US006571138B1

(12) United States Patent
Okada et al.

(10) Patent No.: US 6,571,138 B1
(45) Date of Patent: May 27, 2003

(54) LOCATION PROGRAMMING APPARATUS AND LOCATION PROGRAMMING METHOD

(75) Inventors: Misako Okada, Tokyo (JP); Hidehiko Matsumoto, Tokyo (JP); Nobuyasu Takaki, Tokyo (JP); Yuuko Tomita, Tokyo (JP); Tomoya Shimizu, Tokyo (JP); Tatsuzo Hayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/381,384

(22) PCT Filed: Feb. 23, 1998

(86) PCT No.: PCT/JP98/00721

§ 371 (c)(1), (2), (4) Date: Sep. 21, 1999

(87) PCT Pub. No.: WO99/42911

PCT Pub. Date: Aug. 26, 1999

(51) Int. Cl.[7] ................................................ G05B 15/00
(52) U.S. Cl. ......................... 700/83; 700/189; 700/252; 700/264; 700/56; 318/567; 318/568.1; 318/573
(58) Field of Search .............................. 700/56, 63–64, 700/302, 186, 188–189, 83, 69, 86–88, 252–253, 264; 65/29.11; 318/568.1, 567, 573

(56) References Cited

U.S. PATENT DOCUMENTS

| | | | | | |
|---|---|---|---|---|---|
| 3,893,616 | A | * | 7/1975 | Trousdale | 318/561 |
| 4,413,314 | A | * | 11/1983 | Slater et al. | 700/83 |
| 4,469,993 | A | * | 9/1984 | Swanson et al. | 318/561 |
| 4,617,502 | A | * | 10/1986 | Sakaue et al. | 318/568.18 |
| 5,005,119 | A | * | 4/1991 | Rumbaugh et al. | 709/101 |
| 5,379,367 | A | * | 1/1995 | Song | 700/52 |
| 5,736,824 | A | * | 4/1998 | Sato et al. | 318/561 |
| 5,757,356 | A | * | 5/1998 | Takasaki et al. | 700/276 |
| 5,779,749 | A | * | 7/1998 | Nafziger | 65/29.11 |
| 6,016,110 | A | * | 1/2000 | Takinami | 340/995 |
| 6,160,612 | A | * | 12/2000 | Itoh et al. | 355/53 |

FOREIGN PATENT DOCUMENTS

| | | | | |
|---|---|---|---|---|
| EP | 0 309 589 A1 | | 4/1989 | |
| EP | 0 506 990 A1 | | 10/1992 | |
| EP | 0 685 779 A1 | | 12/1995 | |
| EP | 0 774 701 A1 | | 5/1997 | |
| EP | 0 788 042 A1 | | 8/1997 | |
| EP | 0 813 131 A1 | | 12/1997 | |
| JP | 4-299708 | | 10/1992 | G05B/19/405 |
| JP | 404350701 A | * | 12/1992 | G05B/13/02 |
| JP | 06-131024 AA | | 5/1994 | |
| JP | 6-131024 | | 5/1994 | G05B/19/405 |
| JP | 10-20915 | | 1/1998 | G05B/19/409 |
| WO | WO 97 09547 A1 | | 3/1997 | |

* cited by examiner

*Primary Examiner*—John A. Follansbee
*Assistant Examiner*—Crystal J. Barnes
(74) *Attorney, Agent, or Firm*—Sughrue Mion, PLLC

(57) ABSTRACT

A location programming apparatus and method according to the present invention generates operation control information consisting of a locating control parameter and a locating program for a controller for controlling a motor for operating a subject which must be controlled, the location programming apparatus including: locating control type setting means (control S/W) for setting locating control type for controlling the operation of the subject which must be controlled; graphical data generating means (control S/W) for graphically generating graph data of the locating program on a work memory in accordance with the set locating control type; and operation control information generating means (control S/W) for generating operation control information on a parameter memory and a locating program memory in accordance with graph data stored in the work memory. Thus, a locating program and a locating control parameter can be generated by only graphically setting the locating locus operation, a speed pattern and time transition control.

20 Claims, 177 Drawing Sheets

FIG. 34

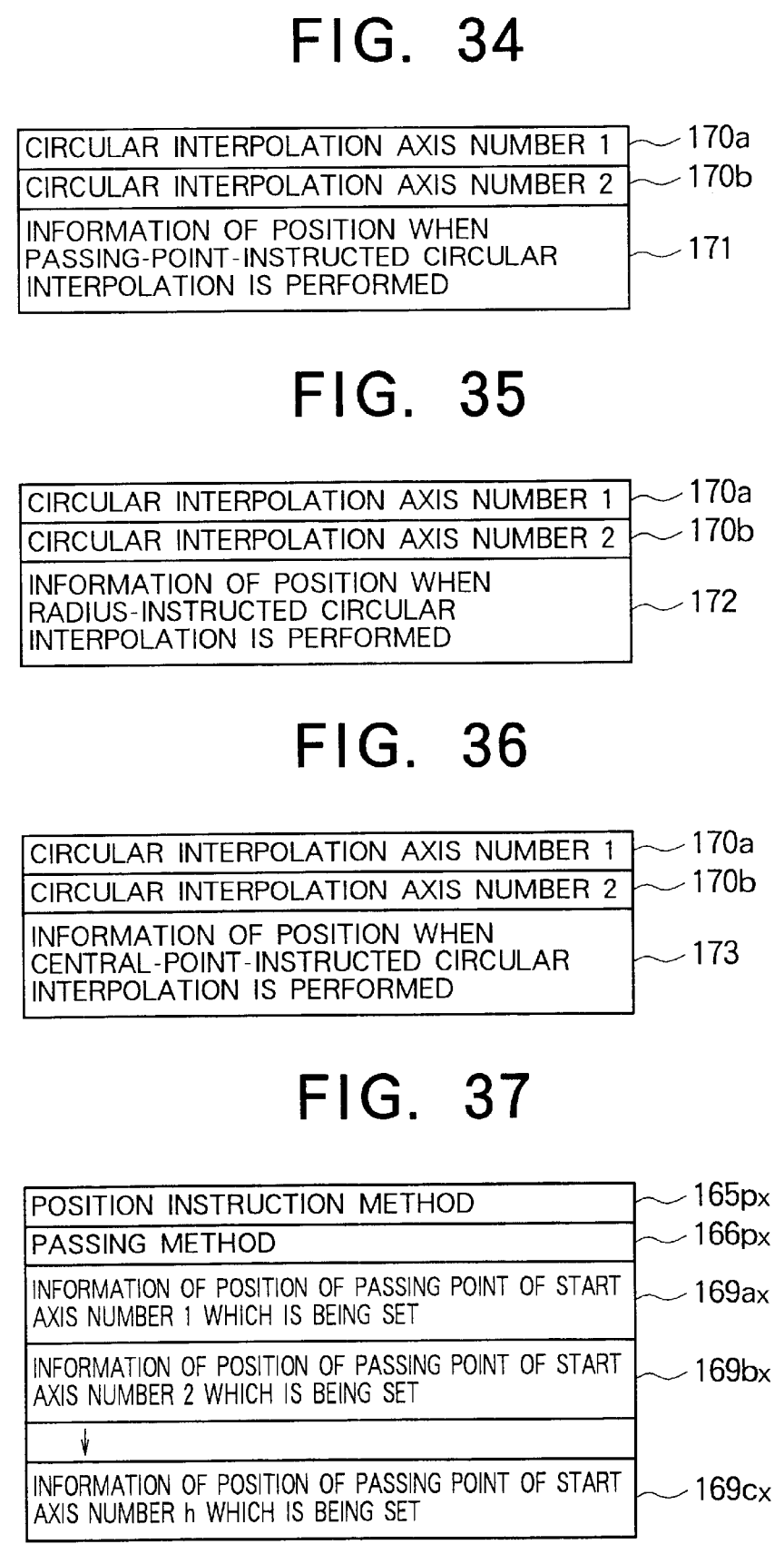

| | |
|---|---|
| CIRCULAR INTERPOLATION AXIS NUMBER 1 | 170a |
| CIRCULAR INTERPOLATION AXIS NUMBER 2 | 170b |
| INFORMATION OF POSITION WHEN PASSING-POINT-INSTRUCTED CIRCULAR INTERPOLATION IS PERFORMED | 171 |

FIG. 35

| | |
|---|---|
| CIRCULAR INTERPOLATION AXIS NUMBER 1 | 170a |
| CIRCULAR INTERPOLATION AXIS NUMBER 2 | 170b |
| INFORMATION OF POSITION WHEN RADIUS-INSTRUCTED CIRCULAR INTERPOLATION IS PERFORMED | 172 |

FIG. 36

| | |
|---|---|
| CIRCULAR INTERPOLATION AXIS NUMBER 1 | 170a |
| CIRCULAR INTERPOLATION AXIS NUMBER 2 | 170b |
| INFORMATION OF POSITION WHEN CENTRAL-POINT-INSTRUCTED CIRCULAR INTERPOLATION IS PERFORMED | 173 |

FIG. 37

| | |
|---|---|
| POSITION INSTRUCTION METHOD | 165px |
| PASSING METHOD | 166px |
| INFORMATION OF POSITION OF PASSING POINT OF START AXIS NUMBER 1 WHICH IS BEING SET | 169ax |
| INFORMATION OF POSITION OF PASSING POINT OF START AXIS NUMBER 2 WHICH IS BEING SET | 169bx |
| ↓ | |
| INFORMATION OF POSITION OF PASSING POINT OF START AXIS NUMBER h WHICH IS BEING SET | 169cx |

FIG. 147

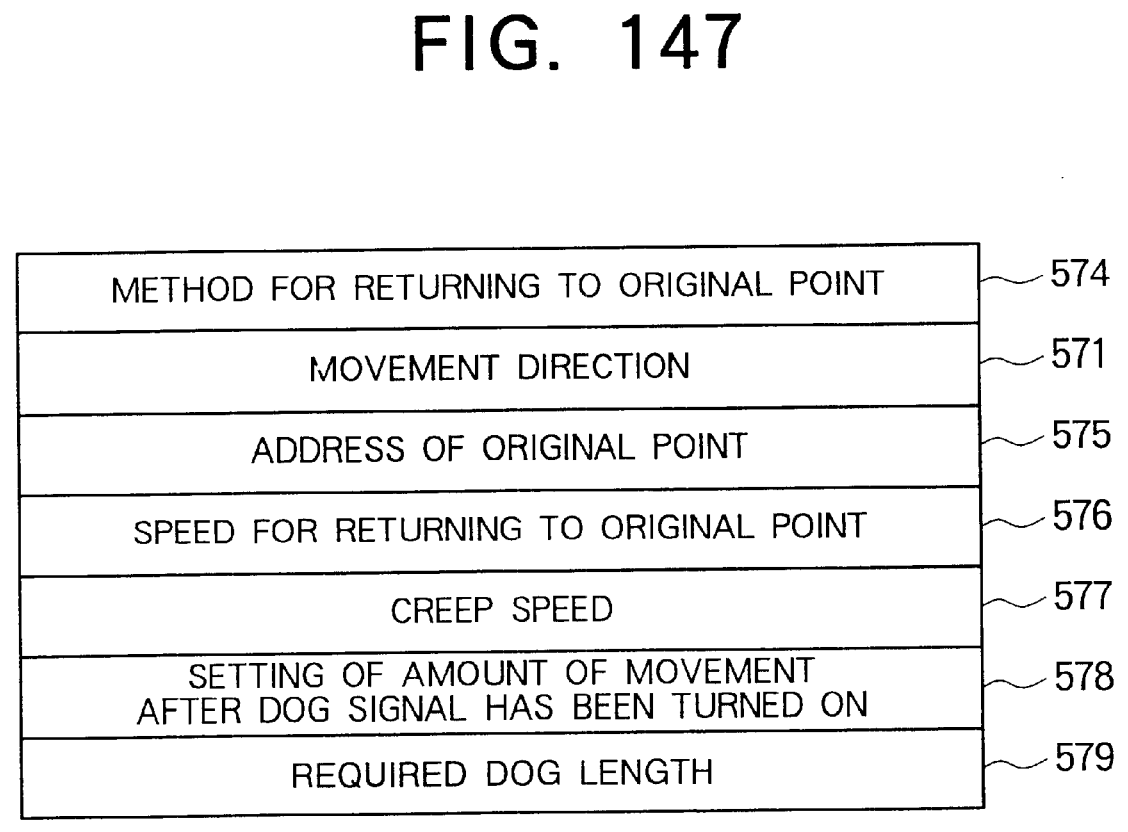

| | |
|---|---|
| METHOD FOR RETURNING TO ORIGINAL POINT | 574 |
| MOVEMENT DIRECTION | 571 |
| ADDRESS OF ORIGINAL POINT | 575 |
| SPEED FOR RETURNING TO ORIGINAL POINT | 576 |
| CREEP SPEED | 577 |
| SETTING OF AMOUNT OF MOVEMENT AFTER DOG SIGNAL HAS BEEN TURNED ON | 578 |
| REQUIRED DOG LENGTH | 579 |

FIG. 160

| TRANSITION TIME | ADDRESS OF POSITION |
|---|---|
| 38a | 38m |
| 38b | 38n |
| 38c | 38o |
| 38d | 38p |
| 38e | 38p |
| 38f | 38q |
| 38g | 38r |
| 38h | 38s |
| 38i | 38s |
| 38j | 38u |
| 38k | 38t |
| 38l | 38m |

FIG. 161

| REGION No. | REGION | SETTING OF SPEED AND ACCELERATION CHARACTERISTICS |
|---|---|---|
| REGION 1 | 38a～38b | CONSTANT ACCELERATION |
| REGION 2 | 38b～38c | UNIFORM VELOCITY |
| REGION 3 | 38c～38d | CONSTANT ACCELERATION |
| REGION 4 | 38d～38e | UNIFORM VELOCITY |
| REGION 5 | 38e～38f | CONSTANT ACCELERATION |
| REGION 6 | 38f～38g | UNIFORM VELOCITY |
| REGION 7 | 38g～38h | CONSTANT ACCELERATION |
| REGION 8 | 38h～38i | UNIFROM VELOCITY |
| REGION 9 | 38i～38j | CONSTANT ACCELERATION |
| REGION 10 | 38j～38k | UNIFORM VELOCITY |
| REGION 11 | 38k～38l | CONSTANT ACCELERATION |

FIG. 162

| POSITION DATA No. | POSITION DATA |
|---|---|
| No1 | 0 |
| • | 0. 001 |
| • | 0. 008 |
| • | • |
| • | 0. 500 |
| • | • |
| • | • |
| • | |
| • | 1 |
| • | • |
| • | 0. 004 |
| No (RESOLUTION−1) | 0 |

| | |
|---|---|
| UNIFORM VELOCITY | DEFORMED TRAPEZOID |
| CONSTANT ACCELERATION | DEFORMED SINE WAVE |
| FIVE-DIMENSIONAL | DEFORMED UNIFORM VELOCITY |
| SIMPLE HARMONIC | TRAPECLOID |
| CYCLOID | INVERTED TRAPECLOID |
| PLURAL-DIMENSIONAL | |

FIG. 173

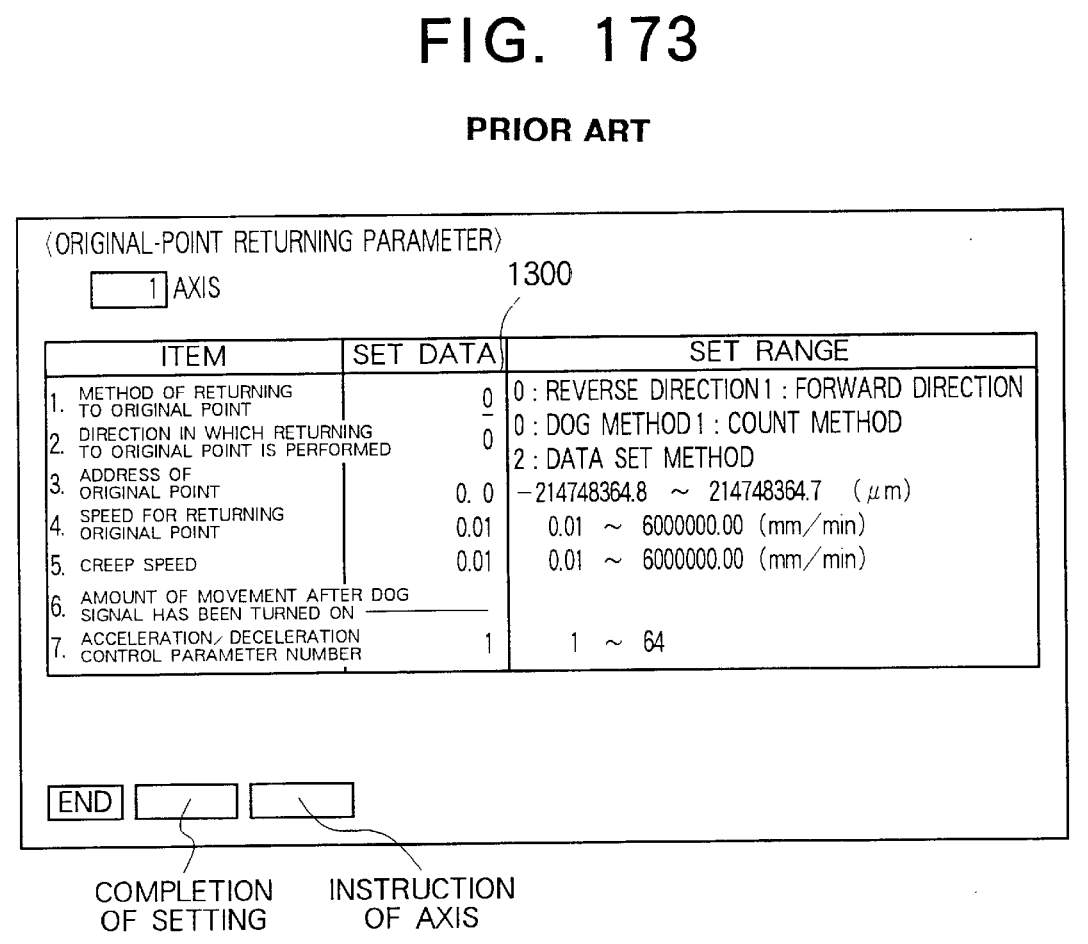

PRIOR ART

⟨ORIGINAL-POINT RETURNING PARAMETER⟩

1 AXIS

1300

| ITEM | SET DATA | SET RANGE |
| --- | --- | --- |
| 1. METHOD OF RETURNING TO ORIGINAL POINT | 0 | 0 : REVERSE DIRECTION 1 : FORWARD DIRECTION |
| 2. DIRECTION IN WHICH RETURNING TO ORIGINAL POINT IS PERFORMED | 0 | 0 : DOG METHOD 1 : COUNT METHOD<br>2 : DATA SET METHOD |
| 3. ADDRESS OF ORIGINAL POINT | 0. 0 | −214748364.8 ~ 214748364.7 (μm) |
| 4. SPEED FOR RETURNING ORIGINAL POINT | 0.01 | 0.01 ~ 6000000.00 (mm/min) |
| 5. CREEP SPEED | 0.01 | 0.01 ~ 6000000.00 (mm/min) |
| 6. AMOUNT OF MOVEMENT AFTER DOG SIGNAL HAS BEEN TURNED ON | —— | |
| 7. ACCELERATION/DECELERATION CONTROL PARAMETER NUMBER | 1 | 1 ~ 64 |

END

COMPLETION OF SETTING

INSTRUCTION OF AXIS

FIG. 177

PRIOR ART

| | | |
|---|---|---|
| POSITION CONTROL UNIT | | 1701 |
| ELECTRONIC GEAR | AMOUNT OF MOVEMENT PER ROTATION | 1702 |
| | AMOUNT OF PULSES PER ROTATION | 1703 |
| | UNIT MAGNIFICATION | 1704 |
| UPPER STROKE LIMIT | | 1705 |
| LOWER STROKE LIMIT | | 1706 |

FIG. 178

PRIOR ART

| | |
|---|---|
| SPEED CONTROL UNIT | 1801 |
| LIMITED SPEED | 1802 |
| ACCELERATION TIME | 1803 |
| DECELERATION TIME | 1804 |
| RAPID STOP DECELERATION TIME | 1805 |
| TYPE OF ACCELERATION /DECELE RATION PATTERN | 1806 |

FIG. 179

PRIOR ART

| | |
|---|---|
| METHOD FOR RETURNING TO ORIGINAL POINT | 1901 |
| DIRECTION IN WHICH RETURNING TO ORIGINAL POINT IS PERFORMED | 1902 |
| ADDRESS OF ORIGINAL POINT | 1903 |
| SPEED AT WHICH RETURNING TO ORIGINAL POINT IS PERFORMED | 1904 |
| CREEP SPEED | 1905 |
| SETTING OF AMOUNT OF MOVEMENT AFTER DOG SIGNAL HAS BEEN TURNED ON | 1906 |
| ACCELERATION /DECELERATION CONTROL PARAMETER NUMBER | 1907 |

FIG. 184
PRIOR ART

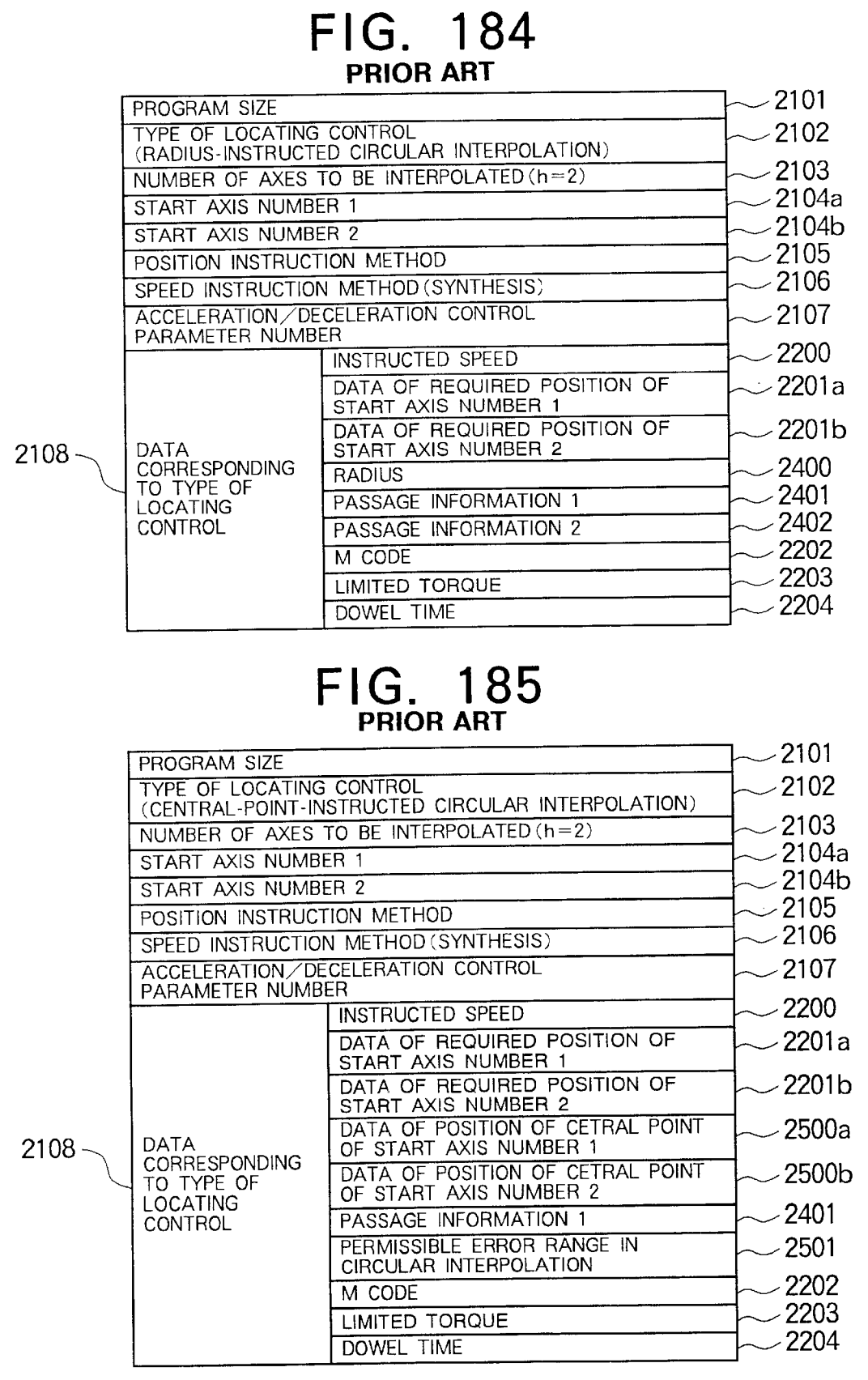

| Field | Item | Ref. |
|---|---|---|
| PROGRAM SIZE | | 2101 |
| TYPE OF LOCATING CONTROL (RADIUS-INSTRUCTED CIRCULAR INTERPOLATION) | | 2102 |
| NUMBER OF AXES TO BE INTERPOLATED (h=2) | | 2103 |
| START AXIS NUMBER 1 | | 2104a |
| START AXIS NUMBER 2 | | 2104b |
| POSITION INSTRUCTION METHOD | | 2105 |
| SPEED INSTRUCTION METHOD (SYNTHESIS) | | 2106 |
| ACCELERATION/DECELERATION CONTROL PARAMETER NUMBER | | 2107 |
| DATA CORRESPONDING TO TYPE OF LOCATING CONTROL (2108) | INSTRUCTED SPEED | 2200 |
| | DATA OF REQUIRED POSITION OF START AXIS NUMBER 1 | 2201a |
| | DATA OF REQUIRED POSITION OF START AXIS NUMBER 2 | 2201b |
| | RADIUS | 2400 |
| | PASSAGE INFORMATION 1 | 2401 |
| | PASSAGE INFORMATION 2 | 2402 |
| | M CODE | 2202 |
| | LIMITED TORQUE | 2203 |
| | DOWEL TIME | 2204 |

FIG. 185
PRIOR ART

| Field | Item | Ref. |
|---|---|---|
| PROGRAM SIZE | | 2101 |
| TYPE OF LOCATING CONTROL (CENTRAL-POINT-INSTRUCTED CIRCULAR INTERPOLATION) | | 2102 |
| NUMBER OF AXES TO BE INTERPOLATED (h=2) | | 2103 |
| START AXIS NUMBER 1 | | 2104a |
| START AXIS NUMBER 2 | | 2104b |
| POSITION INSTRUCTION METHOD | | 2105 |
| SPEED INSTRUCTION METHOD (SYNTHESIS) | | 2106 |
| ACCELERATION/DECELERATION CONTROL PARAMETER NUMBER | | 2107 |
| DATA CORRESPONDING TO TYPE OF LOCATING CONTROL (2108) | INSTRUCTED SPEED | 2200 |
| | DATA OF REQUIRED POSITION OF START AXIS NUMBER 1 | 2201a |
| | DATA OF REQUIRED POSITION OF START AXIS NUMBER 2 | 2201b |
| | DATA OF POSITION OF CETRAL POINT OF START AXIS NUMBER 1 | 2500a |
| | DATA OF POSITION OF CETRAL POINT OF START AXIS NUMBER 2 | 2500b |
| | PASSAGE INFORMATION 1 | 2401 |
| | PERMISSIBLE ERROR RANGE IN CIRCULAR INTERPOLATION | 2501 |
| | M CODE | 2202 |
| | LIMITED TORQUE | 2203 |
| | DOWEL TIME | 2204 |

FIG. 187
PRIOR ART

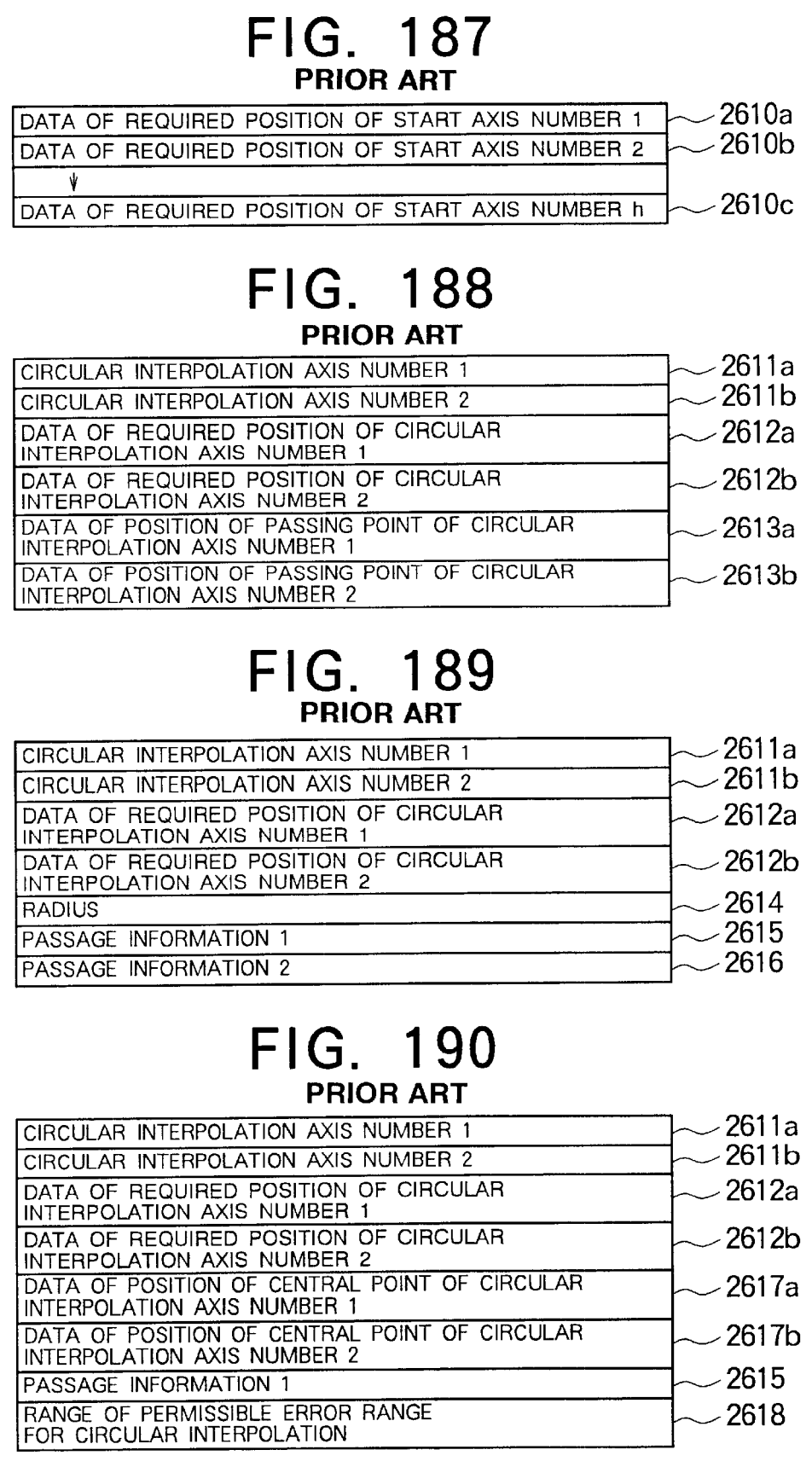

| | |
|---|---|
| DATA OF REQUIRED POSITION OF START AXIS NUMBER 1 | 2610a |
| DATA OF REQUIRED POSITION OF START AXIS NUMBER 2 | 2610b |
| ↓ | |
| DATA OF REQUIRED POSITION OF START AXIS NUMBER h | 2610c |

FIG. 188
PRIOR ART

| | |
|---|---|
| CIRCULAR INTERPOLATION AXIS NUMBER 1 | 2611a |
| CIRCULAR INTERPOLATION AXIS NUMBER 2 | 2611b |
| DATA OF REQUIRED POSITION OF CIRCULAR INTERPOLATION AXIS NUMBER 1 | 2612a |
| DATA OF REQUIRED POSITION OF CIRCULAR INTERPOLATION AXIS NUMBER 2 | 2612b |
| DATA OF POSITION OF PASSING POINT OF CIRCULAR INTERPOLATION AXIS NUMBER 1 | 2613a |
| DATA OF POSITION OF PASSING POINT OF CIRCULAR INTERPOLATION AXIS NUMBER 2 | 2613b |

FIG. 189
PRIOR ART

| | |
|---|---|
| CIRCULAR INTERPOLATION AXIS NUMBER 1 | 2611a |
| CIRCULAR INTERPOLATION AXIS NUMBER 2 | 2611b |
| DATA OF REQUIRED POSITION OF CIRCULAR INTERPOLATION AXIS NUMBER 1 | 2612a |
| DATA OF REQUIRED POSITION OF CIRCULAR INTERPOLATION AXIS NUMBER 2 | 2612b |
| RADIUS | 2614 |
| PASSAGE INFORMATION 1 | 2615 |
| PASSAGE INFORMATION 2 | 2616 |

FIG. 190
PRIOR ART

| | |
|---|---|
| CIRCULAR INTERPOLATION AXIS NUMBER 1 | 2611a |
| CIRCULAR INTERPOLATION AXIS NUMBER 2 | 2611b |
| DATA OF REQUIRED POSITION OF CIRCULAR INTERPOLATION AXIS NUMBER 1 | 2612a |
| DATA OF REQUIRED POSITION OF CIRCULAR INTERPOLATION AXIS NUMBER 2 | 2612b |
| DATA OF POSITION OF CENTRAL POINT OF CIRCULAR INTERPOLATION AXIS NUMBER 1 | 2617a |
| DATA OF POSITION OF CENTRAL POINT OF CIRCULAR INTERPOLATION AXIS NUMBER 2 | 2617b |
| PASSAGE INFORMATION 1 | 2615 |
| RANGE OF PERMISSIBLE ERROR RANGE FOR CIRCULAR INTERPOLATION | 2618 |

FIG. 193

PRIOR ART

| | |
|---|---|
| PROGRAM SIZE | 2101 |
| TYPE OF LOCATING CONTROL (RETURNING TO ORIGINAL POINT) | 2102 |
| NUMBER OF AXES TO BE INTERPOLATED (h=1) | 2103 |
| START AXIS NUMBER 1 | 2104a |
| POSITION INSTRUCTION METHOD (DUMMY) | 2105 |
| SPEED INSTRUCTION METHOD (DUMMY) | 2106 |
| ACCELERATION/DECELERATION CONTROL PARAMETER NUMBER (DUMMY) | 2107 |

FIG. 194

PRIOR ART

| | | | |
|---|---|---|---|
| | PROGRAM SIZE | | 2101 |
| | TYPE OF LOCATING CONTROL (HIGH SPEED OSCILLATION) | | 2102 |
| | NUMBER OF AXES TO BE INTERPOLATED (h=1) | | 2103 |
| | START AXIS NUMBER 1 | | 2104a |
| | POSITION INSTRUCTION METHOD (DUMMY) | | 2105 |
| | SPEED INSTRUCTION METHOD (DUMMY) | | 2106 |
| | ACCELERATION/DECELERATION CONTROL PARAMETER NUMBER (DUMMY) | | 2107 |
| 2108 | DATA CORRESPONDING TO TYPE OF LOCATING CONTROL | START ANGLE | 2900 |
| | | AMPLITUDE | 2901 |
| | | FREQUENCY | 2902 |
| | | M CODE | 2202 |
| | | LIMITED TORQUE | 2203 |

FIG. 196

PRIOR ART

1031a

| | |
|---|---|
| PROGRAM No. | 1031a |
| AMOUNT OF MOVEMENT | AREA OF 1030a, 1030p, 1030q AND 1030d |
| INSTRUCTED SPEED | 1030n |
| ACCELERATION TIME | 1030a～1030b |
| DECELERATION TIME | 1030c～1030d |

1031b

| | |
|---|---|
| PROGRAM No. | 1031b |
| AMOUNT OF MOVEMENT | AREA OF 1030e, 1030r, 1030s AND 1030h |
| INSTRUCTED SPEED | 1030m |
| ACCELERATION TIME | 1030e～1030f |
| DECELERATION TIME | 1030g～1030h |

1031c

| | |
|---|---|
| PROGRAM No. | 1031c |
| AMOUNT OF MOVEMENT | AREA OF 1030i, 1030t, 1030u, 1030l |
| INSTRUCTED SPEED | 1030o |
| ACCELERATION TIME | 1030i～1030j |
| DECELERATION TIME | 1030k～1030l |

PRIOR ART

| | |
|---|---|
| PROGRAM No. | 1031a |
| AMOUNT OF MOVEMENT | AREA OF 1032a, 1032p, 1032q AND 1032d |
| INSTRUCTED SPEED | 1032n |
| ACCELERATION TIME | 1032a~1032b |
| DECELERATION TIME | 1032c~1032l |

1035b

| | |
|---|---|
| PROGRAM No. | 1035b |
| AMOUNT OF MOVEMENT | AREA OF 1032e, 1032r, 1032s AND 1032h |
| INSTRUCTED SPEED | 1032m |
| ACCELERATION TIME | 1032a~1032b |
| DECELERATION TIME | 1032c~1032d |

1035c

| | |
|---|---|
| PROGRAM No. | 1035c |
| AMOUNT OF MOVEMENT | AREA OF 1032i, 1032t, 1032u AND 1032l |
| INSTRUCTED SPEED | 1032o |
| ACCELERATION TIME | 1032i~1032j |
| DECELERATION TIME | 1032k~1032l |

1036a

| | |
|---|---|
| PROGRAM No. | 1036a |
| AMOUNT OF MOVEMENT | AREA OF 1033b, 1033m, 1033n AND 1033e |
| INSTRUCTED SPEED | 1033k |
| ACCELERATION TIME | 1033b~1033c |
| DECELERATION TIME | 1033d~1033e |

1036b

| | |
|---|---|
| PROGRAM No. | 1036b |
| AMOUNT OF MOVEMENT | AREA OF 1033f, 1033o, 1033p AND 1033i |
| INSTRUCTED SPEED | 1033l |
| ACCELERATION TIME | 1033f~1033g |
| DECELERATION TIME | 1033h~1033i |

1037a

| | |
|---|---|
| PROGRAM No. | 1037b |
| AMOUNT OF MOVEMENT | AREA OF 1034a, 1034b, 1034c AND 1034d |
| INSTRUCTED SPEED | 1034j |
| ACCELERATION TIME | 1034b~1034c |
| DECELERATION TIME | 1034d~1034e |

1037b

| | |
|---|---|
| PROGRAM No. | 1037b |
| AMOUNT OF MOVEMENT | AREA OF 1034f, 1034n, 1034o AND 1034i |
| INSTRUCTED SPEED | 1033k |
| ACCELERATION TIME | 1034f~1034g |
| DECELERATION TIME | 1034h~1034i |

LOCATION PROGRAMMING APPARATUS AND LOCATION PROGRAMMING METHOD

FIELD OF THE INVENTION

The present invention relates to a location programming apparatus for supplying a program to a locating controller for controlling a servo motor or the like of a carrier apparatus or the like in a manufacturing plant or the like and a method therefor, and more particularly to a location programming apparatus for graphically describing a program and a method therefor.

More particularly, the present invention relates to a location programming apparatus for automatically generating a position data table for a locating controller for use in a process for controlling a plurality of axes each of which repeats a predetermined operation in accordance with an operation timing chart for each axis.

BACKGROUND ART

A conventional location programming apparatus is arranged to set a locating program by using a formed list and set parameters for controlling a control process on a parameter window.

The conventional location programming apparatus will now be described. FIG. 170 is a diagram showing the structure of the conventional locating controller and that of the system of the location programming apparatus.

Referring to FIG. 170, reference numeral 1001 represents a locating controller, 1002*a*, 1002*b* and 1002*c* represent servo amplifiers, 1003*a*, 1003*b* and 1003*c* represent servo motors, 1004 represents the location programming apparatus comprising a personal computer, 1005 represents a CPU for performing locating operations, 1006 represents an O/S ROM on which an O/S for operating the locating controller 1001 is stored and 1007 represents a work memory for the CPU 1005. Reference numeral 1008 represents a parameter memory on which parameters required to control the locating process are stored, 1009 represents a locating-program memory in which a locating program is stored and 1010 represents a communication interface between the location programming apparatus 1004 and the locating controller 1001. Reference numeral 1011 represents a servo-amplifier interface between the servo amplifiers 1002*a*, 1002*b* and 1002*c* and the locating controller 1001. Reference numeral 1012 represents a signal input/output interface with an external device.

Referring to FIG. 170, reference numeral 1013 represents a CPU for the location programming apparatus 1004. Reference numeral 1014 represents a memory on which software (S/W) for controlling the locating program is stored. Reference numeral 1015 represents a work memory for setting parameter required to controlling the locating process, 1016 represents a parameter memory on which the set parameters are stored, 1017 represents a work memory for setting a list-form locating program and 1018 represents a locating-program memory on which the set locating program is stored. Reference numeral 1019 represents a communication interface to the locating controller 1001 so that the contents of the set parameter memory 1016 and locating-program memory 1018 are written on the locating controller 1001 and reads the same from the locating controller 1001. Note that a display unit is omitted from illustration.

FIG. 171 shows an example of a window for setting axis parameters for the conventional location programming apparatus 1004. A list is displayed so that setting is performed by inputting figures to a set data column 1100.

FIG. 172 shows an example of a window for setting parameters for controlling acceleration/deceleration for the conventional location programming apparatus 1004. A list is displayed so that setting is performed by inputting figures to a set data column 1200.

FIG. 173 shows an example of a window for setting parameters for restoration to an original point for the conventional location programming apparatus 1004. A list is displayed so that setting is performed by inputting figures to a set data column 1300.

FIG. 174 shows example of a location programming window for the conventional location programming apparatus 1004. A program list corresponding to the type of location control selected in a locating-control-type selection area 1400 is displayed on a locating-program-list setting/display area 1401 so as to set required items by inputting figures. FIG. 174 shows a locating program list by a passage-point instruction circular interpolation method in such a manner that absolute positions are instructed. Items to be set include end-point position data 1402, instructed speed 1403, passing-point position data 1404, M code 1405, limited torque value 1406, dwell time 1407 and acceleration/deceleration parameter number 1408. The setting operation is performed by inputting figures to each of the setting columns.

FIG. 175 shows an example of another location programming window for the conventional location programming apparatus 1004. Programming is performed by using standardized codes. Required position data 1501, instructed speed 1502 and the like are set by inputting figures.

The location programming window, the axis parameter setting window, the acceleration/deceleration control parameter setting window and the original-point restoration setting window are independent windows. The window is switched to perform the setting operation.

The structure of the parameter memory 1008 of the locating controller 1001 will now be described with reference to FIGS. 176 to 179. FIG. 176 shows the overall structure of the parameter memory 1008 on which the contents set in each of the parameter setting windows are stored. Reference numeral 1700 represents an area on which the axis parameter is stored and 1900 represents an area on which original-point restoration parameter is store. Each area is determined to correspond to each axis and the number of axes to be controlled. Reference numeral 1800 represents an area on which the acceleration/deceleration control parameter is stored which corresponds to the number of parameters.

FIG. 177 shows the structure of an axis parameter storage area 1700 composed of a position control unit storage area 1701, an area 1702 on which a movement amount per rotation of an electronic gear is stored, an area 1703 on which the number of pulses per rotation of the electronic gear is stored, an area 1704 on which a unit magnification of the electronic gear is stored, an area 1705 on which an upper limit stroke indicating the permissible movement range for the axis is stored and an area 1706 on which a lower stroke limit is stored.

FIG. 178 shows the structure of an acceleration/deceleration control parameter storage area 1800 composed of an area 1801 on which a speed control unit is stored, an area 1802 on which the limited speed is stored, an acceleration time storage area 1803, a deceleration time storage area 1804, a rapid-stop deceleration time storage area 1805 and an area 1806 on which the type of the acceleration/deceleration pattern is stored whether the pattern is trapezoid acceleration/deceleration, S-figure acceleration/deceleration or exponential acceleration/deceleration.

The speed control unit is a unit of the speed which is instructed when two or more axes having different position control units are interpolation-controlled. The acceleration time indicates time required for the speed to reach limited speed. When the type of the acceleration/deceleration pattern is the exponential acceleration/deceleration, the acceleration time indicates set time required for the speed to reach 99% of the limited speed. Similarly, the deceleration time and the rapid stop deceleration time indicates time required for the limited speed to be reduced to the completion of deceleration. When the type of the acceleration/deceleration pattern is the exponential acceleration/deceleration, set time is indicated which takes from 99% of the limited speed to completion of deceleration.

FIG. 179 shows the structure of an original-point-restoration parameter storage area 1900 composed of an area 1901 on which an original-point-restoration method is stored, an area 1902 on which an original-point-restoration direction is stored, an area 1903 on which the address of the original point is stored, an area 1904 on which original-point-restoration speed is stored, an area 1905 on which creep speed is stored, an area 1906 on which a set amount of movement performed after a DOG signal has been turned on is stored and an area 1907 on which the acceleration/deceleration control parameter number is stored. Only required items corresponding to the employed method of returning to the original point are stored.

The structure of the locating-program memory 1009 of the locating controller 1001 will now be described with reference to FIGS. 180 to 194. FIG. 180 shows the overall structure of the locating-program memory 1009 which is composed of areas on which header information 2000 and a locating program code 2100 are stored. The header information storage area 2000 has areas 2001*a*, 2001*b*, 2001*c* and 2001*d* on which information about areas on which locating program codes having program number k are stored is stored.

FIG. 181 shows the structure of the area 2100 on which the locating program code is stored and which is composed of an area 2101 on which the program size is stored, an area 2102 on which the type of the locating control is stored, an area 2103 on which the number of axes to be interpolated is stored, areas 2104*a*, 2104*b* and 2104*c* on which the start axis number is stored, an area 2105 on which whether the method of instructing the position is instruction of the absolute position or instruction of the amount of relative movement is stored. Moreover, the area 2100 has an area 2106 on which a speed instruction method indicating whether the instruction of the speed is instruction of the interpolation axis synthesized speed or instruction of the speed of a reference axis in such a manner that the speed of an instructed axis is instructed or instruction of the speed of the longer axis in such a manner that the speed of the axis which has moved maximally is instructed is stored. In addition, the area 2100 has an area 2107 on which the acceleration/deceleration control parameter number is stored and an area 2108 on which data corresponding to the type of the locating control is stored.

FIG. 182 shows the structure of a locating program storage area for use in a linear locating control. The area 2108 on which data corresponding to the type of the locating control is stored is composed of an area 2200 on which instructed speed is stored, areas 2201*a*, 2201*b* and 2201*c* on each of which data of the required positions of start axis numbers 1, 2, . . . , h is stored, an area 2202 on which the M code is stored, an area 2203 on which the limited torque is stored and an area 2204 on which the dowel time is stored.

FIG. 183 shows the structure of an area on which locating program code for use in passage-point instruction circular interpolation control. The area 2108 on which data corresponding to the type of the locating control is stored is composed of an area 2200 on which instructed speed is stored, areas 2201*a* and 2201*b* on each of which data of a required position of each of start axis numbers 1 and 2 is stored, areas 2300*a* and 2300*b* on each of which data of a passing position of each of the start axis numbers 1 and 2 is stored, an area 2202 on which the M code is stored, an area 2203 on which limited torque is stored and an area 2204 on which dowel time is stored.

FIG. 184 shows the structure of the area on which locating program code for use in radius-instructed circular interpolation control is stored. The area 2108 on which data corresponding to the type of the locating control is stored is composed of an area 2200 on which instructed speed is stored, areas 2201*a* and 2201*b* on each of which data of a required position of each of the start axis numbers 1 and 2 is stored, an area 2400 on which the radius is stored and an area 2401 on which passage information 1 is stored which indicates whether the circular arc passage is clockwise or counterclockwise. Moreover, the area 2108 has an area 2402 on which passage information 2 is stored which indicates whether the angle of the circular arc is not smaller than 180° or smaller than 180°, an area 2202 on which the M code is stored, an area 2203 on which the limited torque is stored and an area 2204 on which dowel time is stored.

FIG. 185 shows the structure of an area on which a locating program code for use in central-position-instructed circular interpolation control is stored. The area 2108 on which data corresponding to the type of the locating control is stored is composed of an area 2200 on which instructed speed is stored, area 2201*a* and 2201*b* on each of which data of a required position for each of the start axis numbers 1 and 2 is stored, areas 2500*a* and 2500*b* on which data items of the positions of the central points of the start axis numbers 1 and 2 are stored, an area 2401 on which passage information 1 is stored, an area 2501 on which a permissible error range in the circular interpolation is stored in a case where a required position is deviated from an ideal final position, an area 2202 on which the M code is stored, an area 2203 on which the limited torque is stored and an area 2204 on which dowel time is stored.

FIG. 186 shows the structure of an area on which locating program code for use in a locus control. The area 2108 on which on which data corresponding to the type of the locating control is stored is composed of an area 2607 on which the number (M) of passing points is stored, areas 2608$p_1$, 2608$p_2$ and 2608$p_M$ on each of which data of locating control of between passing points (regions 1 to M) is stored and an area 2608 on which locating control data in the final region (region M+1) is stored. Data of locating control between passing points is composed of instructed speed 2600$p_M$ between points, position instruction method 2601$p_M$ between points, passing method 2602$p_M$ between points, data 2603$p_M$ corresponding to the passing method between points, M code 2604$p_M$ between points and limited torque 2605$p_M$ between points. Position control data of the final region is composed of dwell time 2606 in addition to locating control data between passing points.

FIG. 187 shows the structure of data 2603 corresponding to the passing method in a case where the passing method of the locating program code of the locus control is linear control. Data 2603 is composed of required position data items 2610*a*, 2610*b* and 2610*c* of the start axis numbers 1, 2, . . . , h.

FIG. 188 shows the structure of data 2603 corresponding to the passing method in a case where the passing method of the locating program code of the locus control is circular interpolation control which is performed in such a manner that the passing point is instructed. Data 2603 is composed of data 2611*a* and 2611*b* of circular interpolation axis numbers 1 and 2, data 2612*a* and 2612*b* of required positions of circular interpolation axis numbers 1 and 2 and data 2613*a* and 2613*b* of circular interpolation axis numbers 1 and 2.

FIG. 189 shows the structure of data 2603 corresponding to the passing method in a case where the passing method of the locating program code of the locus control is circular interpolation control which is performed in such a manner that the radius is instructed. Data 2603 is composed of data 2611*a* and 2611*b* of the circular interpolation axis numbers 1 and 2, data 2612*a* and 2612*b* of required positions of the circular interpolation axis numbers 1 and 2, data 2614 of the radius, data 2615 of passage information 1 and data 2616 of passage information 2.

FIG. 190 shows the structure of data 2603 corresponding to the passing method in a case where the passing method of the locating program code of the locus control is circular interpolation control which is performed in such a manner that the central point is instructed. Data 2603 is composed of data 2611*a* and 2611*b* of the circular interpolation axis numbers 1 and 2, data 2612*a* and 2612*b* of the required positions of circular interpolation axis numbers 1 and 2, data 2617*a* and 2617*b* of the positions of the central points of circular interpolation axis numbers 1 and 2, data 2615 of passage information 1 and data 2618 of the permissible error range in the circular interpolation.

FIG. 191 shows the structure of a locating program code for use when the speed control is performed. The area 2108 on which data corresponding to the type of the locating control is stored is composed of instructed speed 2200, a moving direction 2701 indicated whether the direction is a forward direction or a reverse direction, the M code 2202 and a limited torque 2203.

FIG. 192 shows the structure of a locating program code for use when the speed and position are controlled. The area 2108 on which data corresponding to the type of the locating control is stored is composed of instructed speed 2200, a moving direction 2701, an amount 2800 of movement after the position control has been switched, the M code 2801 after the position control has been switched, limited torque 2802 after the position control has been switch, the M code 2202 at the start of the speed control, limited torque 2203 at the start of the speed control and dwell time 2204.

FIG. 193 shows the structure of a locating program code for use in the original-point restoration control. The locating program requires the start axis number. Except for this, the locating program is controlled in accordance with the contents of the original-point-restoration parameter memory 1900.

FIG. 194 shows the structure of the locating program code for use in high-speed oscillate control. The area 2108 on which data corresponding to the type of the locating control is stored is composed of a start angle 2900, an amplitude 2901, the frequency 2902, the M code 2202 and the limited torque 2203.

The structures of the parameter memory 1008 and the locating-program memory 1009 of the locating controller 1001 and those of the parameter memory 1016 and the locating-program memory 1018 of the location programming apparatus 1004 are the same.

As described above, the conventional location programming apparatus 1004 is structured in such a manner that the locating program and parameters are set on the parameter list window so that the locating program is set by using the list form. Therefore, all of position data, speed data and parameters are set by inputting figures and displayed in the form of figures. Thus, when the initial programming process is performed, the locus of the locations and a diagram of the speed pattern during the operation must be calculated and constructed. Moreover, a substituting process for the values of the program and parameters of the list form in accordance with the constructed diagram. Therefore, there arises a problem in that excessively long time takes to set the parameter and the parameters.

When the set values are changed because debugging of the program is performed, calculations must again be performed. As a result, long time is required to determine figures. Moreover, there arises a problem in that the control operation affected by the changed parameter cannot easily detected.

Since the conventional location programming apparatus 1004 has the structure that the programs for setting the parameters and position use lists which requires figures to be input, there arises a problem in that the actual operation of the subject which must be controlled cannot easily be recognized by simply looking the program and the parameters.

To solve the above-mentioned problems, an object of the present invention is to obtain a location programming apparatus and a method therefor with which the operations for controlling the position and the speed are graphically displayed to enable anyone to easily understand the control operation, the graph can easily be constructed/changed and direct substitution for the locating program and parameters is permitted.

Since the conventional location programming apparatus has the structure that the programs for setting the parameters and position use lists which requires figures to be input, the functions of the items set by the programs for setting the parameter and the position in the control operation of the determined locating control type cannot easily be recognized. Moreover, the relation of the items with the control operation cannot easily be recognized.

The present invention is achieved to solve the above-mentioned problems and an object of the present invention is to obtain a location programming apparatus and a method therefor capable of graphically displaying a graph for enabling the relation of items with the control operation in the determined type of the locating control and the programs for setting the parameter and the position to easily be understood so as to easily set/change a graph pattern and enable substation for the locating program and parameters.

Since the conventional location programming apparatus is arranged to set a locating program by using the list form, all of position data items are set by inputting figures. When a subject, which must be controlled, is located by performing interpolation of a plurality of axes, such as interpolation of three spindles or four spindles, the locus chart which is previously constructed when the initial programming operation is performed becomes too complicated. Thus, there arises a problem in that excessively long time is required to set a program.

Since the conventional location programming apparatus uses a locating program in the form of a list, there arises a problem in that the locus operation of a subject which must be controlled cannot easily be understood by simplifying looking the program.

Since the conventional location programming apparatus uses a locating program in the form of a list, a result of change of a locus cannot easily be understood when position data of the program has been changed. Therefore, there arises a problem in that long time is required to determine position data.

The present invention is achieved to solve the above-mentioned problems and an object of the present invention is to obtain a location programming apparatus and a method therefor capable of easily graphically constructing and changing the locus of a subject which must be controlled even if a plurality of axes are interpolation-controlled and permitting direct substitution for a locating program.

Since the conventional location programming apparatus uses a locating program in the form of a list, there arises a problem in that whether position data is instructed with an absolute position or an amount of relative movement cannot quickly be recognized by only looking at the program depending on the program language.

The present invention is achieved to solve the above-mentioned problem and an object of the present invention is to obtain a location programming apparatus and a method therefor which enables a method of instructing the position to be recognized by only looking at the locus.

Since the conventional location programming apparatus uses a locating program in the form of a list, there arises a problem in that an amount of relative movement between points or a corresponding absolute position cannot immediately be recognized by only looking at the program for controlling the locus of a type in which different methods of instructing the position are mixed.

The present invention is achieved to solve the above-mentioned problem and an object of the present invention is to obtain a location programming apparatus and a method therefor with which enables the absolute position of each point and an amount of relative movement between points to immediately be recognized only by looking even if a locus control program is employed.

Since the conventional location programming apparatus is arranged in such a manner that location programming and setting of locating control parameter, such as the stroke limit, are performed on individual windows, the window must be switched to change/confirm the parameter during the location programming process. Thus, there arises a problem in that a complicated switching operation is required.

Another problem arises in that position data is set without consciousness of a stroke limit when a location programming process is performed and the controller detects an error deviated from the stroke limit range. Thus, start of the operation is sometimes inhibited.

If the start and auxiliary points which are set by the program satisfy the stroke limit range when the circular interpolation is set, deviation of the intermediate path of the circular arc from the stroke limit range cannot be detected when the programming operation is performed. Thus, the controller detects an error deviated from the stroke limit range when the program is started. Therefore, there arises a problem in that the operation is undesirably interrupted.

To solve the above-mentioned problem, an object of the present invention is to obtain a location programming apparatus and a method therefor with which the stroke limit range and the locating locus can always be recognized.

The conventional location programming apparatus is arranged in such a manner that all of data items of, for example, instructed speed, limited speed, acceleration time, deceleration time and rapid stop deceleration time, for controlling acceleration and deceleration are set by inputting figure. Therefore, a speed pattern which is being employed during the operation cannot easily be recognized. To determine a speed pattern, confirmation of the operation by using a machine is required. To modify/change the operation, figures must again be obtained and set followed by confirmation using the machine. Thus, there arises a problem in that excessively long time is required to determine figures and a complicated operation is required.

The conventional location programming apparatus is arranged in such a manner that instructed speed is set on a location programming window in the form of a list. Moreover, data of limited speed, acceleration time, deceleration time and rapid stop deceleration time for controlling acceleration and deceleration is set on a parameter list window. Therefore, data relating to the speed must be set on an individual window. As a result, the relation cannot easily be recognized. Thus, the window must be switched to change/confirm the parameters during the location programming operation. As a result, there arises a problem in that a complicated operation must be performed.

To solve the above-mentioned problem, an object of the present invention is to obtain a location programming apparatus and a method therefor with which a speed pattern for use in the operation can easily be produced/changed and direct substitution for the acceleration/deceleration parameter and for a locating program is permitted.

The conventional location programming apparatus is arranged in such a manner that the location programming window in the form of a list is used to set instructed speed and limited speed is set on a parameter list window by using figures. Therefore, there arises a problem in that instructed speed higher than limited speed is unintentionally set when location programming is performed. As a result, the controller detects an error of a type that the speed is higher than the instructed speed. Thus, there arises a problem in that control to realize instructed speed cannot be performed.

To solve the above-mentioned problem, an object of the present invention is to provide a location programing apparatus and a method therefor with which limited speed can always be recognized during the location programming operation and an error of a type that the speed is higher than the instructed speed can be prevented.

The conventional location programming apparatus is arranged in such a manner that data for controlling the acceleration/deceleration pattern by inputting figures. Therefore, there arises a problem in that an employed pattern for controlling the acceleration/deceleration cannot easily be recognized.

To solve the above-mentioned problem, an object of the present invention is to provide a location programming apparatus and a method therefor with which an actual acceleration/deceleration pattern to be displayed is formed into a speed graph and setting/change is permitted.

The conventional location programming apparatus is arranged in such a manner that a parameter list window is used to set limited speed, acceleration time, deceleration time and rapid stop deceleration time by inputting figures. Therefore, actual acceleration time, deceleration time and rapid stop deceleration time which take in the operation when the speed instructed by the locating program is realized cannot easily be recognized. Thus, there arises a problem in that a user must perform calculations to recognize the time.

If an operation speed pattern is, in a locus control, employed with which the speed is changed at an intermediate passing point, there arises a problem in that actual acceleration/deceleration time at the point at which the speed is changed cannot easily be recognized.

To solve the above-mentioned problem, an object of the present invention is to provide a location programming apparatus and a method therefor with which actual acceleration time, deceleration time and rapid stop deceleration time from the speed instructed by using the locating program can automatically be calculated and displayed.

The conventional location programming apparatus is arranged in such a manner that the list-form locating program is used to set dowel time, the M code and limited torque by inputting figures. Therefore, there arises a problem in that the control operation which is performed during the operation cannot easily be recognized.

To solve the above-mentioned problem, an object of the present invention is to provide a location programming apparatus and a method therefor with which the ratio of dowel time, timing at which the M code must be transmitted and an effective range of the limited torque can visually be recognized when the location programming is performed.

The conventional location programming apparatus suffers from a problem in that the speed of each axis with respect to instructed speed cannot be detected when two or more axes are interpolation-controlled.

To solve the above-mentioned problem, an object of the present invention is to provide a location programming apparatus and a method therefore with which the speed of each axis can graphically be displayed when interpolation control is performed.

The conventional location programming apparatus has a problem in that acceleration distance, deceleration distance and rapid stop deceleration distance which are determined in accordance with the instructed speed, acceleration time, deceleration time and rapid stop deceleration time cannot be detected when the programming operation is performed. That is, there arises a problem in that the distance for which movement is required to realize the instructed speed and the distance required to make the instructed speed to be reduced to completion of movement cannot directly be detected.

To solve the above-mentioned problem, an object of the present invention is to provide a location programming apparatus and a method therefor capable of graphically displaying a distance of movement required to change the speed from the instructed speed, acceleration time, deceleration time and rapid stop deceleration time.

The conventional location programming apparatus has a problem in that the relationships among the rated number of revolutions, maximum number of revolutions and the instructed speed must previously be calculated from parameters.

To solve the above-mentioned problem, an object of the present invention is to provide a location programming apparatus and a method therefor a reference to the rated number of revolutions and maximum number of revolutions of the motor can easily be performed when the speed or the instructed speed is determined.

The conventional location programming apparatus has a problem in that only information, such as acceleration time and deceleration time, relating to the acceleration and formed into figures can be obtained and thus the acceleration cannot directly be determined.

To solve the above-mentioned problem, an object of the present invention is to provide a location programming apparatus and a method therefor with which acceleration time and deceleration time can be changed by changing the acceleration.

The conventional location programming apparatus uses a list-form locating program and an effective region in which the speed can be changed is not displayed. Therefore, there arises a problem in that a user must perform complicated calculations to detect the region.

Another problem arises in that requested change in the speed is performed during control of a type in which speed change during the operation is not permitted or in a region in which the speed change is ineffective and thus the controller detects an error.

To solve the above-mentioned problem, an object of the present invention is to provide a location programming apparatus and a method therefor with which an effective region in which speed can be changed can previously be detected when the locating programming is performed.

The conventional location programming apparatus has a problem in that the control operation cannot easily be understood by looking the list-form locating program and a parameter list. Another problem arises in that a control original point which will be affected by the change in the list-form locating program or that in the location control parameter cannot easily be recognized.

To solve the above-mentioned problem, an object of the present invention is to provide a location programming apparatus and a method therefor with which the control operation can easily be understood in accordance with a graph displayed by a list-form locating program and a control operation which is affected by change in the list-form locating program can easily be understood.

An object of the present invention is to provide a location programming apparatus and a method therefor with which a process for the operation pattern of a produced graph to be changed to a list-form locating program can easily be recognized.

The conventional location programming apparatus has a problem in that whether or not a program can be used in a circular interpolation operation cannot easily be determined when locating programming is performed to perform circular interpolation. Thus, there arises a problem in that the controller cannot be started when the program is started because of an error of a type that the position is deviated from the circular interpolation radius or a permissible range for the circular interpolation.

To solve the above-mentioned problem, an object of the present invention is to provide a location programming apparatus and a method therefor with which a set range in which the circular interpolation operation is permitted can be recognized when programming is performed.

The conventional location programming apparatus has the structure that setting required for a locating program is performed by using a list. Therefore, there arises a problem in that an amount of movement of a speed reference axis for use in the liner interpolation cannot easily be detected. Thus, the conventional apparatus suffers from a problem in that the controller cannot be started when the program is started because the amount of movement of the reference axis is zero.

To solve the above-mentioned problem, an object of the present invention is to provide a location programming apparatus and a method therefor with which an axis which can be employed as the speed reference axis for use in the linear interpolation can be recognized when programming is performed.

The conventional location programming apparatus has the structure that setting required for a locating program is performed by using a list. Therefore, a program is unintentionally determined with which deceleration cannot be completed at the determined speed or within the amount of movement which is performed in the employed speed/position switching control depending on the employed deceleration pattern. Thus, there arises a problem in that an overrun error occurs in that the amount of movement exceeds a determined value during execution of the program. In some cases, there arises a problem in that a collision of the machine occurs.

Since excessively large deviation takes place when the speed/position is switched during the execution of the program, there arises a problem in that an overrun error occurs in that the amount of movement exceeds a determined value. In some cases, there arises a problem in that a collision of the machine occurs.

To solve the above-mentioned problem, an object of the present invention is to provide a location programming apparatus and a method therefor with which an amount of movement which is performed in speed/position switching control which corresponds to a speed pattern and which can be employed can be recognized when programming of the speed/position switching control is performed and permissible deviation with respect to the determined amount of movement can be recognized when programming is performed.

The conventional location programming apparatus is arranged in such a manner that data for returning to the original point is set by using only numerical data. Therefore, there arises a problem in that the speed pattern for use in control for returning to the original point by a dog method and control for returning to the original point by a count method cannot easily be detected.

The length of the near dog is too short depending on the speed at which returning to the original point is performed and the determined creep speed. Thus, there arises a problem in that deceleration to the creep speed cannot be performed and thus overrun takes place. As a result, normal returning to the original point cannot be performed.

When count method returning to the original point is performed, setting of an insufficient amount of movement after the near dog as compared with a deceleration distance from the speed at which returning to the original point is performed cannot be found. Thus, there arises a problem in that overrunning takes place which exceeds the determined amount of movement during execution of the program and thus normal returning to the original point cannot be performed.

To solve the above-mentioned problem, an object of the present invention is to provide a location programming apparatus and a method therefor with which the length of a near dog required to decelerate the speed from the speed at which returning to the original point to the creep speed and the deceleration distance from the from the speed at which returning to the original point is performed can easily be recognized when programming for returning to the original point is performed.

The conventional location programming apparatus is arranged in such a manner that programming for control, such as high-speed oscillation, with which a reciprocating operation is performed in accordance with a sine wave is performed by only inputting figures. Therefore, there arises a problem in that an actual operation cannot easily be recognized during the programming operation.

To solve the above-mentioned problem, an object of the present invention is to provide a location programming apparatus and a method therefor with which programming of a high-speed oscillation function can be performed in such a manner that the actual operation is recognized.

A first conventional locating mode has been described. A second conventional locating mode will now be described.

Hitherto, control of a plurality of axes each of which repeats a predetermined operation has been performed by a controller with which a locating program for each axis is produced and which is arranged to administrate the start timing of the locating program in accordance with the operation timing of each axis.

When a motor for moving a subject, which must be controlled, is controlled to locating the subject to three points apart from one another for arbitrary intervals made up of 1030*a*–1030*u* as shown in FIG. 195, locating programs by a number corresponding to the locating patterns must be produced. When some locating programs are sequentially started, a sequencer or the like is required to administrate the start timings.

Referring to a flow chart shown in FIG. 197, a sequence program will now be described. Initially, locating programs 1031*a*, 1031*b* and 1031*c* as shown in FIG. 196 and corresponding to the number of locating points are produced (step S1100).

Then, the program 1031*a* for a first axis which is first operated is started by a sequencer (step S1101). After the starting operation has been performed, whether or not the locating program 1031*a* for the first axis has been completed is administrated by a sequencer program (step S1102). If the completion is confirmed, whether or not arbitrary periods 1030*d* to 1030*e* of time have passed from completion of the locating program 1031*a* is administrated and determined by the sequencer (step 1103). If completion has been confirmed (step S1104), the locating program 1031*b* is started (step S1105). Then, steps S1106 to S1110 are similarly performed so that sequential locating of three points is completed.

The above-mentioned conventional location programming apparatus 1004 is arranged in such a manner that each of the Locating programs must be operated to set the locating address, limited speed and acceleration/deceleration time. Moreover, the sequencer or the like is required to manage the programs and sequentially start the programs. Thus, there arises a problem in that long time is required to produce the locating program for each locating point. What is worse, use of the sequencer to administrate the start timing causes the start timing to be affected by scan time of the sequencer. In addition, a program is required for the sequencer.

To solve the above-mentioned problem, the present invention is arranged in such a manner that a sequential operation timing chart is produced to automatically produce a position data table. In accordance with the position data table, locating is performed. Therefore, the necessity of sequentially starting the locating programs can be eliminated and an additional sequencer program is not required. Thus, an object of the present invention is to obtain a location programming apparatus having position information provided as data of sequential position table and enabling preventing a problem of delay of operation start and the like.

When a plurality of axes are located while timings are arranged, for example, when three axes are controlled at an operation timing as shown in FIG. 198, a method as shown in flow charts shown in FIGS. 200 and 201 is available in which the position address of each axis is administrated by a sequencer to arrange the start timing operation the locating program shown in FIG. 199. Another method may be employed in which timing is arranged in accordance with input from an external sensor or a timer so that the locating program is started to perform the control.

When each axis is located while timing of a plurality of axes is arranged, the conventional location programming apparatus must adjust the positional relationship with the other axes and arrange the start timing. Therefore, the sequencer or the like is required to administrate the positional relationship among the axes so as to perform required control. Therefore, an additional sequencer program is required. Since the administrating sequencer is employed, there arises a problem in that start varies because of scan time of the sequencer.

To solve the above-mentioned problem, an object of the present invention is to provide a location programming apparatus arranged in such a manner that an operation timing chart for each axis is converted into position table data for controlling each cycle of the plurality of the axes; and the position of each axis is controlled in accordance with data. Thus, even if a plurality of axes are controlled, a necessity of producing a sequence for administrating the positional relationship with other axes and adjusting the start timing can be eliminated. Moreover, the problem of delay of start of each axis can be prevented.

DISCLOSURE OF THE INVENTION

According to the present invention, there is provided a location programming apparatus for generating operation control information including a locating control parameter and a locating program for a controller for controlling a motor for operating a subject which must be controlled, the location programming apparatus comprising: locating control type setting means for setting locating control type for controlling the operation of the subject which must be controlled; graphical data generating means for graphically generating graph data of the locating program on a work memory in accordance with the set locating control type; and operation control information generating means for generating operation control information on a parameter memory and a locating program memory in accordance with graph data stored in the work memory.

The location programming apparatus according to the present invention has the structure that the graphical data generating means uses a coordinate graph in which a position control unit of the instructed axis which must be operated is made to be a unit of a coordinate axis and which indicates the position of the subject which must be controlled and a speed graph having a speed axis and a time axis to indicate change of the speed as time elapses so as to generate graph data.

The location programming apparatus according to the present invention has the structure that the graphical data generating means uses a speed graph having a speed axis and a time axis to indicate change in the speed as time elapses so as to generate graph data.

The location programming apparatus according to the present invention has the structure that the graphical data generating means uses a other-time-transition graph having an amplitude axis and a time axis to indicate change in the degree of reciprocating motion as time elapses and a speed graph having a speed axis and a time axis to indicate change in the speed as time elapses so as to generate graph data.

The location programming apparatus according to the present invention has the structure that when the set locating control type is linear locating control, the graphical data generating means stores information generated on the coordinate graph and the speed graph in a predetermined area in the work memory, and the operation control information generating means generates a locating program and a parameter for the linear locating control as operation control information in accordance with information stored in the work memory.

The location programming apparatus according to the present invention has the structure that when the set locating control type is passing-point-instructed circular interpolation control, the graphical data generating means stores information generated on the coordinate graph and the speed graph in a predetermined area in the work memory, and the operation control information generating means generates a locating program and a parameter for the passing-point-instructed circular interpolation control as operation control information in accordance with information stored in the work memory.

The location programming apparatus according to the present invention has the structure that when the set locating control type is radius-instructed circular interpolation control, the graphical data generating means stores information generated on the coordinate graph and the speed graph in a predetermined area in the work memory, and the operation control information generating means generates a locating program and a parameter for the radius-instructed circular interpolation control as operation control information in accordance with information stored in the work memory.

The location programming apparatus according to the present invention has the structure that when the set locating control type is central-point-instructed circular interpolation control, the graphical data generating means stores information generated on the coordinate graph and the speed graph in a predetermined area in the work memory, and the operation control information generating means generates a locating program and a parameter for the central-point-instructed circular interpolation control as operation control information in accordance with information stored in the work memory.

The location programming apparatus according to the present invention has the structure that when the set locating control type is locus control, the graphical data generating means stores information generated on the coordinate graph and the speed graph in a predetermined area in the work memory, and the operation control information generating means generates a locating program and a parameter for the locus control as operation control information in accordance with information stored in the work memory.

The location programming apparatus according to the present invention has the structure that when the set locating control type is speed control, the graphical data generating means stores information generated on the coordinate graph and the speed graph in a predetermined area in the work memory, and the operation control information generating means generates a locating program and a parameter for the speed control as operation control information in accordance with information stored in the work memory.

The location programming apparatus according to the present invention has the structure that when the set locating control type is speed/position switching control, the graphical data generating means stores information generated on the coordinate graph and the speed graph in a predetermined area in the work memory, and the operation control information generating means generates a locating program and a parameter for the speed/position switching control as operation control information in accordance with information stored in the work memory.

The location programming apparatus according to the present invention has the structure that when the set locating control type is original-point returning control, the graphical data generating means stores information generated on the coordinate graph and the speed graph in a predetermined area in the work memory, and the operation control information generating means generates a locating program and a parameter for the original-point returning control as operation control information in accordance with information stored in the work memory.

The location programming apparatus according to the present invention has the structure that when the set locating control type is high-speed oscillation control, the graphical data generating means stores information generated on the coordinate graph and the speed graph in a predetermined area in the work memory, and the operation control information generating means generates a locating program and a parameter for the high-speed oscillation control as operation control information in accordance with information stored in the work memory.

According to another aspect of the present invention, there is provided a location programming apparatus for generating operation control information for a controller for controlling a motor for operating a subject which must be controlled, the location programming apparatus comprising:

graphical data generating means for generating, on a work memory, a position data table for a locating program having a time transition graph to graphically correspond to time transition; and means for transmitting the position data table stored in the work memory to the locating controller.

The location programming apparatus according to the present invention has the structure that the graphical data generating means generates a position data table for controlling one cycle of a plurality of axes corresponding to the set number of axes to be controlled.

According to another aspect of the present invention, there is provided a location programming method for generating operation control information including a locating control parameter and a locating program for a controller for controlling a motor for operating a subject which must be controlled, the location programming method comprising: a step of setting locating control type for controlling the operation of the subject which must be controlled; a step of graphically generating graph data of the locating program on a work memory in accordance with the set locating control type; and a step of generating operation control information on a parameter memory and a locating program memory in accordance with graph data stored in the work memory.

The location programming method according to the present invention has the structure that the graphical data generating step uses a coordinate graph in which a position control unit of the instructed axis which must be operated is made to be a unit of a coordinate axis and which indicates the position of the subject which must be controlled and a speed graph having a speed axis and a time axis to indicate change of the speed as time elapses so as to generate graph data.

The location programming method according to the present invention has the structure that the graphical data generating step uses a speed graph having a speed axis and a time axis to indicate change in the speed as time elapses so as to generate graph data.

The location programming method according to the present invention has the structure that the graphical data generating step uses a other-time-transition graph having an amplitude axis and a time axis to indicate change in the degree of reciprocating motion as time elapses and a speed graph having a speed axis and a time axis to indicate change in the speed as time elapses so as to generate graph data.

BRIEF DESCRIPTION OF THE DRAWINGS

FIG. 34 is a detailed view showing a passing type corresponding information storage area when the passing method is the passing-point-instructed circular interpolation in the locating program information storage area when locus control of coordinate graph output information is set in the location programming apparatus according to the first embodiment of the present invention;

FIG. 35 is a detailed view showing a passing type corresponding information storage area when the passing method is the radius-instructed circular interpolation in the locating program information storage area when locus control of coordinate graph output information is set in the location programming apparatus according to the first embodiment of the present invention;

FIG. 36 is a detailed view showing a passing type corresponding information storage area when the passing method is the central-point-instructed circular interpolation in the locating program information storage area when locus control of coordinate graph output information is set in the location programming apparatus according to the first embodiment of the present invention;

FIG. 37 is a detailed view showing a window structure information storage area for storing position information of a passing point which is being additionally set when locus control of coordinate graph output information is set in the location programming apparatus according to the first embodiment of the present invention;

FIG. 124 is a flow chart showing the operation which is performed when locating programming is performed by using the speed graph while displaying the list-form locating program in the location programming apparatus according to the first embodiment of the present invention;

FIG. 125 is a diagram showing an example of a locating programming window which is displayed when locating programming is performed by using the list-form locating program while displaying the speed graph in the location programming apparatus according to the first embodiment of the present invention;

FIG. 126 is a flow chart showing the operation which is performed when locating programming is performed by using the list-form locating program while displaying speed graph in the location programming apparatus according to the first embodiment of the present invention;

FIG. 127 is a flow chart showing the operation which is performed when locating programming is performed by using the list-form locating program while displaying the speed graph in the location programming apparatus according to the first embodiment of the present invention;

FIG. 128 is a diagram showing an example of a locating programming window by using the coordinate graph when passing-point-instructed circular interpolation control is set in the location programming apparatus according to the first embodiment of the present invention;

FIG. 129 is a flow chart showing the operation for displaying, on the coordinate graph, a passing point setting permissible range for the passing-point-instructed circular interpolation control in the location programming apparatus according to the first embodiment of the present invention;

FIG. 130 is a detailed view showing a circular arc type setting range information storage area of the location programming apparatus according to the first embodiment of the present invention;

FIG. 131 is a diagram showing an example of a locating programming window by using the coordinate graph when radius-instructed circular interpolation control is set in the location programming apparatus according to the first embodiment of the present invention;

FIG. 132 is a flow chart showing the operation for displaying, on the coordinate graph, the radius-instruction-point setting permissible range for the radius-instructed circular interpolation control in the location programming apparatus according to the first embodiment of the present invention;

FIG. 133 is a diagram showing an example of a locating programming window by using the coordinate graph when central-point-instructed circular interpolation control is set in the location programming apparatus according to the first embodiment of the present invention;

FIG. 134 is a flowchart showing the operation for displaying, on the coordinate graph, circular interpolation central point setting permissible range and the circular interpolation permissible error range for the central-point-instructed circular interpolation control in the location programming apparatus according to the first embodiment of the present invention;

FIG. 135 is a detailed view showing the circular arc type setting range information storage area of the location programming apparatus according to the first embodiment of the present invention;

Figure 136:
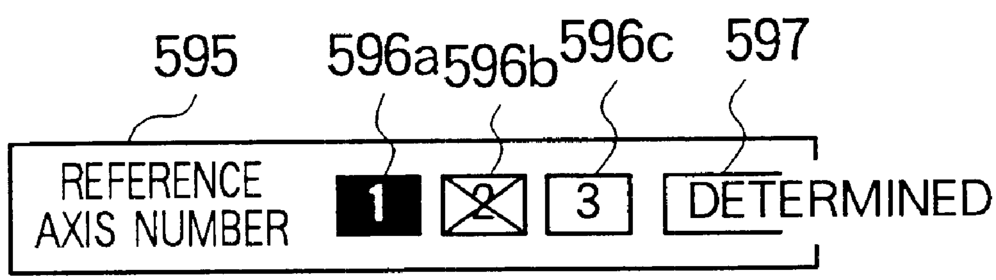
Figure 137:
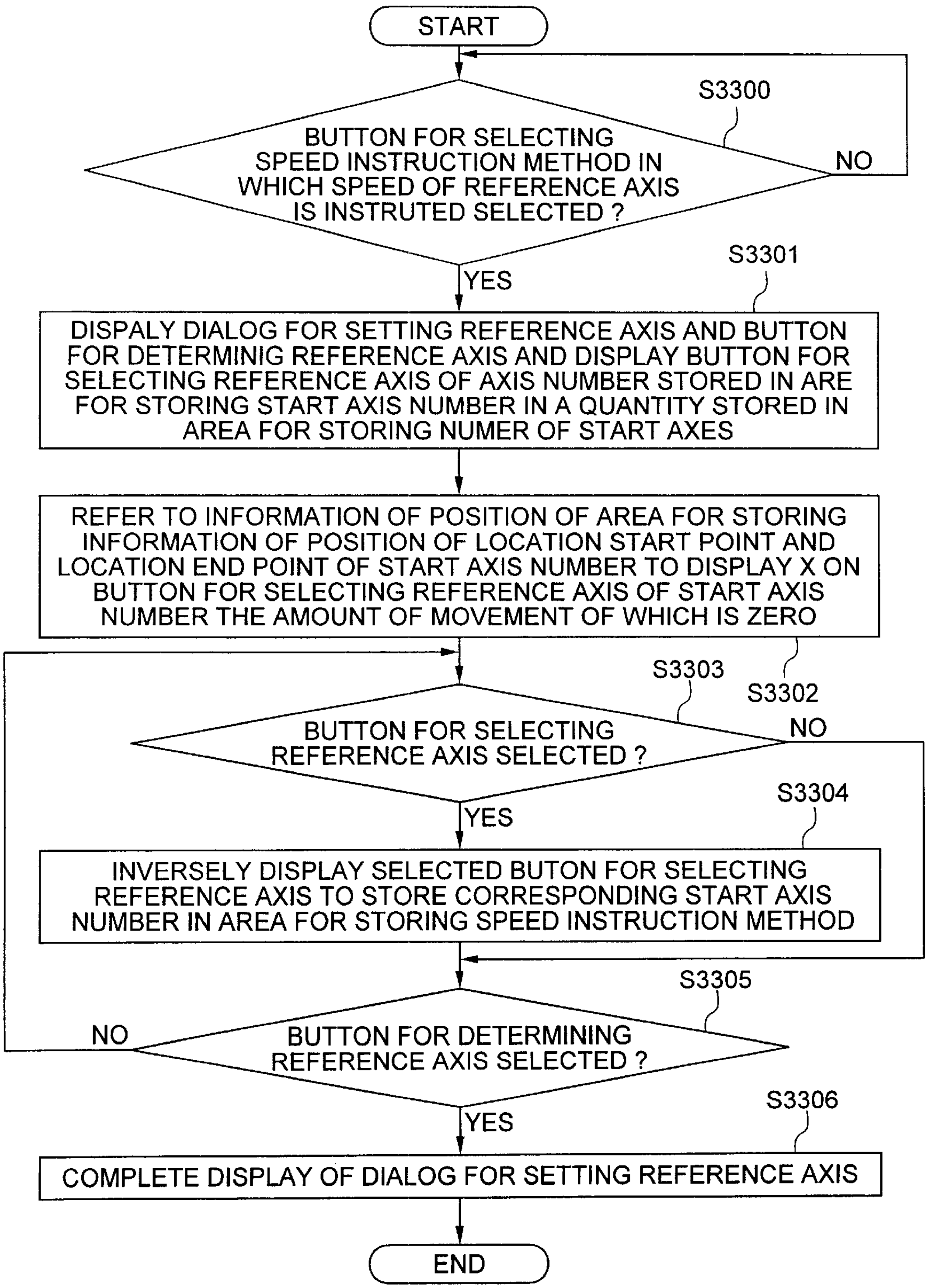
Figure 138:
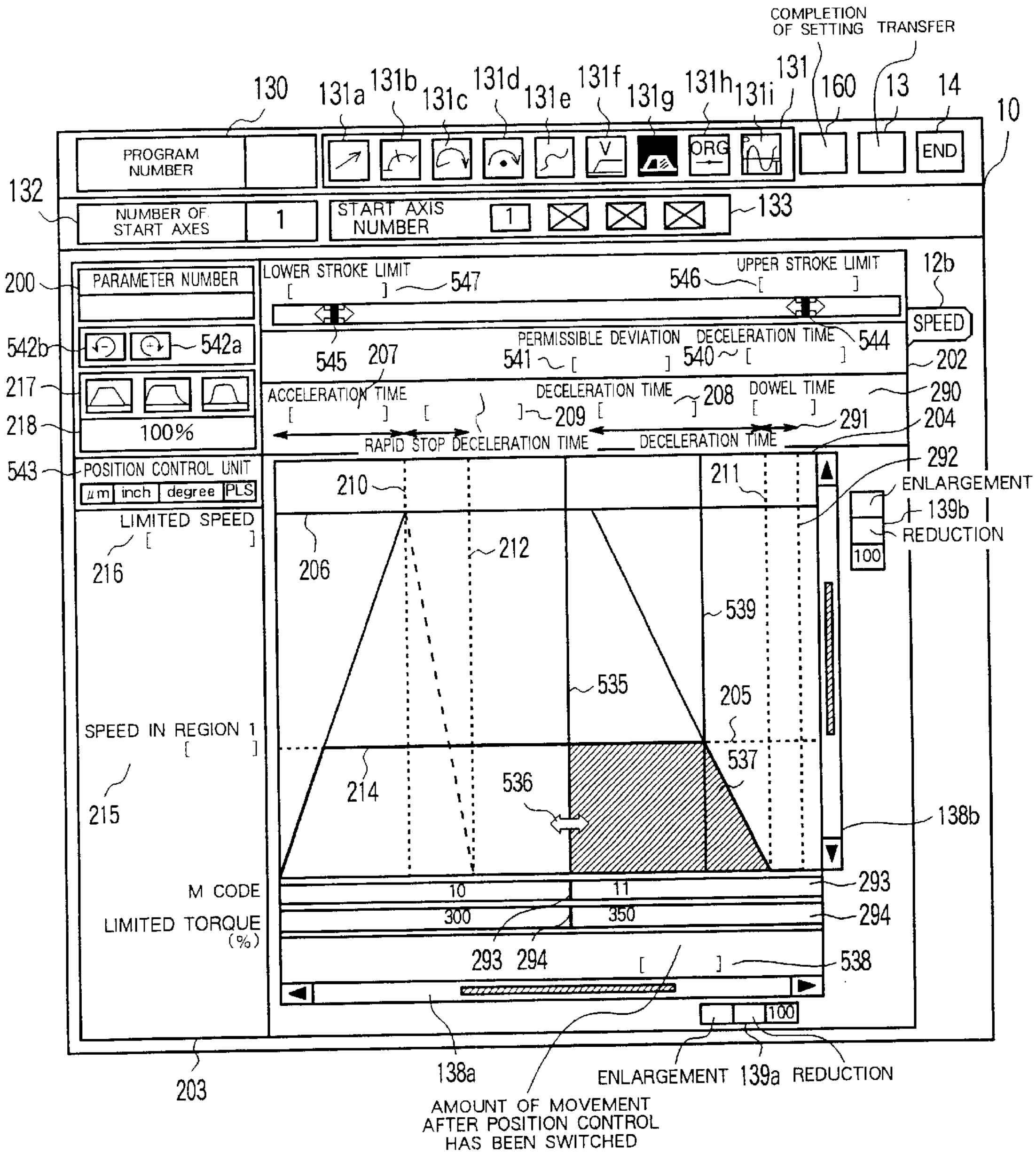
Figure 139:
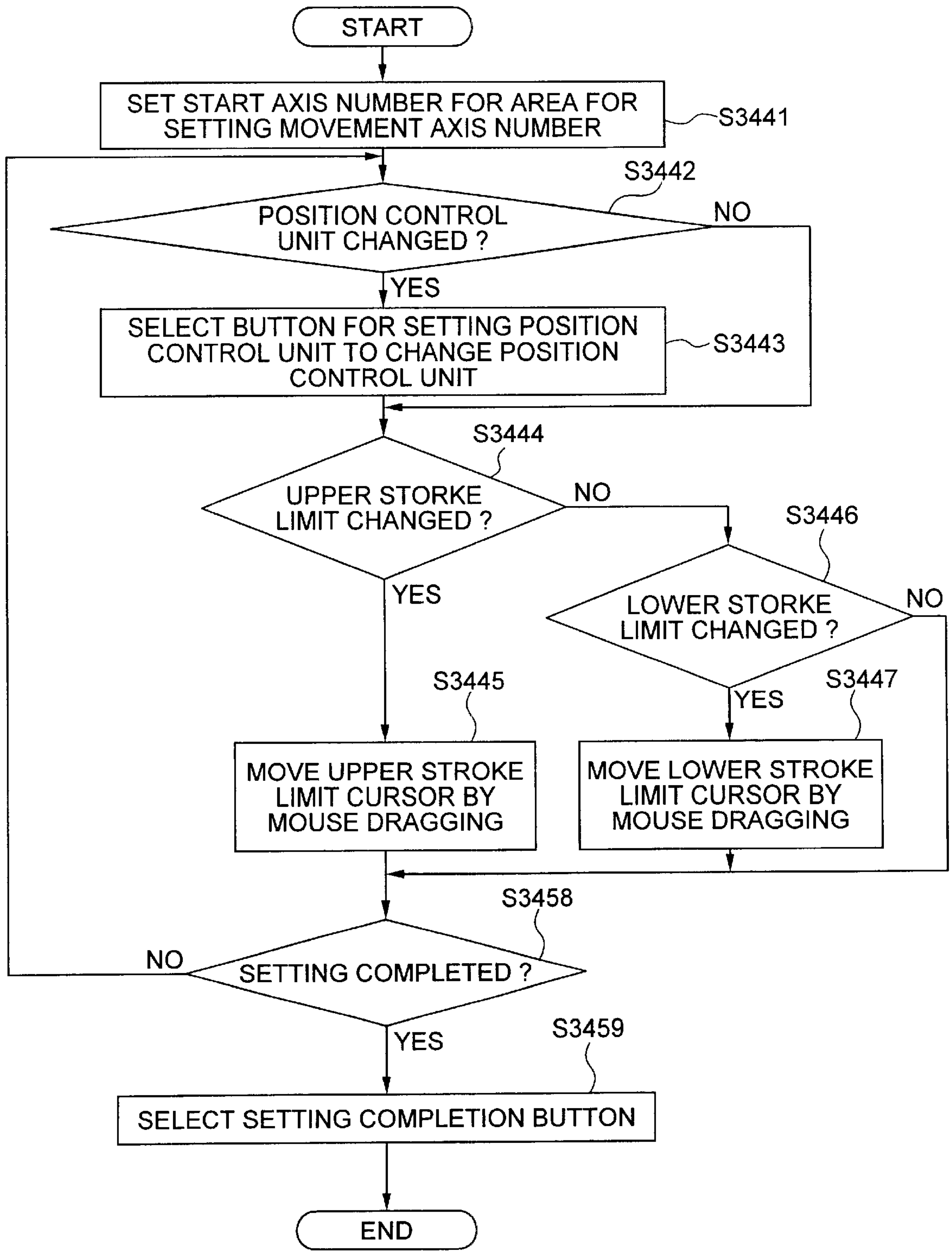
Figure 140:
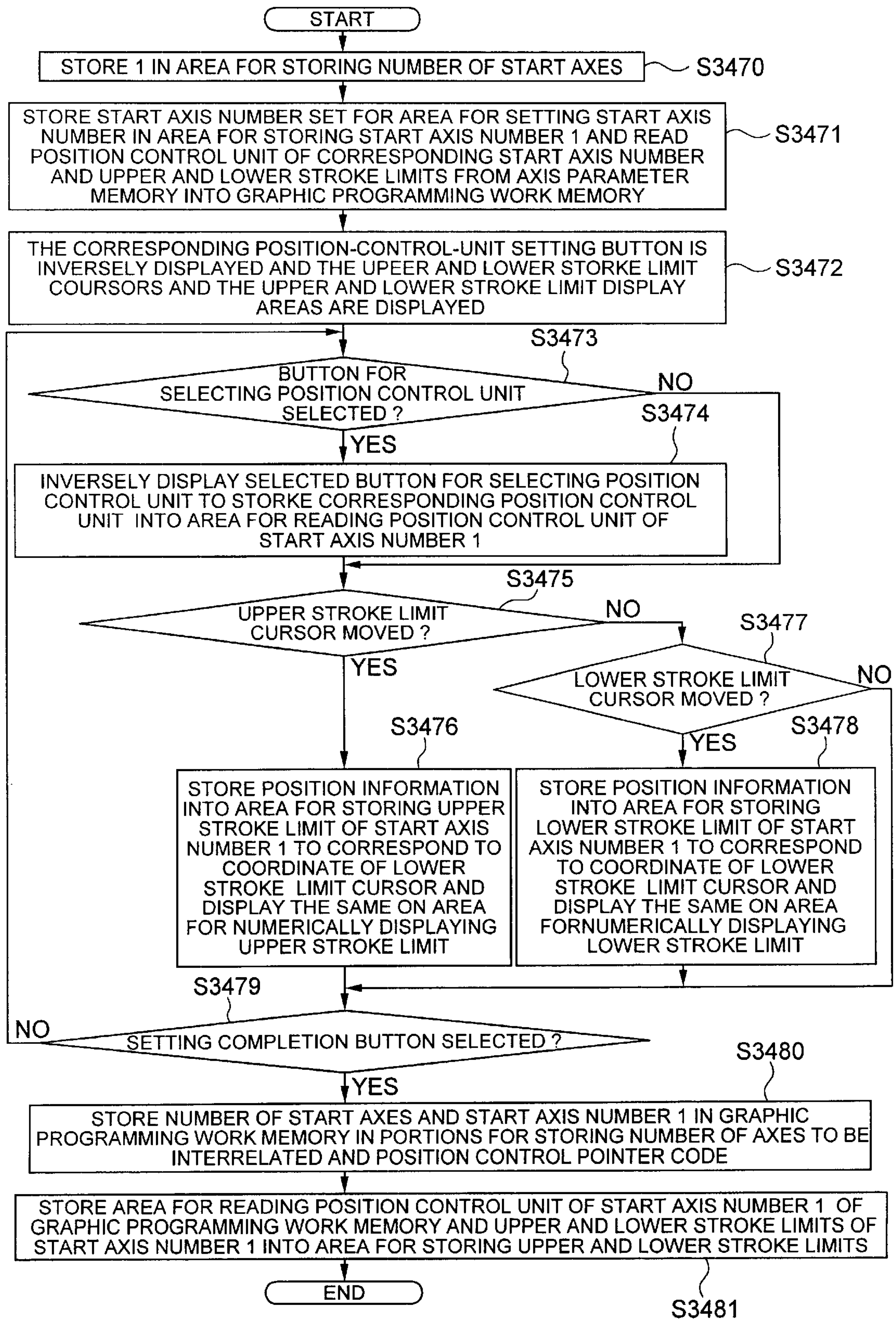
Figure 141:
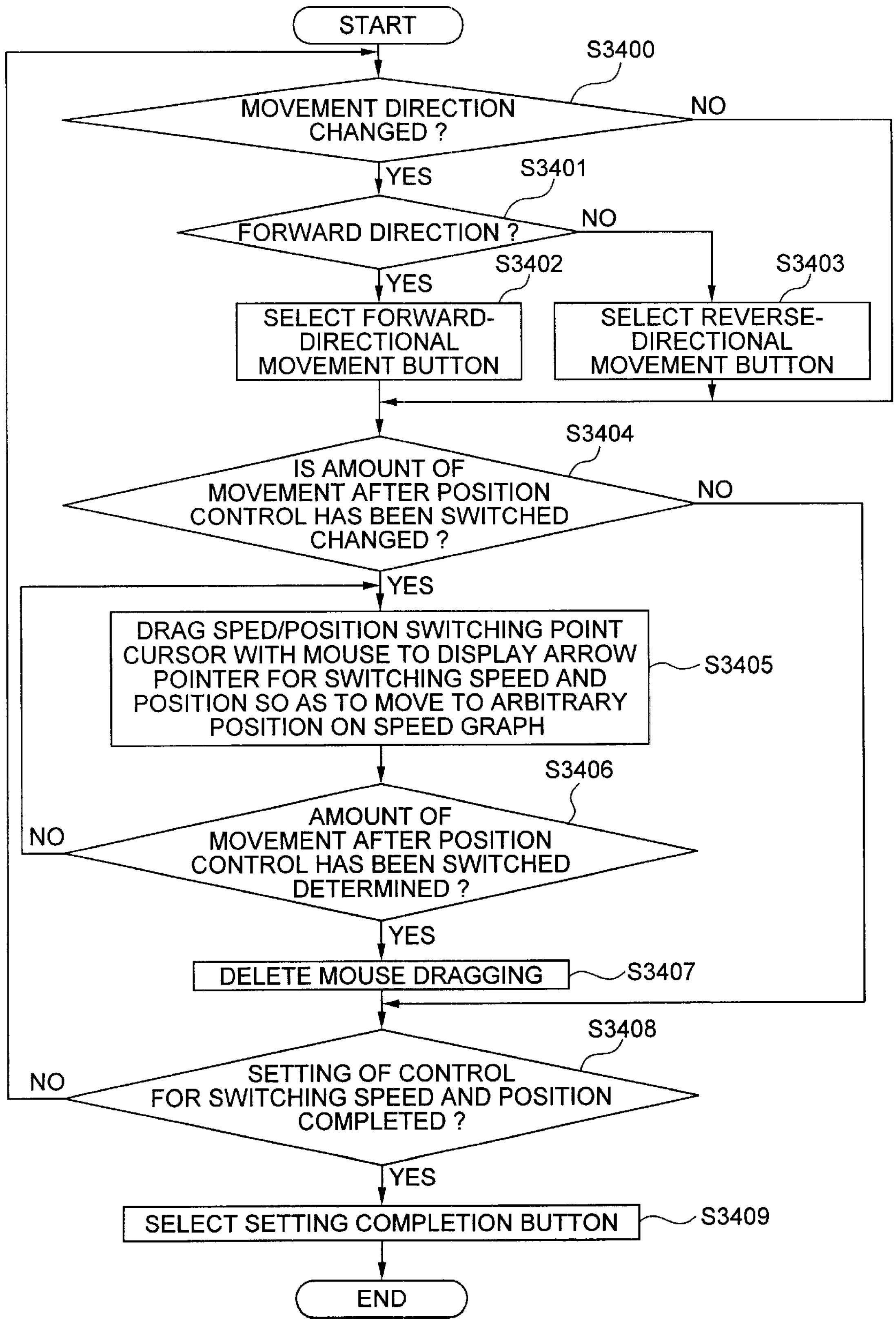
Figure 142:
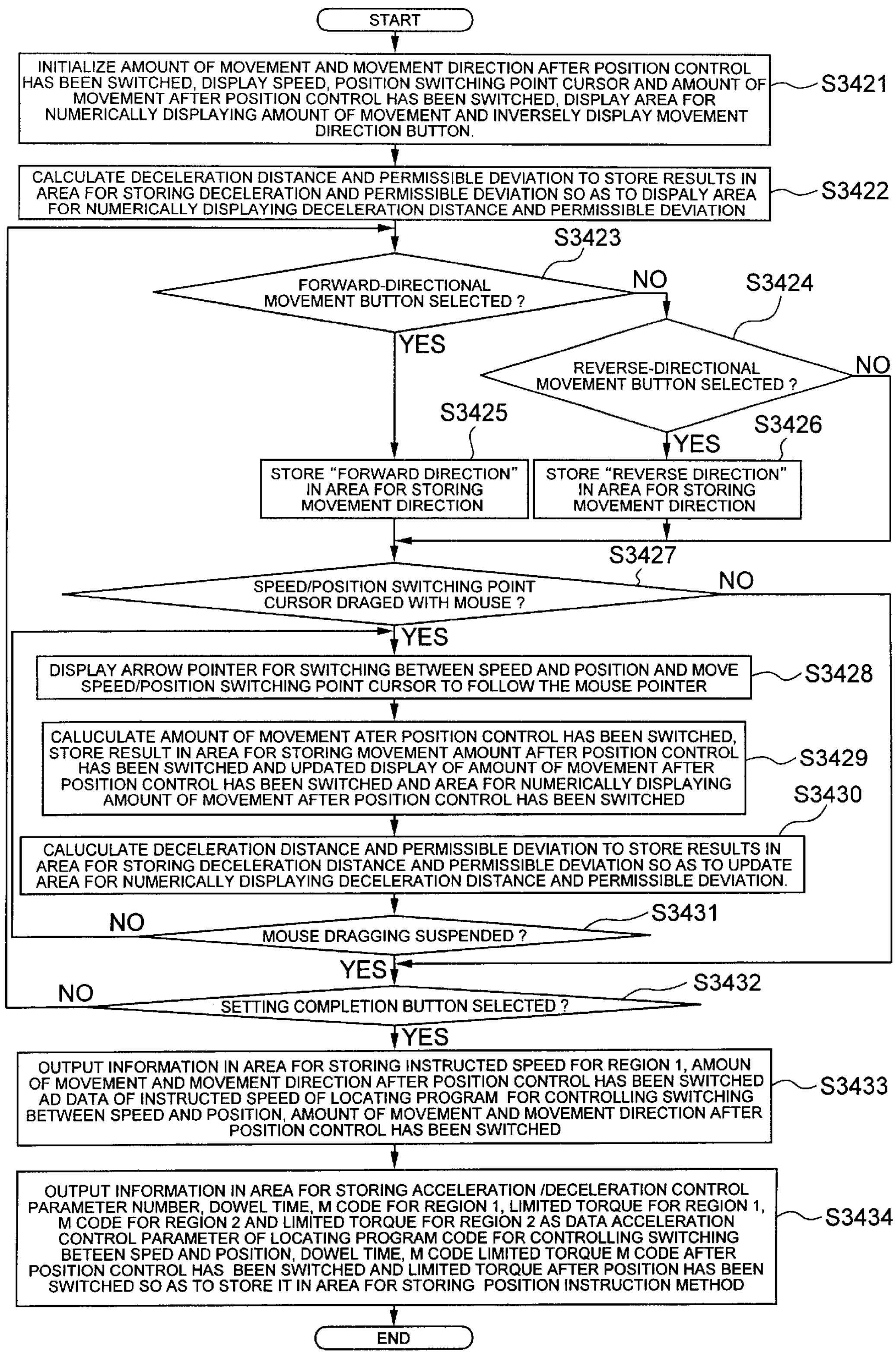
Figure 143:
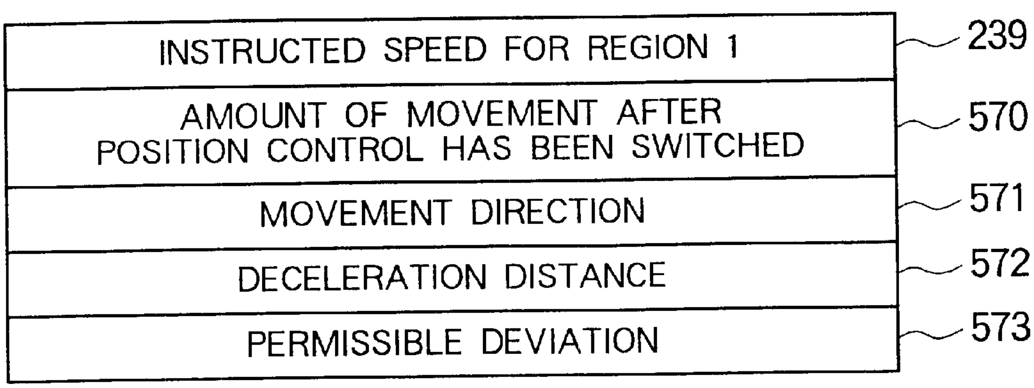
Figure 144:
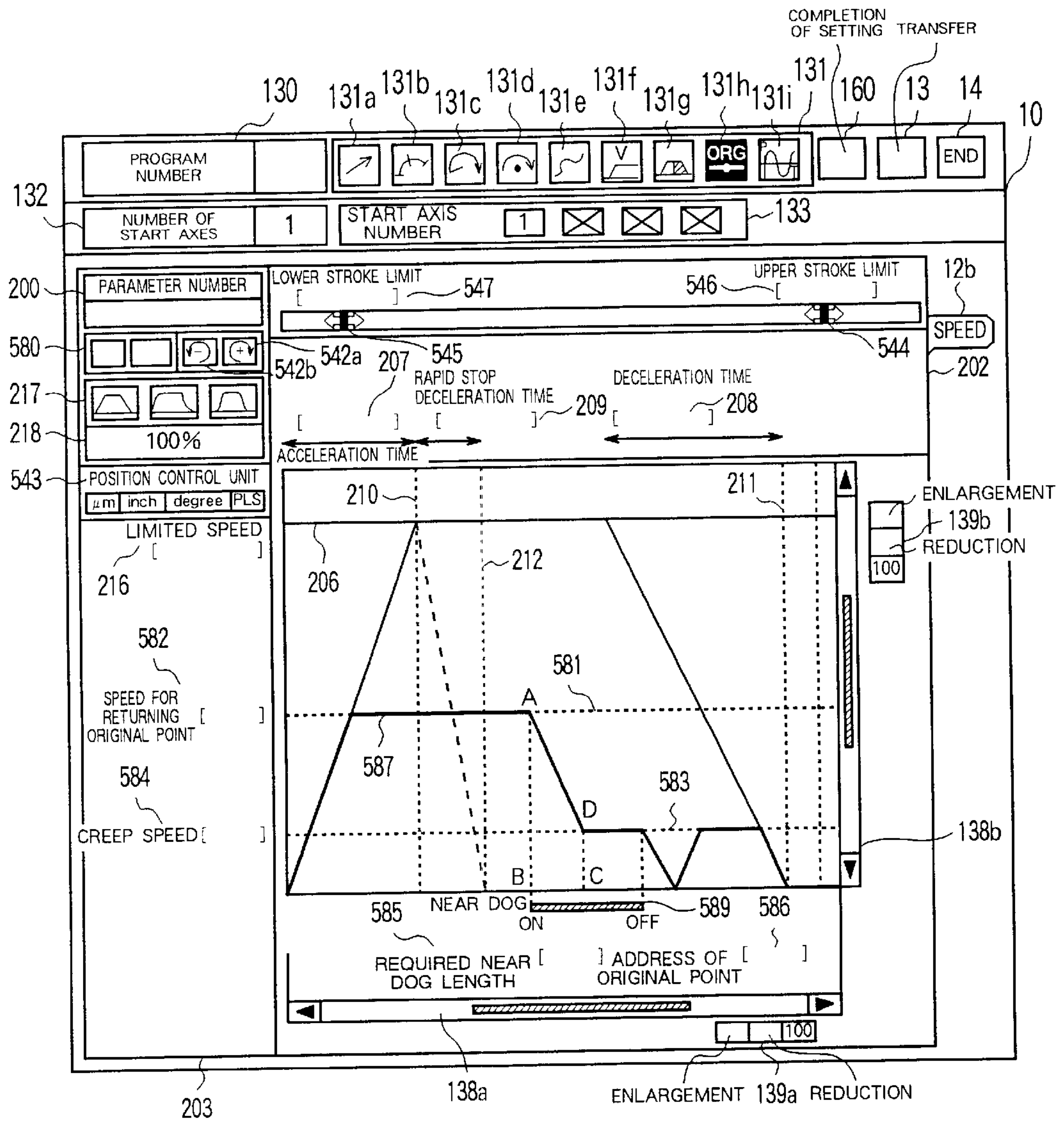
Figure 145:
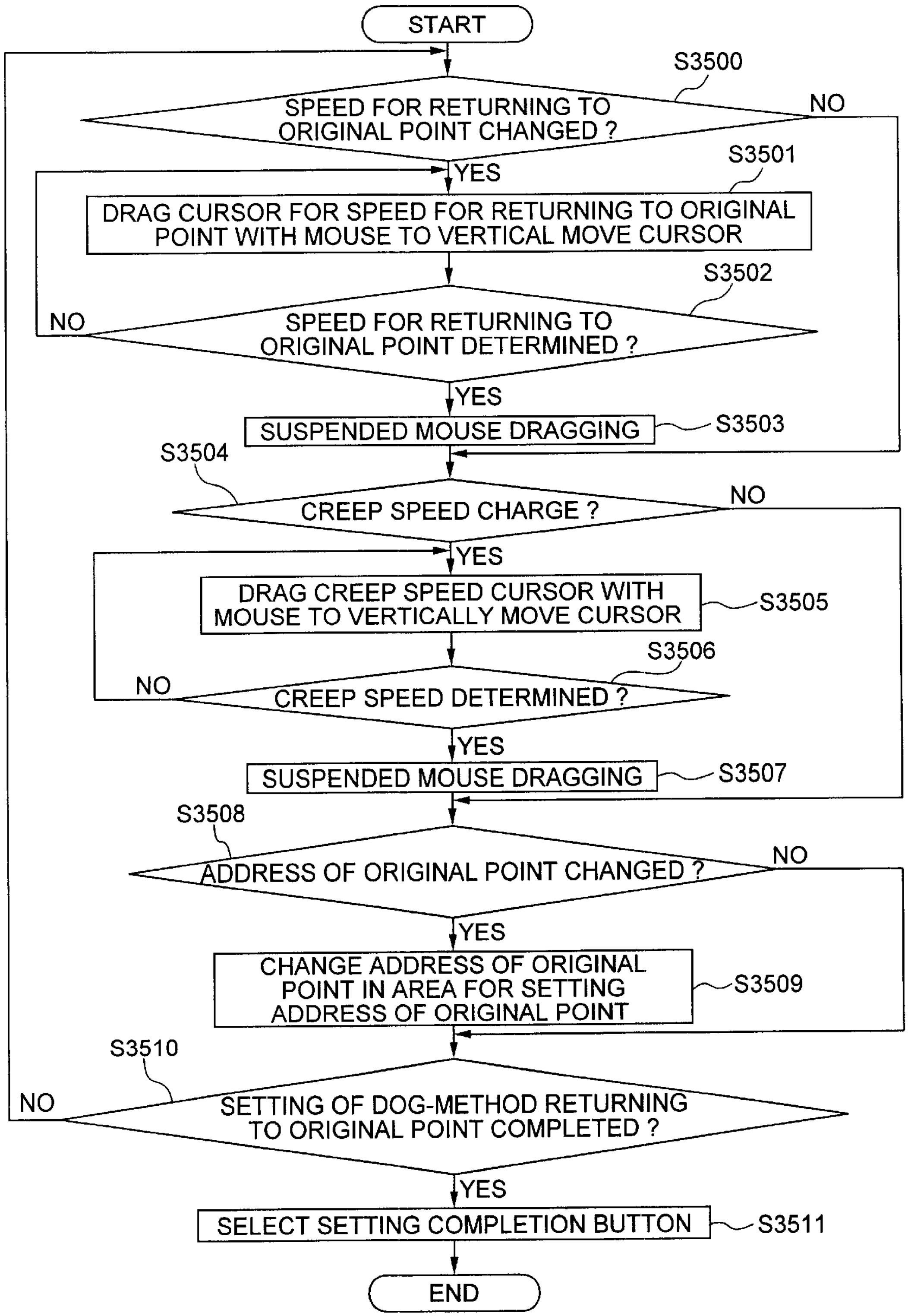
Figure 146:
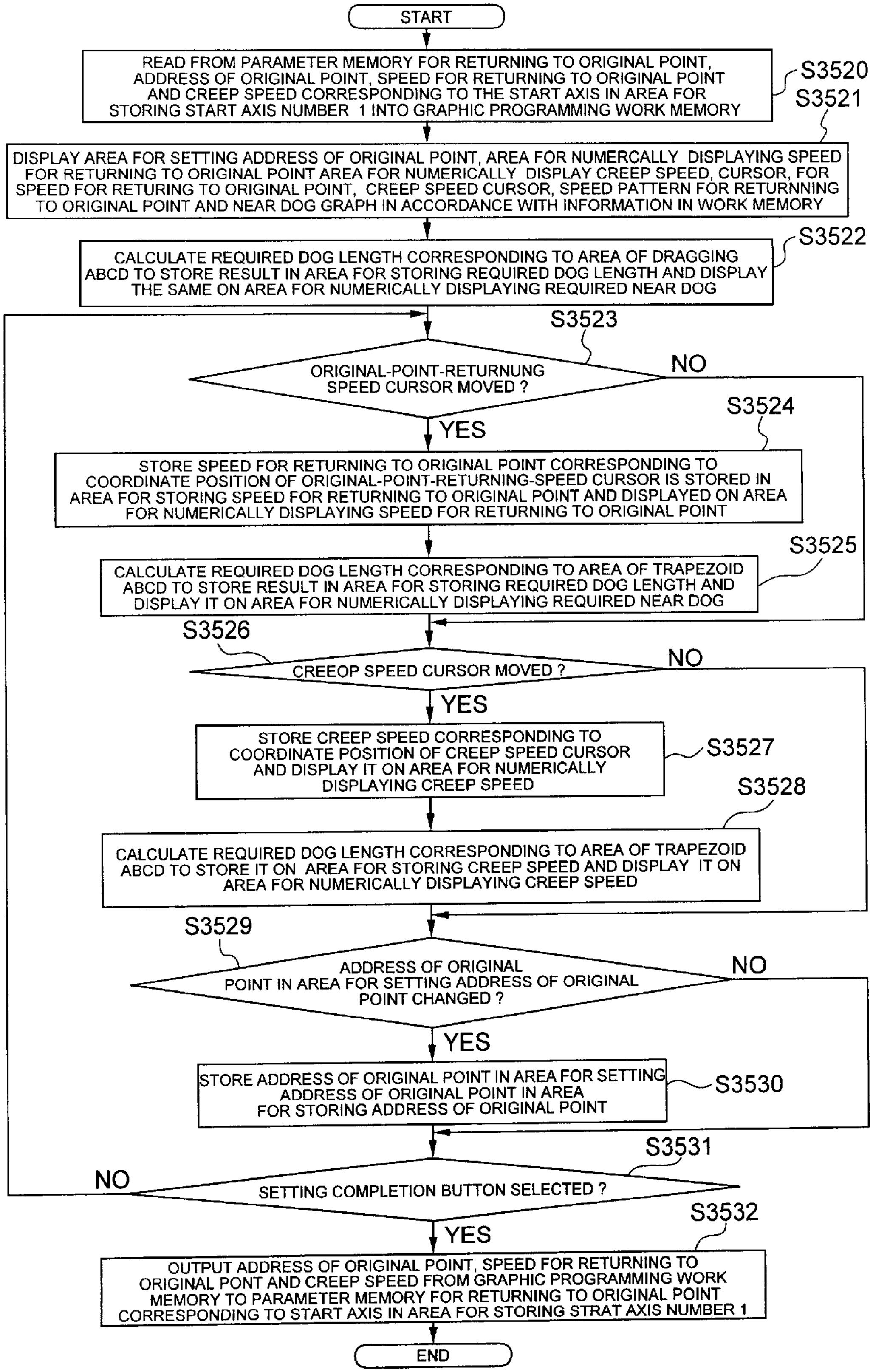
Figure 148:
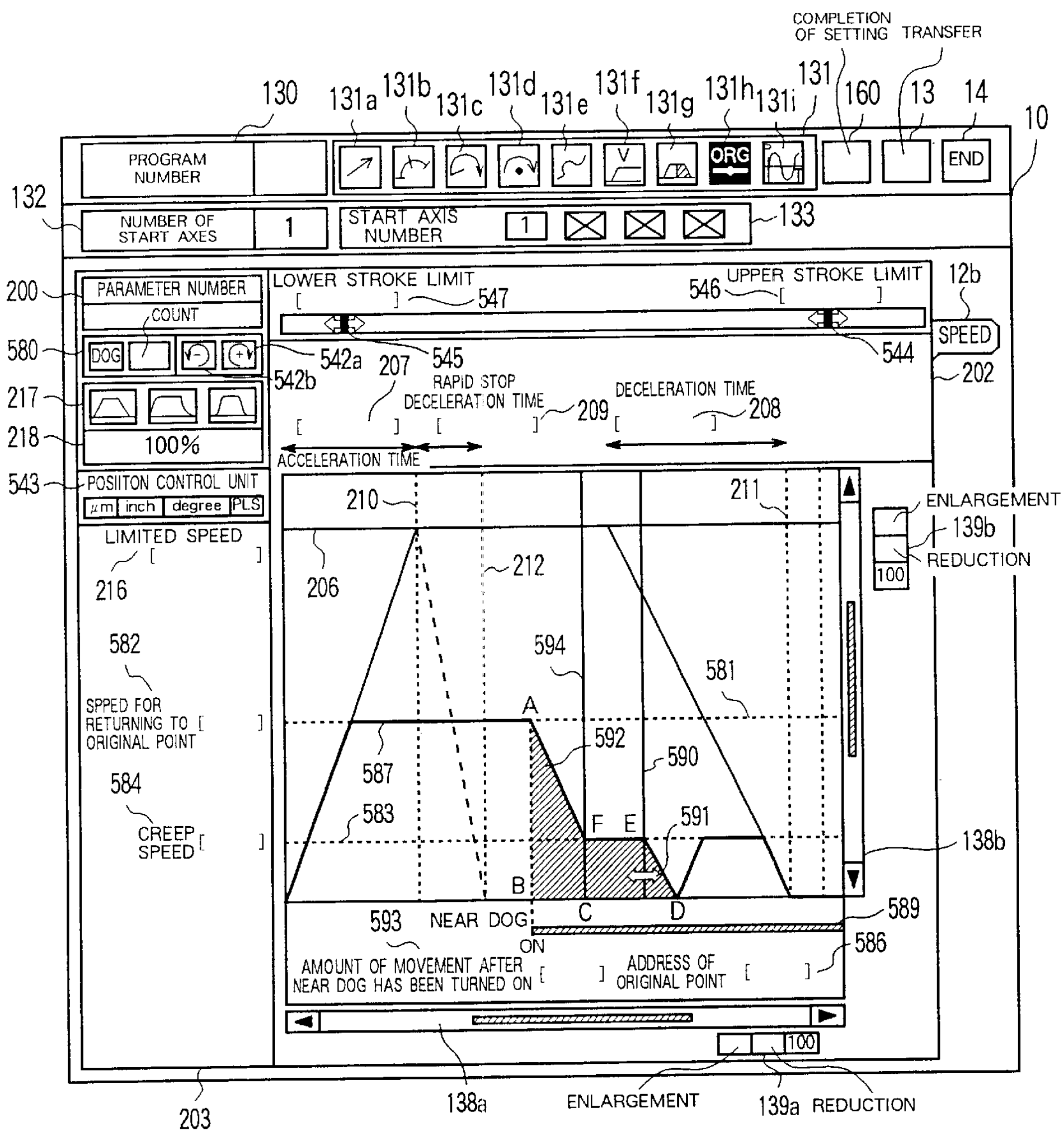
Figure 149:
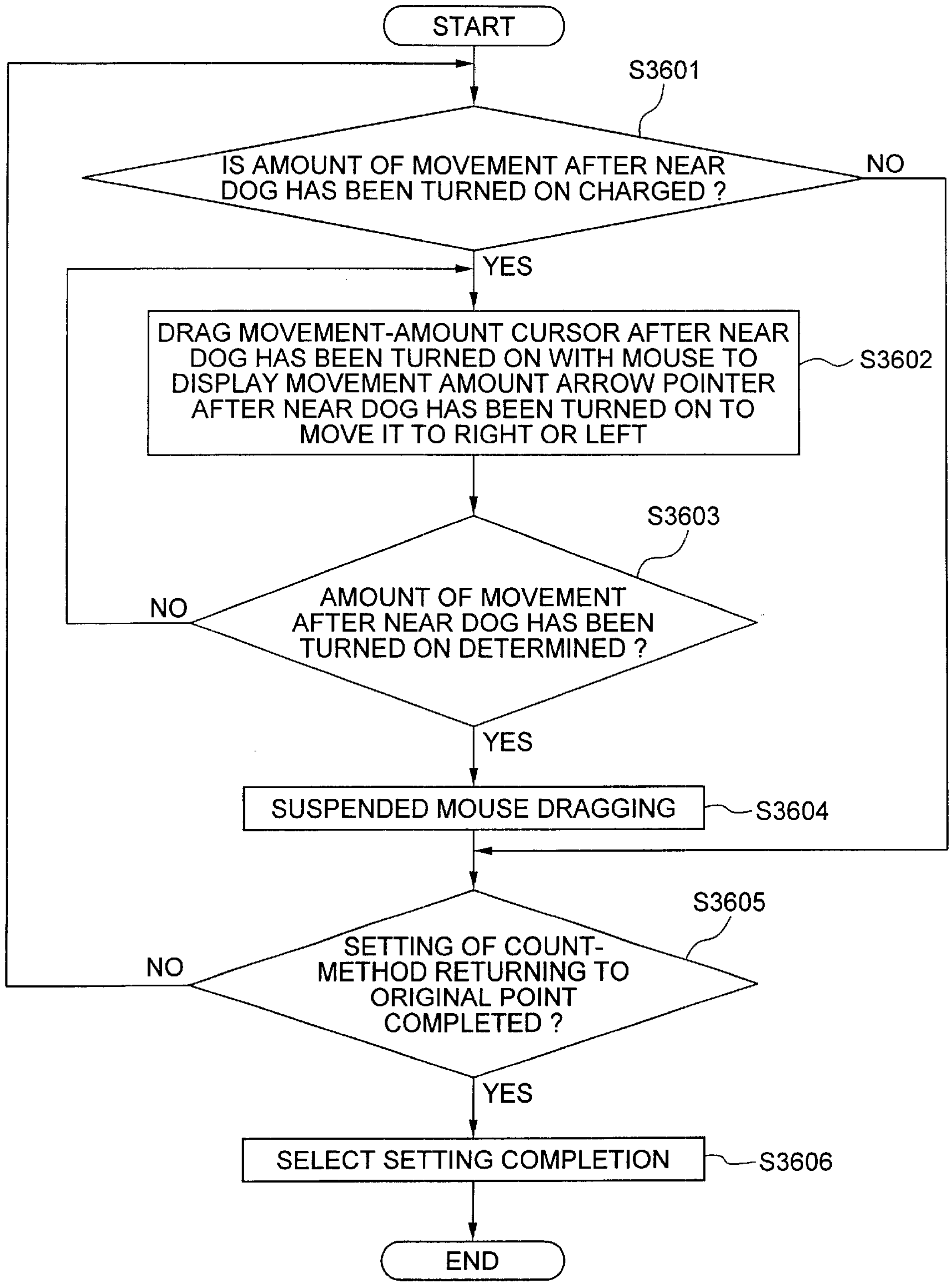
Figure 150:
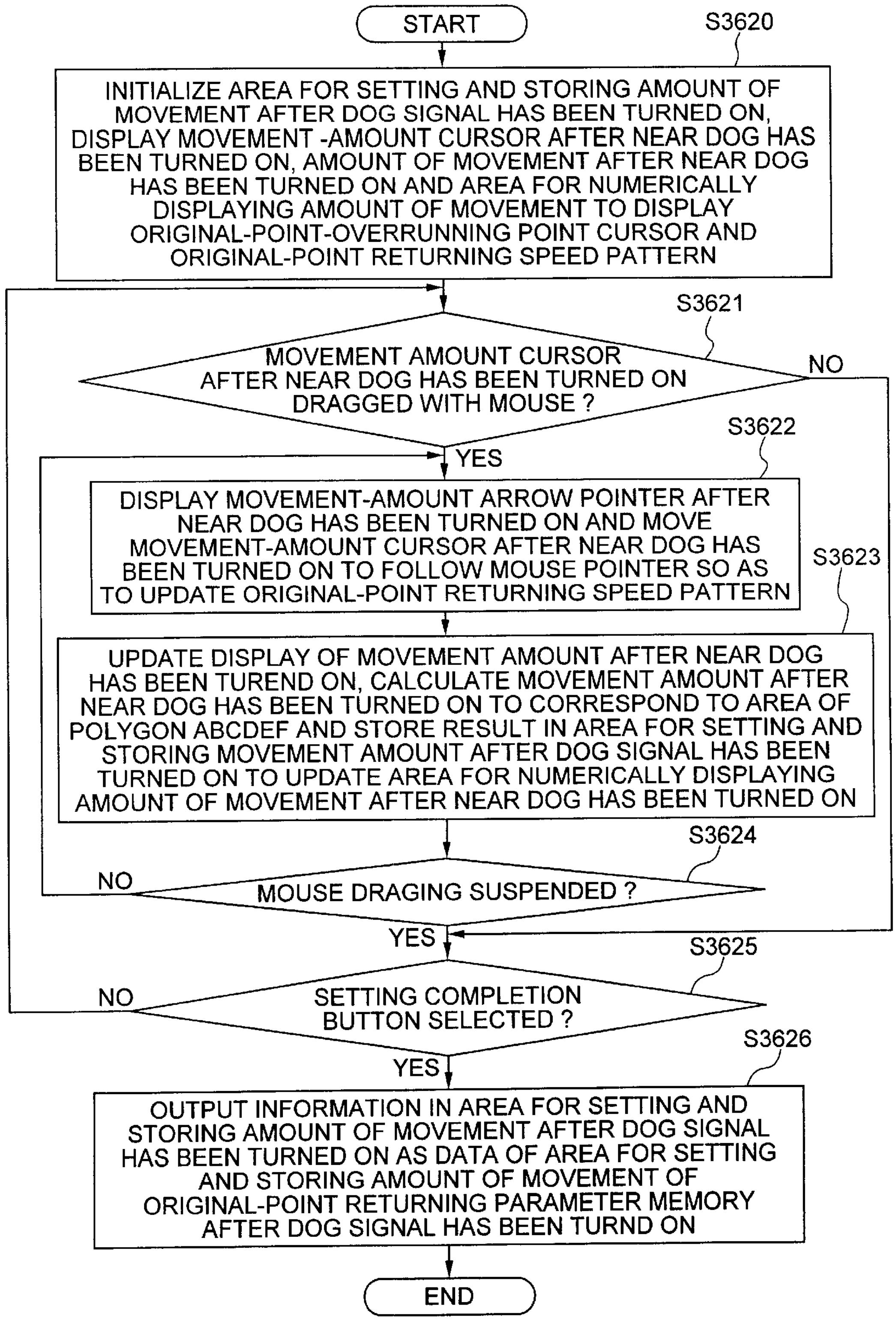
Figure 151:
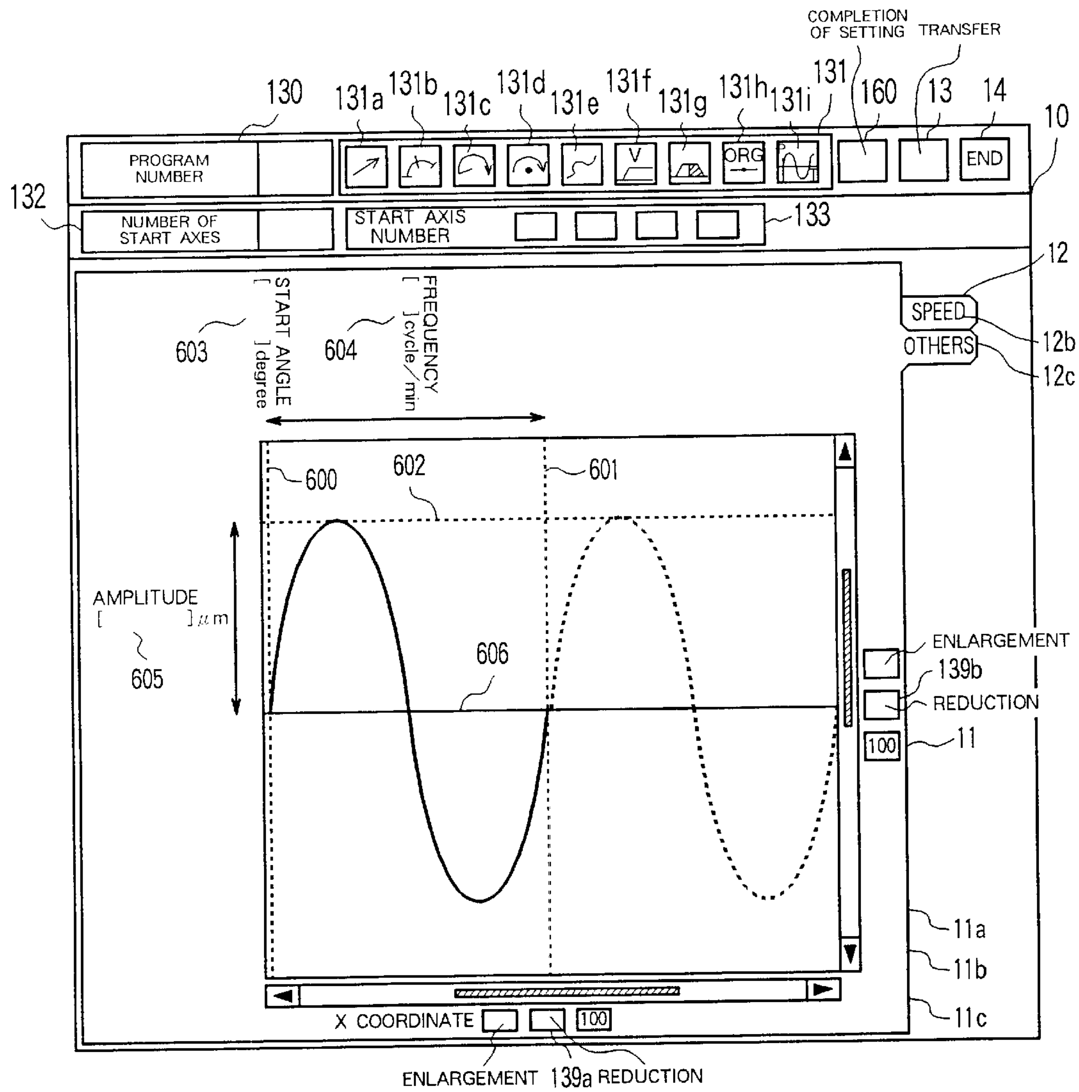
Figure 152:
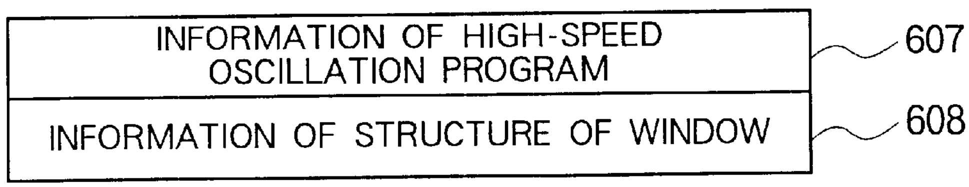
Figure 153:
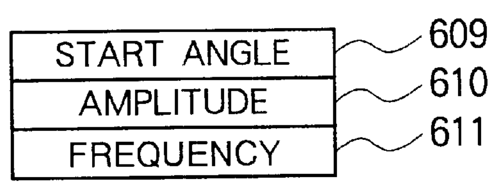
Figure 154:
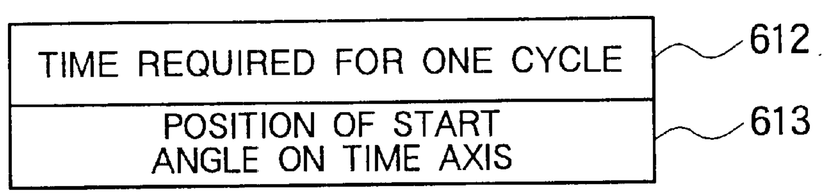
Figure 155:
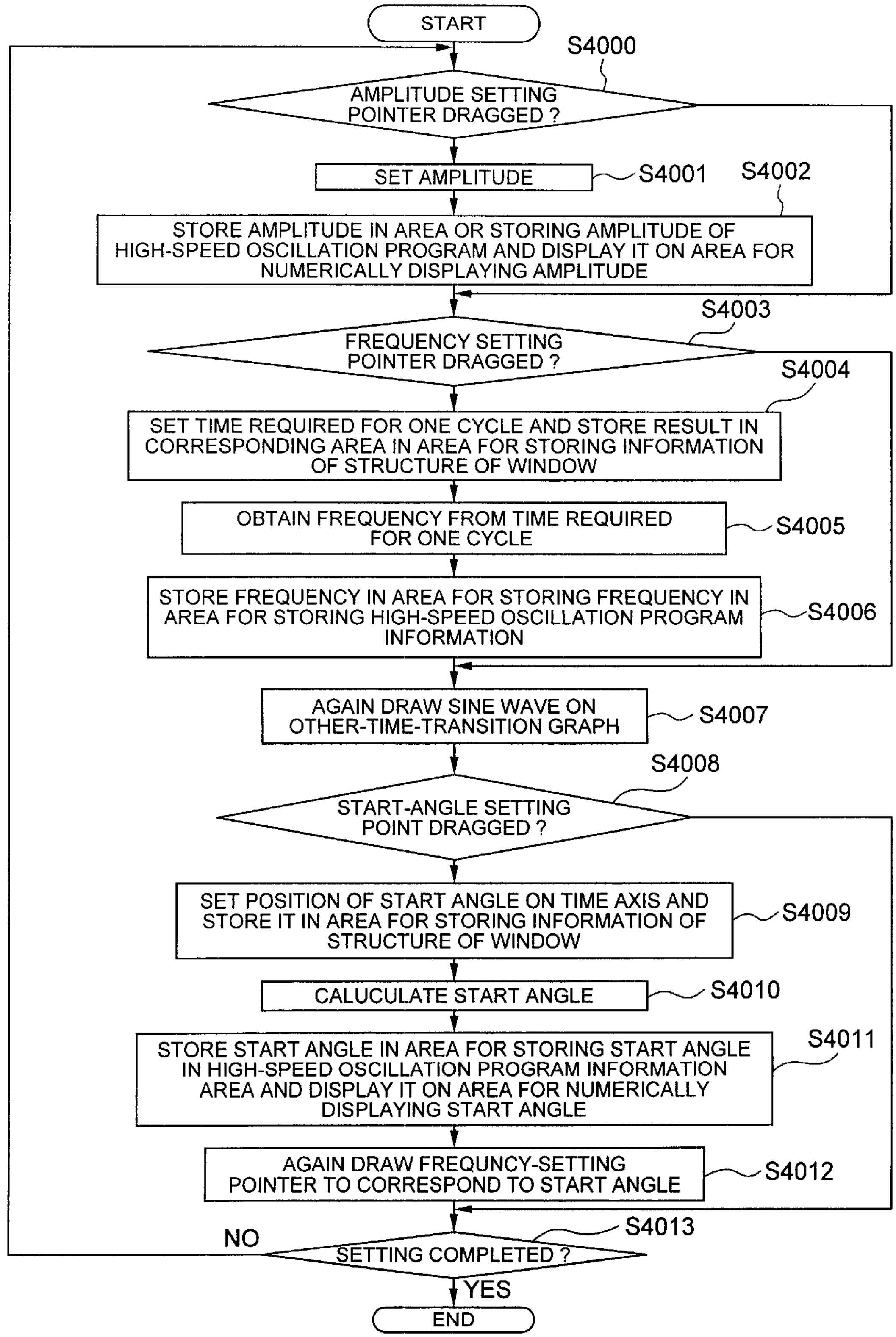
Figure 156:
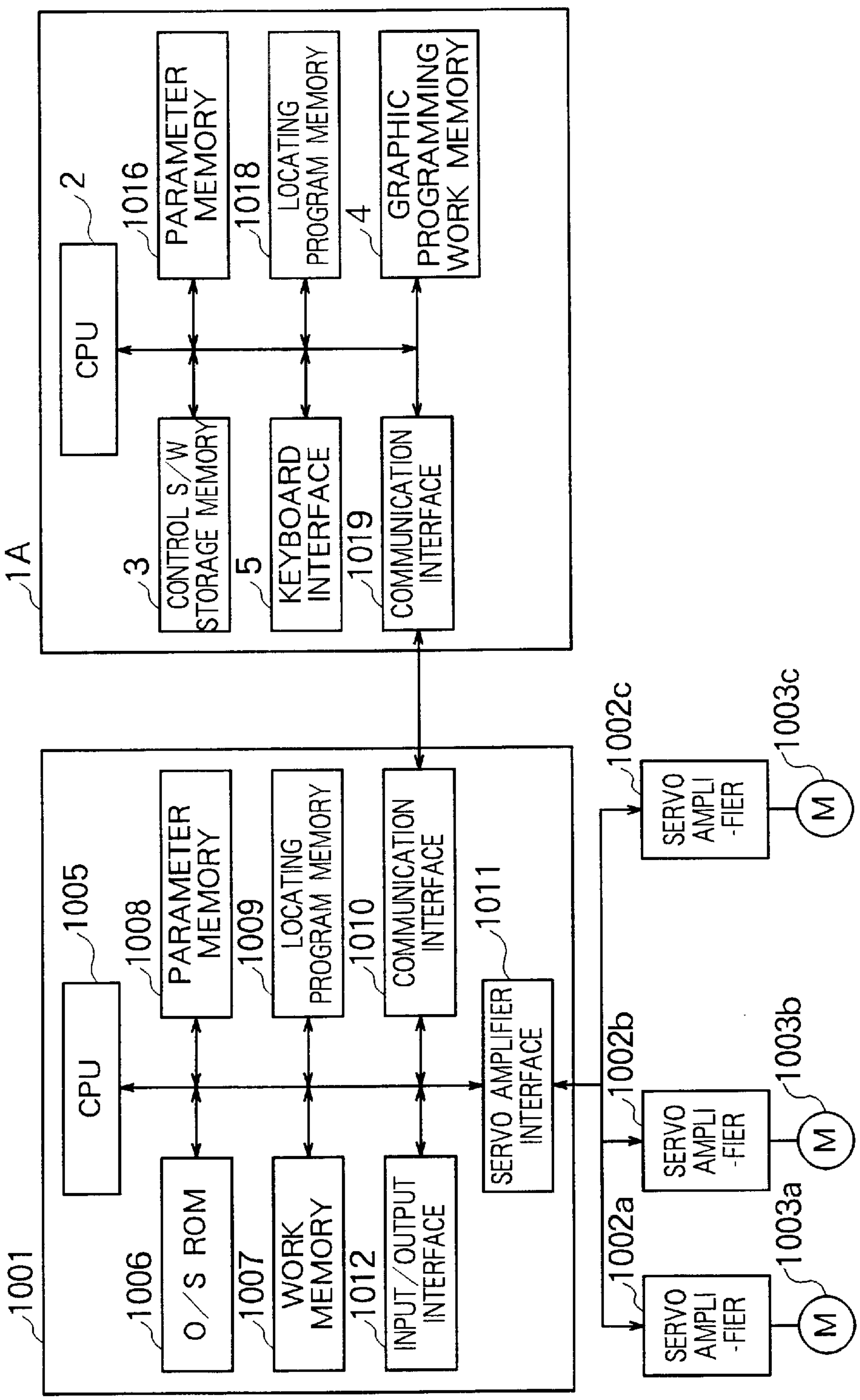
Figure 157:
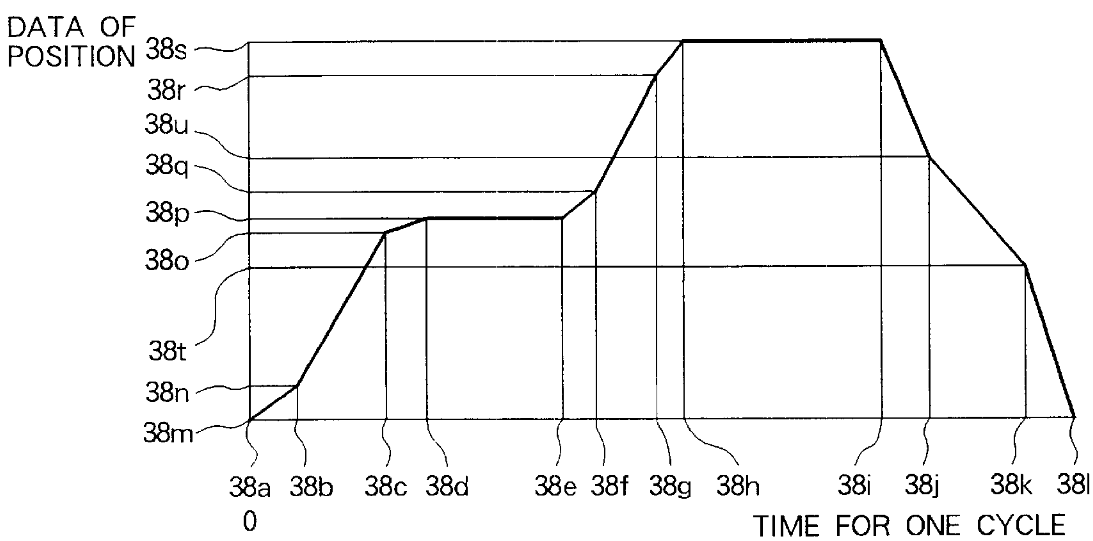
Figure 158:
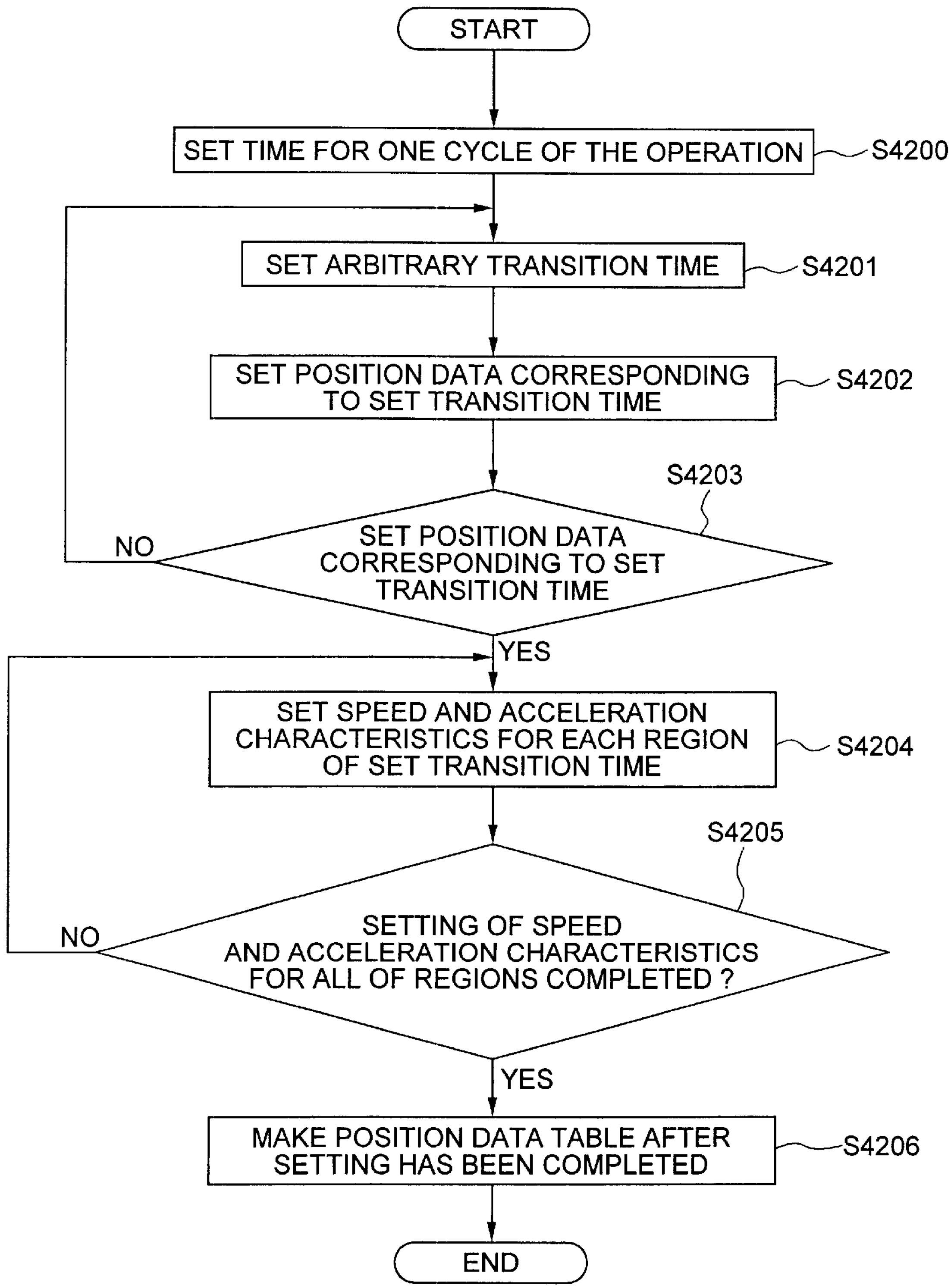
Figure 159:
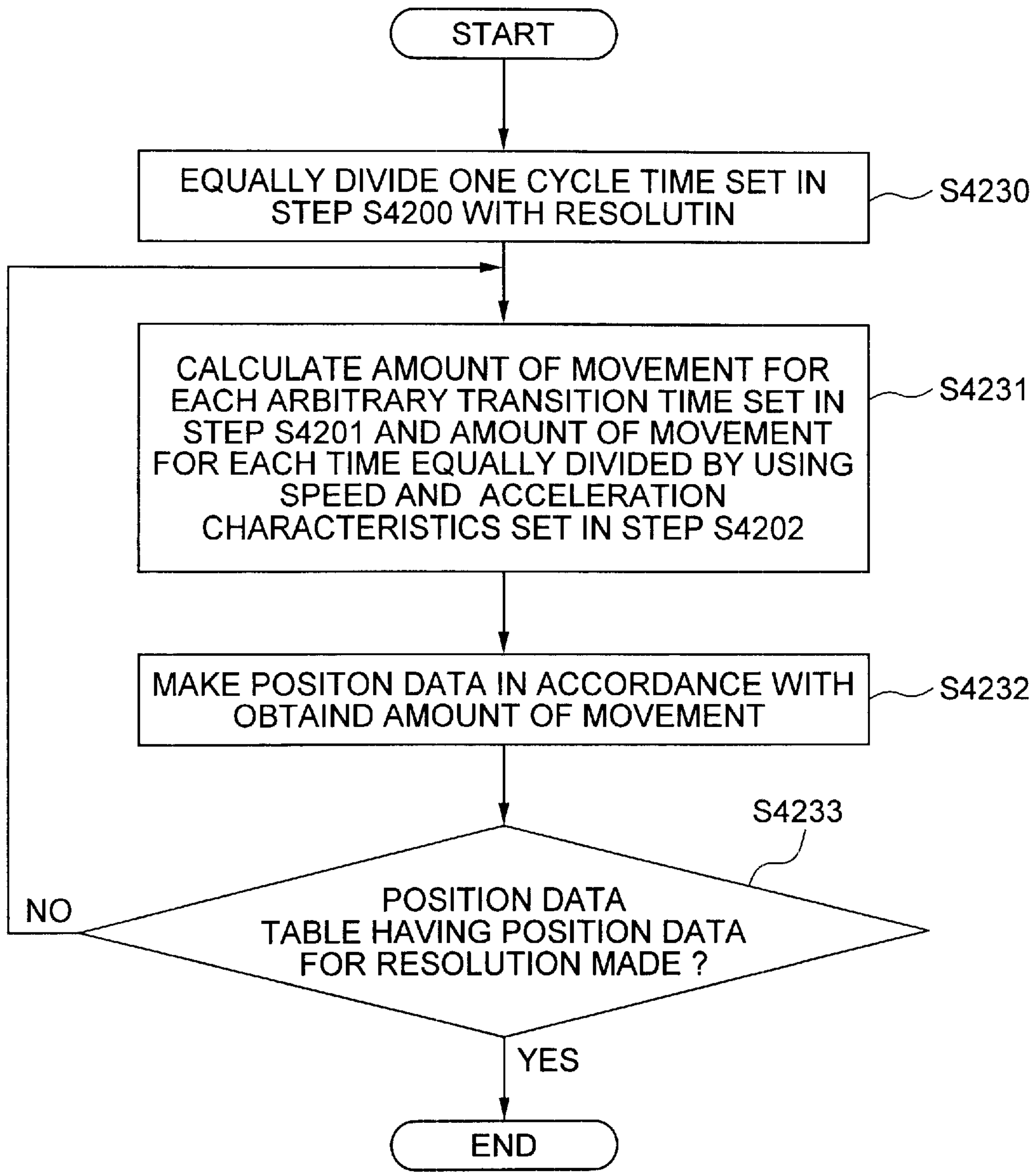
Figure 163:
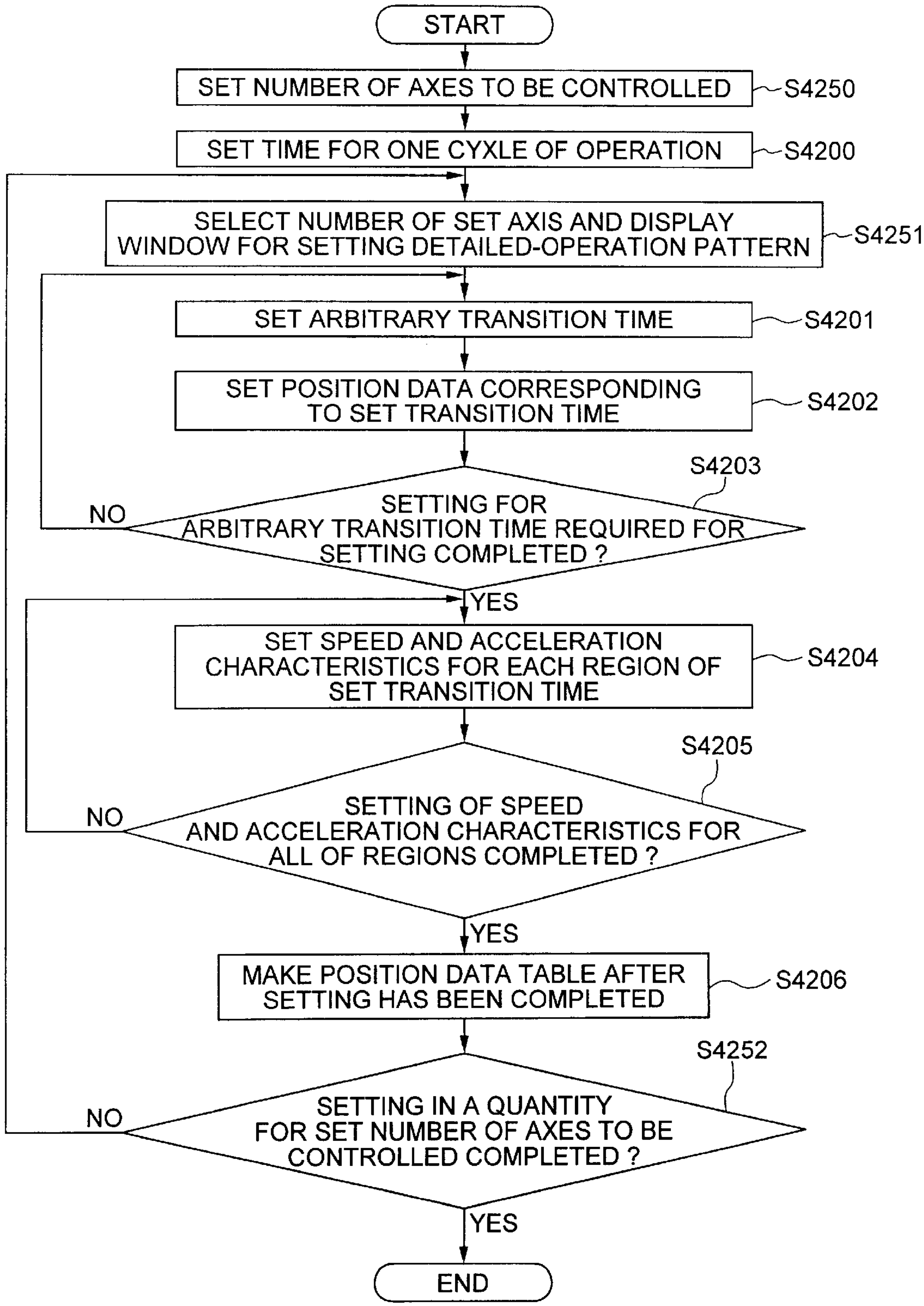
Figure 164:
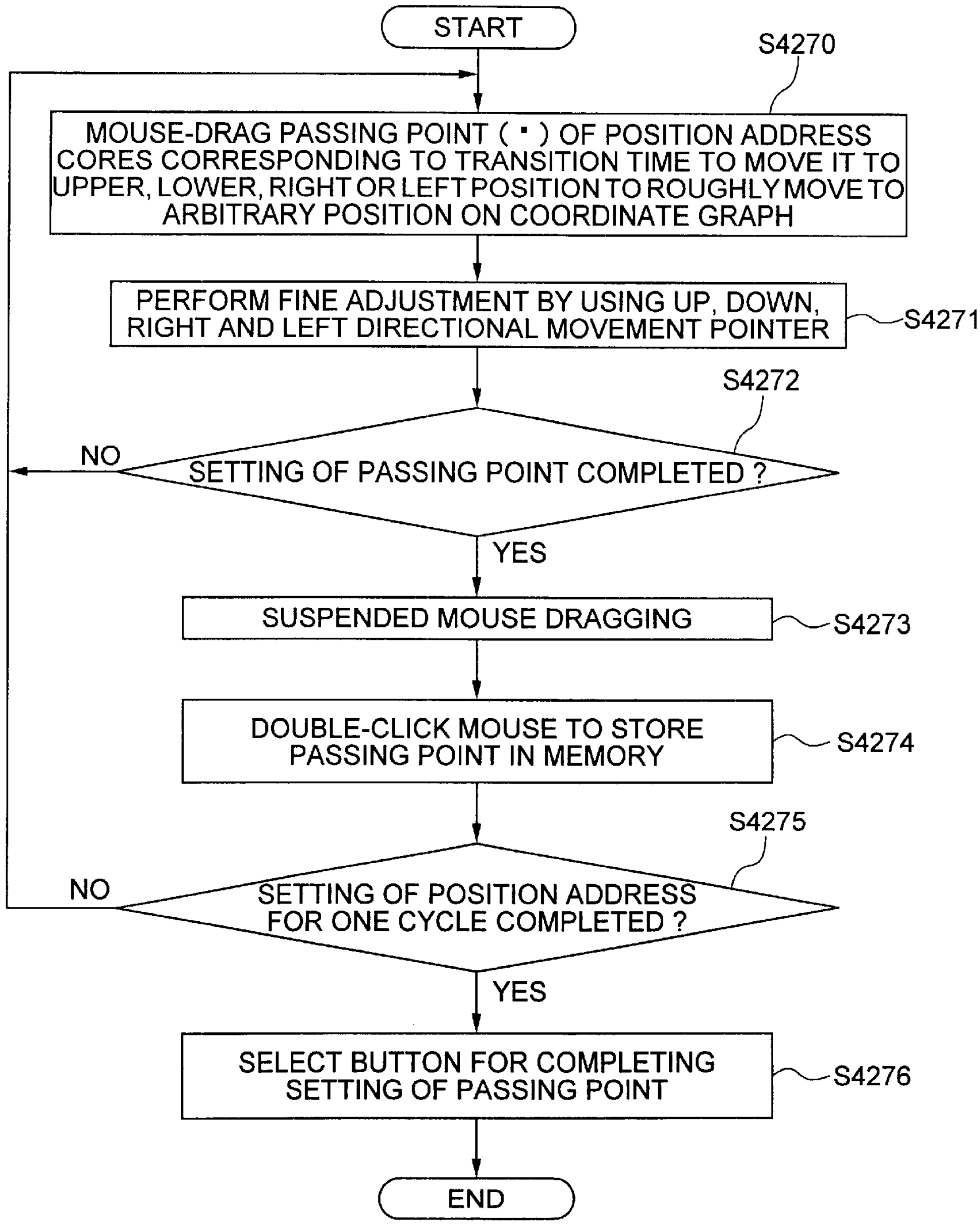
Figure 165:
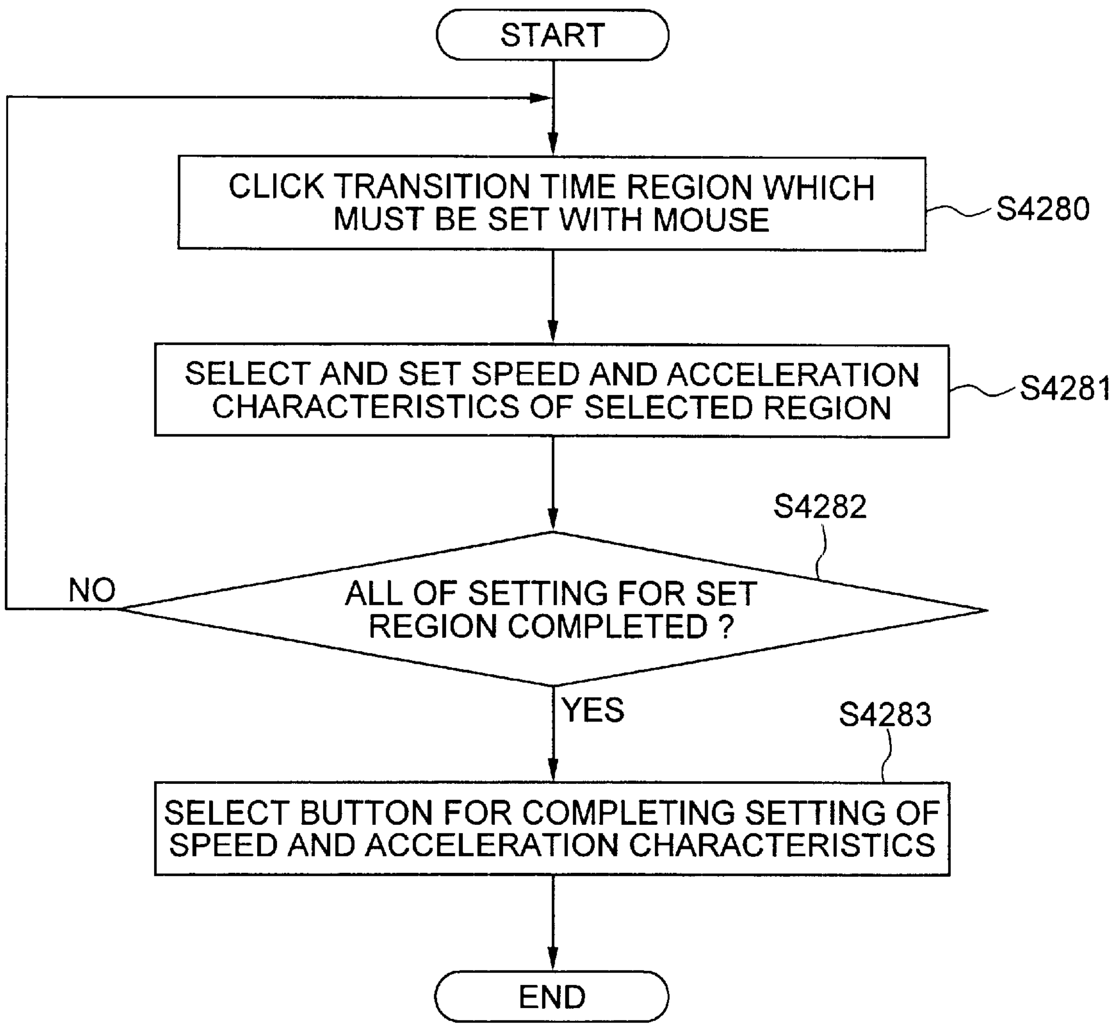
Figure 166:
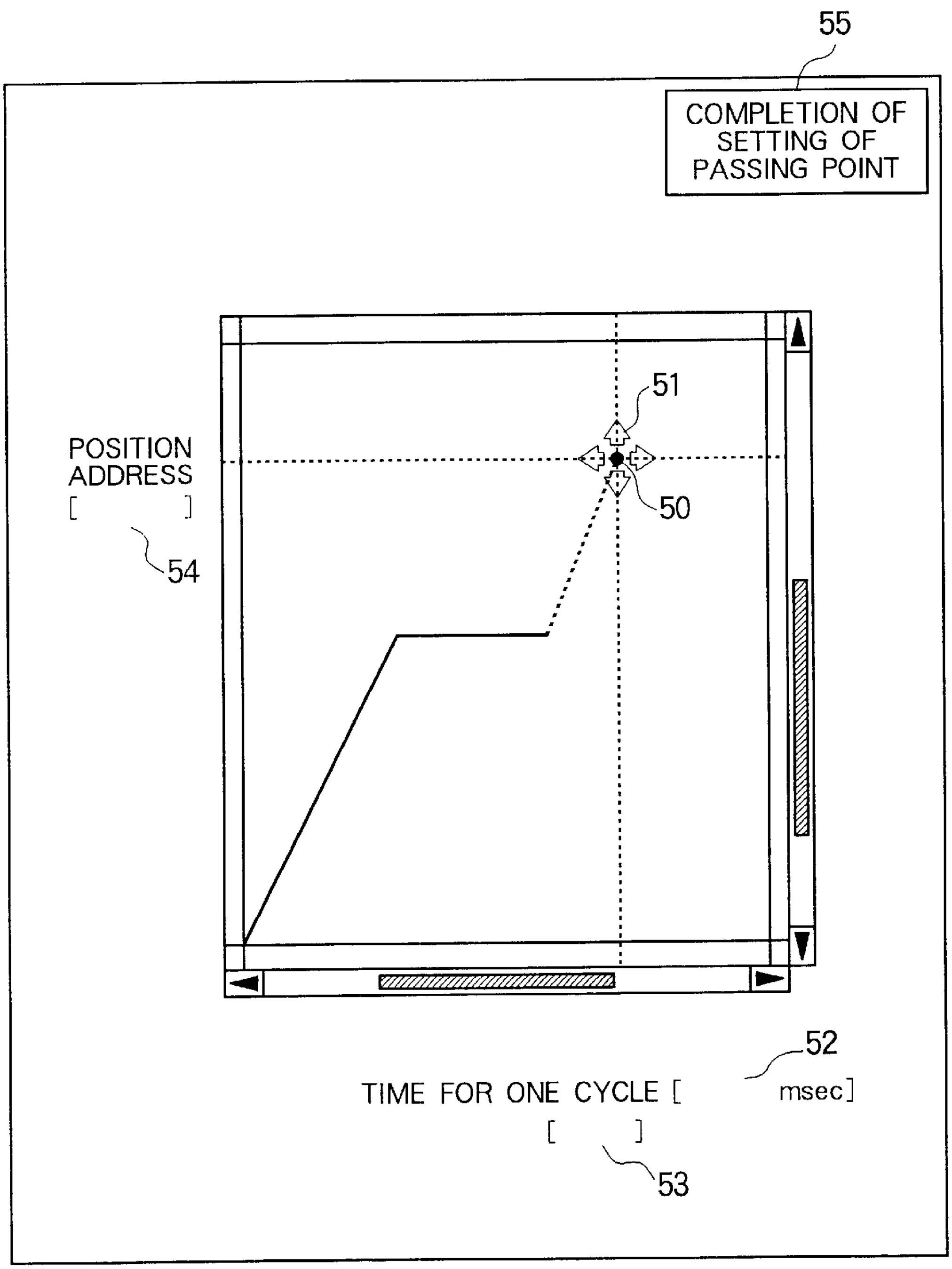
Figure 167:
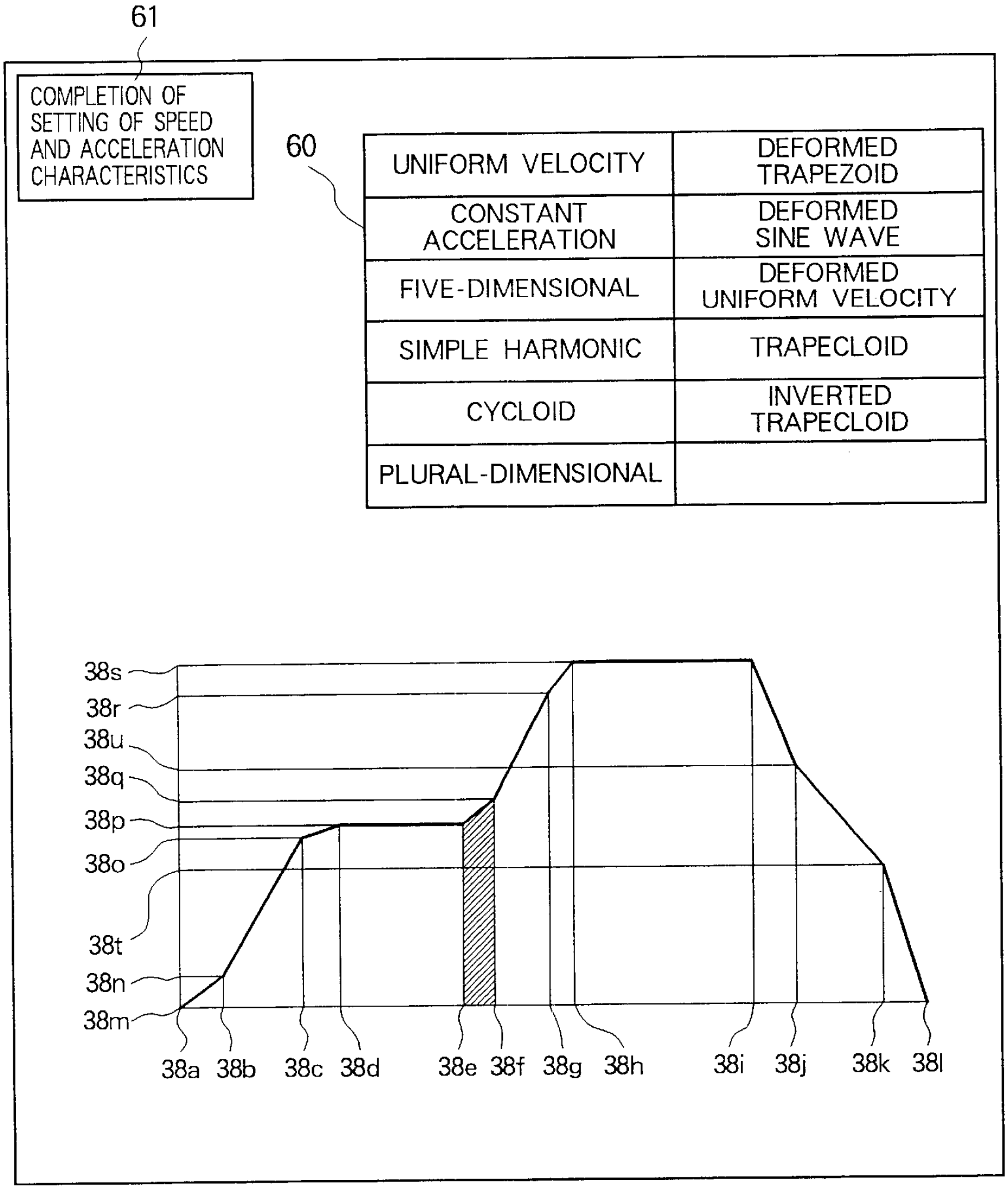
Figure 168:
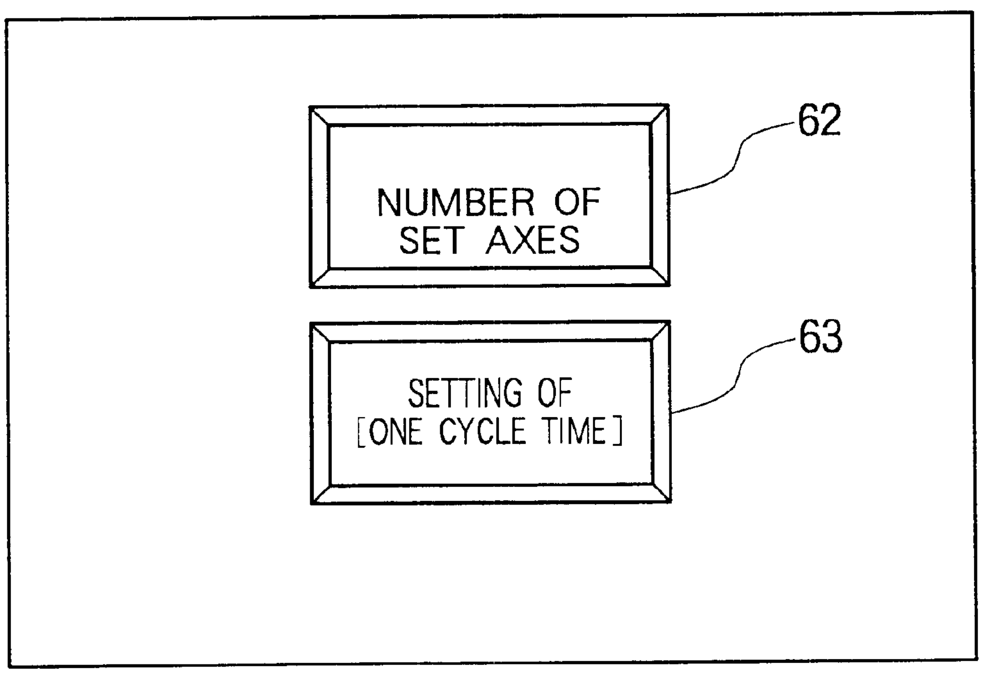
Figure 169:
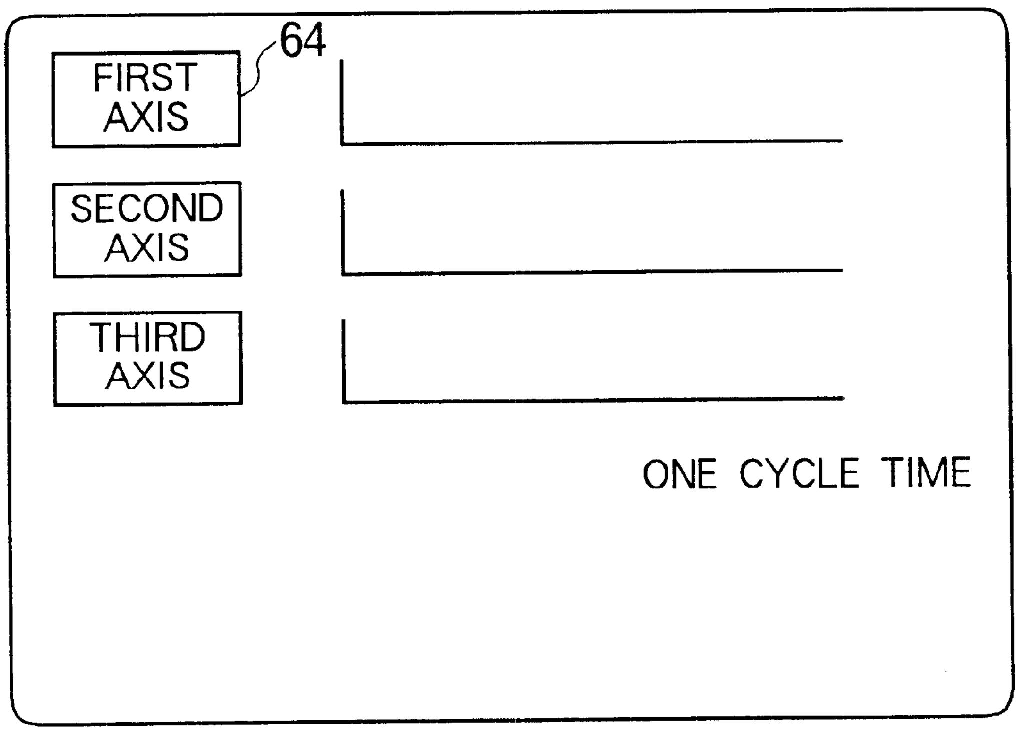
Figure 170:
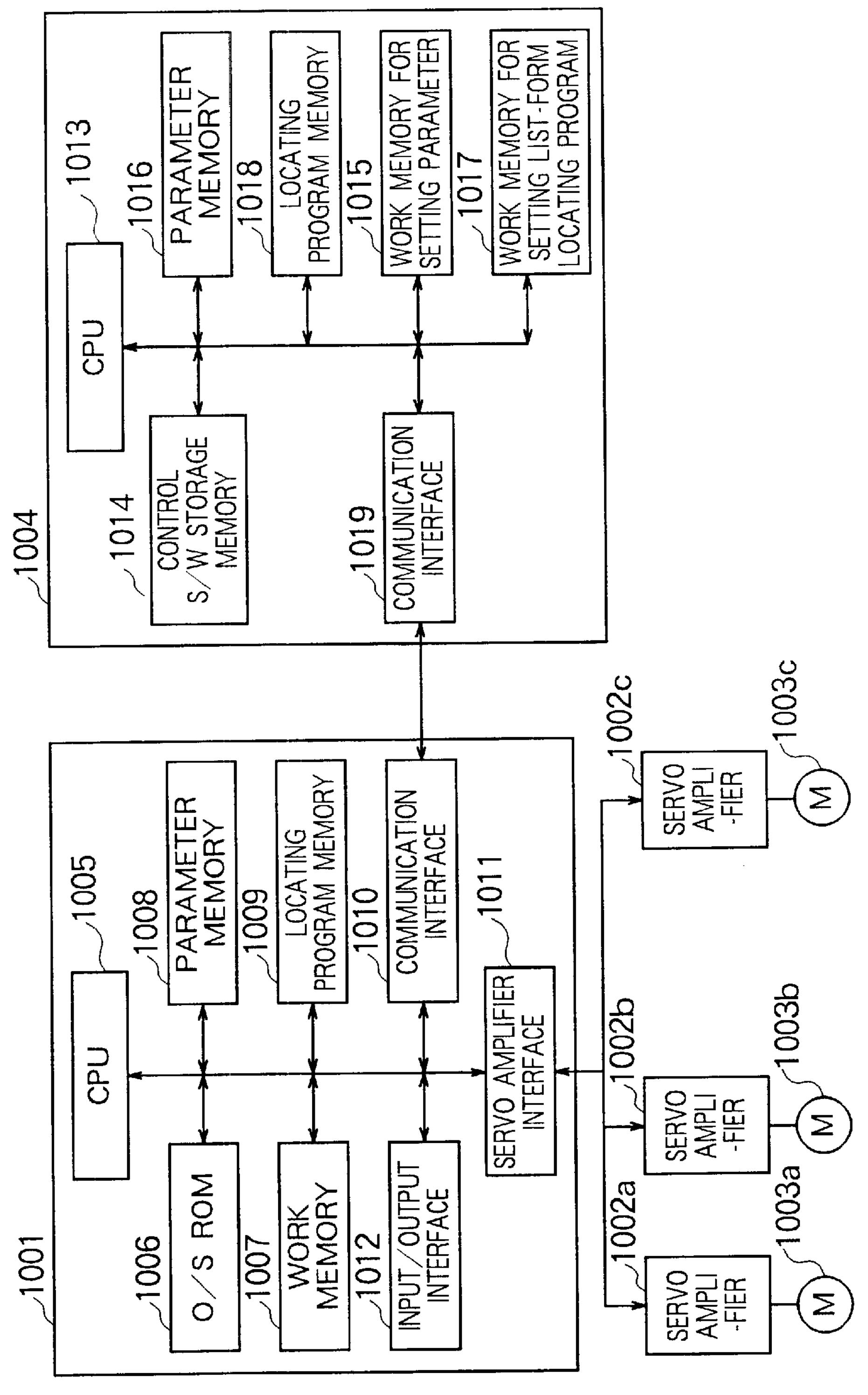
Figure 171:
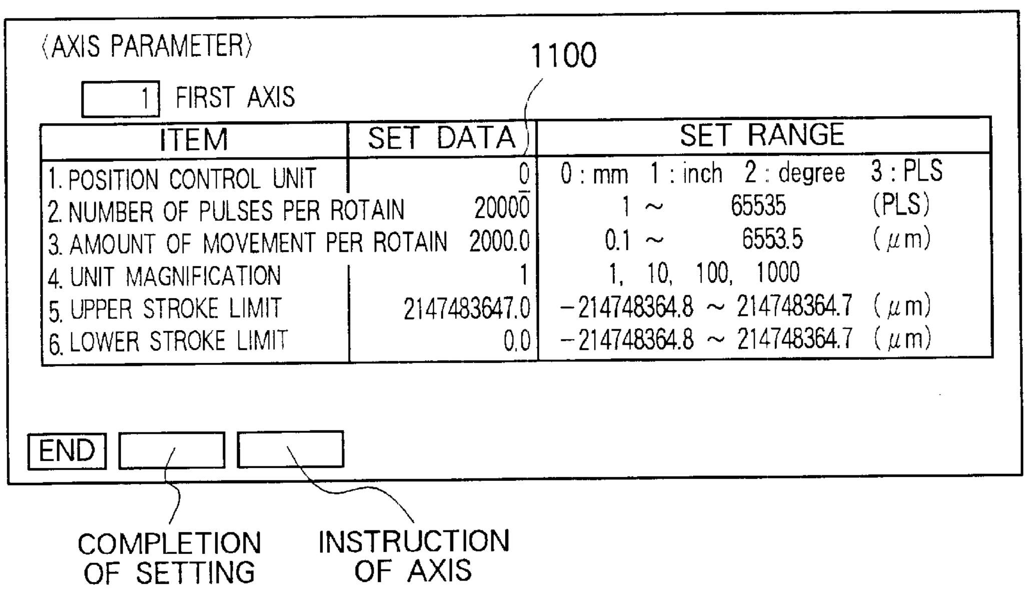
Figure 172:
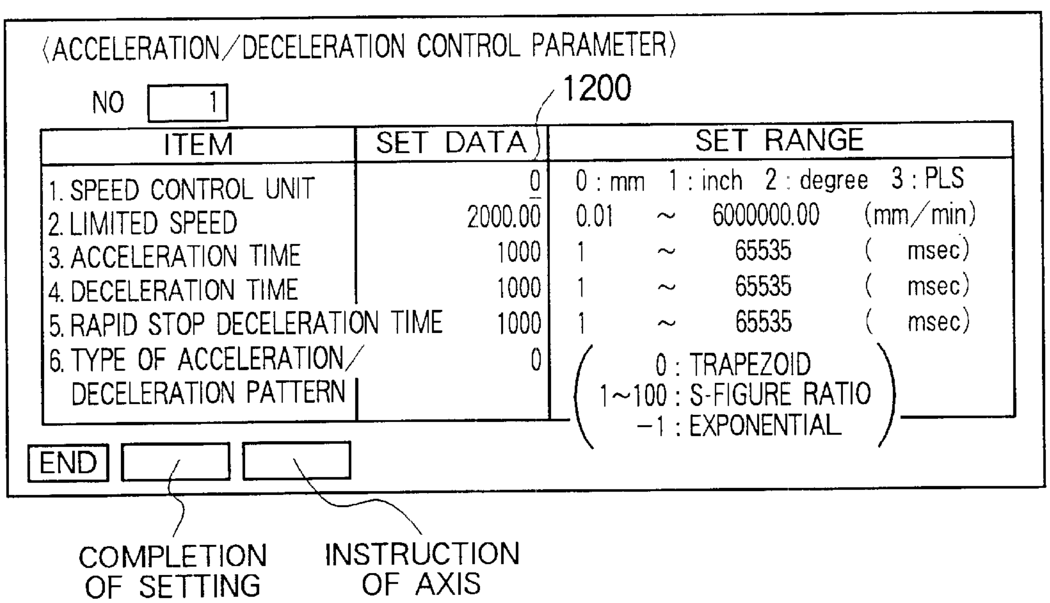
Figure 174:
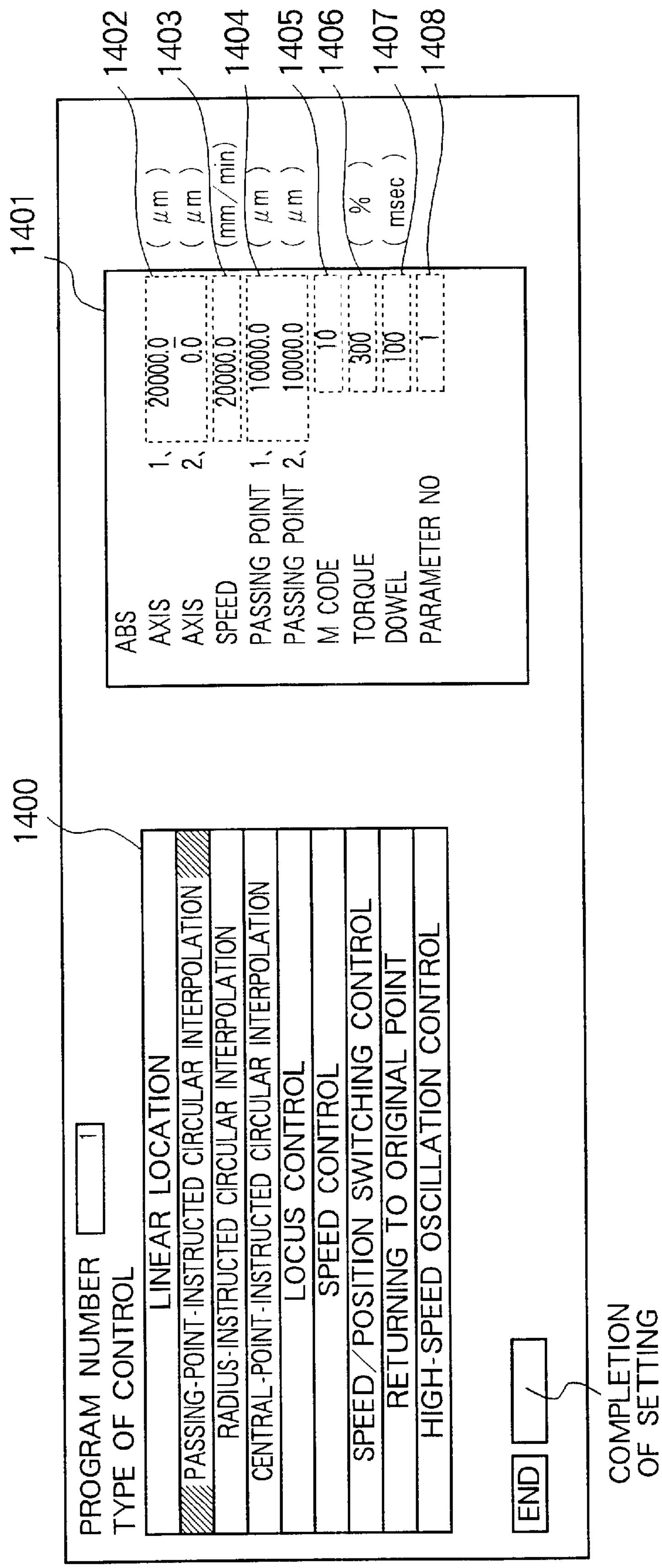
Figure 175:
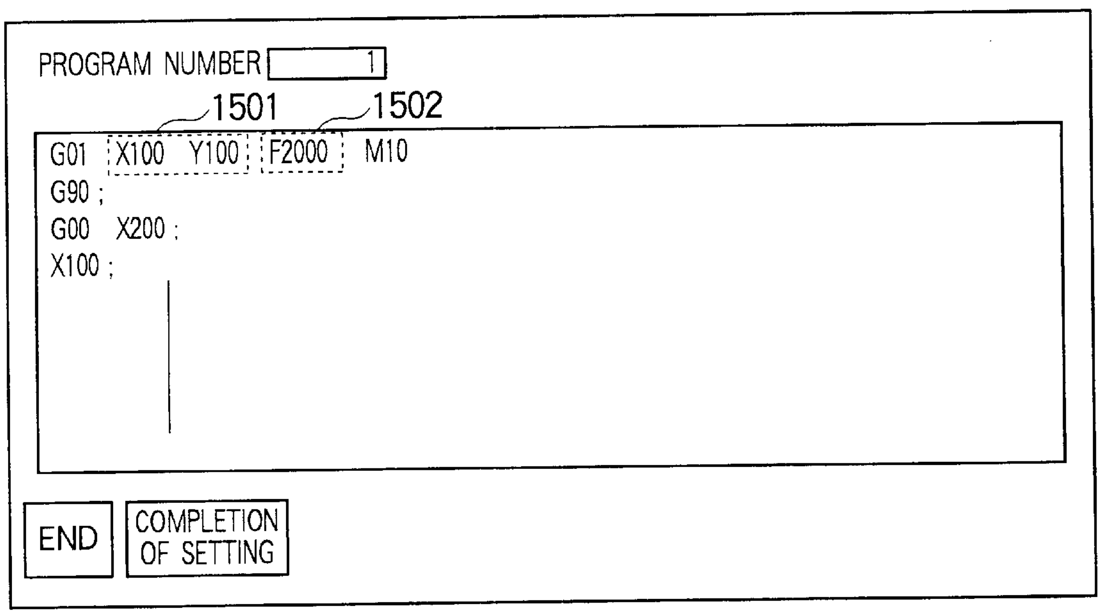
Figure 176:
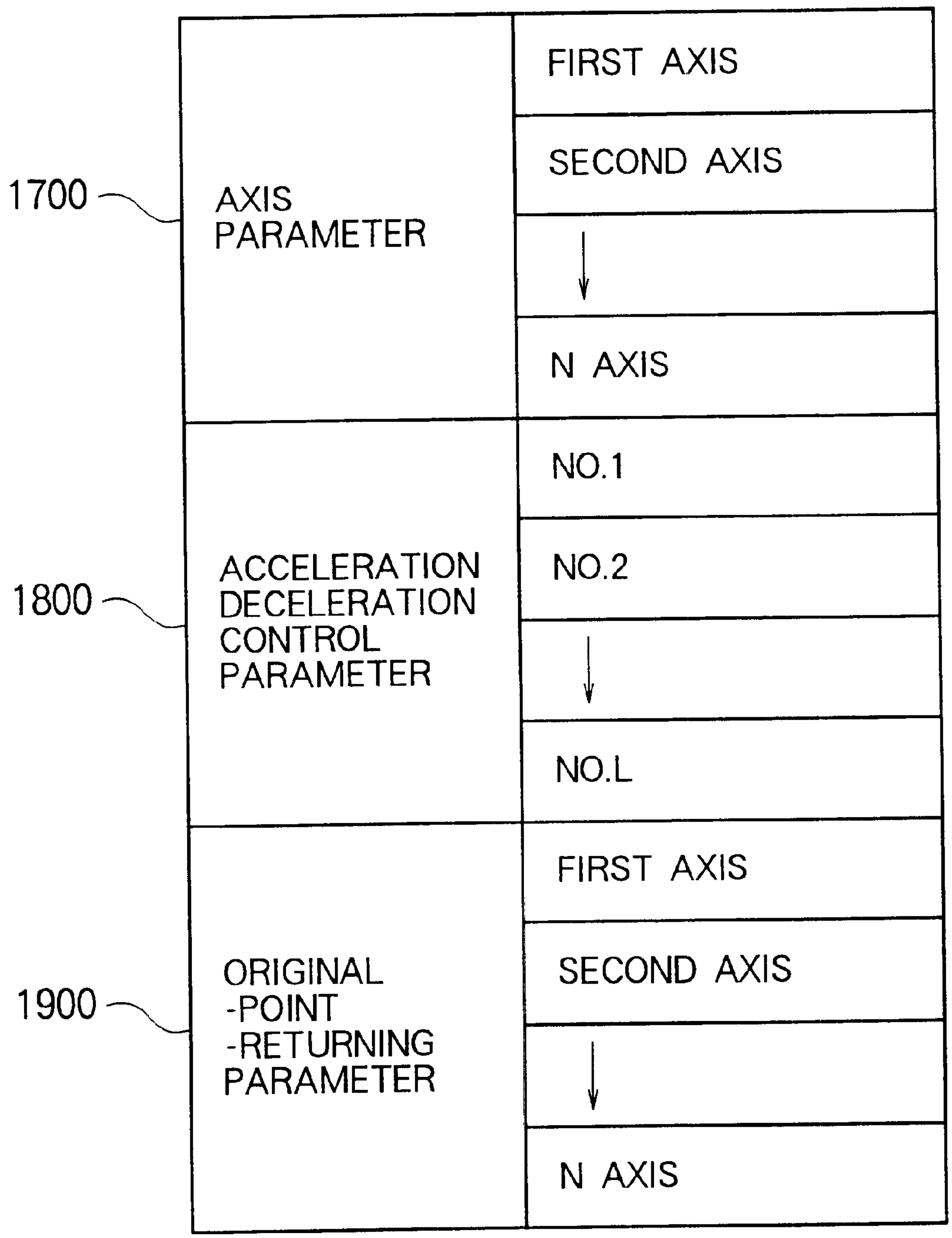
Figure 180:
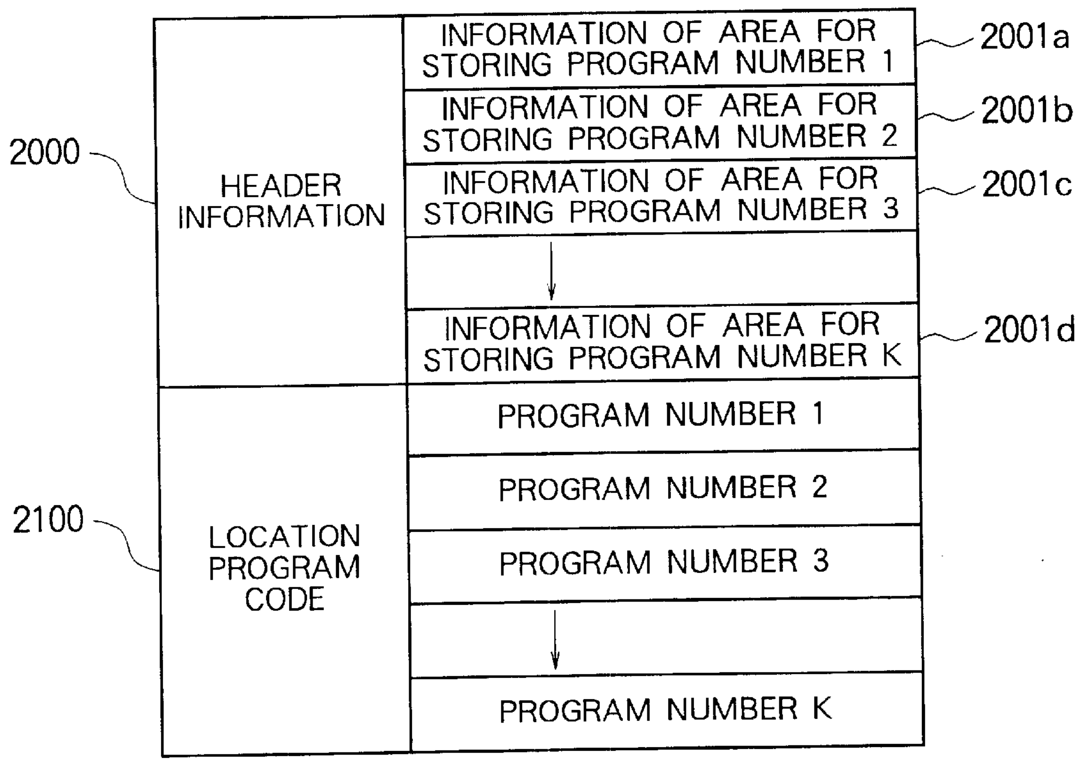
Figure 181:
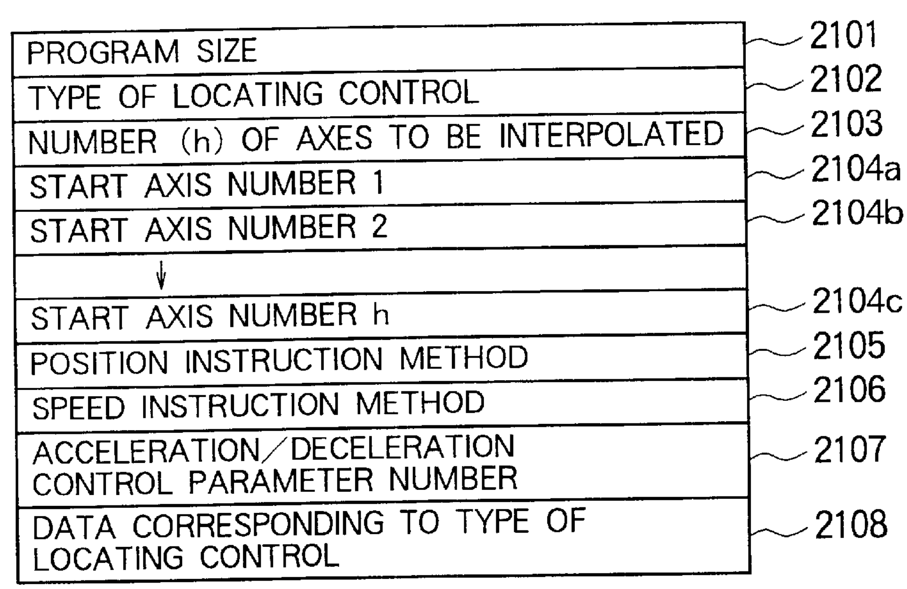
Figure 182:
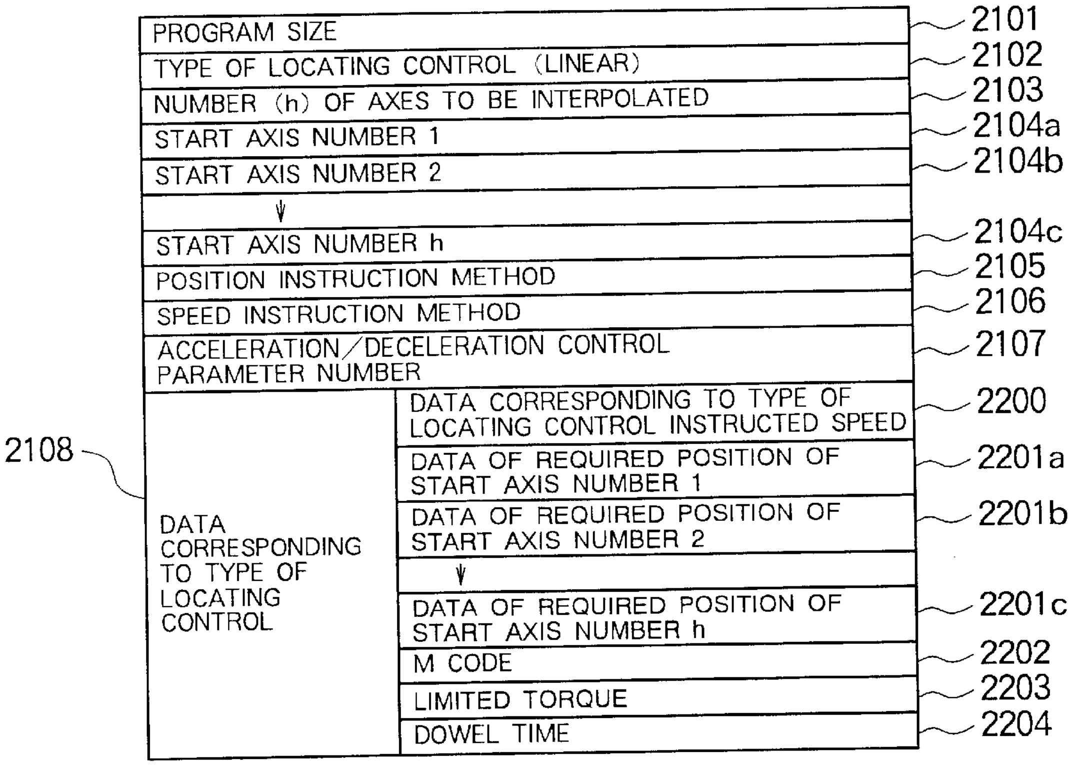
Figure 183:
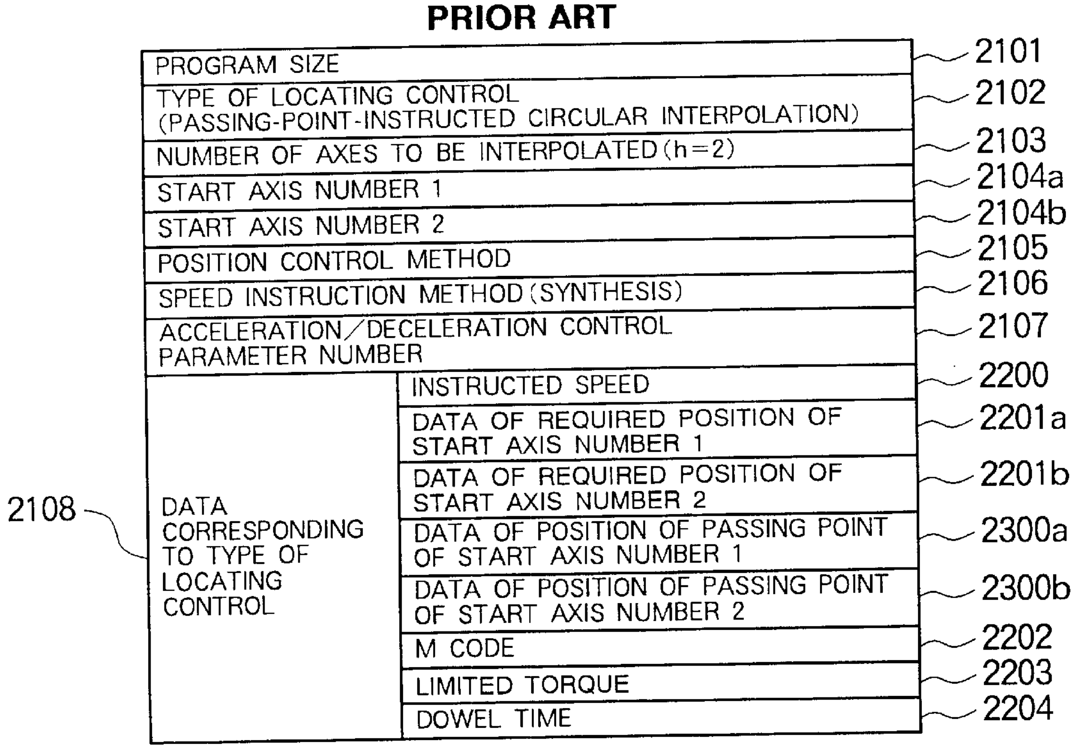
Figure 186:
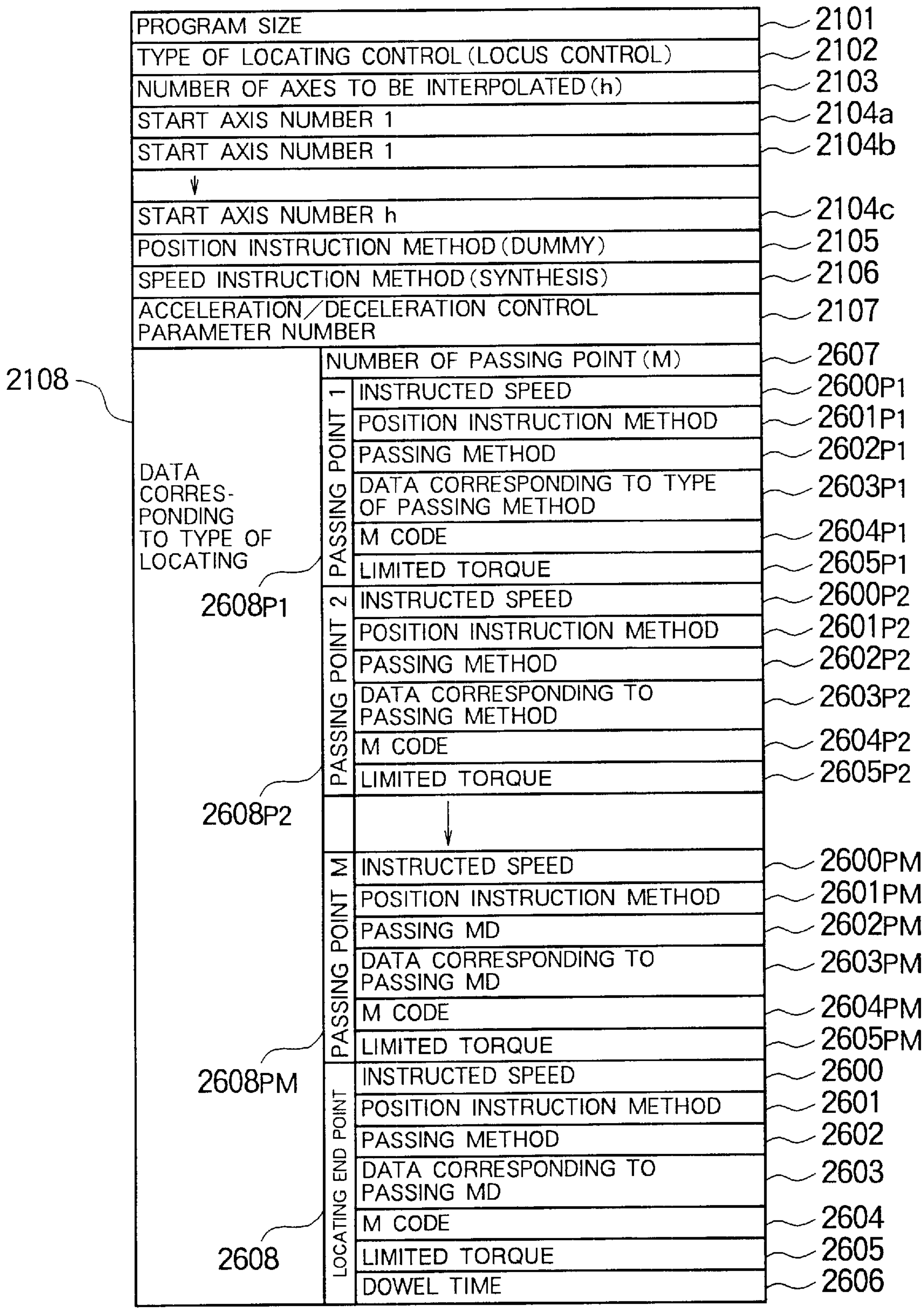
Figure 191:
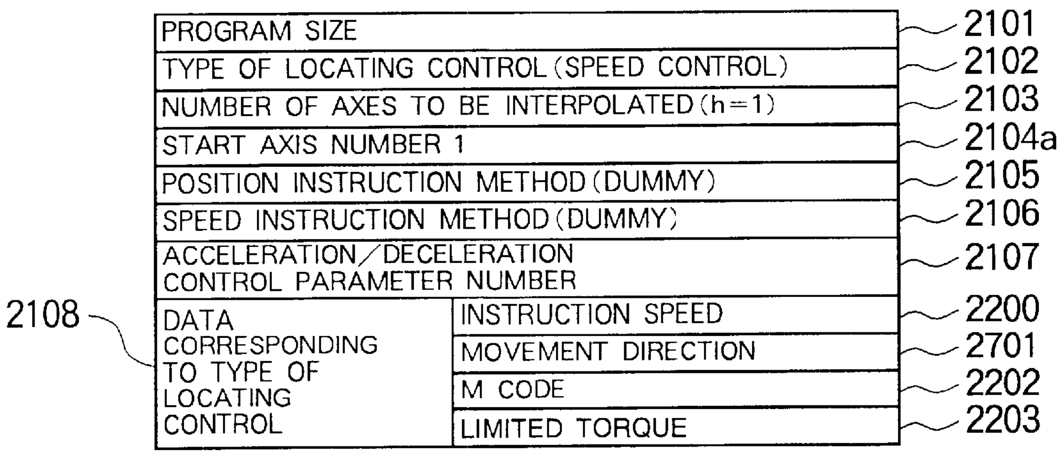
Figure 192:
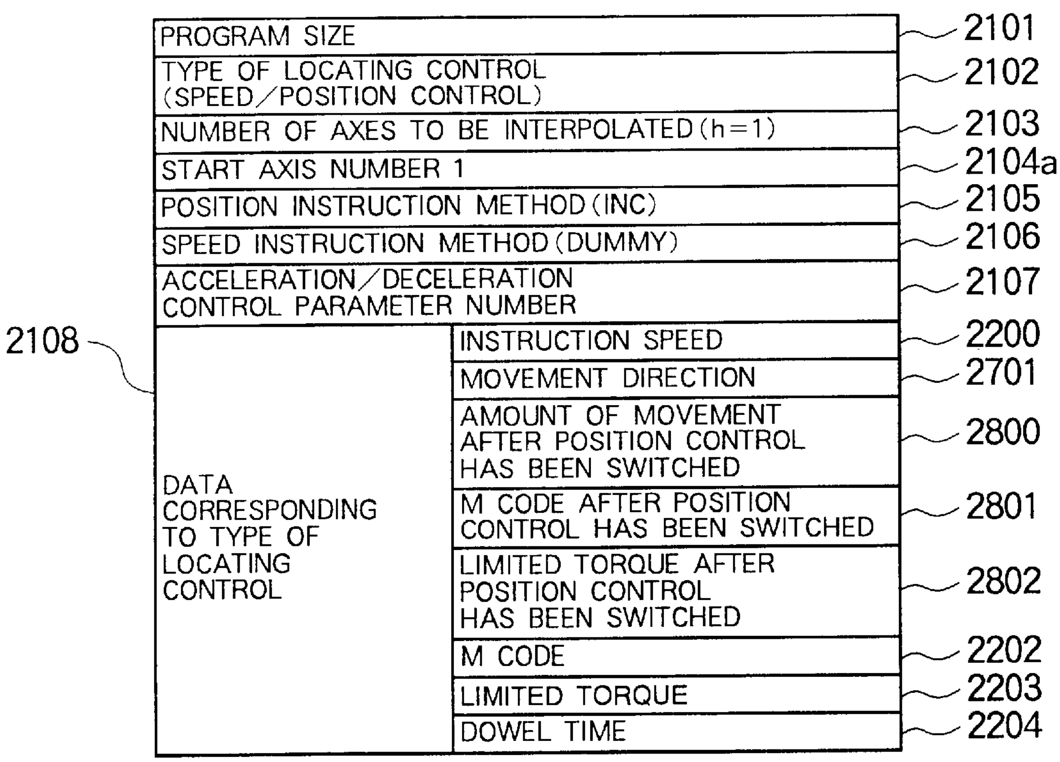
Figure 195:
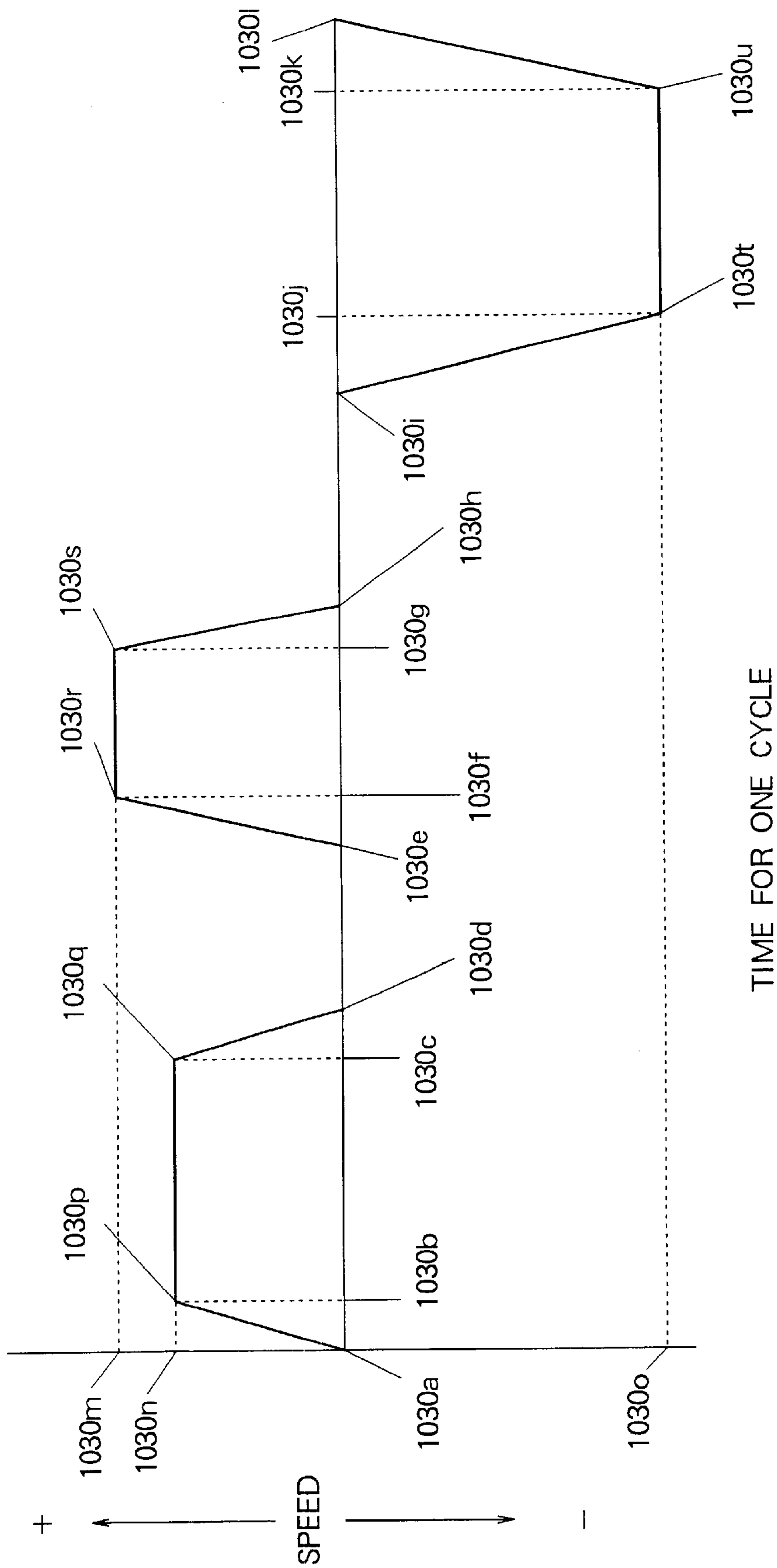
Figure 197:
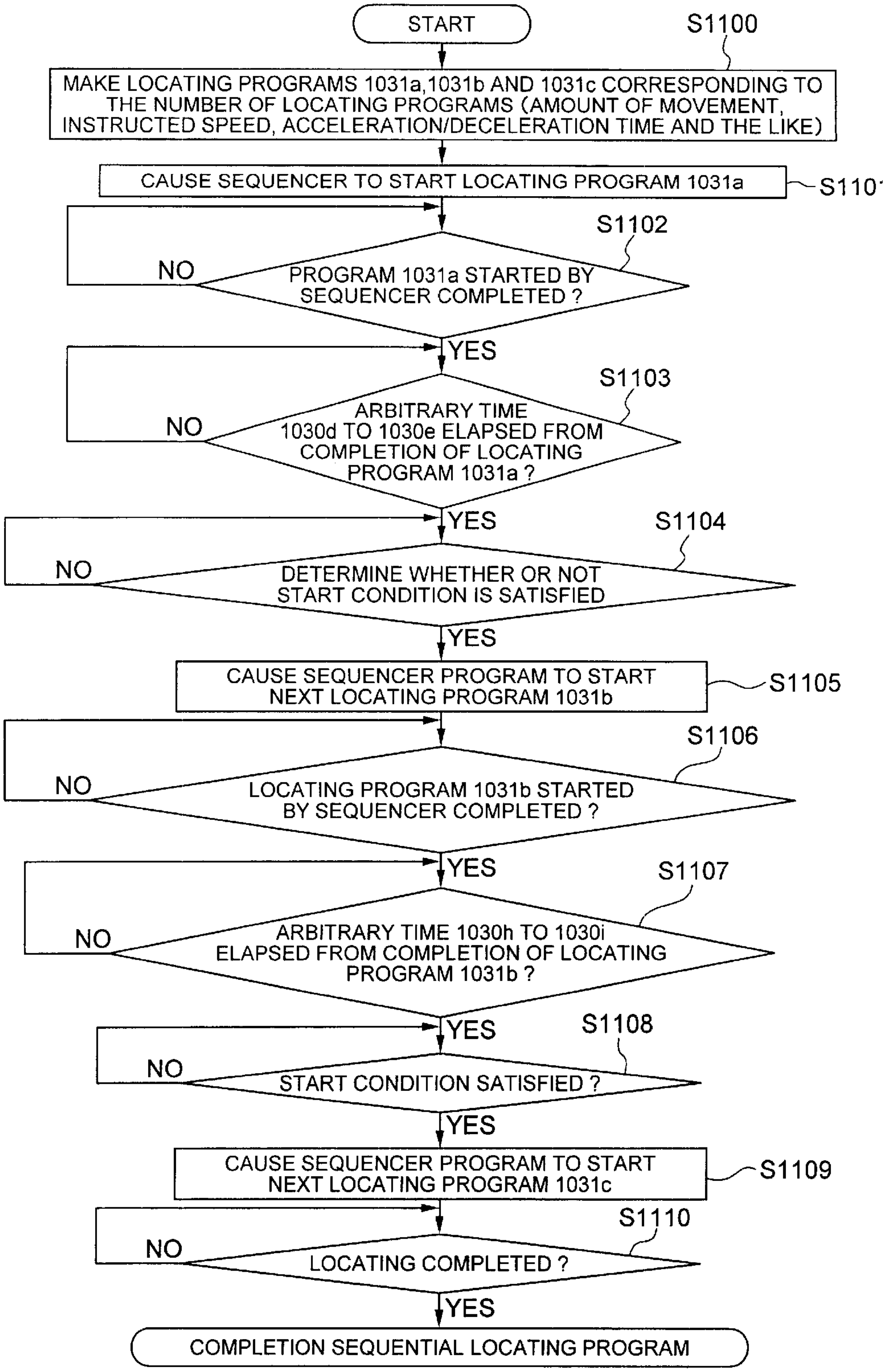
Figure 198:
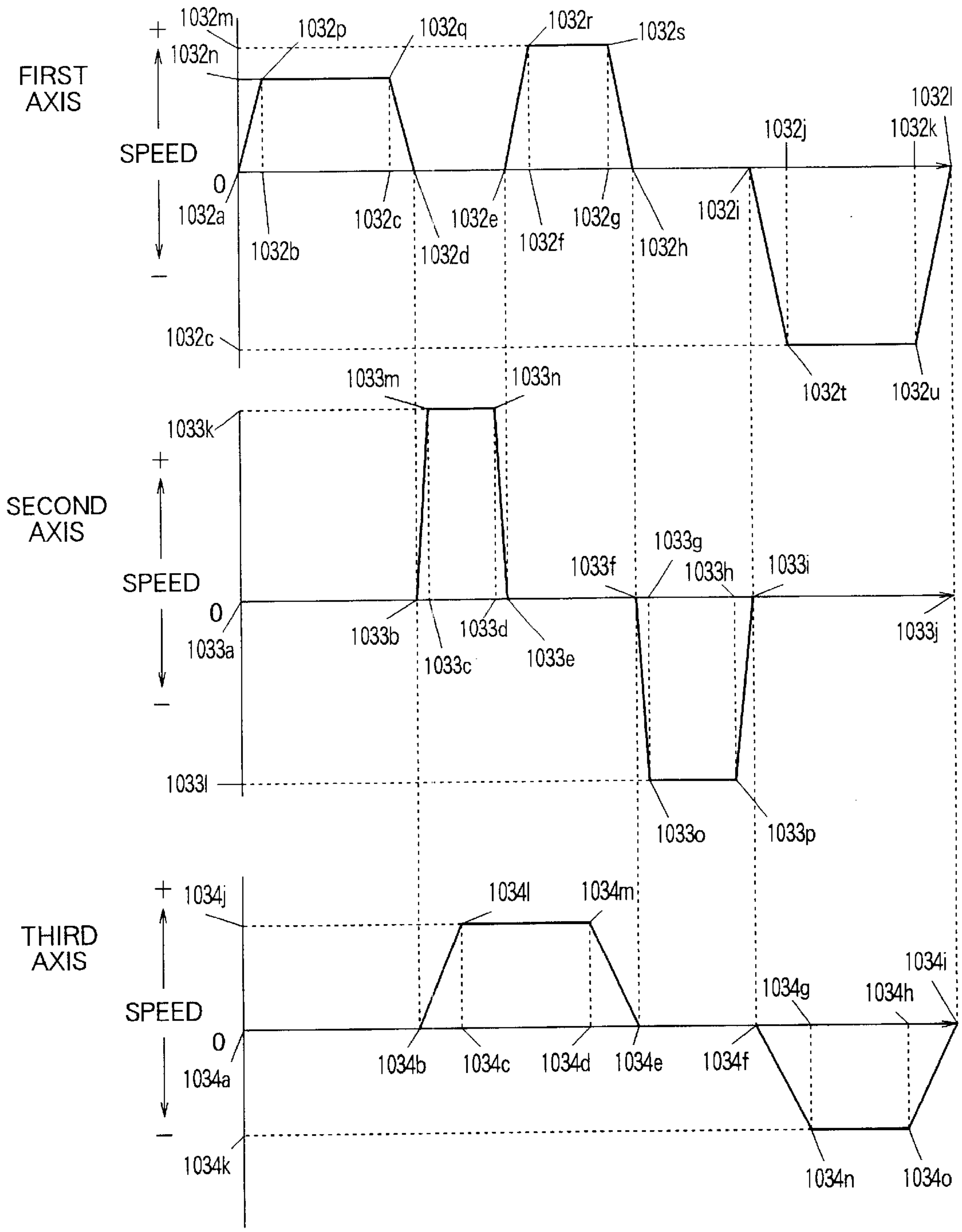
Figure 200:
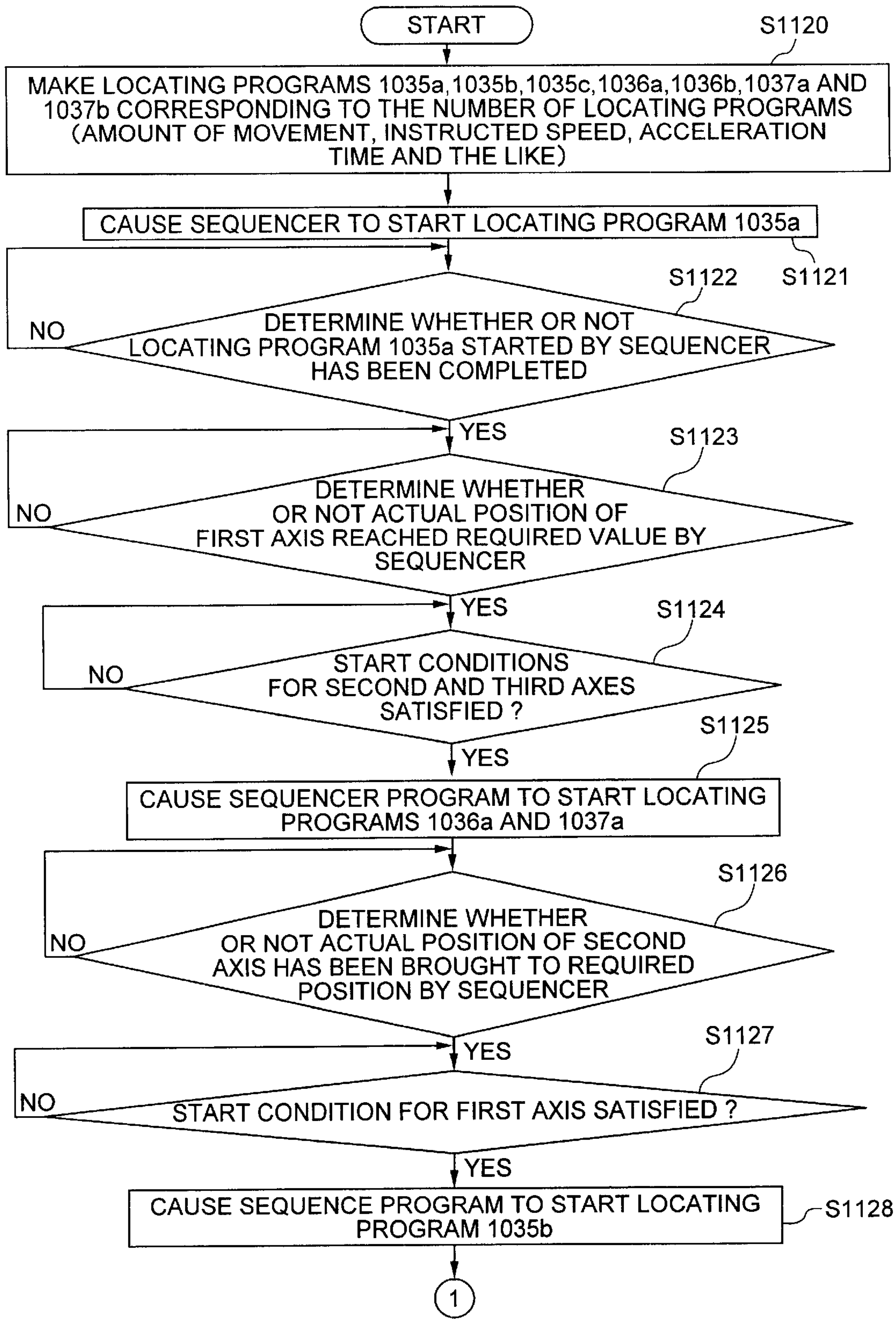
Figure 201:
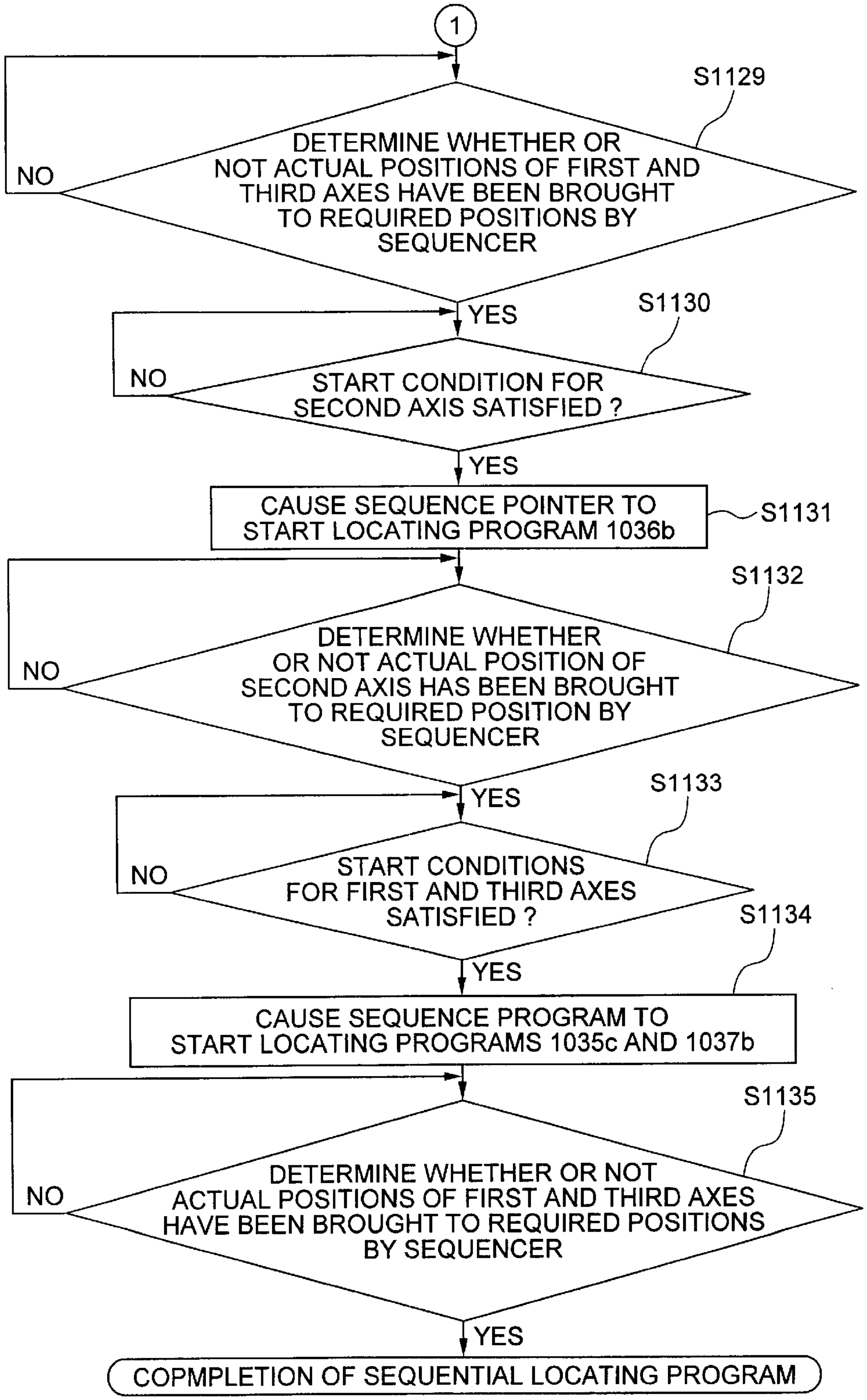

FIG. 136 is a diagram showing an example of a window display dialog for selecting a reference axis for instructing the speed of the reference axis in the location programming apparatus according to the first embodiment of the present invention;

FIG. 137 is a flow chart showing the operation for selecting the reference axis for instructing the speed of the reference axis in the location programming apparatus according to the first embodiment of the present invention;

FIG. 138 is a diagram showing an example of a locating programming which by using the speed graph when speed/position switching control is set in the location programming apparatus according to the first embodiment of the present invention;

FIG. 139 is a flow chart showing the setting operation of locating programming by using the speed graph when the speed/position switching control is set in the location programming apparatus according to the first embodiment of the present invention;

FIG. 140 is a flow chart showing the locating programming operation by using the speed graph when the speed/position switching control is set in the location programming apparatus according to the first embodiment of the present invention;

FIG. 141 is a flow chart showing the setting operation for locating programming by using the speed graph when a position control unit and upper and lower stroke limits are changed in the location programming apparatus according to the first embodiment of the present invention;

FIG. 142 is a flow chart showing the operation of locating programming by using the speed graph when the position control unit and the upper and lower stroke limits are changed in the location programming apparatus according to the first embodiment of the present invention;

FIG. 143 is a detailed view showing a locating program speed information storage area of the location programming apparatus according to the first embodiment of the present invention;

FIG. 144 is a diagram showing an example of a locating programming window by using the speed graph when the dog-method returning to an original point is set in the location programming apparatus according to the first embodiment of the present invention;

FIG. 145 is a flow chart showing the setting operation of locating programming by using the speed graph when the dot-method returning to the original point is set in the location programming apparatus according to the first embodiment of the present invention;

FIG. 146 is a flow chart showing the locating programming operation by using the speed graph when the dog-method returning to the original point is set in the location programming apparatus according to the first embodiment of the present invention;

FIG. 147 is a detailed view showing a locating program speed information storage area of the location programming apparatus according to the first embodiment of the present invention;

FIG. 148 is a diagram showing an example of a locating programming window by using the speed graph when a count-method returning to the original point is set in the location programming apparatus according to the first embodiment of the present invention;

FIG. 149 is a flow chart showing the setting operation of locating programming by using the speed graph when the count-method returning to the original point is set in the location programming apparatus according to the first embodiment of the present invention;

FIG. 150 is a flow chart showing the locating programming operation by using the speed graph when the count-method returning to the original point is set in the location programming apparatus according to the first embodiment of the present invention;

FIG. 151 is a diagram showing an example of a locating programming window by using other-time-transition graph when high speed oscillation is set in the location programming apparatus according to the first embodiment of the present invention;

FIG. 152 is a diagram showing the structure of a other-time-transition graph output information area of the location programming apparatus according to the first embodiment of the present invention;

FIG. 153 is a structural view showing a high speed oscillation programming information area of the location programming apparatus according to the first embodiment of the present invention;

FIG. 154 is a structural view showing a window structure information area of the location programming apparatus according to the first embodiment of the present invention;

FIG. 155 is a flow chart showing the locating programming operation by using the other-time-transition graph when the high speed oscillation is set in the location programming apparatus according to the first embodiment of the present invention;

FIG. 156 is a block diagram showing the structures of a location programming apparatus and a locating controller according to a second embodiment of the present invention;

FIG. 157 is a diagram showing a window for setting position data corresponding to transition time according to the second embodiment of the present invention;

FIG. 158 is a flow chart showing the procedure for setting position data corresponding to the transition time according to the second embodiment of the present invention;

FIG. 159 is a flow chart showing the procedure for making position data table of the setting operation procedure according to the second embodiment of the present invention;

FIG. 160 is a diagram showing an area for storing data of transition time and the address of the position according to the second embodiment of the present invention;

FIG. 161 is a diagram showing an area for storing data of speed and acceleration characteristics for each region according to the second embodiment of the present invention;

FIG. 162 is a diagram showing the structure of the position data table according to the second embodiment of the present invention;

FIG. 163 is a flow chart showing a procedure for setting when a plurality of axes are continuously operated in the structure according to a third embodiment of the present invention;

FIG. 164 is a flow chart showing a detailed procedure for setting transition time and the address of the position according to the second embodiment of the present invention;

FIG. 165 is a flow chart showing detailed procedure for setting a position data table according to the second embodiment of the present invention;

FIG. 166 is a diagram showing a window for setting the transition time and the address of the position according to the second invention;

FIG. 167 is a diagram showing a window for setting the position data table according to the second embodiment of the present invention;

FIG. 168 is a diagram showing a window for setting the number of axes to be controlled and time for one cycle according to the third embodiment of the present invention;

FIG. 169 is a diagram showing a window for setting the axis number according to the third embodiment of the present invention;

FIG. 170 is a block diagram showing the system structure of the conventional location programming apparatus and the locating controller;

FIG. 171 is a diagram showing an example of a window for setting an axis parameter by using a parameter list of the conventional location programming apparatus;

FIG. 172 is a diagram showing an example of a window for setting acceleration/deceleration control parameter by using the parameter list of the conventional location programming apparatus;

FIG. 173 is a diagram showing an example of a window for setting original-point returning parameter by using the parameter list of the conventional location programming apparatus;

FIG. 174 is a diagram showing an example of a window for performing locating programming by the list-form method in the conventional location programming apparatus;

FIG. 175 is a diagram showing another example of a window for performing locating programming by the list-form method in the conventional location programming apparatus;

FIG. 176 is a detailed view showing the structure of a parameter memory of the conventional location programming apparatus;

FIG. 177 is a detailed view showing the structure of an axis parameter storage area of the conventional location programming apparatus;

FIG. 178 is a detailed view showing the structure of a acceleration/deceleration control parameter storage area of the conventional location programming apparatus;

FIG. 179 is a detailed view showing the structure of a original-point returning parameter storage area of the conventional location programming apparatus;

FIG. 180 is a detailed view showing the structure of a locating programming memory of the conventional location programming apparatus;

FIG. 181 is a detailed view showing the structure of a locating program code storage area of the conventional location programming apparatus;

FIG. 182 is a detailed view showing the structure of a locating program code for the linear locating control for the conventional location programming apparatus;

FIG. 183 is a detailed view showing the structure of a locating program code for the passing-point-instructed circular interpolation control for the conventional location programming apparatus;

FIG. 184 is a detailed view showing the structure of the locating program code for the radius-instructed circular interpolation control for the conventional location programming apparatus;

FIG. 185 is a detailed view showing the structure of the locating program code for the central-point-instructed circular interpolation control for the conventional location programming apparatus;

FIG. 186 is a detailed view showing the of the locating program code for locus control in the conventional location programming apparatus;

FIG. 187 is a detailed view showing the structure of the locating program code for a linear passing region for the locus control in the conventional location programming apparatus;

FIG. 188 is a detailed view showing the structure of a locating program code for passing-point-instructed circular interpolation passing region for locus control in the conventional location programming apparatus;

FIG. 189 is a detailed view showing the structure of a locating program code for the radius-instructed circular interpolation passing region in the conventional location programming apparatus;

FIG. 190 is a detailed view showing the structure of a locating program code for the central-point-instructed circular interpolation passing region for the locus control in the conventional location programming apparatus;

FIG. 191 is a detailed view showing the structure of a locating program code for speed control in the conventional location programming apparatus;

FIG. 192 is a detailed view showing the structure of a locating program code for the speed/position switching control in the conventional location programming apparatus;

FIG. 193 is a detailed view showing the structure of a locating program code for the original-point returning control in the conventional location programming apparatus;

FIG. 194 is a detailed view showing the structure of a locating program code for the high speed oscillation control in the conventional location programming apparatus;

FIG. 195 is a timing chart of the operation which is performed when continuous locating (for example, three points) is performed in the conventional location programming apparatus;

FIG. 196 is a diagram showing a locating program for the conventional location programming apparatus;

FIG. 197 is a flow chart showing the Operation which is performed when continuous locating is performed in the conventional location programming apparatus;

FIG. 198 is a timing chart showing the operation which is performed when continuos locating of a plurality of axes is performed in the conventional location programming apparatus;

FIG. 199 is a diagram showing an example of each locating program when continues locating of a plurality of axes is performed in the conventional location programming apparatus; and FIGS. 200 and 201 show a flow chart of the operation when a plurality of axes are continuously located in the conventional location programming apparatus.

BEST MODE FOR CARRYING OUT OF THE INVENTION

Embodiments of the present invention will now be described with reference to the drawings.

First Embodiment

A first embodiment of the present invention will now be described in such a manner that the operations relating to control S/W will be described for each of the following functions.

Figure 1:
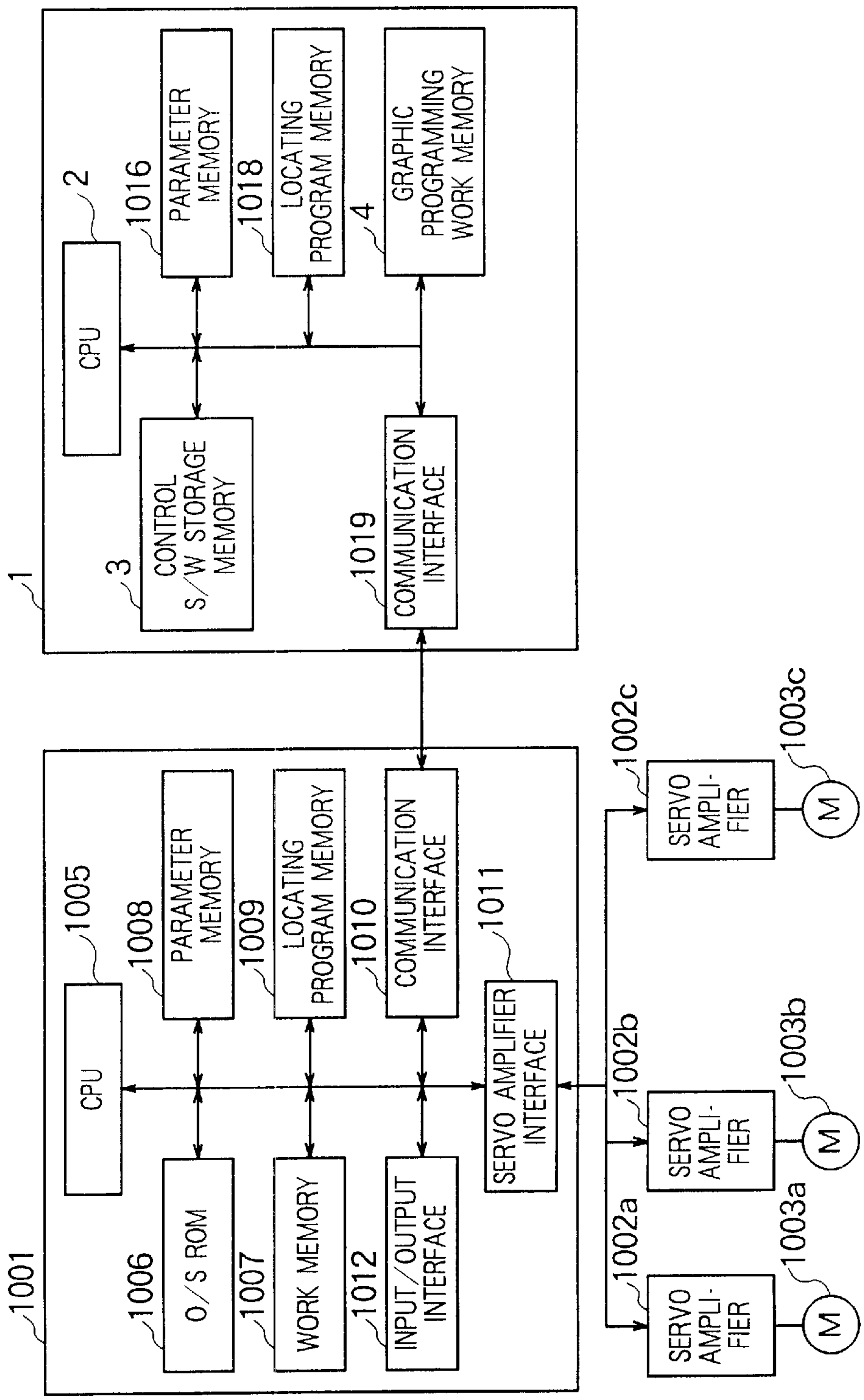
FIG. 1 is a block diagram showing the system of a location programming apparatus and a locating controller according to a first embodiment of the present invention.

1. Overall Operation
2. Locating Programming Using Coordinate Graph
3. Locating Programming for Linear Control Using Coordinate Graph
4. Locating programming for Passing-Point-Instructed Circular Interpolation Using Coordinate Graph
5. Locating programming for Circular Interpolation While instructing Radius using Coordinate Graph
6. Locating programming for Circular Interpolation While Instructing Central Point Using Coordinate Graph
7. Locating programming for Locus Control Using Coordinate Graph
8. Locating programming for Setting Position Instruction Method Using Coordinate Graph
9. Locating programming for Locus Control by Setting Position Instruction Method Using Coordinate Graph
10. Setting/Change of Operation Permissible Range for Subject Which Must be Controlled by Using Coordinate Graph
11. Locating Programming Using Speed Graph
12. Setting/Change of Limited Speed Using Speed Graph
13. Setting of Acceleration/Deceleration Pattern Type Using Speed Graph
14. Setting/Change of Acceleration Time Using Speed Graph
15. Calculation/Display of Actual Acceleration Time In Acceleration Region Using Speed Graph
16. Setting/Change of Deceleration Time Using Speed Graph
17. Calculation/Display of Actual Deceleration Time in Deceleration Region Using Speed Graph
18. Setting/Change of Rapid Stop Deceleration Time Using Speed Graph
19. Calculation/Display of Actual Rapid Stop Deceleration time Using Speed Graph
20. Setting/Change of Dowel Time Using Speed Graph
21. Setting/Change of M Code Using Speed Graph
22. Setting/Change of Limited Torque Using Speed Graph
23. Decomposition/Display of Instructed Speed to Each Axis Using Speed Graph In a Case where Two or More Axes Are Interpolation-Controlled
24. Calculation/Display of Amount of Movement Performed Until Instructed Speed is Realized In Accordance With Acceleration Time and Using Speed Graph
25. Calculation/Display of Amount of Movement Performed From Start of Deceleration to Stop In Accordance With Deceleration Time and Using Speed Graph
26. Calculation/Display of Amount of Movement Performed From Deceleration to Stop In Accordance With Rapid Stop Deceleration Time and Using Speed Graph
27. Display of Maximum Speed and Rated Speed of Motor On Drive Shaft Using Speed Graph
28. Change of Acceleration/Deceleration Pattern Using Speed Graph
29. Display of Effective Speed Change Range Using Coordinate Graph
30. Locating Programming Using Coordinate Graph While Displaying List Form Locating Program
31. Locating Programming Using List Form Locating Program While Displaying Coordinate Graph
32. Locating Programming Using Speed Graph While Displaying List Form Locating Program
33. Locating Programming Using List Form Locating Program While Displaying Speed Graph
34. Display of Range In Which Passing Points In Circular Interpolation Can Be Set When Passing-Point Instructed Circular Interpolation Is Performed
35. Display of Range In Which Radius-Instructed Points Can Be Set When Radius-Instructed Circular Interpolation Is Performed
36. Display of Range In Which Central Point of Circular Arc Can Be Set When Central-Point-Instructed Circular Interpolation Is Performed
37. Selection of Reference Axis By Instructing Speed of Reference Axis
38. Locating Programming for Speed/Position Switching Control Using Speed Graph
39. Programming of Dog-Method Returning to Original Point Using Speed Graph 40. Programming of Count-Method Returning to Original Point Using Speed Graph
41. Programming of High Speed Oscillation Using 1. Overall Operation A location programming apparatus according to a first embodiment of the present invention will now be described with reference to the drawings. FIG. 1 is a block diagram showing the structures of a location programming apparatus and a locating controller according to the first embodiment of the present invention. The same reference numerals among the drawings represent the same or similar elements.

Referring to FIG. 1, reference numeral 1 represents a location programming apparatus and 2 represents a CPU of the location programming apparatus 1. Reference numeral 3 represents a memory on which software (S/W) for controlling locating programming is stored and 4 represents a graphic programming work memory on which graph information is stored. Reference numeral 1016 represents a parameter memory on which set parameters are stored, 1018 represents a locating program memory on which set locating program is stored and 1019 represents a communication interface to a locating controller 1001. The structures of the parameter memory 1016 and the locating program memory 1018 are the same as those of the conventional structure shown in FIGS. 176 to 194. The other structures are similar to those of the conventional structure.

Figure 2:
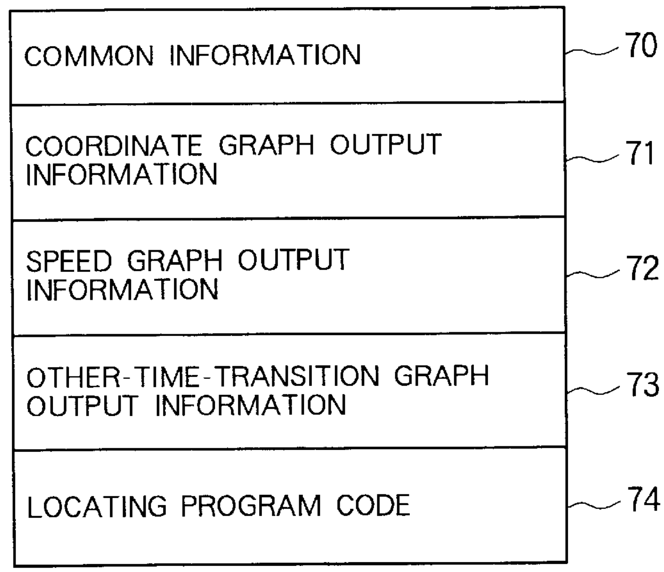
FIG. 2 is a diagram showing the structure of a work memory for graphic programming of the location programming apparatus according to the first embodiment of the present invention.

FIG. 2 shows the structure of the graphic programming work memory 4. The graphic programming work memory 4 is composed of a common-information storage area 70 on which information common to each of graph setting operations is stored and a coordinate-graph-output-information storage area 71 on which information to be set to a coordinate graph with which information required to control the position is set is stored. Moreover, there are provided a speed-graph-output-information storage area 72 on which information to be set to a speed graph with which information required to mainly control speed is set is stored and an other-time-transition-graph storage area 73 on which information set to another-time-transition graph is stored. In addition, a locating-program-code storage area 74 is provided on which a locating program code generated in accordance with information transmitted from each graph is stored.

Figure 3:
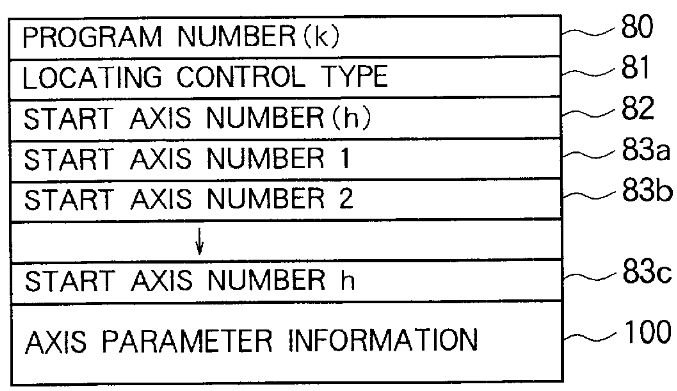
FIG. 3 is a diagram showing the structure of a common information storage area of the graphic programming work memory of the location programming apparatus according to the first embodiment of the present invention.

FIG. 3 shows the common-information storage area 70 composed of an area 80 on which locating program number to be set is stored, a locating control type storage area 81, a start-axis-number storage area 82, start-axis-number storage areas 83*a*, 83*b* and 83*c* and an axis-parameter-information storage area 100.

Figure 4:
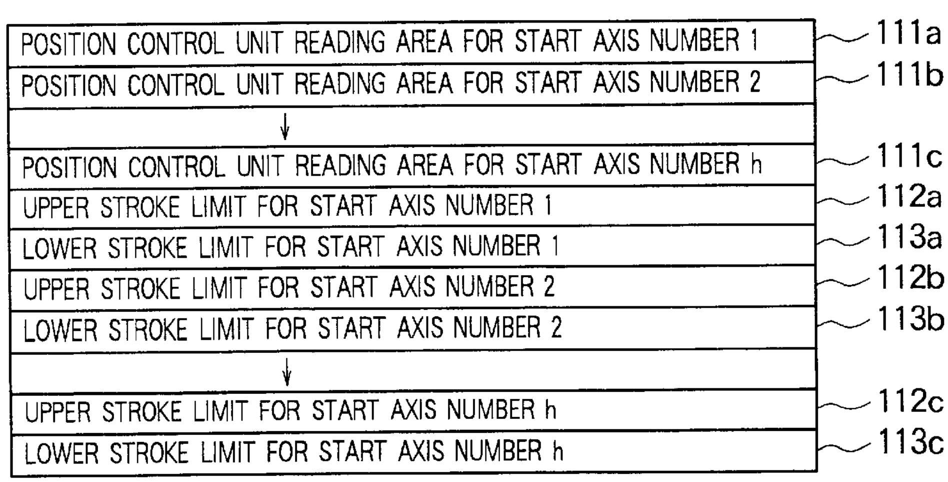
FIG. 4 is a diagram showing the structure of an axis parameter information storage area of a common information storage area of the location programming apparatus according to the first embodiment of the present invention.

FIG. 4 shows the axis-parameter-information storage area 100 included in the common-information storage area 70 and composed of position-control-unit reading areas 111*a*, 111*b* and 111*c* of the start-axis number, upper stroke limit storage areas 112*a*, 112*b* and 112*c* of the start axis number and lower stroke limit storage areas 113*a*, 113*b* and 113*c* of the start axis number.

Figure 5:
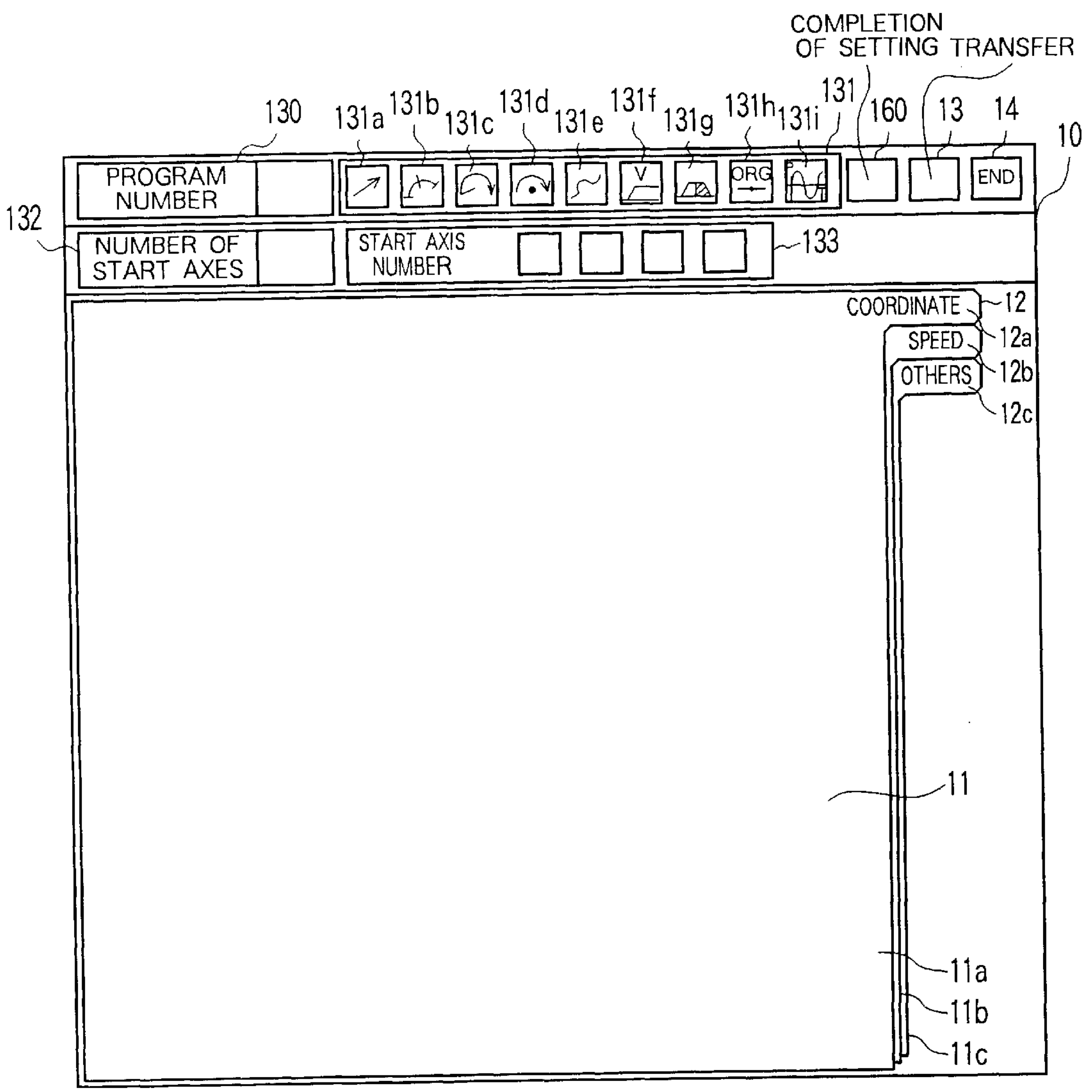
FIG. 5 is a diagram showing the structure of a graphic programming window of the location programming apparatus according to the first embodiment of the present invention.

FIG. 5 shows the structure of a programming window according to an example of graphic programming. Referring to FIG. 5, reference numeral 10 represents an area on which common information required during programming is always displayed and which is composed of a locating-program-number setting area 130 and a position-locating-control-type selection button 131 having a linear locating button 131*a*, a passing-point-instructed circular interpolation button 131*b*, a radius-instructed circular interpolation button 131*c*, a central-point-instructed circular interpolation button 131*d*, a locus control button 131*e*, a speed control button 131*f*, a speed/position switching control button 131*g*, an original-point returning button 131*h* and a high speed oscillation control button 131*i*. Moreover, there are provided an area 132 for setting the number of start axes, a start-axis-number setting area 133, a setting completion button 160 for defining setting of one program, a transfer button 13 for transferring, to a controller, a set program and parameters when all of items have been set to the program and a completion button 14 for ending the programming operation. Reference numeral 11 represents a graph making/display area on which a graph sheet, which must be set, is displayed which is selected from a coordinate graph sheet 11*a*, a speed graph sheet 11*b* and other-time-transition graph sheet 11*c* in accordance with the selected locating control type. If various graphs must be set, a graph index 12 indicating the coordinate graph 12*a*, the speed graph 12*b* and the other-time-transition graph 12*c* is selected so that the graph sheet is switched.

Figure 6:
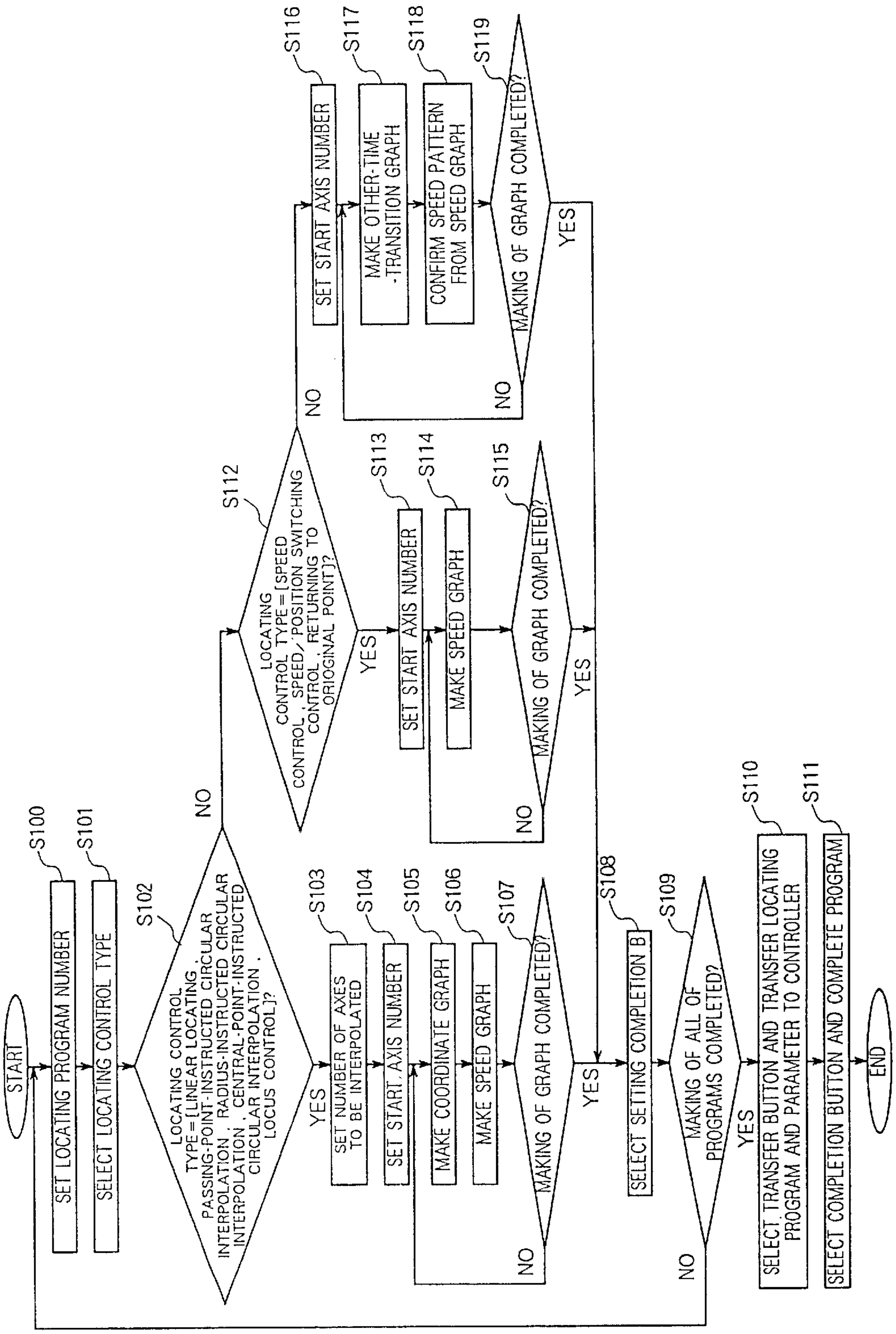
FIG. 6 is a flow chart showing the procedure of graphic programming in the location programming apparatus according to the first embodiment of the present invention.

A procedure for operating graphic programming will now be described with reference to a flow chart shown in FIG. 6. Initially, a locating program number which is set in the locating-program-number setting area 130 is set (step S100). Then, the position-locating-control-type selection button 131 is operated to select locating control type (step S101). If the locating control type is "linear locating 131*a*" or "passing-point-instructed circular interpolation 131*b*" or "radius-instructed circular interpolation 131*c*" or central-point-instructed circular interpolation 131*d*" or "locus control 131*e*" (step S102), the number of axes to be interpolated is set by using the area 132 for setting the number of start axes (step S103). Then, the start axis numbers corresponding to the number of the axes to be interpolated is set by using the start-axis-number setting area 133 (step S104). The control operation at the position is set by using the coordinate graph sheet 11*a* displayed on the graph making/display area 11 (step S105), and then the speed graph 12*b* of the graph index 12 is selected to display the speed graph sheet 11*a* with which the speed control operation is set (step S106). When the graph is changed, the coordinate graph 12*a* or the speed graph 12*b* of the graph index 12 is selected to change the graph. After the graph has been made (step S107), the operation proceeds to step S108.

If the locating control type is "speed control 131*f*" or "speed/position switching control 131*g*" or "returning to original point 131*h*" (step S112), the start axis number is set by using the start-axis-number setting area 133 because the number of axes to be started is fixed to one (step S113). Then, the speed graph sheet 11*b* displayed on the graph making/display area 11 is used to set the speed control operation and required information (step S114). After the graph has been made (step S115), the operation proceeds to step S108.

If the locating control type is "high speed oscillation control 131*i*" (that is, in another case), the start axis number is set by using the start-axis-number setting area 133 because the number of axes to be started is fixed to one (step S116). Then, the other-time-transition graph sheet 11*c* displayed on the graph making/display area 11 is used to set the control operation and required information (step S117). When the speed control operation is confirmed by using the speed graph, the speed graph 12*b* of the graph index 12 is selected so as to switch the graph sheet (step S118). When the graph is again changed, the other-time-transition graph 12*c* of the graph index 12 is selected so as to switch the graph sheet. After the graph has been made (step S119), the operation proceeds to step S108.

After the graph corresponding to the locating control type has been made, the setting completion button 160 is selected so as to define the locating operation of the instructed locating program number (step S108). When another locating program is produced, the operation returns to step S100. When all of the programs have been made (step S109), the transfer button 13 is selected. Then, the locating controller 1001 is operated to transfer the locating program and parameters (step S110). Then, the end button 14 is selected so that programming is ended (step S111).

Figure 7:
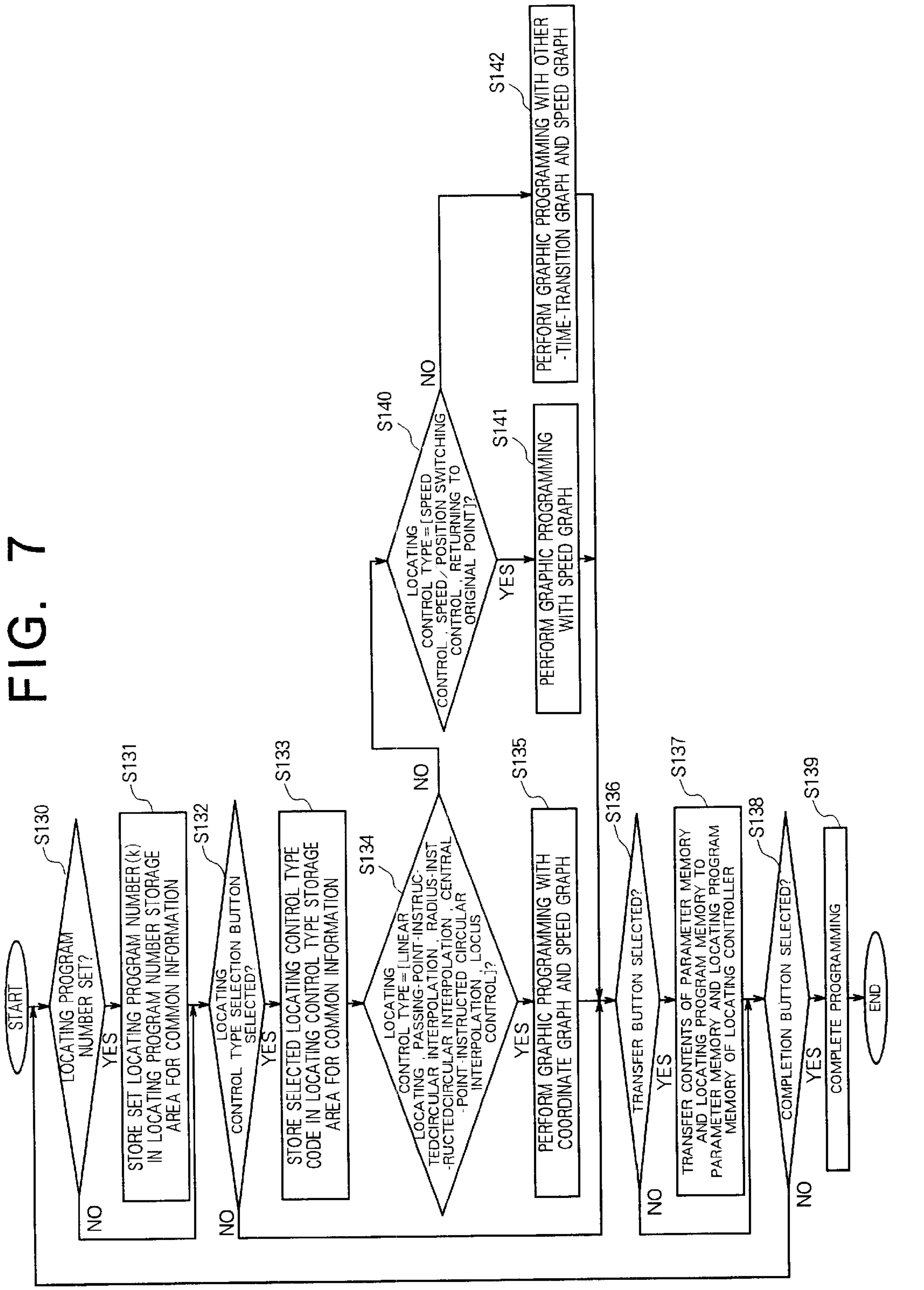
FIG. 7 is a flow chart showing the overall operation of graphic programming in the location programming apparatus according to the first embodiment of the present invention.

The overall operation of graphic programming will now be described with reference to a flow chart shown in FIG. 7. When locating program number has been set (step S130), the set locating program number (k) is stored on the area 80 of the common-information storage area 70 on which locating program number to be set is stored (step S131). When the position-locating-control-type selection button 131 is selected (step S132), the selected locating control type code is stored in the locating control type storage area 81 of the common-information storage area 70 (step S133). In accordance with the locating controller type, a graph which must be set is displayed. Note that steps S132 to S133 correspond to the control type setting means.

If the locating control type is "linear locating 131*a*" or "passing-point-instructed circular interpolation 131*b*" or "radius-instructed circular interpolation 131*c*" or central-point-instructed circular interpolation 131*d*" or "locus control 131*e*" (step S134), the coordinate graph sheet 11*a* and the speed graph sheet 11*b* are used to perform the graphic programming process (step S135). Then, the operation proceeds to step S136.

If the locating control type is "speed control 131*f*" or "speed/position switching control 131*g*" or "returning to original point 131*h*" (step S140), the speed graph sheet 11*b* is used to perform the graphic programming process (step S141). Then, the operation proceeds to step S136.

If the locating control type is "high speed oscillation control 131*i*" the other-time-transition graph sheet 11*c* and the speed graph sheet 11*b* are used to perform the graphic programming process (step S142). Then, the operation proceeds to step S136. Note that steps S134 and S135 and S140 to S141 and S142 correspond to the graphical data making means and drive control information making means.

When the transfer button 13 has been selected (step S136), the contents of the parameter memory 1016 and the locating-program memory 1018 stored by dint of the graphic programming process are transferred to the parameter memory 1008 and the locating-program memory 1009 of the locating controller 1001 through the communication interfaces 1019 and 1010 (step S137).

The operation returns to step S130 until the completion button 14 is selected. When the completion button 14 is selected (step S138), programming is ended (step S139).

Figure 8:
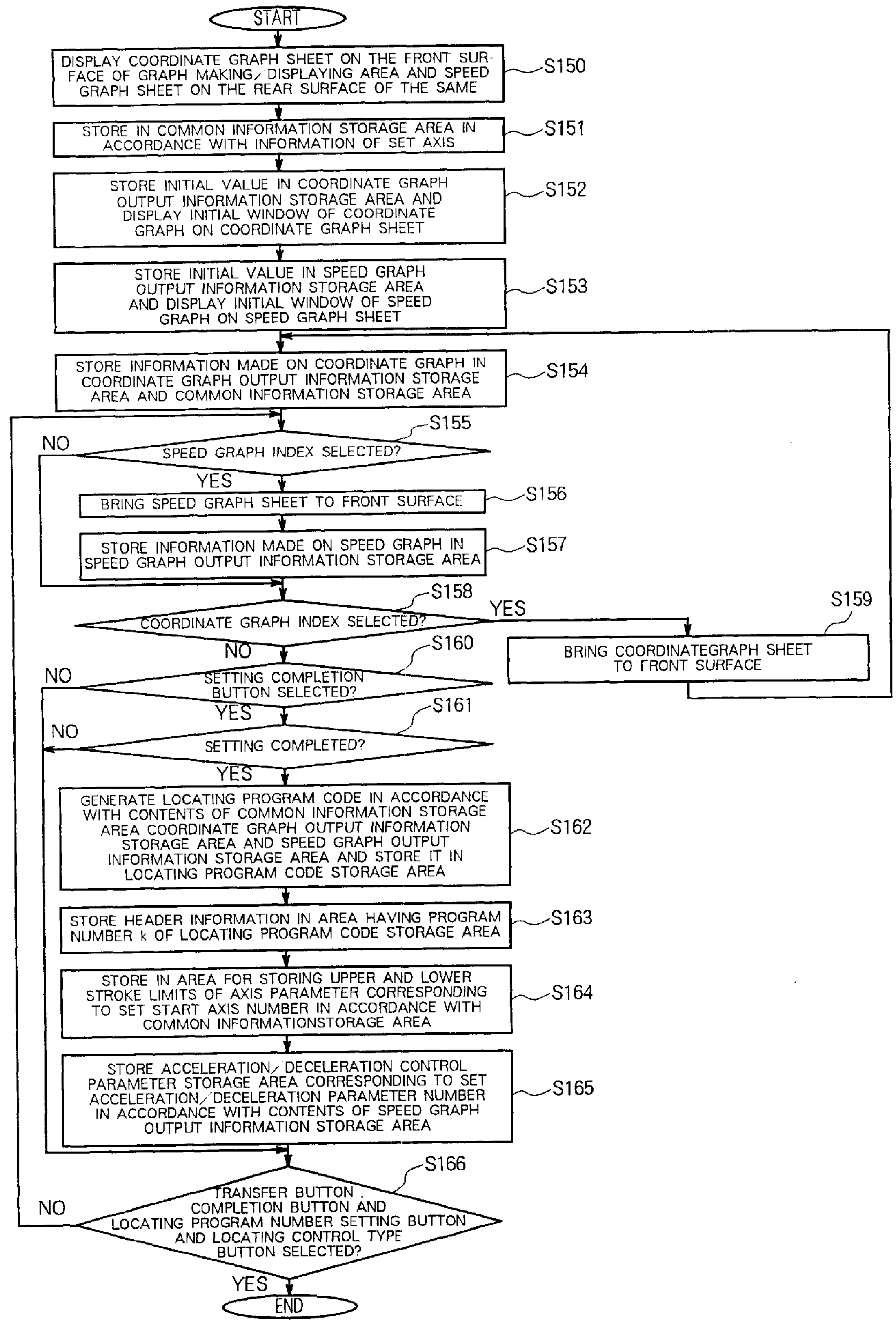
FIG. 8 is a flow chart schematically showing the operation which is performed when graphical programming is performed by using a coordinate graph and a speed graph in the location programming apparatus according to the first embodiment of the present invention.

The operation, which is performed when a graphic programming process using the coordinate graph and the speed graph is performed, will schematically be described with reference to a flow chart shown in FIG. 8. Initially, the coordinate graph sheet 11*a* is displayed on the front surface of the graph making/display area 11 and the speed graph sheet 11*b* is displayed on the rear surface of the same (step S150). The set number of start axes and the start axes numbers are stored in the start-axis-number storage area 82 and the start-axis-number storage area 83 of common-information storage area 70. In accordance with the start axis number, an initial value is stored in the axis-parameter-information storage area 100 (step S151). Moreover, an initial value is stored in the coordinate-graph-output-information storage area 71, and initial window of the coordinate graph is displayed on the coordinate graph sheet 11*a* (step S152). Moreover, an initial value is stored in the speed-graph-output-information storage area 72, and an initial window of the speed graph is displayed on the speed graph sheet 11*b* (step S153).

Information produced on the coordinate graph displayed on the front surface is stored in the coordinate-graph-output-information storage area 71 and the common-information storage area 70 (step S154). When the speed graph 12*b* is selected (step S155), the graph sheet which is displayed on the front surface is switched to the speed graph sheet 11*b* (step S156). Then, information of the speed parameter produced on the speed graph is stored in the speed-graph-output-information storage area 72 (step S157). When the coordinate graph index 12*a* is selected (step S158), a graph sheet which is displayed on the front surface is again switched to the coordinate graph sheet 11*a* (step S159). Then, the operation returns to step S154. Steps S154 and S157 form an example of graphical data making means.

When the setting completion button 160 has been selected (step S160), whether or not setting for the set locating control type has been completed is determined (step S161). If setting has normally been completed, a locating program code corresponding to the set locating control type shown in FIGS. 182 to 190 is generated in accordance with the contents of the common-information storage area 70, the coordinate-graph-output-information storage area 71 and the speed-graph-output-information storage area 72 so as to be stored in the locating-program-code storage area 74 (step S162). Then, header information and the locating program code are stored in the areas of the header-information storage area 2000 and the program-code storage area 2100 of the locating program memory 1018 corresponding to the program number k (step S163). Moreover, upper stroke limit and the like is stored in the upper stroke limit storage area 1705 and the lower stroke limit storage area 1706 of the axis-parameter storage area 1700 in accordance with the contents of the axis-parameter-information storage area 100 of the common-information storage area 70 (step S164). In accordance with the contents of the speed-graph-output-information storage area 72, acceleration/deceleration parameter is stored in the acceleration/deceleration control program storage area 1800 corresponding to the set acceleration/deceleration parameter number (step S165). Steps S163 to S165 form an example of the drive control information generating means.

The operation returns to step S155 until the transfer button 13 or the completion button 14 or the locating program number setting button 130 or the locating control type selection button 131 is selected. If a button is selected (step S166), the foregoing operation is completed and the operation proceeds to step S136 of the overall operation.

Figure 9:
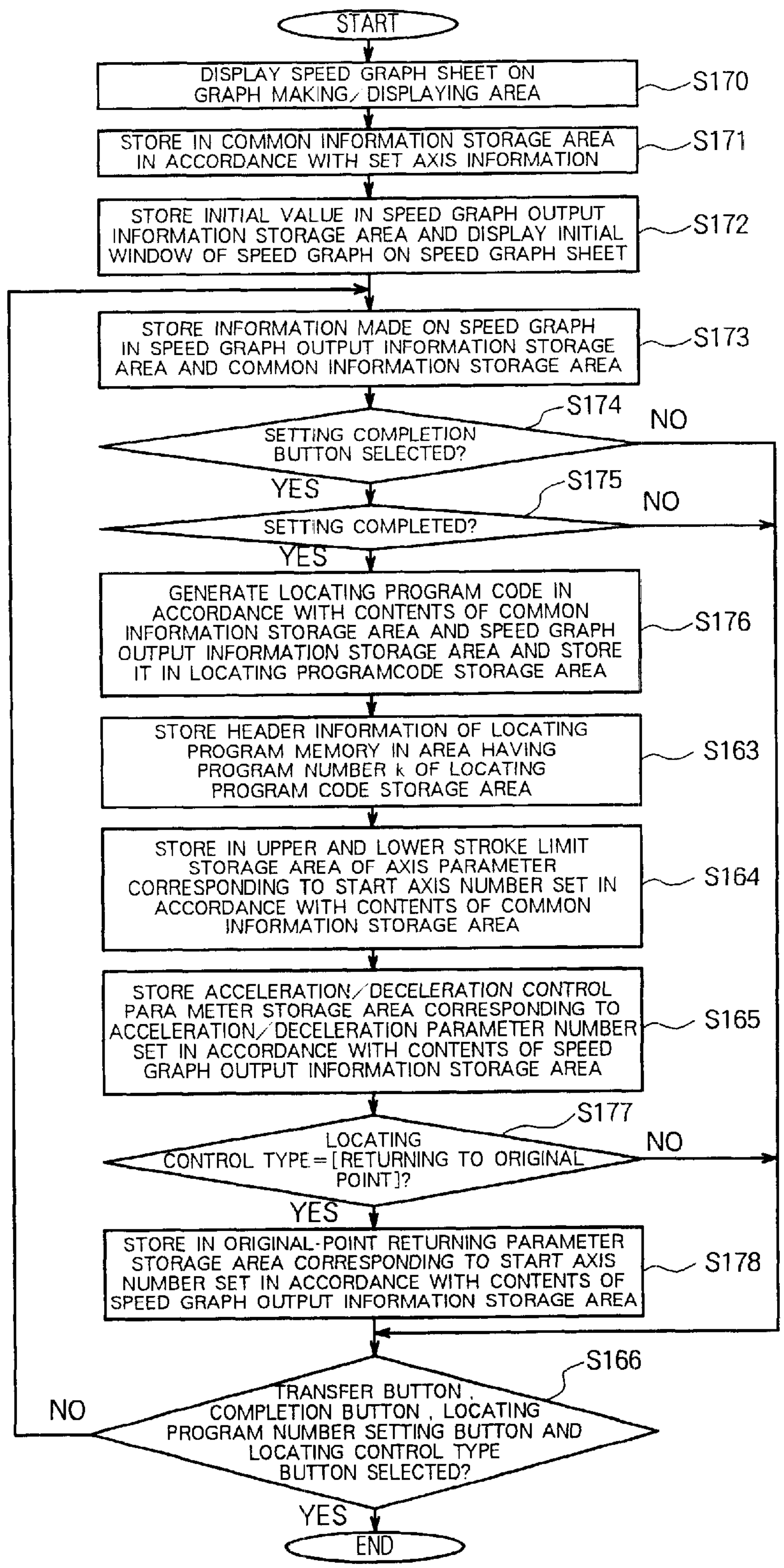
FIG. 9 is a flow chart schematically showing the operation which is performed when graphic programming is performed by using a speed graph in the location programming apparatus according to the first embodiment of the present invention.

The operation, which is performed when graphic programming is performed by using the speed graph, will schematically be described with reference to a flow chart shown in FIG. 9. Initially, the speed graph sheet 11*b* is displayed on the graph making/display area 11 (step S170). The set number of the start axes and the start axis number are stored in the area 82 on which the number of start axes is stored and the start-axis number storage area 83 of the common-information storage area 70. In accordance with the start axis number, an initial value is stored in the axis-parameter-information storage area 100 (step S171). Moreover, an initial value is stored in the speed-graph-output-information storage area 72, and then an initial window of the speed graph corresponding to the locating control type is displayed on the speed graph sheet 11*b* (step S172).

Information produced on the speed graph is stored in the speed-graph-output-information storage area 72 and the common-information storage area 70 (step S173).

When the setting completion button 160 is selected (step S174), whether or not setting for the set locating control type has been completed is determined (step S175). If setting has normally been completed, a locating program code corresponding to the set locating control type shown in FIGS. 191 to 193 is generated in accordance with the contents operation the common-information storage area 70 and the speed-graph-output-information storage area 72 so as to be stored in the locating-program-code storage area 74 (step S176). Then, storage in the areas of the header-information storage area 2000 and the locating-program-codes storage area 2100 of the locating-program memory 1018 corresponding to the locating program number k are performed (step S163). In accordance with the contents of the axis-parameter-information storage area 100 of the common-information storage area 70, storage in the upper stroke limit storage area 1705 and the lower stroke limit storage area 1706 of the axis parameter storage area 1700 corresponding to the set start axis number are performed in accordance with the contents of the axis-parameter-information storage area 100 of the common-information storage area 70 (step S164). Moreover, storage in the acceleration/deceleration control parameter storage area 1800 corresponding to the set acceleration/deceleration parameter number is performed in accordance with the speed-graph-output-information storage area 72 (step S165).

If the locating control type is "returning to original point 131*h*" (step S177), storage in the area 1900 on which a parameter for returning to the original point and which corresponds to the set start axis number is performed in accordance with the contents of the speed-graph-output-information storage area 72 (step S178).

The operation returns to step S173 until the transfer button 13 or the completion button 14 or the locating program number setting button 130 or the locating control type selection button 131 is selected. When any one of the buttons is selected (step S166), the foregoing operation is ended and the operation proceeds to step S136 of the overall operation.

Figure 10:
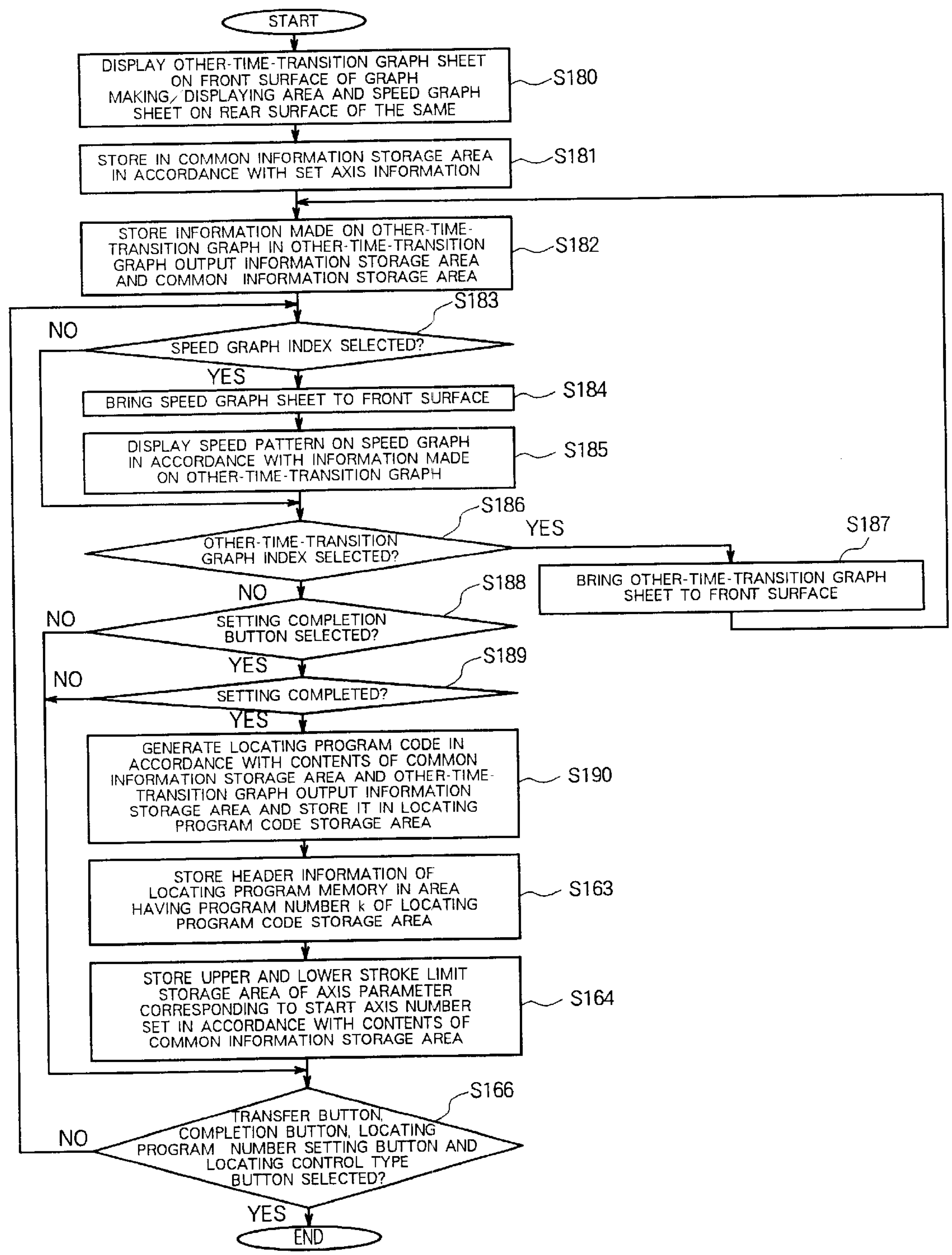
FIG. 10 is a flow chart schematically showing the operation which is performed when graphic programming is performed by using a other-time-transition graph and the speed graph in the location programming apparatus according to the first embodiment of the present invention.

The operation, which is performed when graphic programming using the other-time-transition graph and the speed graph will schematically be described with reference to a flow chart shown in FIG. 10. Initially, the other-time-transition graph sheet 11*c* is displayed on the front surface of the graph making/display area 11 and the speed graph sheet 11*b* is displayed on the rear surface of the same (step S180). The set number of start axes and the start axis number are stored in the area 82 on which the number of start axes is stored in the start-axis-number storage area 83. Then, an initial value is stored in the axis-parameter-information storage area 100 in accordance with the start axis number (step S181).

Information produced on the other-time-transition graph displayed on the front surface is stored in the other-time-transition-graph-output-information storage area 72 and the common-information storage area 70 (step S182). When the speed graph 12*b* is selected (step S183), the graph sheet which is displayed on the front surface is switched to speed graph sheet 11*b* (step S184). In accordance with information produced on the other-time-transition graph, the speed pattern is displayed on the speed graph sheet 11*b* (step S185). When the other-time-transition graph 12*c* is selected (step S186), the graph sheet which is displayed on the front surface is again switched to the other-time-transition graph sheet 11*c* (step S187). Then, the operation returns to step S182.

When the setting completion button 160 is selected (step S188), whether or not setting for the set locating control type has been completed is determined (step S189). If setting has normally been completed, a locating program code corresponding to the set locating control type shown in FIG. 194 is generated in accordance with the contents of the common-information storage area 70 and the other-time-transition-graph storage area 73 so as to be stored in the locating-program-code storage area 74 (step S190). Then, storage in the areas of the header-information storage area 2000 and the locating-program-code storage area 2100 of the locating program memory 1018 corresponding to the locating program number k is performed (step S163). In accordance with the contents of the axis-parameter-information storage area 100 of the common-information storage area 70, storage in the upper stroke limit storage area 1705 and the lower stroke limit storage area 1706 of the axis-parameter storage area 1700 corresponding to the set start axis number is performed (step S164).

The operation returns to step S183 until the transfer button 13 or the completion button 14 or the locating-program-number setting button 130 or the locating-control-type button 131 is selected. When any one of the buttons is selected (step S166), the foregoing operation is ended and the operation proceeds to step S136 of the overall operation.

The location programming apparatus 1 enables items required for the locating controller 1001 to perform control corresponding to the locating control type to be set while the control operation pattern is graphically displayed. As a result, a necessity of making a list-form locating program can be eliminated The location programming apparatus according to the present invention is able to automatically generate a locating program and a location control parameter only by graphically setting the locating locus operation, the speed pattern and the time transition control.

Moreover, the control operation can visually and easily be identified for any one and time required to complete the initial programming process can significantly be shortened.

Since calculations are not required when the operation is changed, the changing operation can quickly be completed.

Moreover, the relationship among the set items in the control operation corresponding to the locating control type and the parameter and locating program can easily be understood.

2. Locating Programming Using Coordinate Graph

Figure 11:
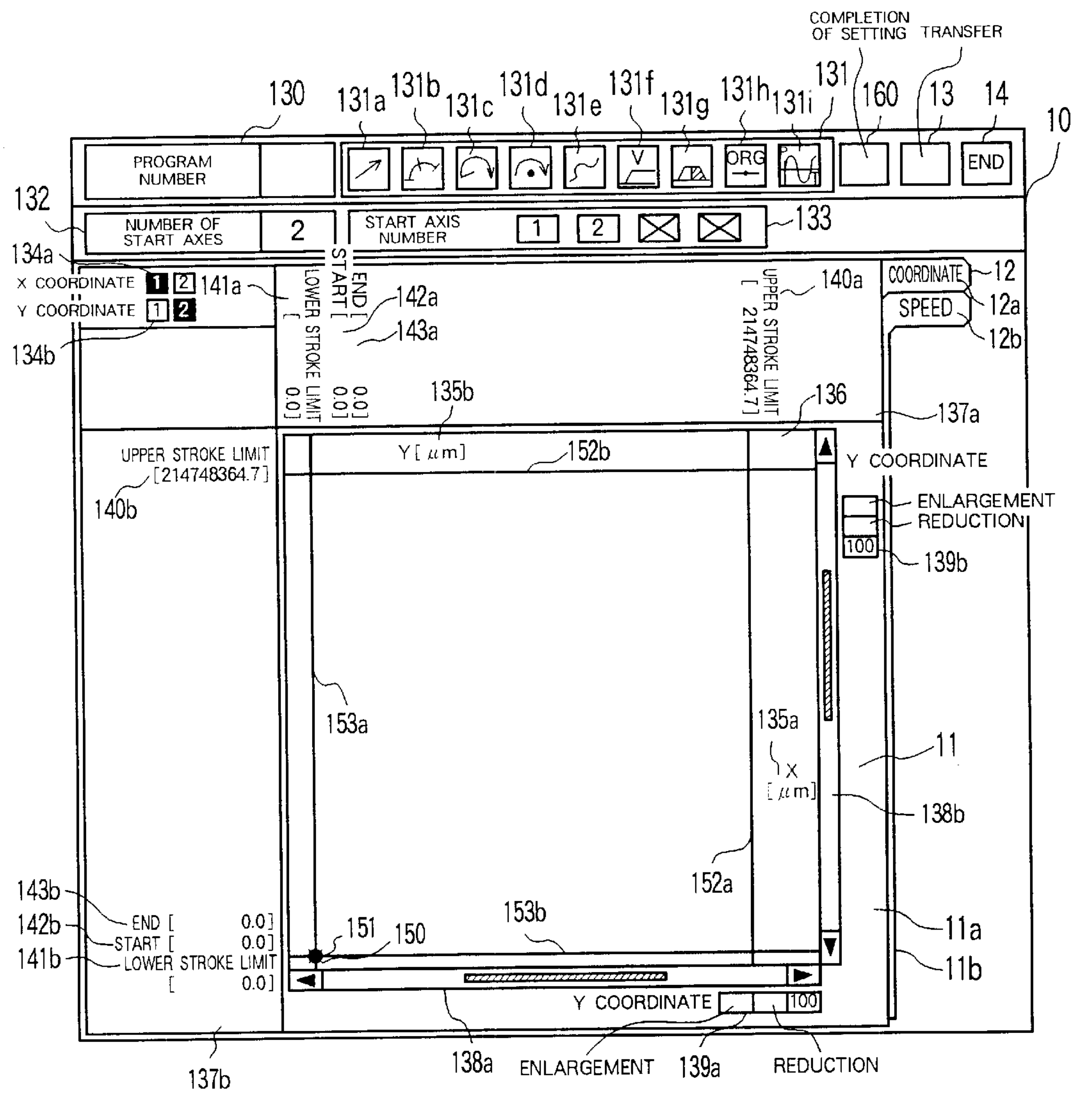
FIG. 11 is a diagram showing an example of an initial window for locating programming by using the coordinate graph in the location programming apparatus according to the first embodiment of the present invention.

The operation for performing a locating programming process by using a coordinate graph will now be described with reference to FIGS. 11 to 16. FIG. 11 shows an example of a locating programming window using a coordinate graph. FIG. 11 shows an initial display window of the coordinate graph. Referring to FIG. 11, contents of a locating-program-number setting area 130 and a location-control-type selection button 131 which have been determined previously are displayed. Reference numeral 132 represents an area for setting the number of start axes, 133 represents a start-axis-number setting area, 134*a* and 134*b* represent axis number selection buttons for the X- and Y-coordinates, 135*a* and 135*b* represent position-controlunit display area of the axis numbers set on the X- and Y-coordinates. Reference numeral 136 represents a coordinate-graph making/display area, 150 represents a location start point, 151 represents a location end point, 152*a* and 153*a* represent upper and lower stroke limits of the X-coordinate axis numbers and 152*b* and 153*b* represent upper and lower stroke limit lines. Reference numerals 137*a* and 137*b* represent X- and Y-coordinate set-information-values display areas for displaying upper and lower limit liens of the axes set by the coordinate-graph making/display area 136 and positions indicated by the points at 140*a*, 140*b*, 141*a*, 141*b*, 142*a*, 142*b*, 143*a* and 143*b* with figures. Reference numerals 138*a* and 138*b* represent X- and Y-coordinate scroll bars for moving the graph display ranges. Reference numerals 139*a* and 139*b* represent X- and Y-coordinate scale buttons for adjusting enlargement, contraction and standard display of the graph scale.

Figure 12:
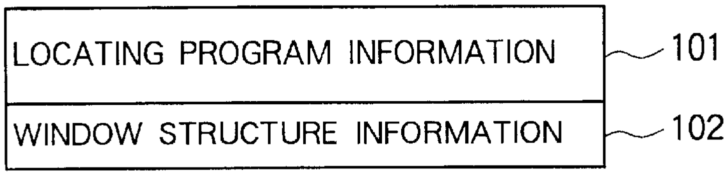
FIG. 12 is a diagram showing the structure of a coordinate graph output information storage area of the graphic programming work memory of the location programming apparatus according to the first embodiment of the present invention.

FIG. 12 shows the coordinate-graph-output-information storage area 71 of the graphic programming work memory 4, the coordinate-graph-output-information storage area 71 being composed of the locating-program-information storage area 101 and the window-structure-information storage area 102.

Figure 13:
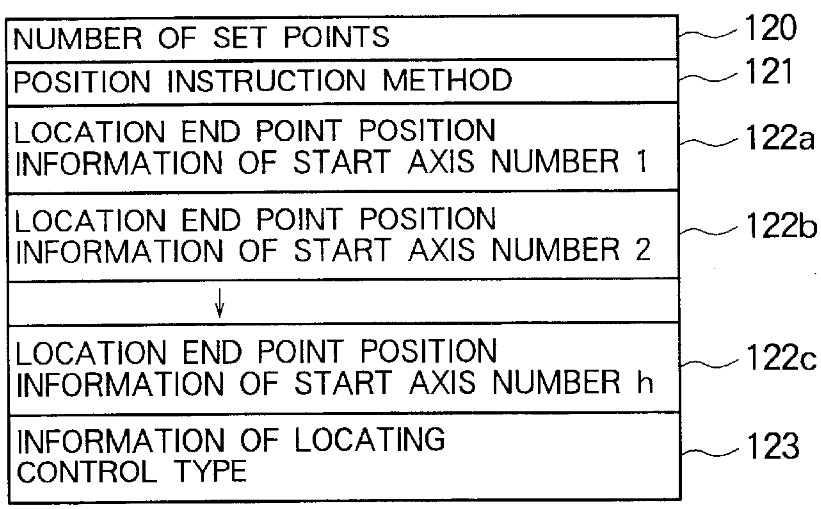
FIG. 13 is a diagram showing the structure of a locating program information storage area of coordinate graph output information of the location programming apparatus according to the first embodiment of the present invention.

FIG. 13 shows the locating-program-information storage area 101 of the coordinate-graph-output-information storage area 71 in the case where the locating control type is linear locating, passing-point-instructed circular interpolation, radius-instructed circular interpolation or central-point-instructed circular interpolation. The locating-program-information storage area 101 is composed of an area 120 for storing the number of set points, a position-location-method storage area 121, a position-location-method storage area 121, location-end-point-position information storage area 122*a*, 122*b* and 122*c* and a location-control-type corresponding information storage area 123.

Figure 14:
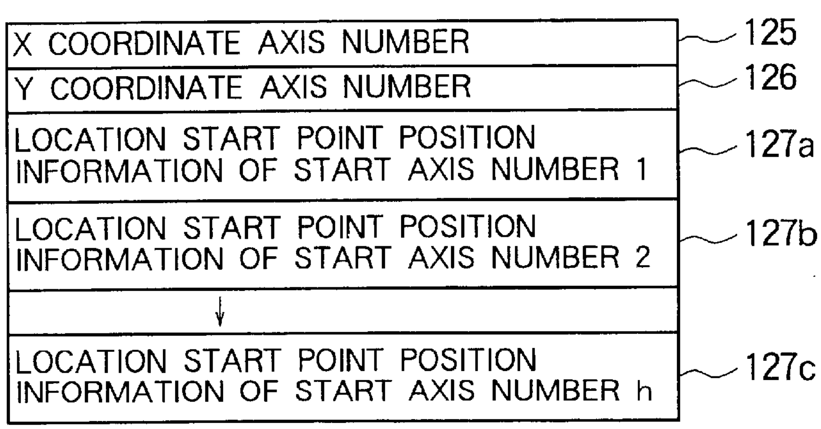
FIG. 14 is a detailed view showing a window structure information storage area of coordinate graph output information of the location programming apparatus according to the first embodiment of the present invention.

FIG. 14 shows the window-structure-information storage area 102 of the coordinate-graph-output-information storage area 71, that being composed of an X-coordinate-axis-number storage area 125, a Y-coordinate-axis-number storage area 126 and locating-start-point-position-information storage areas 127*a*, 127*b* and 127*c* of the start axis numbers.

Figure 15:
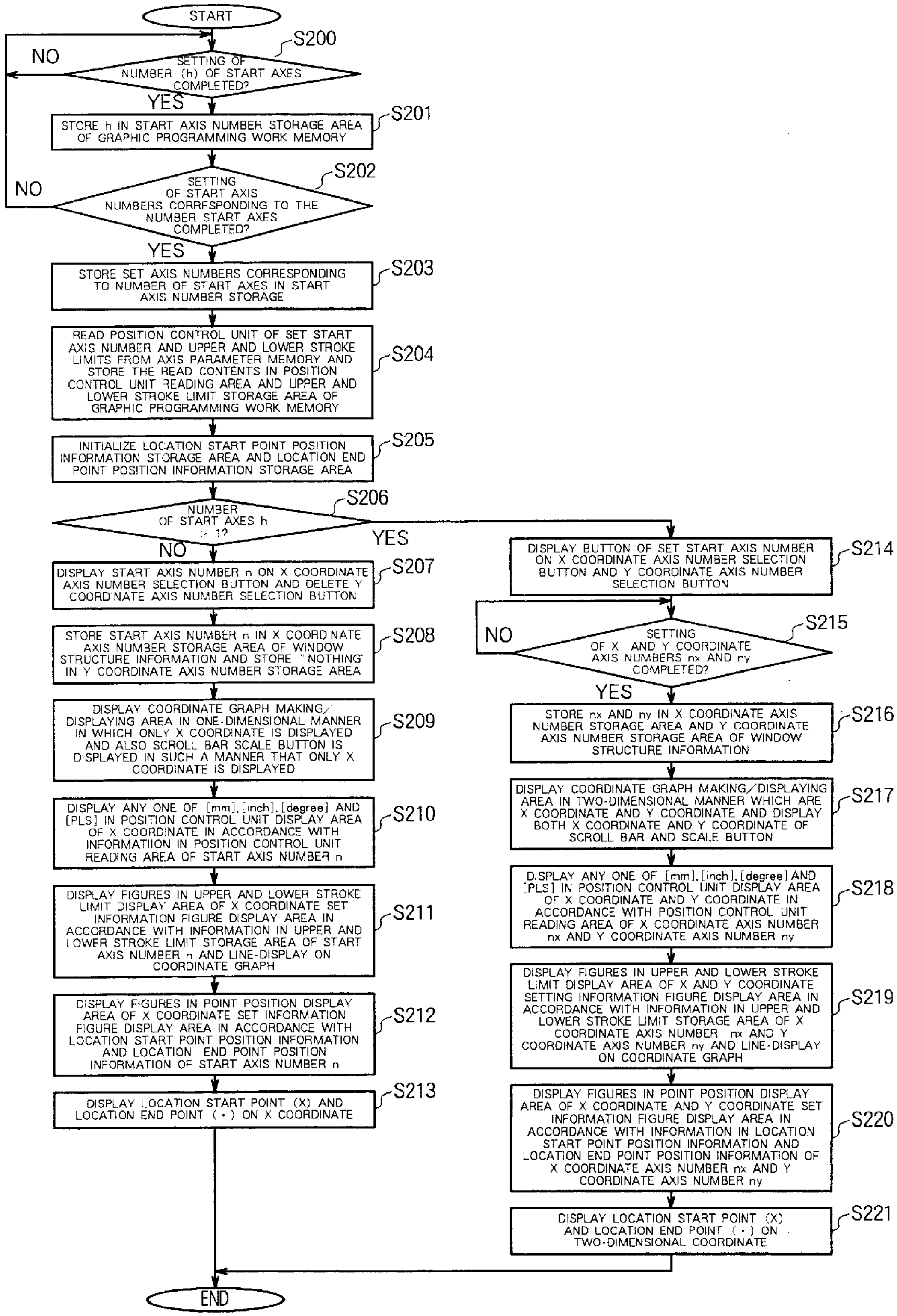
FIG. 15 is a flow chart showing a setting operation and the operation which are performed until an initial window for the locating programming by using the coordinate graph is displayed in the location programming apparatus according to the first embodiment of the present invention.

The setting manipulation and operation which are performed to display an initial window in a state shown in FIG. 11 will now be described with reference to a flow chart shown in FIG. 15. When any one of the linear location 131*a*, passing-point-instructed circular interpolation 131*b*, radius-instructed circular interpolation 131*c*, the central-point-instructed circular interpolation 131*d* or the locus control 131*e* has been selected by the location-control-type selection button 131, the area 120 for storing the number of set points of the graphic programming work memory 4 is initialized to "1" so that a coordinate graph window is displayed. When the number h of start axes is set by using the area 132 for setting the number of start axes (step S200), h is stored in the area 82 on which the number of start axes is stored of the graphic programming work memory 4 (step S201). Thus, the start axis numbers corresponding to the number of the start axes number of start axes are set by using the start-axis-number setting area 133 (step S202). Therefore, the set axis numbers are stored in the start-axis-number storage area 83 of the graphic programming work memory 4 (step S203). Then, the position control units and upper and lower stroke limits of the set start axis numbers are read from the axis-parameter memory 1700 so as to be stored in the position-control-unit reading area 111 for the start axis numbers and upper and lower-stroke-limit storage areas 112 and 113 of the start axis numbers of the graphic programming work memory 4 by the number corresponding to the number of the start axes (step S204). Then, the locating-start-point-position-information storage area 127 and the locating-end-point-position-information storage area 122 of the start axis numbers are initialized (step S205).

Then, display on the window is performed in accordance with information above. When the number h of the start axes is one, the operation proceeds to step S207 in which one-dimensional graph display on only the X-coordinate is performed. When the number h of the start axes is two or more, the operation proceeds to step S214 in which two-dimensional graph display on the X- and Y-coordinates is performed (step S206).

When one-dimensional graph is used, a button of the start axis number n is displayed on the X-coordinate-axis-number selection button 134*a*. The Y-coordinate-axis-number selection button 134*b* is deleted (step S207). The start axis number n set in step S202 is stored in the X-coordinate-axis-number storage area 125 of the window-structure-information storage area 102. "None" is stored in the Y-coordinate-axis-number storage area 126 (step S208). Display of the coordinate-graph making/display area 136 is performed by the one dimensional manner in which only the X coordinate is displayed. Also only X coordinates of a scroll bar 138 and a scale button 139 are displayed (step S209).

In accordance with information in the position-control-unit reading area 111*a* of the start axis number n, any one of [um], [inch], [degree] and [PLS] is displayed on the position-control-unit display area 135*a* of the of the X coordinate (step S210). In accordance with information in the upper- and lower-stroke-limits storage area of the start axis number n 112*a* and 113*a*, figures are displayed on the upper- and lower-stroke-limit display areas 140*a* and 141*a* of the X-coordinate-setting-information value display area 137*a*. Moreover, line display 152*a* and 153*a* on the coordinate graph is performed (step S211). In accordance with locating-start-point position information 127*a* and locating-end-point-position-information storage area 122 of the start axis number n, figures are displayed on the point-position display areas 142*a* and 143*a* of the X-coordinate-setting-information value display area 137*a* (step S212) in such a manner that location start point (×) 150 and location end point (•) 151 are displayed on the X coordinate (step S213). Thus, display of the initial window of the one dimensional graph is completed.

When a two-dimensional graph is displayed, each of buttons of the start axis numbers set to the X-coordinate-axis-number selection button 134*a* and the Y-coordinate-axis-number selection button 134*b* is displayed (step S214). When axis numbers nx and ny of the X- and Y-coordinates are selected by the above-mentioned buttons (step S215), nx and ny are stored in the X-coordinate-axis-number storage area 125 and the Y-coordinate-axis-number storage area 126 of the window-structure-information storage area 102 (step S216). The coordinate-graph making/display area 136 is displayed two-dimensionally on the X- and Y-coordinates. Also the scroll bar 138 and the scale button 139 are displayed on both X- and Y-coordinates (step S217).

In accordance with the position control unit 111, the upper stroke limit 112, the lower stroke limit 113, the locating-start-point-position information 127 and location-end-point-position information 122 of the X coordinate axis number nx and Y coordinate axis number ny, display at 135*a*, 140*a*, 141*a*, 152*a*, 153*a*, 142*a* and 143*a* on the X coordinate and 135*b*, 140*b*, 141*b*, 152*b*, 153*b*, 142*b* and 143*b* on the Y coordinate is performed (steps S218, S219 and S220). The location start point (×) 150 and location end point (•) 151 are displayed on the two-dimensional coordinates (step S221). Thus, display of the initial window of the two-dimensional graph is ended.

When the number h of the start axes is three or more, an arbitrary combination of the X coordinate number and the Y coordinate number can be selected. When the X coordinate number or the Y coordinate number is changed, the process in step S216 and ensuing steps shown in FIG. 15 are performed. Thus, display of the coordinate graph is switched.

Figure 16:
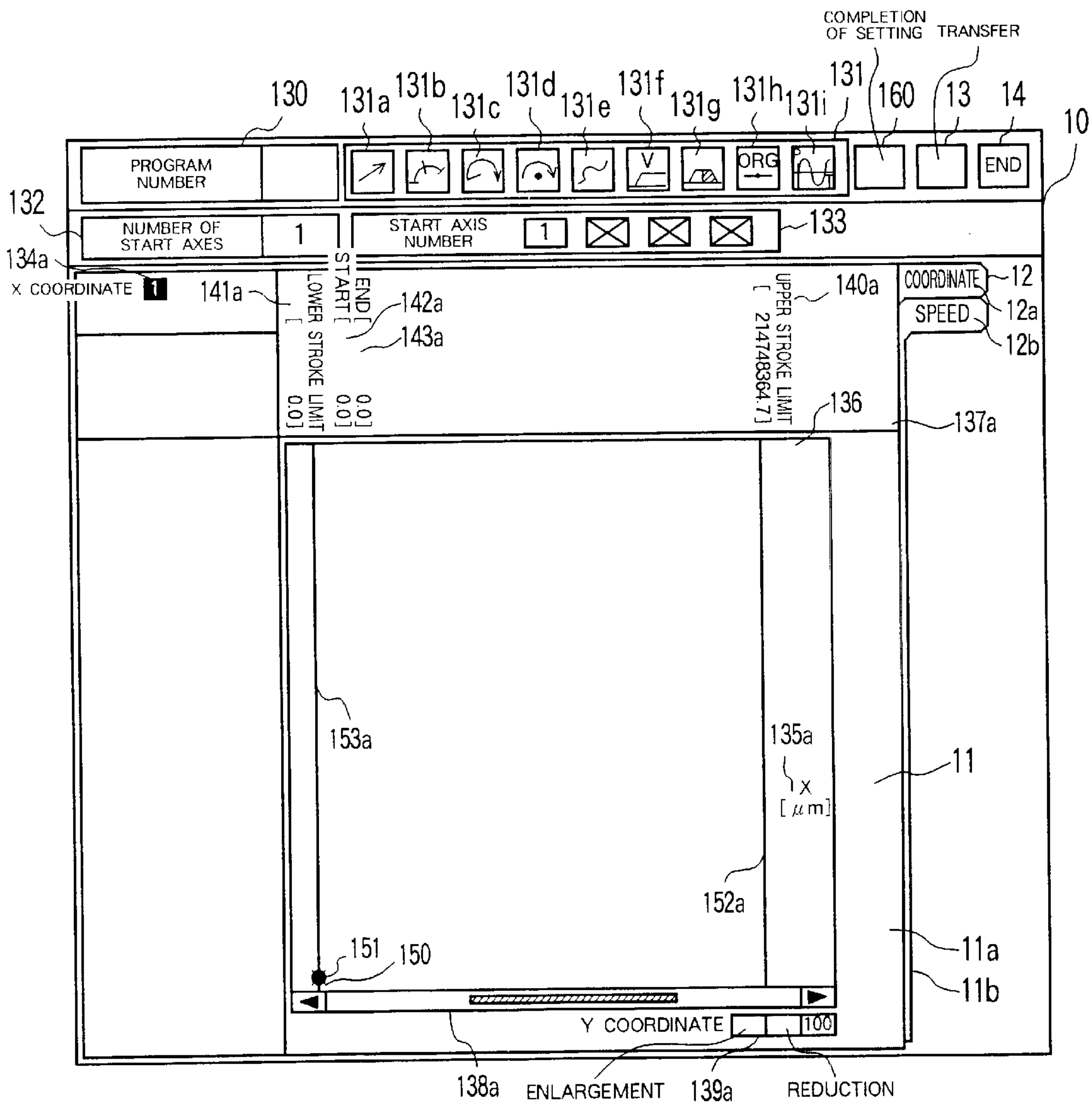
FIG. 16 is a diagram showing an example of an initial window for locating programming by using the coordinate graph when one axis is linear-controlled by the location programming apparatus according to the first embodiment of the present invention.

FIG. 11 shows an initial window of the coordinate graph which is displayed when, for example, linear control of two axes has been set. FIG. 16 shows an initial window of a coordinate graph which is displayed when linear control of one axis has been set.

Start axis number 82 and start axis number 83 stored, in steps S201 and S202, in the graphic programming work memory 4 are outputted as number 2103 of axes to be interpolated and number 2104 of axes to be interpolated of the locating program code common portion when the setting completion button 160 has been selected.

The above-mentioned location programming apparatus is structured in such a manner that the operation permissible range of an axis is previously displayed on a graph when a required position is set. When a plurality of axes are interpolation-controlled, the operation at a position with respect to a certain axis can be set. Therefore, the relationship among the axes can easily be understood.

The location programming apparatus according to the present invention is able to generate a locating program by simply setting a locus on a coordinate graph.

Moreover, a locus operation of other axes with respect to a reference axis can be set when a plurality of axes are interpolation-controlled. Thus, the locus operation can easily be recognized.

3. Locating Program for Linear Control by Using Coordinate Graph

Figure 17:
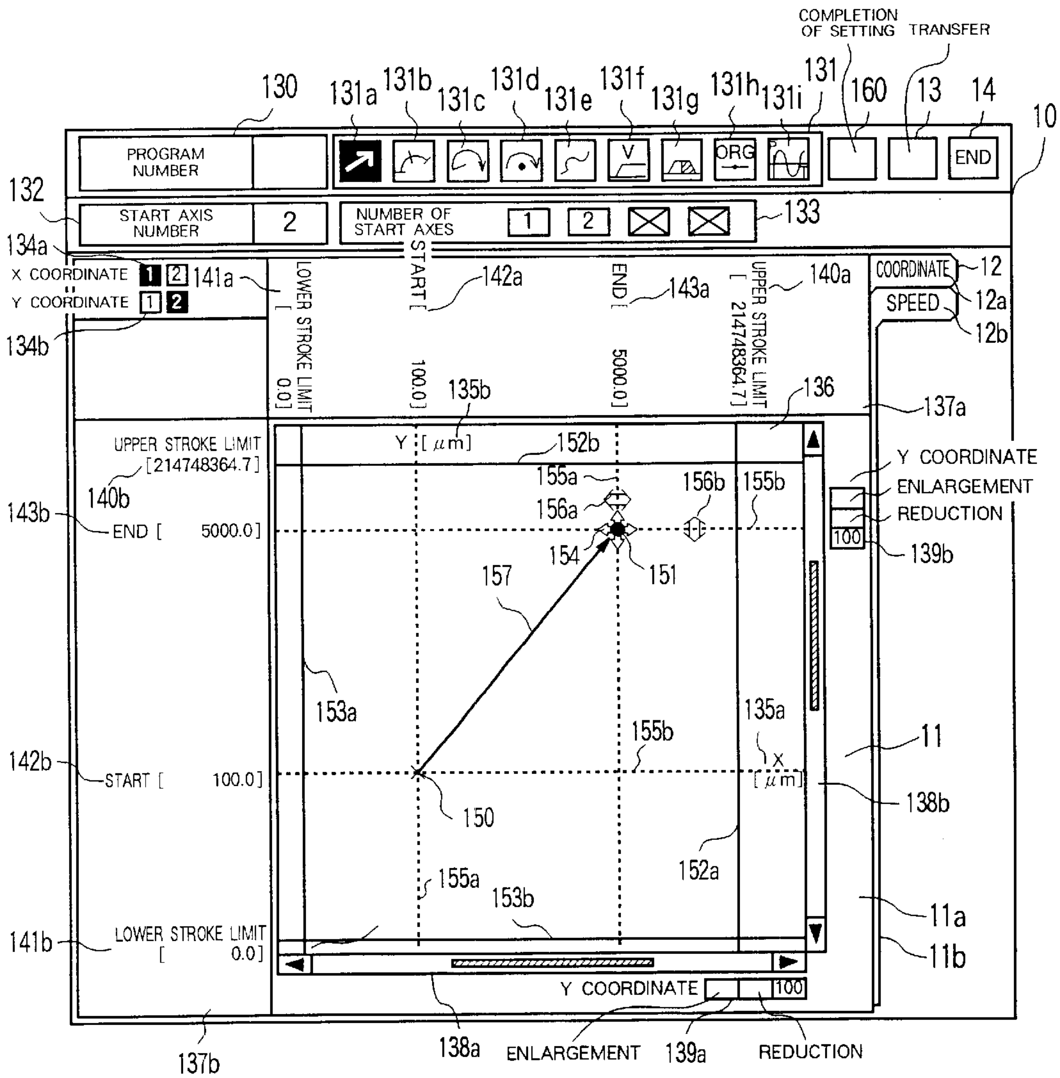
FIG. 17 is a diagram showing an example of a locating programming window by using a coordinate graph in a case where linear control of two axes is set in the location programming apparatus according to the first embodiment of the present invention.
Figure 18:
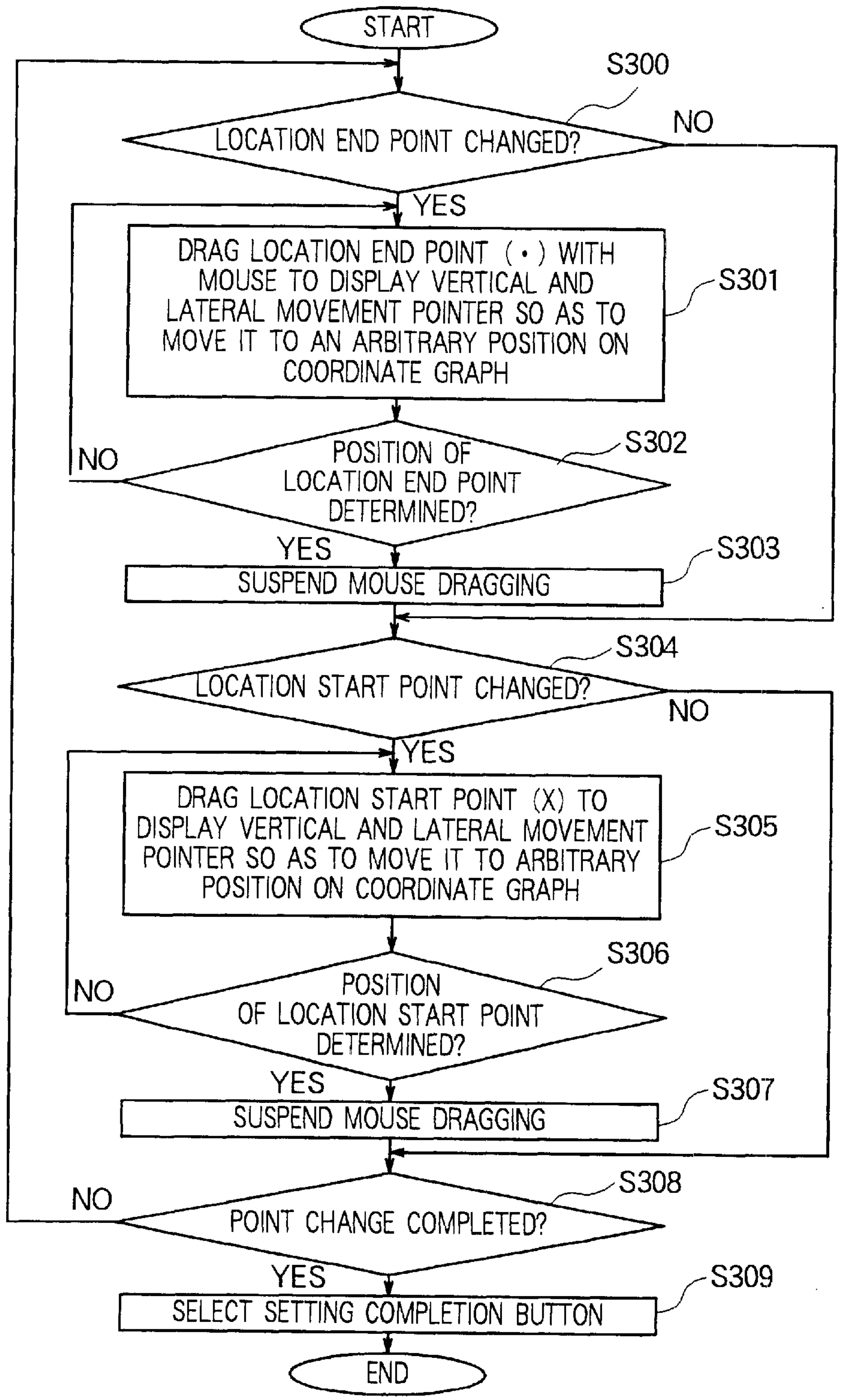
FIG. 18 is a flow chart showing an operation for setting locating programming by using a coordinate graph in a case where liner control is set in the location programming apparatus according to the first embodiment of the present invention.

The operation for performing locating programming for linear control by using a coordinate graph will now be described with reference to from FIGS. 17 to 19. FIG. 17 shows an example of a window which is displayed when linear control of two axes is performed. Reference numeral 154 represents a pointer for arbitrarily moving a pointer. When the mouse cursor is moved to a required point, the cursor is formed into an arrow cursor facing up, down, right and left as illustrated. When a dragging operation is performed, the cursor is able to freely move in the coordinate-graph making/display area 136. The point at which the mouse has been released is a decided point. Reference numeral 155*a* represents a cursor bar for moving the point in the direction of the X coordinate and reference numeral 155*b* represents a cursor bar for moving the point in the direction of the Y coordinate. The cursor bars are always displayed for the set point. When the mouse cursor is moved onto the cursor bar, arrow cursors 156*a* and 156*b* permitted to be moved in the directions as illustrated are displayed. When a dragging operation is performed, the point is moved together with the cursor bar. The point at which the mouse dragging has been suspended is the decided position. Reference numeral 157 represents a locus from a location start point 150 to a location end point 151 when linear locating is performed.

The operation which is performed when the point is changed will now be described with reference to a flow chart shown in FIG. 18. The location start point 150 and the location end point 151 are located at the initial positions in the coordinate-graph making/display area 136 because of the initial window display. When the locating end point is changed (step S300), the present location end point (•) is dragged with the mouse to display the movable pointer 154 which is moved to an arbitrary position on the coordinate graph (step S301). When the location end point is determined (step S302), mouse dragging is suspended (step S303). Then, the operation proceeds to step S304. When the location end point is not changed in step S300, the operation proceeds to step S304. When the location start point is changed (step S304), the present location start point (×) is dragged by the mouse so that the movable pointer 154 is displayed and moved to an arbitrary position on the coordinate graph (step S305). After the location start point has been determined (step S306), mouse dragging is suspended (step S307). Then, the operation proceeds to step S308. When the location start point is not changed in step S304, the operation proceeds to step S308. When the point is changed, the operation returns to step S300. When change has been completed (step S308), the setting completion button 160 is selected (step S309). Thus, the operation is ended.

The operation which is performed when the point is changed will now be described with reference to a flow chart shown in FIG. 19. When the location end point 151 is being dragged with the mouse (step S320), the location end point (•) is moved to follow the movable pointer 154. Moreover, also the locus 157 for the linear location and the cursor bars 155*a* and 155*b* are changed (step S321). Position information of the X-coordinate axis number nx and that of Y-coordinate axis number ny corresponding to the point (•) on the coordinate graph are calculated so as to be stored in the locating-end-point-position-information storage area 122 of the start axis numbers nx and ny (step S322). Thus, the display of the end-point-position display areas 143*a* and 143*b* of the areas 137*a* and 137*b* in which the number of set information on X- and Y-coordinates are stored is updated (step S323). The processes in steps S321 to S323 are performed until mouse dragging is suspended. When the mouse dragging is suspended, the operation proceeds to step S325 (step S324). If the location end point 151 is not being dragged with the mouse in step S320, the operation proceeds to step S325.

When the location start point 150 is being dragged with the mouse (step S325), the location start point (×) is moved to follow the movable pointer 154. Moreover, the locus 157 and the cursor bars 155*a* and 155*b* are changed (step S326). Position information of X-coordinate axis number nx and that of Y-coordinate axis number ny corresponding to the point (×) on the coordinate graph are calculated so as to be stored in the locating-start-point-position-information storage area 127 of the start axis numbers nx and ny (step S327). Thus, display on the start-point-position display areas 142*a* and 142*b* of the areas 137*a* and 137*b* in which the number of set information on X- and Y-coordinates are stored is updated (step S328). The processes in steps S326 to S328 are performed until mouse dragging is suspended. When mouse dragging is suspended, the operation proceeds to step S330 (step S329). If the location start point 150 is not being dragged with the mouse in step S325, the operation proceeds to step S330.

When the locating control type is linear location 131*a*, no data is stored in the location-control-type corresponding information storage area 123 of the graphic programming work memory 4.

The operation returns to step S320 until the setting completion button 160 is selected. When the setting completion button 160 is selected (step S330), location-end-point-position information 122 of the start axis number of coordinate graph output information is outputted as required-position data 2201 of the start axis number of the linear control locating program code. Then, the operation is ended (step S331).

The linear control of two axes is performed as described above. When three axes are linear-controlled, two pages of two-dimensional graphs are made by combining the start axis numbers of the X coordinate and Y coordinate. When, for example, first, second and third axes are linear-controlled, two pages are made which include a two-dimensional graph of the first and second axes and that of the first and third axes.

When four axes are linear-interpolated, two or three pages are made to complete the setting operation. When, for example, first, second, third and fourth axes are linear-interpolated, two pages are made which include a two-dimensional graph of the first and second axes and that of the third and fourth axes. As an alternative to this, three pages are made which include a two-dimensional graph of the first and second axes, that of the first and third axes and that of the first and fourth axes.

The above-mentioned location programming apparatus enables required position data to easily be set and changed. Also change of the locus operation caused from the change can simultaneously be confirmed.

The above-mentioned location programming apparatus enables a locating program for the linear control to easily be set and changed by using a locus graph.

Figure 20:
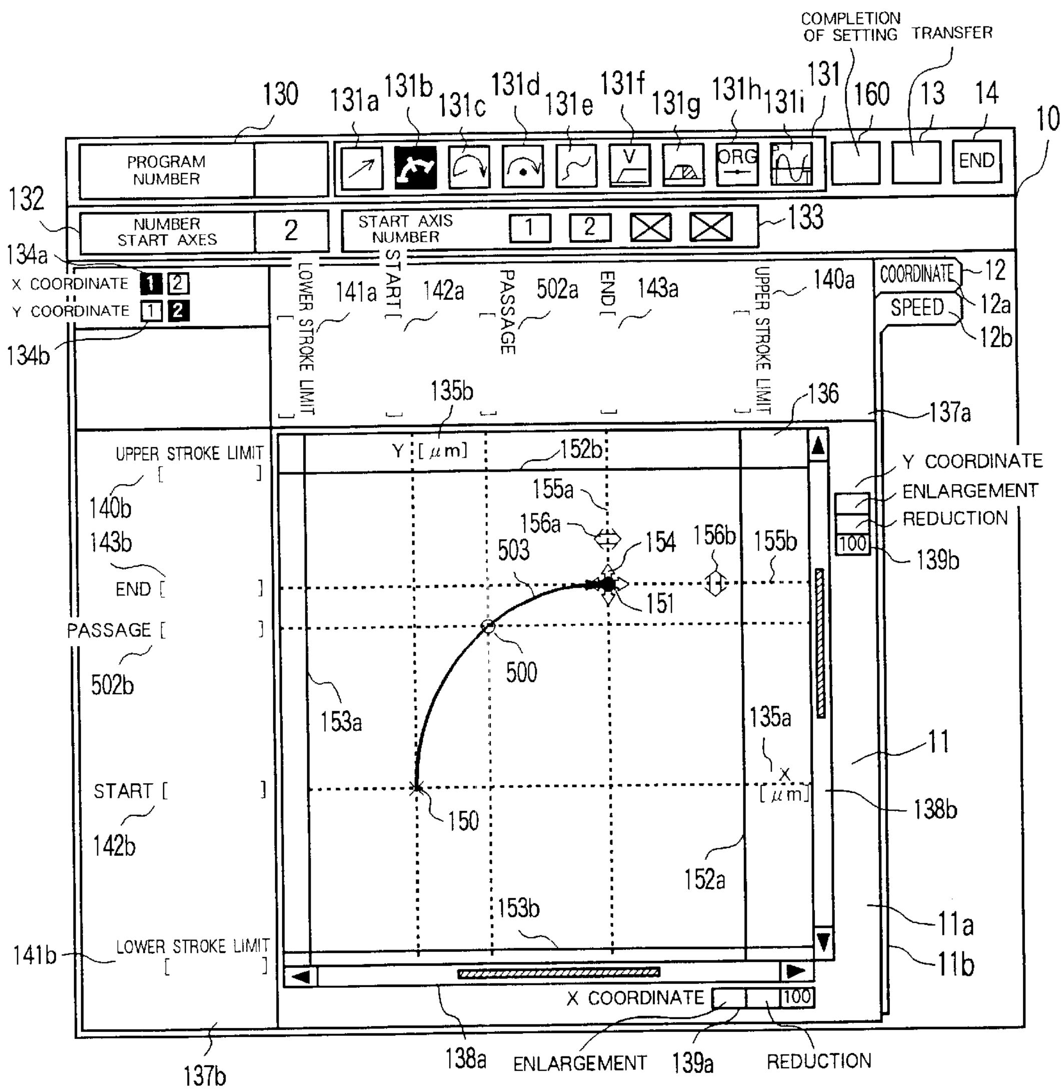
FIG. 20 is a diagram showing an example of a locating programming window by using the coordinate graph in a case where passing-point-instructed circular interpolation control is set in the location programming apparatus according to the first embodiment of the present invention.

4. Locating programming for Passing-Point-Instructed Circular Interpolation Using Coordinate Graph The operation for performing locating programming for the passing-point-instructed circular interpolation by using a coordinate graph will now be described with reference to FIGS. 20 to 23. FIG. 20 shows an example of a window which is displayed when the passing-point-instructed circular interpolation is performed. Reference numeral 500 represents a circular-interpolation passing point which is one instructed passing point during the circular interpolation. When a dragging operation with the mouse is performed, the movable pointer 154 is displayed on the circular-interpolation passing point 500. Moreover, the circular-interpolation passing point 500 is able to freely moved in the coordinate-graph making/display area 136. The point at which dragging has been suspended is the decided position. Reference numeral 502*a* and 502*b* represent circular-interpolation-passing-point-position display areas on which X- and Y-coordinates of the circular-interpolation passing point 500 are displayed with figures. Reference numeral 503 represents a locus formed from the location start point 150 to pass through the circular-interpolation passing point 500 so as to reach the location end point 151, the locus 503 being formed in the circular interpolation.

Figure 23:
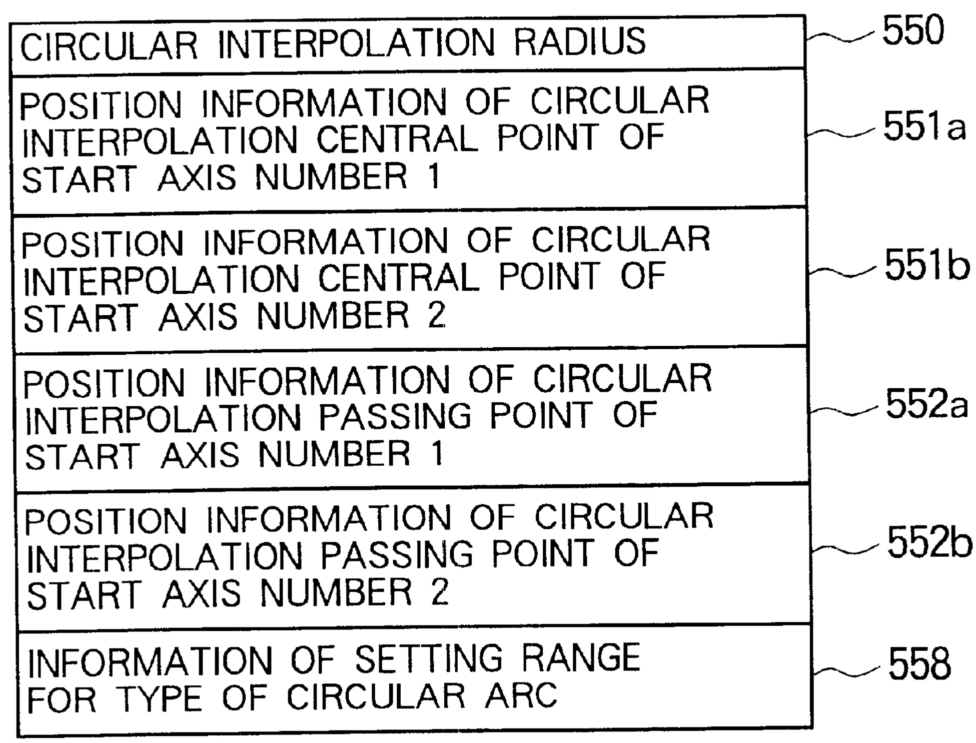
FIG. 23 is a detailed view showing a locating control type corresponding information storage area of the location programming apparatus according to the first embodiment of the present invention.

FIG. 23 shows the location-control-type corresponding information storage area 123 of the graphic programming work memory 4 which is, when locating programming is performed for the passing-point-instructed circular interpolation, composed of the circular-interpolation radius 550, circular-interpolation-central-point-position-information storage areas 551*a* and 551*b* of the start axis numbers, circular-interpolation-passing-point-position-information storage areas 552*a* and 552*b* of the start axis numbers and a circular-interpolation-type-setting-range-information storage area 558.

Figure 21:
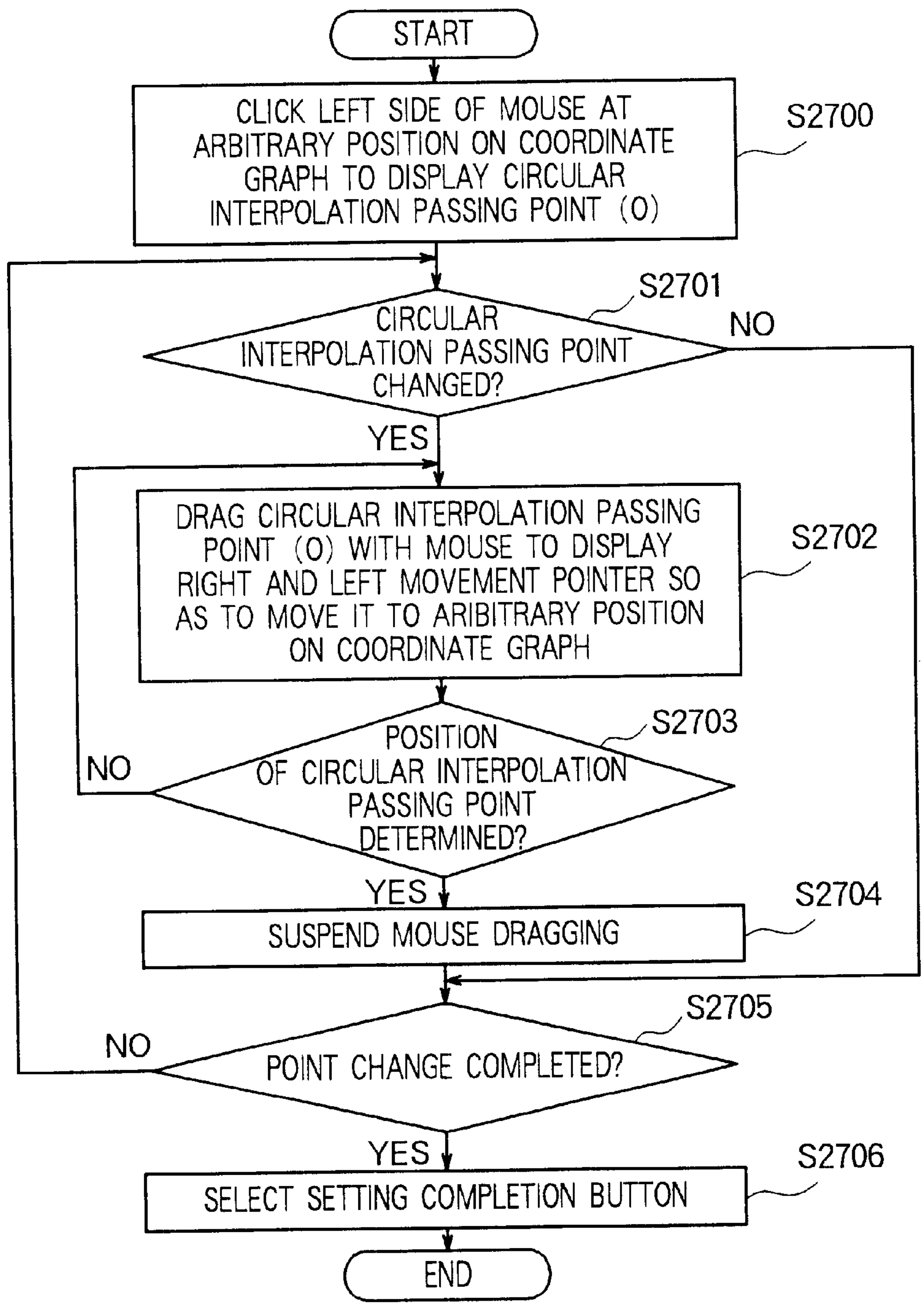
FIG. 21 is a flow chart showing a setting operation of a locating programming by using the coordinate graph in a case where passing-point-instructed circular interpolation control is set in the location programming apparatus according to the first embodiment of the present invention.

The operation for setting and changing the circular-interpolation passing point 500 will now be described with reference to a flow chart shown in FIG. 21. The location start point 150 and the location end point 151 are positioned at the initial positions in the coordinate-graph making/display area 136 on the initial window. When dragging operation is performed with the mouse, movement of each point to an arbitrary position is permitted. To display the circular-interpolation passing point 500, the mouse cursor is moved to an arbitrary position in the coordinate-graph making/display area 136. Then, the left side of the mouse is clicked so that location to the initial position is performed (step S2700). When the circular-interpolation passing point is changed (step S2701), the present circular-interpolation passing point (O) is moved to an arbitrary position on the coordinate graph with a movable pointer 154 displayed by dragging the mouse (step S2702). When the circular-interpolation passing point has been determined (step S2703), mouse dragging is suspended (step S2704). Then, the operation proceeds to step S2705. When the circular-interpolation passing point is not changed in step S2701, the operation proceeds to step S2705. When the circular-interpolation passing point is changed, the operation returns to step S2701. When the change has been completed (step S2705), the setting completion button 160 is selected (step S2706). Thus, the operation is ended.

Figure 22:
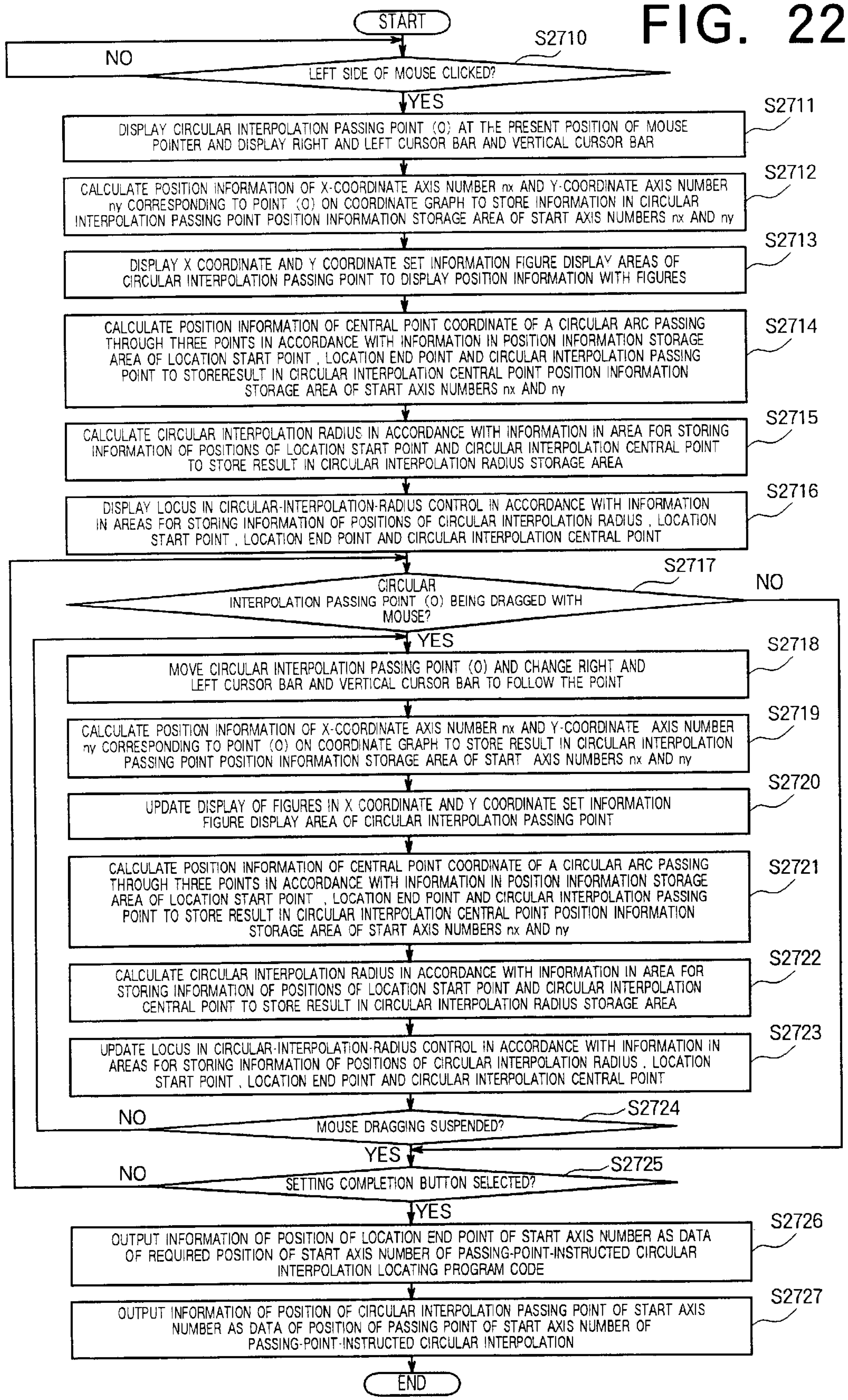
FIG. 22 is a flow chart showing a setting operation of a locating programming by using the coordinate graph in a case where passing-point-instructed circular interpolation control is set in the location programming apparatus according to the first embodiment of the present invention.

The operation for setting and changing the circular-interpolation passing point 500 will now be described with reference to a flow chart shown in FIG. 22. When the left side of the mouse has been clicked on the coordinate-graph making/display area 136 (step S2710), the circular-interpolation passing point 500 (O) is displayed at the present position of the mouse pointer. Moreover, cursor bars 155*a* and 155*b* corresponding to the point (O) on the coordinate graph are displayed (step S2711). Then, position information of X-coordinate axis number nx and that of Y-coordinate axis number ny corresponding to the point (O) on the coordinate graph are calculated so as to be stored in the circular-interpolation-passing-point-position-information storage areas 552*a* and 552*b* of the start axis numbers nx and ny (step S2712). Moreover, circular-interpolation-passing-point-position display areas 502*a* and 502*b* are displayed on the areas 137*a* and 137*b* in which the number of set information on X- and Y-coordinates are stored so that position information is displayed with figures (step S2713). In accordance with information in the location start point, location end point and circular-interpolation passing point storage areas 127*a*, 127*b*, 122*a*, 122*b*, 552*a* and 552*b*, position information of the coordinates of the central point operation a circular arc which passes through the three points is calculated so as to be stored in the circular-interpolation-central-point-position-information storage areas 551*a* and 551*b* of the start axis numbers nx and ny in step S2714. Then, the circular-interpolation radius is calculated in accordance with information in the location start point and circular-interpolation-central-point position information storage areas 127*a*, 127*b*, 551*a* and 551*b* so as to be stored in the circular-interpolation radius 550 in step S2715. In accordance with information in the circular-interpolation-radius, location start point and circular-interpolation-central-point position information storage areas 550, 127*a*, 127*b*, 122*a*, 122*b*, 551*a* and 551*b*, the locus 503 for the linear locating control is performed is displayed in step S2716.

When the circular-interpolation passing point (O) 500 is being dragged with the mouse (step S2717), the circular-interpolation passing point (O) is moved to follow the movable pointer 154. Also the cursor bars 155*a* and 155*b* are changed to follow the movable pointer 154 (step S2718). Position information of the X-coordinate axis number nx and Y-coordinate axis number ny corresponding to the point (O) on the coordinate graph is calculated so as to be stored in the circular-interpolation-passing-point-position-information storage areas 552*a* and 552*b* of the start axis numbers nx and ny (step S2719). Thus, displayed figures on the circular-interpolation-passing-point-position display areas 502*a* and 502*b* of the areas 137*a* and 137*b* in which the number of set information on X- and Y-coordinates are stored are updated (step S2720). Then, in accordance with information in the location start point, location end point and circular-interpolation passing point storage areas 127*a*, 127*b*, 122*a*, 122*b*, 552*a* and 552*b*, position information of the coordinate of the central point of a circular arc which passes through three points is calculated so as to be stored in the circular-interpolation-central-point-position-information storage areas 551*a* and 551*b* of the start axis numbers nx and ny in step S2721. Then, the circular-interpolation-radius is calculated in accordance with information in the location start point and circular-interpolation-central-point position information storage areas 127*a*, 127*b*, 551*a* and 551*b* so as to be stored in the circular-interpolation radius 550 in step S2722. In accordance with information in the circular-interpolation-radius, location start point and circular-interpolation-central-point position information storage areas 550, 127*a*, 127*b*, 122*a*, 122*b*, 551*a* and 551*b*, the locus 503 for the circular interpolation is updated in step S2723. The processes in steps S2718 to S2723 are performed until mouse dragging is suspended. When mouse dragging has been suspended, the operation proceeds to step S2725 (step S2724). If the circular-interpolation passing point 500 is not being dragged with the mouse in step S2717, the operation proceeds to step S2725.

The operation returns to step S2717 until the setting completion button 160 is selected. When the setting completion button 160 has been selected (step S2725), position information in the location-end-point-position-information storage areas 122*a* and 122*b* of the start axis numbers stored in the graphic programming work memory 4 is outputted as required position data 2201*a* and 2201*b* of the start axis numbers of the passing-point-instructed circular interpolation locating program code (step S2726). Moreover, position information in the circular-interpolation-passing-point-position-information storage areas 552*a* and 552*b* of the start axis numbers is outputted as passing-point position data 2300*a* and 2300*b* of the start axis numbers of the passing-point-instructed circular interpolation locating program code (step S2727).

The operation for setting and changing the circular-interpolation passing point 500 is performed as described above. Also the location start point 150 and the location end point 151 can arbitrarily be changed by the above-mentioned operation until the setting completion button 160 is selected.

The above-mentioned location programming apparatus enables the locating program for the passing-point-instructed circular interpolation control to easily be set and changed by using a locus graph.

Figure 24:
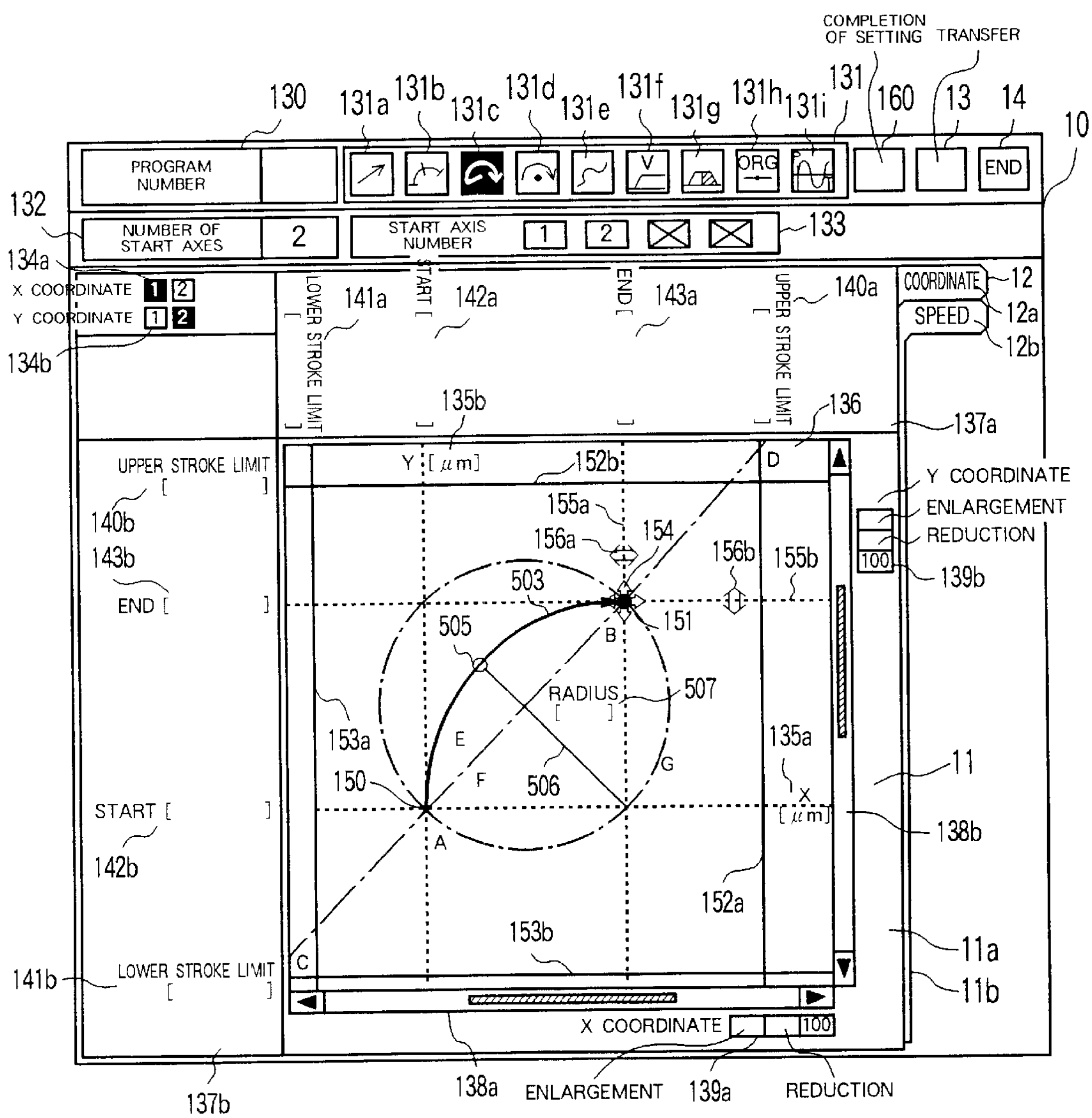
FIG. 24 is a diagram showing an example of a locating programming window by using the coordinate graph in a case where radius-instructed circular interpolation control is set in the location programming apparatus according to the first embodiment of the present invention.

5. Locating programming for Radius-Instructed Circular Interpolation by Using Coordinate Graph The operation for locating programming for radius-instructed circular interpolation by using a coordinate graph will now be described with reference to FIGS. 24 to 27. FIG. 24 shows an example of a window which is displayed when radius-instructed circular interpolation is performed. An alternate long and short dash line and symbols A to G are auxiliary lines and auxiliary symbols for description which are not displayed on the window. Straight line AB is a is a straight line connecting the location start point 150 and the location end point 151 to each other. Straight line CD is an extension of the straight line AB to divide the coordinate-graph making/display area 136 into region E and region F. Circle G is a circle, the diameter of which is the straight line AB. Referring to FIG. 24, reference numeral 505 represents a circular-arc-radius-instructing point for instructing the circular interpolation radius with the position of a midpoint of a circular arc which connects the location start point 150 and the location end point 151 to each other. The circular-arc-radius-instructing point 505 is displayed at the initial position of the initial window. When dragging operation with the mouse is performed, the movable pointer 154 is displayed. When the circular-arc-radius-instructing point 505 is moved on a perpendicular bisector of the straight line AB, the radius of the circular arc can be changed. When dragging is suspended, the radius of the circular arc is determined. Reference numeral 506 represents a graph of a radius of a circular arc, the graph connecting the central point of the circular arc and the circular-arc-radius-instructing point 505 to each other so as to graphically indicate the radius of the circular arc. Reference numeral 507 represents a circular-arc-radius display area for displaying the radius of the circular arc with figure.

Figure 27:
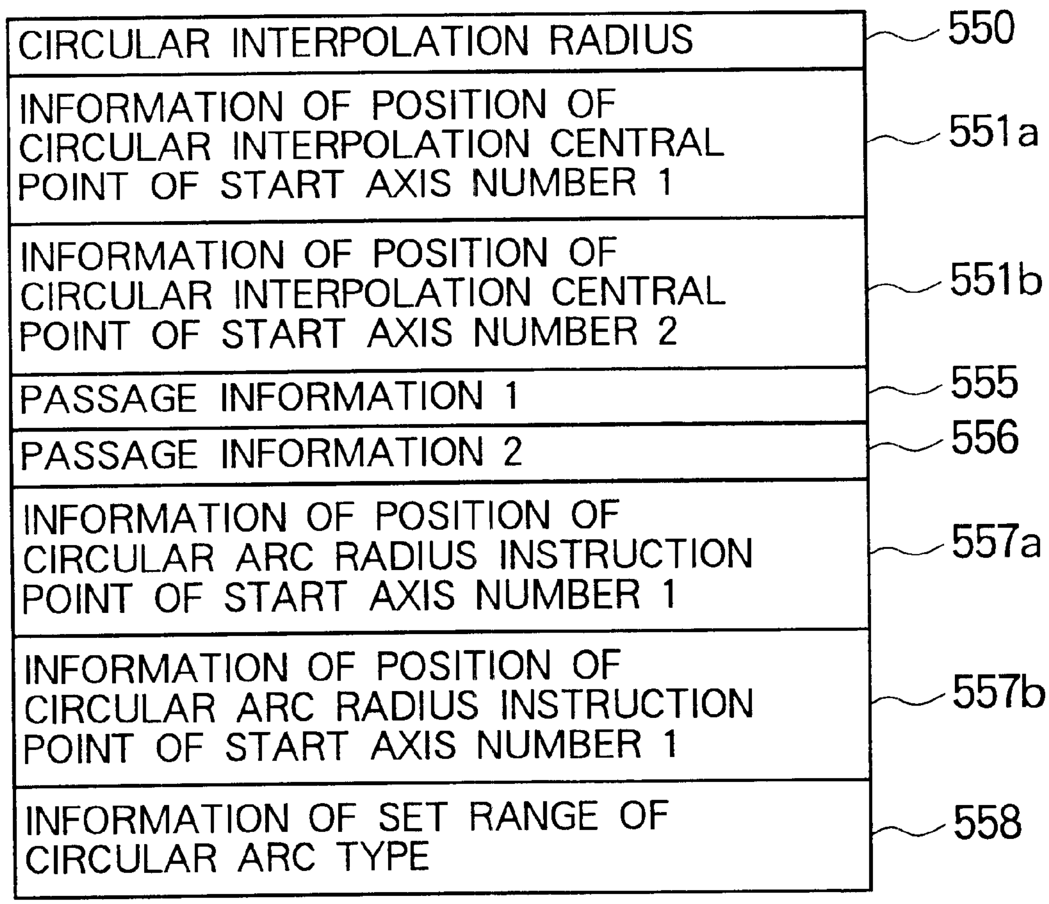
FIG. 27 is a detailed view showing locating control type corresponding information storage area of the location programming apparatus according to the first embodiment of the present invention.

FIG. 27 shows the location-control-type corresponding information storage area 123 of the graphic programming work memory 4. When the locating programming for the radius-instructed circular interpolation is performed, the location-control-type corresponding information storage area 123 is composed of the circular-interpolation radius 550, the circular-interpolation-central-point-position-information storage areas 551*a* and 551*b* of the start axis numbers, a passage-information-1-storage area 555 for storing information whether the rotational direction of the circular arc is clockwise or counterclockwise, a passage-information-2-storage area 556 for storing information whether the center angle of the circular arc is not smaller than 180 degrees or smaller than 180 degrees, radius-instructed-point-position-information storage areas 557*a* and 557*b* and the circular-interpolation-type-setting-range-information storage area 558.

Figure 25:
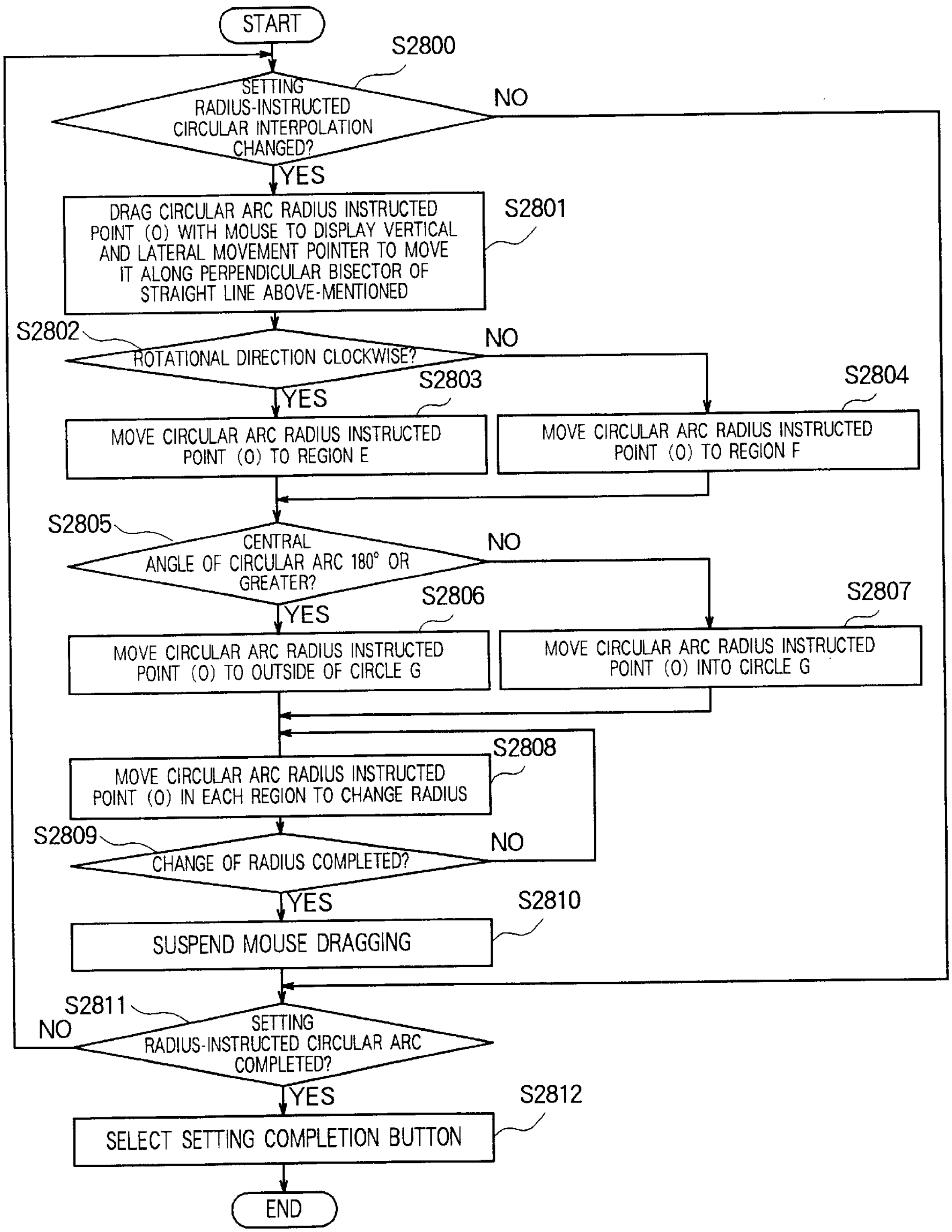
FIG. 25 is a flow chart showing a setting operation for locating programming by using the coordinate graph in a case where radius-instructed circular interpolation control is set in the location programming apparatus according to the first embodiment of the present invention.

The operation for changing setting of the radius-instructed circular arc will now be described with reference to a flow chart shown in FIG. 25. The location start point 150 and the location end point 151 are located at the initial positions in the coordinate-graph making/display area 136 because of the display of the initial window. When the mouse dragging operation is performed, movement to arbitrary position of each point is permitted. Also the circular-arc-radius-instructing point (O) 505 is disposed on the initial position on the perpendicular bisector of the straight line AB. When setting of the radius-instructed circular arc is changed (step S2800), the present circular-arc-radius-instructing point (O) 505 is dragged with the mouse so that the movable pointer 154 is displayed and movement on the perpendicular bisector of the straight line AB is performed (step S2801). When setting is not changed in step S2800, the operation proceeds to step S2811. When the rotational direction of the circular arc is made to be clockwise in step S2802, the circular-arc-radius-instructing point (O) 505 is moved to the region E (step S2803). When the direction is made to be counterclockwise, the circular-arc-radius-instructing point (O) 505 is moved to the region F (step S2804). Then, the operation proceeds to step S2805. When the center angle of the circular arc is made to be not smaller than 180 degrees in step S2805, the circular-arc-radius-instructing point (O) 505 is moved to the outside of the circle G (step S2806). If the center angle is made to be smaller than 180 degrees, the circular-arc-radius-instructing point (O) 505 is moved into the circle G (step S2807). The operation proceeds to step S2808 so that the circular-arc-radius-instructing point (O) 505 is moved in each region to change the radius. When change of the radius has been completed (step S2809), mouse dragging is suspended (step S2810). If the change is not changed, step S2808 is repeated. When setting of the radius-instructed circular arc is changed, the operation returns to step S2800. When the change has been completed (step S2811), the setting completion button 160 is selected (step S2812). Thus, the operation is ended.

Figure 26:
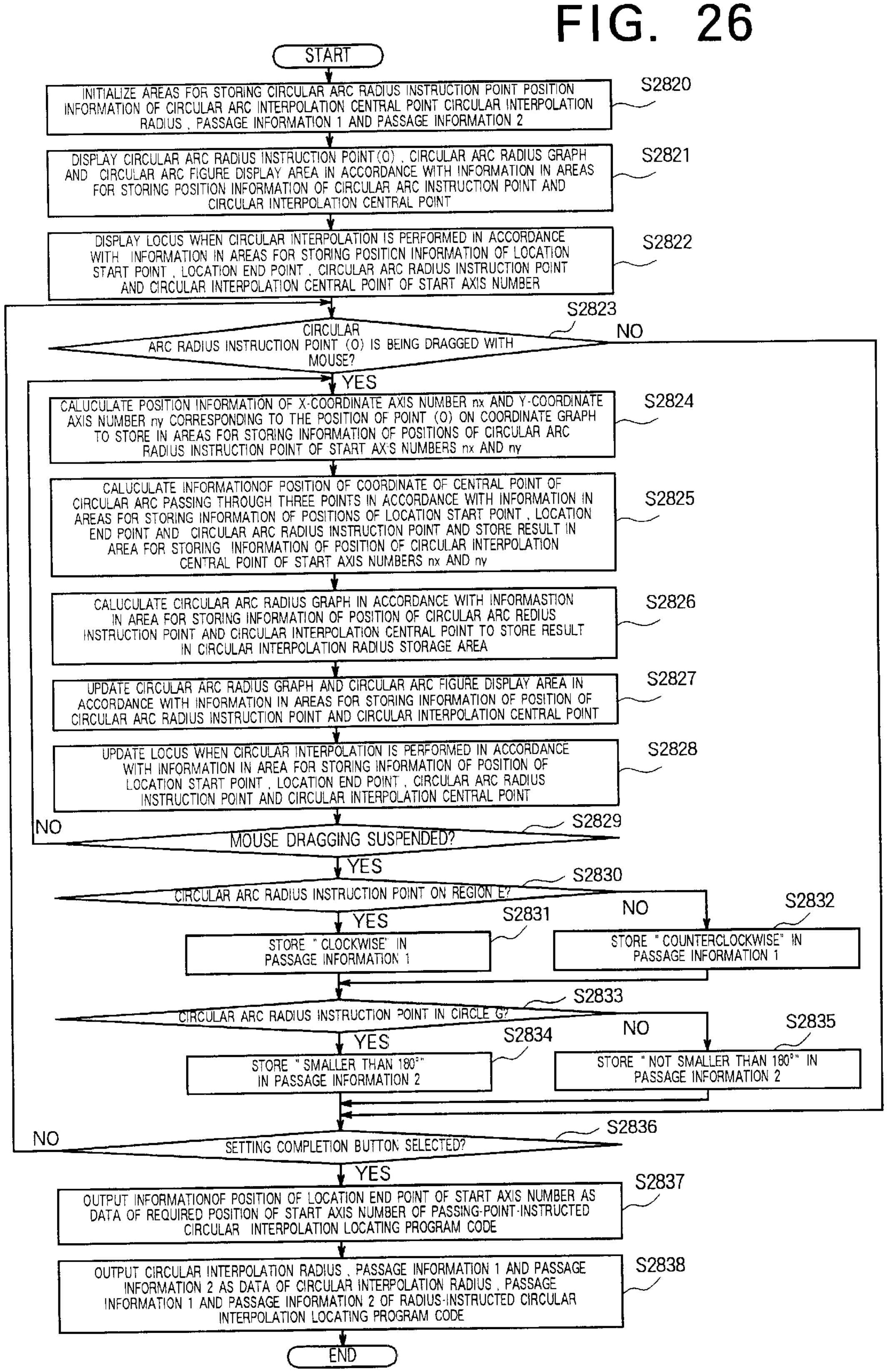
FIG. 26 is a flow chart showing a locating programming operation by using the coordinate graph in a case where radius-instructed circular interpolation control is set in the location programming apparatus according to the first embodiment of the present invention.

The operation for changing setting of the radius-instructed circular arc will now be described with reference to a flow chart shown in FIG. 26. The initial operation is performed in such a manner that the radius-instructed-point-position-information storage areas 557*a* and 557*b* of the X-coordinate axis number nx and Y-coordinate axis number ny, the circular-interpolation-central-point-position-information storage areas 551*a* and 551*b*, the circular-interpolation radius 550, the passage-information-1-storage area 555 and the passage-information-2-storage area 556 are initialized (step S2820). In accordance with information in the above-mentioned storage areas, the circular-arc-radius-instructing point (O) 505, the circular-arc-radius graph 506 and the circular-arc-radius-figure display area 507 are displayed in step S2821. In step S2822 the locus 503 for the circular interpolation is displayed.

When the circular-arc-radius-instructing point (O) 505 is being dragged by the mouse (step S2823), the circular-arc-radius-instructing point (O) is moved on the perpendicular bisector of the straight line AB following the movable pointer 154. Moreover, position information of the X-coordinate axis number nx and that of Y-coordinate axis number ny corresponding to the position of the point (O) on the coordinate graph are calculated so as to be stored in the radius-instructed-point-position-information storage areas 557*a* and 557*b* of the start axis numbers nx and ny (step S2824). Then, in accordance with information in the location start point, location end point and circular-arc-radius-instructed-point position information storage areas 127*a*, 127*b*, 122*a*, 122*b*, 557*a* and 557*b*, position information of the coordinate of the central point of a circular arc which passes through three points is calculated so as to be stored in the circular-interpolation-central-point-position-information storage areas 551*a* and 551*b* of the start axis numbers nx and ny in step S2825. In accordance with information in the location start point and circular-interpolation-central-point position information storage areas 127*a*, 127*b*, 551*a* and 551*b*, the circular interpolation radius is calculated in step S2826 so as to be stored in the circular-interpolation radius 550 in step S2826. In accordance with in the circular-arc-radius-instructed-point and circular-interpolation-central-point position information storage areas 557*a*, 557*b*, 551*a* and 551*b*, the circular-radius graph 506 and the circular-arc-radius-figure display area 507 are updated in step S2827. In accordance with information in the circular-interpolation-radius, location start point, location end point and circular-interpolation-central-point position information storage areas 550, 127*a*, 127*b*, 122*a*, 122*b*, 551*a* and 551*b*, the locus 503 for the circular interpolation is updated in step S2828. The processes in steps S2824 to S2828 are performed until mouse dragging is suspended. When mouse dragging has been suspended, the operation proceeds to step S2830 (step S2829). If the circular-arc-radius-instructing point (O) 505 is not being dragged by the mouse in step S2823, the operation proceeds to step S2836.

When the circular-arc-radius-instructing point (O) 505 is in the region E in step S2830, "clockwise" is stored in the passage-information-1-storage area 555 (step S2831). When the circular-arc-radius-instructing point (O) 505 is in the region F, "counterclockwise" is stored (step S2832). Then, the operation proceeds to step S2833. If the circular-arc-radius-instructing point (O) 505 is on the inside of the circle G in step S2833, "smaller than 180 degrees" is stored in the passage-information-2-storage area 556 (step S2834). When the circular-arc-radius-instructing point (O) 505 is on the circle G or outside the circle G, "not smaller than 180 degrees" is stored (step S2835). Then, operation proceeds to step S2836.

The operation returns to step S2823 until the setting completion button 160 is selected. When the setting completion button 160 has been selected (step S2836), position in f in the location-end-point-position-information storage areas 122*a* and 122*b* of the start axis numbers stored in the graphic programming work memory 4 is outputted as required position data 2201*a* and 2201*b* of the start axis numbers of the radius-instructed circular interpolation locating program code (step S2837). Then, information in the circular-interpolation radius storage area, passage-information-1-storage area and passage-information-2-storage area 550, 555 and 556 is outputted as data 2400, 2401 and 2402 of circular interpolation radius, passage information 1 and passage information 2 (step S2838).

The operation for setting and changing the circular-arc-radius-instructing point 505 is performed as described above. Also the location start point 150 and the location end point 151 can arbitrarily be changed by the above-mentioned operation until the setting completion button 160 is selected.

The above-mentioned location programming apparatus enables the locating program for the radius-instructed circular interpolation control to easily be set and changed by using the locus graph.

Figure 28:
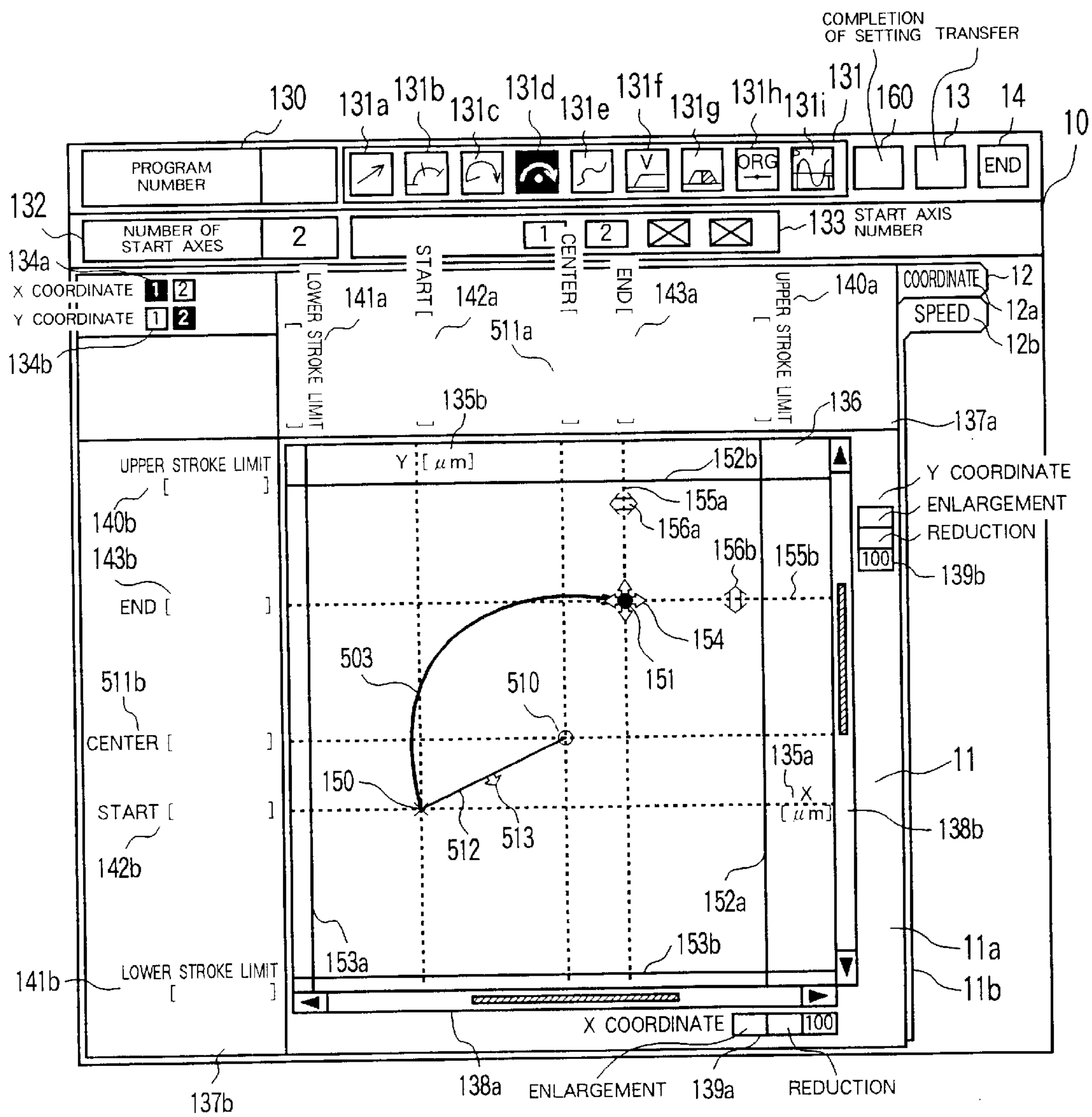
FIG. 28 is a diagram showing a locating programming window by using the coordinate graph in a case where central-point-instructed circular interpolation control is set in the location programming apparatus according to the first embodiment of the present invention.

6. Locating Programming for Central-Point-Instructed Circular Interpolation Using Coordinate Graph The operation for performing locating programming for the central-point-instructed circular interpolation by using a coordinate graph will now be described with reference to FIGS. 28 to 31. FIG. 28 shows an example of a window which is displayed when central-point-instructed circular interpolation is performed. Reference numeral 510 circular interpolation central point. When mouse dragging is performed, the movable pointer 154 is displayed. Moreover, the circular interpolation central point 510 is able to freely move in the coordinate-graph making/display area 136. The point at which dragging has been suspended is the decided point. Reference numerals 511*a* and 511*b* represent circular interpolation central-point-position display areas 511*a* and 511*b* in which the X- and Y-coordinates of the circular interpolation central point 510 are displayed with figures. Reference numeral 512 represents a rotational-direction-instructing radius graph for connecting the location start point 150 and the circular interpolation central point 510 to each other. Reference numeral 513 represents an arrow cursor for instructing the rotational direction. When the mouse cursor has been moved onto the circular interpolation central point 510, an arrow facing opposite to the locus 503 for the circular interpolation is displayed. When dragging in the direction indicated by the arrow is performed, the rotational direction is changed. When the central-point-instructed circular interpolation is performed, the location end point 151 is not always set on a circular arc calculated from the circular interpolation central point 510 and the location start point 150. Therefore, the locus 503 for the circular interpolation is subjected to error correction by a spiral correction method in such a manner that the locus 503 for the circular interpolation pass through the location end point 151.

Figure 31:
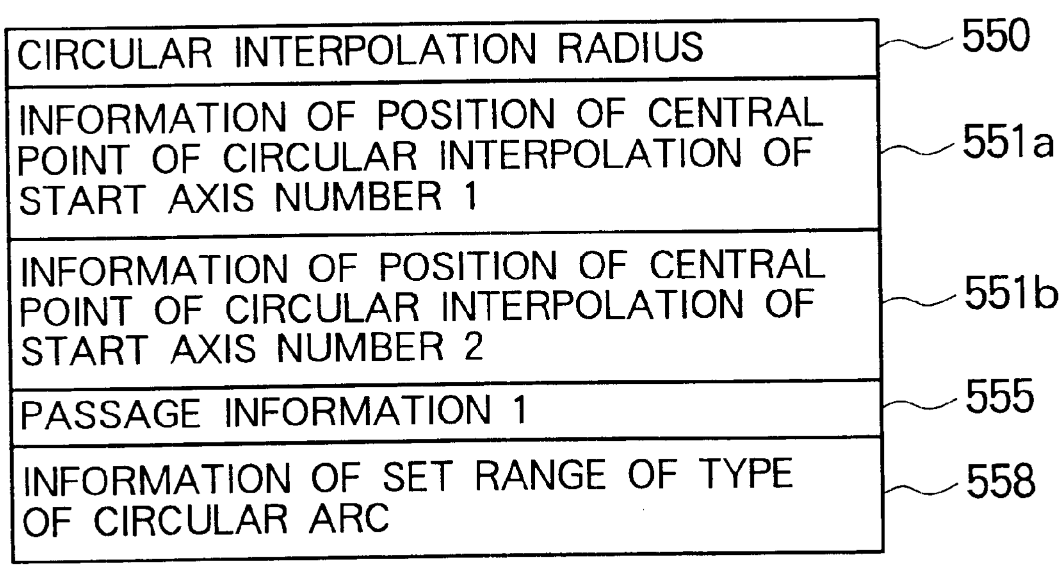
FIG. 31 is a detailed view showing a locating control type corresponding information storage area of the location programming apparatus according to the first embodiment of the present invention.

FIG. 31 shows the location-control-type corresponding information storage area 123 of the graphic programming work memory 4. When locating programming for the central-point-instructed circular interpolation is performed, the location-control-type corresponding information storage area 123 is composed of the circular-interpolation radius 550, the circular-interpolation-central-point-position-information storage areas 551*a* and 551*b* of the start axis numbers, the passage-information-1-storage area 555 for storing information indicating whether the rotational direction of the circular arc is clockwise or counterclockwise and the circular-interpolation-type-setting-range-information storage area 558.

Figure 29:
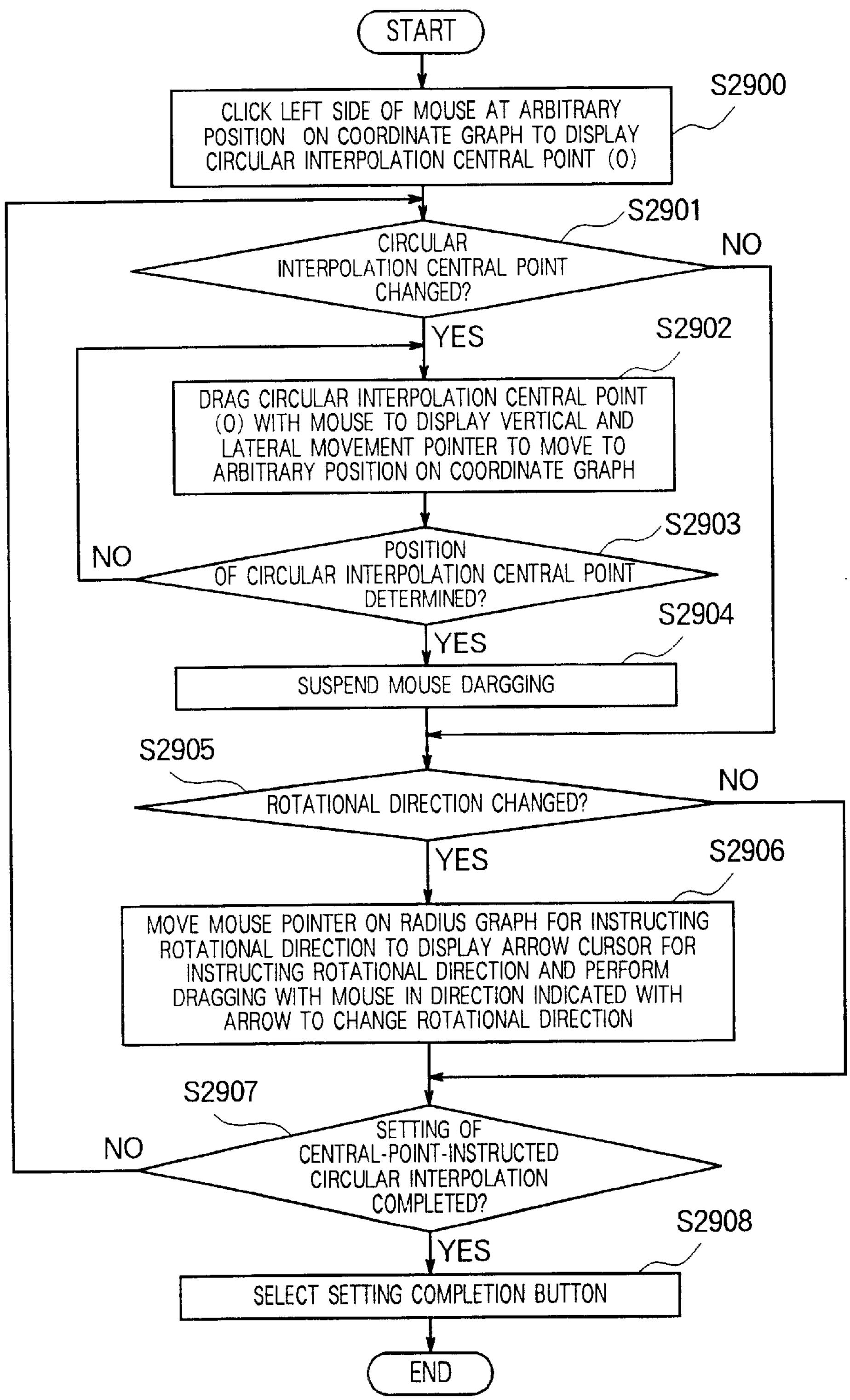
FIG. 29 is a flow chart showing a setting operation of locating Programming by using a coordinate graph in a case where central-point-instructed circular interpolation control is set in the location programming apparatus according to the first embodiment of the present invention.

The operation for setting and changing the central-point-instructed circular arc will now be described with reference to a flow chart shown in FIG. 29. The location start point 150 and the location end point 151 are located at the initial positions in the coordinate-graph making/display area 136 because of display of the initial window. Each point can be moved to an arbitrary position when the mouse dragging operation has been performed. To display the circular interpolation central point 510, the mouse cursor is moved to an arbitrary position in the coordinate-graph making/display area 136. Then, the left side of the mouse is clicked so that the circular interpolation central point 510 is position at the initial position (step S2900). When the circular-interpolation central point is changed (step S2901), the present circular-interpolation central point (O) is dragged by the mouse. Thus, the movable pointer 154 is displayed so as to be moved to an arbitrary position on the coordinate graph (step S2902). When the position of the circular-interpolation central point has been determined (step S2903), mouse dragging is suspended (step S2904). Then, the operation proceeds to step S2905. When the circular-interpolation central point is not changed in step S2901, the operation proceeds to step S2905. When the rotational direction is changed (step S2905), the mouse pointer is moved onto the rotational-direction-instructing radius graph 512 so that the rotational-direction-instructing radius graph 512 is displayed. Then, mouse dragging is performed in the direction indicated by the arrow so that the rotational direction is changed (step S2906). When the rotational direction is not changed in step S2905, the operation proceeds to step S2907. When the central-point-instructed circular arc is changed, the operation returns to step S2901. When the change has been completed (step S2907), the setting completion button 160 is selected (step S2708). Thus, the operation is ended.

Figure 30:
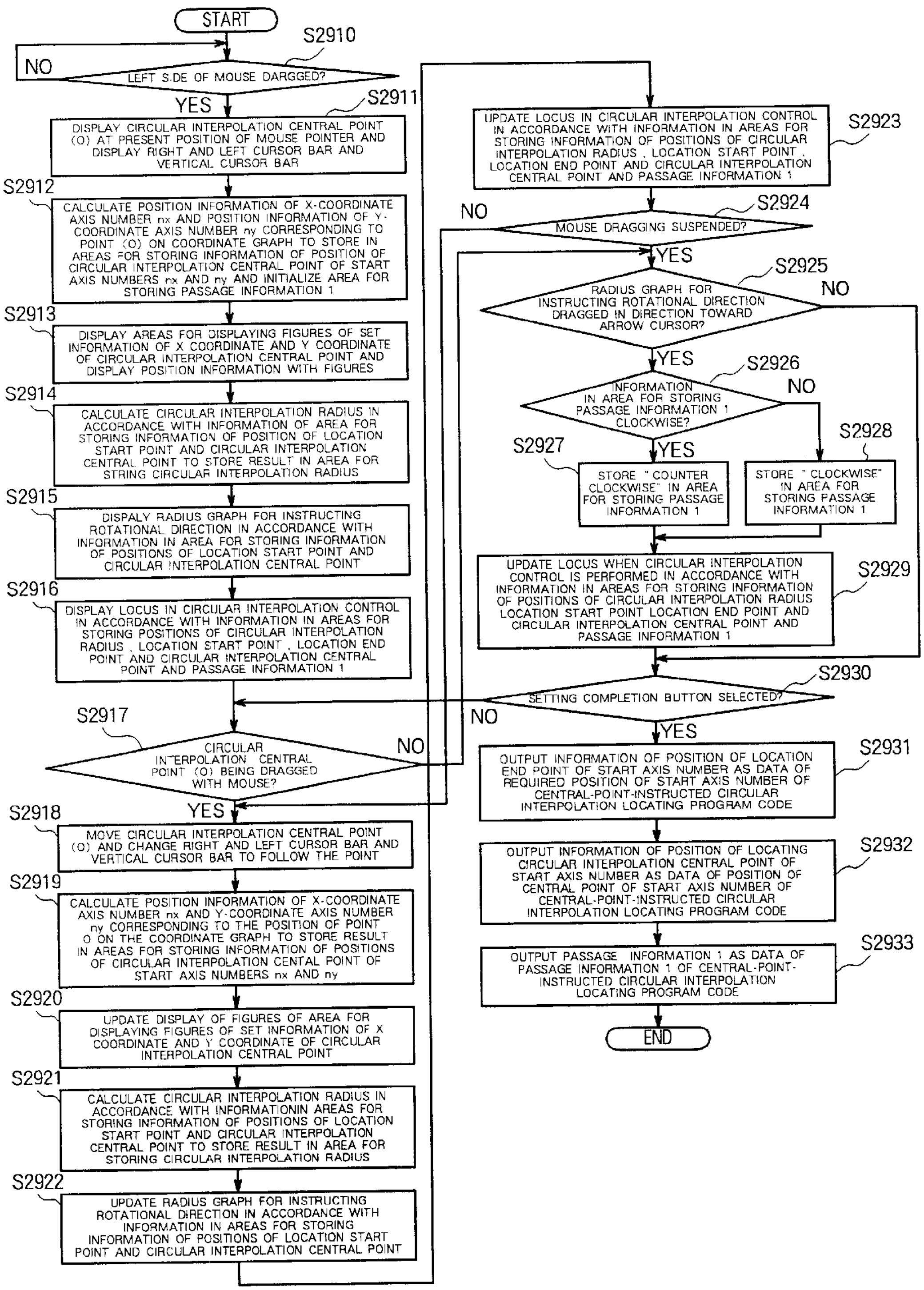
FIG. 30 is a flow chart showing the operation of locating programming by using the coordinate graph in a case where central-point-instructed circular interpolation control is set in the location programming apparatus according to the first embodiment of the present invention.

The operation for setting and changing the central-point-instructed circular arc will now be described with reference to a flow chart shown in FIG. 30. When the left side of the mouse has been clicked on the coordinate-graph making/display area 136 (step S2910), the circular interpolation central point (O) 510 is displayed at the present position of the mouse pointer. Moreover, the cursor bars 155*a* and 155*b* corresponding to the point (O) on the coordinate graph are displayed (step S2911). Moreover, position information of the X-coordinate axis number nx and Y-coordinate axis number ny corresponding to the point (O) on the coordinate graph is calculated so as to be stored in the circular-interpolation-central-point-position-information storage areas 551*a* and 551*b* of the start axis numbers nx and ny (step S2912). Moreover, the initial value of the rotational direction is stored in the passage-information-1-storage area (step S2912). Moreover, the circular interpolation central-point-position display areas 511*a* and 511*b* are displayed in the areas 137*a* and 137*b* in which the number of set information on X- and Y-coordinates are stored so that position information is displayed with figures (step S2913). In accordance with information in the areas 127*a*, 127*b*, 551*a* and 551*b* for storing information of the positions of the location start point and the circular interpolation central point, the circular interpolation radius is calculated in step S2914 so as to be stored in the circular-interpolation radius 550. Moreover, the rotational-direction-instructing radius graph 512 is displayed (step S2915). In accordance with information in the areas 550, 127*a*, 127*b*, 122*a*, 122*b*, 551*a*, 551*b* and 555 for storing information of the positions of the circular interpolation radius, the location start point, the location end point, the circular interpolation central point and passage information 1, the locus 503 for the circular interpolation control is displayed in step S2916.

When the circular interpolation central point (O) 510 is being dragged with the mouse (step S2917), the circular interpolation central point (O) is moved to follow the movable pointer 154. Moreover, the cursor bars 155*a* and 155*b* are changed to follow the movable pointer 154 (step S2918). Then, position information of the X-coordinate axis number nx and Y-coordinate axis number ny corresponding to the point (O) on the coordinate graph is calculated so as to be stored in the circular-interpolation-central-point-position-information storage areas 551*a* and 551*b* of the start axis numbers nx and ny (step S2919). Thus, the displayed figures in the circular-interpolation-passing-point-position display areas 502*a* and 502*b* of the areas 137*a* and 137*b* for storing the number of set information on X- and Y-coordinates are stored is updated (step S2920). In accordance with information in the areas 127*a*, 127*b*, 551*a* and 551*b* for storing position information of the location start point and the circular interpolation central point, the circular interpolation radius is calculated so as to be stored in the circular-interpolation radius 550 in step S2921. Moreover, the rotational-direction-instructing radius graph 512 is updated (step S2922). In accordance with information in the areas 550, 127*a*, 127*b*, 122*a*, 122*b*, 551*a*, 551*b* and 555 for storing position information of the circular interpolation radius, the location start point, the location end point, the circular interpolation central point and passage information 1, the locus 503 is updated for the circular interpolation in step S2923. The processes in steps S2918 to S2923 are performed until mouse dragging is suspended. When mouse dragging has been suspended, the operation proceeds to step S2925 (step S2924). When the circular interpolation central point (O) 510 is not being dragged in step S2917, the operation proceeds to step S2925.

When the rotational-direction-instructing radius graph 512 has been dragged toward the rotational-direction-instructing arrow cursor 513 (step S2925), the operation proceeds to step S2926. When present information in the passage-information-1-storage area 555 is "clockwise", "counterclockwise" is stored in the passage-information-1-storage area 555 (step S2927). When present information is "counterclockwise", "clockwise" is stored (step S2928). In accordance with information in the areas 550, 127*a*, 127*b*, 122*a*, 122*b*, 551*a*, 551*b* and 555 for storing position information of the circular interpolation radius, the location start point, the location end point, the circular interpolation central point and passage information 1, the locus 503 for the circular interpolation control is updated in step S2929. When the rotational-direction-instructing radius graph 512 is not being dragged to toward the rotational-direction-instructing arrow cursor 513 in step S2925, the operation proceeds to step S2930.

The operation returns to step S2917 until the setting completion button 160 is selected. When the setting completion button 160 has been selected (step S2930), position information in the location-end-point-position-information storage areas 122*a* and 122*b* of the start axis numbers stored in the graphic programming work memory 4 are outputted as required position data 2201*a* and 2201*b* of the start axis numbers of the central-point-instructed circular interpolation program code (step S2931). Position information in the circular-interpolation-passing-point-position-information storage areas 552*a* and 552*b* of the start axis numbers is outputted as central-point data 2500*a* and 2500*b* of the start axis numbers of the central-point-instructed circular interpolation circular interpolation locating program code (step S2932). Moreover, information of the rotational direction in the passage-information-1-storage area 555 is outputted as data 2401 of passage information 1 of the central-point-instructed circular interpolation circular interpolation locating program code (step S2933).

The setting and changed of the circular interpolation central point 510 and the operation of the rotational direction are performed as described above. Also the location start point 150 and the location end point 151 can arbitrarily be changed by the above-mentioned operation until the setting completion button 160 is selected.

The above-mentioned location programming apparatus enables the locating program for the central-point-instructed circular interpolation circular interpolation control to easily be set and changed by using a locus graph.

7. Locating Programming for Locus Control Using Coordinate Graph

Figure 32:
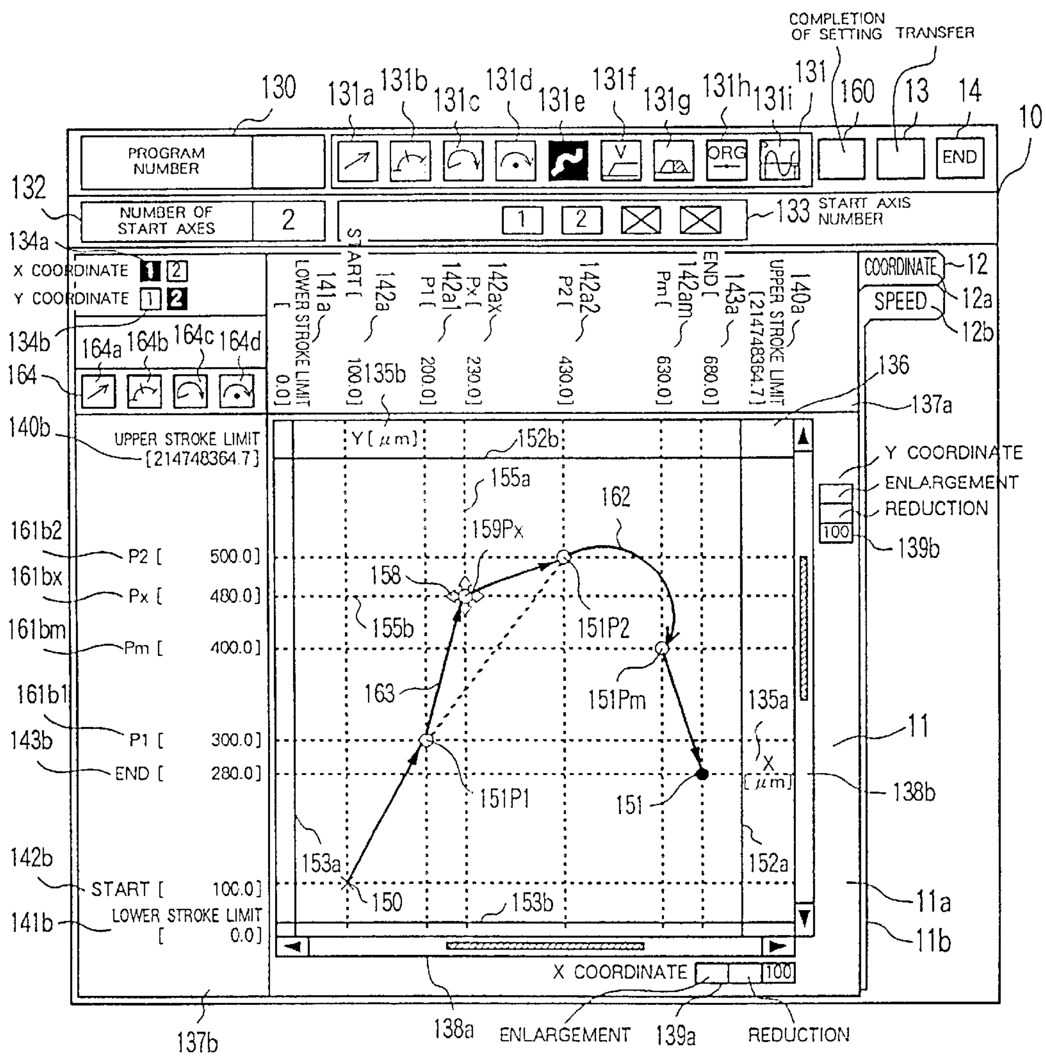
FIG. 32 is a diagram showing an example of a locating programming window by using the coordinate graph in a case where locus control of two axes is set in the location programming apparatus according to the first embodiment of the present invention.

The operation for performing locating programming for the locus control by using a coordinate graph will now be described with reference to FIGS. 32 to 44. FIG. 32 shows an example of a window which is displayed when two axes are locus-controlled. Reference numeral 158 represents passing-point setting/moving pointer, 159$p_x$ represents a passing point which is being set additionally, 151$p_1$, 151$p_2$ and 151$p_m$ represent set passing points $P_1$, $P_2$ and $P_m$, and 142$a_x$, 142$a_1$, 142$a_2$, 142$a_m$, 161$b_x$, 161$b_1$, 161$b_2$ and 161$b_m$ represent areas for displaying X- and Y-coordinates of the passing points with figures. Reference numeral 163 represents a selected region. A method of passing through the region is selected from straight line 164*a*, passing-point-instructed circular interpolation 164*b*, radius-instructed circular interpolation 164*c* and central-point-instructed circular interpolation 164*d* by using a passing method selection button 164. Reference numeral 162 represents a locus connecting the location start point 150, passing points 151$p_1$, 151$p_2$ and 151$p_m$ and the location end point by a set passing method.

Figure 33:
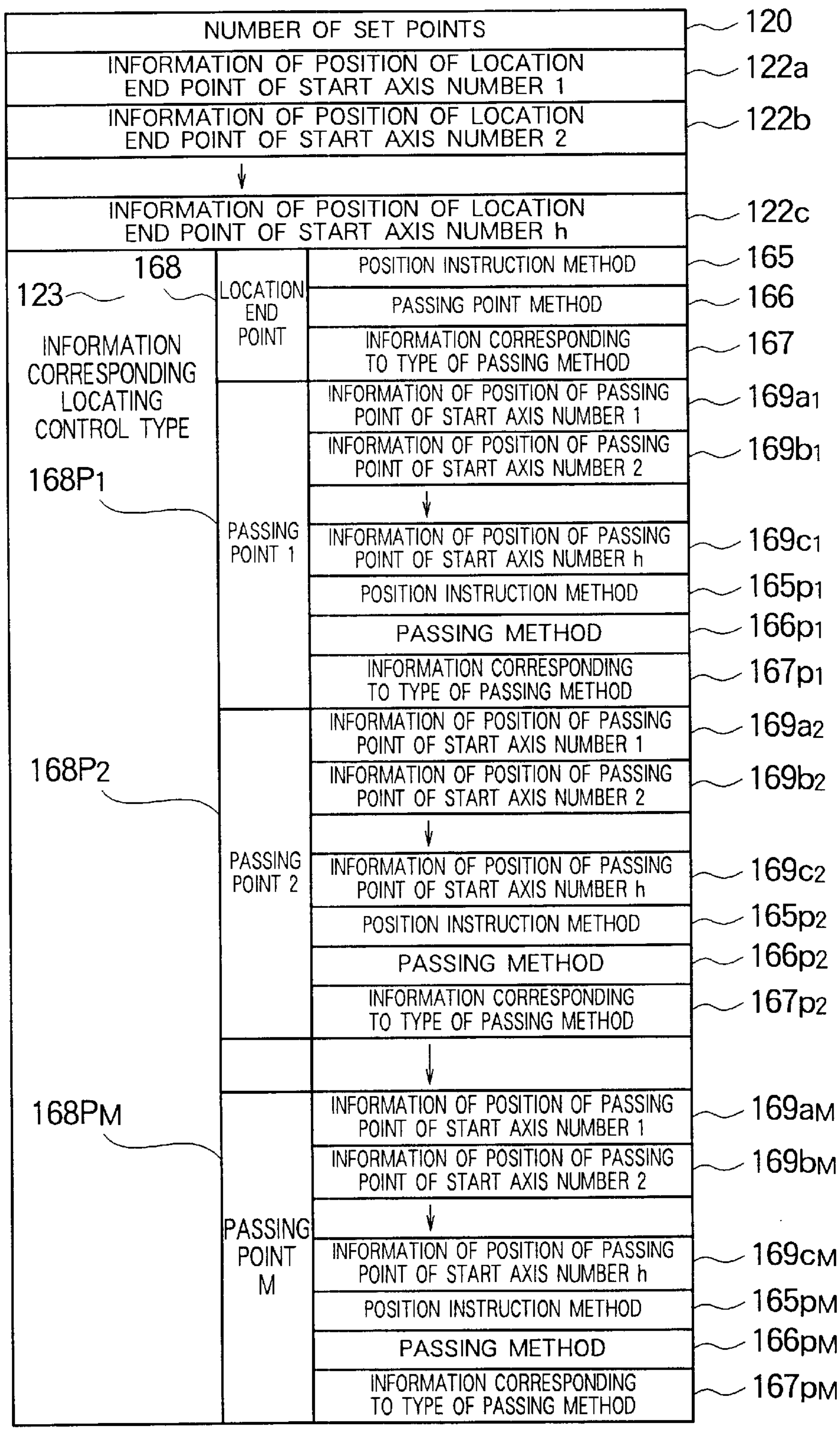
FIG. 33 is a detailed view showing the locating program information storage area when locus control of coordinate graph output information is set in the location programming apparatus according to the first embodiment of the present invention.

FIG. 33 shows a locating program information storage area 101 of the coordinate-graph-output-information storage area 71 when the locating control type is the locus control. Reference numeral 120 represents an area for storing the set number of passing point (M)+1 (end point). Reference numeral 168 $P_1$ represents position control information of a region (region 1) from the location start point 150 to a first passing point $P_1$, 168$p_2$ represents position control information of a region (region 2) from the first passing point $P_1$ to the second point $P_2$ and 168 represents position control information of a region (region M) from the M−1th passing point $P_{M-1}$ to $p_M$th point $p_M$ and 168$p_M$ represents a position-control-information storage area of a position-control-information storage area of a region (region M+1) from the M-th passing point $P_M$ to the location end point 151. The regions 1 to M ($1 \leqq m \leqq M$) are composed of passing-point-position-information storage areas 169$a_m$, 169$b_m$ and 169$c_m$, the position-instruction-method storage 165$p_m$, the passing-method storage area 166$p_m$ and the passing-method-corresponding-information storage area 167$p_m$. The region M+1 is composed of the position-instruction-method storage area 165, the passing-method storage area 166 and the passing-method-corresponding-information storage area 167.

FIG. 34 shows the structures of the passing-method-corresponding-information storage areas 167$p_m$ and 167 for use when the passing method is, in the structure shown in FIG. 33, the passing-point-instructed circular interpolation. The passing-method-corresponding-information storage areas 167$p_m$ and 167 are composed of the circular-interpolation-start-axis-number storage areas 170*a* and 170*b* and an area 171 for storing position information when the passing method is the passing-point-instructed circular interpolation. The structure of the area 171 for storing position information when the passing method is the passing-point-instructed circular interpolation is the same as that shown in FIG. 23.

FIG. 35 shows the structures of the passing-method-corresponding-information storage areas 167$p_m$ and 167 when the passing method shown in FIG. 33 is the passing-point-instructed circular interpolation, the passing-method-corresponding-information storage areas 167$p_m$ and 167 being composed of the circular-interpolation-start-axis-number storage areas 170*a* and 170*b* and an area 172 for storing position information when the passing method is the radius-instructed circular interpolation. The structure of the area 172 for storing position information when the passing method is the radius-instructed circular interpolation is the same as that shown in FIG. 27.

FIG. 36 shows the structures of the passing-method-corresponding-information storage areas 167$p_m$ and 167 when the passing method shown in FIG. 33 is the central-point-instructed circular interpolation. The passing-method-corresponding-information storage areas 167$p_m$ and 167 are composed of the circular-interpolation-start-axis-number storage areas 170*a* and 170*b* and an area 173 for storing position information when the passing method is the central-point-instructed circular interpolation. The structure of the area 173 for storing position information when the passing method is the central-point-instructed circular interpolation is the same as that shown in FIG. 31.

FIG. 37 shows window structure information of the coordinate-graph-output-information storage area 71 when passing point $P_x$ is being added. The window is composed of a position-instruction-method storage area 165$p_x$, a passing-method storage area 166$p_x$ and passing-point-position-information storage areas 169$a_x$, 169$b_x$ and 169$c_x$ of the start axis numbers.

Figure 38:
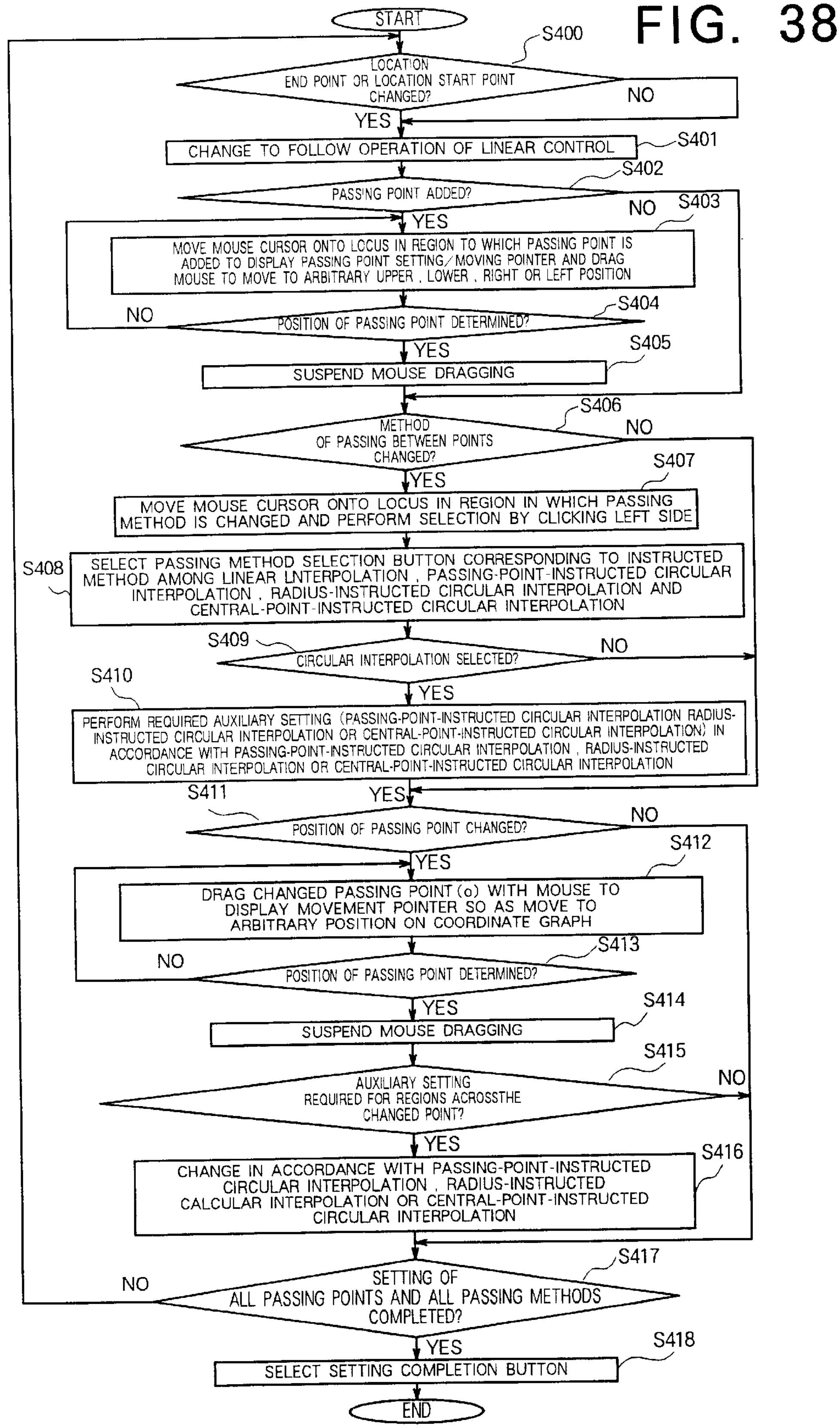
FIG. 38 is a flow chart showing a setting operation of a locating programming by using a coordinate graph in a case where locus control is set in the location programming apparatus according to the first embodiment of the present invention.

The operation for setting and changing the passing point and the passing method will now be described with reference to a flow chart shown in FIG. 38. When the location start point 150 and the location end point 151 are changed (step S400), the operation described to perform the linear control is performed so that changes are performed (step S401). When a passing point is added (step S402), the mouse cursor is moved onto a locus in a region (a region between the location start point 150 and the location end point 151 in an initial state) to which the passing point is added so that the passing point setting/moving pointer 158 is displayed. Then, the mouse is dragged so as to move the passing point setting/moving pointer 158 to any one of arbitrary upper, lower, right and left position (step S403). When the position of the passing point has been determined (step S404), mouse dragging is suspended (step S405). Then, the operation proceeds to step S406. If no passing point is added in step S402, the operation proceeds to step S406.

When a method of passing between points is changed (step S406), the mouse cursor is moved to a locus in a region in which the passing method is changed. Then, the left side is clicked so that selection is performed (step S407). Then, a button is selected by the passing-method selection button 164 from straight line 164*a*, passing-point-instructed circular interpolation 164*b*, radius-instructed circular interpolation 164*c* and the central-point-instructed circular interpolation 164*d* (step S408). When the circular interpolation has been selected (step S409), required auxiliary setting (circular arc passing point, the radius, the central point and the like) is performed in accordance with the passing-point-instructed circular interpolation, the radius-instructed circular interpolation and the central-point-instructed circular interpolation (step S410). Then, the operation proceeds to step S411. If the passing method is not changed in step S406, the operation proceeds to step S411.

When the position of the set passing point is changed (step S411), the passing point (O) 159*$p_m$* which must be changed is dragged with the mouse so that the movable pointer 154 is displayed which is moved to an arbitrary position on the coordinate graph (step S412). When the position of the passing point has been determined (step S413), mouse dragging is suspended (step S414) and the operation proceeds to step S415. If auxiliary setting in the regions across the point, which must be changed, is changed when the position of the passing point is changed (step S415), change is performed in accordance with the passing-point-instructed circular interpolation, the radius-instructed circular interpolation and the central-point-instructed circular interpolation (step S416). Then, the operation proceeds to step S417. If the position of the passing point is not changed in step S411, the operation proceeds to step S417.

If the passing point and the passing method is set and changed, the operation returns to step S400. When all passing points have been set and when passing methods for all regions have been set, the setting completion button 160 is selected (step S418). Then, the operation is ended.

The operation for setting and changing the passing point and the passing method will now be described with reference to a flow chart shown in FIGS. 39 to 44. The process until the initial window of the coordinate graph is displayed is performed similarly to the above-mentioned coordinate graph. The area 120 for storing the number of set points in the graphic programming work memory 4 is initialized to "1". Also the locating-start-point-position-information storage area 127 and the locating-end-point-position-information storage area 122 have been initialized.

Figure 39:
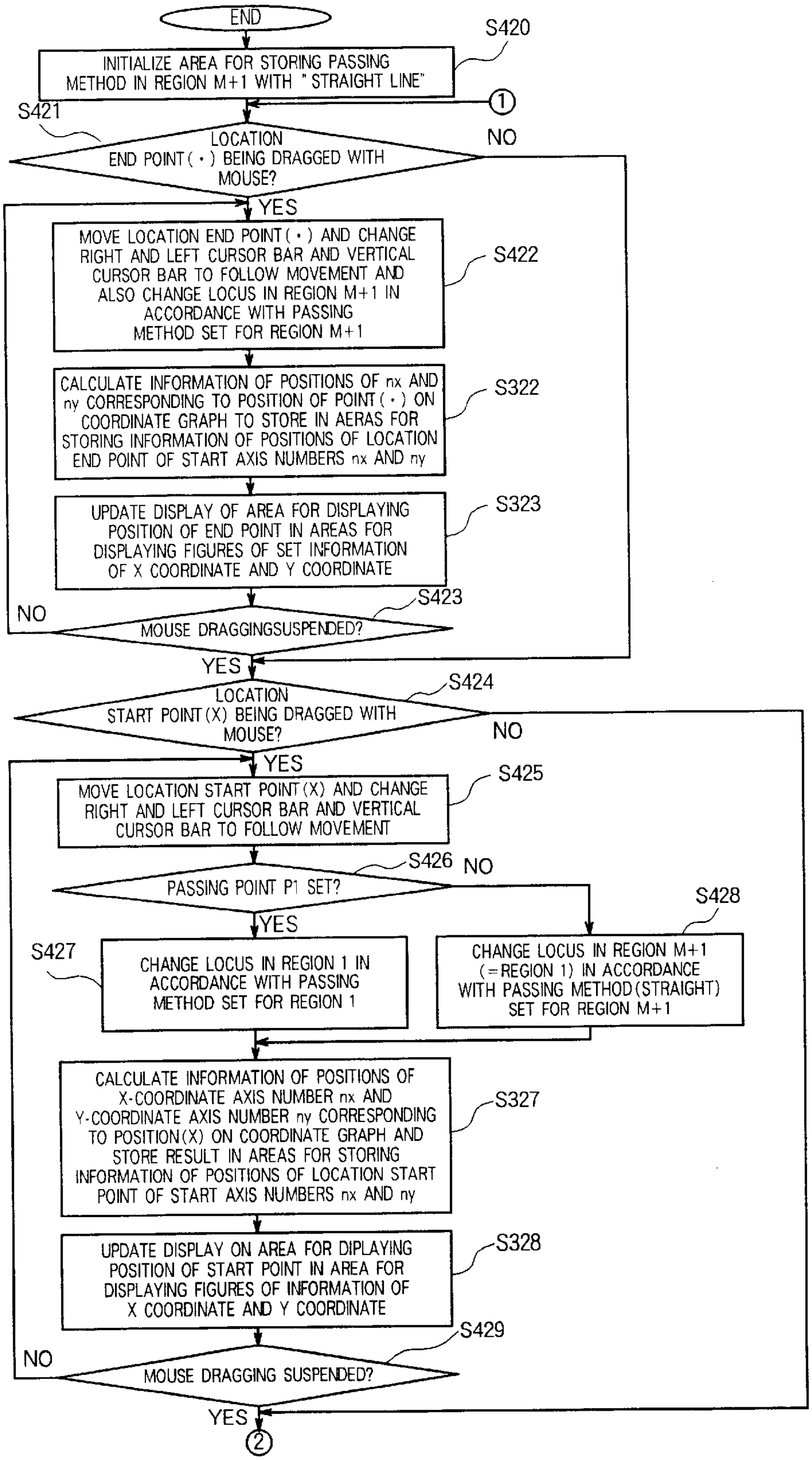
FIGS. 39 and 40 show a flow chart showing a locating programming operation by using the coordinate graph in a case where locus control is set in the location programming apparatus according to the first embodiment of the present invention.
Figure 40:
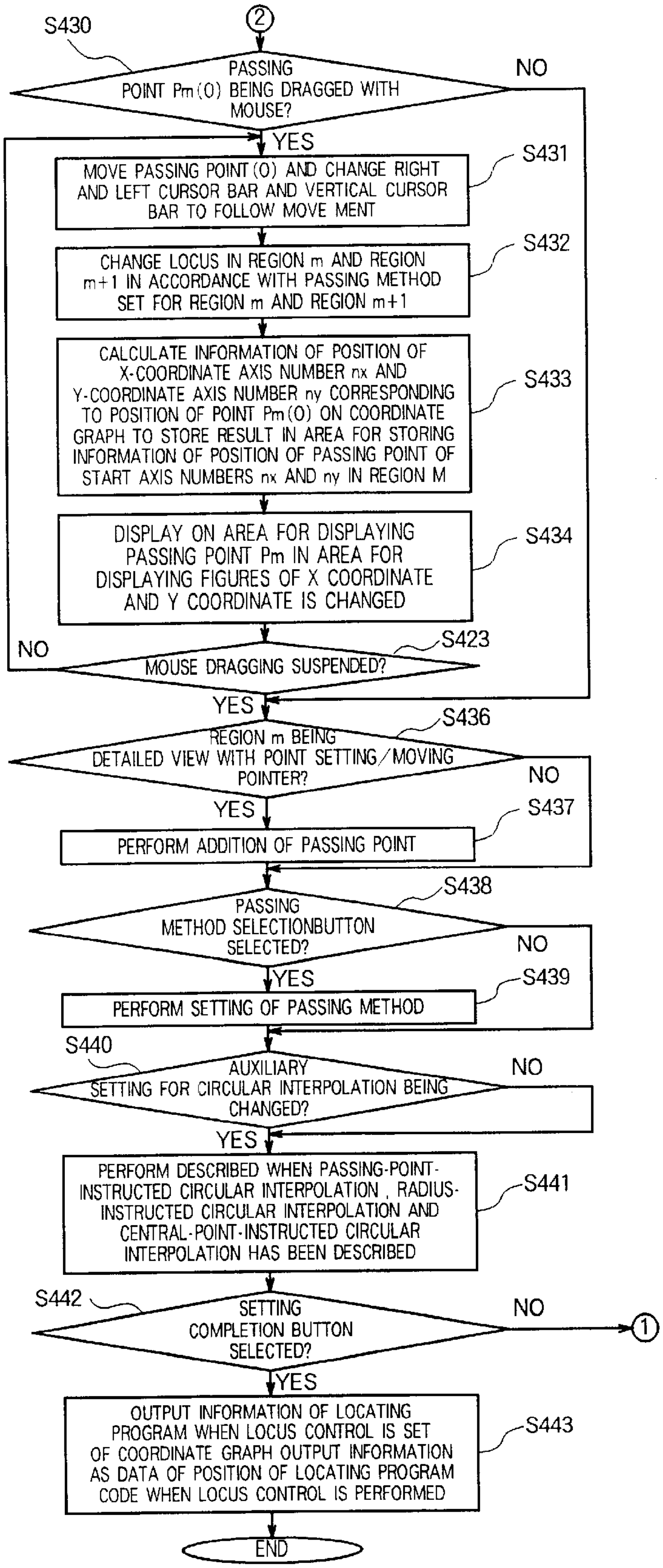

In a state shown in FIG. 39, a passing-method storage area 166 for the region M+1 is initialized to "straight line" (step S420). Then, the operation proceeds to step S421. When the location end point 151 is being dragged with the mouse (step S421), the location end point (•) is moved to follow the movable pointer 154. Moreover, also the cursor bars 155*a* and 155*b* are changed so that also the locus 162 in the region M+1 is changed by the passing method 166 set for the region M+1 (step S422). Position information of X-coordinate axis number nx and that of Y-coordinate axis number ny corresponding to the position of the point (•) on the coordinate graph are calculated so as to be stored in the locating-end-point-position-information storage area 122 of the start axis numbers nx and ny (step S322). Moreover, display in the end-point-position display areas 143*a* and 143*b* of the areas 137*a* and 137*b* in which the number of set information on X- and Y-coordinates are stored is updated (step S323). The processes in steps S422 to S323 are performed until mouse dragging is suspended. When mouse dragging has been suspended, the operation proceeds to step S424 (step S423). If the location end point 151 is not being dragged with the mouse in step S421, the operation proceeds to step S424.

If the location start point 150 is being dragged with the mouse (step S424), the location start point (×) is moved to follow the movable pointer 154. Also the cursor bars 155*a* and 155*b* are changed (step S425). If the passing point $P_1$ has been set (step S426), the locus 162 for the region 1 is changed by the passing method 166*$p_1$* (step S427). If setting is not performed, the locus 162 for the region M+1 (=region 1) is changed by the passing method 166 (straight line) set for the region M+1 (step S428). Position information of the X-coordinate axis number nx and that of the Y-coordinate axis number ny corresponding to the position of the point (×) on the coordinate graph are calculated so as to be stored in the locating-start-point-position-information storage area 127 of the start axis numbers nx and ny (step S327). Thus, display on the start-point-position display areas 142*a* and 142*b* of the areas 137*a* and 137*b* in which the number of set information on X- and Y-coordinates are stored is updated (step S328). The processes in steps S425 to S328 are performed until mouse dragging is suspended. When mouse dragging has been suspended, the operation proceeds to step S430 (step S429). If the location start point 150 is not being dragged with the mouse in step S424, the operation proceeds to step S430.

When the passing point $P_m$159*$p_m$* is being dragged with the mouse (step S430), the passing point (O) is moved to follow the movable pointer 154. Moreover, also the cursor bars 155*a* and 155*b* are changed (step S431). Thus, the locus 162 in the regions m and m+1 is changed by the passing methods 166*$p_m$* and 166*$p_{m+1}$* set for the regions m and m+1 (step S432). Position information of the X-coordinate axis number nx and that of the Y-coordinate axis number ny corresponding to the position of the point $P_m$ (O) on the coordinate graph are calculated so as to be stored in the areas corresponding to the nx and ny axes of the passing point position information storage areas 169*$a_m$*, 169*$b_m$* and 169*$c_m$* of the start axis numbers in the region m (step S433). Thus, display of the display areas 161$_a m$ and 16*$b_m$* of the position of the passing point $P_m$ in the areas 137*a* and 137*b* in which the number of set information on X- and Y-coordinates are stored (step S434). The processes in steps S431 to S434 are performed until mouse dragging is suspended. When mouse dragging has been suspended, the operation proceeds to step S436 (step S423). If the passing point $P_m$ is not being dragged with the mouse in step S430, the operation proceeds to step S436.

Figure 41:
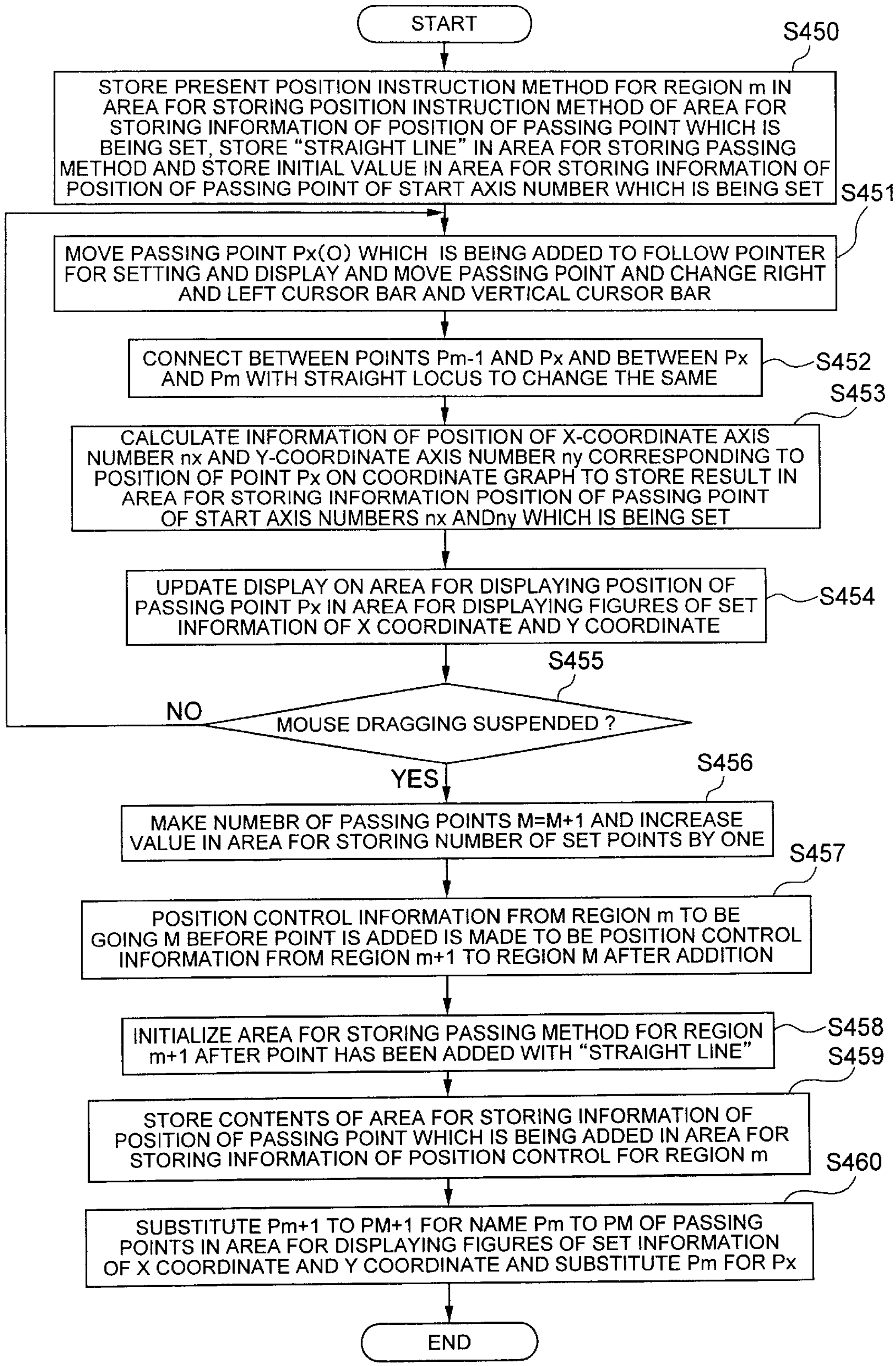
FIG. 41 is a flow chart showing the operation which is performed when a passing point is additionally set during the locating programming operation by using the coordinate graph in a case where locus control is set in the location programming apparatus according to the first embodiment of the present invention.

When the locus in the region m is being dragged with the pointer for setting/moving the passing point (step S436), the process for adding the passing point shown in a flow chart shown in FIG. 41 is performed (step S437). When dragging with the pointer for setting/moving the passing point is not being performed in step S436, the operation proceeds to step S438.

Figure 42:
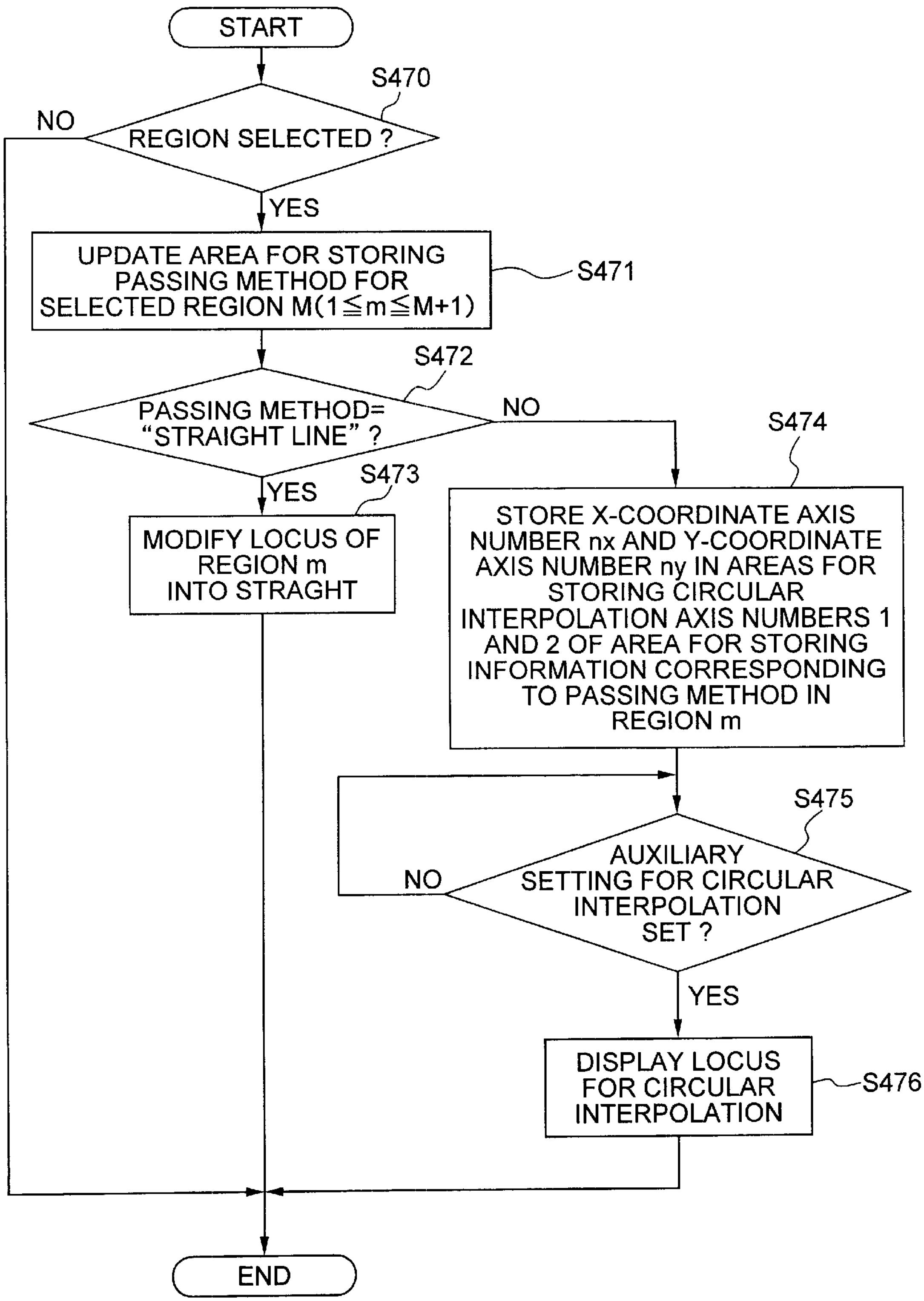
FIG. 42 is a flow chart showing the operation which is performed when a passing method is set during the locating programming operation by using the coordinate graph in a case where locus control is set in the location programming apparatus according to the first embodiment of the present invention.

When the passing method selection button has been selected (step S438), the process for setting a passing method shown in a flow chart shown in FIG. 42 is performed (step S439). If the button has not been selected, the operation proceeds to step S440.

When auxiliary setting is being changed in the region in which the passing method is the circular interpolation (step S440), the processes described in the passing-point-instructed circular interpolation, the radius-instructed circular interpolation and the central-point-instructed circular interpolation are performed (step S441).

The operation returns to step S421 until the setting completion button 160 is selected. When the setting completion button 160 has been selected (step S442), locating program information of coordinate graph output information when the locus control has been set is outputted as position data of the linear control locating program code in accordance with a flow chart shown in FIGS. 43 and 44. Then, the operation is ended (step S443).

The operation for adding a passing point will now be described with reference to a flow chart shown in FIG. 41. When a locus in a region m is dragged, the position-information storage area for the passing point which is being added is initialized. Position instruction method 165$p_m$ for the present region m is stored in the position-instruction-method storage area 165$p_x$ as an initial value, "straight line" is stored in the passing-method storage area 166$p_x$ as an initial value and information of the dragging position is stored in the passing-point-position-information storage areas 169$a_x$, 169$b_x$ and 169$c_x$ of the start axis numbers as initial value (step S450). Then, the passing point $P_x$ (O) which is being added is moved to follow the passing point setting/moving pointer 158. Moreover, the cursor bars 155$a$ and 155$b$ are displayed so that change is made (step S451). Thus, the area between the points $P_{m-1}$ and $P_x$ and that between the points $P_x$ and $P_m$ are connected to each other with a linear locus so as to be changed (step S452). Moreover, position information of the X-coordinate axis number nx and that of the Y-coordinate axis number ny corresponding to the position of the point $P_x$ on the coordinate graph are calculated so as to be stored in the areas of the areas 169$a_x$, 169$b_x$, and 169$c_x$ for storing position information of a passing point of the start axis number which is being set (step S453). Thus, display on the areas 161$a_x$ and 161$b_x$ for displaying the position of the passing point $P_x$ in the areas 137$a$ and 137$b$ in which the number of set information on X- and Y-coordinates are stored is updated (step S454). The processes in steps S451 to S454 are performed until mouse dragging is suspended. When the mouse dragging has been suspended, the operation proceeds to step S456 (step S455) so that locating program information is updated.

Initially, the number M of passing points is made to be M+1, the value of the area 120 for storing the number of set points is increased by one (step S456). Position control information 168$pm$ to 168$p_M$ of the regions m to M before the point is added is made to be position control information 168$p_{m+1}$ to 168$p_m$ of the regions m+1 to M after the point has been added (step S457). Then, the passing-method storage area 166$p_{m+1}$ of the region m+1 after the point has been added is initialized to "straight line" (step S458). Then, the contents of the area for storing information of the position of the passing point which is being added are stored in the position-control-information storage area 168$p_m$ for the region m (step S459). Finally, passing point names $P_{m+1}$ to $P_{M+1}$ are substituted for $P_m$ to $P_M$ of the areas 137$a$ and 137$b$ in which the number of set information on X- and Y-coordinates are stored. Moreover, $P_m$ is substituted for $P_x$ (step S460). Thus, the process for adding a passing point is ended.

The operation which is performed when the passing method selection button has been selected will now be described with reference to a flow chart shown in FIG. 42. If no region has been selected, no operation is performed and the process is ended (step S470). The passing-method storage area 166 or 166$p_m$ of the region m ($1 \leqq m \leqq M+1$) indicated with the selected region 163 is updated (step S471). When "straight line 164$a$" has been selected (step S472), display of the locus in the region m is modified with display of a straight line (step S473). If the locus is not the "straight line", X-coordinate axis number nx and Y-coordinate axis number ny are stored in the areas 170$a$ and 170$b$ for storing circular interpolation axis numbers 1 and 2 of the area 167 or 167$p_m$ for storing passing-method corresponding information for the region m (step S474). When auxiliary setting of the circular-arc passing point, radius and central point of the circular arc has been set in accordance with the passing point, radius and central-point instructed circular interpolation (step S475), the locus of the circular arc is displayed (step S476). Thus, the operation for selecting the passing method is ended.

Figure 43:
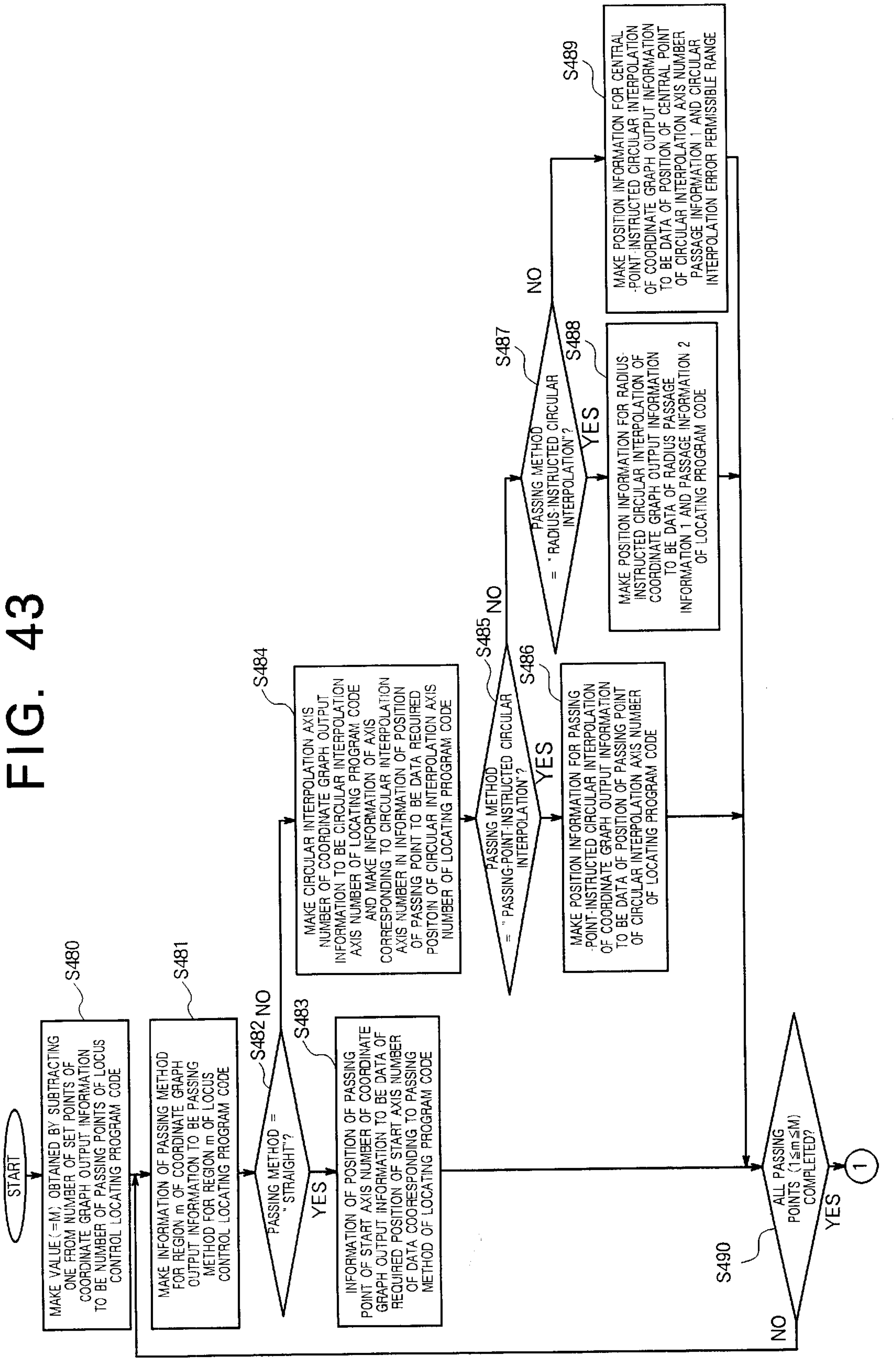
FIGS. 43 and 44 show a flow chart showing the operation which is performed when setting is completed during the locating programming operation by using the coordinate graph in a case where locus control is set in the location programming apparatus according to the first embodiment of the present invention.
Figure 44:
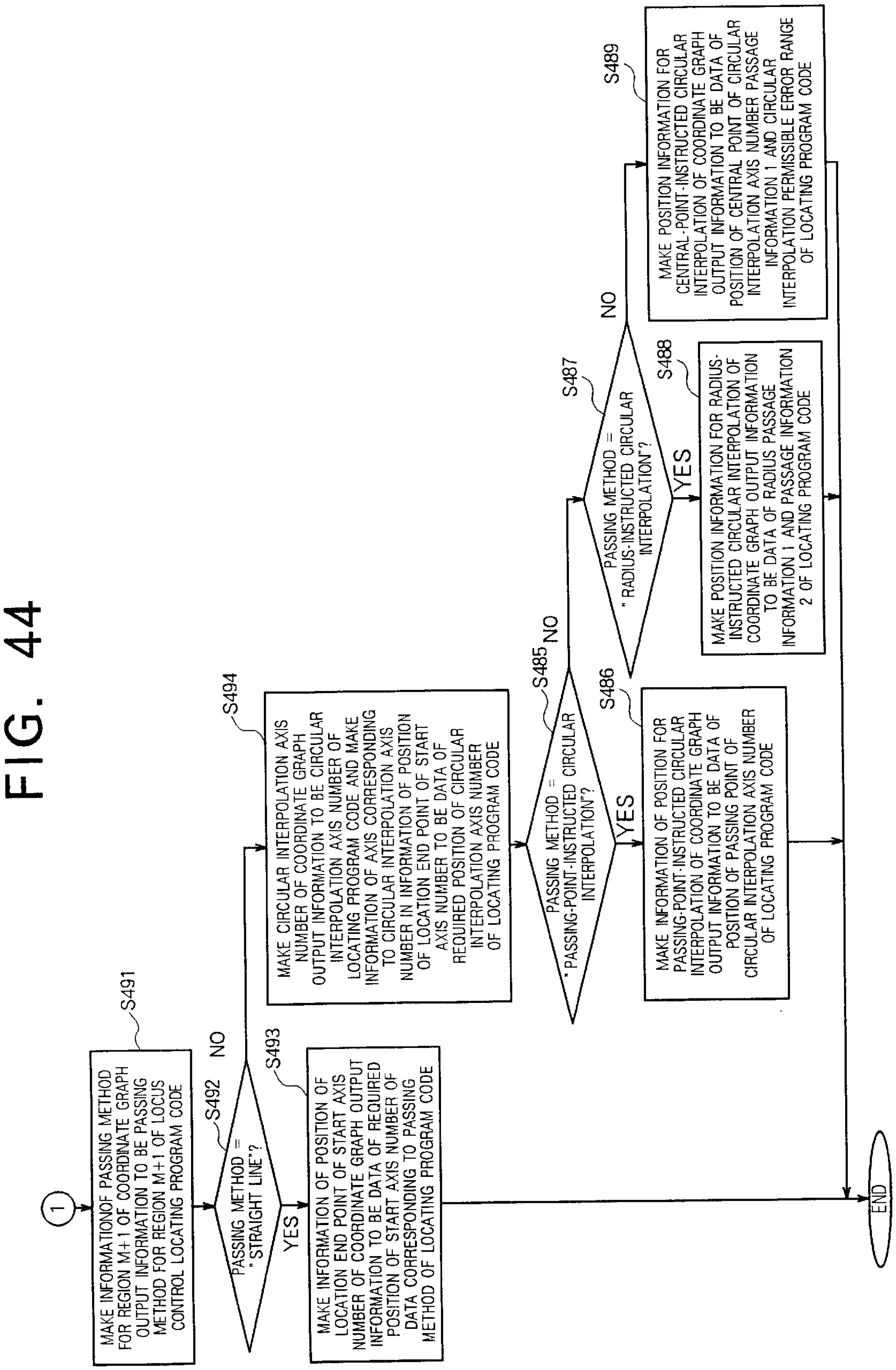

The operation which is performed when the setting completion button has been selected will now be described with reference to a flow chart shown in FIGS. 43 and 44. A value −1(M) obtained by subtracting one from a value of the number 120 of the set points of coordinate graph output information is made to be the number 2607 of passing points of the locus control locating program code (step S480). Output is made from area 168$p_m$ for storing position control information of the region m of coordinate graph output information to the region m 2608$p_m$ of the locus control locating program code is performed for the region 1 to region M. Initially, information of the passing method 166$p_m$ is made to be passing method 2602$p_m$ (step S481). When the passing method is "straight line" (step S482), passing-point-position information 169$a_m$, 169$b_m$ and 169$c_m$ of the start axis numbers are made to be data 2610$a$, 2610$b$ and 2610$c$ of the start axis numbers of data 2603$p_m$ corresponding to the passing method (step S483). When the passing method is not straight line, circular interpolation axis numbers 170$a$ and 170$b$ are made to be circular interpolation axis numbers 2611$a$ and 2611$b$. Moreover, information of the axes corresponding to the circular interpolation axis numbers of passing-point-position information 169$a_m$, 169$b_m$ and 169$c_m$ of the start axis numbers is made to be required position data 2612$a$ and 2612$b$ of the circular interpolation axis numbers (step S484). When the passing method is the "passing-point-instructed circular interpolation" (step S485), passing-point-position data 2613$a$ and 2613$b$ of the circular interpolation axis number is outputted from position information 171 when the method is the passing-point-instructed circular interpolation (step S486). When the passing method is the "radius-instructed circular interpolation" (step S487), radius 2614, data 2615 of passage information 1 and data 2616 of passage information 2 are outputted from position information 172 when the interpolation is the radius-instructed circular interpolation (step S488). When the passing method is the "central-point-instructed circular interpolation", central-point-position data 2617*a* and 2617*b* and circular-interpolation-error-permissible range 2618 of the circular interpolation axis numbers are outputted from the position information 173 when the interpolation method is the central-point-instructed circular interpolation (step S489).

When the processes in steps 481 to 489 for all of the passing points ($1 \leq m \leq M$) have been completed (step S490), a process for the region M+1 is similarly performed. Information of the passing method 166 is made to be passing method 2602 (step S491). When the passing method is the "straight line" (step S492), location-end-point-position information 122*a*, 122*b* and 122*c* of the start axis numbers is made to be required position data 2610*a*, 2610*b* and 2610*c* of data 2603 corresponding to the passing method (step S493). When the passing method is not the straight line method, circular interpolation axis numbers 170*a* and 170*b* are made to be circular interpolation axis numbers 2611*a* and 2611*b*. Moreover, information of the axes corresponding to circular interpolation axis numbers of location-end-point-position information 122*a*, 122*b* and 122*c* of the start axis numbers is made to be required position data 2612*a* and 2612*b* of the circular interpolation axis numbers (step S494). Moreover, the processes which are the same as those in steps S485 to S489 are performed, and then the operation which is performed when setting has been completed is ended.

The above-mentioned location programming apparatus enables the passing point to easily be set, changed and added when a plurality of passing points are instructed and the locus control is set. Moreover, the process of the change of the locus operation occurring due to change in the position of the passing point can simultaneously be confirmed.

The above-mentioned location programming apparatus enables a locating program for use when the locus control is performed to easily be set and changed by using a locus graph.

Figure 45:
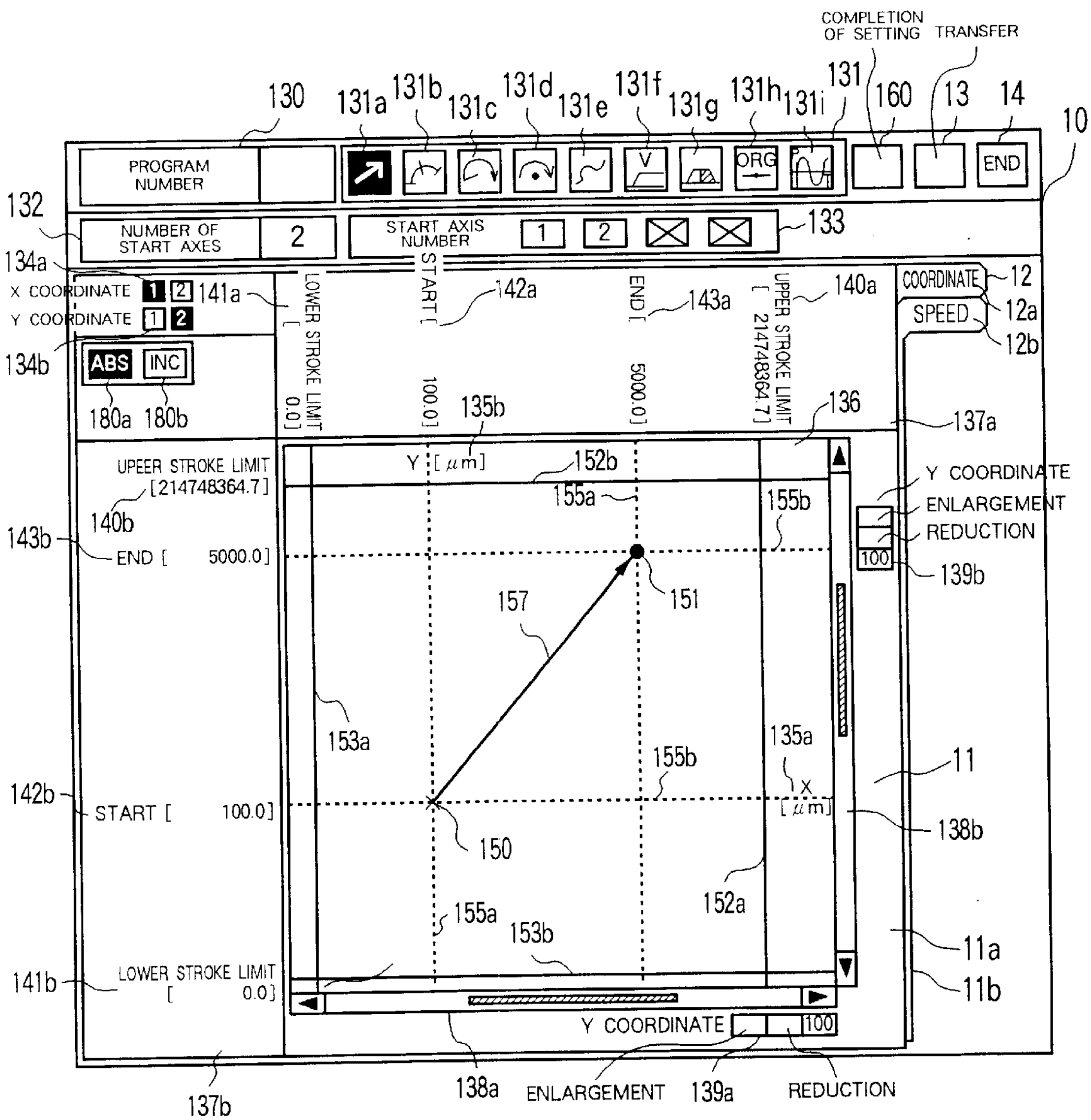
FIG. 45 is a diagram showing an example of a locating programming window by using a absolute coordinate graph in a case where liner control of two axes is set in the location programming apparatus according to the first embodiment of the present invention.
Figure 46:
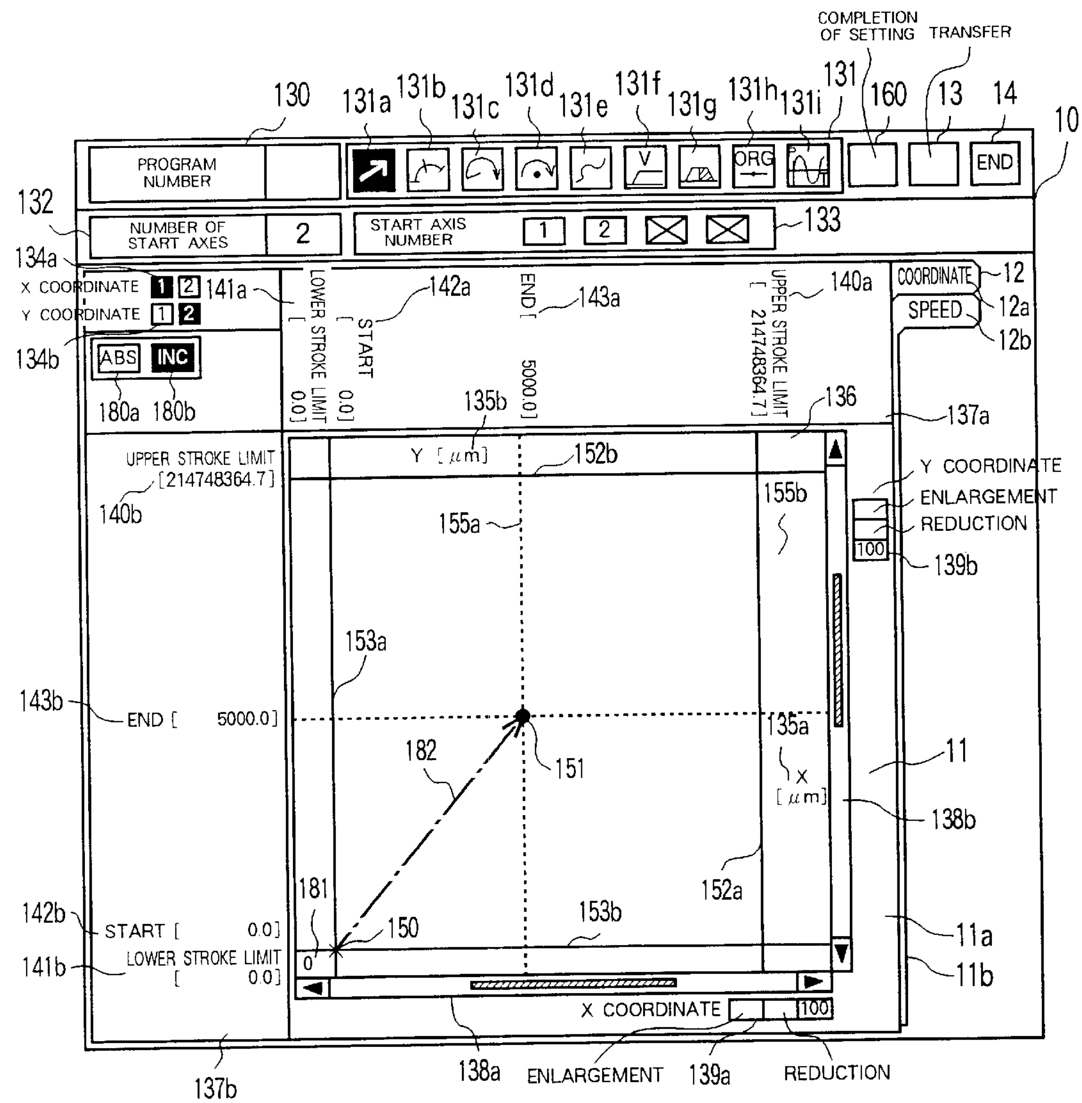
FIG. 46 is a diagram showing an example of a locating programming window using a relative coordinate graph in a case where liner control of two axes is set in the location programming apparatus according to the first embodiment of the present invention.

8. Locating Programming for Setting Position Instruction Method by Using Coordinate Graph The operation for performing locating programming by setting a position instruction method by using a coordinate graph will now be described with reference to FIGS. 45 to 49. FIG. 45 shows an example of a window for performing programming of linear interpolation of two axes by using an absolute coordinate graph in such a manner that the locating position is instructed with an absolute position. FIG. 46 shows an example of a window for performing programming of linear interpolation of two axes by using a relative coordinate graph in such a manner that the locating position is instructed with a relative amount of movement from the locating start point. Referring to FIGS. 45 and 46, reference numeral 180 represents a position-instruction-method selection button for selecting either absolute-position instruction 180*a* or relative-movement-amount instruction 180*b*. When the initial window of the coordinate graph is displayed, an absolute position instruction is displayed. Reference numeral 157 represents a locus when the absolute position is instructed and 182 represents a locus when the relative amount of movement is instructed. A solid line and an alternate long and short dash line are used to display the corresponding instruction. Reference numeral 181 represents a reference point for a relative coordinate.

Figure 47:
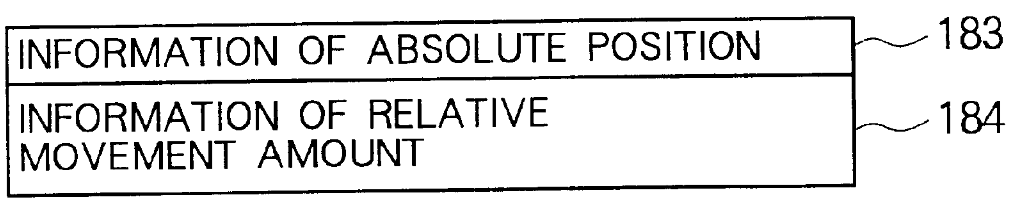
FIG. 47 is a detailed view showing a position information storage area for each point of coordinate graph output information of the location programming apparatus according to the first embodiment of the present invention.

FIG. 47 shows the structure of a position-information storage area for each point of coordinate graph output information, the area being composed of an absolute-position-information storage area 183 and a relative-movement-amount storage area 184. Foregoing information corresponds to each point position information in the locating-end-point-position-information storage area 122 and the location-control-type corresponding information storage area 123 of the start axis numbers shown in FIG. 13 and the locating-start-point-position-information storage area 127 of the start axis number shown in FIG. 14.

Figure 48:
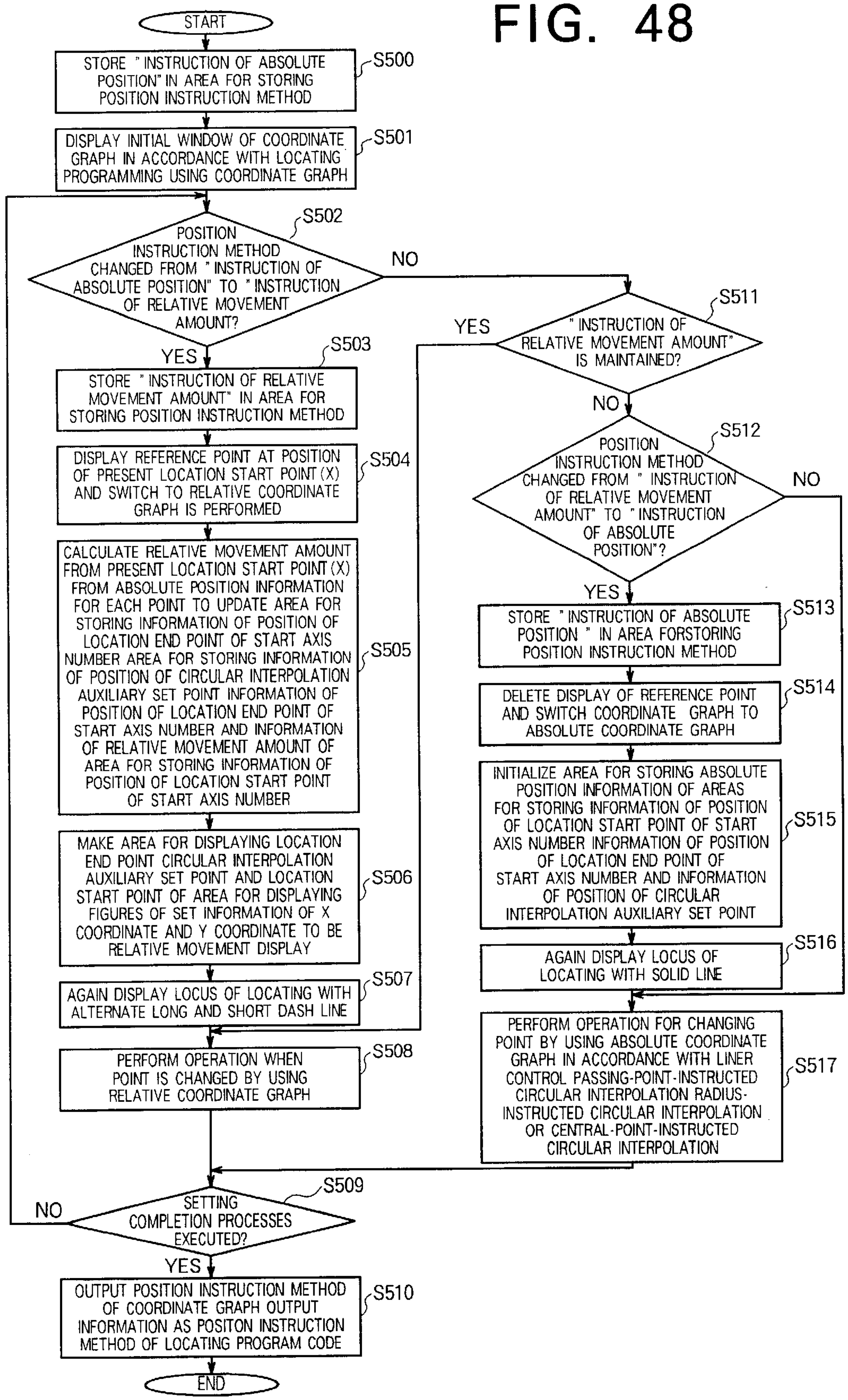
FIG. 48 is a flow chart showing the operation which is performed when a position instruction method is set for the locating programming using the coordinate graph in the location programming apparatus according to the first embodiment of the present invention.

The operation which is performed when the position-instruction-method selection button has been selected will now be described with reference to a flow chart shown in FIG. 48. When the locating control type is linear control locating, passing-point-instructed circular interpolation, the radius-instructed circular interpolation or the central-point-instructed circular interpolation, "absolute position instruction" is stored in the position-location-method storage area 121 of the graphic programming work memory 4 (step S500). In accordance with the description in the coordinate graph, a an initial window of the coordinate graph is displayed (step S501).

When the relative-movement-amount instruction 180*b* is selected with the position-instruction-method selection button 180 and thus the position instruction method has been changed from the "absolute position instruction" to the "relative movement amount instruction" (step S502), "relative movement amount instruction" is stored in the position-location-method storage area 121 (step S503). Moreover, the reference point 181 is displayed at the position of the present location start point (×) 150 so that switch to the relative coordinate graph is performed (step S504). The relative movement amount is calculated from absolute position information of each point in accordance with equations 500, 501 and 502 so as to be stored in the relative-movement-amount storage area 184 portion of the locating-start-point-position-information storage areas 127*a*, 127*b* and 127*c* of the start axis numbers, the location-end-point-position-information storage areas 122*a*, 122*b* and 122*c*, the location-end-point-position-information storage areas 122*a*, 122*b* and 122*c* and the location-control-type corresponding information storage area 123 (step S505).

$$Psi(n)=0 \quad \text{Equation 500}$$

$$Pei(n)=Pea(n)-Psa(n) \quad \text{Equation 501}$$

$$Poi(n)=Poa(n)-Psa(n) \quad \text{Equation 502}$$

$$(1 \leq n \leq h)$$

Psi(n): location start point relative movement amount position information of start axis number n Pei (n): location end point relative movement amount position information of start axis number n Poi (n): circular interpolation auxiliary setting point relative movement amount position information of start axis number n Psa (n): location start point absolute position information of start axis number n Pea (n): location end point absolute position information of start axis number n Poa (n): circular interpolation auxiliary setting point absolute position information of start axis number n h: number of start axes Displayed values of points 142*a*, 142*b*, 143*a*, 143*b*, 502*a*, 502*b*, 551*a* and 551*b* in the areas 137*a* and 137*b* in which the number of set information on X- and Y-coordinates are stored are updated to relative movement amounts in accordance with relative movement amount position information of the points (step S506). Moreover, a locus of the location is again displayed with an alternate long and short dash line (step S507).

The operation for changing a point in a relative coordinate graph will now be described with reference to a flow chart shown in FIG. 49 (step S508).

When a process for completing setting is not performed when the point is changed, the operation returns to step S502. When setting has been completed (step S509), the position instruction method 121 of the coordinate graph output information is outputted as a position instruction method 2105 of the locating program code (step S510).

If the position instruction method which is the "relative movement amount instruction" is not changed in step S502, the operation proceeds to step S508 (step S511). Thus, the absolute-position instruction 180*a* is selected so that the position instruction method is changed from the "relative movement amount instruction" to the "absolute position instruction" (step S512). Thus, the "absolute position instruction" is stored in the position-location-method storage area 121 (step S513). Then, display of the reference point 181 is deleted and switch to the absolute coordinate graph is performed (step S514). In accordance with equations 503, 504 and 505, the absolute-position-information storage area 183 portion of the location-start-point-position-information storage areas 127*a*, 127*b* and 127*c* of the start axis numbers, the location-end-point-position-information storage areas 122*a*, 122*b* and 122*c* of the start axis numbers and the location-control-type corresponding information storage area 123 is initialized (step S515). Thus, the locus of locating is again displayed with a solid line (step S516).

$$Psa(n)=Psi(n) \qquad \text{Equation 503}$$

$$Pea(n)=Pei(n) \qquad \text{Equation 504}$$

$$Poa(n)=Poi(n) \qquad \text{Equation 505}$$

$$(1 \leqq n \leqq h)$$

Psi (n): location start point relative movement amount position information of start axis number n Pei (n): location end point relative movement amount position information of start axis number n Poi (n): circular interpolation auxiliary setting point relative movement amount position information of start axis number n Psa (n): location start point absolute position information of start axis number n Pea (n): location end point absolute position information of start axis number n Poa (n): circular interpolation auxiliary setting point absolute position information of start axis number n h: number of start axes The operation for changing a point with an absolute coordinate graph is performed in accordance with the linear control, the passing-point-instructed circular interpolation, the radius-instructed circular interpolation and the central-point-instructed circular interpolation (step S517). Then, the operation proceeds to step S509.

If the instructed position instruction method "absolute position instruction" is not changed in step S512, the operation proceeds to step S517.

Figure 19:
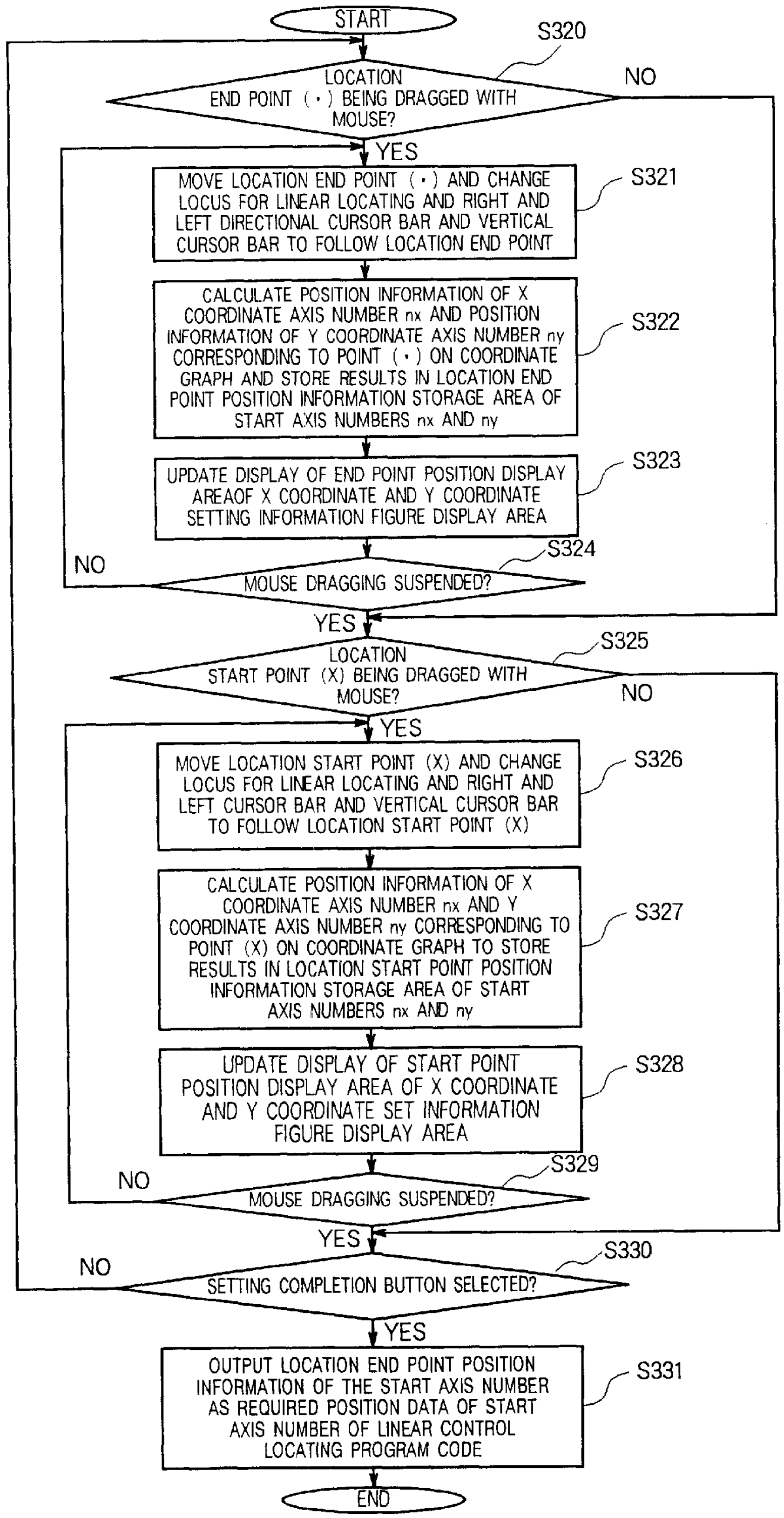
FIG. 19 is a flow chart showing the locating programming operation by using a coordinate graph in a case where linear control is set in the location programming apparatus according to the first embodiment of the present invention.

If the position instruction method is the absolute position instruction in step S517, an operation is performed in accordance with a flow chart shown in FIG. 19 when linear control is performed. Position information of the location end point and that of the location start point calculated in steps S322 and 327 are stored in the absolute-position-information storage area 183. In step S331 required position data of the locating program code is outputted in accordance with absolute-position-information storage area 183 of the locating-end-point-position-information storage area 122 of the start axis number. Also the passing-point-instructed circular interpolation, the radius-instructed circular interpolation and the central-point-instructed circular interpolation are performed similarly.

The operation for changing a point with a relative coordinate graph will now be described with reference to a flow chart shown in FIG. 49. The same operations in the flow chart as those of the point changing operation with the absolute coordinate graph in the flow chart shown in FIG. 19 are given the same step numbers and operated as described in the linear control.

In step S520 which is the operation during dragging of a location end point with the mouse, the relative among from point (•) to the location start point (×) on the coordinate graph is calculated as position information of X-coordinate axis number nx and that of Y-coordinate axis number ny so as to be stored in the relative-movement-amount storage area 184 of the locating-end-point-position-information storage area 122 of the start axis numbers nx and ny (step S520). Moreover, information of the relative movement amount is displayed in the end-point-position display areas 143*a* and 143*b* of the areas 137*a* and 137*b* in which the number of set information on X- and Y-coordinates are stored (step S521). Then, the operation proceeds to step S324.

After step S326 which is the operation during dragging of the location start point with the mouse has been performed, also the reference point 181 for the relative coordinate is moved to following location start point (×)(step S522). The moving location start point (×) is always made to be a reference point (O) to calculate a relative amount to the location end point (•) on the coordinate graph. A result is, as position information of the X-coordinate axis number nx and Y-coordinate axis ny, stored in the relative-movement-amount storage area 184 of the end-point-position-information storage area 122 of the start axis numbers nx and ny (step S523). Finally, information of the relative movement amount is displayed on the end-point-position display areas 143*a* and 143*b* of the areas 137*a* and 137*b* in which the number of set information on X- and Y-coordinates are stored (step S524). Then, the operation proceeds to step S329.

When the setting completion button 160 has been selected (step S330), required position data of the locating program code is outputted in accordance with relative-movement-amount information 184 of location-end-point-position information 122 of the start axis number (step S525).

The processes in the other steps are the same as those when a point is changed by using the absolute coordinate graph.

Figure 49:
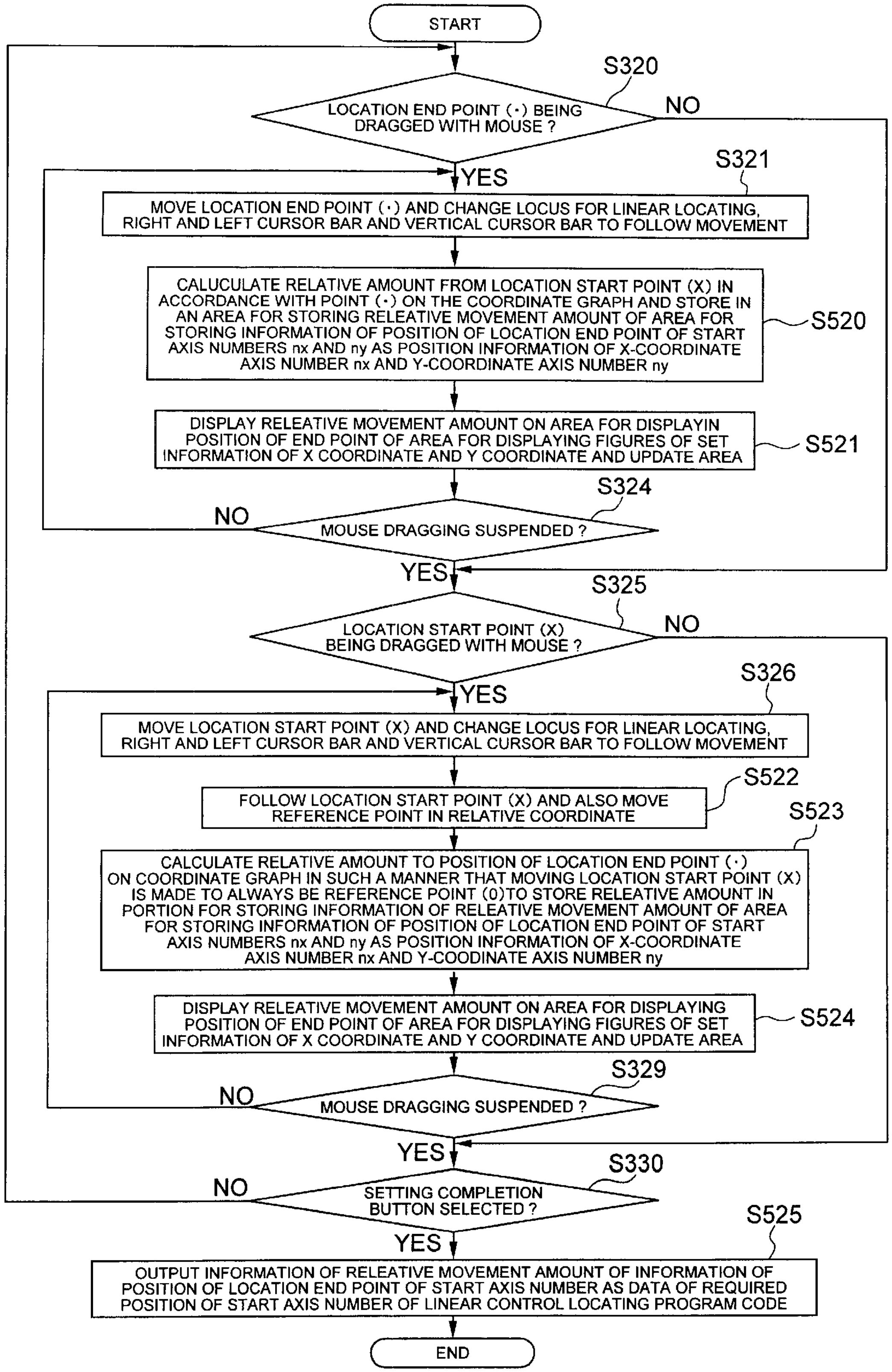
FIG. 49 is a flow chart showing the locating programming operation using the relative coordinate graph in a case where linear control is set in the location programming apparatus according to the first embodiment of the present invention.

FIG. 49 shows the linear control. When circular interpolation is performed, a process similar to that for the location end point is added for the circular interpolation auxiliary point.

The above-mentioned location programming apparatus enables the method of instructing a position to immediately be understood. If a method of instructing the position has been changed, position information can be maintained and the same is converted into position information corresponding to the position instruction method.

The above-mentioned location programming apparatus enables a locating program to easily be set and changed by using a locus graph. Thus, a position instruction method can easily be recognized from a locus graph.

Figure 50:
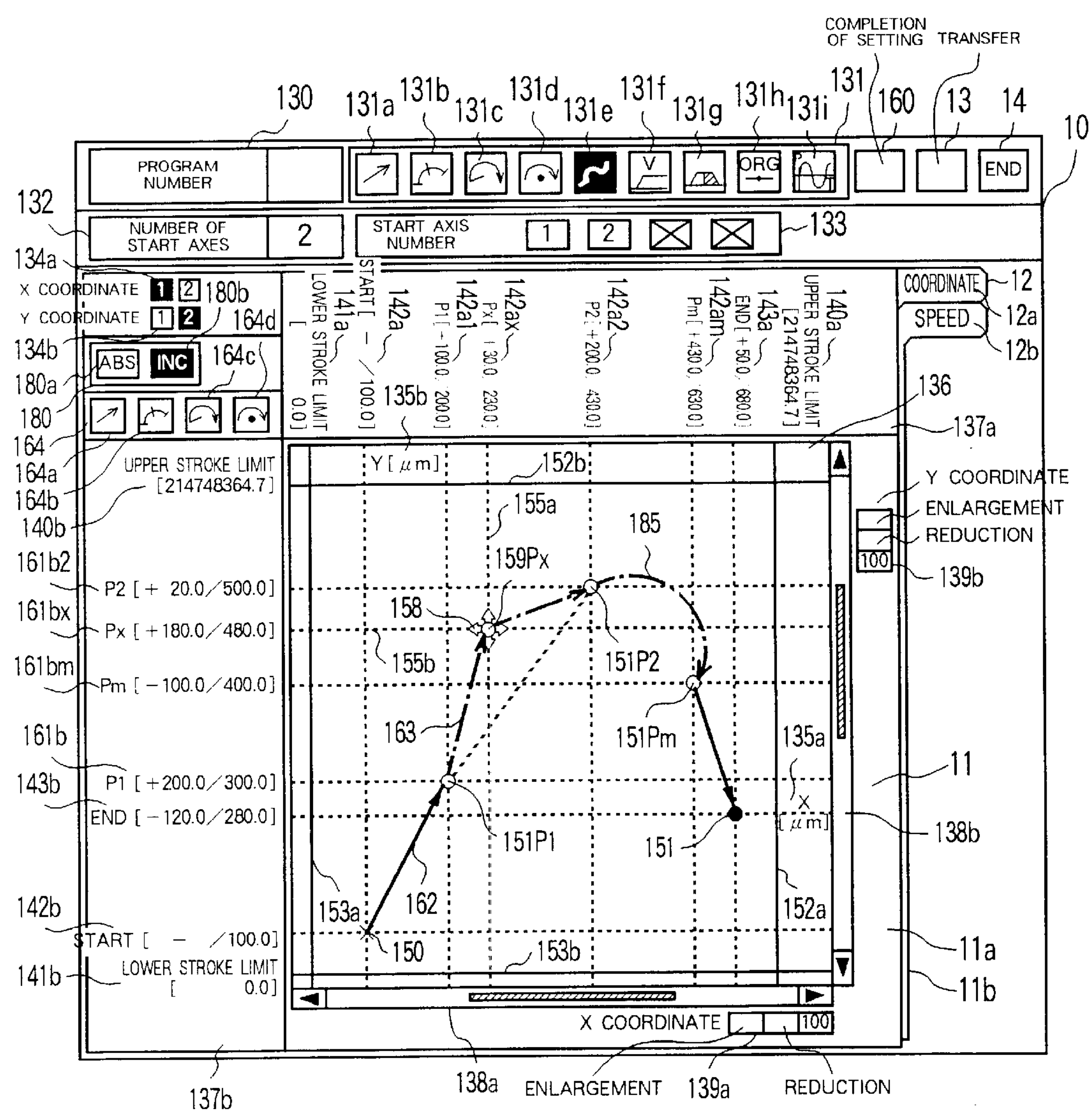
FIG. 50 is a diagram showing an example of a locating programming window using the coordinate graph in a case where position instruction methods for regions are mixed in a case where locus control of two axes is set in the location programming apparatus according to the first embodiment of the present invention.

9. Locating Programming for Locus Control for Setting Position Instruction Method by Using Coordinate Graph The operation for performing locating programming of a locus control in such a manner that a position instruction method is set by using a coordinate graph will now be described with reference to FIGS. 50 to 60. FIG. 50 shows an example of a window for performing programming for locus-controlling two axes by using a coordinate graph in a case where a region in which the passing point and location end point are instructed with an absolute position and a region in which instruction is performed in accordance with a relative movement amount from the previous point are mixed. Referring to the drawings, reference numeral 180 represents a position-instruction-method selection button 180 for each region. Either of the absolute-position instruction 180*a* or the relative-movement-amount instruction 180*b* is selected for a selected region 163 so that a position instruction method is set and changed. When the initial window of the coordinate graph is displayed, the region M+1 (=region 1) is instructed with an absolute position. Reference numeral 162 represents a locus in an absolute position instruction region and 185 represents a locus in a relative movement amount instruction region which are displayed by different types of lines which are a solid line and an alternate lone and short dash line. Both of absolute position information and relative movement amount information are displayed on point position display areas 142*a*, 142*b*, 143*a*, 143*b*, 142$a_x$, 142$a_1$, 142$a_2$, 142$a_m$, 161$b_x$, 161$b_1$, 161$b_2$ and 161$b_m$ of the areas 137*a* and 137*b* in which the number of set information on X- and Y-coordinates are stored.

Also the areas for storing location end point position information 122 of the start axis number, passing point position information 169$a_m$, 169$b_m$ and 169$c_m$ of the start axis number, each point position information in information 167 corresponding to the passing method shown in FIG. 33 and areas for storing information 169$a_x$, 169$b_x$, and 169$c_x$ of the position of the passing point of the start axis number which is being set and shown in FIG. 47 are composed of the absolute-position-information storage area 183 and the relative-movement-amount storage area 184.

Figure 51:
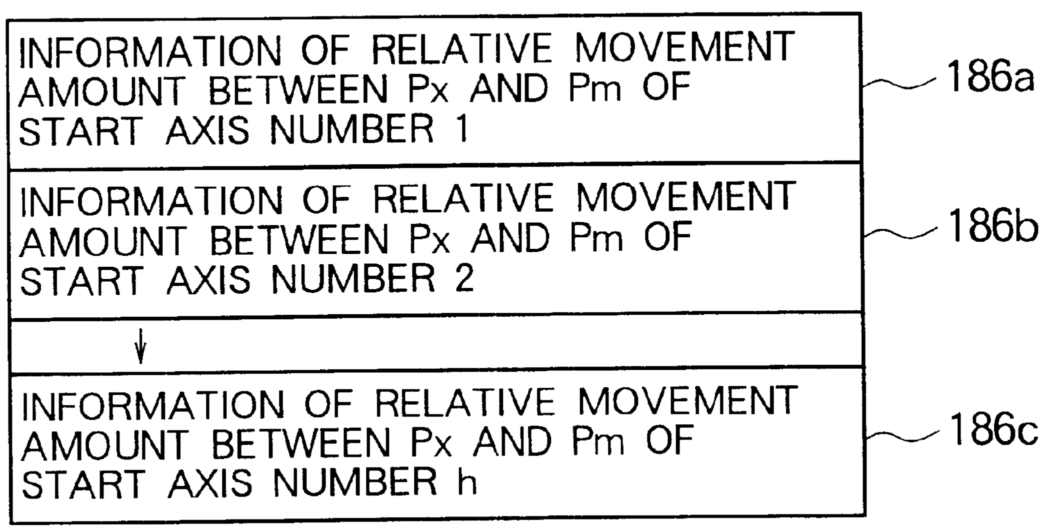
FIG. 51 is a detailed view showing the relative-movement-amount information storage area between passing point which is being added and a next point of the locus control of coordinate graph output information in the location programming apparatus according to the first embodiment of the present invention.

FIG. 51 shows information of the structure of a window for the coordinate-graph-output-information storage area 71 when passing point $P_x$ is being added. The window is composed of $P_x \cdot P_m$ relative movement amount information storage areas 186*a*, 186*b* and 186*c* of the start axis number for storing a result of an amount of a relative movement between $P_x$ and next point $P_m$.

Figure 52:
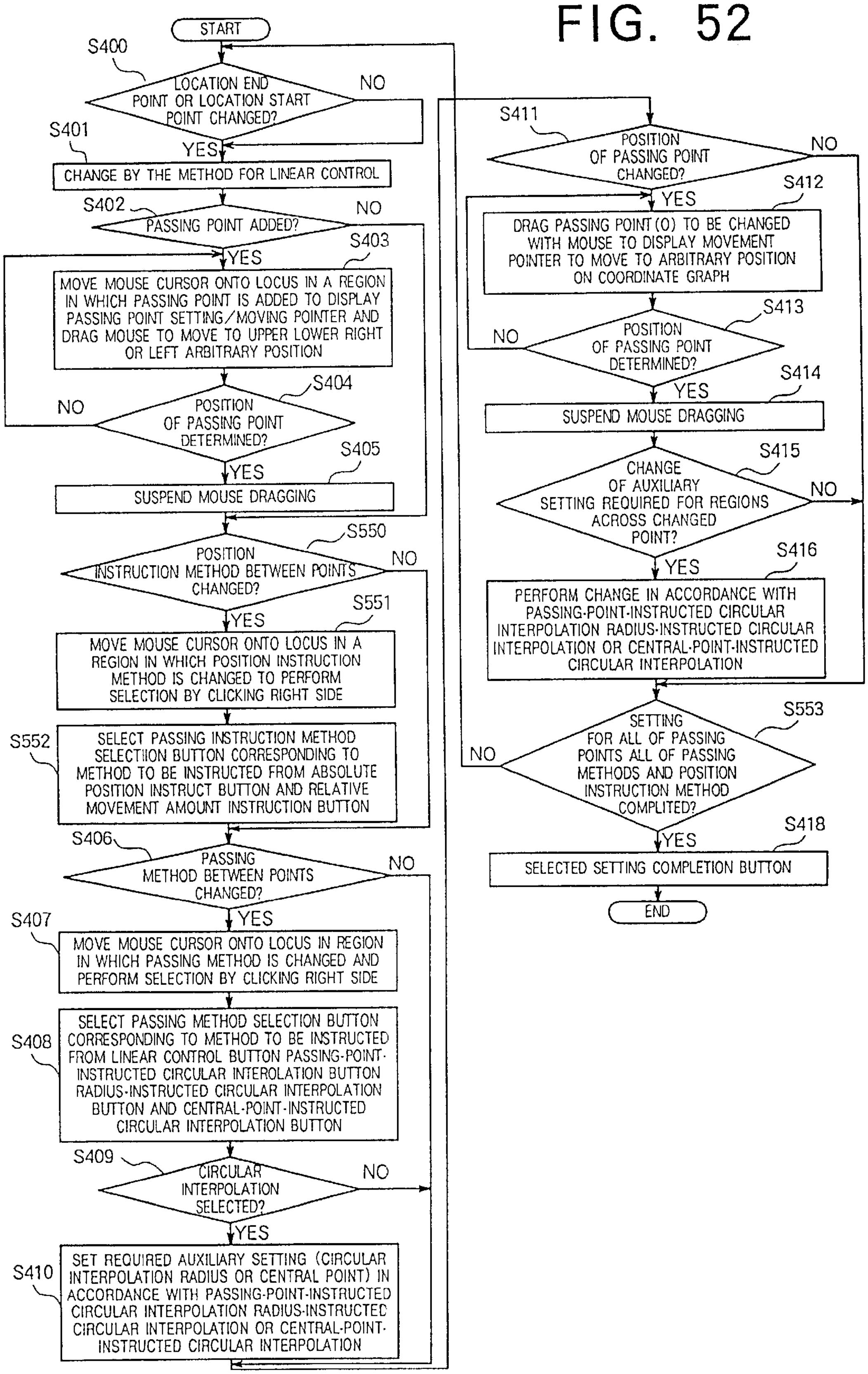
FIG. 52 is a flow chart showing the setting operation of the locating programming by using the coordinate graph in a case where a position instruction method for each region is set when locus control is set in the location programming apparatus according to the first embodiment of the present invention.

The operation for setting and changing the position instruction method for each region will now be described with reference to a flow chart shown in FIG. 52. Referring to FIG. 52, the same portions as those in the flow chart shown in FIG. 38 of the operation for setting and changing the passing point and the passing method by the locus control method are given the same step numbers and they are performed similarly to the locus control. When the position instruction method is changed in each region (step S550), the mouse cursor is moved onto the locus in the region in which the position instruction method is changed. Then, right side is clicked to perform selection (step S551). Then, a button corresponding to required method is selected from the absolute-position instruction 180*a* and the relative-movement-amount instruction 180*b* of the position-instruction-method selection button 180 (step S552). When all of the passing points have been set and the passing method and the position instruction method have been completed for all of the regions (step S553), the setting completion button 160 is selected (step S418). Then, the operation is ended.

Figure 53:
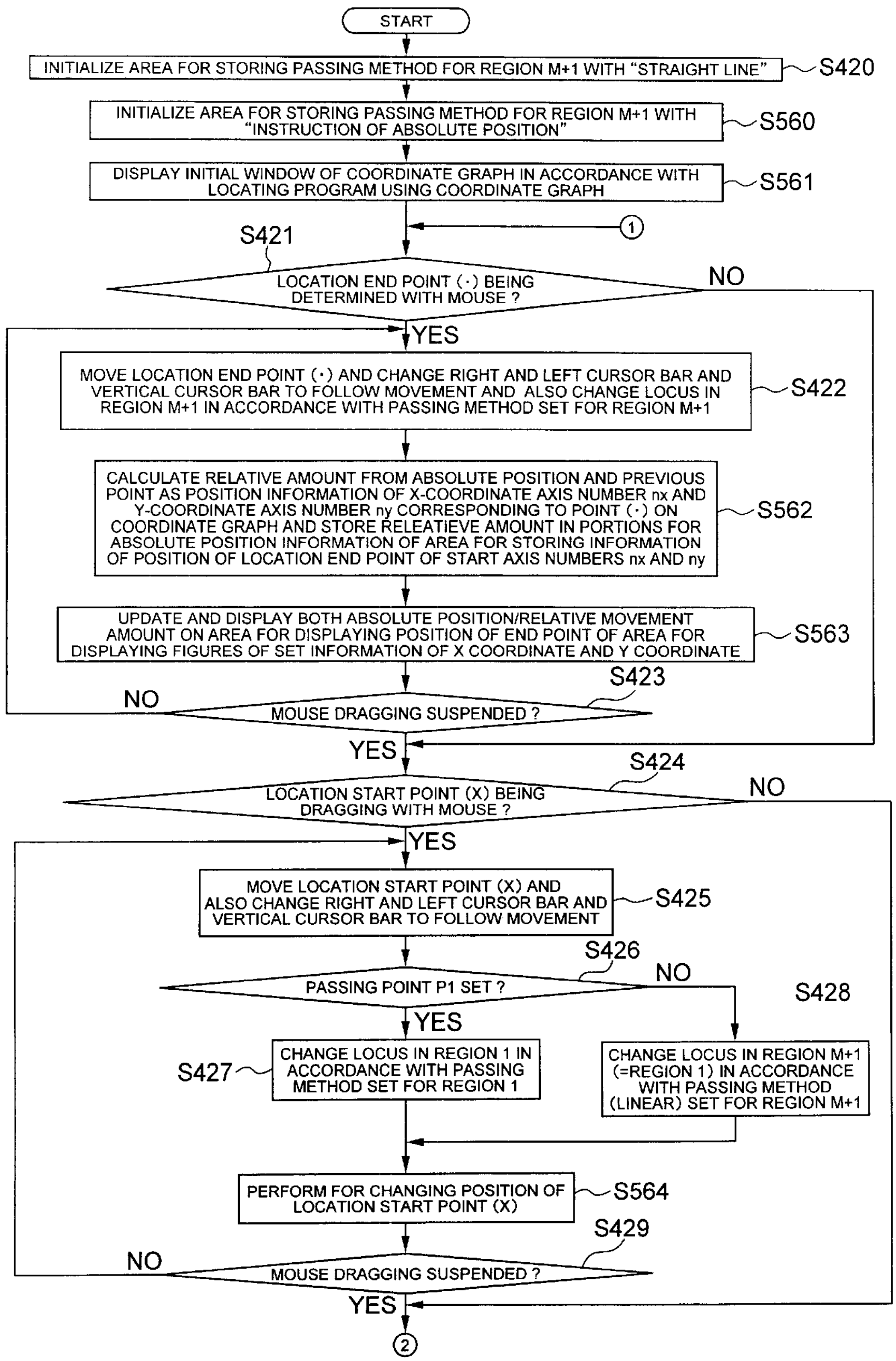
FIGS. 53 and 54 show a flow chart of the operation of the locating programming by using the coordinate graph in a case where a position instruction method is set for each region when locus control is set in the location programming apparatus according to the first embodiment of the present invention.
Figure 54:
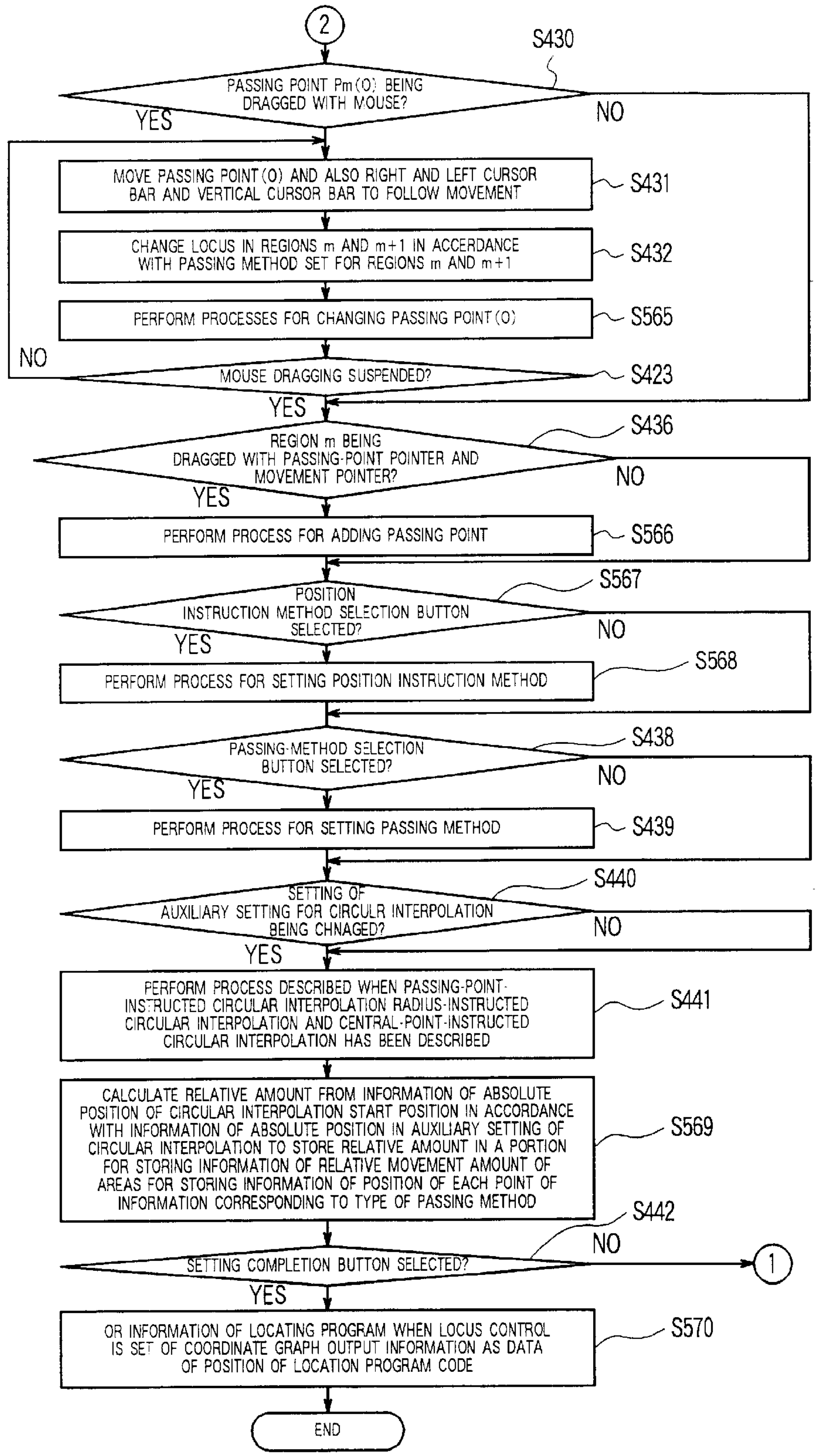

The operation for setting position instruction method for each region in the locus control and performing programming will now be described with reference to a flow chart shown in FIGS. 53 to 60. FIGS. 53 and 54 shows a flow chart showing the overall operation. In FIGS. 53 and 54, the same portions as those in the flow chart shown in FIGS. 39 and 40 of the operation for setting and changing the passing point and the passing method are given the same step numbers and they are operated as described in the locus control. When the locating control type is the locus control, "absolute position instruction" is stored in the position-instruction-method storage area 165 of the graphic programming work memory 4 for the region M+1 (step S560). Thus, an initial window of the coordinate graph is displayed in accordance with the description of the coordinate graph (step S561).

If the position instruction method for each region is the absolute position instruction or the relative movement amount instruction, absolute position information of the subject point and the relative movement amount of regions across the moving point are always updated and administrated when the location start point and the location end point are moved and a passing point is added and moved. When the location end point (•) is being dragged, the absolute positions of the X-coordinate axis number nx and the Y-coordinate axis number ny corresponding to the position of the point (•) and a relative amount from the previous point are calculated so as to be stored in the absolute-position-information storage area 183 and the relative-movement-amount storage area 184 of end-point-position information 122 of the start axis numbers nx and ny (step S562). Then, both of the absolute position and the relative movement amount are displayed in the end-point-position display areas 143*a* and 143*b* of the areas 137*a* and 137*b* in which the number of set information on X- and Y-coordinates are stored (step S563).

Figure 55:
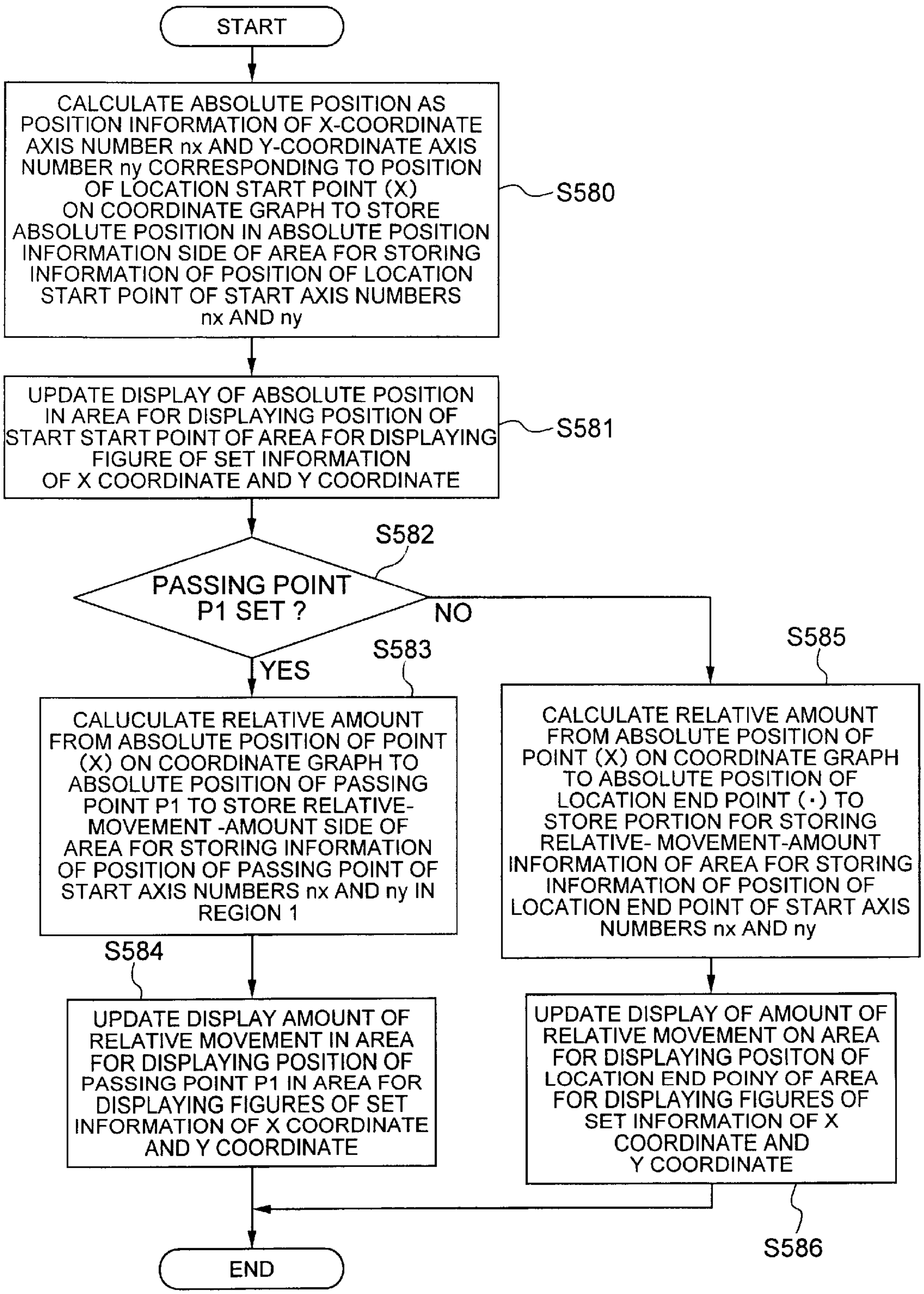
FIG. 55 is a flow chart of the operation which is performed when the position of the locating start point is changed during the operation of the locating programming by using the coordinate graph when a position instruction method is set for each region for the locus control in the location programming apparatus according to the first embodiment of the present invention.

When the location start point (×) is being dragged, the operation will now be described with reference to a flow chart shown in FIG. 55 (step S564). Initially, the absolute positions of the start axis numbers nx and ny corresponding to the point (×) are calculated so as to be stored in the absolute-position-information storage area 183 of the locating-start-point-position-information storage area 127 of the start axis numbers nx and ny (step S580). Then, display of the absolute position in the start-point-position display areas 142*a* and 142*b* of the areas 137*a* and 137*b* in which the number of set information on X- and Y-coordinates are stored is updated (step S581). If the passing point P1 has been set (step S582), the relative amounts of the nx and ny axes from the point (×) to the point $P_1$ are calculated so as to be stored in the relative-movement-amount storage area 184 of the corresponding nx and ny areas of the passing-point-position information 169$a_1$, 169$b_1$ and 169$c_1$ of the start axis numbers in the region 1 (step S583). Thus, display of the relative movement amount in the areas 161$a_1$ and 161$b_1$ for displaying the number $P_1$ of the passing points in the areas 137*a* and 137*b* in which the number of set information on X- and Y-coordinates are stored is updated (step S584). If the passing point $P_1$ has not been set in step S582, the relative amounts of the nx and ny axes from the point (×) to the location end point (•) are calculated so as to be stored in the area for storing relative amount information 184 of the end-point-position information 122 of the start axis number (step S585). Thus, display of the relative movement amount in the end-point-position display areas 143*a* and 143*b* of the areas 137*a* and 137*b* in which the number of set information on X- and Y-coordinates are stored is updated (step S586).

Figure 56:
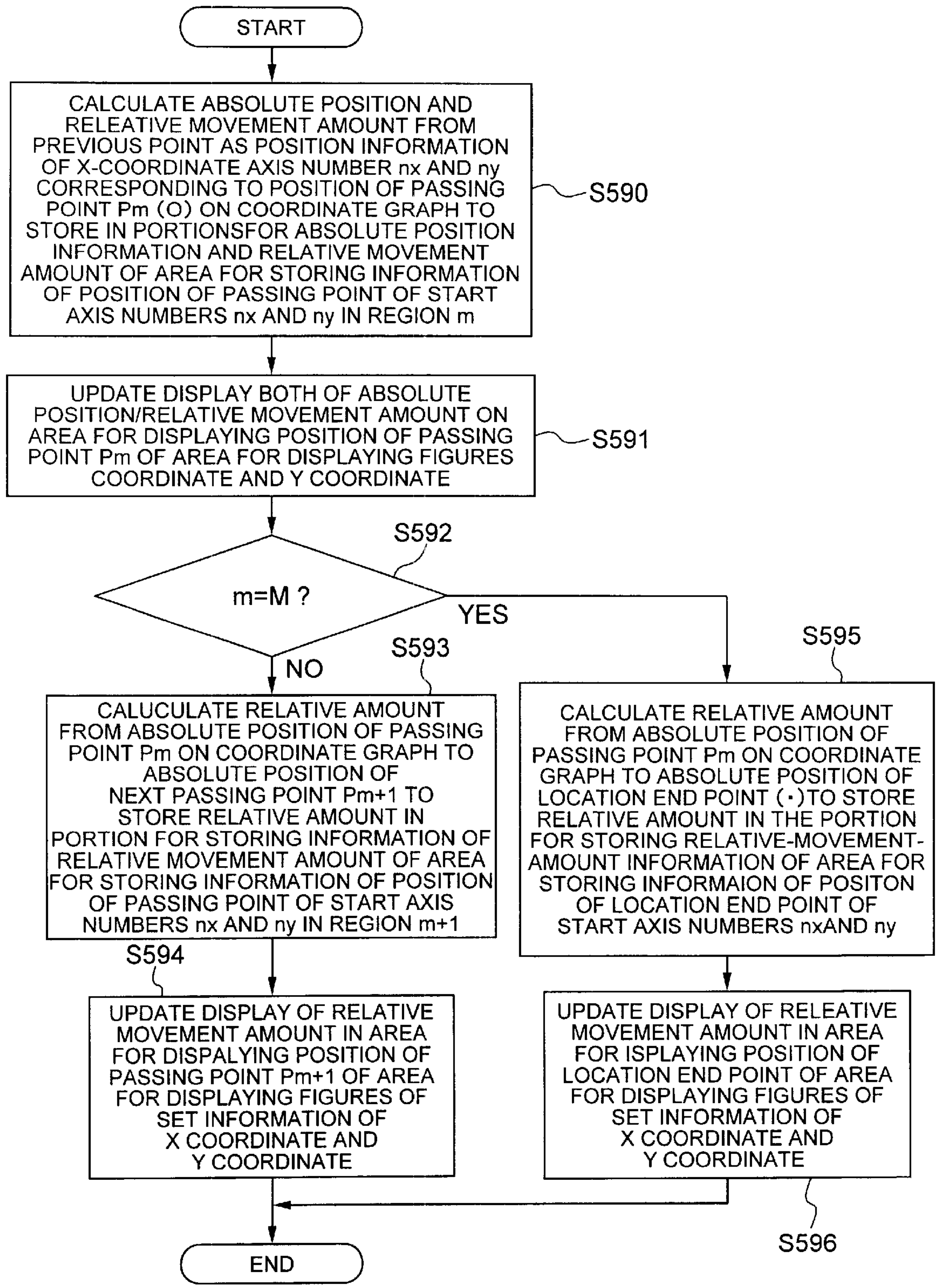
FIG. 56 is a flow chart of the operation which is performed when the position of the passing point is changed during the locating programming operation by using the coordinate graph in a case where a position instruction method is set for each region for the locus control in the location programming apparatus according to the first embodiment of the present invention.

When the passing point $P_m$ (O) is being dragged, the description will be made in accordance with a flow chart shown in FIG. 56 (step S565). Initially, the absolute positions of the X-coordinate axis number nx and Y-coordinate axis number ny corresponding to the point (O) and a relative amount from the previous point are calculated so as to be stored in the absolute-position-information storage area 183 and the relative-movement-amount storage area 184 of the corresponding axes nx and ny of the passing-point-position information 169$a_m$, 169$b_m$ and 169$c_m$ of the start axis numbers nx and ny in the region m (step S590). Thus, display of both of the absolute positions and relative movement amounts in the areas 161$a_m$ and 161$b_m$ for displaying the number $P_m$ of passing points of the areas 137*a* and 137*b* in which the number of set information on X- and Y-coordinates are stored is updated (step S591). If the relationship that passing point $P_m$=final passing point $P_M$ is not satisfied (step S592), a relative amount of the nx and ny axes from the point $P_m$ (O) to $P_{m+1}$ calculated so as to be stored in the area for storing relative-movement-amount information 184 of the corresponding start axis numbers nx and ny of passing point information 169$a_m$, 169$b_m$ and 169$c_m$ of the start axis number in the region m+1 (step S593). Thus, display of the relative movement amount in the areas 161$a_{m+1}$ and 161$b_{m+1}$ for displaying the number $P_{m+1}$ of the passing points of the areas 137*a* and 137*b* in which the number of set information on X- and Y-coordinates are stored is updated (step S594). If passing point $P_m$=final passing point $P_M$ in step S592, relative amounts of the nx and ny axes from the point $P_m$ (O) to the location end point (•) are calculated so as to be stored in the relative-movement-amount storage area 184 of location end point position information 122 (step S595). Thus, display of relative movement amounts in the end-point-position display areas 143*a* and 143*b* of the areas 137*a* and 137*b* in which the number of set information on X- and Y-coordinates are stored is updated (step S596).

Figure 57:
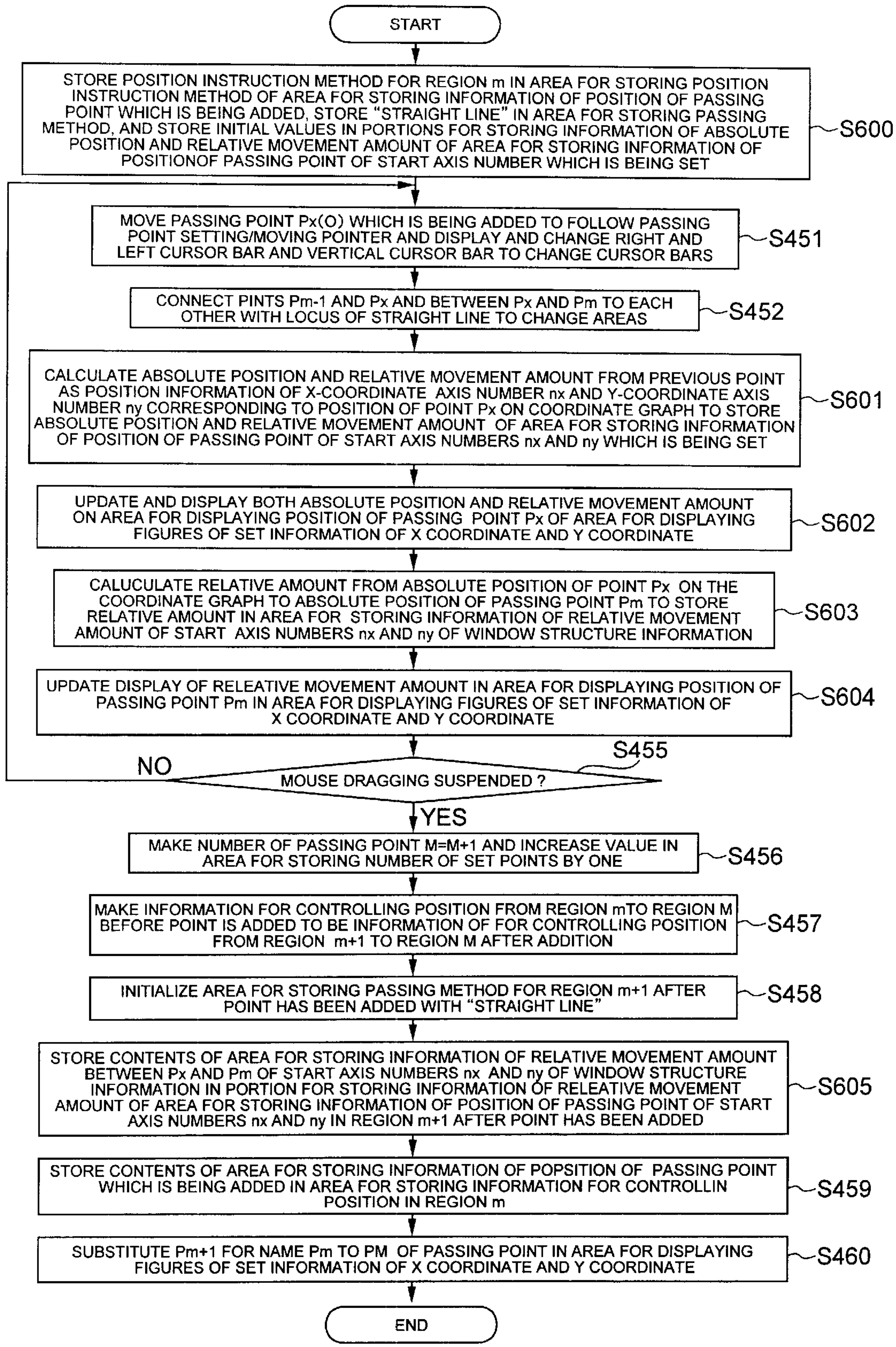
FIG. 57 is a flow chart of the operation which is performed when a passing point is additionally set during the locating programming operation by using the coordinate graph in a case where a position instruction method is set for each region for the locus control in the location programming apparatus according to the first embodiment of the present invention.

The operation which is performed when the locus in the region m is being dragged with the passing-point setting and moving pointer will now be described with reference to a flow chart shown in FIG. 57 (step S566). The same portions as those in the flow chart shown in FIG. 41 of the operation which is performed when a passing point is added and set are given the same step numbers and they are operate similarly to those in the locus control. Initially, the areas for storing position information of the passing point which is being added are initialized in such a manner that initial value are stored in the absolute-position-information storage area 183 and the relative-movement-amount storage area 184 for information of the passing point of the start axis number which is being set (step S600). When mouse dragging is being performed, the absolute positions of the X-coordinate axis number nx and Y-coordinate axis number ny corresponding to the position of the point Px (O) and a relative amount from the previous point are calculated so as to be stored in the absolute-position-information storage area 183 and the relative-movement-amount storage area 184 of the corresponding axes nx and ny of information 169$a_x$, 169$b_x$ and 169$c_x$ of the position of the passing point of the start axis number which is being set (step S601). Thus, display of both of the absolute position and the relative movement amount of the areas 161$a_x$ and 161$b_x$ for displaying the number $P_x$ of passing points in the areas 137*a* and 137*b* in which the number of set information on X- and Y-coordinates are stored is updated (step S602). Then, relative amounts of nx and ny axes from the point $P_x$ (O) to $P_m$ are calculated so as to be stored in the areas for the corresponding axes nx and ny of information 186*a*, 186*b* and 186*c* of the relative movement amount between $P_x$ and $P_m$ of the start axis numbers (step S603). Thus, display of the relative movement amount in the areas 161$a_m$ and 161$b_m$ for displaying the number $P_m$ of passing points in the areas 137*a* and 137*b* in which the number of set information on X- and Y-coordinates are stored is updated (step S604). When dragging is suspended, stored information 186*a*, 186*b* and 186*c* of the relative movement amount between $P_x$ and $P_m$ of the start axis number for nx and ny axes is stored in the relative-movement-amount storage area 184 for the passing point position information 169$a_{m+1}$, 169$b_{m+1}$ and 169$c_{m+1}$ of the start axis number in the region m+1 (step S605).

Figure 58:
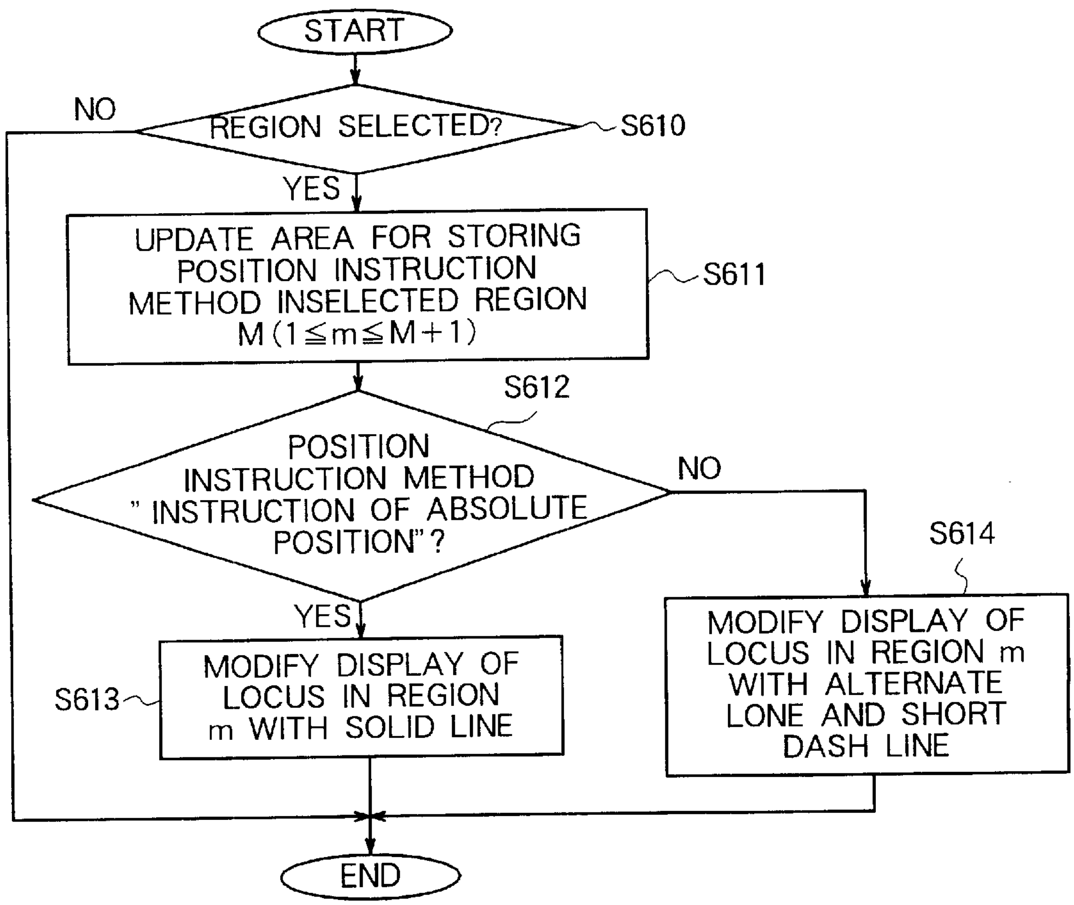
FIG. 58 is a flow chart of the operation which is performed when a position instruction method is set during the locating programming operation by using the coordinate graph in a case where a position instruction method is set for each region for the locus control in the location programming apparatus according to the first embodiment of the present invention.

When the position-instruction-method selection button 180 has been selected (step S567), an operation is performed to follow a flow chart shown in FIG. 58 (step S568). If selection of a region is not performed, no operation is performed and the process is ended (step S610). The position-instruction-method storage area 165 or 165$p_m$ in the region m (1≦m≦M+1) indicated with a selected region 163 is updated (step S611). If the "absolute-position instruction 180*a*" has been selected (step S612), the locus in the region m is modified with a solid line. If "instruction 180*b* of relative movement amount" has been selected, the locus in the region m is modified with an alternate long and short dash line (step S614). When the locus is changed by moving the point, the type of the line corresponding to the method of instructing the position in the corresponding region is employed.

When circular interpolation auxiliary setting has been changed in step S441, a relative amount is calculated from information of the absolute position of the auxiliary set point (circular interpolation passing point or the circular interpolation central point) for the circular interpolation and information of the absolute position of the circular interpolation start point so as to be stored in the relative-movement-amount storage area 184 for position information of the corresponding point (step S569).

Figure 59:
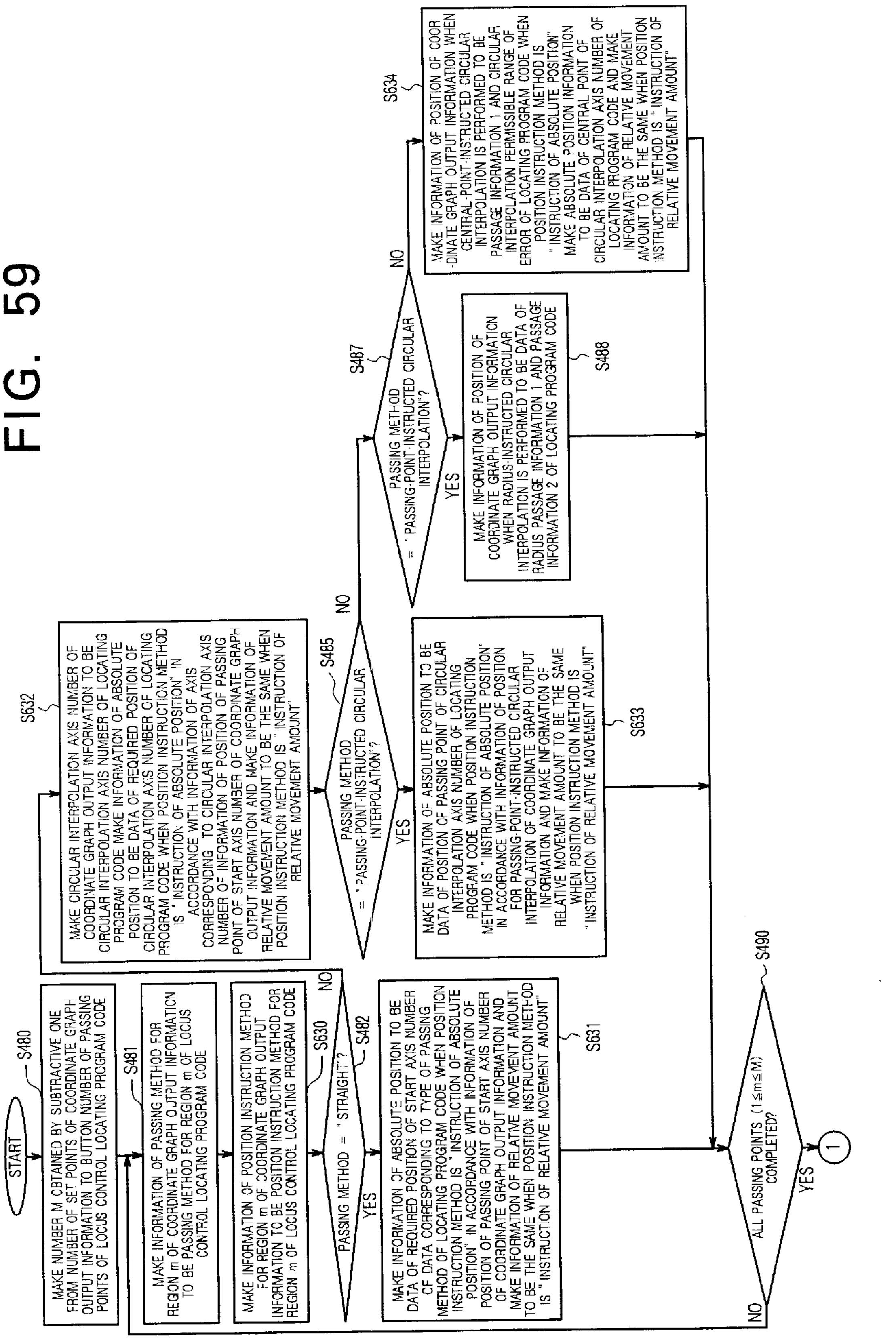
FIGS. 59 and 60 show a flow chart of the operation which is performed when setting is completed during the locating programming operation by using the coordinate graph in a case where a position instruction method is set for each region for the locus control in the location programming apparatus according to the first embodiment of the present invention.
Figure 60:
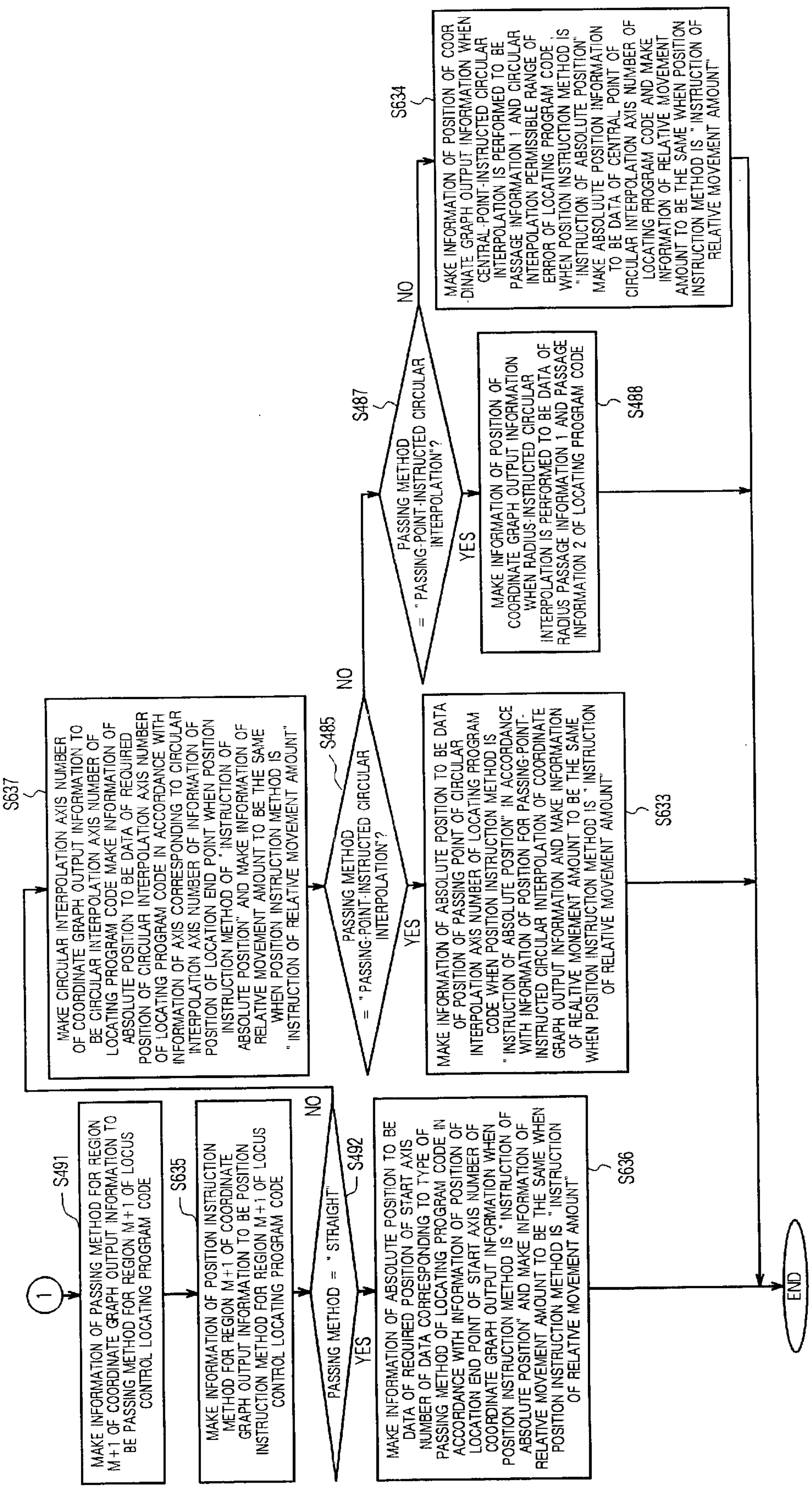

When the setting completion button has been selected, an operation following a flow chart shown in FIGS. 59 and 60 is performed (step S570). The same portions as those in the flow chart shown in FIG. 43 and 44 which show the operation which is performed when setting of the locus control has been performed are given the same step numbers and they are performed similarly to those in the locus control. In steps S481 to S490 for outputting locating program code for the regions 1 to M, information of the position instruction method 165*pm* is made to be position instruction method 2601*pm* (step S630). In a region in which the position instruction method is the "absolute position instruction", absolute position information 183 is made to be required position data 2610 of the start axis number, required position data 2612 of the circular interpolation axis number, passing-point-position data 2613 of the circular interpolation axis number and central-point position data 2617 of the circular interpolation axis number. In the region of the "relative movement amount", relative movement amount information 184 is made to be the same (steps S631, S632, S633 and S634).

Also in steps S491 to S634 for outputting the locating program code for the region M+1, information of position instruction method 165 is made to be position instruction method 2601 (step S635). If the position instruction method is the "absolute position instruction", location end point position information, circular interpolation passing point position information and circular interpolation central-point position information of the start axis are absolute position information 183. When the position instruction method is the "relative movement amount instruction", the relative movement amount information 184 is made to be required position data 2610 of the start axis number, required position data 2612 of the circular interpolation axis number, data 2613 of the passing point data of the circular interpolation axis number and central-point position data 2617 of the circular interpolation axis number (steps S636, S637, S633 and S634).

The above-mentioned location programming apparatus enables the position instruction method between passing points to quickly be recognized when a plurality of passing points are instructed and a locus control is set. Moreover, even if the position instruction method between the passing points is changed, a necessity of again setting position data can be eliminated.

The above-mentioned location programming apparatus enables the locating program for the locus control to easily be set and changed by using a locus graph. Thus, the position instruction method between passing points can easily be understood from the locus graph.

Moreover, the absolute position and the relative position between the passing points for the locus control can easily be understood.

Figure 61:
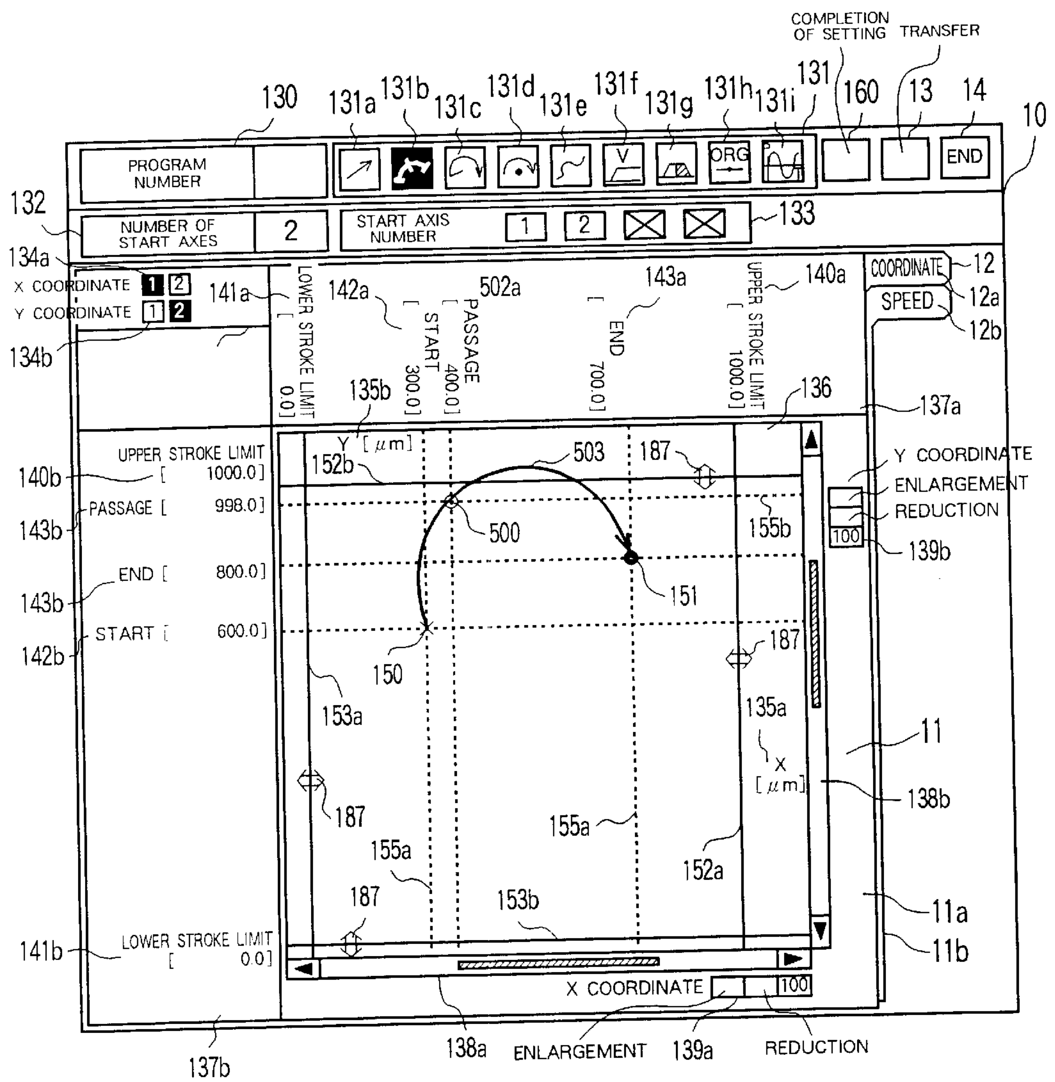
FIG. 61 is a diagram showing an example of a locating programming window by using the coordinate graph in a case where an operation permissible range for a subject which must be controlled is set and changed in the location programming apparatus according to the first embodiment of the present invention.

10. Setting and Change of Operation Permissible Range of Subject Which Must be Controlled By using Coordinate Graph The operation for setting and changing the operation permissible range for a subject which must be controlled by using a coordinate graph will now be described with reference to FIGS. 61 to 63. FIG. 61 shows an example of a programming window using a coordinate graph. An operation permissible range for a subject which must be controlled is, as upper and lower stroke limit lines 152*a* and 153*a* of the X coordinate axis number and upper and lower stroke limit lines 152*b* and 153*b* of the Y coordinate axis number, read and displayed in such a manner that the upper and lower stroke limits 1705 and 1706 of the axis-parameter memory 1700 are read and displayed to the upper and lower stroke limit storage areas 112 and 113 of the graphic programming work memory 4. The locating points which are set on the coordinate graph and the locus can easily be recognized. Reference numeral 187 represents a stroke-limit-range changing pointer. When the mouse cursor is moved onto the X coordinate side stroke limit line, the stroke-limit-range changing pointer 187 is formed into an arrow cursor facing right and left. When the mouse cursor is moved onto the Y coordinate side stroke limit line, the stroke-limit-range changing pointer 187 is formed into an arrow cursor facing up and down. The stroke-limit-range changing pointer 187 can be moved into directions indicated by the arrows when a dragging operation has been performed. A position at which the mouse has been released is a decided position.

Figure 62:
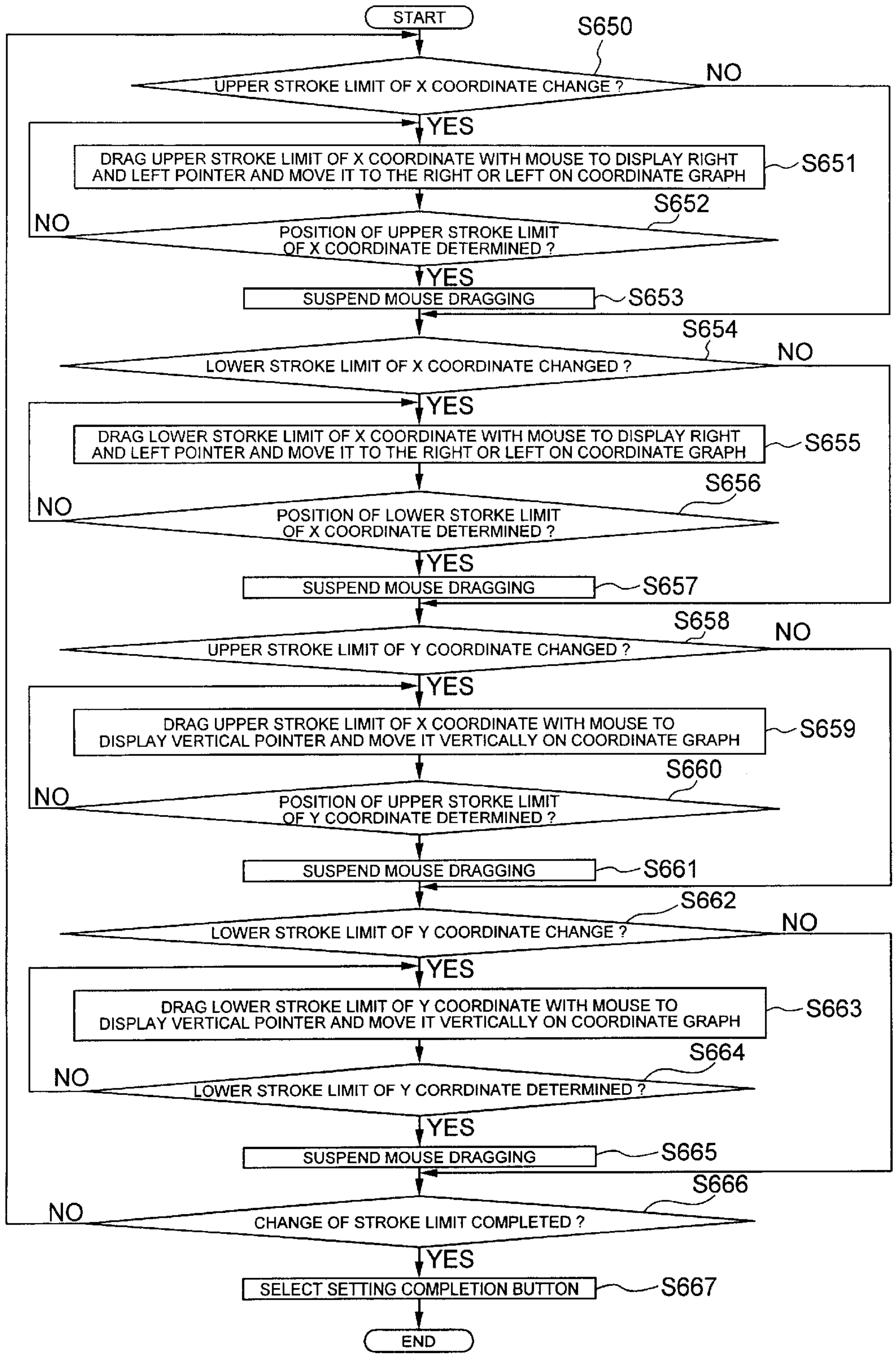
FIG. 62 is a flow chart showing a setting operation of the locating programming by using the coordinate graph in a case where the operation permissible range for the subject which must be controlled is set and changed in the location programming apparatus according to the first embodiment of the present invention.

The operation for changing the stroke limit range will now be described with reference to a flow chart shown in FIG. 62. When an upper X coordinate stroke limit is changed (step S650), the upper X coordinate stroke limit line which is being displayed is dragged with the mouse so that the stroke-limit-range changing pointer 187 is displayed so as to be moved on the coordinate graph to the right or left (step S651). When the position has been determined (step S652), mouse dragging is suspended (step S653). When a lower X coordinate stroke limit is changed (step S654), the lower X coordinate stroke limit line which is being displayed is dragged with the mouse so that the stroke-limit-range changing pointer 187 is displayed so as to be moved on the coordinate graph to the right or left (step S655). When the position has been determined (step S656), mouse dragging is suspended (step S657).

When the upper Y coordinate stroke limit is changed in the case where the coordinate graph is a two-dimensional graph (step S658), the upper Y coordinate stroke limit line which is being displayed is dragged with the mouse so that the stroke-limit-range changing pointer 187 is displayed which is moved in the vertical direction on the coordinate graph (step S659). When the position has been determined (step S660), mouse dragging is suspended (step S661). When the lower Y coordinate stroke limit is changed (step S662), the lower Y coordinate stroke limit line which is being displayed is determined by the mouse so that the stroke-limit-range changing pointer 187 is displayed which is moved in the vertical direction (step S663). When the position has been determined (step S664), mouse dragging is suspended (step S665).

When the stroke limit range is changed, the operation returns to step S650. When change has been completed (step S666), the setting completion button 160 is selected (step S667). Thus, the operation is ended.

Figure 63:
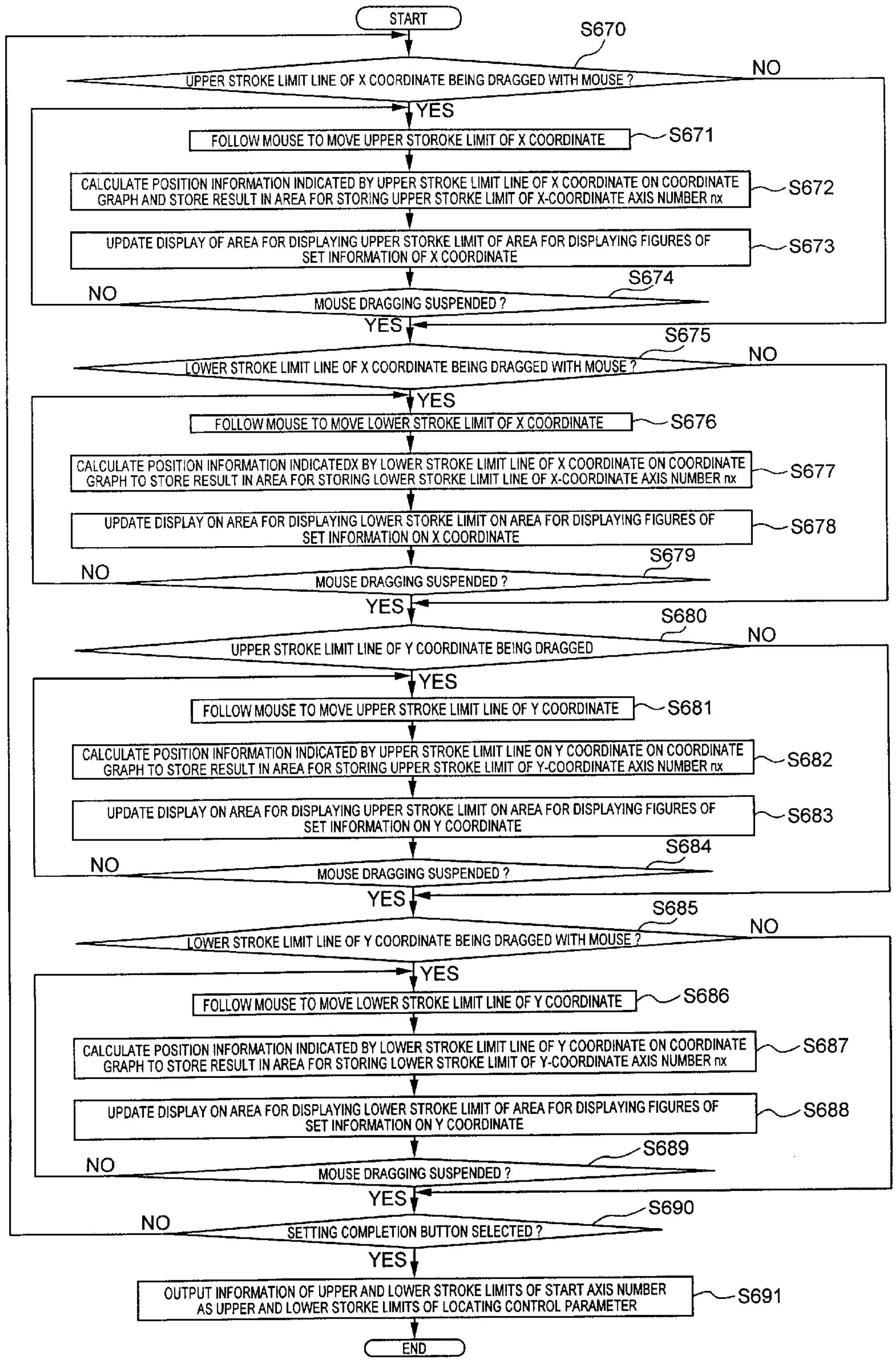
FIG. 63 is a flow chart showing a setting operation of the locating programming by using the coordinate graph in a case where the operation permissible range for the subject which must be controlled is set and changed in the location programming apparatus according to the first embodiment of the present invention.

The operation for changing the stroke limit range will now be described with reference to a flow chart shown in FIG. 63. When the line upper X-coordinate stroke lime line 152*a* is being dragged with the mouse (step S670), the upper X-coordinate stroke lime line 152*a* is moved to follow the stroke-limit-range changing pointer 187 (step S671). Then, position information of the X-coordinate axis number nx corresponding to the line position on the coordinate graph is calculated so as to be stored in the upper stroke limit storage area 112 of the X-coordinate axis number nx (step S672). Moreover, the upper stroke limit display area 140*a* in the X-coordinate-setting-information value display area 137*a* is updated (step S673). The processes in steps S671 to S673 are performed until mouse dragging is suspended. When mouse dragging has been suspended, the operation proceeds to step S675 (step S674). When the upper X-coordinate stroke lime line 152*a* is not being dragged with the mouse in step S670, the operation proceeds to step S675.

When the lower X-coordinate stroke limit line 153*a* is being dragged with the mouse (step S675), the lower X-coordinate stroke limit line 153*a* is moved to follow the stroke-limit-range changing pointer 187 (step S676), the lower X-coordinate stroke limit line 153*a* is moved to follow the stroke-limit-range changing pointer 187 (step S676). Then, position information of the X-coordinate axis number nx corresponding to the line position on the coordinate graph is calculated so as to be stored in the lower stroke limit storage area 113 of the X-coordinate axis number nx (step S677). Moreover, the lower stroke limit display area 141*a* of the X-coordinate-setting-information value display area 137*a* is updated (step S678). The processes in steps S676 to S678 are performed until mouse dragging is suspended. When mouse dragging is suspended, the operation proceeds to step S680 (step S679). When the lower X-coordinate stroke limit line 153*a* is not being dragged with the mouse in step S675, the operation proceeds to step S680.

When the upper Y-coordinate stroke limit line 152*b* is being dragged with the mouse (step S680), the upper Y-coordinate stroke limit line 152*b* is moved to follow the stroke-limit-range changing pointer 187 (step S681). Then, position information of Y-coordinate axis number ny corresponding to the line position on the coordinate graph is calculated so as to be stored in the upper stroke limit storage area 112 of the Y-coordinate axis number ny (step S682). Moreover, the upper stroke limit display area 140*b* of the set Y-coordinate information value display area 137*b* is updated (step S683). The processes in steps S681 to S683 are performed until mouse dragging is suspended. When mouse dragging has been suspended, the operation proceeds to step S685 (step S684). If the upper Y-coordinate stroke limit line 152*b* is not being dragged in step S680, the operation proceeds to step S685.

When the lower Y-coordinate stroke limit 153*b* is being dragged with the mouse (step S685), the lower Y-coordinate stroke limit 153*b* is moved to follow the stroke-limit-range changing pointer 187 (step S686). Position information of the Y-coordinate axis number ny corresponding to the line position on the coordinate graph is calculated so as to be stored in the lower stroke limit storage area 113 of the Y-coordinate axis number ny (step S687). Moreover, the lower stroke limit display area 141*b* of the set Y-coordinate information value display area 137*b* is updated (step S688). The processes in steps S686 to S688 are performed until mouse dragging is suspended. When mouse dragging has been suspended, the operation proceeds to step S690 (step S689). If the lower Y-coordinate stroke limit 153*b* is not being dragged with the mouse in step S685, the operation proceeds to step S690.

The operation returns to step S670 until the setting completion button 160 is selected. When the setting completion button 160 has been selected (step S690), the contents of the areas for storing the upper and lower stroke limits 112 and 113 of the start axis number are, as the locating control parameters, stored in the axis areas of the axis-parameter memory 1700 for storing the upper stroke limit 1705 and the lower stroke limit 1706 (step S691). Then, the operation is ended.

The above-mentioned location programming apparatus enables the stroke range for the corresponding axis to easily be confirmed and changed when position data is set.

The above-mentioned location programming apparatus enables the operation permissible range of the subject which must be controlled to easily be set and changed on a locating program window.

When locating programming is performed, the relationship among the points which must be set, the locus and the operation permissible range of the subject which must be controlled can always easily be recognized.

An error that "start cannot be performed because the instructed position does not satisfy the stroke limit range" which is detected by the controller when the program is started can be prevented when locating program is performed.

An error that "operation cannot be performed because an intermediate passage for the location does not satisfy the stroke limit range" which is detected by the controller when the program is started can previously be prevented when programming is performed.

11. Locating Programing By Using Speed Graph

Figure 64:
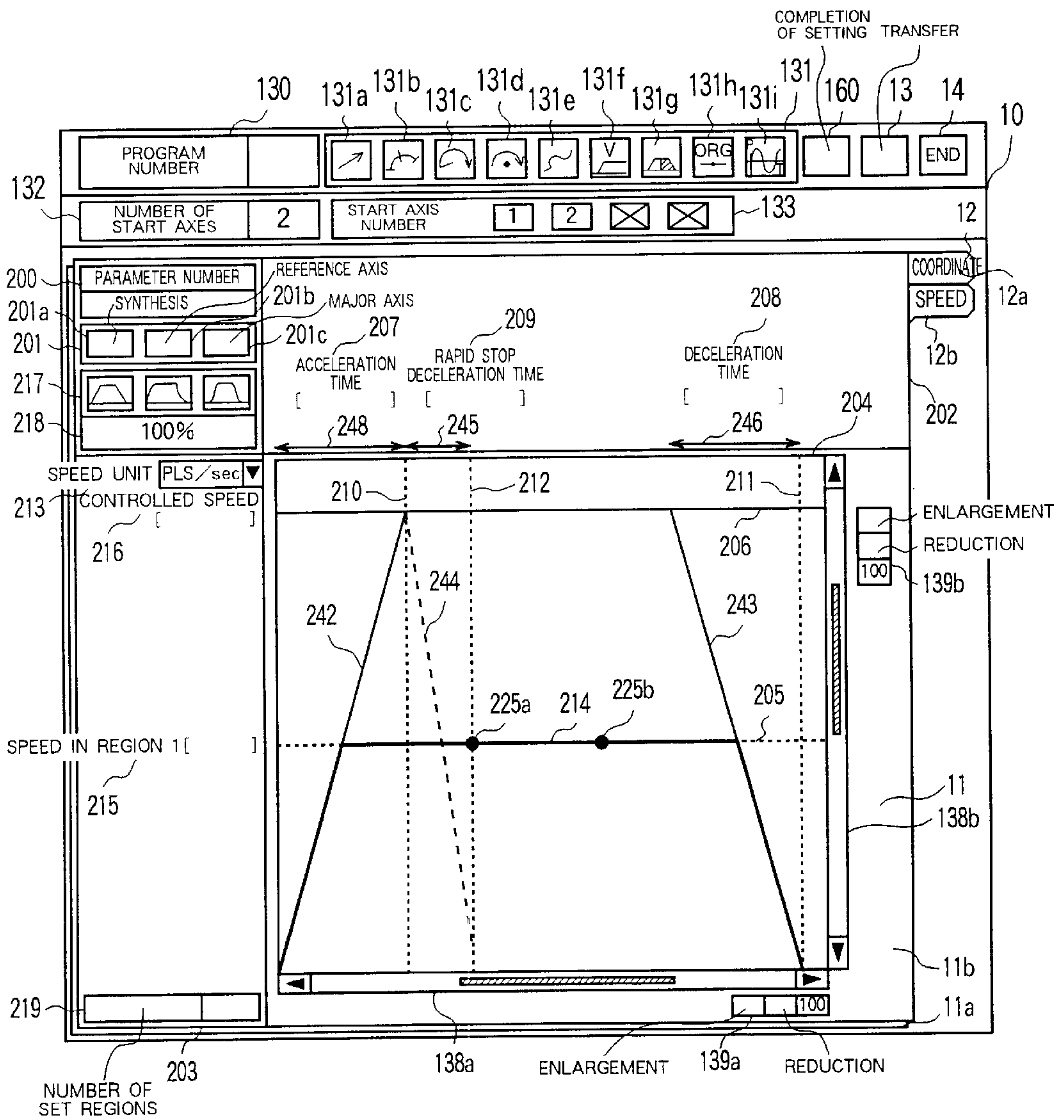
FIG. 64 is a diagram showing an example of an initial locating programming window by using the coordinate graph of the location programming apparatus according to the first embodiment of the present invention.

The operation for performing locating programming by using a speed graph will now be described with reference to FIGS. 64 to 71. FIG. 64 shows an example for setting data relating to the speed by using a speed graph and shows an initial window of the speed graph. Referring to the drawing, reference numerals 130 to 133, 138, 139 and 160 represent the same elements as those shown in FIG. 11. Reference numeral 200 represents an acceleration/deceleration-control-parameter-number setting area and 201 represents a speed-instruction-method selection button for performing selection from a synthesis speed instruction button 201*a*, a reference-axis speed instruction button 201*b* and a major-axis-speed instruction button 201*c*. Reference numeral 217 represents an acceleration/deceleration pattern type selection button, 218 represents a S-figure ratio display area, 204 represents a speed-graph making and displaying area on which an instruction speed line 205 for each region, a speed limit line 206, an acceleration time pointer 210, a deceleration time pointer 211, a rapid stop deceleration time pointer 212, inclination 242 of the acceleration pattern, inclination 243 of the deceleration pattern, inclination 244 of the rapid stop deceleration pattern, a speed pattern 214 and speed changing points 225*a* and 225*b* are displayed. Reference numeral 203 represents a speed-information-value display area on which instructed speed 205 and limited speed 206 set in the speed graph making and displaying area 204 are displayed at 215 and 216 with figures. Reference numeral 213 represents speed-control-unit display area. Reference numeral 219 represents a set-region-number display area for displaying the number of points set on the coordinate graph. Reference numeral 202 represents a time-information-number display area on which acceleration time, deceleration time and rapid stop deceleration time indicated by the acceleration time pointer 210, the deceleration time pointer 211 and the rapid stop deceleration pointer 212 are displayed in 207, 208 and 209 with figures. Moreover, each set time period is indicated with arrows 248, 246 and 245.

Figure 65:
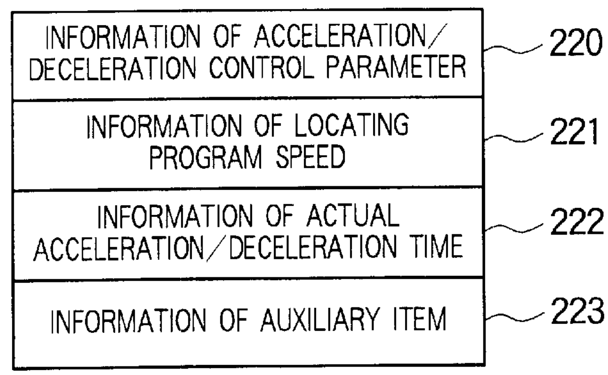
FIG. 65 is a detailed view showing the speed graph output information storage area of the location programming apparatus according to the first embodiment of the present invention.

FIG. 65 shows the speed-graph-output-information storage area 72 of the graphic programming work memory 4 which is composed of an acceleration/deceleration control-parameter-information storage area 220, a locating-program-speed-information storage area 221, an actual acceleration/deceleration time information storage area 222 and an auxiliary-item-information storage area 223.

Figure 66:
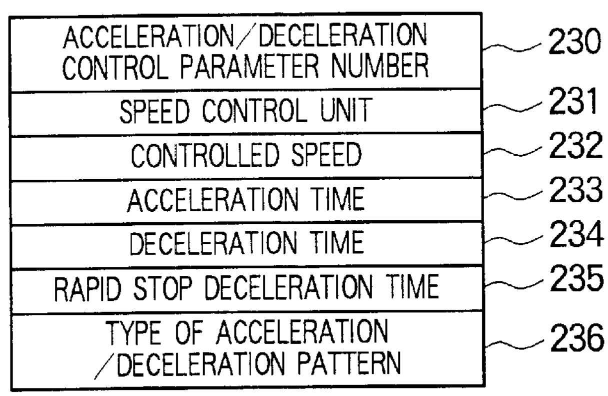
FIG. 66 is a detailed view showing the acceleration/deceleration control parameter information storage area of speed graph output information of the location programming apparatus according to the first embodiment of the present invention.

FIG. 66 shows the acceleration/deceleration control-parameter-information storage area 220 of the speed-graph-output-information storage area 72 which is composed of an acceleration/deceleration parameter number storage area 230, a speed-control-unit storage area 231, a limit-speed storage area 232, an acceleration-time storage area 233, a deceleration-time storage area 234, a rapid-stop-deceleration-time storage area 235 and an acceleration/deceleration pattern type storage area 236.

Figure 67:
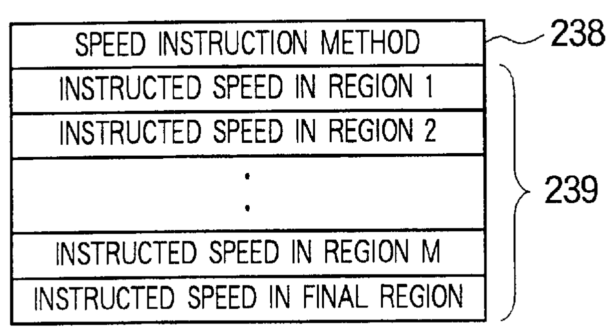
FIG. 67 is a detailed view showing a locating programming speed information storage area of speed graph output information of the location programming apparatus according to the first embodiment of the present invention.

FIG. 67 shows the locating-program-speed-information storage area 221 of the speed-graph-output-information storage area 72 which is composed of a speed-instruction-method storage area 238 and a region-instructed-speed storage area 239. The region-instructed-speed storage area 239 is composed of the number of points set on the coordinate graph.

Figure 68:
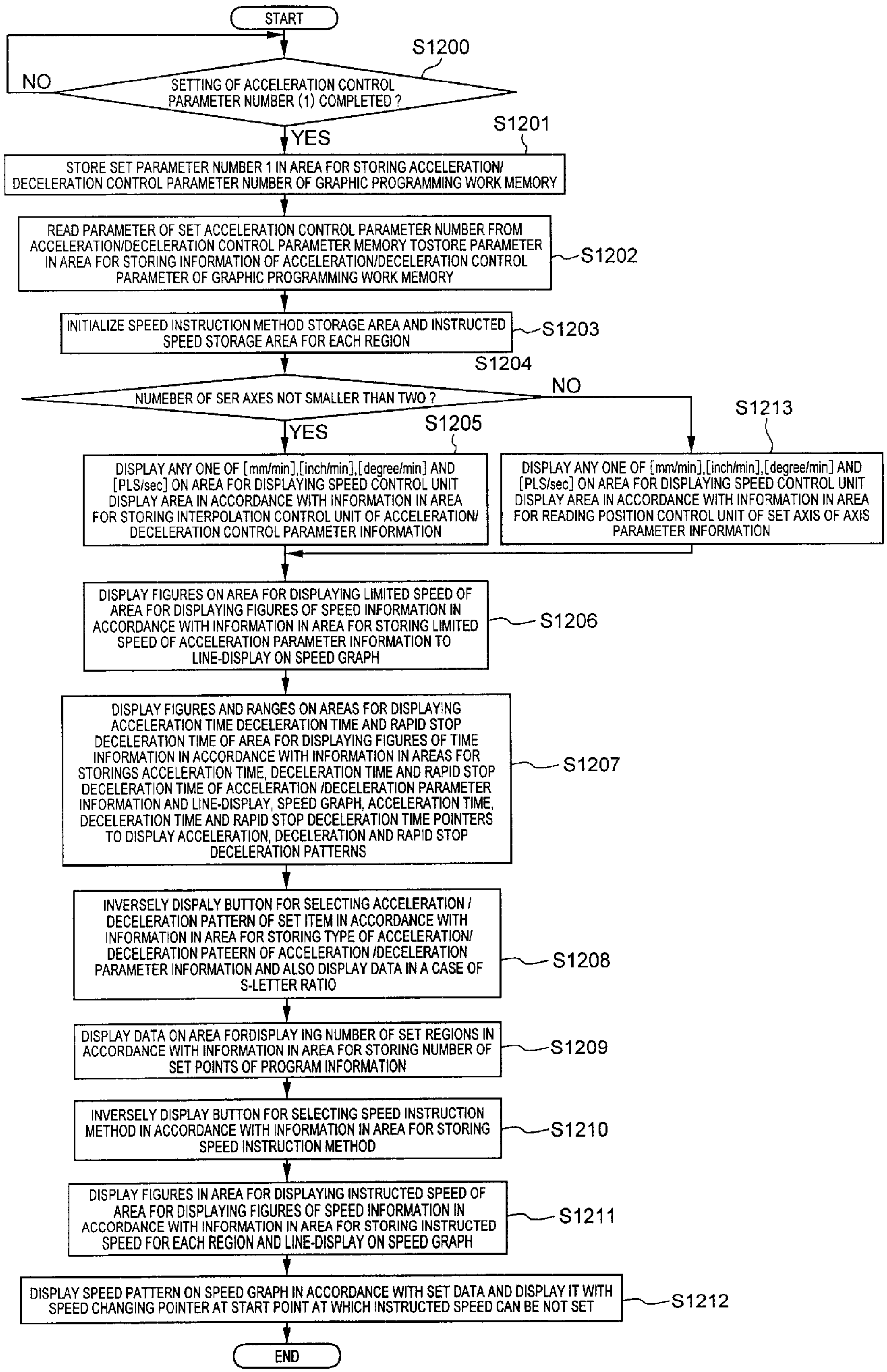
FIG. 68 is a flow chart showing the setting operation and the operation which are performed until the locating programming initial window is displayed by using the speed graph in the location programming apparatus according to the first embodiment of the present invention.

The setting operation which is performed until an initial window of the speed graph in a state shown in FIG. 64 will now be described with reference to a flow chart shown in FIG. 68. When acceleration/deceleration parameter number 1 is set in the acceleration/deceleration control-parameter number setting area 200 (step S1200), 1 is stored in the acceleration/deceleration parameter number storage area 230 of the graphic programming work memory 4 (step S1201). Then, data of acceleration/deceleration control parameter number 1 is read from the acceleration/deceleration control parameter memory 1800 so as to be stored in the speed-control-unit storage area 231, the limit-speed storage area 232, the acceleration-time storage area 233, the deceleration-time storage area 234, the rapid-stop-deceleration-time storage area 235 and the acceleration/deceleration pattern type storage area 236 of the acceleration/deceleration control-parameter-information storage area 220 (step S1202). The speed-instruction-method storage area 238 of the locating-program-speed-information storage area 221 is initialized so that the region-instructed-speed storage area 239 is initialized in a quantity corresponding to the number of points set in the area 120 for storing the number of set points of coordinate graph output information (step S1203).

Then, display on the window is performed in accordance with information above. When the set number 82 of start axes is two or more (step S1204), any one of [mm/min], [inch/min], [degree/min] and [PLS/sec] is displayed on the speed-control-unit display area 213 in accordance with information in the speed-control-unit storage area 231 (step S1205). Then, the operation proceeds to step S1206. If the number 82 of the start axes is one in step S1204, any one of [mm/min], [inch/min], [degree/min] and [PLS/sec] is displayed on the speed-control-unit display area 213 in accordance with information in the position-control-unit reading area 111 of the start axis number (step S1213). Then, the operation proceeds to step S1206. In accordance with information in the limit-speed storage area 232, figures are displayed on the limited speed display area 216 of the speed-information-value display area 203. Moreover, line display 206 is performed on the speed graph (step S1206).

In accordance with information in the acceleration-time storage area 233, the deceleration-time storage area 234 and the rapid-stop-deceleration-time storage area 235, display on the acceleration time 207 ,and the deceleration time208 of the display area 202 and the rapid stop deceleration time display area 209 is performed. Each of set time is displayed with arrows 248, 246 and 245. Then, the acceleration time pointer 210, the deceleration time pointer 211 and the rapid stop deceleration time pointer 212 are displayed on the speed graph. Moreover, the inclination 242 of the acceleration pattern, the inclination 243 of the deceleration pattern and the inclination 244 of the rapid stop deceleration pattern are displayed (step S1207). In accordance with information in the acceleration/deceleration pattern type storage area 236, a corresponding acceleration/deceleration pattern selection button 217 is displayed inversely. If S-figure acceleration/deceleration is set, the S-figure ratio is displayed on a S-figure ratio display area 218 (step S1208). Information in the area 120 for storing the number of set points is displayed on the set-region-number display area 219 (step S1209).

In accordance with information in the speed-instruction-method storage area 238, the corresponding speed-instruction-method selection button 201 is inverted (step S1210). In accordance with information in the region-instructed-speed storage area 239, figures are displayed on the instructed speed figure display area 215 of the speed-information-value display area 203. Line display 205 is performed on the speed graph (step S1211). In accordance with information in the area 120 for storing the number of set points and region-instructed-speed storage area 239, the speed pattern 214 is displayed on the speed graph. The speed changing pointers 225*a* and 225*b* are displayed at the start point of a region in which the instructed speed can be set (step S1212). Thus, display of the initial window of the speed graph is ended.

Figure 69:
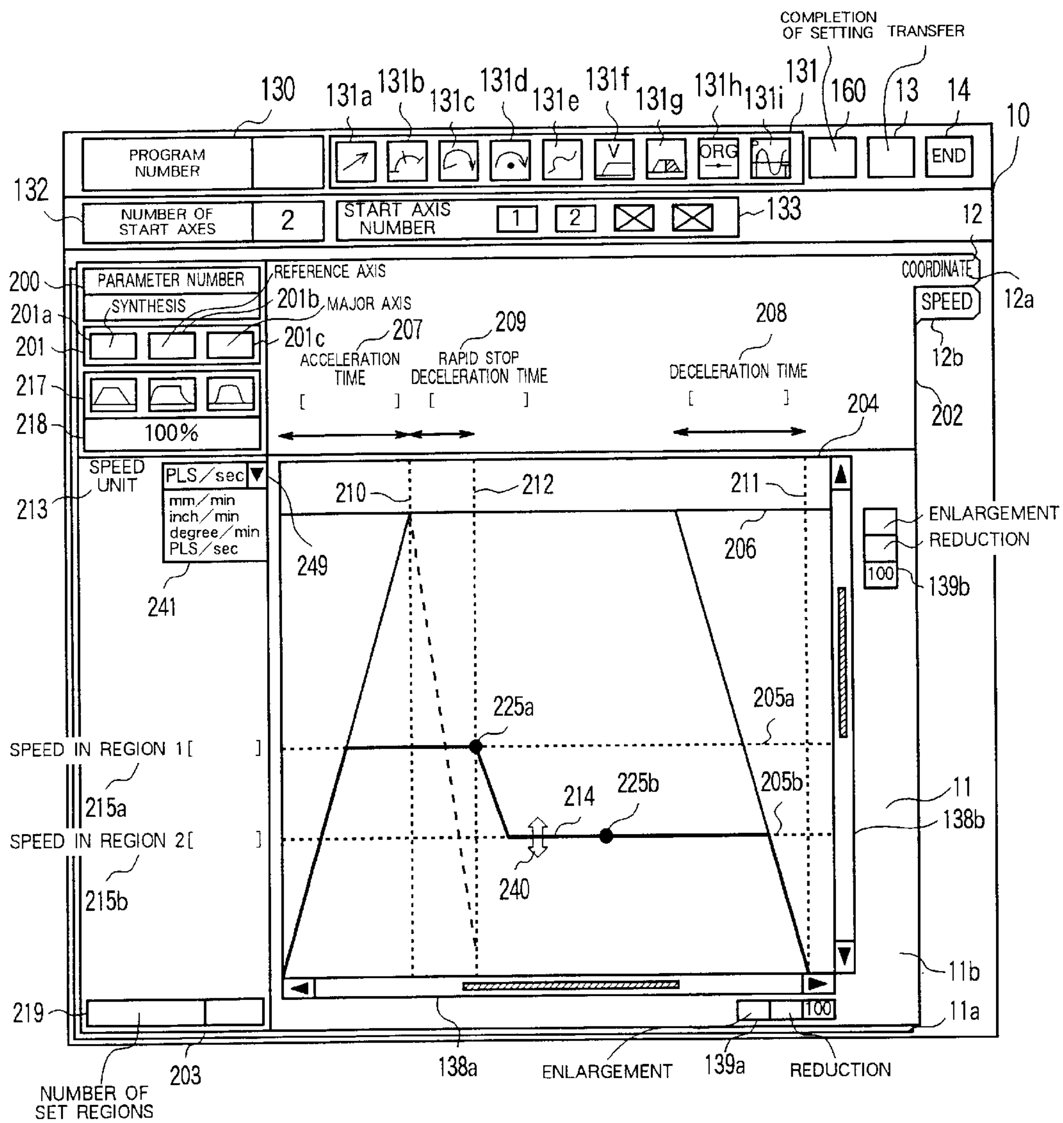
FIG. 69 is a diagram showing an example of a locating programming window by using the speed graph in a case where the speed instruction method, the speed control unit and instructed speed are set and changed in the location programming apparatus according to the first embodiment of the present invention.
Figure 70:
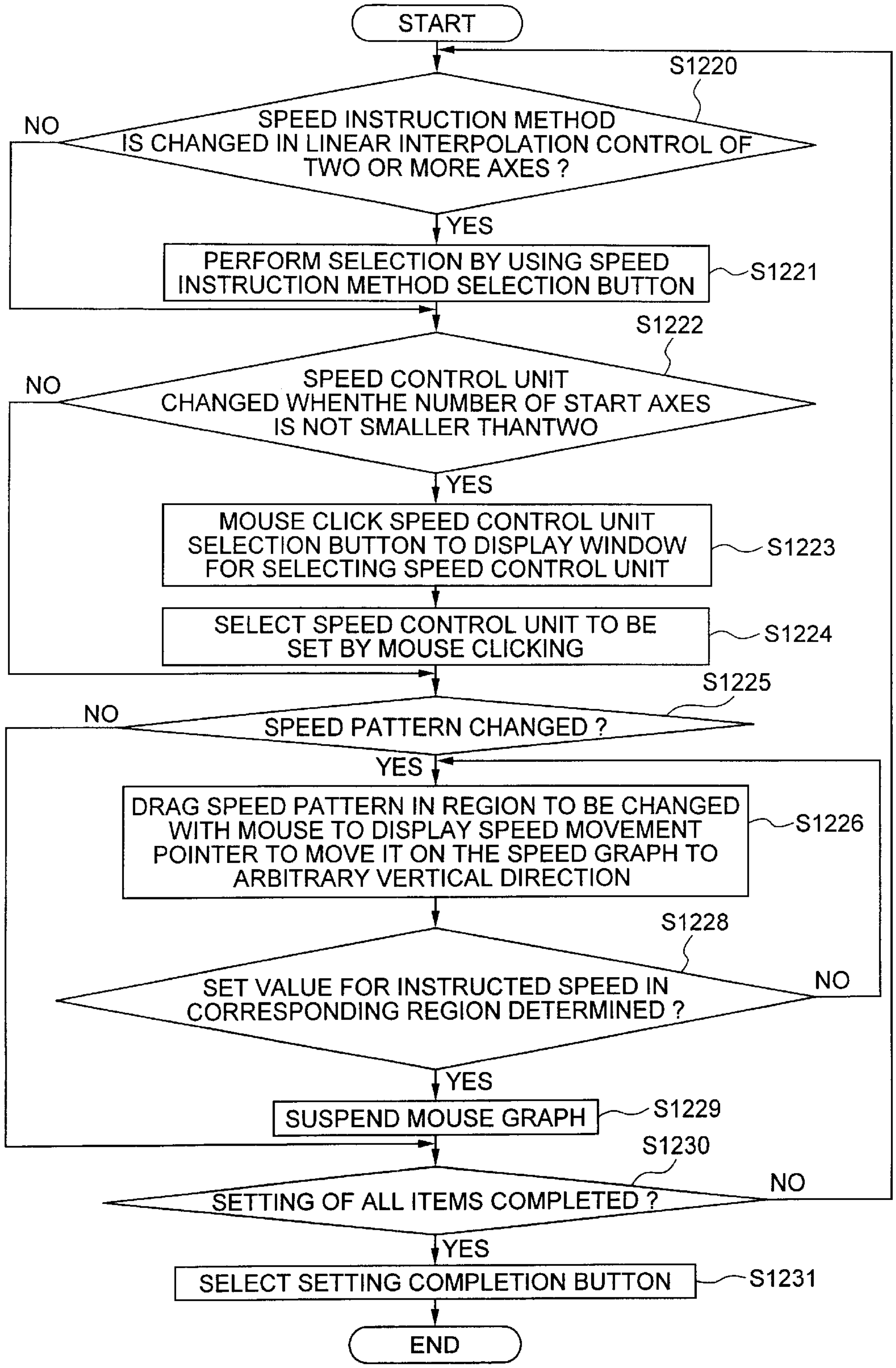
FIG. 70 is a flow chart showing the setting operation of locating programming by using the speed graph in a case where the speed instruction method, the speed control unit and instructed speed are set and changed in the location programming apparatus according to the first embodiment of the present invention.

The operation for selecting and changing the speed instruction method and the speed control unit and setting and changing the speed pattern by using a speed graph will now be described with reference to FIGS. 69 to 71. FIG. 69 shows an example of a locating programming window by using a speed graph when the speed instruction method, the speed control unit and the instructed speed are set and changed. Reference numeral 240 represents a speed movement pointer for vertically moving the speed line. When the mouse cursor is moved onto a speed line required to be changed, the pointer is formed into an arrow cursor facing up and down as illustrated. When a dragging operation is performed, the pointer is able to move vertically in the speed-graph making and displaying area 204. A position at which mouse dragging has been suspended is the set speed. Reference numeral 249 represents a speed-control-unit selection button. When the speed-control-unit selection button is clicked, a speed-control-unit selection window 241 is opened. Thus, speed units which can be selected are displayed in accordance with information in the position-control-unit reading area 111 of the start axis number. When an instructed unit is clicked, selection is performed.

An example of the operation will now be described with reference to a flow chart shown in FIG. 70. If the number 82 of the start axes is not smaller than two and the locating control type 81 is the linear locating, the speed instruction method is initialized to "synthesized speed". When the speed instruction method is changed (step S1220), a synthesized-speed instruction button 201*a*, a reference-axis-speed instruction button 201*b* and a major-axis-speed instruction button 201*c* of the speed-instruction-method selection button 201 are operated so that selection is performed (step S1221). If the speed instruction method is not changed in step S1220, the operation proceeds to step S1222. If the speed control unit is changed in a case where the number 82 of start axes is not smaller than two (step S1222), the speed-control-unit selection button 249 is clicked by the mouse so that the speed-control-unit selection window 241 is displayed (step S1223). When clicking with the mouse is performed, a unit is selected (step S1224). If the speed control unit is not changed in step S1222, the operation proceeds to step S1225.

When the speed pattern 214 is changed (step S1225), the mouse cursor is moved onto the speed pattern 214 for the region intended to be changed. Then, mouse dragging is performed so that the speed movement pointer 240 is displayed which is arbitrarily moved in the vertical direction on the speed graph (step S1226). After the instructed speed has been determined (step S1228), mouse dragging is suspended (step S1229). Then, the operation proceeds to step S1230. When the speed pattern is not changed in step S1225, the operation proceeds to step S1230.

When all items for the speed graph have been set (step S1230), the setting completion button 160 is selected (step S1231) to complete the operation.

The operation for selecting and changing the speed instruction method and the speed control unit and setting and changing the speed pattern will now be described with reference to a flow chart shown in FIG. 71. When the speed-instruction-method selection button 201 is clicked by the mouse (step S1240) and the number 82 of start axes is not smaller than two and the locating control type storage area 81 is "linear locating" (step S1241), information of the selected speed instruction method is stored in the speed-instruction-method storage area 238 (step S1242). Moreover, the corresponding buttons 201*a*, 201*b* and 201*c* are inversely displayed (step S1243). If the speed-selection-method selection button is not selected in step S1240 and if locating is not linear locating of two or more axes in step S1241, the operation proceeds to step S1244.

When the speed control unit selection window is clicked with the mouse (step S1244) and the number 82 of start axes is not smaller than two (step S1245), the information of the selected speed control unit is stored in the speed-control-unit storage area 231 (step S1246) so that display on the speed-control-unit display area 213 is updated (step S1247). If the speed control unit window is not clicked with the mouse in step S1244, the operation proceeds to step S1248 in a case where the number of start axis is one in step S1245.

If the speed pattern 214 is being dragged with the mouse (step S1248), the instructed speed line 205 in the corresponding region is moved to follow the speed movement pointer 240 and also the speed pattern 214 is changed (step S1249). Thus, information of the speed corresponding to the position of the instructed speed line 205 in the corresponding region on the speed graph is calculated so as to be stored in the region-instructed-speed storage area 239 in the corresponding region (step S1250). If the instructed speed in the corresponding region is different from the instructed speed (step S1251), region instructed speed display areas 215*a* and 215*b* of the speed-information-value display area 203 are added and displayed with figures (step S1252). If the instructed speed in the corresponding region is the same as that in the previous region in step S1251, the operation proceeds to step S1253. The processes in the steps S1249 to S1252 are performed until mouse dragging is suspended. When mouse dragging has been suspended, the operation proceeds to step S1254 (step S1253). If the speed pattern 214 is not being dragged with the mouse in step S1248, the operation proceeds to step S1254.

The operation returns to step S1240 until the setting completion button 160 is selected. When the setting completion button 160 has been selected (step S1254), information in the speed-instruction-method storage area 238 of the speed graph output information is outputted as data 2106 of speed instruction method of the locating program code. If the set locating control type 81 is locus control, information of the region-instructed-speed and final region instructed-speed storage area 239 is outputted as data 2600*pm* ($1 \leqq m \leqq M$) of instructed speed of the passing point of the locus control locating program code and data 2600 of instructed speed of the location end point. If the set locating control type is another type, it is outputted as instructed speed data 2200 of the control-type corresponding data 2108. Moreover, information in the speed-control-unit storage area 231 is outputted as speed-control-unit data 1801 of the acceleration/deceleration control parameter corresponding to the acceleration/deceleration control parameter number 1230 and the operation is ended (step S1255).

The above-mentioned location programming apparatus is able to generate a locating program by simply graphically setting an instructed speed pattern for the operation.

Moreover, the instructed speed pattern can visually be understood for any user. The instructed speed can easily be set and changed. Moreover, change in the speed pattern occurring when change has been performed can simultaneously be recognized.

Moreover, the relationship between the speed and parameters relating to the control can easily be understood.

12. Setting and Change in Limited Speed By Using Speed Graph

Figure 72:
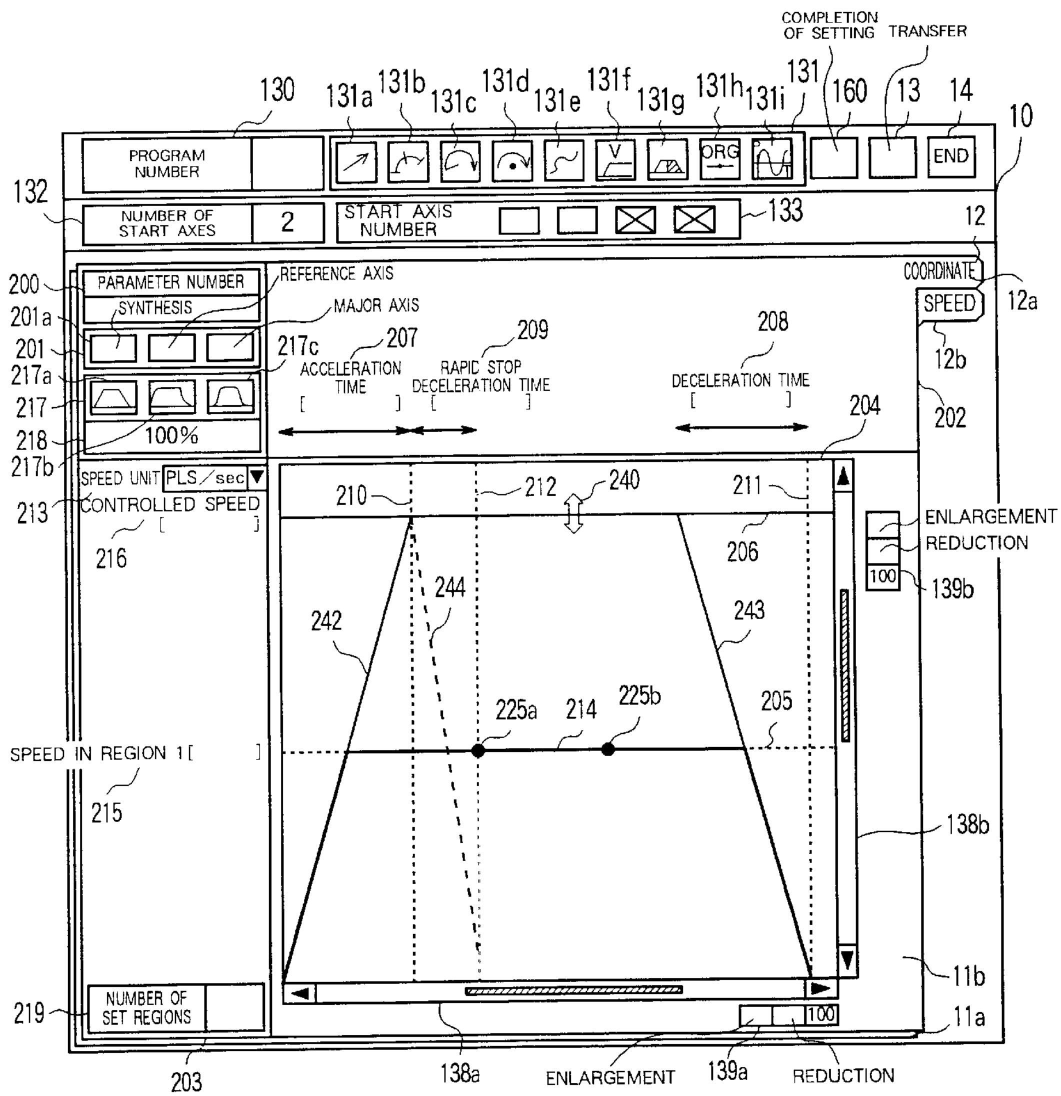
FIG. 72 is a diagram showing an example of a locating programming window by using the speed graph in a case where the speed instruction method, the speed control unit and instructed speed are set and changed in the location programming apparatus according to the first embodiment of the present invention.
Figure 73:
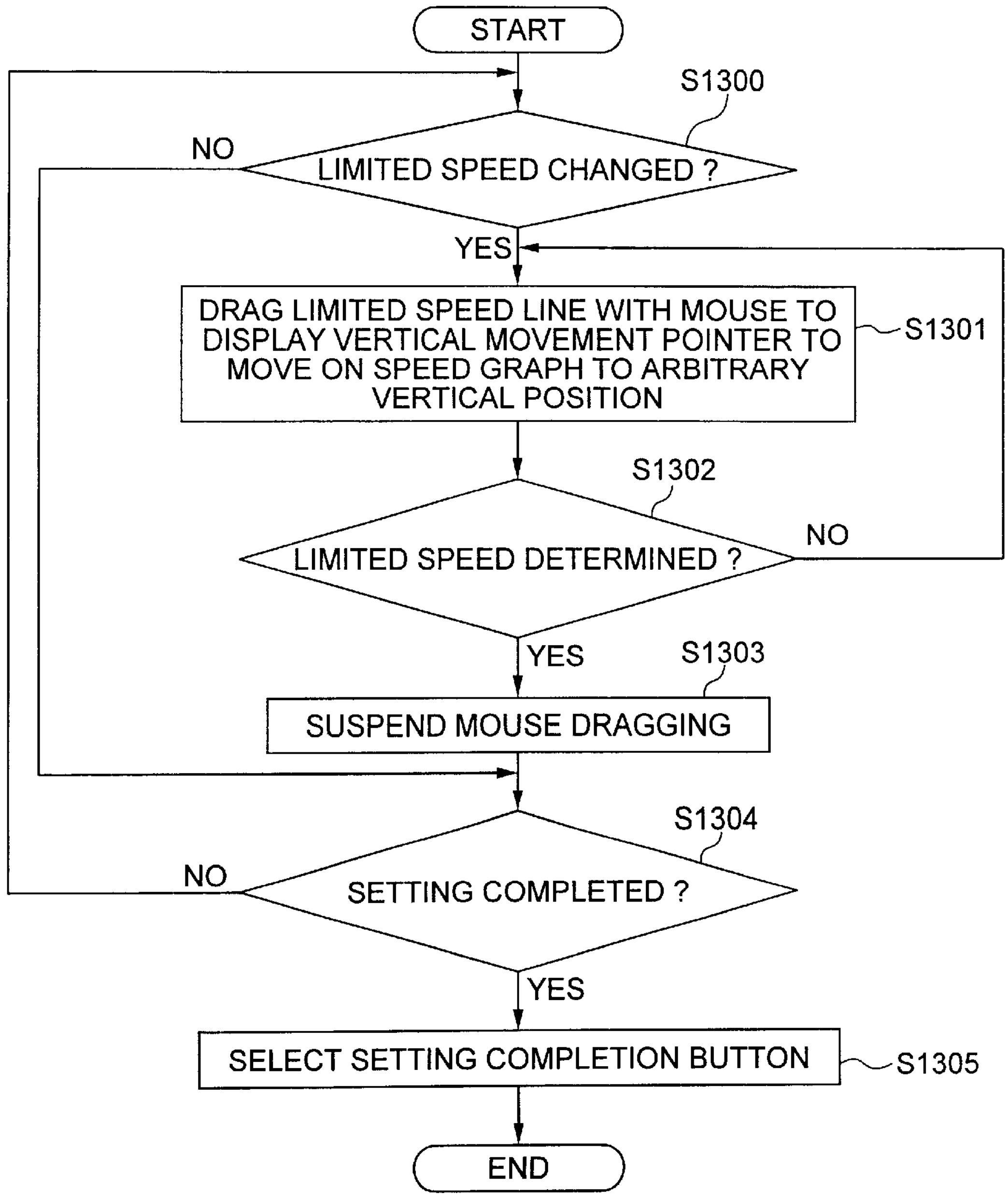
FIG. 73 is a flow chart showing the setting operation of locating programming by using the speed graph when the limited speed is set and changed in the location programming apparatus according to the first embodiment of the present invention.
Figure 74:
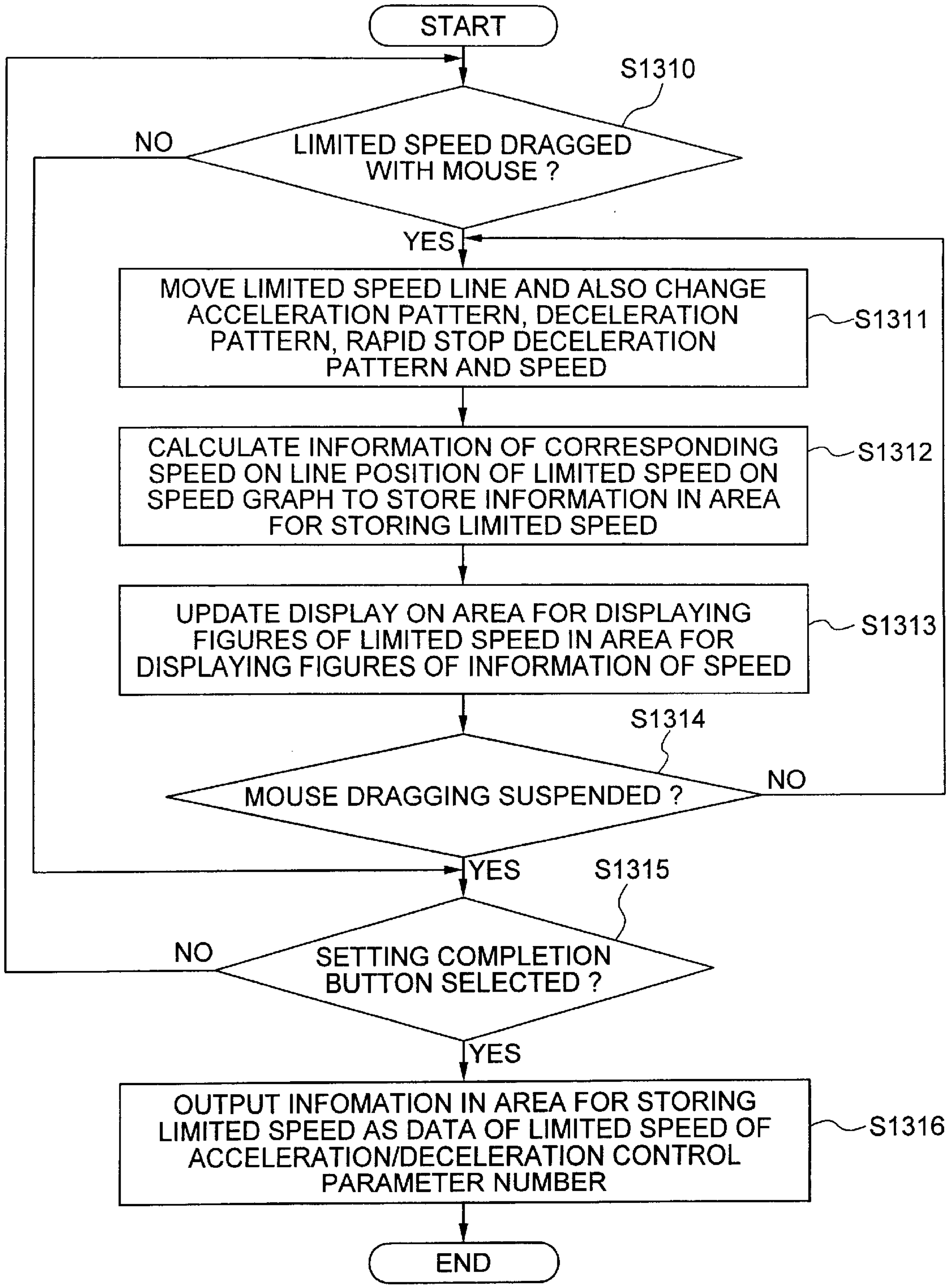
FIG. 74 is a flow chart showing the operation of locating programming by using the speed graph when the limited speed is set and changed in the location programming apparatus according to the first embodiment of the present invention.

The operation for setting and changing the limited speed by using the speed graph will now be described with reference to FIGS. 72 to 74. FIG. 72 shows an example of a locating programming window by using a speed graph when the limited speed is set and changed. Reference numeral 240 represents a speed movement pointer for vertically moving the speed line. When the mouse cursor is moved onto a limited speed line 206, the speed movement pointer 240 is formed into an arrow cursor facing up and down as illustrated. When a dragging operation is performed, the pointer is able to vertically move in the speed-graph making and displaying area 204. A point at which mouse dragging has been suspended is the set speed. Reference numeral 242 represents inclination of the acceleration pattern, 243 represents inclination of the deceleration pattern, 244 represents inclination of the rapid stop deceleration pattern and 214 represents the speed pattern.

The operation for setting and changing the limited speed will now be described with reference to a flow chart shown in FIG. 73. The limited speed line 206 is located at the position of the set speed in the speed-graph making and displaying area 204 in the displayed initial window described with the speed graph. When the limited speed is changed (step S1300), the present limited speed line 206 is dragged with the mouse so that the speed movement pointer 240 is displayed so as to be vertically moved to an arbitrary position on the speed graph (step S1301). When the limited speed has been determined (step S1302), mouse dragging is suspended (step S1303). Then, the operation proceeds to step S1304. If the limited speed is not changed in step S1300, the operation proceeds to step S1304. If the limited speed is changed, the operation returns to step S1300. When the change of the limited speed has been completed (step S1304), the setting completion button 160 is selected (step S1305). Then, the operation is ended.

The operation for changing the limited speed will now be described with reference to a flow chart shown in FIG. 74. If the limited speed line 206 is being dragged with the mouse (step S1310), the limited speed line 206 is moved to follow the speed movement pointer 240. Moreover, also the inclination 242 of the acceleration pattern, the inclination 243 of the deceleration pattern, the inclination 244 of the rapid stop deceleration pattern and the speed pattern 214 are changed (step S1311). Moreover, information of the speed corresponding to the position of the limited speed line 206 on the speed graph is calculated so as to be stored in the limit-speed storage area 232 (step S1312). Thus, display on the limited speed display area 216 of the speed-information-value display area 203 is updated (step S1313). The processes in steps S1311 to S1313 are performed until mouse dragging is suspended. When mouse dragging has been suspended, the operation proceeds to step S1315 (step S1314). When the limited speed line 206 is not being dragged with the mouse in step S1310, the operation proceeds to step S1315.

The operation returns to step S1310 until the setting completion button 160 is selected. When the setting completion button 160 has been selected (step S1315), information in the limit-speed storage area 232 for the speed graph output information is outputted as limited-speed data 1802 of the acceleration/deceleration control parameter corresponding to the acceleration/deceleration control parameter number 1230 and the operation is ended (step S1316).

The above-mentioned location programming apparatus is able to easily set and change limited speed simultaneously with the locating programming operation.

Moreover, limited speed can always be recognized during locating programming. In addition, an error that “operation is performed at the limited speed because the instructed speed exceeds the limited speed” which is detected by the controller when the program is started can be prevented.

In addition, the relationship among the limited speed, the acceleration pattern and the deceleration pattern can easily be understood.

13. Setting of Acceleration/Deceleration Pattern Type By Using Speed Graph

The operation for setting the acceleration/deceleration pattern type by using the speed graph will now be described with reference to FIGS. 72 and 75 to 77. FIG. 72 shows an example of a locating programming window by using a speed graph when the acceleration/deceleration pattern type is set and changed. Reference numeral 217 represents a acceleration/deceleration pattern selection button composed of a trapezoid acceleration/deceleration selection button 217*a*, an exponential acceleration/deceleration button 217*b* and an S-figure acceleration/deceleration selection button 217*c*.

Figure 75:
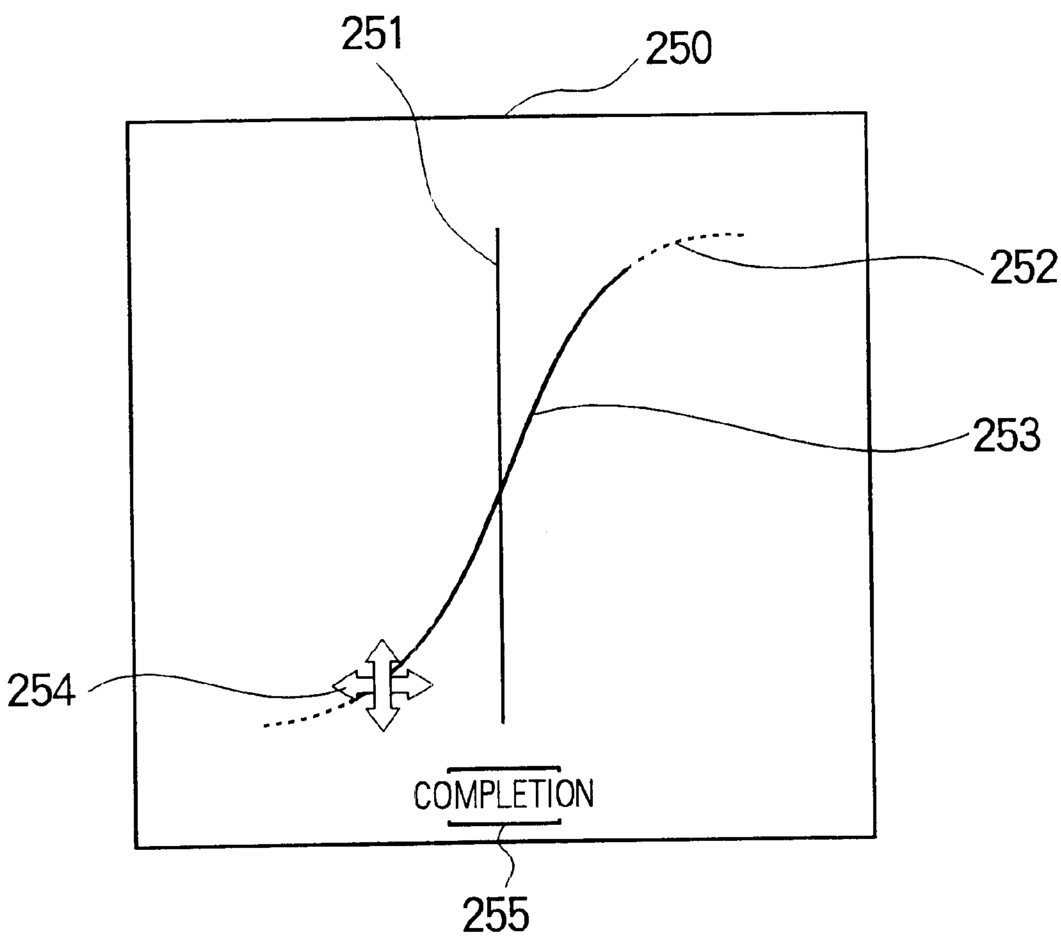
FIG. 75 is a diagram showing an example of a locating programming window by using the speed graph when the S-figure ratio in the S-figure acceleration/deceleration is set and changed in the location programming apparatus according to the first embodiment of the present invention.

FIG. 75 shows an S-figure ratio setting window 250 which is displayed when the S-figure acceleration/deceleration pattern selection button is selected. Reference numeral 252 represents a 100% acceleration pattern in an acceleration region when the S-figure acceleration/deceleration control is performed in accordance with, for example, a sine curve. Reference numeral 251 represents a center line of the sine curve. Reference numeral 254 represents an S-figure-ratio setting pointer which is formed into an arrow cursor as illustrated when the mouse cursor has been moved onto the sine curve 252. When a dragging operation causes the S-figure-ratio setting pointer 254 on the sine curve 252, a symmetrical set region 253 for the S-figure acceleration pattern with respect to the center line 251, that is, the S-figure ratio can be changed. A position at which dragging has been suspended indicate set data. Reference numeral 255 represents an S-figure-ratio setting completion button for completing setting of the S-figure ratio and closing the S-figure ratio setting window 250.

Figure 76:
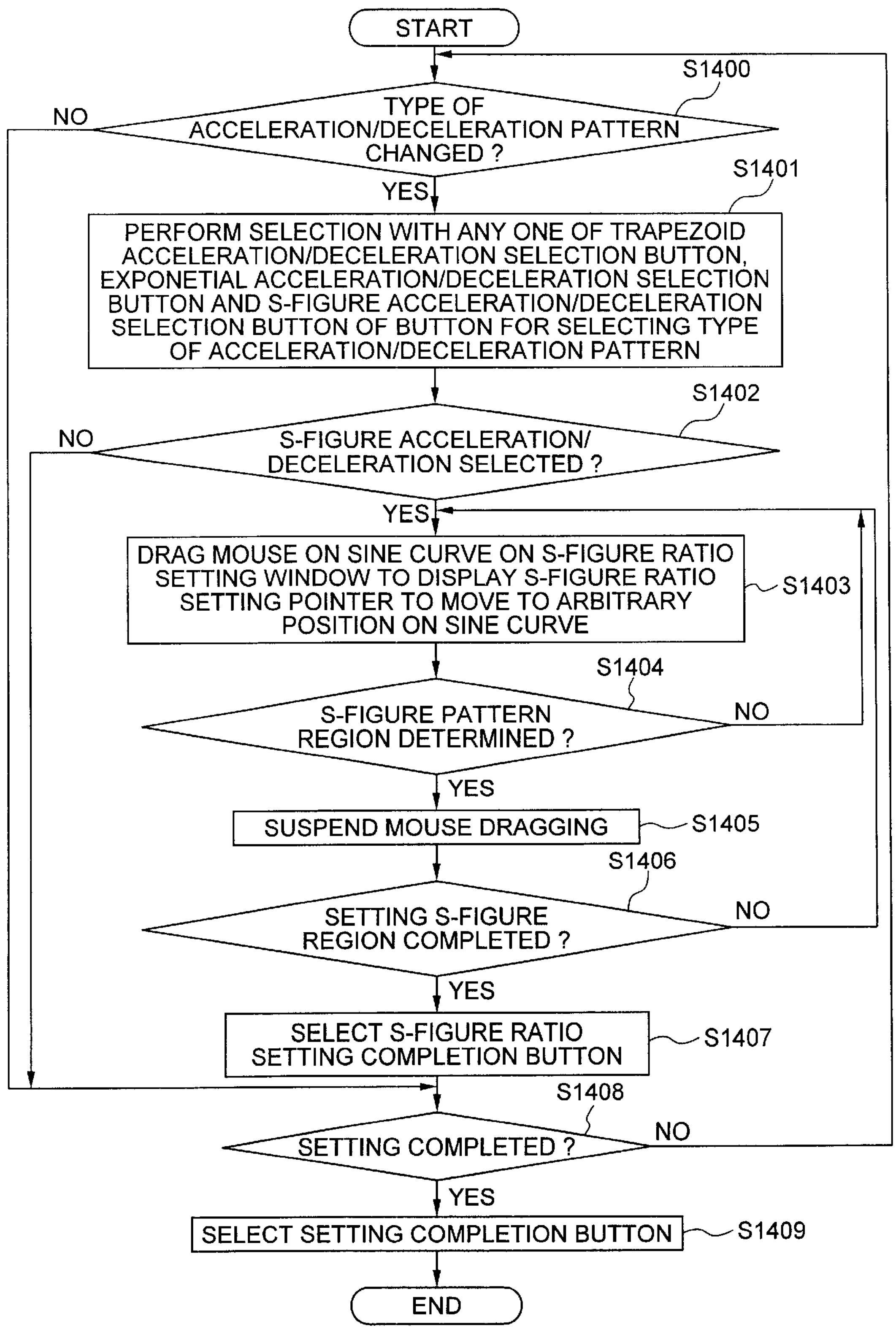
FIG. 76 is a flow chart showing the setting operation of locating programming by using the speed graph when the type of the speed pattern is set and changed in the location programming apparatus according to the first embodiment of the present invention.

The operation for setting and changing the acceleration/deceleration pattern type will now be described with reference to a flow chart shown in FIG. 76. When the acceleration/deceleration pattern type is changed (step S1400), any one of the "trapezoid acceleration/deceleration selection button 217*a*", "the exponential acceleration/deceleration button 217*b*" and the "S-figure acceleration/deceleration selection button 217*c*" of the acceleration/deceleration pattern selection button 217 is operated to perform selection (step S1401). When the S-figure acceleration/deceleration selection button 217*c* has been selected (step S1402), the S-figure acceleration/deceleration pattern region is set on the displayed S-figure ratio setting window 250. Initially, the mouse is dragged on the sine curve 252 so as to display the S-figure-ratio setting pointer 254. Then, the S-figure-ratio setting pointer 254 is moved to an arbitrary position on the sine curve so as to set the region for the S-figure acceleration pattern (step S1403). After the S-figure acceleration pattern region has been determined (step S1404), mouse dragging is suspended (step S1405). When the S-figure pattern region has been set (step S1406), the S-figure-ratio setting completion button 255 is selected (step S1407) to close the S-figure ratio setting window. Then, the operation proceeds to step S1408. If the S-figure pattern region is furthermore changed in step S1406, the operation returns to step S1403.

If the acceleration/deceleration pattern type is not changed in step S1400, the operation proceeds to step S1408. When a button except for the S-figure acceleration/deceleration selection button 217*c* has been selected in step S1402, the operation proceeds to step S1408. If the acceleration/deceleration pattern type is furthermore changed, the operation returns to step S1400. When setting of the acceleration/deceleration pattern type has been completed (step S1408), the setting completion button 160 is selected (step S1409). Then, the operation is ended.

Figure 77:
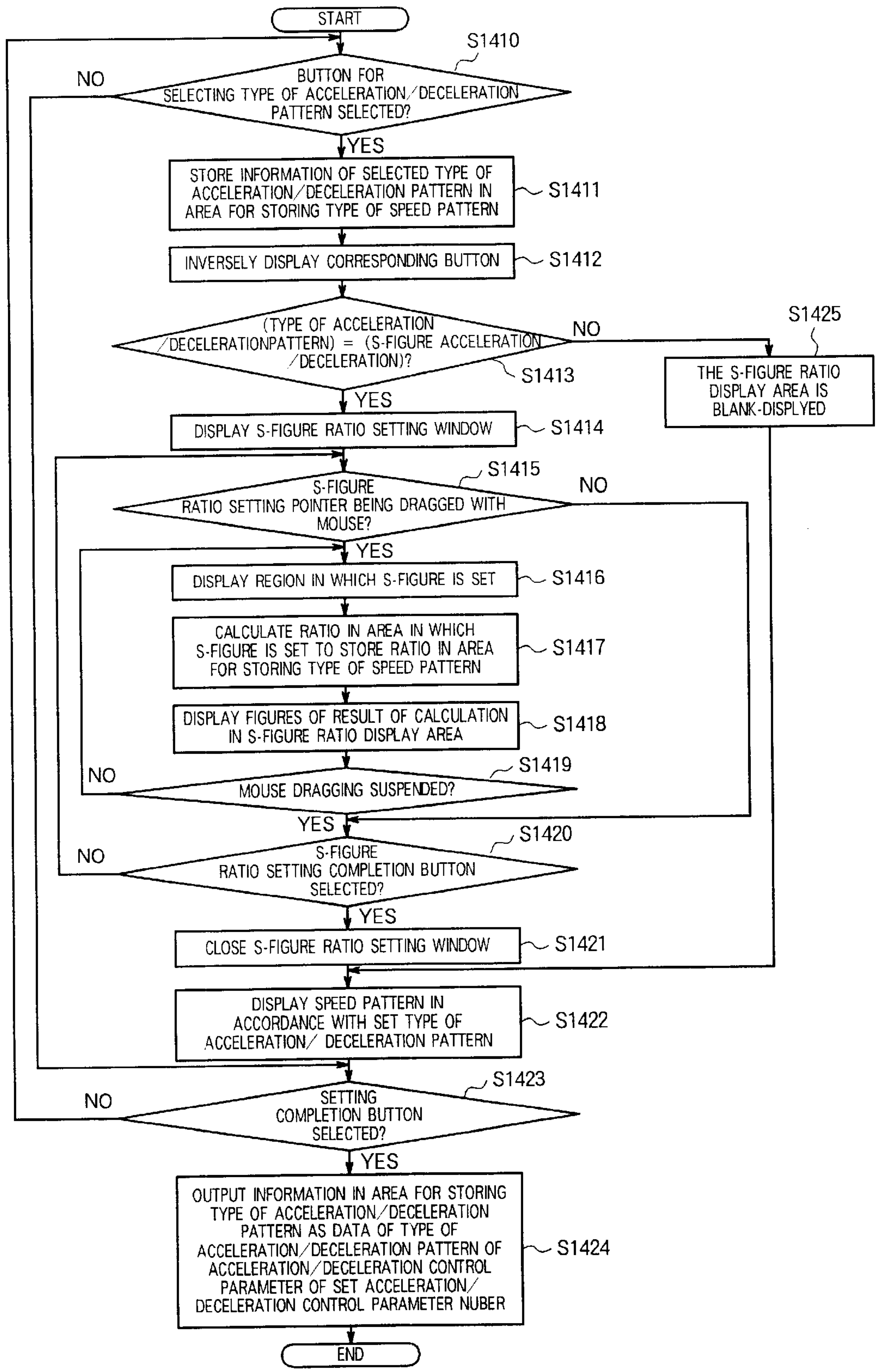
FIG. 77 is a flow chart showing the operation of locating programming by using the speed graph when the type of the speed pattern is set and changed in the location programming apparatus according to the first embodiment of the present invention.

The operation for setting and changing the acceleration/deceleration pattern type will now be described with reference to a flow chart shown in FIG. 77. When the acceleration/deceleration pattern selection button 217 has been selected (step S1410), information of the selected acceleration/deceleration pattern type is stored in the acceleration/deceleration pattern type storage area 236 (step S1411). Moreover, a corresponding button is inversely displayed (step S1412).

If the selected acceleration/deceleration pattern type is the S-figure acceleration/deceleration (step S1413), the S-figure ratio setting window 250 is displayed (step S1414) so that the process for setting the S-figure acceleration/deceleration pattern region is performed. If the S-figure-ratio setting pointer 254 is being dragged with the mouse (step S1415), a S-figure setting region 253 indicated with the pointer is displayed on the 100% acceleration pattern 252 (step S1416). Then, information of the ratio corresponding to the S-figure setting region 253 is calculated so as to be stored in the acceleration/deceleration pattern type storage area 236 (step S1417). Then, a result of the calculation is displayed on the S-figure ratio display area 218 with figures (step S1418). The processes in steps S1416 to S1418 are performed until mouse dragging is suspended. When mouse dragging is suspended, the operation proceeds to step S1420 (step S1419). If the S-figure-ratio setting pointer 254 is not being dragged with the mouse in step S1415, the operation proceeds to step S1420. The operation returns to step S1415 until the S-figure-ratio setting completion button 255 is selected. When the S-figure-ratio setting completion button 255 has been selected (step S1420), the S-figure ratio setting window 250 is closed (step S1421). Then, the operation proceeds to step S1422.

If acceleration/deceleration pattern type selected in step S1413 is not the S-figure acceleration/deceleration, the S-figure ratio display area 218 is blank-displayed (step S1425). Then, the operation proceeds to step S1422.

In accordance with information in the acceleration/deceleration pattern type storage area 236, the acceleration pattern and the deceleration pattern of the speed pattern 214 are displayed on the speed graph (step S1422). Then, the operation proceeds to step S1423. If the acceleration/deceleration pattern selection button 217 has not been selected in step S1410, the operation proceeds to step S1423.

The operation returns to step S1410 until the setting completion button 160 is selected. When the setting completion button 160 has been selected (step S1423), information in the acceleration/deceleration pattern type storage area 236 of speed graph output information is outputted as data 1806 of the acceleration/deceleration pattern type of the acceleration/deceleration parameter corresponding to the acceleration/deceleration control parameter number 1230, and the operation is ended (step S1424).

The above-mentioned location programming apparatus enables the acceleration/deceleration pattern, that is, the control operation to easily be understood. Moreover, an acceleration/deceleration pattern suitable for a subject which must be controlled can easily be determined.

14. Setting and Changing Acceleration Time By Using Speed Graph

Figure 78:
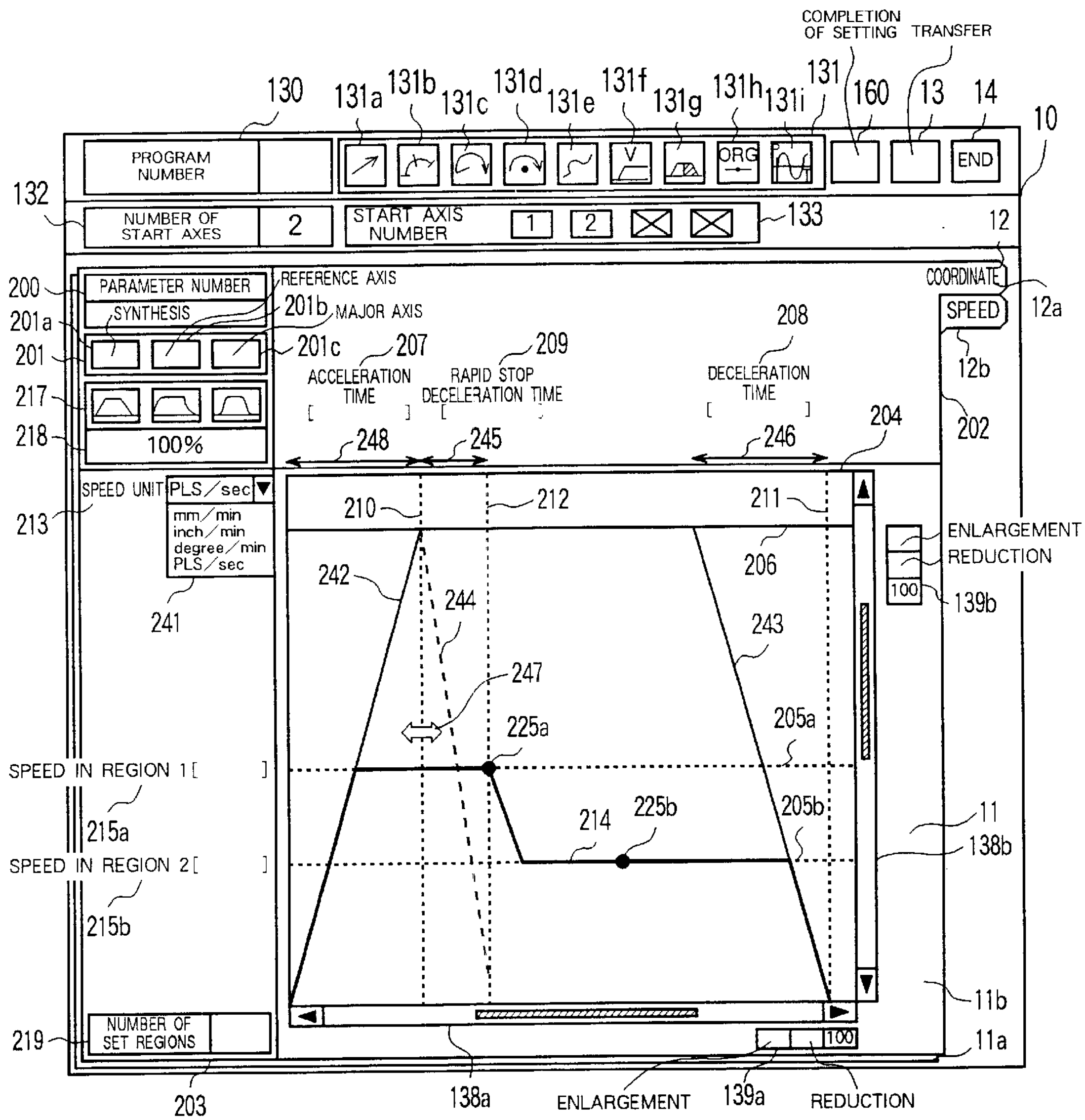
FIG. 78 is a diagram showing an example of a locating programming window by using the speed graph when acceleration time, deceleration time and rapid stop deceleration time are set and changed in the location programming apparatus according to the first embodiment of the present invention.
Figure 79:
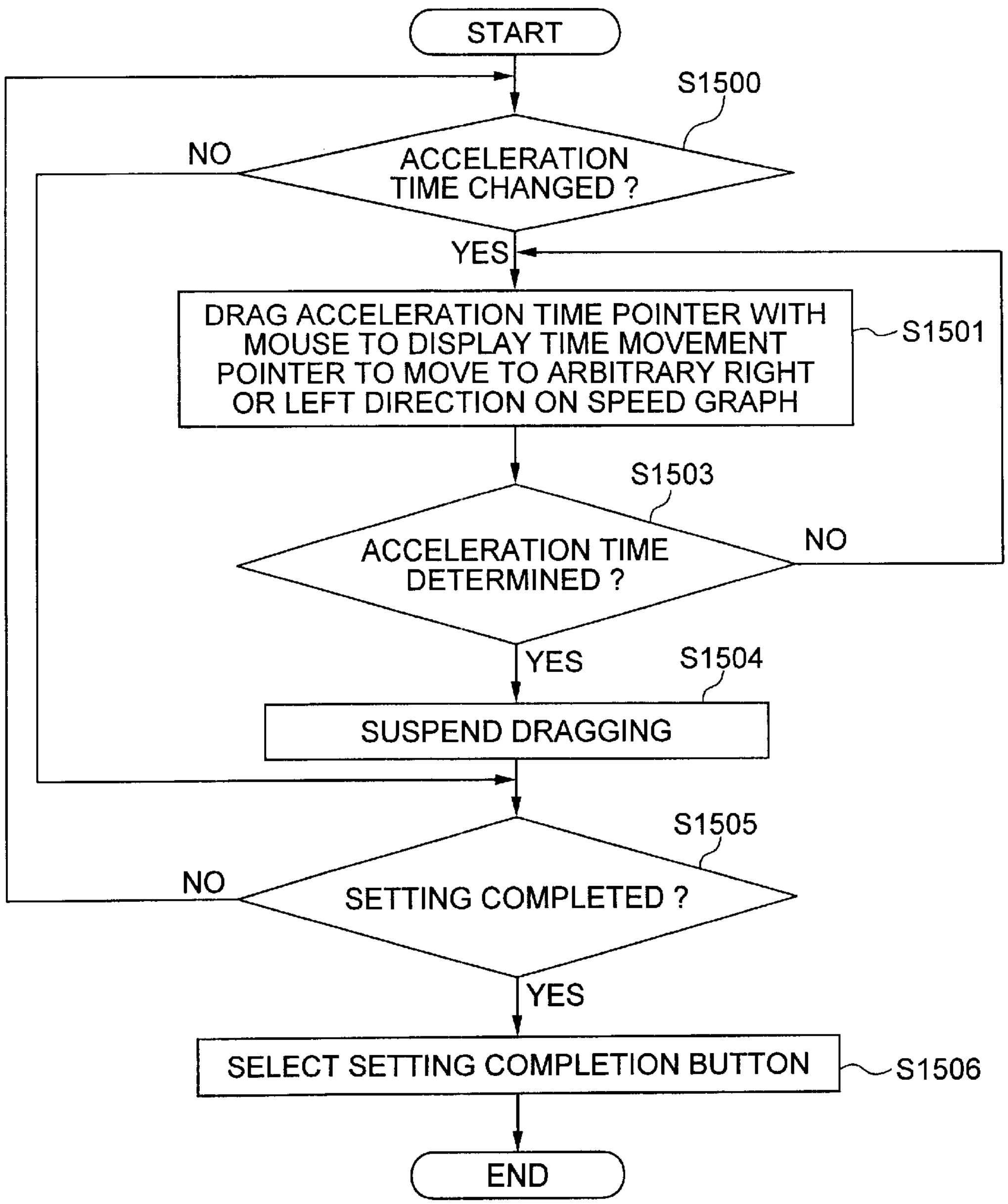
FIG. 79 is a flow chart showing the setting operation of locating programming by using the speed graph when the acceleration time is set and changed in the location programming apparatus according to the first embodiment of the present invention.
Figure 80:
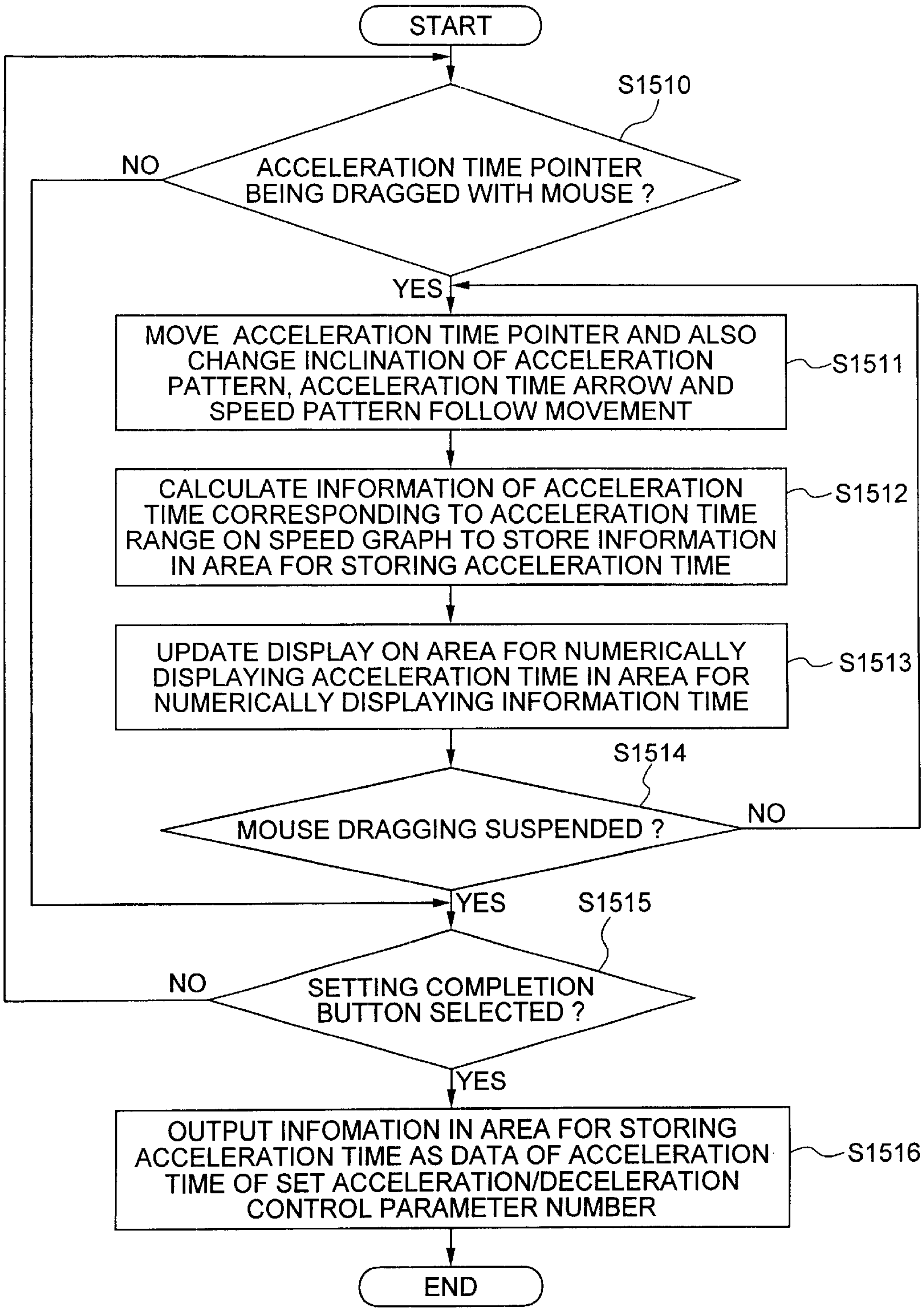
FIG. 80 is a flow chart showing the locus of locating programming by using the speed graph when the acceleration time is set and changed in the location programming apparatus according to the first embodiment of the present invention.

The operation for setting and changing acceleration time by suing the speed graph will now be described with reference to FIGS. 78 to 80. FIG. 78 shows an example of a locating programming window by using a speed graph for setting and changing acceleration time. Reference numeral 247 represents a time movement pointer for changing time data. When the mouse cursor is moved onto the time pointer, the time movement pointer 247 is formed into an arrow cursor facing right and left as illustrated. When a dragging operation is performed, the time movement pointer 247 is able to move in the speed-graph making and displaying area 204 to the right and left. A position at which mouse dragging has been suspended indicate set time. Reference numeral 248 represents an acceleration time range with which the width of acceleration time for which acceleration has been started to reach limited speed is indicated by the length of an arrow. Reference numeral 207 represents an acceleration time display area, 242 represents a inclination of the acceleration pattern and 210 represents a acceleration time pointer for changing acceleration time, that is, the inclination 242 of the acceleration pattern.

The operation for changing acceleration time will now be described with reference to a flow chart shown in FIG. 79. The acceleration time pointer 210 is located at the position of set time in the speed-graph making and displaying area 204 in the displayed initial window described in the locating programming using the above-mentioned speed graph. When acceleration time is changed (step S1500), the acceleration time pointer 210 is dragged with the mouse so that the time movement pointer 247 is displayed which is moved to an arbitrary position in the right and left directions on the speed graph (step S1501). When the acceleration time has been set (step S1503), mouse dragging is suspended (step S1504), the operation proceeds to step S1505. If acceleration time is not changed in step S1500, the operation proceeds to step S1505. If acceleration time is furthermore changed, the operation returns to step S1500. If the operation for setting acceleration time has been completed (step S1505), the setting completion button 160 is selected (step S1506) and the operation is ended.

The operation for changing acceleration time will now be described with reference to a flow chart shown in FIG. 80. When the acceleration time pointer 210 is being dragged with the mouse (step S1510), the acceleration time pointer 210 is moved to follow the time movement pointer 247. Moreover, also the inclination 242 of the acceleration pattern, the acceleration time range 248 and the speed pattern 214 are changed (step S1511). Moreover, information of acceleration time corresponding to the length of the acceleration time range 248 on the speed graph is calculated so as to be stored in the acceleration-time storage area 233 (step S1512). Thus, display on the acceleration time display area 207 of the time-information-value display area 202 is updated (step S1513). The processes in steps S1511 to S1513 are performed until mouse dragging is suspended. When mouse dragging has been suspended, the operation proceeds to step S1515 (step S1514). If the acceleration time pointer 210 is not being dragged with the mouse in step S1510, the operation proceeds to step S1515.

The operation returns to step S1510 until the setting completion button 160 is selected. When the setting completion button 160 has been selected (step S1515), information in the acceleration-time storage area 233 of speed graph output information is outputted as acceleration time data 1803 of the acceleration/deceleration control parameter corresponding to the acceleration/deceleration control parameter number 1 and the operation is ended (step S1516).

The above-mentioned location programming apparatus enables adjustment to be performed while change of the acceleration pattern can be confirmed as a result of change in the acceleration time.

Figure 81:
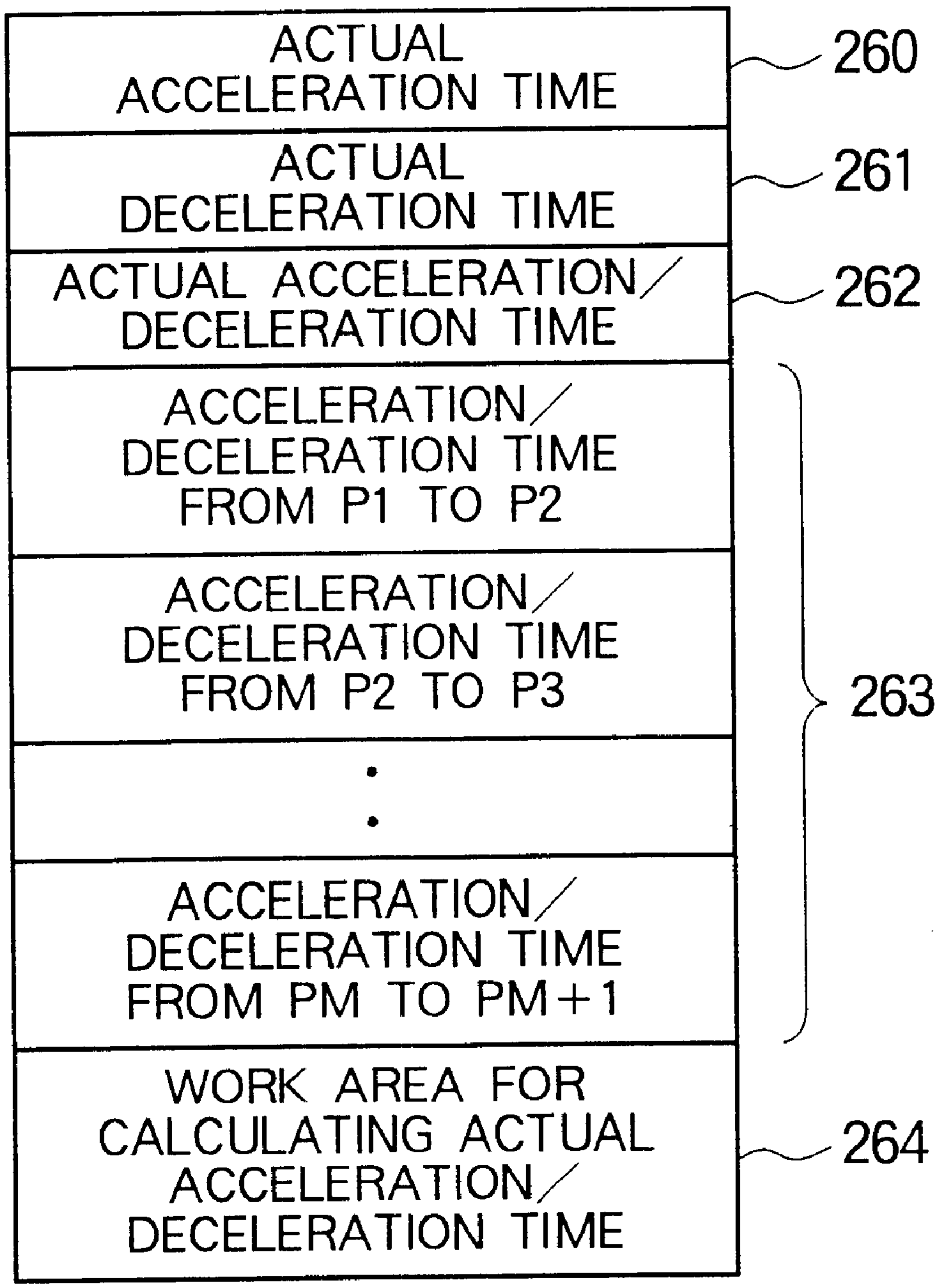
FIG. 81 is a detailed view showing an actual acceleration/deceleration time information storage area of speed graph output information of the location programming apparatus according to the first embodiment of the present invention.

15. Calculation and Display of Actual Acceleration Time in Acceleration Region By Using Speed Graph The Operation for calculating and displaying actual acceleration time in an acceleration period by using a speed graph will now be described with reference to FIGS. 81 to 84. FIG. 81 shows an actual acceleration/deceleration time information storage area 222 of the speed-graph-output-information storage area 72 which is composed of an actual-acceleration-time storage area 260 for storing a result of calculations of actual acceleration time required to reach instructed speed for region 1 and an actual-deceleration-time storage area 261 for storing a result of calculations of actual deceleration time required from instructed speed in the final region to completion of deceleration. Moreover, the actual acceleration/deceleration time information storage area 222 has an actual-rapid-stop-deceleration-time storage area 262 for storing a result of calculations of actual rapid stop deceleration time required from the instructed speed for the region 1 to completion of rapid stop, a speed-change-point-acceleration/deceleration-time storage area 263 for storing a result of calculations of acceleration time or deceleration time required for the speed to reach the instructed speed between passing points and an actual acceleration/deceleration-time calculating work area 264. The speed-change-point-acceleration/deceleration-time storage area 263 has a capacity corresponding to the number M of the passing points.

Figure 82:
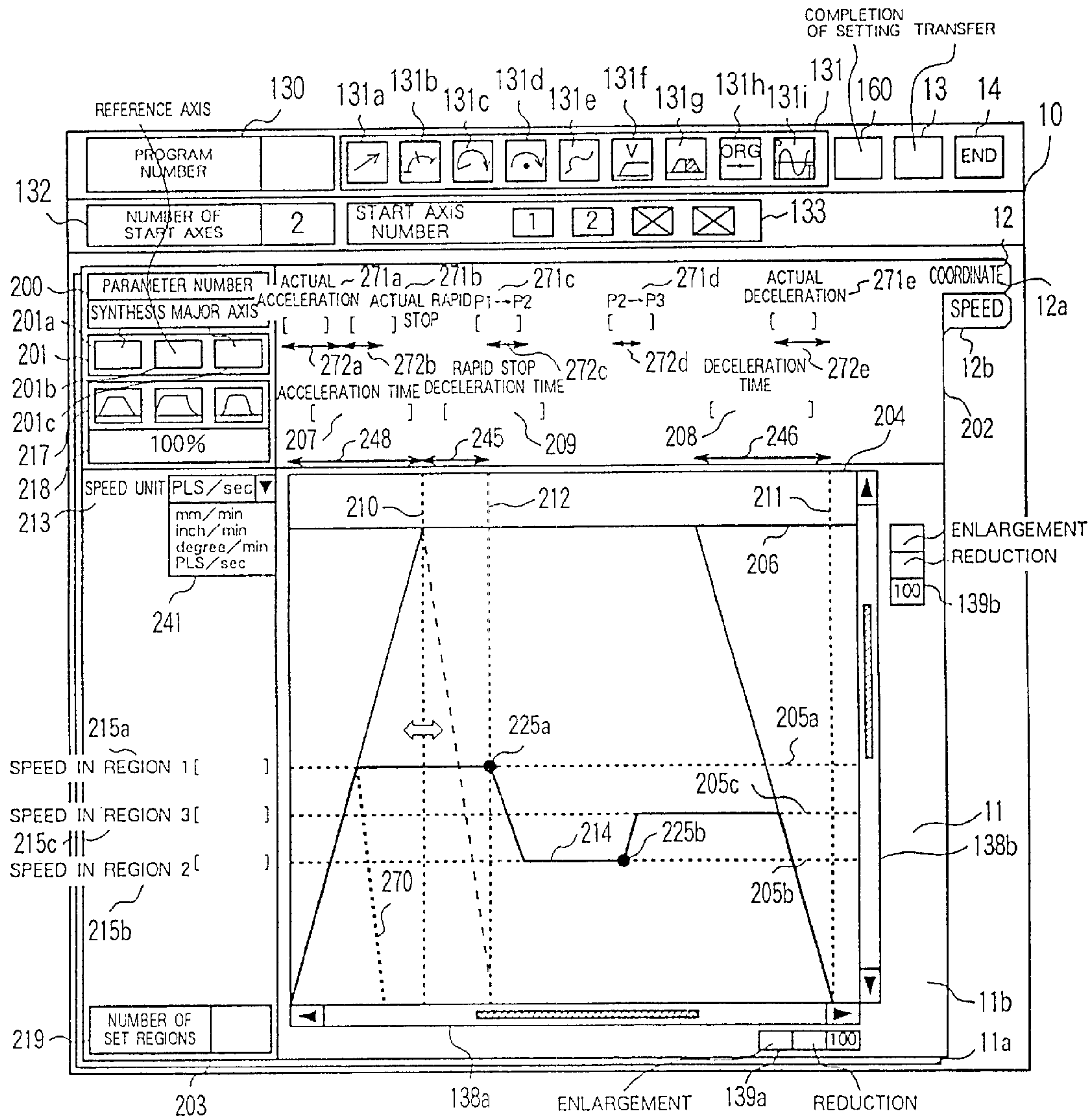
FIG. 82 is a diagram showing an example of a locating programming window by suing the speed graph when the actual acceleration time, actual deceleration time and actual rapid stop deceleration time are calculated and displayed in the location programming apparatus according to the first embodiment of the present invention.

FIG. 82 shows an example of a locating programming window by using a speed graph and displaying a result of calculations of actual acceleration/deceleration time. Reference numeral 271*a* represents actual-acceleration-time display area, 271*c* and 271*d* represent speed-change-point-actual acceleration/deceleration time display areas and 272*a*, 272*c* and 272*d* represent ranges indicated by the areas 271*a*, 271*c* and 271*d* with arrows.

Figure 83:
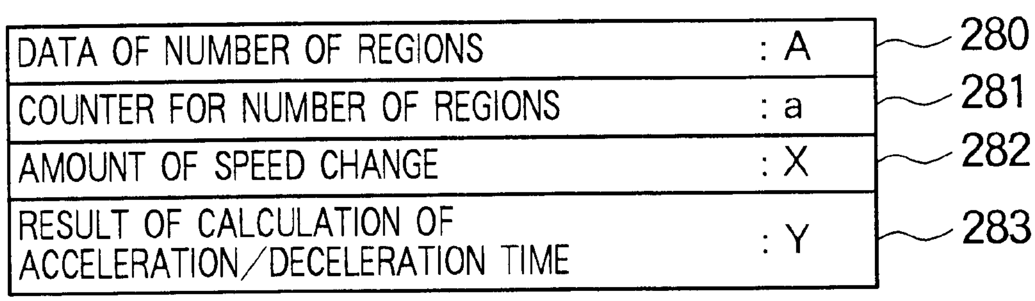
FIG. 83 is a detailed view showing an actual acceleration/deceleration time information storage area of speed graph output information when the actual acceleration time, acceleration deceleration time and actual rapid stop deceleration time are calculated and displayed in the location programming apparatus according to the first embodiment of the present invention.

FIG. 83 shows the actual acceleration/deceleration-time calculating work area 264 for use when the actual acceleration/deceleration time for the speed change point and composed of a work area 280 for data of the number of regions, a work area 281 for a counter of the number of regions, a work area 282 for an amount of changed speed and a work area 283 for a result of calculations of acceleration/deceleration time.

Figure 84:
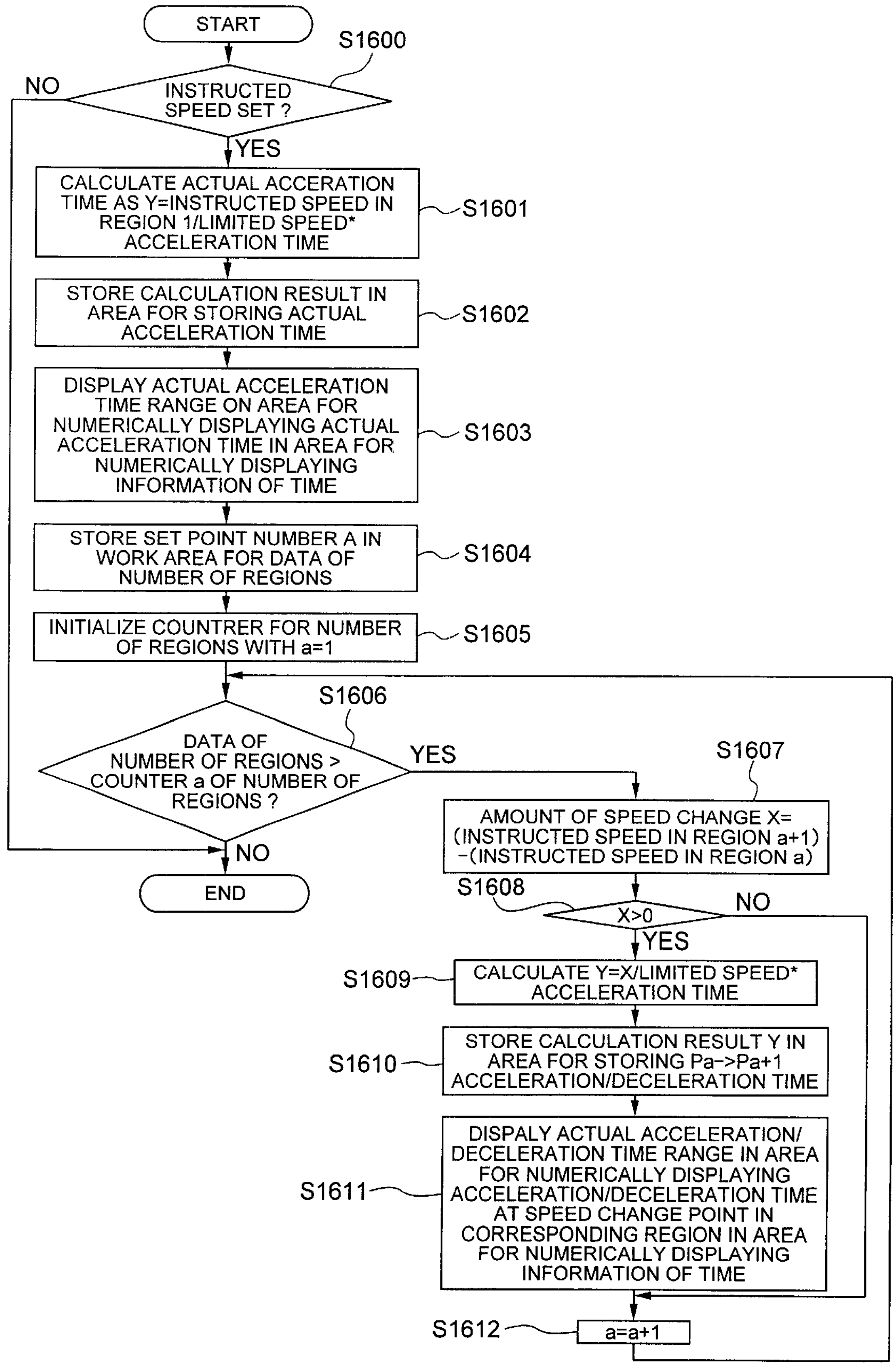
FIG. 84 is a flow chart showing the operation of locating programming by using the speed graph when the actual acceleration time is calculated and displayed in the location programming apparatus according to the first embodiment of the present invention.

The operation for calculating and displaying actual acceleration time in an acceleration period will now be described with reference to a flow chart shown in FIG. 84. If the speed is not instructed, no operation is performed and the process is ended. If speed has been instructed (step S1600), actual acceleration time Tar with respect to instructed speed for the region 1 is calculated in accordance with Equation 1100 (step S1601). A result of the calculations is stored in the work area 283 for a result of calculations of acceleration/deceleration time and an actual-acceleration-time storage area 260 (step S1602).

$$Tar = Ta * V1 / Vmax \qquad \text{Equation 1100}$$

Tar: actual acceleration time in region 1

Ta: acceleration time

Vmax: limited speed

V1: instructed speed for region 1

In accordance with data in the actual-acceleration-time storage area 260, the actual-acceleration-time display area

271*a* and actual-acceleration-time range 272*a* of the time-information-value display area 202 are displayed (step S1603).

The contents (A) of the area 120 for storing the number of set points are stored in the work area 280 for data of the number of regions (step S1604). Then, the work area 281 for the counter (a) of the number of regions is initialized to "1" (step S1605). If data A of the number of regions is larger than the counter a of the number of regions, the processes in step S1607 to S1612 are performed. Thus, actual acceleration time required for the acceleration region between passing points to reach the instructed speed is calculated. If data A of the number of regions is smaller than the counter a of the number of regions, the process for calculating and displaying the actual acceleration time is ended (step S1606).

If data A of the number of regions is larger than the counter a of the number of regions, the difference between the instructed speed in the region $P_a$ and that in the region $P_{a+1}$ is calculated in accordance with Equation 1101 so as to be stored in the work area 282 for changing speed (X) (step S1607). If the amount X of changed speed is larger than 0 (step S1608), an acceleration region is indicated. Therefore, actual acceleration time Tarx between regions $P_a$ and $P_{a+1}$ is calculated in accordance with the Equation 1102 so as to be stored in the work area 283 for a result of calculations of acceleration/deceleration time (step S1609). Then, the contents of the work area 283 for a result of calculations of acceleration/deceleration time are stored in the Pa→Pa+1 acceleration/deceleration-time storage area 263 (step S1610). In accordance with data above, regions of the speed-change-point acceleration/deceleration time display areas 271*c* and 271*d* and the actual acceleration/deceleration time ranges 272*c* and 272*d* corresponding to $P_a \rightarrow P_{a+1}$ of the time-information-value display area 202 are displayed (step S1611). Then, the operation proceeds to step S1612.

$$X=Va+1-Va \quad \text{Equation 1101}$$

$$Tarx=Ta*X/Vmax \quad \text{Equation 1102}$$

X: amount of changed speed

Va: instructed speed in region a

Va+1: instructed speed in region a+1

Tarx: actual acceleration time between region Pa and region Pa+1

Ta: acceleration time

Vmax: limited speed

If the amount X of the changed speed is zero or smaller than zero in step S1608, the same instructed speed or a deceleration region is indicated. Therefore, the operation proceeds to step S1612. Finally, the counter a for counting the number of regions is increased by one so that the counter is updated (step S1612). Then, the operation returns to step S1606. In step S1606 data A of the number of regions and the counter a for counting the number of regions are again subjected to a comparison. If the counter a for counting the number of regions is larger than A, calculation and display of the actual acceleration time are completed.

The above-mentioned location programming apparatus enables actual acceleration time in an acceleration period of an instructed speed pattern to automatically be recognized when a locating programming process is performed. Moreover, acceleration time suitable for a subject which must be controlled can easily be determined.

16. Setting and Change of Deceleration Time By Using Speed Graph

Figure 85:
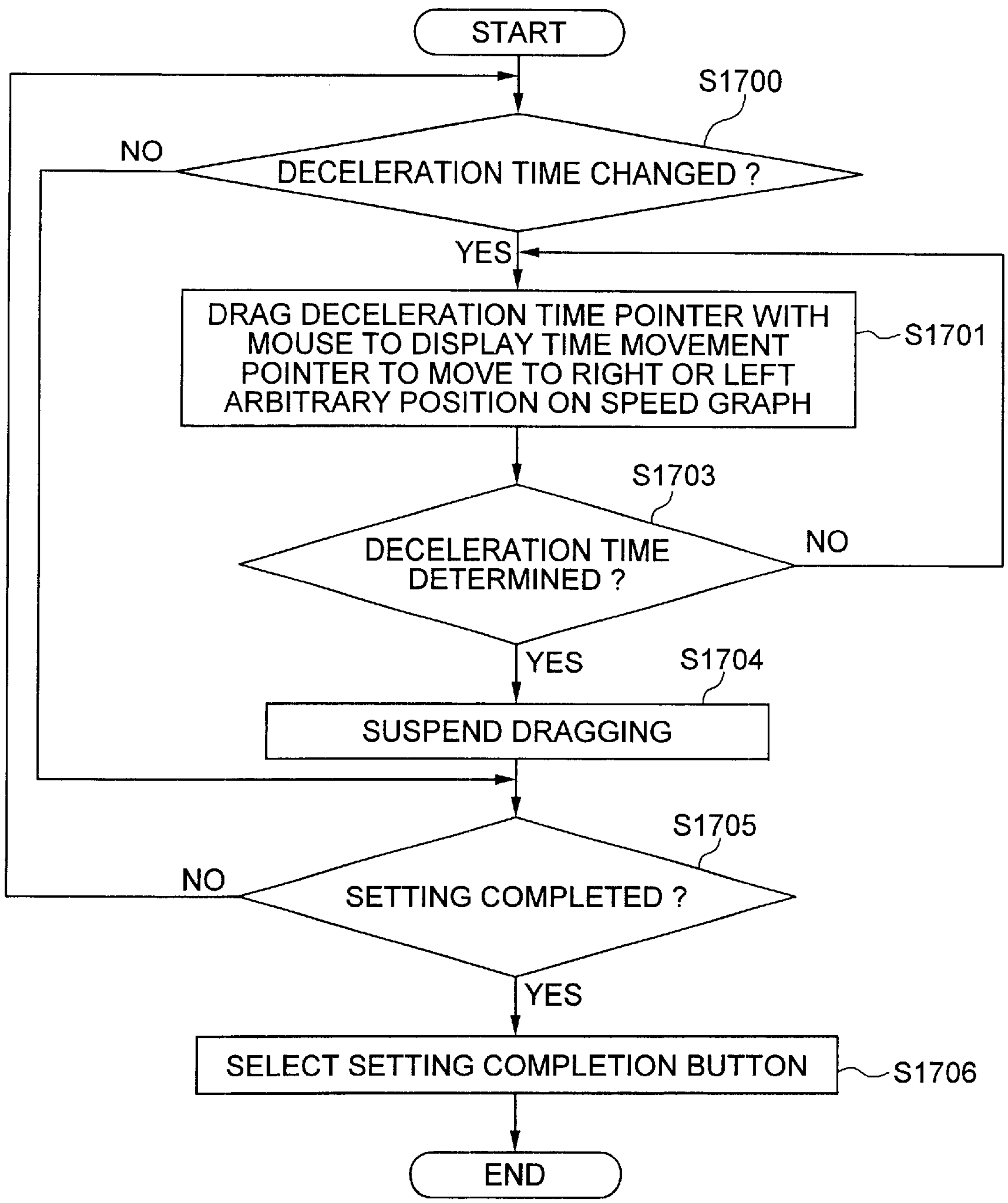
FIG. 85 is a flow chart showing the setting operation of locating programming by using the speed graph when the changed time is set and changed in the location programming apparatus according to the first embodiment of the present invention.
Figure 86:
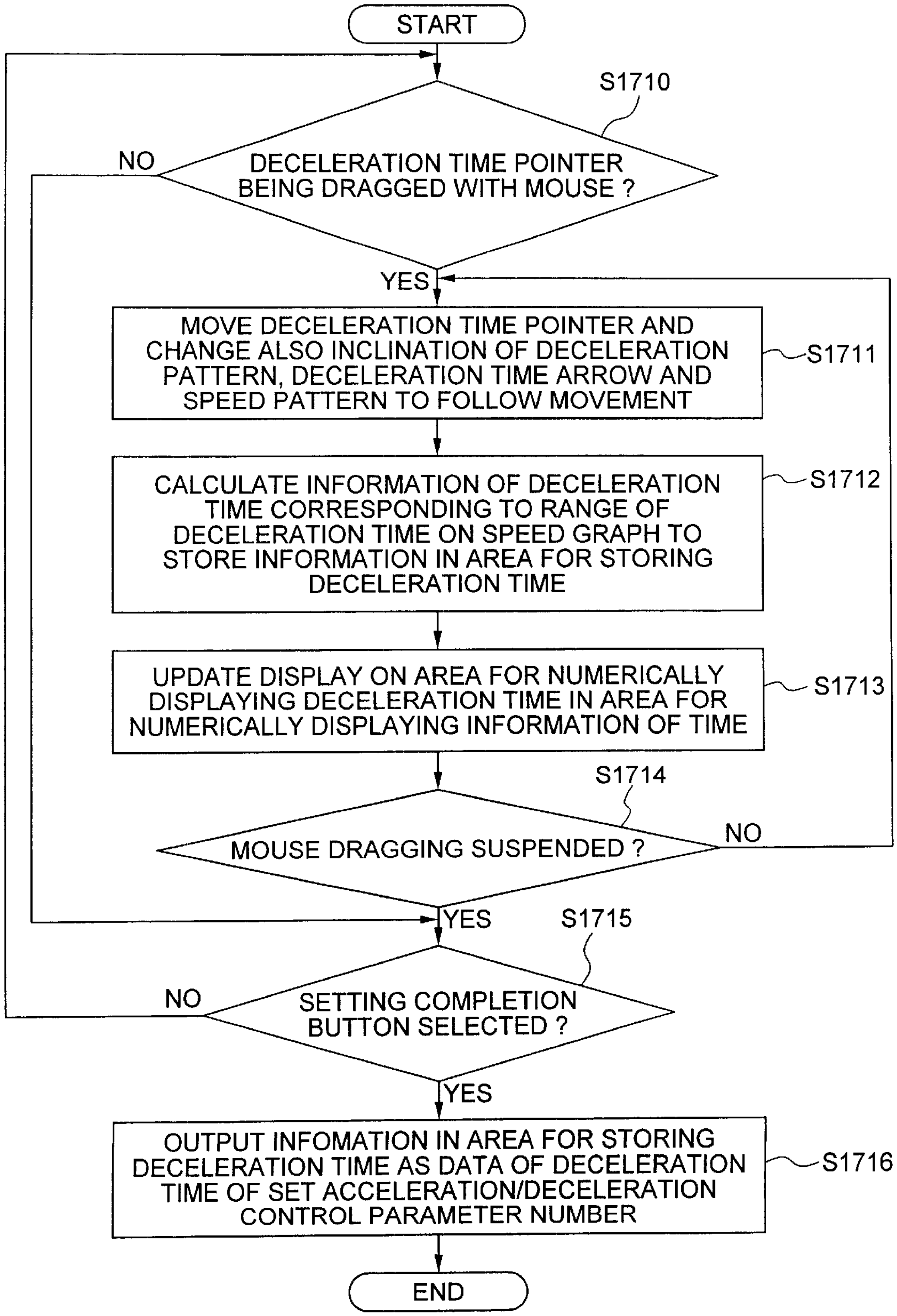
FIG. 86 is a flow chart showing the operation of locating programming by using the speed graph when the deceleration time is set and changed in the location programming apparatus according to the first embodiment of the present invention.

The operation for setting and changing deceleration time by using a speed graph will now be described with reference to FIGS. 78, 85 and 86. FIG. 78 shows an example of a locating programming window by using a speed graph when the acceleration time is set and changed. A similar window is used when the deceleration time is set and changed as described below. Referring to the drawing, reference numeral 246 represents a deceleration time range in which the width of deceleration time required from limited speed to completion of deceleration and stop with the length of an arrow. Reference numeral 208 represents a deceleration time display area, 243 represents inclination of a deceleration pattern and 211 represents a deceleration time pointer for changing deceleration time, that is, the inclination 243 of the deceleration pattern.

The operation for changing deceleration time will now be described with reference to a flow chart shown in FIG. 85. The deceleration time pointer 211 is located at the position of set time in the speed-graph making and displaying area 204 of the initially displayed window for use when the locating programming is performed by using a speed graph. When deceleration time is changed (step S1700), the deceleration time pointer 211 is dragged with the mouse so that the time movement pointer 247 is displayed which is moved to an arbitrary position in the right or left direction on the speed graph (step S1701). When deceleration time has been determined (step S1703), mouse dragging is suspended (step S1704). Then, the operation proceeds to step S1705. When deceleration time is not changed in step S1700, the operation proceeds to step S1705. When deceleration time is furthermore changed, the operation returns to step S1700. When deceleration time has been set (step S1705), the setting completion button 160 is selected (step S1706). Then, the operation is ended.

The operation for changing deceleration time will now be described with reference to a flow chart shown in FIG. 86. When the deceleration time pointer 211 is being dragged with the mouse (step S1710), the deceleration time pointer 211 is moved to follow the time movement pointer 247. Moreover, also the inclination 243 of the deceleration pattern, the deceleration time range 246 and the speed pattern 214 are changed (step S1711). Moreover, information of deceleration time corresponding to the length of the deceleration time range 246 on the speed graph is calculated so as to be stored in the deceleration-time storage area 234 (step S1712). Thus, display on the deceleration time display area 208 of the time-information-value display area 202 is updated (step S1713). The processes in steps S1711 to S1713 are performed until mouse dragging is suspended. When mouse dragging is suspended, the operation proceeds to step S1715 (step S1714). When the deceleration time pointer 211 is not being dragged with the mouse in step S1710, the operation proceeds to step S1715.

The operation returns to step S1710 until the setting completion button 160 is selected. When the setting completion button 160 has been selected (step S1715), information in the deceleration-time storage area 234 of speed graph output information is outputted as data 1804 of deceleration time of the acceleration/deceleration control parameter corresponding to the acceleration/deceleration control parameter number 1 and the operation is ended (step S1716).

The above-mentioned location programming apparatus is able to perform adjustment while change in the deceleration pattern occurring when the deceleration time is changed is confirmed.

Figure 87:
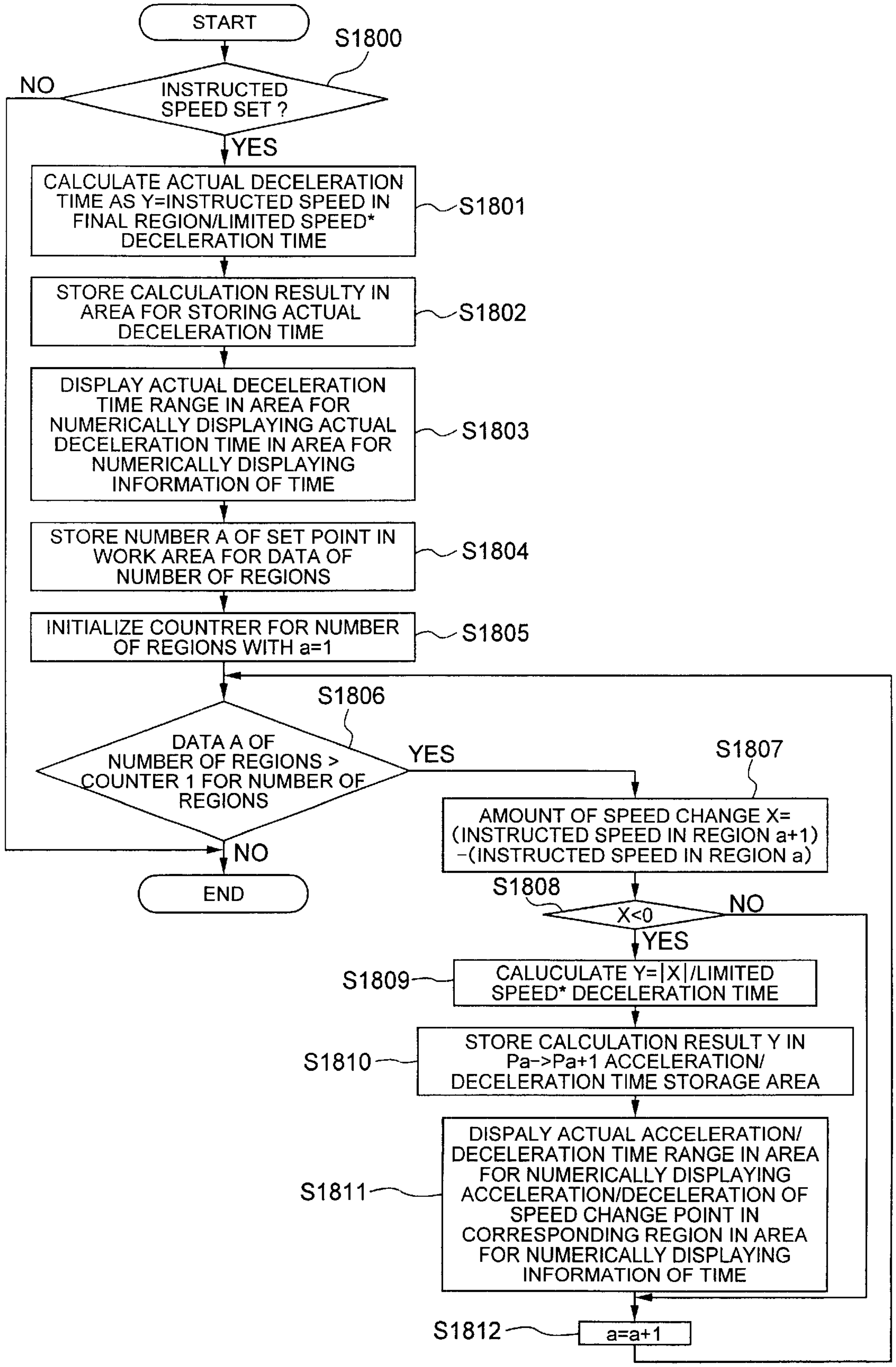
FIG. 87 is a flow chart showing the operation of locating programming by using the speed graph when the actual deceleration time is calculated and displayed in the location programming apparatus according to the first embodiment of the present invention.

17. Calculation and Display of Actual Deceleration Time in Deceleration Region By Using Speed Graph The operation for calculating and displaying actual deceleration time in a deceleration region by using a speed graph will now be described with reference to FIGS. 81 to 83 and 87. FIG. 87 shows an example of a locating programming window by using a speed graph in such a manner that a result of calculated actual acceleration/deceleration time is shown. Reference numeral 271*e* represents actual-deceleration-time display area, 271*c* and 271*d* represent speed-change-point-actual acceleration/deceleration time display areas and 272*c*, 272*d* and 272*e* represents the ranges indicated by the areas 271*c*, 271*d* and 271*e* with arrows.

The operation for calculating and displaying actual deceleration time in a deceleration region will now be described with reference to a flow chart shown in FIG. 87. If the speed is not instructed, no operation is performed and the process is ended. If speed has been instructed (step S1800), actual deceleration time Tdr with respect to instructed speed for the final region is calculated in accordance with Equation 1200 (step S1801). A result of calculations is stored in the work area 283 for calculating acceleration/deceleration time and stored in the actual-deceleration-time storage area 261 (step S1802).

$$Tdr=Td*VM+1/Vmax \qquad \text{Equation 1200}$$

Tdr: actual deceleration time in final region

Td: deceleration time

Vmax: limited speed

VM+1: instructed speed for final region

In accordance with data in the actual-deceleration-time storage area 261, the actual-deceleration-time display area 271*e* and the actual deceleration time range 272*e* of the time-information-value display area 202 are displayed (step S1803).

The contents (A) of the area 120 for storing the number of set points are stored in the work area 280 for data of the number of regions (step S1804). Then, the work area 281 for the counter (a) of the number of regions is initialized to "1" (step S1805). If data A of the number of regions is larger than the counter a of the number of regions, the processes in step S1807 to S1812 are performed. Thus, actual deceleration time required for the deceleration region between the passing points from instructed speed to completion of the deceleration and stop is calculated. If data A of the number of regions is smaller than the counter a of the number of regions, the process for calculating and displaying the actual deceleration time is ended (step S1806).

If data A of the number of regions is larger than the counter a of the number of regions, the difference between the instructed speed in the region $P_a$ and that in the region $P_{a+1}$ is calculated in accordance with Equation 1201 so as to be stored in the work area 282 for changing speed (X) (step S1807). If the amount X of changed speed is larger than 0 (step S1808), a deceleration region is indicated. Therefore, actual deceleration time Tdrx between regions $P_a$ and $P_{a+1}$ is calculated in accordance with the Equation 1202 so as to be stored in the work area 283 for a result of calculations of acceleration/deceleration time (step S1809). Then, the contents of the work area 283 for a result of calculations of acceleration/deceleration time are stored in the $P_a \rightarrow P_{a+1}$ acceleration/deceleration-time storage area 263 (step S1810). In accordance with data above, regions of the speed-change-point acceleration/deceleration time display areas 271*c* and 271*d* and the actual acceleration/deceleration time ranges 272*c* and 272*d* corresponding to $P_a \rightarrow P_{a+1}$ are displayed (step S1811). Then, the operation proceeds to step S1812.

$$X=Va+1-Va \qquad \text{Equation 1201}$$

$$Tdrx=Td*|X|/Vmax \qquad \text{Equation 1202}$$

X: amount of changed speed

Va: instructed speed in region a

Va+1: instructed speed in region a+1

Tdrx: actual deceleration time between region Pa and region Pa+1

Td: deceleration time

Vmax: limited speed

If the amount X of the changed speed is zero or larger than zero in step S1808, the same instructed speed or a acceleration region is indicated. Therefore, the operation proceeds to step S1812. Finally, the counter a for counting the number of regions is increased by one so that the counter is updated (step S1812). Then, the operation returns to step S1806. In step S1806 data A of the number of regions and the counter a for counting the number of regions are again subjected to a comparison. If the counter a for counting the number of regions is larger than A, calculation and display of the actual deceleration time are completed.

The above-mentioned location programming apparatus enables actual deceleration time with respect to a deceleration region of an instructed speed pattern to automatically be recognized when locating programming is performed. Moreover, deceleration time suitable for a subject which must be controlled can easily be determined.

18. Setting and Changing of Rapid Stop Deceleration Time By Using Speed Graph The operation for setting and changing rapid stop deceleration time by using a speed graph will now be described with reference to FIGS. 78, 88 and 89. FIG. 78 shows an example of a locating programming window using a speed graph when the acceleration time is set and changed. Also the operation for setting and changing the rapid stop deceleration time uses a similar window. Referring to the drawing, reference numeral 245 represents a rapid stop deceleration time range in which the width of rapid stop deceleration time required for the limited speed to completion of rapid stop and deceleration is indicated with the length of an arrow. Reference numeral 209 represents a rapid stop deceleration time display area, 244 represents inclination of rapid stop deceleration pattern and 212 represents a rapid stop deceleration time pointer for changing the rapid stop deceleration time, that is, the inclination 244 of the rapid stop deceleration pattern.

Figure 88:
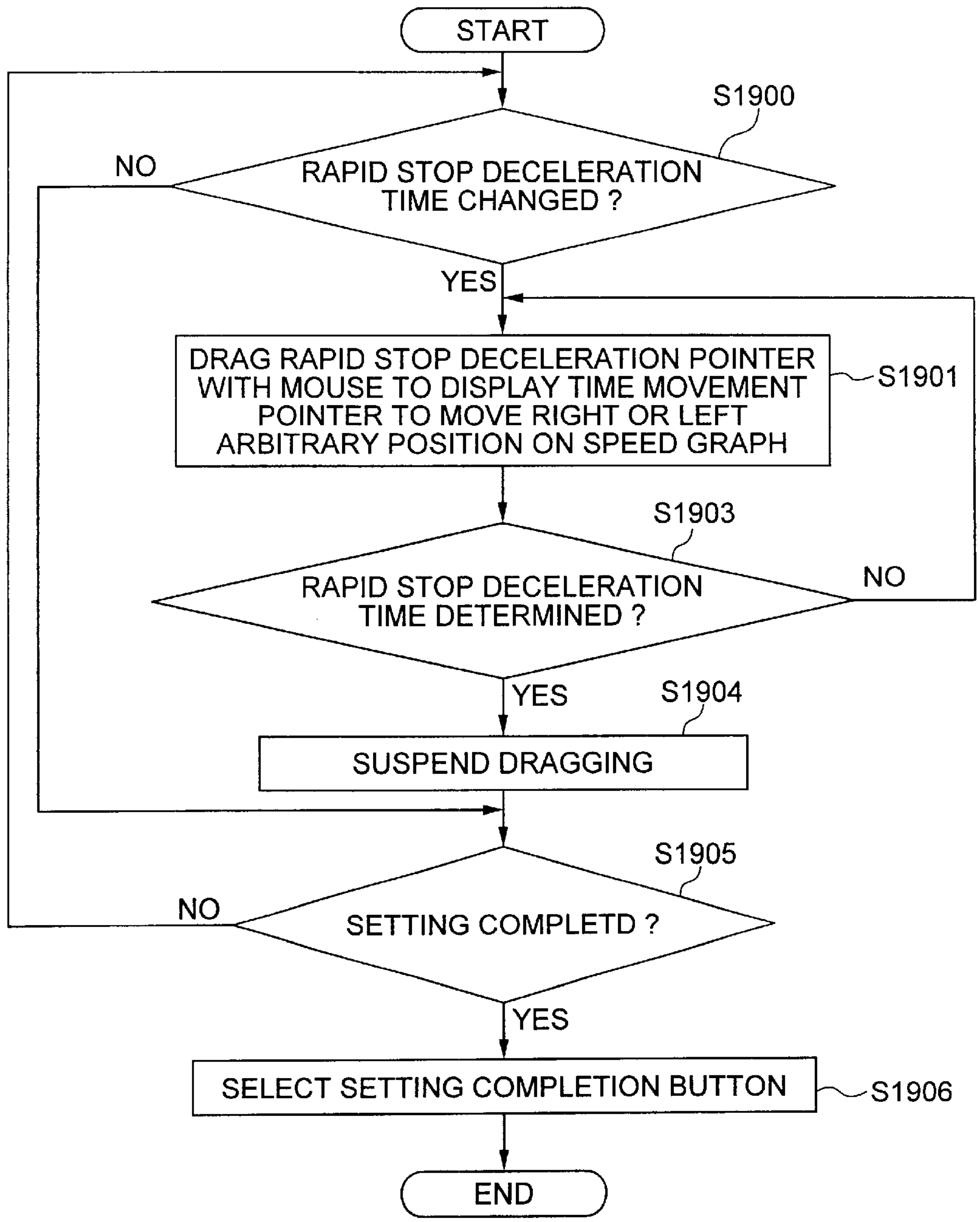
FIG. 88 is a flow chart showing the setting operation of locating programming by using the speed graph when the rapid stop deceleration time is set and changed in the location programming apparatus according to the first embodiment of the present invention.

The operation for changing rapid stop deceleration time will now be described with reference to a flow chart shown in FIG. 88. The rapid stop deceleration time pointer 212 is located at the position of set time in the speed-graph making and displaying area 204 in the displayed initial window described in the locating programming using the speed graph. When the rapid stop deceleration time is changed (step S1900), the rapid stop deceleration time pointer 212 is dragged with the mouse so that the time movement pointer 247 is displayed which is moved to an arbitrary position in the right or left direction on the speed graph (step S1901). When the rapid stop deceleration time has been determined (step S1903), mouse dragging is suspended (step S1904). Then, the operation proceeds to step S1905. If the rapid stop deceleration time is not changed in step S1900, the operation proceeds to step S1905. When the rapid stop deceleration time is furthermore changed, the operation returns to step S1900. When setting of the rapid stop deceleration time has been completed (step S1905), the setting completion button 160 is selected (step S1906). Then, the operation is ended.

Figure 89:
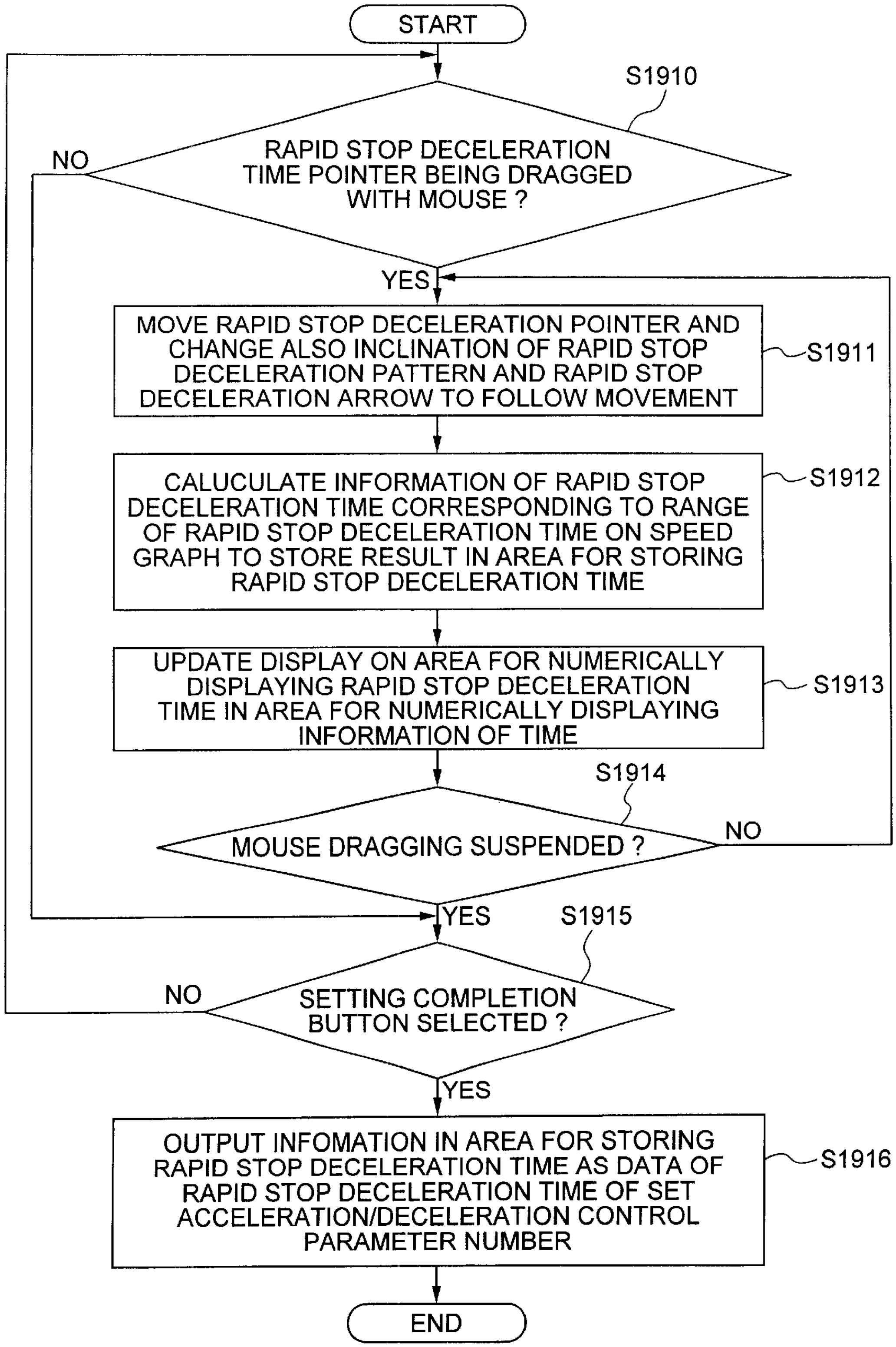
FIG. 89 is a flow chart showing the locating programming operation by using the speed graph when the rapid stop deceleration time is set and changed in the location programming apparatus according to the first embodiment of the present invention.

The operation for changing rapid stop deceleration time will now be described with reference to a flow chart shown in FIG. 89. When the rapid stop deceleration time pointer 212 is being dragged with the mouse (step S1910), the rapid stop deceleration time pointer 212 is moved to follow the time movement pointer 247. Moreover, also the inclination 244 of the rapid stop deceleration pattern 244 and the rapid stop and deceleration time range 245 are changed (step S1911). Moreover, information of rapid stop deceleration time corresponding to the length of the rapid stop and deceleration time range 245 on the speed graph is calculated so as to be stored in the rapid-stop-deceleration-time storage area 235 (step S1912). Thus, display on the rapid stop deceleration time display area 209 of the time-information-value display area 202 is updated (step S1913). The processes in steps S1911 to S1913 are performed until mouse dragging is suspended. When mouse dragging is suspended, the operation proceeds to step S1915 (step S1914). If the rapid stop deceleration time pointer 212 is not being dragged with the mouse in step S1910, the operation proceeds to step S1915.

The operation returns to step S1910 until the setting completion button 160 is selected. When the setting completion button 160 has been selected (step S1915), information in the rapid-stop-deceleration-time storage area 235 of speed graph output information is outputted a rapid stop deceleration time data 1805 of the acceleration/deceleration control parameter corresponding to acceleration/deceleration control parameter number 1. Then, the operation is ended (step S1916).

The above-mentioned location programming apparatus enables adjustment to be performed while change in the deceleration pattern occurring due to change in the rapid stop deceleration time is confirmed.

19. Calculation and Display of Actual Rapid Stop Deceleration Time By Using Speed Graph The operation for calculating and displaying actual rapid stop deceleration time by using a speed graph will now be described with reference to FIGS. 81 to 83 and 90. FIG. 82 shows an example of a locating programming window by using a speed graph in which a result of calculations of actual acceleration/deceleration time is displayed. Referring to the drawings, actual rapid stop deceleration time is time taken from instructed speed for region 1 to completion of rapid stop deceleration. Reference numeral 270 represents an actual rapid stop deceleration pattern from instructed speed for the region 1 to completion of rapid stop deceleration, 271*b* represents actual rapid stop deceleration time display area and 272*b* represents a range indicated with 271*b* with an arrow.

Figure 90:
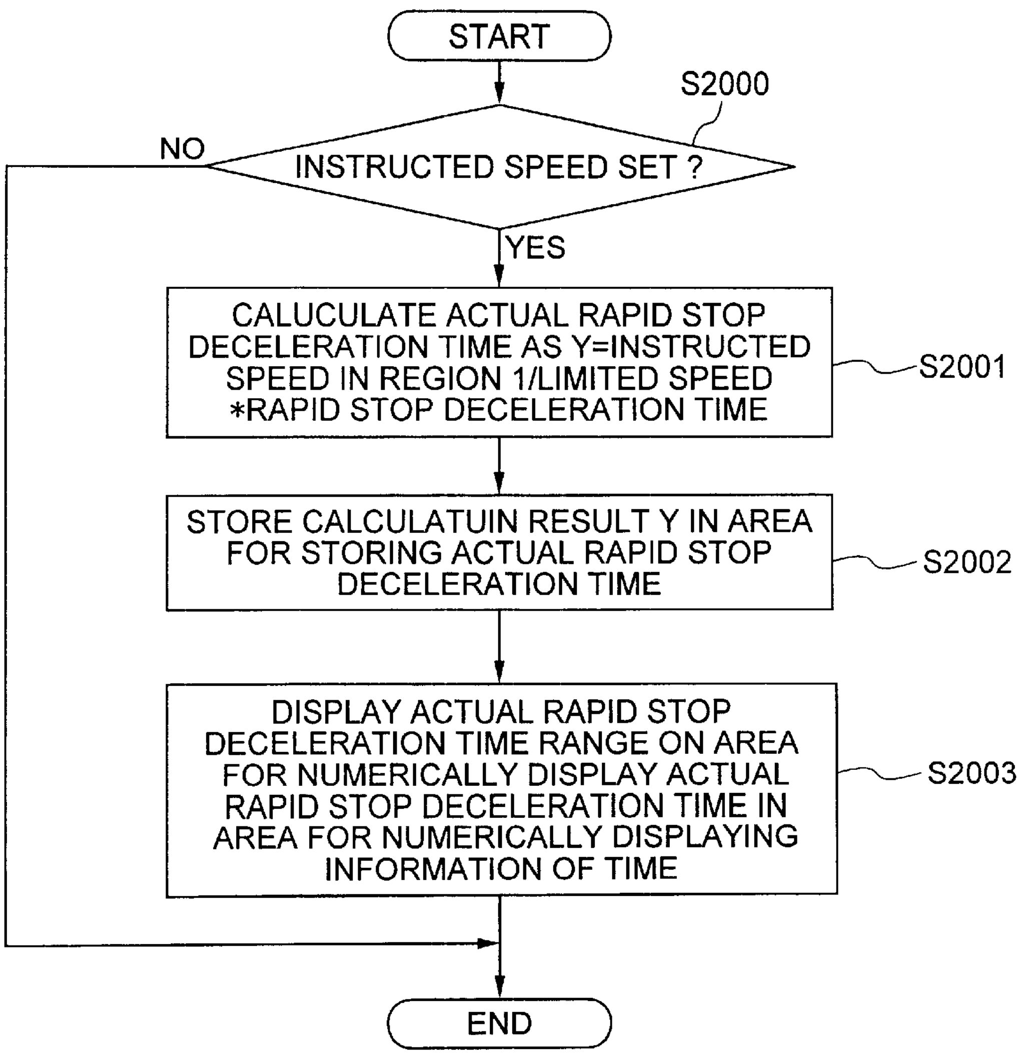
FIG. 90 is a flow chart showing the locating programming operation by using the speed graph when the actual rapid stop deceleration time is calculated and displayed in the location programming apparatus according to the first embodiment of the present invention.

The operation for calculating and displaying actual rapid stop deceleration time will now be described with reference to a flow chart shown in FIG. 90. When instructed speed has not been set, no operation is performed and the process is ended. When instructed speed has been set (step S2000), actual rapid stop deceleration time Tedr with respect to instructed speed for the region 1 is calculated in accordance with Equation 1300 (step S2001). A result of calculations is stored in the work area 283 for a result of calculations of acceleration/deceleration time and stored in the actual-rapid-stop-deceleration-time storage area 262 (step S2002).

$$Tedr = Ted * V1 / Vmax \quad \text{Equation 1300}$$

Tedr: actual rapid stop deceleration time with respect to instructed speed for region 1

Ted: rapid stop deceleration time

Vmax: limited speed

V1: instructed speed for region 1

In accordance with data in the actual-rapid-stop-deceleration-time storage area 262, an actual rapid stop deceleration time display area 271*b* and an actual rapid stop deceleration time range 272*b* of the time-information-value display area 202 are displayed (step S2003). Thus, calculation and display of the actual rapid stop deceleration time are ended.

The actual rapid stop deceleration time with respect to the instructed speed for the region 1 is calculated as described above. Also calculation and display can be performed for the instructed speed for each region in accordance with Equation 1300.

The above-mentioned location programming apparatus enables actual rapid stop deceleration time with respect to each region of the instructed speed pattern to automatically be recognized when locating programming is performed. Moreover, rapid stop deceleration time suitable for a subject which must be controlled can easily be determined.

20. Setting and Change of Dwell Time By Using Speed Graph

Figure 91:
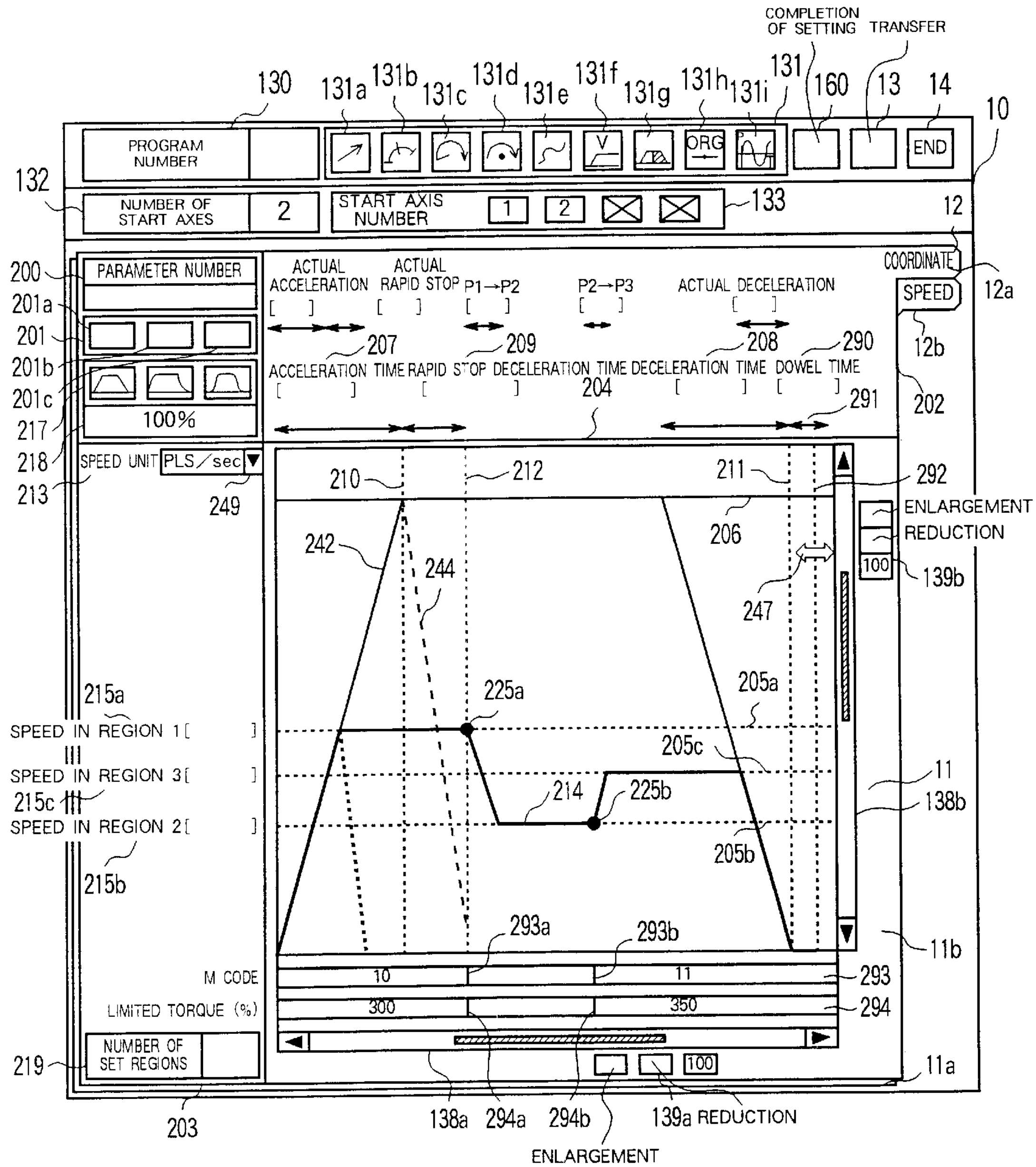
FIG. 91 is a diagram showing an example of a locating programming window by using the speed graph when dowel time, M code output and limited torque are set and changed in the location programming apparatus according to the first embodiment of the present invention.

The operation for setting and changing dowel time by using a speed graph will now be described with reference to FIGS. 91 to 95. FIG. 91 shows an example of a locating programming window using a speed graph when dowel time is set and changed. Reference numeral 247 represents a time movement pointer, 291 represents a dwell time range for indicating the dowel time with the length of an arrow, 290 represents a dwell time display area, 292 represents a dwell time pointer, 293 represents a M-code setting/display area and 294 represents a limited-torque setting/display area.

Figure 92:
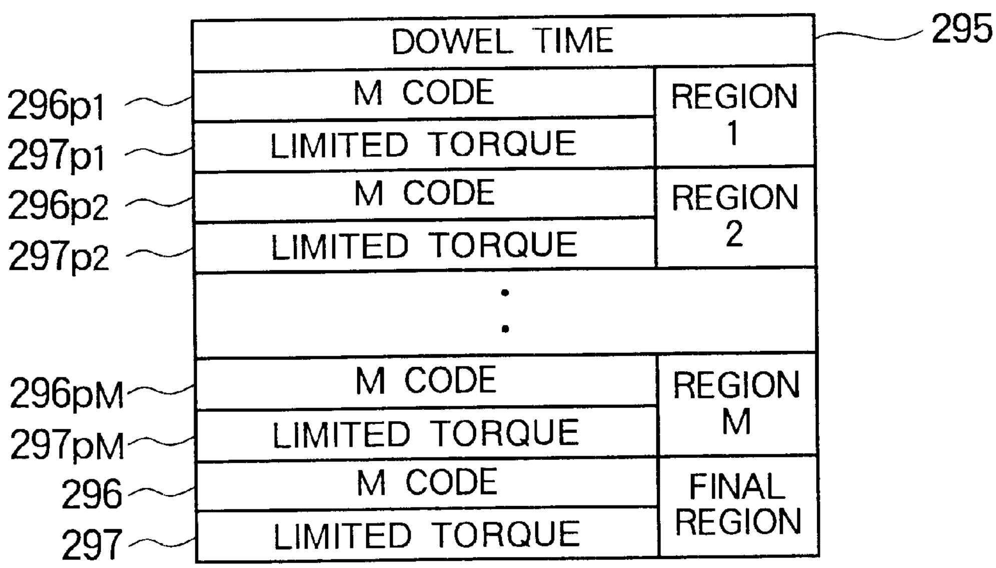
FIG. 92 is a detailed view showing an auxiliary item information storage area of speed graph output information of the location programming apparatus according to the first embodiment of the present invention.

FIG. 92 shows an auxiliary-item-information storage area 223 of the speed-graph-output-information storage area 72 which is composed of a dwell-time storage area 295, an M-code storage area 296 for each region and a limited-torque storage area 297 for each region.

Figure 93:
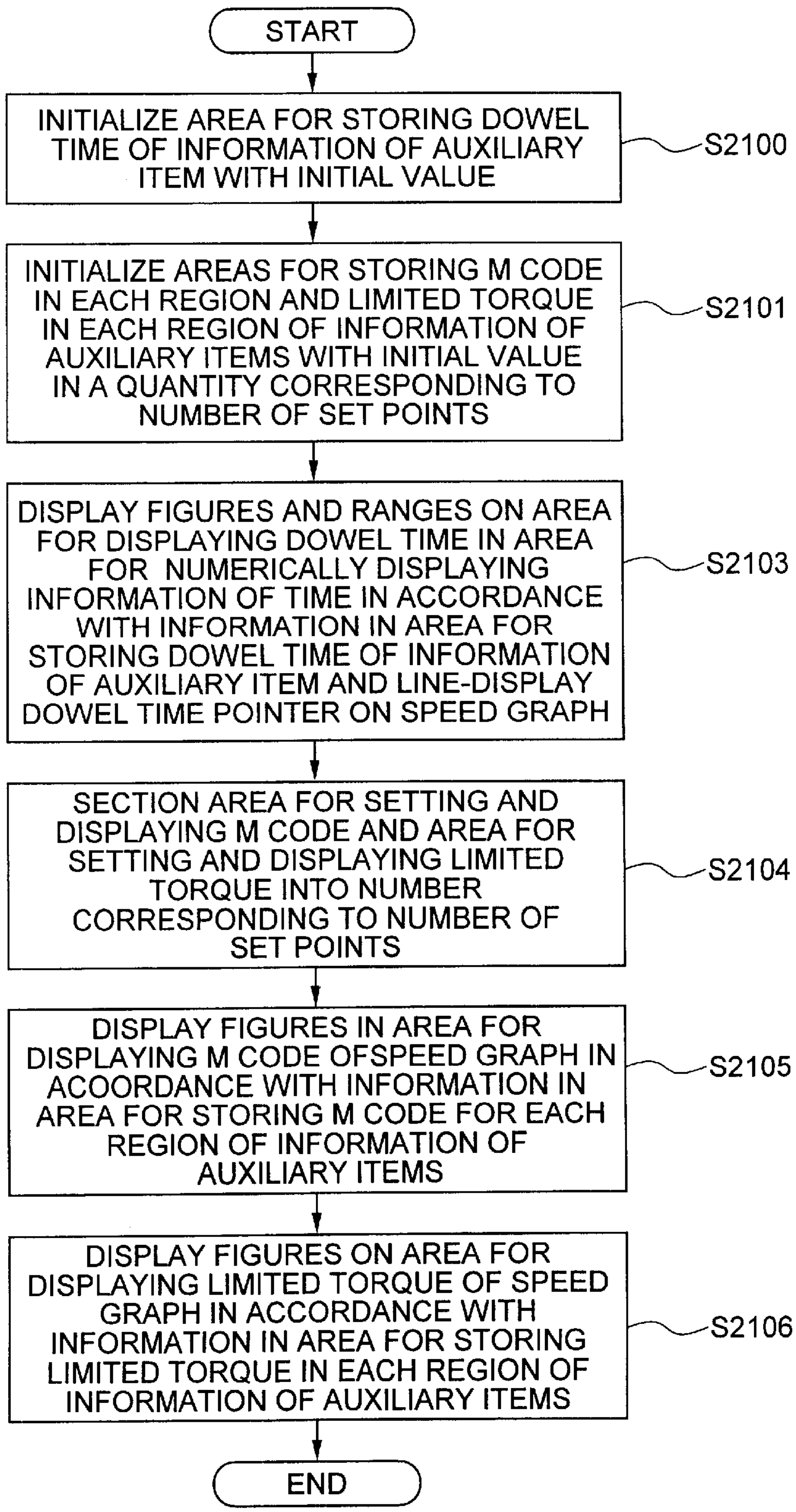
FIG. 93 is a flow chart showing the setting operation and the operation which are performed until the auxiliary item is initialized and displayed on the locating programming window by using the speed graph in the location programming apparatus according to the first embodiment of the present invention.

An operation for initializing auxiliary items in the displayed initial window of the speed graph will now be described with reference to a flow chart shown in FIG. 93. Initially, the dwell-time storage area 295 of the auxiliary-item-information storage area 223 is initialized to an initial value (step S2100). Moreover, the M-code storage area 296 for each region and the limited-torque storage area 297 for each region are, with initial values, initialized in a quantity corresponding to the number of points set for the area 120 for storing the number of set points (step S2101).

Then, display on the window is performed in accordance with information above. In accordance with information in the dwell-time storage area 295, figures are displayed on the dwell time display area 290 of the time-information-value display area 202. The dwell time range 291 is displayed and the dwell time pointer 292 is line-displayed at the end point of the dowel time range on the speed graph (step S2103). Then, the M-code setting/display area 293 and the limited-torque setting/display area 294 are sectioned into the number corresponding to the number of points set for the area 120 for storing the number of set points similarly to the speed change points (step S2104). In accordance with information in the M-code storage area 296 for each region, figures are displayed in the corresponding region of the M-code setting/display area 293 (step S2105). In accordance with information in the limited-torque storage area 297 for each region, figures are displayed on the corresponding region of the limited-torque setting/display area 294 (step S2106). Thus, the operation for initializing the auxiliary items is completed.

Figure 94:
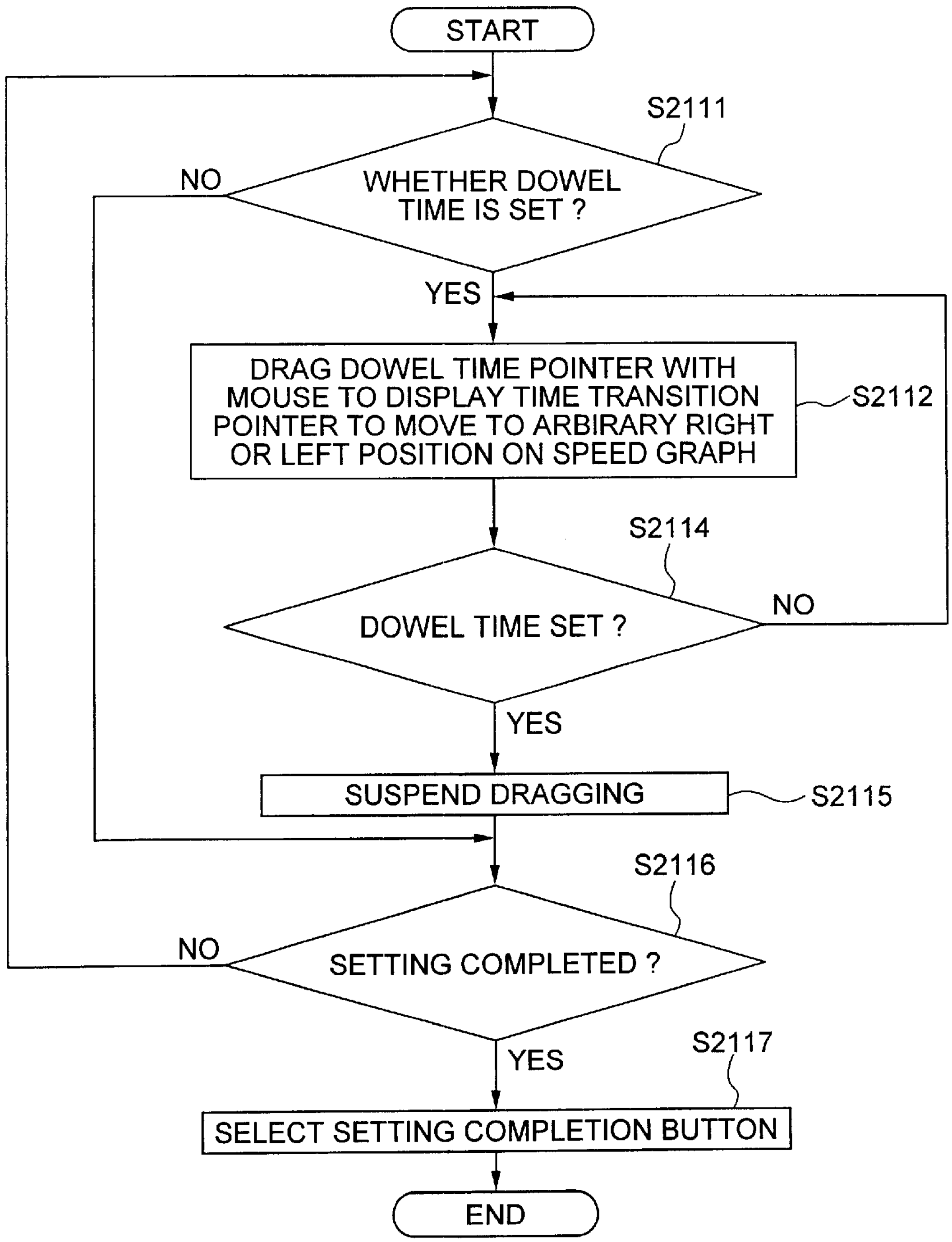
FIG. 94 is a flow chart showing the setting operation of locating programming by using the speed graph when the dowel time is set and changed in the location programming apparatus according to the first embodiment of the present invention.

The operation for setting and changing the dowel time will now be described with reference to a flow chart shown in FIG. 94. The dwell time pointer 292 is located at the position of set time in the speed-graph making and displaying area 204 as a result of the initializing operation. When dowel time is set (step S2111), the dwell time pointer 292 is dragged with the mouse so that the time movement pointer 247 is displayed which is moved to an arbitrary position in the right or left id on the speed graph time (step S2112). When dowel time has been set (step S2114), mouse dragging is suspended (step S2115). Then, the operation proceeds to step S2116. When the dowel time is not changed in step S2111, the operation proceeds to step S2116. When the dowel time is furthermore changed, the operation returns to step S2111. When dowel time has been set (step S2116), the setting completion button 160 is selected (step S2117). Thus, the operation is ended.

Figure 95:
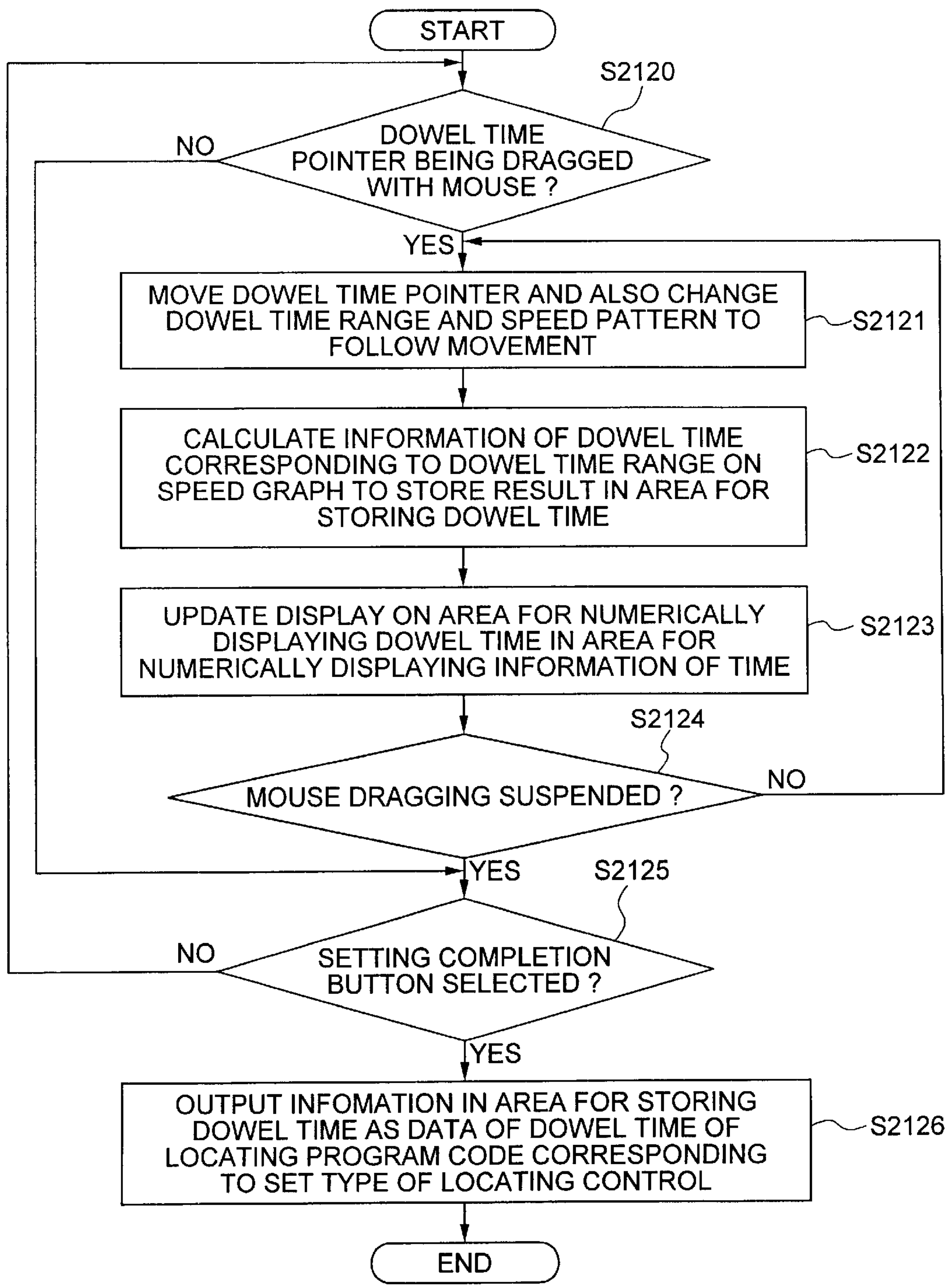
FIG. 95 is a flow chart showing the locating programming operation by using the speed graph when the dowel time is set and changed in the location programming apparatus according to the first embodiment of the present invention.

The operation for changing dowel time will now be described with reference to a flow chart shown in FIG. 95. When the dwell time pointer 292 is being dragged with the mouse (step S2120), the dwell time pointer 292 is moved to follow the time movement pointer 247. Moreover, also the dwell time range 291 and the speed pattern 214 are changed (step S2121). Information of dowel time corresponding to the length of the dwell time range 291 on the speed graph is calculated so as to be stored in the dwell-time storage area 295 (step S2122). Thus, display on the dwell time display area 290 of the time-information-value display area 202 is updated (step S2123). The processes in steps S2121 to S2123 are performed until mouse dragging is suspended. When mouse dragging is suspended (step S2124), the operation proceeds to step S2125. When the dwell time pointer 292 is not being dragged with the mouse in step S2120, the operation proceeds to step S2125.

The operation returns to step S2120 until the setting completion button 160 is selected. When the setting completion button 160 has been selected (step S2125), information in the dwell-time storage area 295 of speed graph output information is outputted as location end point dowel time 2606 of the locating program code in a case where the locating control type storage area 81 is locus control. In a case where the locating control type storage area 81 is another locating control type, it is outputted as dowel time 2204 of data 2108 corresponding to the locating control type of the locating program code (step S2126). Thus, the operation is ended.

The location programming apparatus enables the ratio of time required from start to stop and dowel time to visually be recognized when locating programming is performed.

21. Setting and Change of M-Code By Using Speed Graph

The operation for setting and changing M code by using a speed graph will now be described with reference to FIGS. 91 to 93, 96 and 97. FIG. 91 shows an example of a locating programming window using a speed graph for setting and changing M code. Reference numeral 293 represents an M code setting and display area which is capable of displaying M-code setting permission regions 293*a* corresponding to the number 120 of set points to permit setting for each region. Moreover, a region range 293*b* for outputting the M code with respect to the set M code is displayed.

Figure 96:
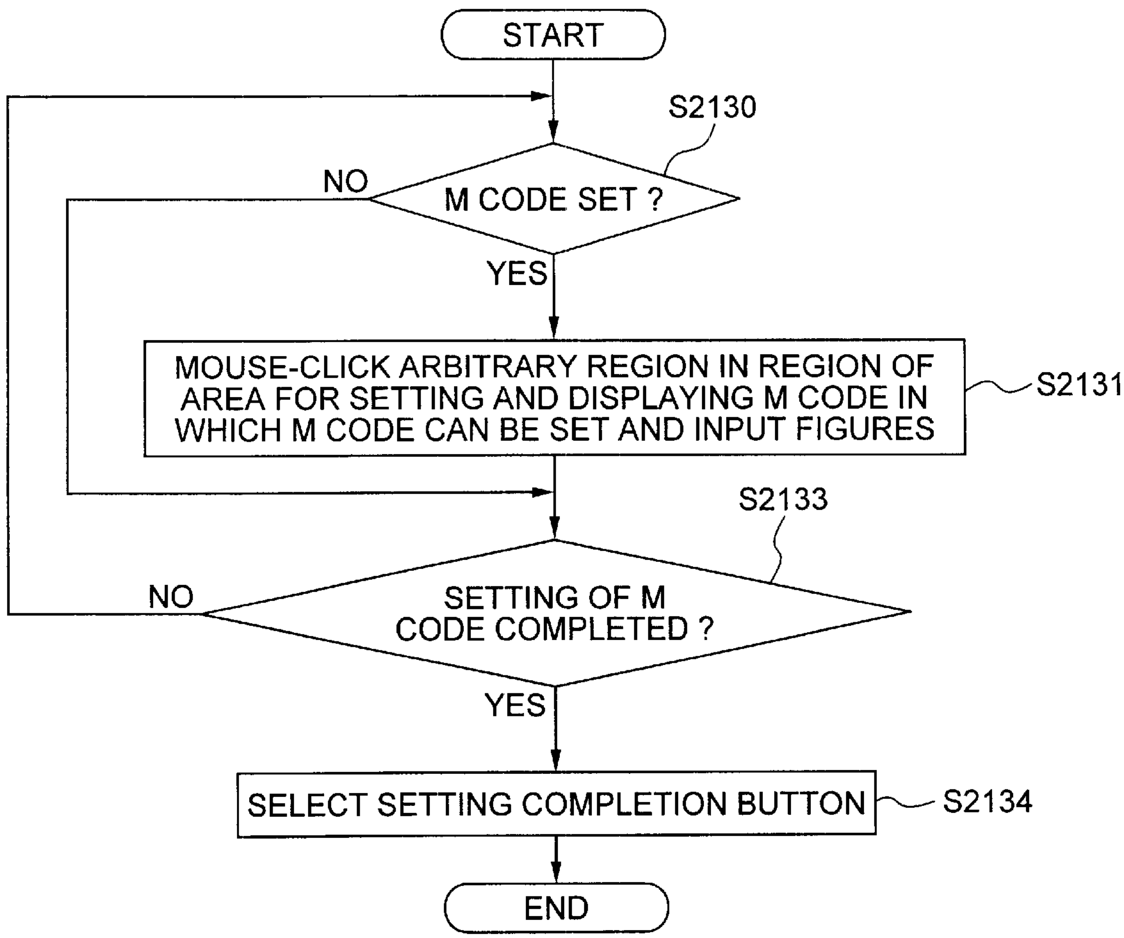
FIG. 96 is a flow chart showing the setting operation of locating programming by using the speed graph when the M code output is set and changed in the location programming apparatus according to the first embodiment of the present invention.

The operation for setting M code will now be described with reference to a flow chart shown in FIG. 96. The M-code storage area 296 for each region and the M-code setting/display area 293 have been initialized as a result of the initializing operation described when the dowel time has been set and changed by using the speed graph. When M code is set (step S2130), an arbitrary region of the M-code setting permissible range 293*a* of the M-code setting/display area 293 is clicked with the mouse so that figures are input to set the M code (step S2131). If no M code is set in step S2130, the operation proceeds to step S2133. When M code is furthermore set, the operation returns to step S2130. When setting of the M code has been completed (step S2133), the setting completion button 160 is selected (step S2134). Thus, the operation is ended.

Figure 97:
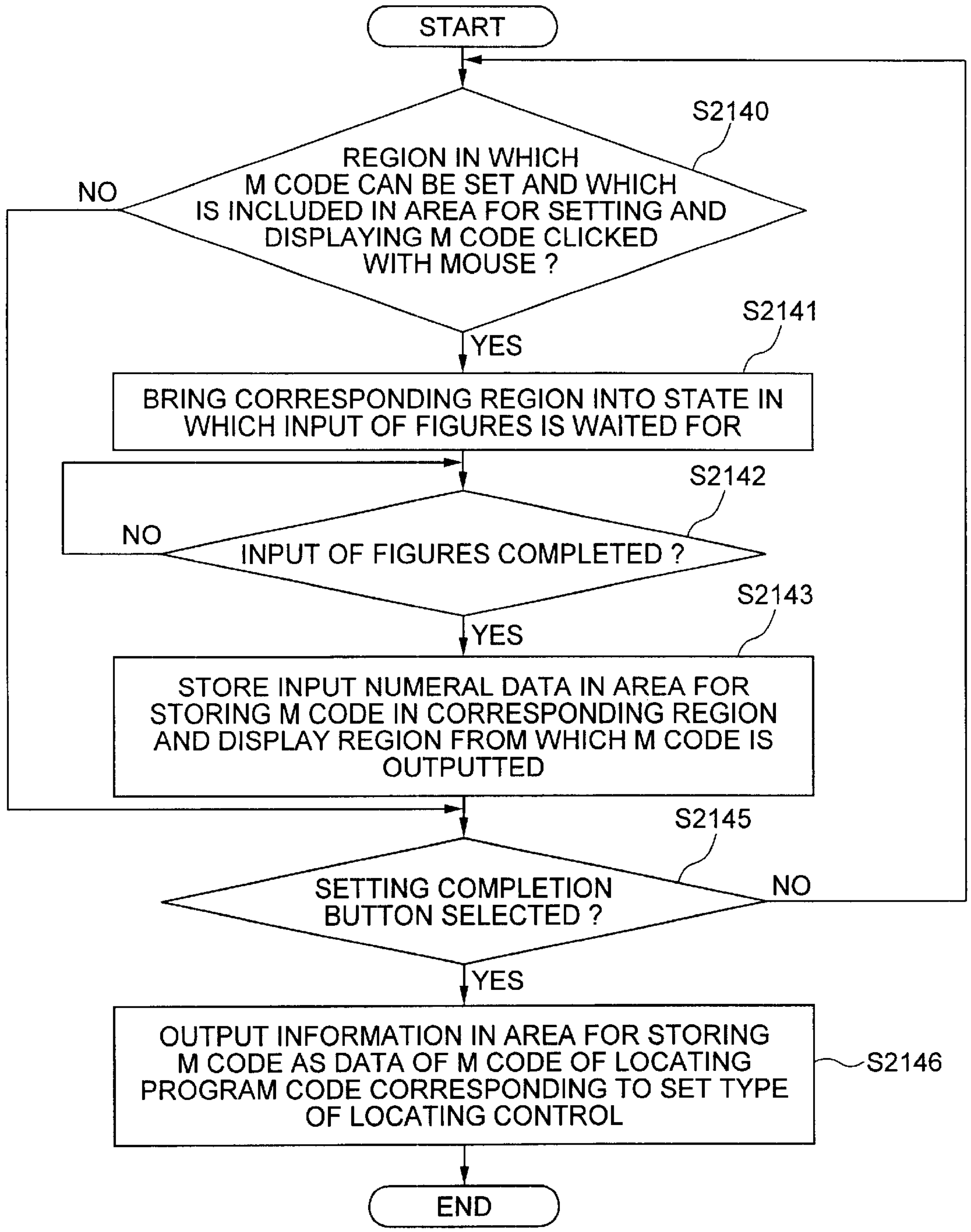
FIG. 97 is a flow chart showing the locating programming operation by using the speed graph when the M code output is set and changed in the location programming apparatus according to the first embodiment of the present invention.

The operation for setting M code will now be described with reference to a flow chart shown in FIG. 97. When the M-code setting permissible range 293*a* in the M code setting and displaying area has been clicked with the mouse (step S2140), the corresponding region is brought to a state in which input of figures is waited for (step S2141). When input of figures has been completed (step S2142), input numeral data is stored in the M-code storage area 296 in the corresponding region and a region range 293*b* for outputting the corresponding M code is displayed (step S2143). Then, the operation proceeds to step S2145. When the M-code setting permissible range 293*a* is not being clicked in step S2140, the operation proceeds to step S2145.

The operation returns to step S2140 until the setting completion button 160 is selected. When the setting completion button 160 has been selected (step S2145), information in the M-code storage area 296 for each region of speed graph output information is outputted as M code data 2604*pm* and 2604 (1≦m≦M+1) for the region m of the locating program code in a case where the set locating control type is locus control. In a case where the locating control type is another locating control type, it is outputted as M code data 2202 of data 2108 corresponding to the locating control type of the locating program code (step S2146). Thus, the operation is ended.

The above-mentioned location programming apparatus enables M code to graphically be set to correspond to the control operation.

22. Setting and Changing of Limited Torque By Using Speed Graph

The operation for setting and changing limited torque by using a speed graph will now be described with reference to FIGS. 91 to 93, 98 and 99. FIG. 91 shows an example of a locating programming window for setting and changing limited torque by using a speed graph. Reference numeral 294 represents a limited-torque setting and displaying area for displaying limited-torque setting permissible regions 294*a* corresponding to the number 120 of set points. Thus, setting for each region is permitted. Moreover, a region range 294*b* for instructing the corresponding limited torque with respect to the set limited torque is displayed.

Figure 98:
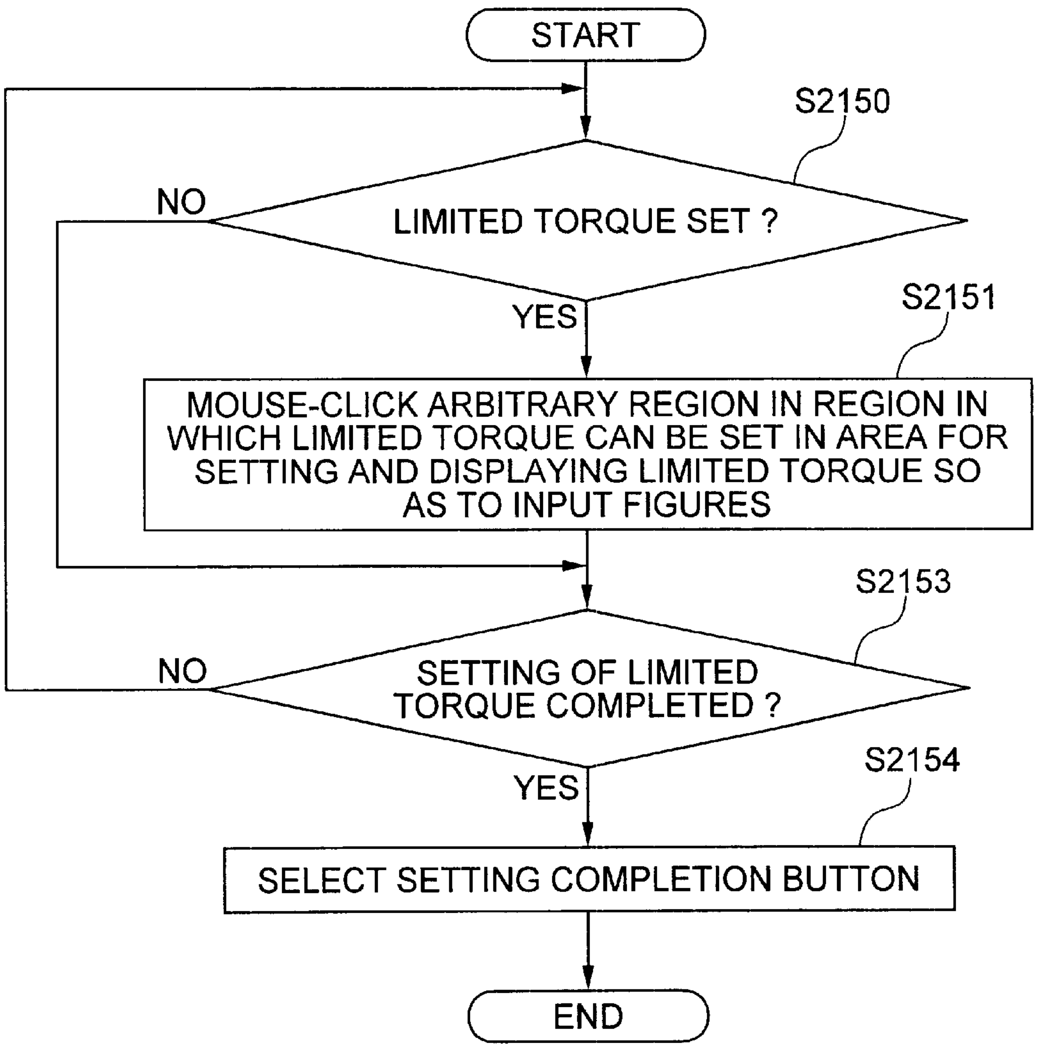
FIG. 98 is a flow chart showing the setting operation of locating programming by suing the speed graph when the limited torque is set and changed in the location programming apparatus according to the first embodiment of the present invention.

The operation for setting a limited torque will now be described with reference to a flow chart shown in FIG. 98. The limited-torque storage area 297 for each region and the limited-torque setting/display area 294 have been initialized as described when setting and changing of the dowel time using the speed graph have been described. When limited torque is set (step S2150), an arbitrary region of the limited-torque setting permissible regions 294*a* of the limited-torque setting/display area 294 is clicked with the mouse and figures are input so that setting is performed (step S2151). When limited torque is not set in step S2150, the operation proceeds to step S2153. When limited torque is furthermore set, the operation returns to step S2150. When setting of limited torque has been completed (step S2153), the setting completion button 160 is selected (step S2154). Then, the operation is ended.

Figure 99:
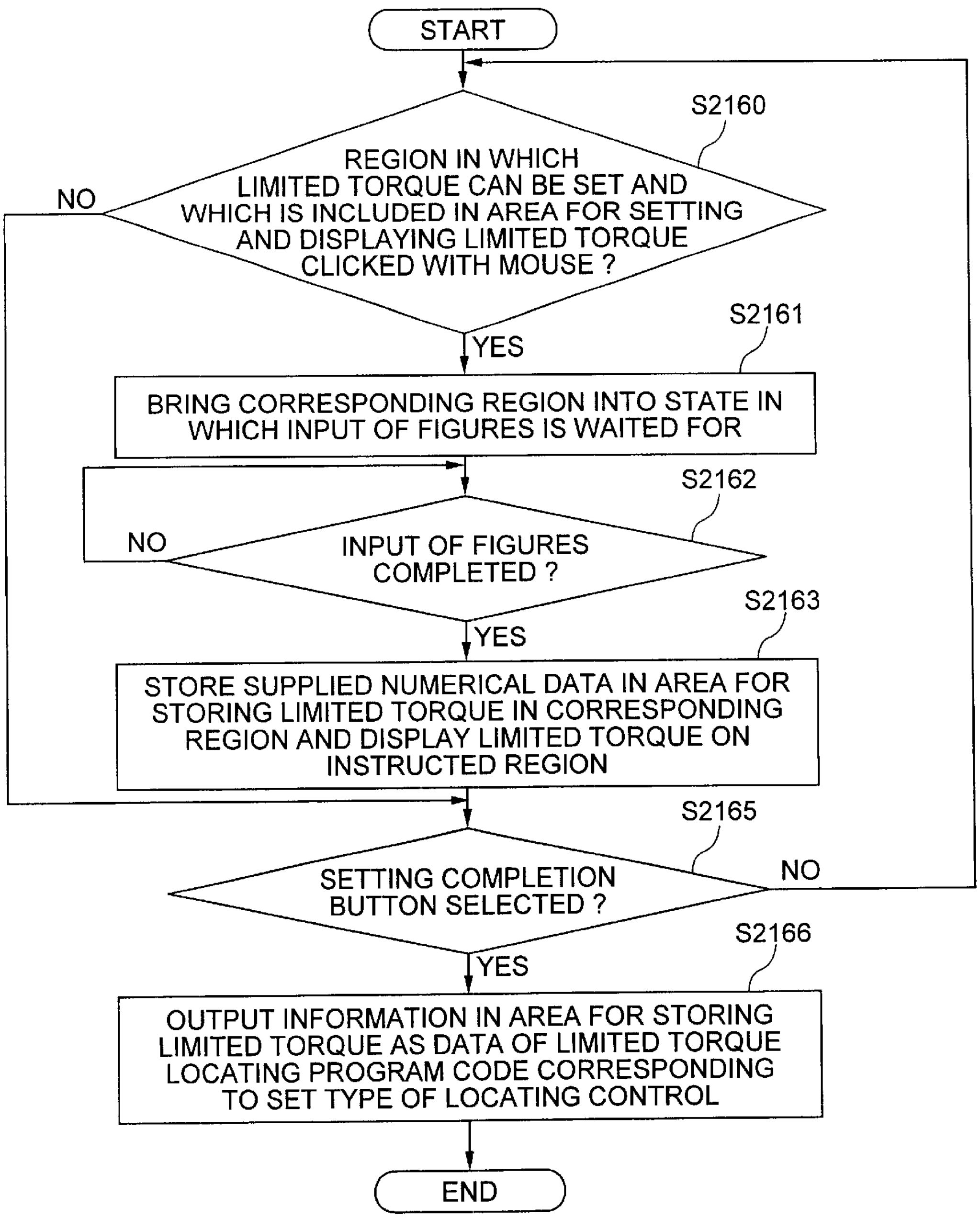
FIG. 99 is a flow chart showing the locating programming operation by using the speed graph when the limited torque is set and changed in the location programming apparatus according to the first embodiment of the present invention.

The operation for setting limited torque will now be described with reference to a flow chart shown in FIG. 99. When the limited-torque setting permissible region 294*a* of the limited torque setting and displaying area is clicked with the mouse (step S2160), the region is brought to a state in which input of figures is waited for (step S2161). After input of figures has been completed (step S2162), supplied numeral data is stored in the limited-torque storage area 297 for the corresponding region. Moreover, the region range 294*b* for instructing the limited torque is displayed (step S2163). Then, the operation proceeds to step S2164. When the limited-torque setting permissible region 294*a* is not being clicked with the mouse in step S2160, the operation proceeds to step S2165.

The operation returns to step S2160 until the setting completion button 160 is selected. When the setting completion button 160 has been selected (step S2165), information of the limited-torque storage area 297 for each region of speed graph output information is outputted as limited torque data $2605p_m$ and 2605 ($1 \leqq m \leqq M+1$) in the region m of the locating program code in a case where the set locating control type is locus control. When another locating control type is set, it is outputted as limited torque data 2203 of data 2108 corresponding to the locating control type of the locating program code (step S2166). Then, the operation is ended.

The above-mentioned location programming apparatus enables limited torque for the motor to graphically be set to correspond to the control operation.

Figure 100:
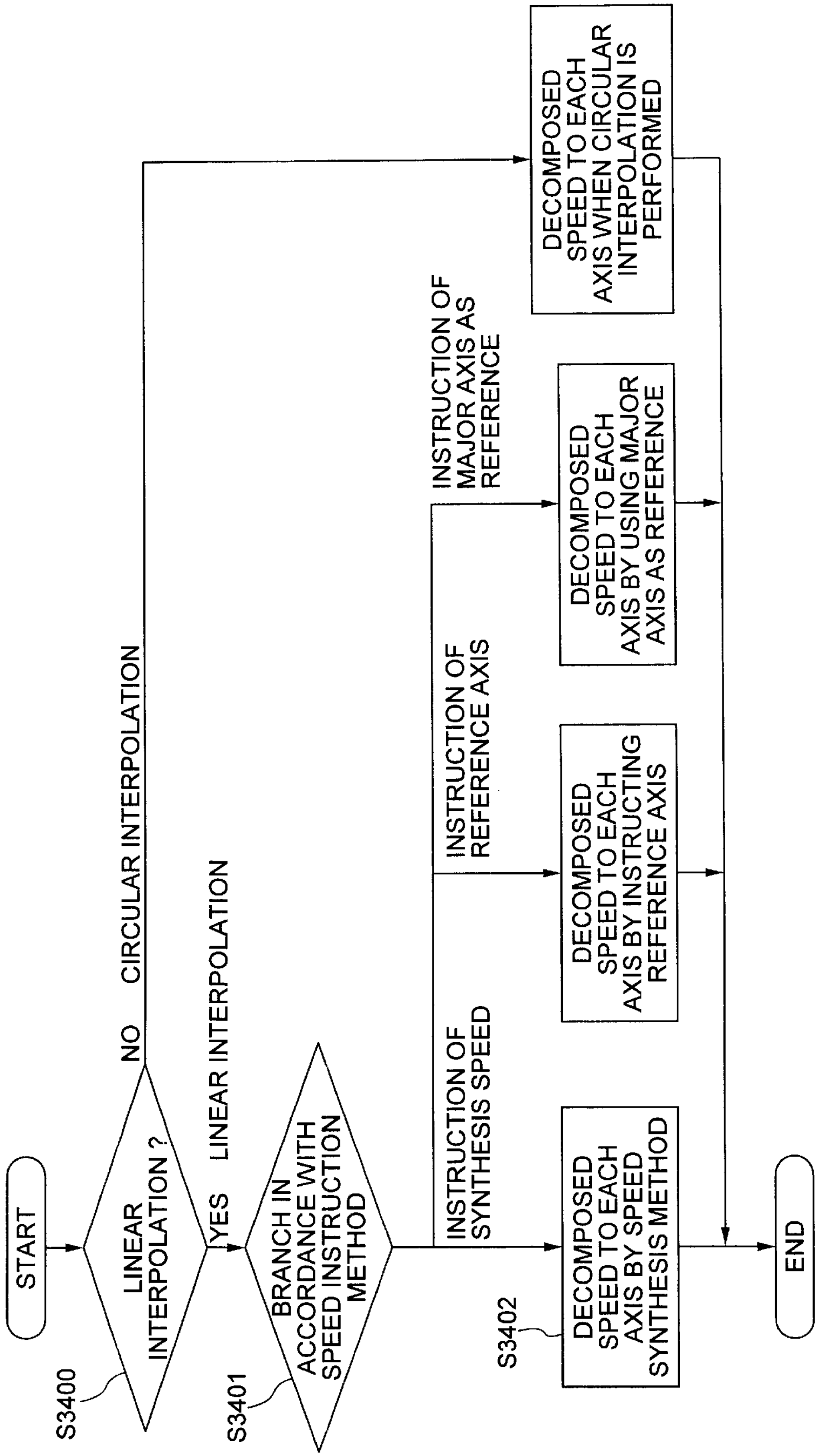
FIG. 100 is a flow chart for decomposition to the speed for each axis in accordance with the type of the instructed speed according to the first embodiment of the present invention.

23. Decomposition/Display of Instructed Speed to Each Axis Using Speed Graph in a Case Where Two or More Axes Are Interpolation-Controlled The operation for decomposing and displaying instructed speed into a speed pattern for each axis when two or more axes are interpolation-controlled will now be described with reference to FIGS. 100 to 103. FIG. 100 is a flow chart for calculating the speed of each axis when two axes are interpolation-controlled. In accordance with the locating control type storage area 81 shown in FIG. 3, determination is performed whether the interpolation is linear interpolation or circular interpolation (step S3400). If the interpolation is linear interpolation, the speed instruction method 238 in the locating program speed information structural diagram shown in FIG. 67 is used to branch the process into instruction of synthesized speed, instruction of reference axis or instruction of major axis (step S3401). After branching has been performed, speed for each method is decomposed to each axis (step S3402).

Figure 101:
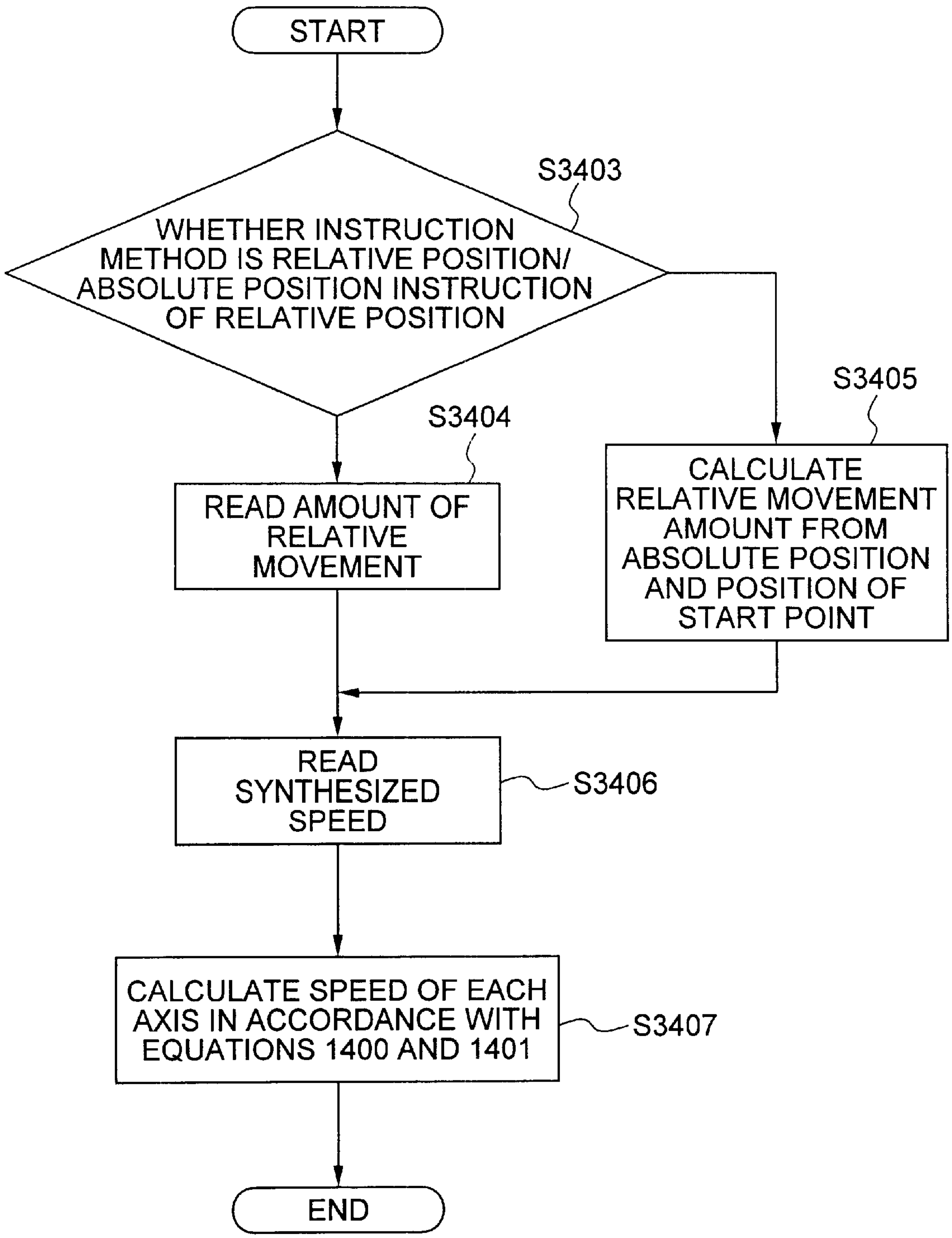
FIG. 101 is a flow chart for decomposition to the speed for each axis in the case where synthesized speed is instructed in the structure according to the first embodiment of the present invention.

A method of decomposing the speed to that for each axis in a case of where two axes are interpolation-controlled and synthesized speed is instructed will now be described with reference to a flow chart shown in FIG. 101. Whether or not the position instruction method in the description of the position instruction method by using the coordinate graph is "absolute position instruction" or "relative position instruction" is read from the position-location-method storage area 121 shown in FIG. 13. Then, branching is performed (step S3403). When relative position instruction has been set, movement amounts d1 and d2 to the instructed point are the amounts of relative movements set for the locating-end-point-position-information storage area 122 shown in FIG. 13. Therefore, the relative movement amounts are read (step S3404). When absolute position instruction has been set, movement amounts d1 and d2 to the instructed point are calculated by the same method as that employed when the relative movement amounts are calculated when the position instruction method is changed from the "absolute position instruction" to the "relative position instruction" as described when the position instruction method using the coordinate graph has been described (step S3405). Moreover, synthesized movement speed v to the above-mentioned point is read from the region-instructed-speed storage area 239 shown in FIG. 67 (step S3406). Then, the movement amount and synthesized speed of each axis are used to calculate the speed of each axis (step S3407). At this time, the speed of each axis is decomposed as follows:

$$v1=v\times\{d1/\sqrt{(d1^2+d2^2)}\} \quad \text{(Equation 1400)}$$

$$v2=v\times\{d2/\sqrt{(d1^2+d2^2)}\} \quad \text{(Equation 1401)}$$

When the speed instruction method is the instruction of a reference axis, decomposition to the speed for each axis is performed by the following method. The movement amounts d1 and d2 to the instructed point are calculated by the same method as that employed when the synthesized speed instruction is set. Assuming that the instructed speed is v, the speed of the reference axis is V1, the speed of another axis is v2, the movement amount of the reference axis is d1 and that of another axis is d2, the speed of each axis is expressed by the following Equations 1402 and 1403:

$$v1=v \quad \text{(Equation 1402)}$$

$$v2=v\times(d2/d1) \quad \text{(Equation 1403)}$$

When the speed instruction method is the major-axis reference instruction method, decomposition to the speed of each axis is performed by the following method. The movement amounts d1 and d2 to the instructed point are calculated by the same method as that employed in the case of the synthesized speed instruction method. Assuming that the instructed speed is v, the speed of an axis which is moved greater is v1 and that of another axis is v2, the movement amount of the axis which is moved greater is d1 and the movement amount of the other axis is d2, the speed of each axis is expressed by the following Equations 1404 and 1405:

$$v1=v \quad \text{(Equation 1404)}$$

$$v2=v\times(d2/d1) \quad \text{(Equation 1405)}$$

In a case of locus control of a type that a plurality of speed switch points exist in one program, the foregoing calculations are performed by using the movement amount and the instructed speed for each point. Then, decomposition to each axis for each point is required.

Also in a case where the instructed speed for each point includes a pattern in which the acceleration and deceleration speeds are changed, the ratio of the speeds for the axes with respect to the instructed speed is expressed by Equations 1400 and 1401 when the synthesized speed instruction is employed, the same is expressed by Equations 1402 and 1403 when the reference axis speed instruction is employed and the same is expressed by Equations 1404 and 1405 when the major-axis reference instruction. Therefore, the instructed speed for each time period is required to be decomposed to the speed of each axis in accordance with the speed instruction method.

Although two axes are linear-interpolation-controlled, a similar method enables decomposition from instructed speed to the speed of each axis if three or more axes are linear-interpolation-controlled.

Figure 102:
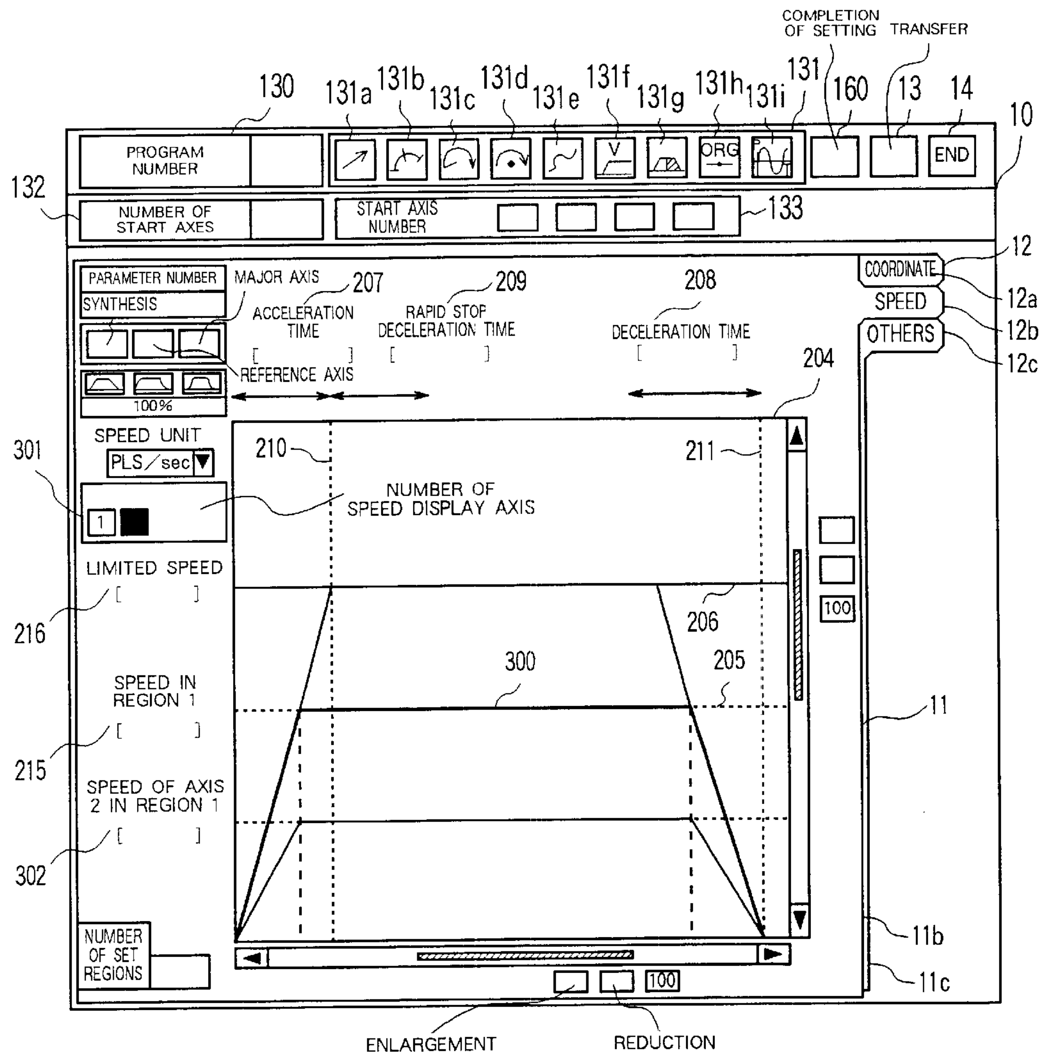
FIG. 102 is a diagram showing an example of a window in which the speed pattern decomposed to each axis is displayed on the speed graph in the location programming apparatus according to the first embodiment of the present invention.

The speed pattern obtained as described above and decomposed to each axis is graphically displayed on the speed graph similarly to the instructed speed pattern. FIG. 102 shows an example of display of the speed pattern decomposed to each axis on the speed graph. Reference numeral 300 represents a speed pattern of the second axis and 301 represents a selection button for selecting an axis to be displayed. The selection button 301 causes display to be performed by the number of the start axes in accordance with the number of start axes h82 and the start axis number 83 in the structure of common information shown in FIG. 3. Moreover, speed decomposed to each axis is calculated for the axis selected by the selection button so as to be displayed. Moreover, figures are displayed on the figure display area 302 for the decomposed speed.

Figure 103:
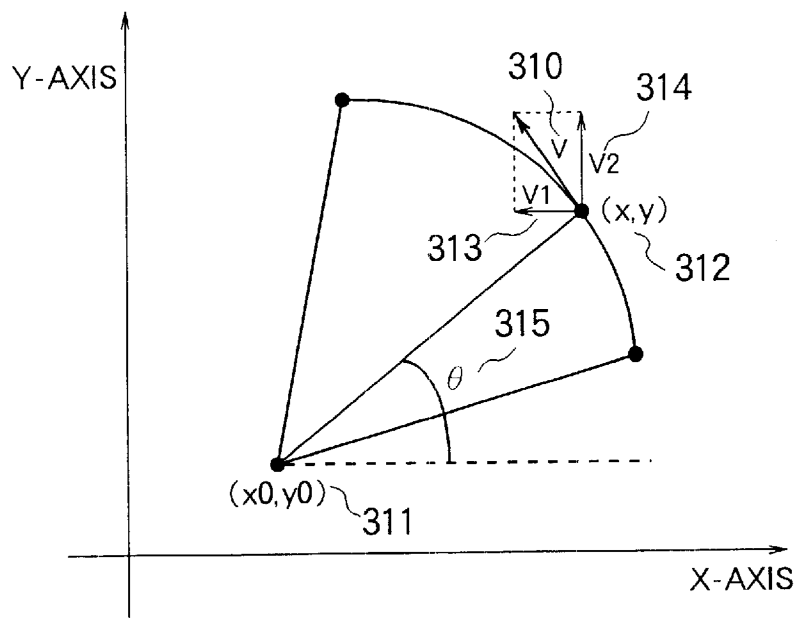
FIG. 103 is a diagram showing an idea for decomposing to the speed for each cursor when circular interpolation is performed in the structure according to the first embodiment of the present invention.

Although the linear interpolation has been described, a method of the decomposition to the speed for each axis in the case of the circular interpolation will briefly be described with reference to FIG. 103. Referring to FIG. 103, reference numeral 310 represents instructed speed in the case of the circular interpolation, the instructed speed being speed in the direction of a tangent of a circular arc. Reference numeral 311 represents a central point of the circular arc, 312 represents a present position, 313 represents a speed component in the direction of the X-axis and 314 represents a speed component in the direction of the Y-axis at the present position 312. The speed components 313 and 314 for each axis can be obtained from the following Equation 1406 in accordance with the law of geometry:

$$v1=-v \times \sin\theta \ (315) \qquad \text{(Equation 1406)}$$

v: instructed speed (speed in the tangent direction of circular arc)

v1: speed component in the direction of X-axis v2: speed component in the direction of Y-axis (x0, y0): coordinates of central point of circular arc (x, y): coordinate of a position at which speed is obtained The method of obtaining the coordinate of the present position 312 by the Equation 1406 may be performed in such a manner that calculations for actually performing circular interpolation control are performed. Since the foregoing method does not relate to the decomposition of the speed, it is omitted from description.

The above-mentioned location programming apparatus enables change in the speed of each axis to graphically be displayed when interpolation operation is performed. Since the operation pattern for each axis can be recognized, determination of the capacity of the motor and the like can easily be performed.

Figure 104:
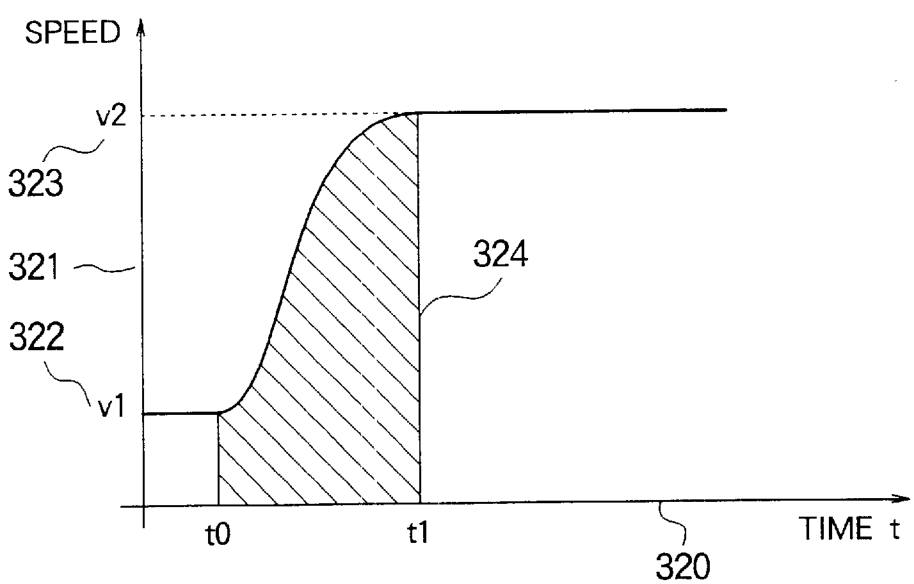
FIG. 104 is a diagram showing an acceleration distance in the speed graph according to the first embodiment of the present invention.

24. Calculation/Display of Amount of Movement Performed Until Instructed Speed is Realized in Accordance With Acceleration Time by Using Speed Graph The operation for calculating the movement amount required to accelerate the speed to reach instructed speed in accordance with acceleration time by using a speed graph and displaying a result will now be described with reference to FIGS. 104 to 107. Referring to a speed graph shown in FIG. 104, reference numeral 320 represents an axis of abscissa of the graph standing for the time axis, 321 represents an axis of ordinate standing for the speed, 322 represents speed v1 before acceleration, 323 represents speed v2 after acceleration and 324 represents an acceleration region. It is apparent that the movement amount required to accelerate speed v1 to another speed level v2 is the area of the acceleration region 324 indicated with diagonal lines. Therefore, if the area of the acceleration region 324 is obtained, the movement amount required to reach the instructed speed can be obtained regardless of the acceleration pattern. The area of the acceleration region 324, that is, the movement distance required to perform acceleration can be calculated in accordance with the following Equation 1500 assuming that time corresponding to time axis of the speed graph is t, time at which acceleration is started is t0, time at which acceleration is completed is t1 and a function indicating the acceleration pattern is f (t). Note that integrating period is t0 to t1.

$$\text{area (movement distance required to perform acceleration)}=\int f(t)dt \qquad \text{(Equation 1500)}$$

Figure 105:
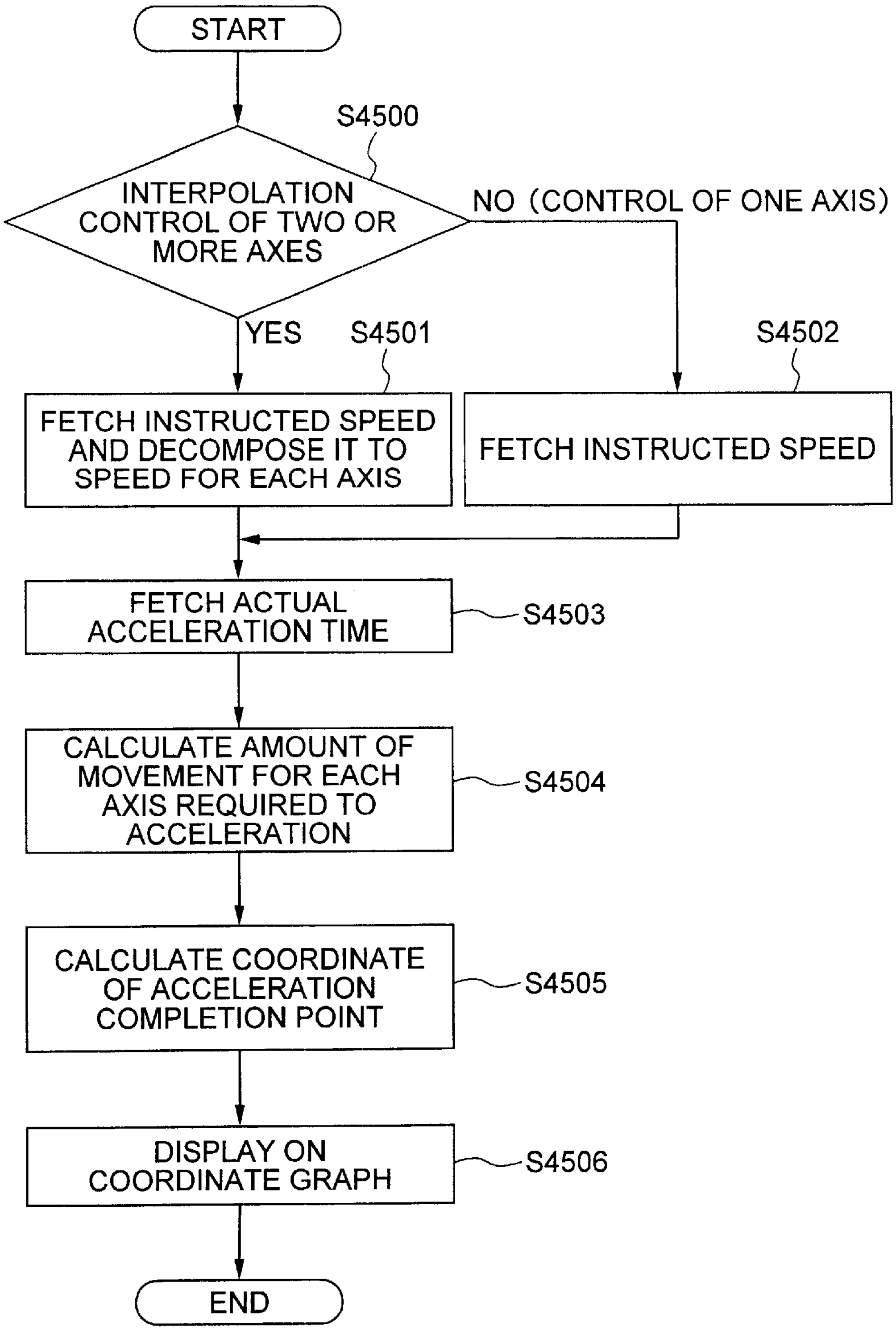
FIG. 105 is a flow chart for displaying an acceleration region according to the first embodiment of the present invention.

An example of a method of calculating the distance required to accelerate the speed in accordance with Equation 1500 in a case of trapezoid acceleration/deceleration will now be described. In the case of the trapezoid acceleration/deceleration, Equation 1500 causes the area of a triangle formed when acceleration is performed in the speed graph. In accordance with actual acceleration time 260 shown in FIG. 81 and obtained by calculating and displaying the actual acceleration time in the acceleration region in the speed graph and in accordance with the instructed speed, the distance required to accelerate the speed can be obtained by the following Equation 1501:

$$dar=(tar=v)/2 \qquad \text{(Equation 1501)}$$

dar: distance required to accelerate the speed tar: actual acceleration time v: instructed speed A method of displaying an acceleration period from a start point to a position apart from the same for a movement distance required to accelerate the speed on the locating locus on the coordinate graph by using the movement amount obtained as described above and required to accelerate the speed will now be described with reference to FIGS. 105 to 107. FIG. 105 is a flow chart showing the method of displaying an acceleration region on the coordinate graph. Initially, branching is performed depending on whether two or axes are interpolation-controlled or one axis is interpolation-controlled (step S4500). If one axis is controlled, the instructed speed is the speed of the above-mentioned axis (step S4502). If two or more axes are interpolation-controlled, the method of decomposing and displaying the instructed speed to the speed pattern for each axis is employed to decompose the instructed speed to the speed for each axis (step S4501). When interpolation control is performed, the actual acceleration time of the speed decomposed to each axis is the same as the actual acceleration time of the synthesized speed. Therefore, the actual-acceleration-time storage area 260 is read (step S4503). Then, the movement amount required to accelerate the speed is calculated for the number of start axes in accordance with Equation 1501 (step S4504). Assuming that the coordinate of the location start point of the two axes displayed on the coordinate graph are (x0, y0) and movement amounts of the two axes required to accelerate the speed are dx and dy, the coordinates at which the acceleration is completed are as follows (step S4505):

X-axis coordinates of point at which acceleration is completed= $x0+dx$

Y-axis coordinates of point at which acceleration is completed= $y0+dy$ (Equation 1502)

Figure 106:
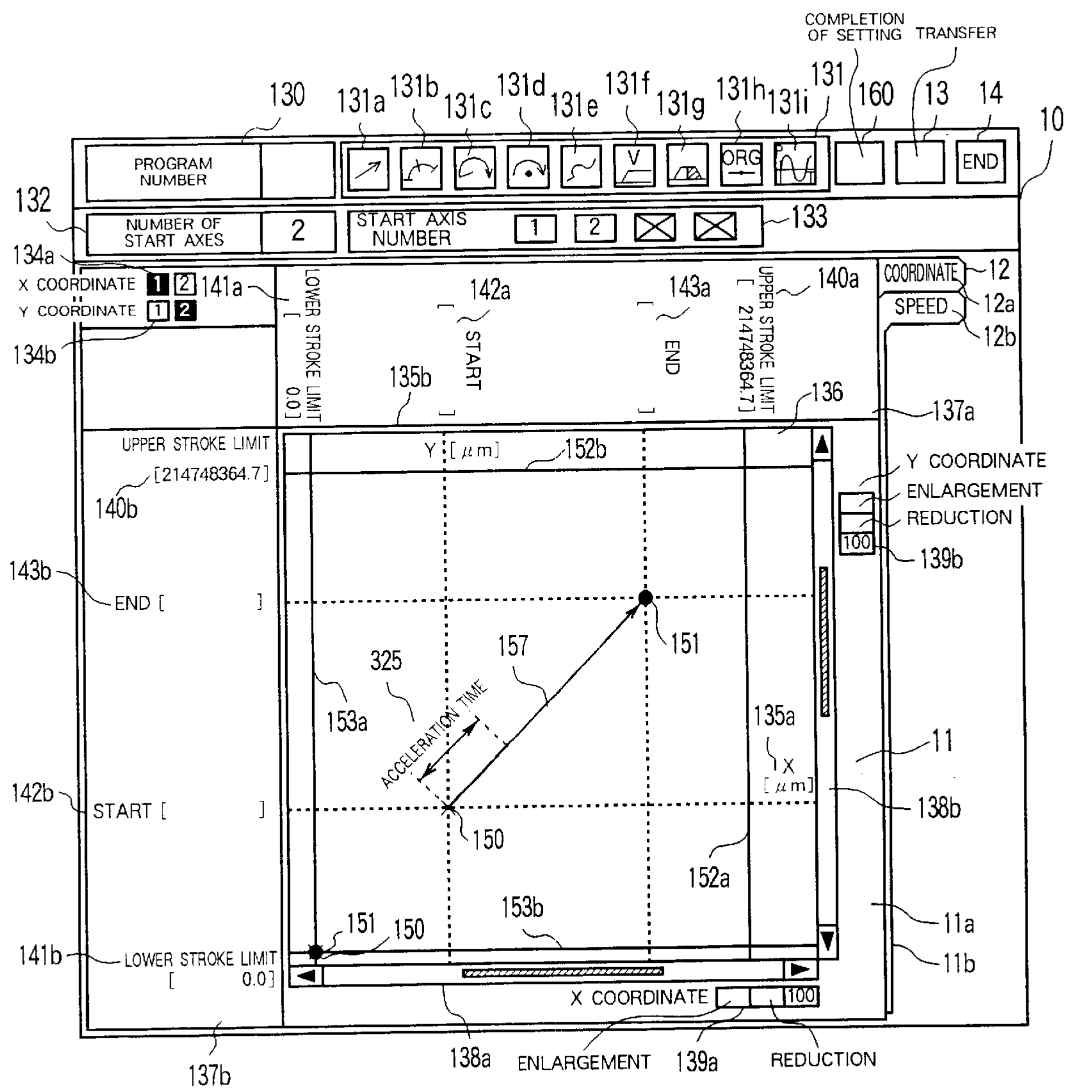
FIG. 106 is a diagram showing an example of display of the coordinate graph showing the acceleration region according to the first embodiment of the present invention.
Figure 107:
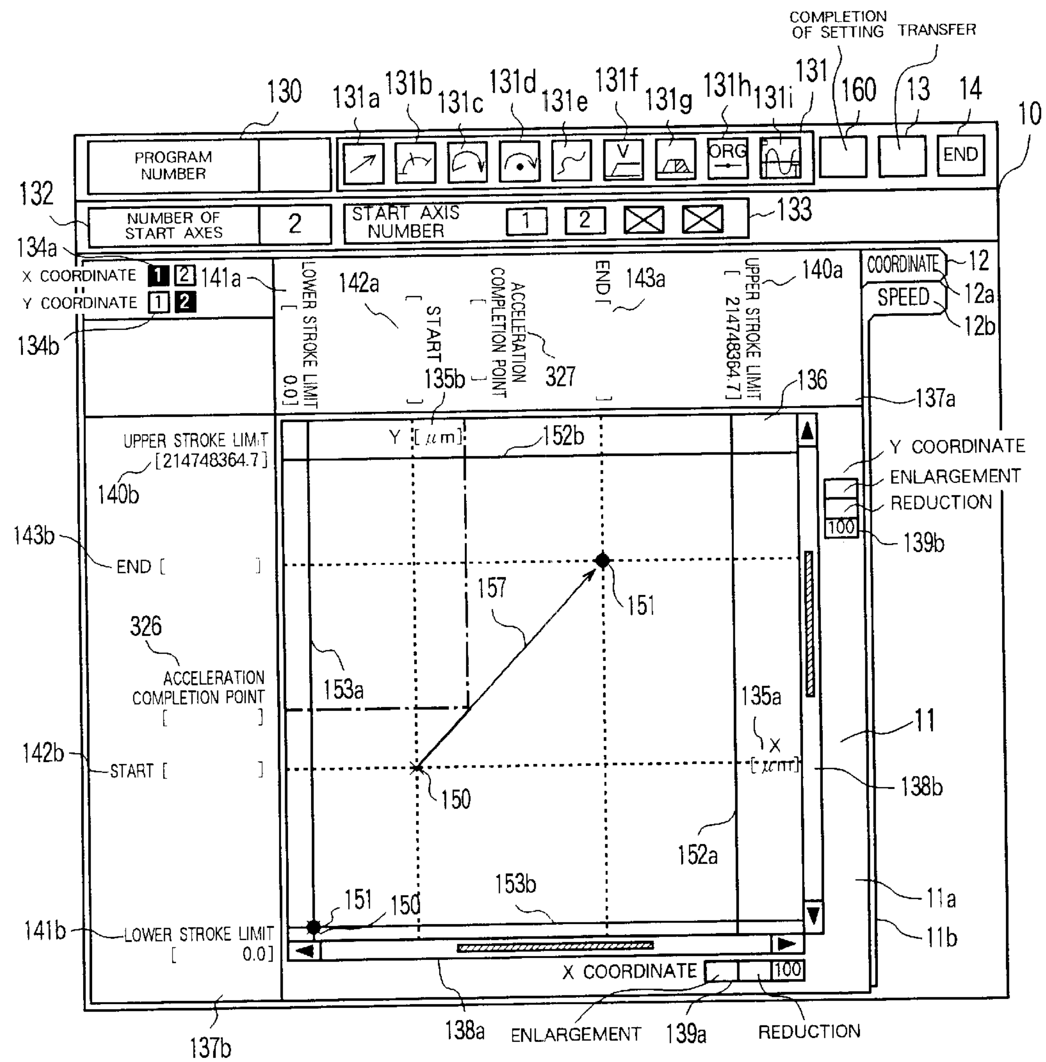
FIG. 107 is a diagram showing another example of the coordinate graph showing the acceleration region according to the first embodiment of the present invention.

- x0: coordinates of X-axis of point at which location is started
- y0: coordinates of Y-axis of point at which location is started
- dx: movement amount of X-axis required to accelerate speed
- dy: movement amount of Y-axis required to accelerate speed The thus-obtained coordinates at which the acceleration is completed and the location start point are displayed on the coordinate graph shown in FIG. 106 as indicated with reference numeral 325 (step S4506). Note that the coordinates of the acceleration completion points may be displayed with figures as indicated with reference numerals 326 and 327 shown in FIG. 107.

The above-mentioned location programming apparatus enables the position at which acceleration is completed to be displayed. Therefore, the position at which the speed is made to be constant can easily be detected.

Figure 108:
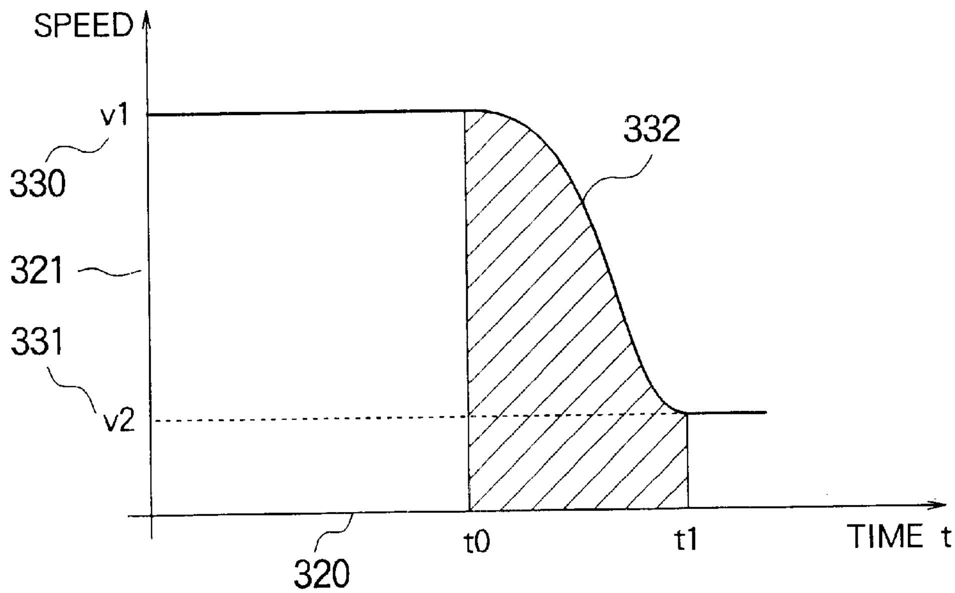
FIG. 108 is a diagram showing a deceleration distance in the speed graph according to the first embodiment of the present invention.

25. Calculation/Display of Amount of Movement Performed From Start of Deceleration to Stop in Accordance With Deceleration Time and Using Speed Graph The operation for calculating the movement amount required from start of deceleration to stop in accordance with the deceleration time and displaying a result will now be described with reference to FIG. 108. Referring to a speed graph shown in FIG. 108, reference numeral 330 represents speed v1 before deceleration, 331 represents speed v2 after deceleration and 332 represents a deceleration region. It is apparent that the movement amount required to decelerate speed v1 to another speed level of v2 is the area of the deceleration region 332 indicated with diagonal lines. If the area of the deceleration region 332 is obtained, the movement amount required to decelerate the speed and stop the movement can be obtained regardless of the deceleration pattern. The area of the deceleration region 332, that is, movement distance required to decelerate the speed can be calculated in accordance with the following Equation 1601 assuming that time corresponding to the time axis of the speed graph is t, time at which deceleration is started is t0, time at which movement is stopped is t1 and a function indicating the deceleration pattern is f (t). Note that integrating region is t0 to t1.

area (movement distance required to decelerate speed)= $\int f(t)dt$ (Equation 1601)

When two or more axes are interpolation-controlled, the movement amount required to decelerate the speed is obtained from the speed graph of the synthesized speed shown in FIG. 82. Thus, a movement amount which is required to decelerate the speed and which is a result of the interpolation can be obtained. In accordance with the speed graph showing the decomposed speed for each axis shown in FIG. 102, the movement amount for each axis required to decelerate and stop the movement can be obtained.

The thus-obtained movement amount required to decelerate the speed and stop the movement is used to display a deceleration region from the movement stop position to a position returned for a movement amount required to decelerate the speed on the locating locus of the coordinate graph. The display method is similar to the method of calculating and displaying the movement amount required to reach the instructed speed in accordance with the acceleration time by using the above-mentioned speed graph.

The above-mentioned location programming apparatus enables the deceleration distance in accordance with the deceleration time to easily be displayed. Therefore, the position at which deceleration is started can easily be understood.

Figure 109:
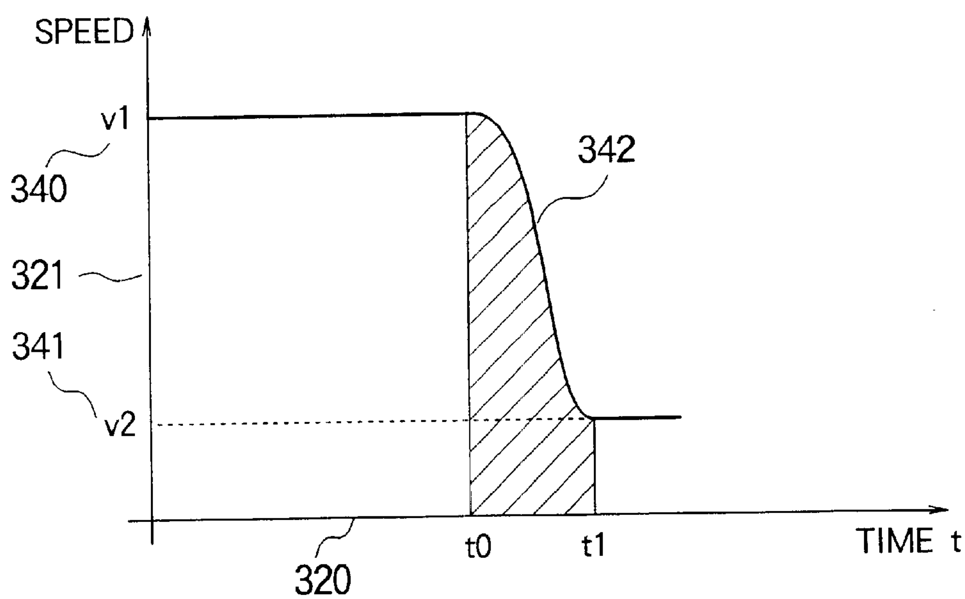
FIG. 109 is a diagram showing a rapid stop deceleration distance in the speed graph according to the first embodiment of the present invention.

26. Calculation/Display of Amount of Movement Performed From Deceleration to Stop in Accordance with Rapid Stop Deceleration Time and Using Speed Graph The operation for calculating the movement amount required to decelerate the speed and stop the movement in accordance with the rapid stop deceleration time and displaying a result will now be described with reference to FIG. 109. Referring to the speed graph shown in FIG. 109, reference numeral 340 represents speed v1 before rapid stop deceleration, 341 represents speed v2 after rapid stop deceleration and 342 represents a rapid stop deceleration region. It is apparent that the movement amount required for speed v1 to rapidly be decelerated to another speed level of v2 is the area of the rapid stop deceleration region 342 indicated with diagonal lines. If the area of the rapid stop deceleration region 342 can be obtained, a requited movement amount to rapidly stop the movement can be obtained regardless of the rapid stop deceleration pattern. The area of the rapid stop deceleration region 342, that is the movement distance required to complete the rapid stop can be calculated in accordance with the following Equation 1701 assuming that time corresponding to the time axis of the speed graph is t, time at which rapid stop is started is t0, time at which the movement is stopped is t1 and a function indicating the rapid deceleration pattern is f (t). Note that the integrating period is t0 to t1.

area (movement distance required to rapidly stop movement)= $\int f(t)dt$ (Equation 1701)

When two or more axes are interpolation-controlled, the movement amount required to rapid stop the movement is obtained from the speed graph of the synthesized speed shown in FIG. 82. Thus, the movement amount which is required to accelerate the speed and which is a result of the interpolation can be obtained. In accordance with the speed graph decomposed to each axis shown in FIG. 102, the movement amount for each axis required to rapidly stop the movement can be obtained.

The thus-obtained movement amount required to rapid stop the movement is used to display a rapid stop deceleration region from the position at which rapid stop has been completed to a position returned for a movement amount required to rapid stop the movement on the locating locus of the coordinate graph. The display method is similar to the method of calculating and displaying the movement amount required to reach the instructed speed in accordance with the acceleration time by using the above-mentioned speed graph.

The above-mentioned location programming apparatus enables the rapid stop deceleration distance in accordance with the rapid stop deceleration time to be understood. Therefore, the distance required from instruction to rapid stop the movement can easily be understood.

Figure 110:
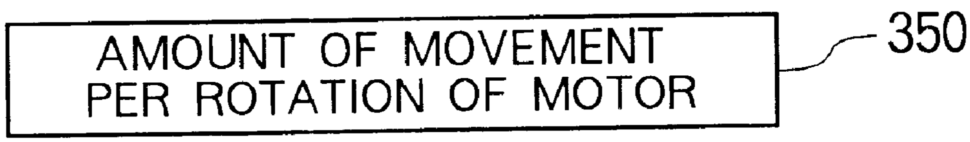
FIG. 110 is a structural view showing a memory according to the first embodiment of the present invention in which a unit conversion parameter is stored.
Figure 111:
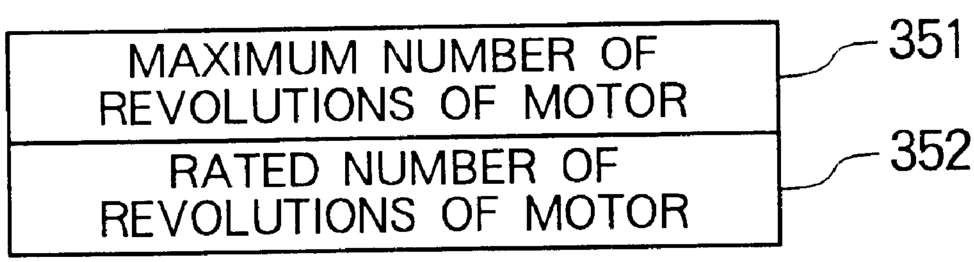
FIG. 111 is a structural view showing a memory in which maximum speed and rated speed of a motor according to the first embodiment of the present invention are stored.

27. Display of Maximum Speed and Rated Speed of Motor on Drive Shaft Using Speed Graph The operation for displaying maximum speed and rated speed obtained from maximum number of revolutions and rated number of revolutions of a motor on a drive shaft will now be described with reference to FIGS. 110 to 112. The maximum number of revolutions and rated number of revolutions of a motor are limits with which the operation of the motor is guaranteed and which are determined for each type of the motors. In general, the number of revolutions is number of revolutions per minutes and indicated in units of [r/min]. On the other hand, the instructed speed for a locating program is expressed in a unit system of a machine which is operated by the motor. FIG. 110 shows the structure of a parameter memory in which parameters for converting the number of revolutions of the motor into instructed speed unit. Reference numeral 350 a memory in which unit conversion parameter indicating the degree of movement in an instructed unit per rotation of the motor is stored. FIG. 111 shows the structures of parameter memories on which the maximum number of revolutions for the motor and the rated number of revolutions are stored. Reference numeral 351 represents a memory on which the maximum number of revolutions for the motor is stored and 352 represents a memory on which the rated number of revolutions of the motor is stored.

In a case where the instructed unit is [mm] and the unit of the instructed speed is amount of movement [mm/min] per minute and the unit conversion parameter 350 indicates the distance which is in units of mm and for which the machine which is operated by the motor, the maximum speed converted into the instructed unit system from the unit conversion parameter 350 the maximum number of revolutions 351 can be obtained from the following Equation 1801:

maximum speed [mm/min]=unit conversion parameter [mm/r] maximum number of revolutions [r/min] (Equation 1801)

Also the rated speed can be obtained from the unit conversion parameter 350 and the rated number of revolutions 351 in accordance with the following Equation 1802:

rated speed [mm/min]=unit conversion parameter [mm/r]×rated number of revolutions [r/min] (Equation 1802)

Although the instructed unit is [mm] and the unit for the speed is [mm/min] in the description above, conversion may, of course, be performed if the unit system is another system.

Figure 112:
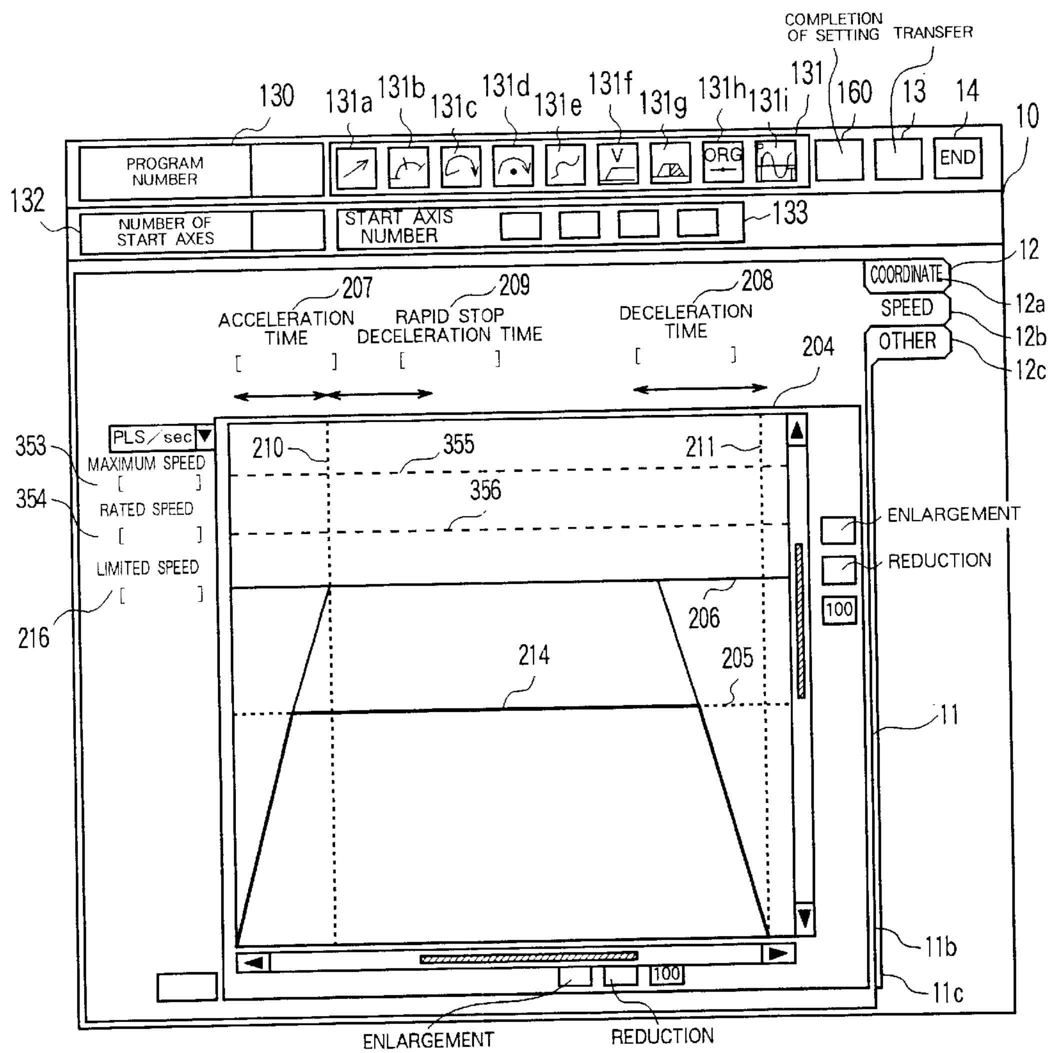
FIG. 112 is a diagram showing an example of display of a rated speed and maximum speed on the speed graph according to the first embodiment of the present invention.

The thus-obtained maximum speed and the rated speed are displayed on the speed graph. FIG. 112 shows an example of the maximum speed and the rated speed on the speed graph. Reference numeral 353 represents a figure display area for the maximum speed, 354 represents a figure display area for the rated speed, 355 represents a maximum-speed display line showing the maximum speed and 356 represents a rated-speed display line showing the rated speed. The display is performed by a method similar to the method of displaying the limited speed described when the limited speed is set and changed by using the speed graph. Thus, the maximum speed and the rated speed obtained in accordance with the Equations 1801 and 1802 are used so that display on the speed graph shown in FIG. 112 is performed.

The above-mentioned location programming apparatus is arranged in such a manner that the maximum number of revolutions and the rated number of revolutions of the employed motor are displayed on the speed graph. Therefore, the necessity of converting the maximum number of revolutions and the rated number of revolutions into the unit of the speed can be eliminated to determine limited speed.

28. Change of Acceleration/Deceleration Pattern Using Speed Graph

Figure 113:
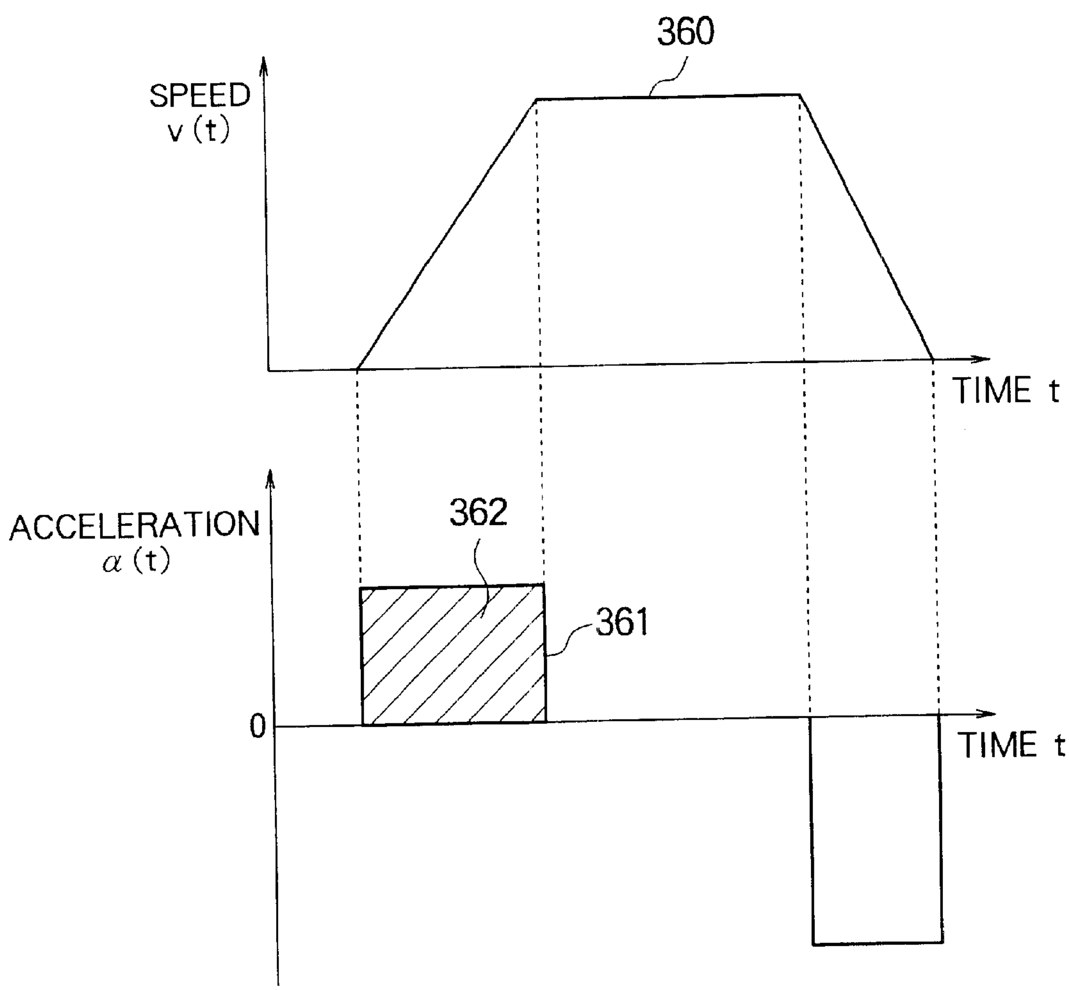
FIG. 113 is a diagram showing the relationship between the speed and the acceleration when trapezoid acceleration/deceleration is performed in the structure according to the first embodiment of the present invention.
Figure 114:
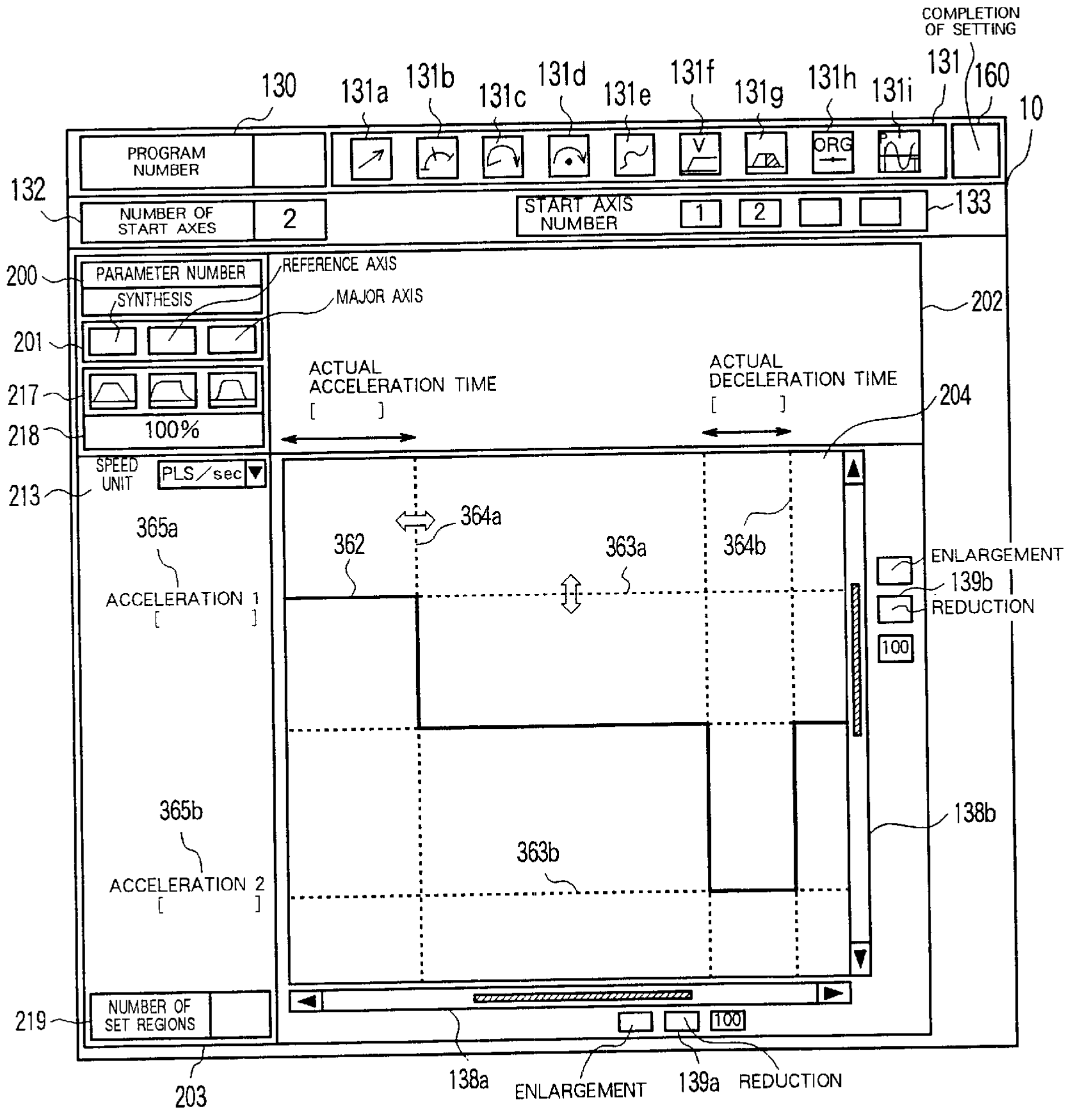
FIG. 114 is a diagram showing a window of a acceleration graph according to the first embodiment of the present invention.

The operation for calculating and illustrating acceleration from data of a speed pattern by using the speed graph and changing the illustrated shape of the acceleration graph so as to change the acceleration/deceleration pattern on the speed graph will now be described with reference to FIGS. 113 and 114. The acceleration is an amount of change of the speed per unit time. Assuming that a function of the speed in terms of time t is v (t) and a function of the acceleration in terms of time is a (t), a fact has been known that the acceleration is expressed by differentiating the speed with time as shown in the following Equation 1900:

$$a(t)=dv(t)/dt \quad \text{(Equation 1900)}$$

The foregoing Equation 1900 can be used to obtain a graph showing change as time elapses from the speed graph and the graph can be displayed. FIG. 113 is a graph showing the relationship between the speed and the acceleration when the trapezoid acceleration/deceleration, that is, when the acceleration/deceleration is performed at a constant acceleration. Reference numeral 360 represents a graph showing change in the speed as time elapses and 361 represents a graph showing change in the acceleration as time elapses corresponding to change in the speed as time elapses. In the graph 360 showing the change in the acceleration as time elapses, it is apparent that the area of the portion 362 indicated with diagonal lines is the same as the speed which has been made to be constant from the above-mentioned Equation 1900.

A method of displaying the acceleration graph shown in FIG. 114 will now be described in such a manner that the trapezoid acceleration/deceleration is performed for example. When the trapezoid acceleration/deceleration is performed, that is, when the constant acceleration is employed, the acceleration a can be obtained as follows from actual acceleration time ta260 determined as a result of calculations and display of the actual acceleration time in the acceleration region in the above-mentioned speed graph and instructed speed 239 stored in the locating program speed information area shown in FIG. 67.

$$a=V/Tar \quad \text{(Equation 1901)}$$

a: acceleration v: instructed speed tar: actual acceleration time

Therefore, a straight line having a size of a which is the actual acceleration time tar is drawn from the point at which acceleration has been started. The acceleration is zero after the actual acceleration time has elapsed, that is, from the point at which acceleration has been completed to a next change in the speed. Then, the acceleration is required to be calculated and illustrated at each point at which the speed is changed. As a matter of course, the instructed speed v in the Equation 1901 is the different between the speed after the change and that before the change in a case where acceleration is not performed from a stopped state and in a case where the speed is changed at an intermediate locating point. As a matter of course, the straight line can be drawn in a case of deceleration similar to the acceleration.

The procedure for changing the acceleration and the acceleration time by using the acceleration graph will now be described. FIG. 114 shows an example of the structure of a window for setting an acceleration graph obtained from a speed graph. Referring to FIG. 114, reference numeral 362 represents a graph showing acceleration, 363 represents a pointer for changing the acceleration and 364 represents a pointer for changing actual acceleration time. Reference numeral 365 represents an area for displaying the acceleration with figures. The pointer 363 is able to vertically move in the speed-graph making and displaying area 204 as a result of dragging operation of the mouse. A point at which the dragging operation has been suspended indicates the acceleration. When the acceleration is changed without change of the instructed speed, the actual acceleration time must be changed to correspond to the acceleration as can be understood from Equation 1901. In this case, the actual acceleration time can be obtained as follows as can be understood from Equation 1901:

$$tar=v/a \quad \text{(Equation 1902)}$$

Therefore, the actual acceleration time is again calculated in accordance with the Equation 1902 to correspond to the determined acceleration. In accordance with the result of the calculations, an acceleration graph is again drawn. Moreover, the obtained acceleration time is stored in the actual-acceleration-time storage area 260 of the actual acceleration/deceleration time information area shown in FIG. 81. Moreover, the acceleration time 233 in the acceleration/deceleration control parameter area shown in FIG. 66 is again calculated so as to be stored in the area 233. It is apparent that the method of again calculating the acceleration time 233 can be performed in accordance with the following Equation 1903 from the description of the locating programming using the speed graph:

$$ta=(vmax/v)\times tar \quad \text{(Equation 1903)}$$

ta: acceleration time tar: actual acceleration time vmax: limited speed v: instructed speed Also the acceleration graph permits the acceleration time to be changed. Referring to the drawing, the pointer 364 is able to move to the right and left in the speed-graph making and displaying area 204 when a dragging operation with the mouse has been performed. A point at which the dragging operation has been suspended indicates acceleration time. When the acceleration time is changed without change in the instructed speed, the acceleration must be changed as described above.

Although the process which is performed when acceleration is performed has been described, a similar method may, of course, be employed to change the deceleration time and acceleration for the deceleration process on the acceleration graph when the deceleration process is performed.

Although only the acceleration and the acceleration time are changed in the description above, the acceleration/deceleration pattern can be changed by deforming the acceleration graph.

The above-mentioned location programming apparatus enables acceleration time and deceleration time to be set by using the acceleration graph. Therefore, the acceleration time and deceleration time can be set while a user is conscious of the acceleration.

29. Display of Effective Speed Change Range Using Coordinate Graph

Figure 115:
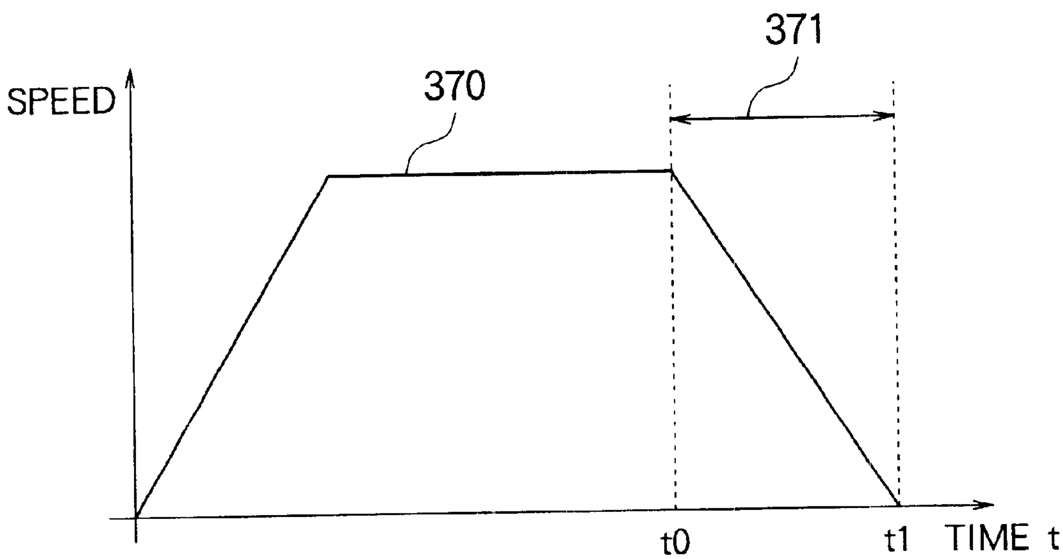
FIG. 115 is a diagram showing change in the instructed speed as time elapses in the structure according to the first embodiment of the present invention.
Figure 116:
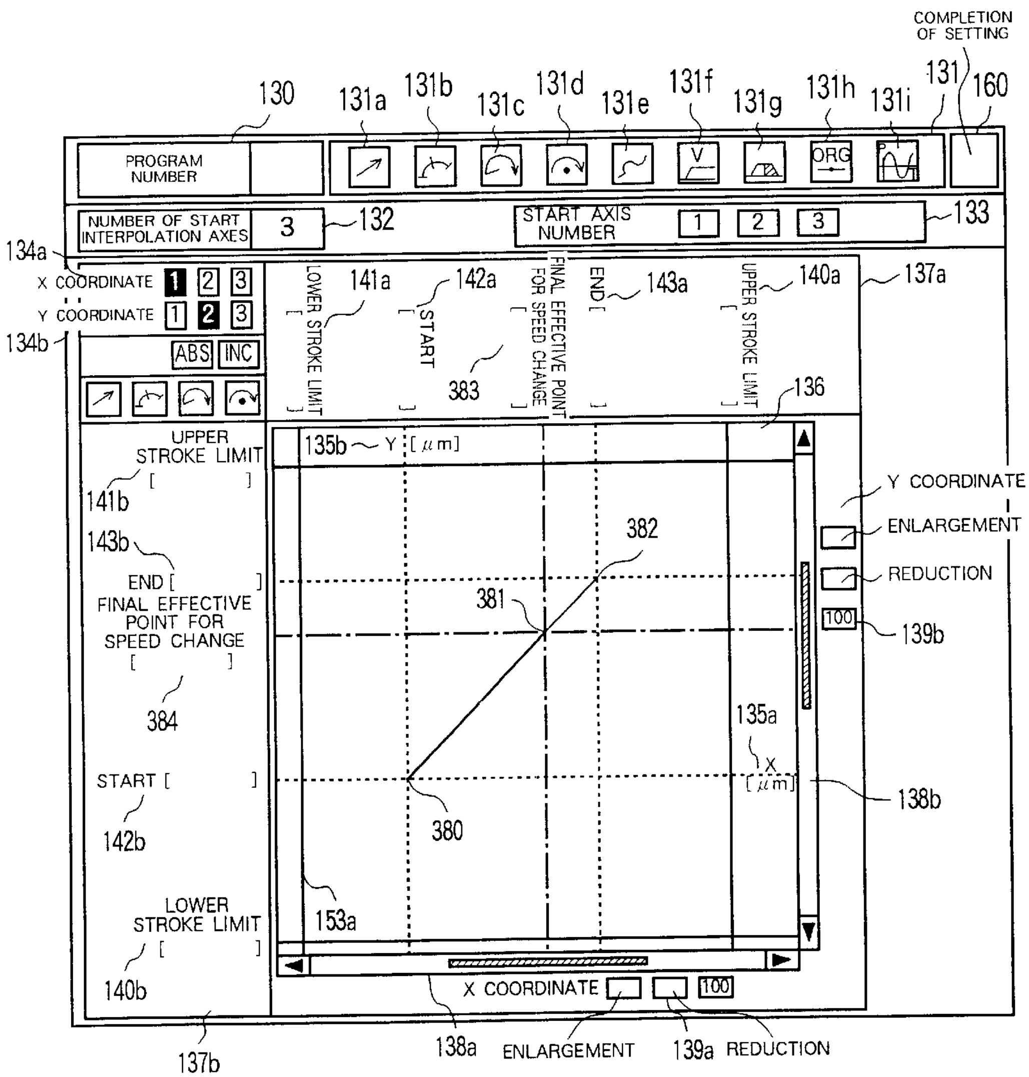
FIG. 116 is a diagram showing an effective range in which the speed can be changed in the structure according to the first embodiment of the present invention.
Figure 117:
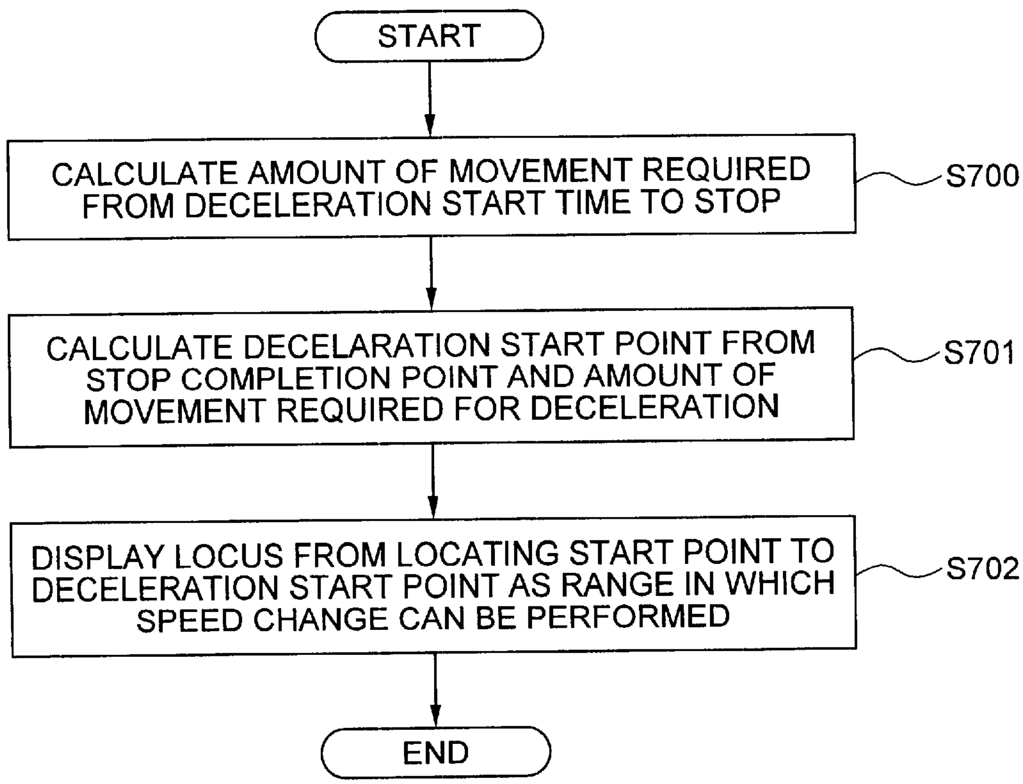
FIG. 117 is a flow chart showing the operation for displaying the effective range in which the speed can be changed in the structure according to the first embodiment of the present invention.

The operation for displaying an effective speed change range on the coordinate graph will now be described with reference to FIGS. 115 to 117. FIG. 115 shows an example of a graph showing change in the instructed speed as time elapses when locating control is performed. Reference numeral 370 represents a graph showing change in the speed as time elapses. Reference numeral 371 represents a region in which deceleration is performed to a point at which location is completed. When the instructed speed is changed during the locating control, the position moved from the position at which deceleration has been started for a deceleration distance in accordance with a deceleration pattern is the position at which locating is completed. Therefore, speed cannot be changed even if change in the speed is requested during deceleration to the point at which locating is completed, that is, in a region 371 shown in FIG. 115. That is, the region from the point at which locating has been started to a point at which deceleration is started toward the point at which locating is completed is the effective range for changing the speed.

A method of displaying the effective speed-change range on the coordinate graph will now be described in such a manner that two axes are linearly interpolated. FIG. 116 shows an example of a coordinate graph showing an effective range in which speed can be changed. Reference numeral 380 represents a point at which locating is started, 381 represents a point a which deceleration is started and 382 represents a point at which locating is completed. FIG. 117 is a flow chart for displaying the effective speed-change range on the coordinate graph. The description will be performed with reference to FIG. 117. The deceleration distance required from the point at which deceleration has been started to the point at which locating is completed, that is, completion of the stop of the movement can be obtained by the method described when the movement amount is calculated and displayed (step S700). In accordance with the thus-obtained deceleration distance for each axis and the point at which locating is completed, the point at which deceleration is started toward the point at which locating is completed can be obtained as follows (step S701):

$$x_{dp}=xe-dx$$

$$Y_{dp}=ye-dy \quad \text{(Equation 700)}$$

xdp: coordinate of deceleration start point to locating completion point on X-axis ydp: coordinate of deceleration start point to locating completion point on Y-axis xe: coordinate of locating completion point on X-axis ye: coordinate of locating completion point on Y-axis dx: deceleration distance on X-axis dy: deceleration distance on Y-axis Therefore, the range from the locating start point 380 to the deceleration start point 381 obtained in accordance with Equation 700 is the effective speed-change range. Since the passage from the locating start point 380 to the deceleration start point 381 on the coordinate graph shown in FIG. 116 is the effect speed-change range, the locating passage in the effective speed-change range is drawn on the coordinate with a changed type of line or the color of the like (step S702).

The above-mentioned location programming apparatus is able to prevent an error that “request for changing speed is executed during operation in which speed change is ineffective” detected by a controller during execution of the program when the locating programming is performed.

Figure 118:
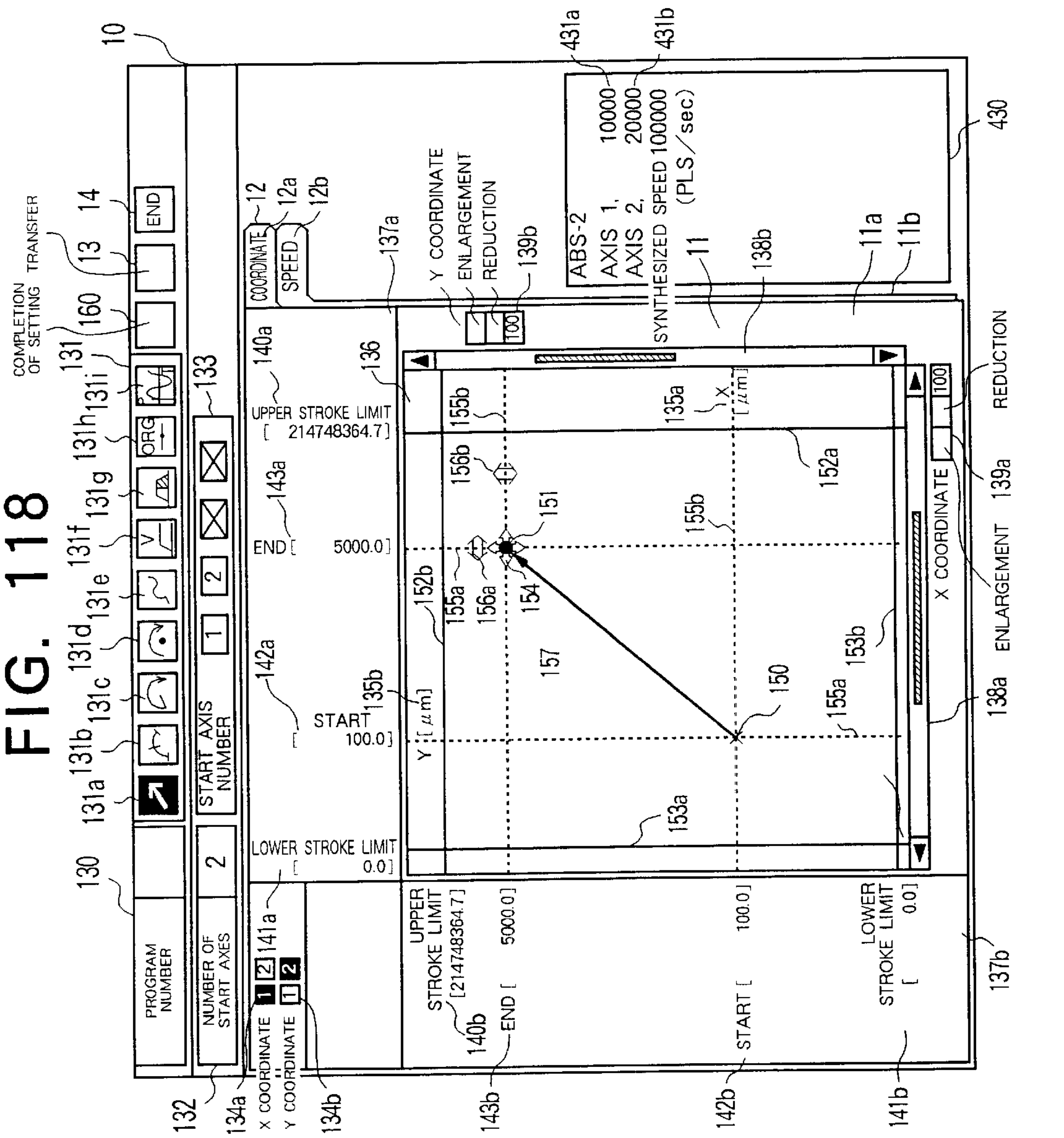
FIG. 118 is a diagram showing an example of a locating programming window when locating programming is performed by using the coordinate graph while displaying a list-form locating program in the location programming apparatus according to the first embodiment of the present invention.

30. Locating Programming Using Coordinate Graph While Displaying List Form Locating Program The operation for performing locating programming by using a coordinate graph while displaying a list-form locating program will now be described with reference to FIGS. 118 and 119. FIG. 118 shows an example of a window when a location end point 151 is changed in a program for linear interpolation locating of two axes in a case where the position instruction method is the absolute position instruction. The operation described when the linear control is performed by using the coordinate graph has been described is employed to change the locating end point. Referring to the drawing, reference numeral 430 represents a list-form locating program display area on which a corresponding locating program list is displayed in accordance with information stored in the graphic programming work memory 4. Reference numerals 431*a* and 431*b* represent required position data of the start axis numbers in such a manner that the contents of the end-point-position information storage area 122 of the start axis number are displayed.

Figure 119:
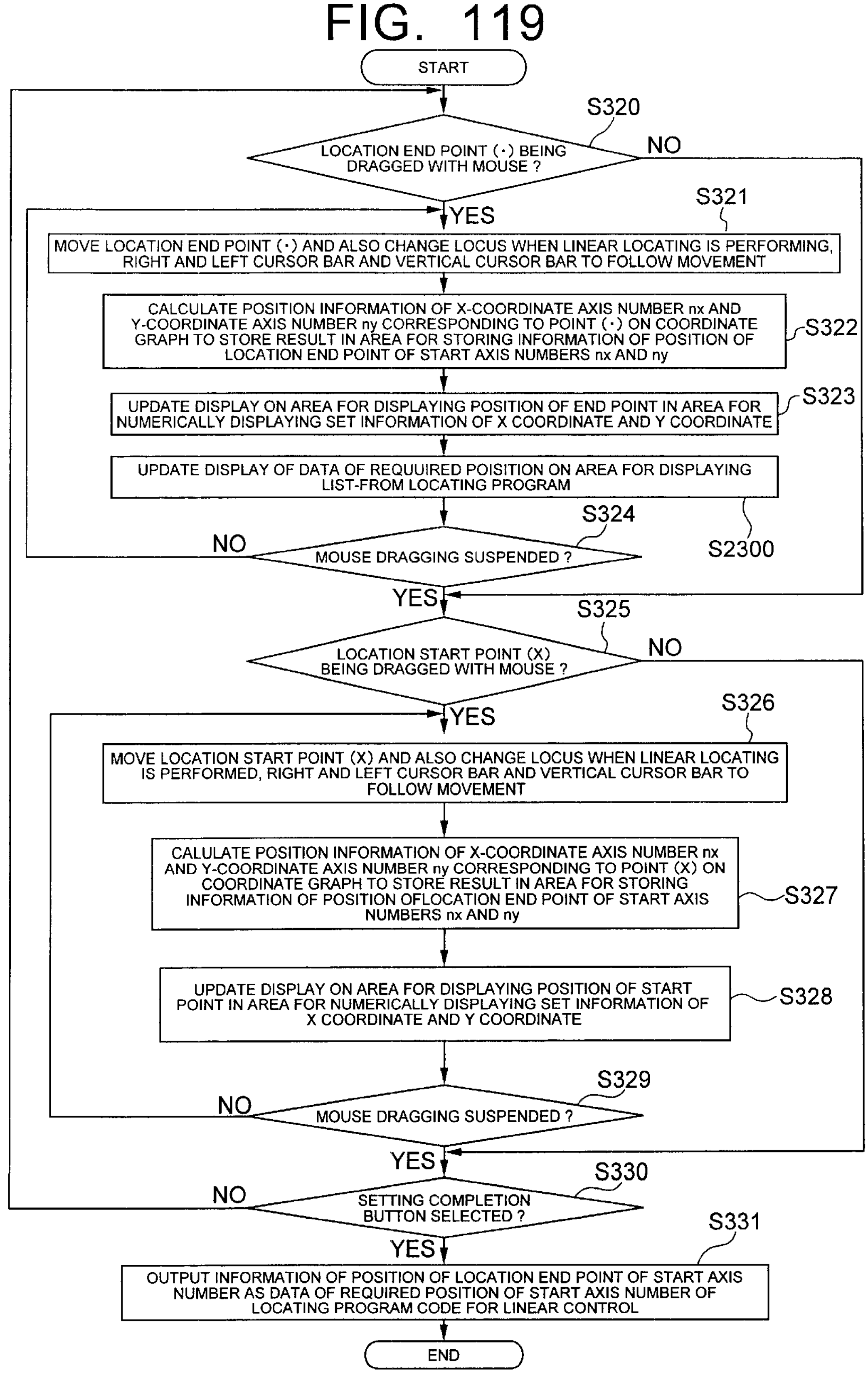
FIG. 119 is a flow chart showing the operation which is performed when locating programming is performed by using the coordinate graph while displaying the list-form locating program in the location programming apparatus according to the first embodiment of the present invention.

The operation for simultaneously displaying a list-form locating program when locating programming is performed by using a coordinate graph will now be described with reference to a flow chart shown in FIG. 119 in such a manner that a case of two axes are linear-interpolated by instructing absolute position. In accordance with information in the locating control type storage area 81 of the common-information storage area 70 of the graphic programming work memory 4, a corresponding program is determined. Required information is fetched from the coordinate-graph-output-information storage area 71, the speed-graph-output-information storage area 72 and the other-time-transition-graph storage area 73 so as to be formed into a list which must be displayed. When the location end point 151 is being dragged with the mouse on the coordinate graph (step S320), display of required position data 431*a* and 431*b* of the start axis number in the list-form locating program display area 430 is updated in accordance with position information stored in the end-point-position information storage area 122 of the start axis number in addition to the process in steps S321 to S323 for the linear control by using the coordinate graph (step S2300). The processes in steps S321 to S2300 are performed until mouse dragging is suspended. When mouse dragging has been suspended, the operation proceeds to step S325. Then, a process similar to that when linear control is performed by using the coordinate graph is performed.

The above-mentioned location programming apparatus enables the process of setting a list-form locating program when the locus operation has been changed to simultaneously be recognized.

Figure 120:
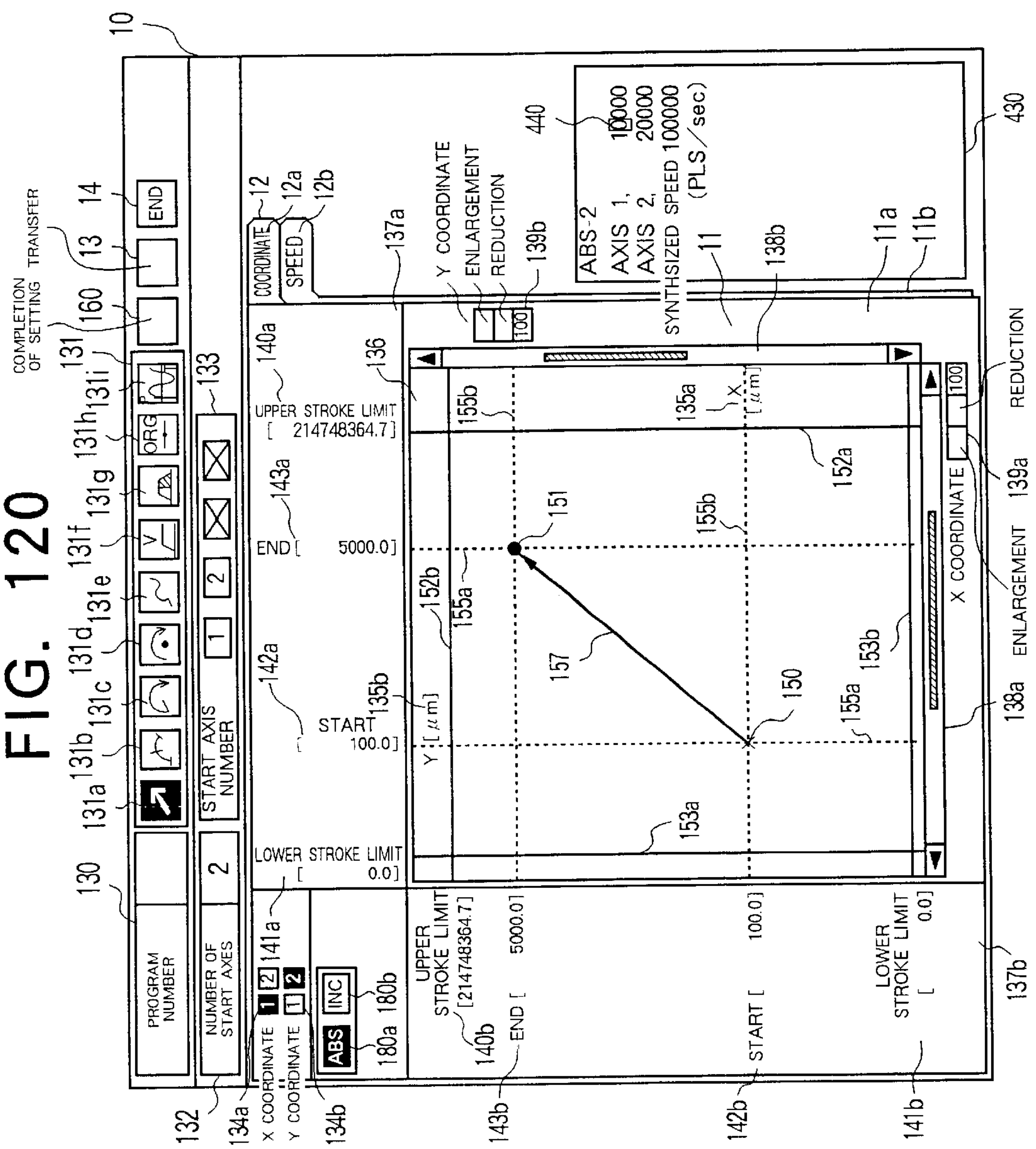
FIG. 120 is a diagram showing an example of a locating programming window which is displayed when locating programming is performed by using the list-form locating program while displaying the coordinate graph in the location programming apparatus according to the first embodiment of the present invention.

31. Locating Programming Using List Form Locating Program While Displaying Coordinate Graph The operation for performing locating programming by using a list-form locating program while displaying a coordinate graph will now be described with reference to FIGS. 120 to 122. FIG. 120 shows an example of a window for linear interpolation of two axes are performed in a state where the position instruction method is the absolute position instruction. Reference numeral 440 represents a cursor for showing a state where figures are input which is displayed when each data setting column of the list-form locating program display area 430 is clicked with the mouse. Thus, data can be set with figures.

Figure 121:
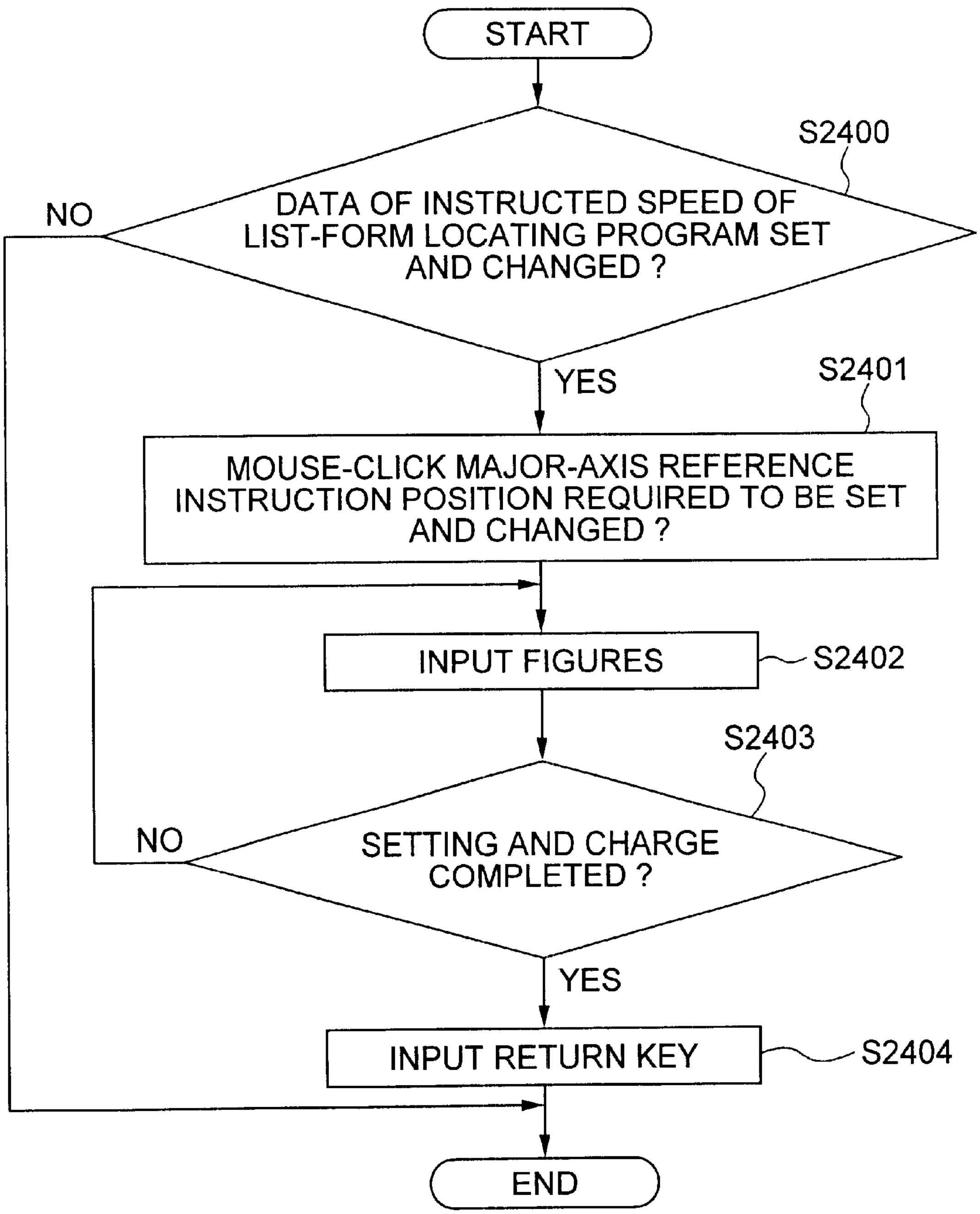
FIG. 121 is a flow chart showing the operation for performing locating programming by using the list-form locating program while displaying the coordinate graph in the location programming apparatus according to the first embodiment of the present invention.

The operation for changing the list-form locating program while displaying the coordinate graph will now be described with reference to a flowchart shown in FIG. 121. When required position data is set and changed by using the list-form locating program (step S2400), the figure portion which must be set and changed is clicked with the mouse (step S2401). Thus, figures are input (step S2402). When setting and change have been completed (step S2403), a return key is depressed (step S2404) to end the setting operation using the list.

Figure 122:
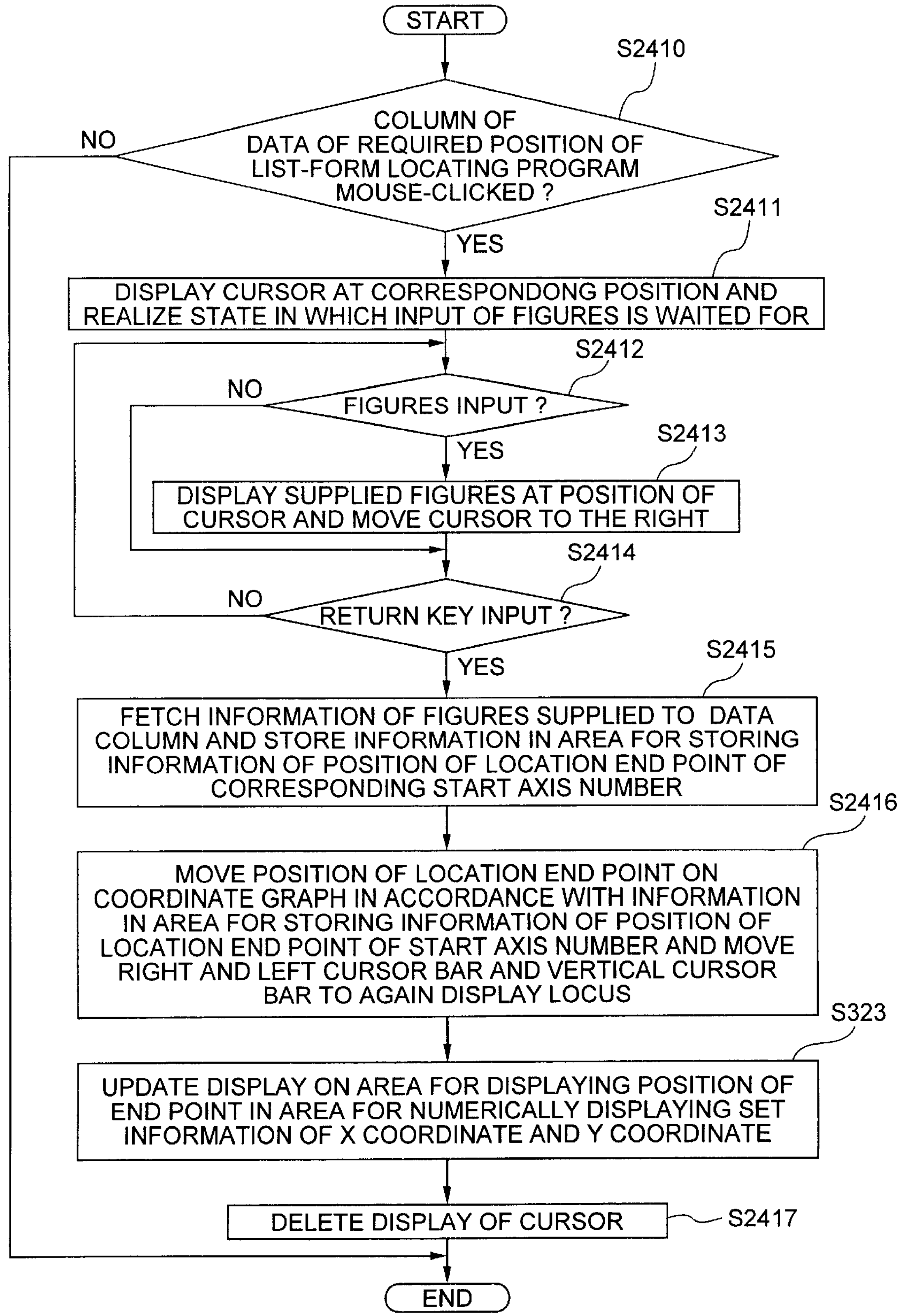
FIG. 122 is a flow chart showing the operation which performed when locating programming is performed by using the list-form locating program while displaying the coordinate graph in the location programming apparatus according to the first embodiment of the present invention.

The operation for changing the list-form locating program while displaying the coordinate graph will now be described with reference to a flow chart shown in FIG. 122. FIG. 122 shows a case of a locating program for linear-interpolating two axis in a state in which the position instruction method is the absolute position instruction. When a required position data column in the list-form locating program display area 430 is clicked with the mouse (step S2410), the cursor 440 is displayed at the corresponding position so that a state in which input of figures is waited for is realized (step S2411). When figures are supplied (step S2412), the supplied figures are displayed at the position of the cursor 440. Then, the cursor is moved to the right for a distance corresponding to one character (step S2413). The processes in steps S2412 and S2413 are performed until the return key is depressed. When the return key has been depressed (step S2414), information of supplied figures in the data column are fetched so as to be stored in the end-point-position information speed graph area 122 of the start axis number (step S2415).

In accordance with information in the end-point-position information storage area 122 of the start axis number, the location end point (•) 151 on the coordinate graph is moved to the corresponding position. Also the right-left directional cursor bar 155*a* and the up-down directional cursor bar 155*b* are moved. Thus, the locus 157 is displayed (step S2416). Moreover, display on the end-point-position display areas 143*a* and 143*b* of the areas 137*a* and 137*b* in which the number of set information on X- and Y-coordinates are stored is updated (step S323). Then, the cursor is erased (step S2417). Thus, the operation for setting and changing the program by using the list is ended.

The above-mentioned location programming apparatus enables the process of change of the locus operation when position data of the list-form locating program is changed to simultaneously be recognized.

Figure 123:
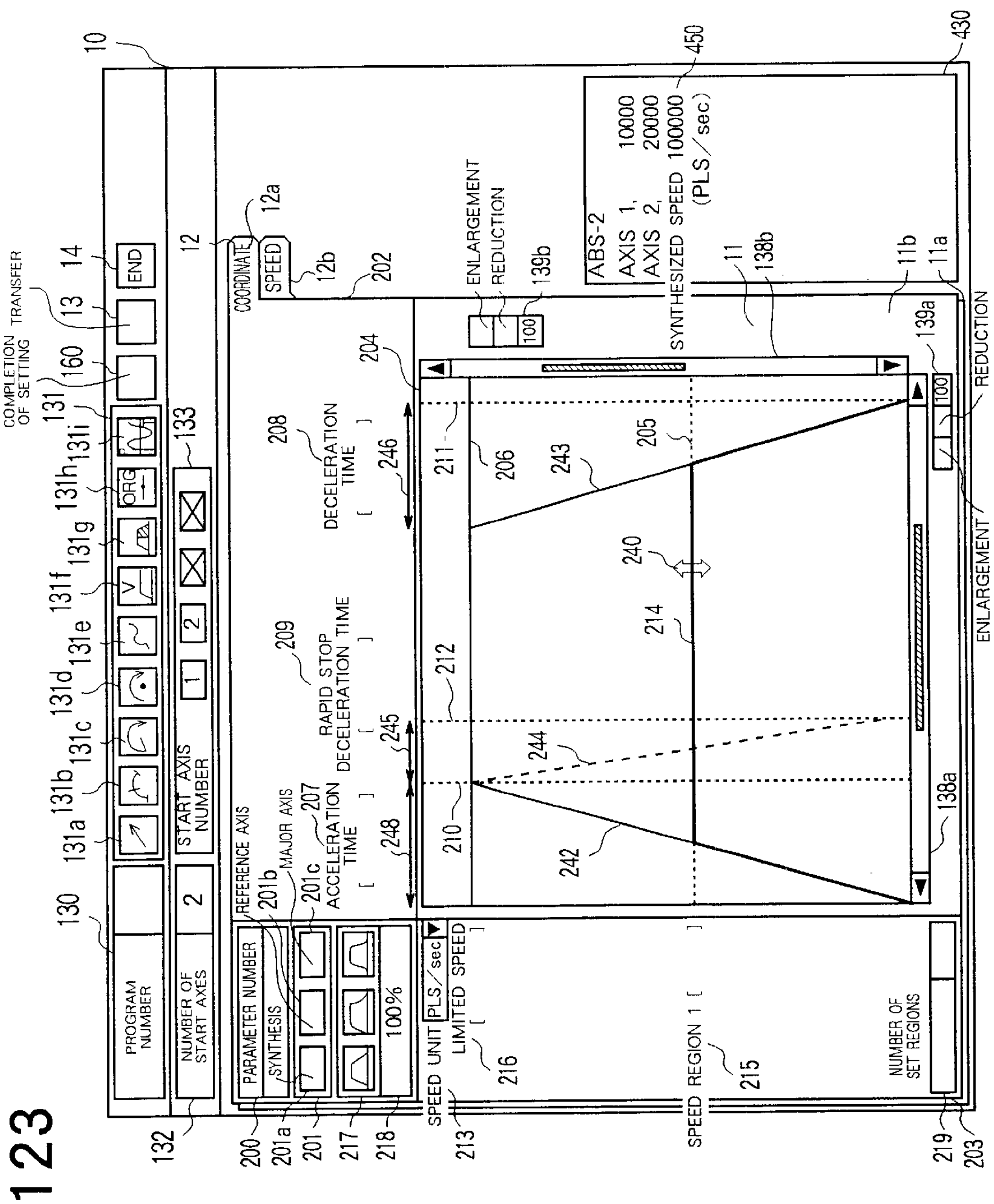
FIG. 123 is a diagram showing an example of a locating programming window which is displayed when locating programming is performed by using the speed graph while displaying the list-form locating program in the location programming apparatus according to the first embodiment of the present invention.

32. Locating Programing Using Speed Graph While Displaying List Form Locating Program The operation for performing locating programming by using a speed graph while displaying a list-form locating program will now be described with reference to FIGS. 123 and 124. FIG. 123 shows an example of a window for changing a speed pattern in a locating program for linear-interpolating two axes. The speed pattern 214 is changed by the operation described when the locating programming is performed by using the speed graph. Referring to the drawing, reference numeral 430 represents a list-form locating program display area 430 on which a locating program list is displayed in accordance with information stored in the graphic programming work memory 4. Reference numeral 450 represents instructed speed data in which the contents of the region-instructed-speed storage area 239 of the region 1 are displayed. Reference numeral 451 represents a speed instruction method which is displayed in accordance with the contents of the speed-instruction-method storage area 238.

Figure 124:
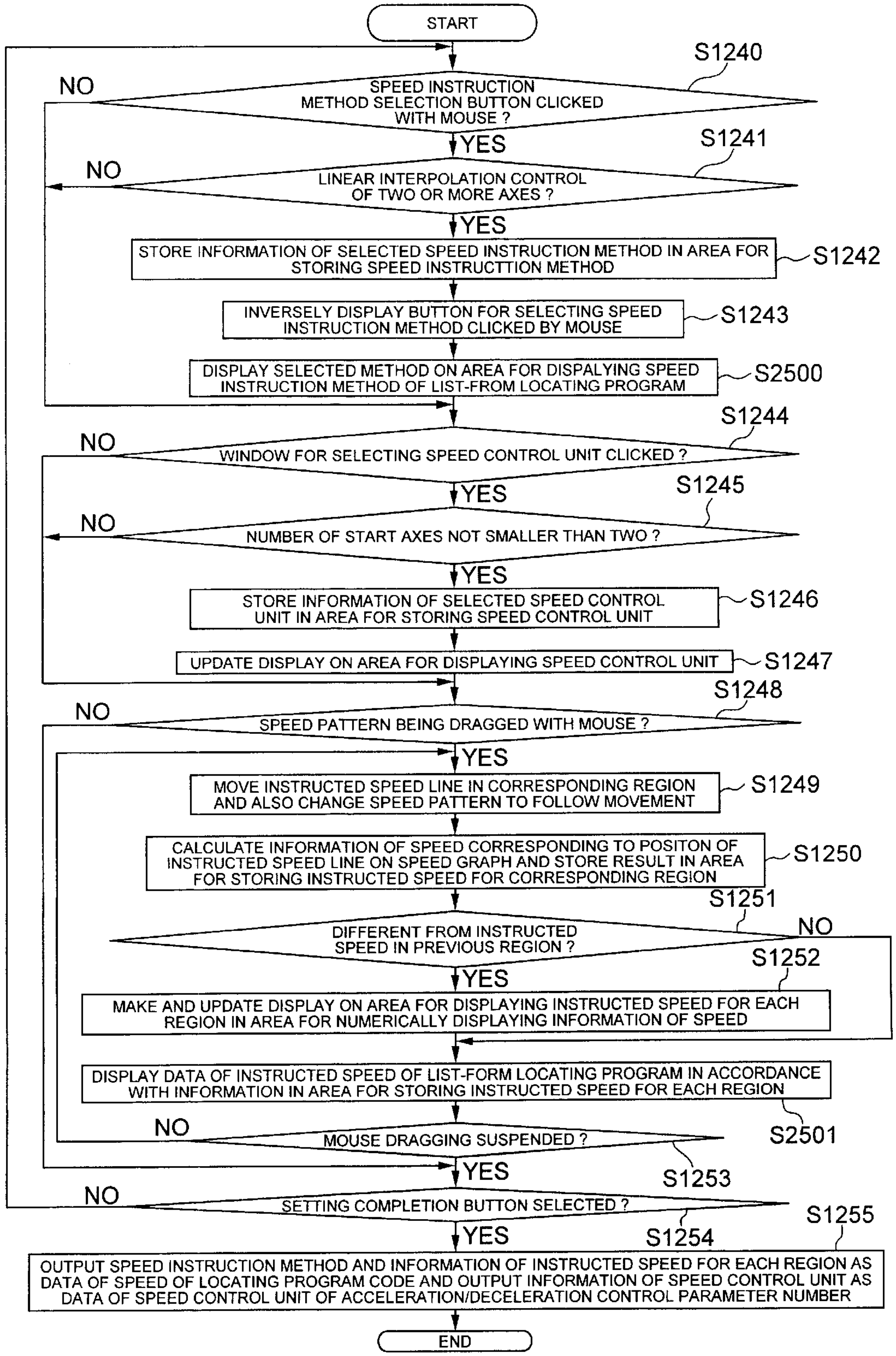

The operation for simultaneously displaying a list form locating program when locating programming is performed by using a speed graph will now be described with reference to a flow chart shown in FIG. 124. Initially, a corresponding program is determined in accordance with information in the locating control type storage area 81 of the common-information storage area 70 of the graphic programming work memory 4. Required information is fetched from the coordinate-graph-output-information storage area 71, the speed-graph-output-information storage area 72 and the other-time-transition-graph storage area 73 so as to be formed into a list which must be displayed.

Figure 71:
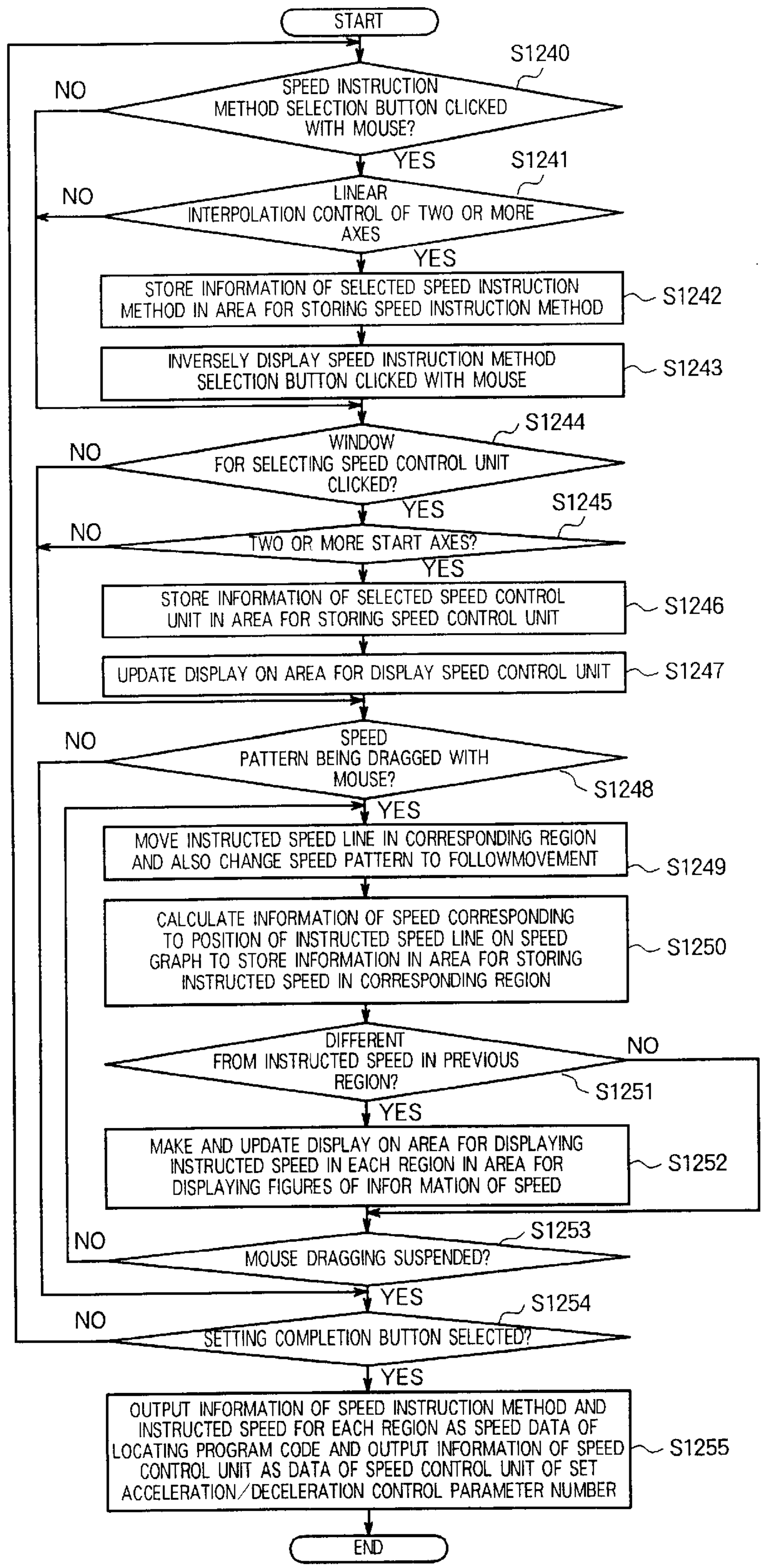
FIG. 71 is a flow chart showing the operation of locating programming by using the speed graph in a case where the speed instruction method, the speed control unit and instructed speed are set and changed in the location programming apparatus according to the first embodiment of the present invention.

The same processes as those for the locating programming process using the speed graph are given the same step numbers as those shown in the flow chart shown in FIG. 71. When the speed instruction method selection button is clicked with the mouse in step S1240, the method selected by the speed instruction method 451 of the list-form locating program display area 430 is displayed in addition to the process until step S1243 is performed for performing locating programming by using the speed graph (step S2500). If the speed pattern 214 is being dragged with the mouse in step S1247, instructed speed data 450 in the list-form locating program display area 430 is displayed in accordance with information in the region-instructed-speed storage area 239 in addition to the processes until step S1252 is performed (step S2501). Then, the same operation as that for performing locating programming by using the speed graph is performed.

The above-mentioned location programming apparatus enables setting of the list-form locating program when the speed pattern has been changed to simultaneously be recognized.

Figure 125:
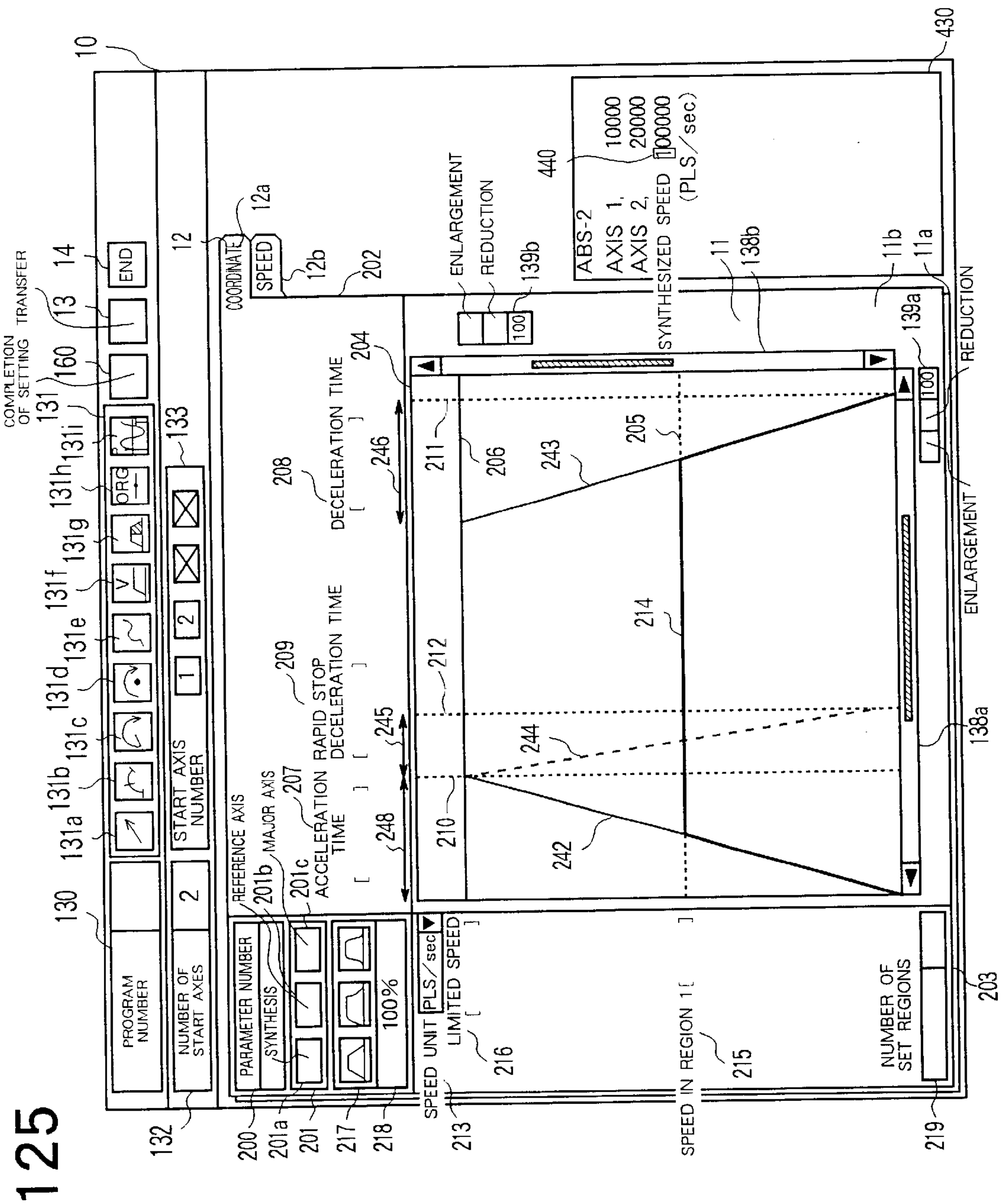

33. Locating Programming Using List Form Locating Program While Displaying Speed Graph The operation for performing locating programming by using a list-form locating program while displaying the speed graph will now be described with reference to FIGS. 125 to 127. FIG. 125 shows an example of a window for changing the speed pattern in the locating program for linear-interpolating two axes. Reference numeral 440 represents a cursor for showing a state in which figures which are displayed when each data setting column in the list-form locating program display area 430 is clicked with the mouse are input. Thus, each data can be set with figures.

Figure 126:
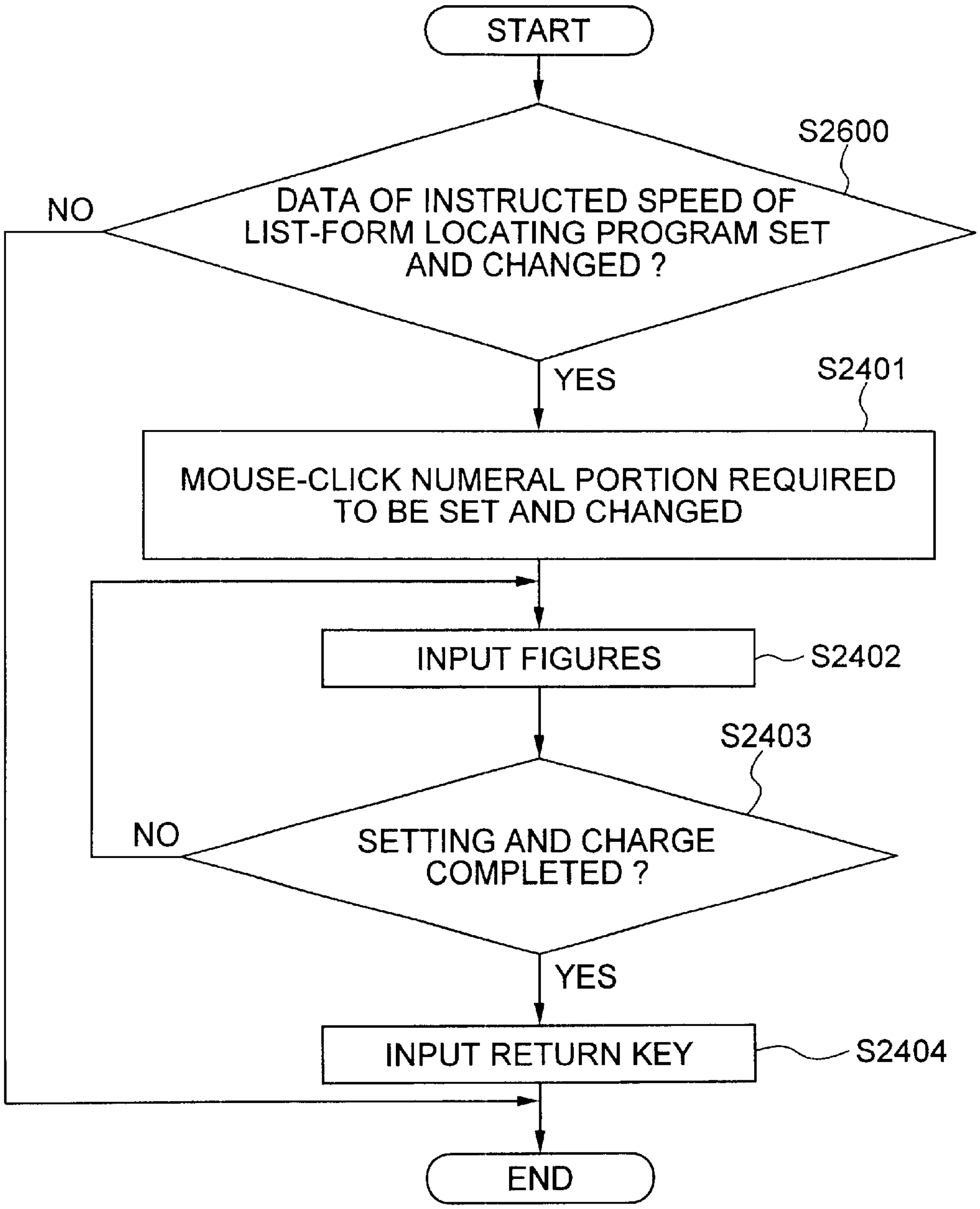

The operation for changing the list-form locating program while displaying the speed graph will now be described with reference to a flow chart shown in FIG. 126. When the instructed speed data is set and changed by using the list-form locating program (step S2600), the portion which must be set and changed is clicked with the mouse (step S2401) so that figures are input (step S2402). When setting and changing have been completed (step S2403), the return key is depressed (step S2404). Thus, setting with the list is ended.

Figure 127:
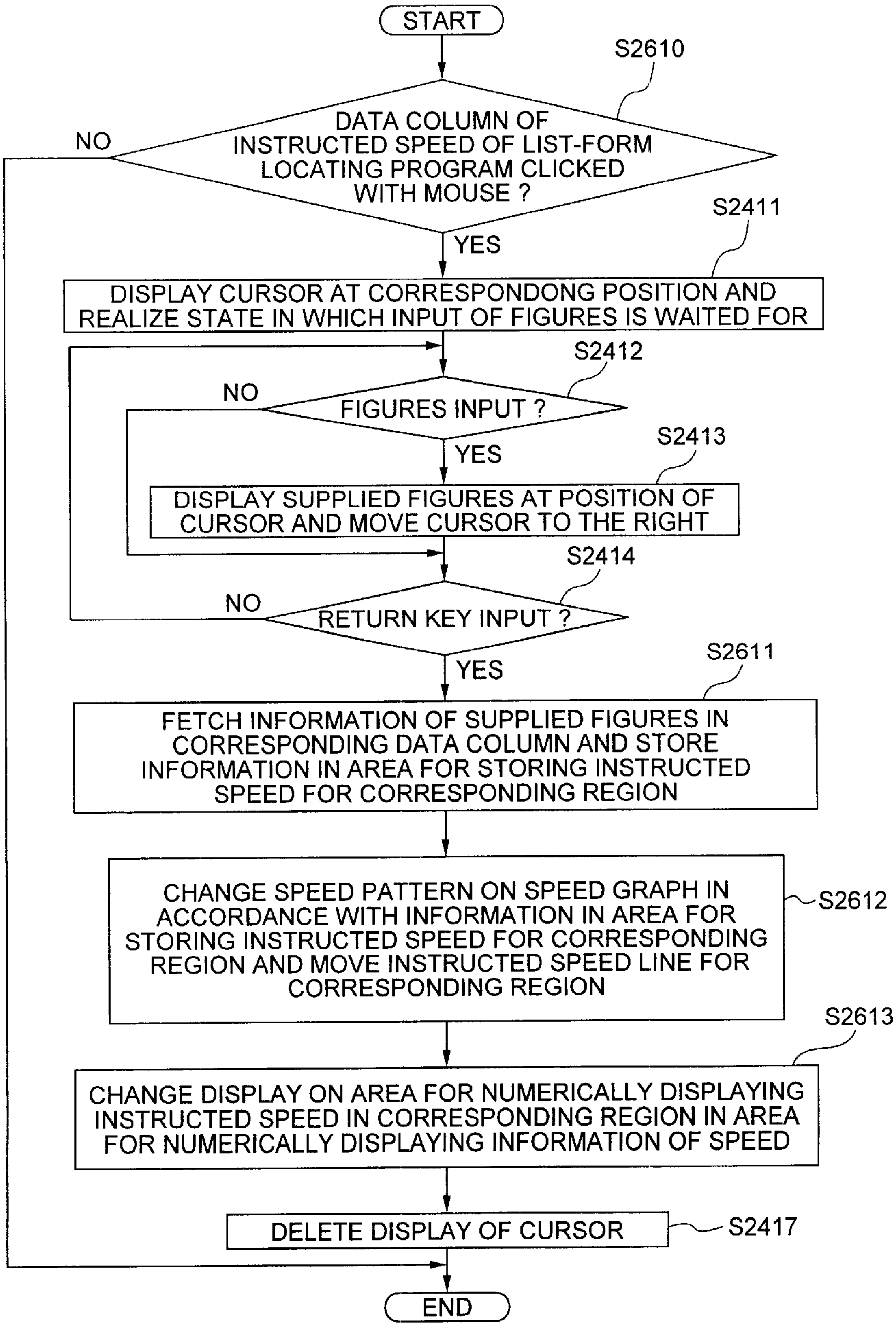

The operation for changing the List-form locating program while displaying the speed graph will now be described with reference to a flow chart shown in FIG. 127. When an instructed speed data column of the list-form locating program display area 430 is clicked with the mouse (step S2610), the cursor 440 is displayed at the clicked position so that a state in which input of figures is waited for is realized (step S2411). When figures have been supplied (step S2412), supplied figures are displayed at the position of the cursor 440. Then, the cursor is moved to the right for a distance corresponding to one character (step S2413). The processes insteps S2412 and S2413 are performed until the return key is depressed. When the return key has been depressed (step S2414), information of supplied figures in the corresponding data column is stored in the region-instructed-speed storage area 239 (step S2611).

In accordance with information in the region-instructed-speed storage area 239, the speed pattern 214 on the speed graph is changed. Moreover, the instructed speed line 205 in the corresponding region is moved (step S2612). Moreover, display in the instructed speed figure display area 215 in the corresponding region in the speed-information-value display area 203 is updated (step S2613). Then, the cursor is deleted (step S2417). Thus, setting and changing of the program by using a list is ended.

The above-mentioned location programming apparatus enables the change in the speed pattern when speed data in the list-form locating program has been changed to simultaneously be understood.

Figure 128:
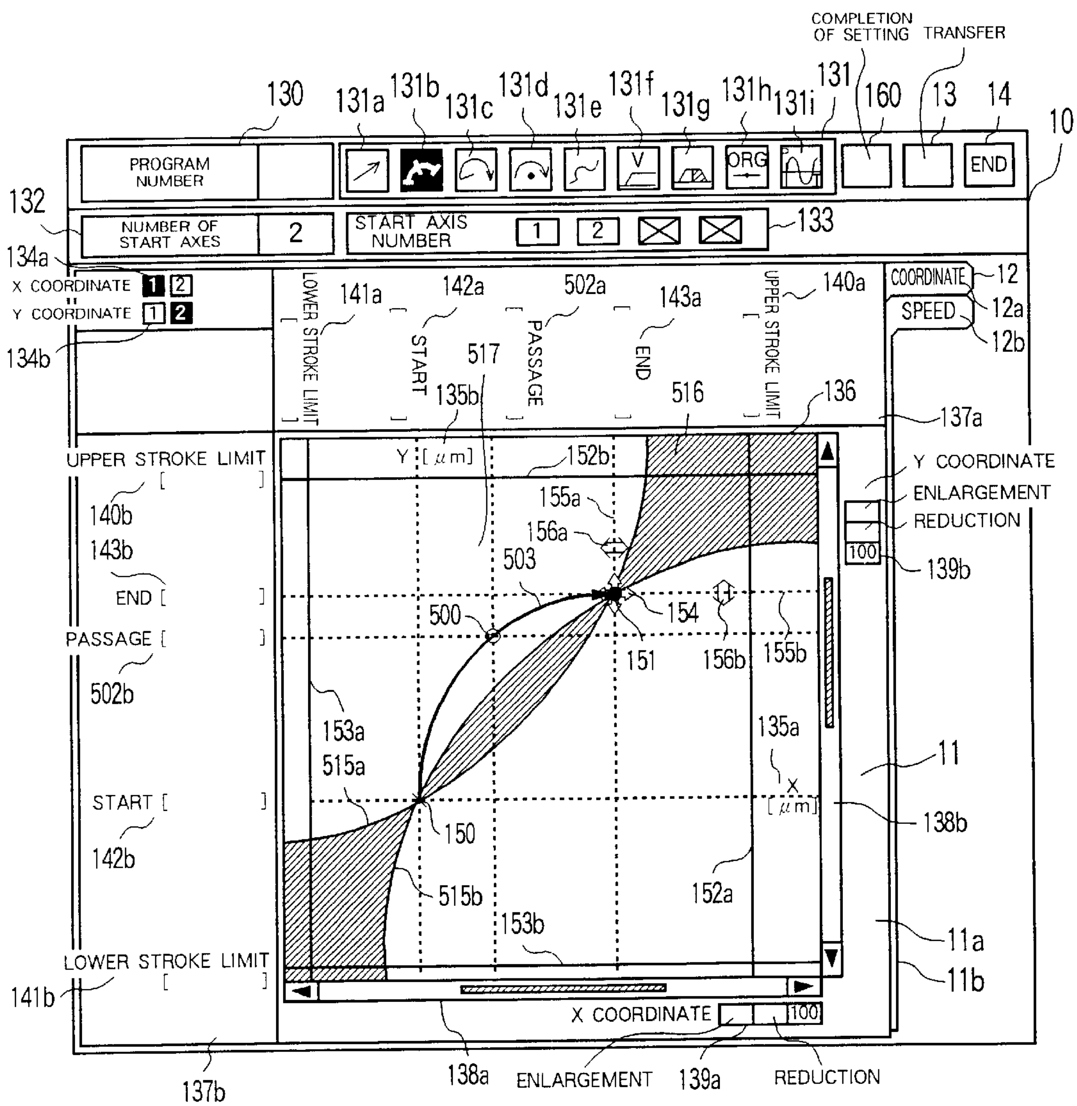

34. Display of Range in Which Passing Points in Circular Interpolation can be Set When Passing-Point Instructed Circular Interpolation is Performed The operation for displaying a range in which the passing point for circular interpolation can be set and a range in which setting is inhibited on the coordinate graph when the locating programming for a passing-point-instructed circular interpolation is performed by using the coordinate graph described when the passing-point-instructed circular interpolation using the coordinate graph has been described will now be described with reference to FIGS. 128 to 130. FIG. 128 shows an example of a window which is displayed when the passing-point-instructed circular interpolation is performed. The operation for the passing-point-instructed circular interpolation using the coordinate graph is performed to perform programming for the passing-point-instructed circular interpolation. Referring to the drawings, reference numerals 515*a* and 515*b* represent setting-range-displaying circle showing setting-range-permissive of the circular-interpolation passing point 500 which are two circles each of which passes through the location start point 150 and the location end point 151 and each of which has a maximum circular arc radius which can be circular-interpolation-controlled by a locating controller 1001. Reference numeral 516 represents a region in which setting of a passing point is inhibited because the circular arc radius exceeds the maximum circular arc radius which can be circular-interpolation-controlled by the locating controller 1001 if the circular-interpolation passing point 500 is set. The range in which the outer regions of the setting-range-displaying circles 515*a* and 515*b* overlap and the range in which the inner regions overlap the above-mentioned region. In this description, the region is indicated with diagonal lines on the coordinate-graph making/display area 136 so as to be distinguished from the other regions. Reference numeral 517 represents a passing-point-setting-permissible region which can be circular-interpolation-controlled by the locating controller 1001, the region being a region on the outside the region 516 in which setting of a passing point is inhibited on the coordinate-graph making/display area 136.

Figure 130:
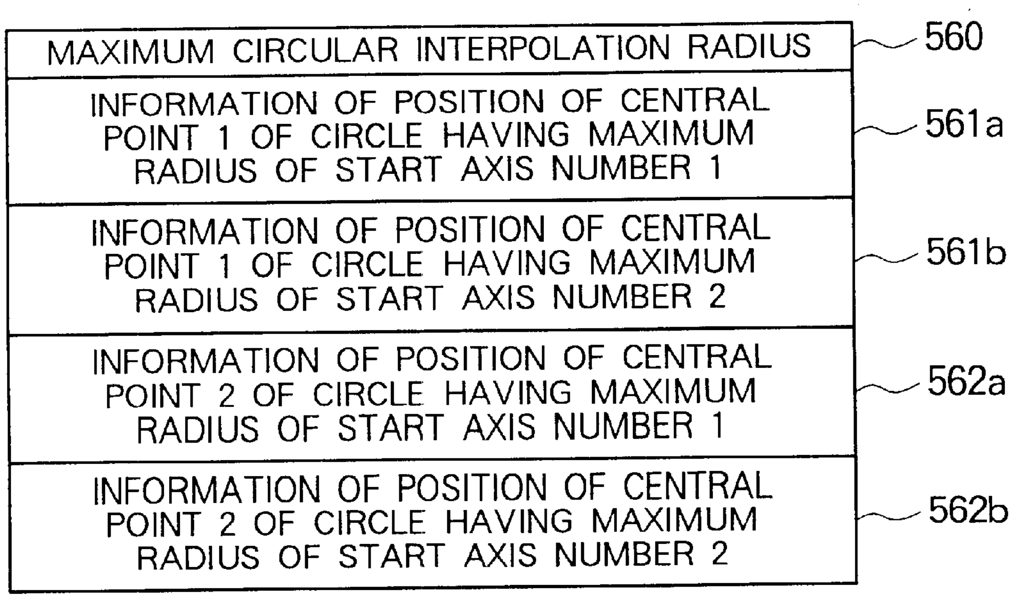

FIG. 130 shows a circular-interpolation-type-setting-range-information storage area 558 of the graphic programming work memory 4 which is composed of a maximum circular interpolation radius storage area 560, areas 561*a*, 561*b*, 562*a* and 562*b* for storing information of the positions of central points 1 and 2 for the circular interpolation of the start axis number when the locating programming for the passing-point-instructed circular interpolation or the radius-instructed circular interpolation is performed.

Figure 129:
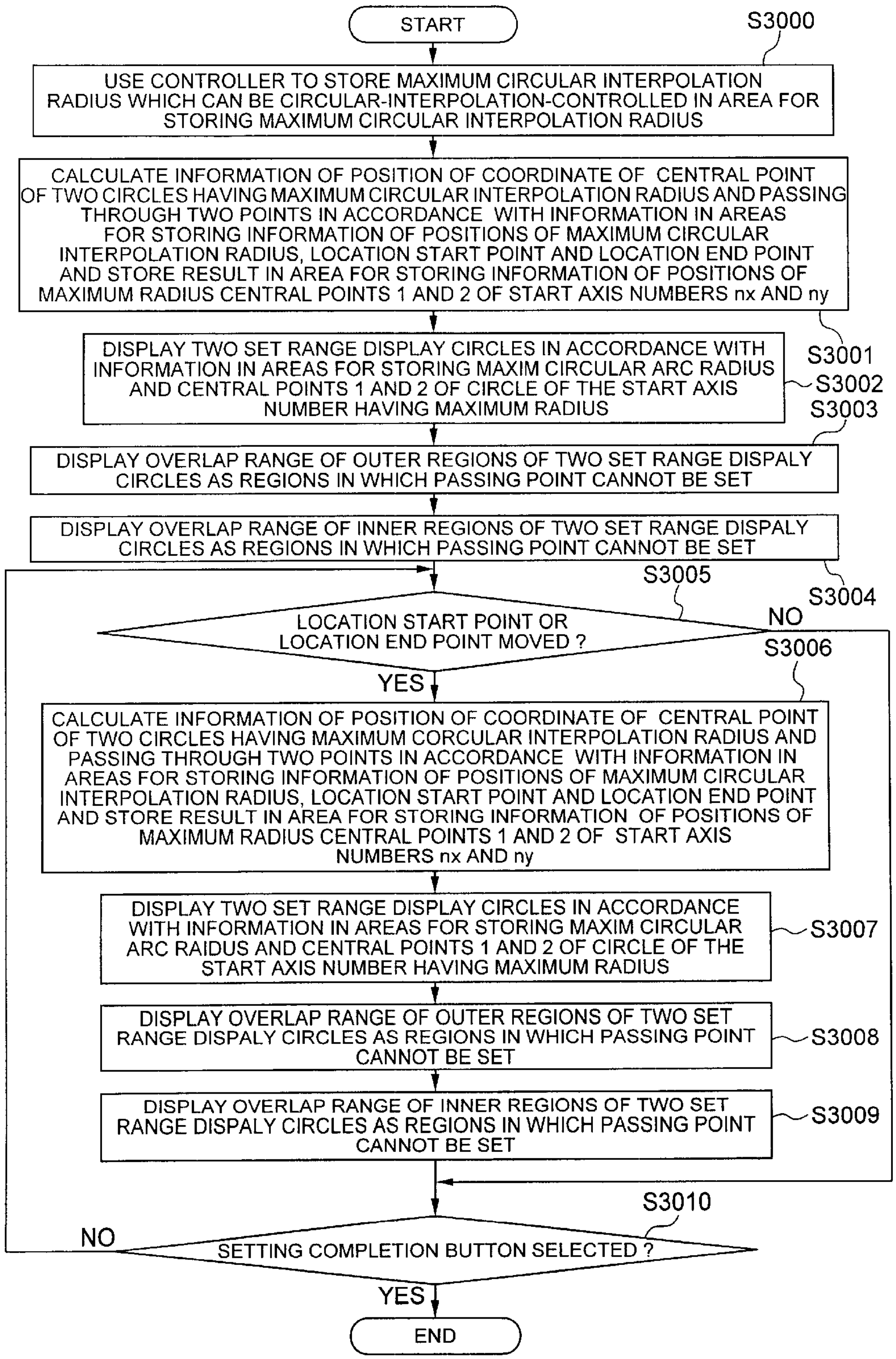

The operation for displaying, on the coordinate graph, the circular interpolation passing point setting permissible range and setting inhibited range when locating programming for the passing-point-instructed circular interpolation is performed will now be described with reference to a flow chart shown in FIG. 129. Initially, the maximum circular interpolation radius which can be circular-interpolation-controlled by the locating controller 1001 is stored in the maximum circular interpolation radius storage area 560 (step S3000). In accordance with information in the areas 560, 127*a*, 127*b*, 122*a* and 122*b* for storing information of the positions of the maximum circular interpolation radius, location start point and location end point, position information of the coordinates of the two central points of the circles passing through the location start point 150 and the location end point 151 and having the maximum circular interpolation radius are calculated in step S3001. Obtained information is stored in the areas 561*a*, 561*b*, 562*a* and 562*b* for storing central points 1 and 2 of the circles having the maximum radius of the start axis numbers nx and ny. In step S3002 the two setting-range-displaying circles 515*a* and 515*b* are displayed in accordance with information in the areas 560, 561*a*, 561*b*, 562*a* and 562*b* for storing information of the positions of the maximum circular arc radius, the central points 1 and 2 of the circles having the maximum radius of the start axis number. In step S3003 the overlap range in the outer region of the two setting-range-displaying circles 515*a* and 515*b* is displayed with diagonal lines as the region 516 in which setting of a passing point is inhibited. In step S3004 the overlap range in the inner portion of the two setting-range-displaying circles 515*a* and 515*b* is displayed with diagonal lines as the region 516 in which setting of a passing point is inhibited.

When the location start point 150 or the location end point 151 has been moved because of the mouse dragging operation described in locating programming by using coordinate graph (step S3005), the operation proceeds to step S3006. If the movement is not performed, the operation proceeds to step S3010. In step S3006 position information of coordinates of the two central points of the circles passing through the location start point 150 and the location end point 151 and having the maximum circular interpolation radius is calculated in accordance with information in the areas 560, 127*a*, 127*b*, 122*a* and 122*b* for storing information of the positions of the maximum circular interpolation radius, location start point and the location end point. Obtained information is stored in the areas 561*a*, 561*b*, 562*a* and 562*b* for storing information of the positions of the central points 1 and 2 of the circles having the maximum radius of the start axis numbers nx and ny. In step S3007 the two setting-range-displaying circles 515*a* and 515*b* are updated in accordance with information in the areas 560, 561*a*, 561*b*, 562*a* and 562*b* for storing information of the positions of the maximum circular arc radius and the central points 1 and 2. In step S3008 the overlap range of the outer regions of the two setting-range-displaying circles 515*a* and 515*b* is displayed with diagonal lines as the region 516 in which setting of a passing point is inhibited. In step S3009 the overlap range of the inner regions of the two setting-range-displaying circles 515*a* and 515*b* is displayed with diagonal lines as the region 516 in which setting of a passing point is inhibited. The operation returns to step S3005 until the setting completion button 160 is selected. When the setting completion button 160 has been selected (step S3010), the operation is ended.

The above-mentioned structure is arranged in such a manner that the setting permissible range and the setting inhibited range for the circular interpolation passing point are simply displayed on the coordinate graph. When movement of the circular interpolation passing point into the setting inhibited range is inhibited, undesirable making of a circular interpolation program which cannot be circular-interpolation-controlled by the locating controller 1001 can be prevented.

The above-mentioned structure is arranged in such a manner that the setting permissible range and the setting inhibited range for the circular interpolation passing point are always displayed on the coordinate graph. When an error message is made when the circular interpolation passing point exists in the setting inhibited range in a case where the setting completion button 160 has been selected, undesirable making of a circular interpolation program which cannot be circular-interpolation-controlled by the locating controller 1001 can be prevented.

The above-mentioned location programming apparatus enables a setting range which can be circular-interpolation-controlled by the locating controller to easily be confirmed when the locating program for the passing-point-instructed circular interpolation control is set and changed by using a locus graph.

Figure 131:
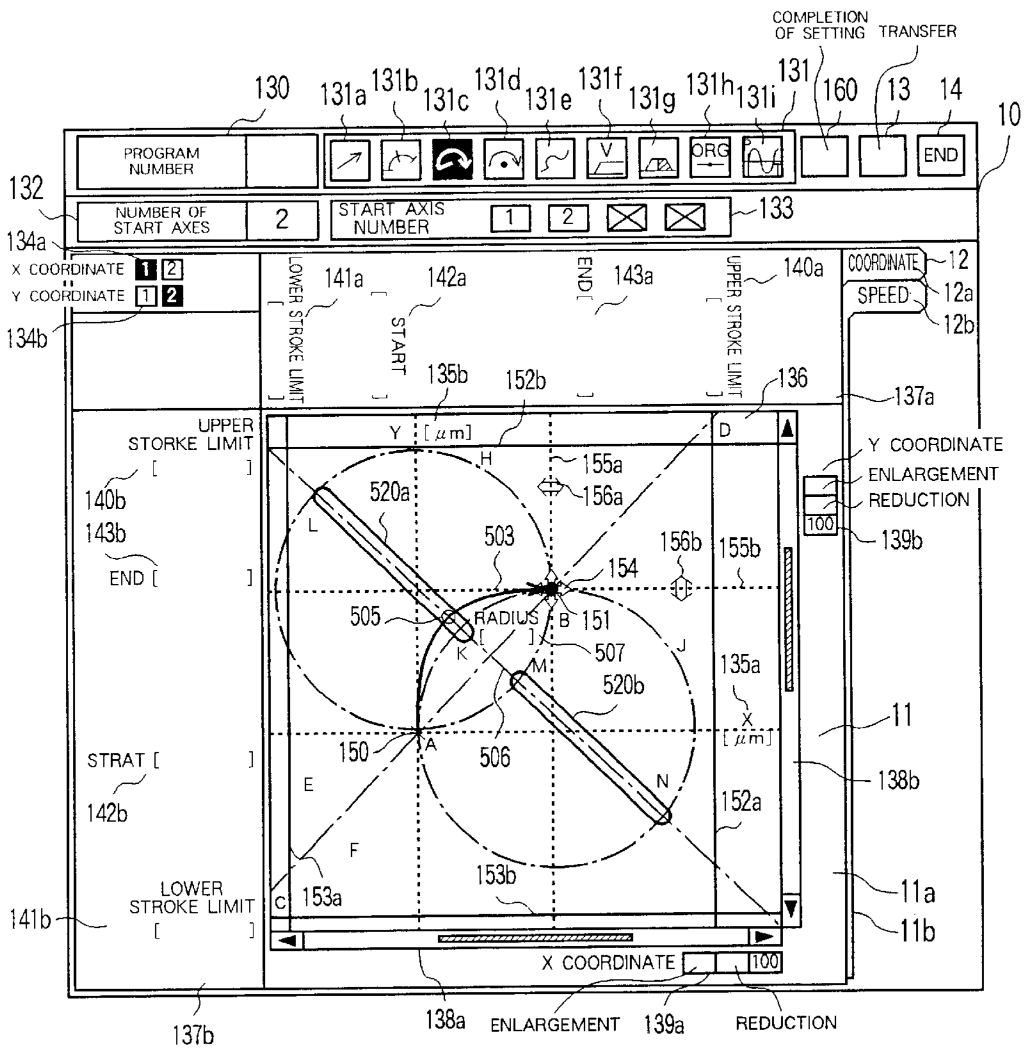

35. Display of Range in Which Radius-Instructed Points can be Set When Radius-Instructed Circular Interpolation is Performed The operation for displaying a range in which the passing point for radius-instructed circular interpolation can be set on the coordinate graph when the locating programming for a radius-instructed circular interpolation is performed by using the coordinate graph described when locating programming of the radius-instructed circular interpolation is performed by using the coordinate graph will now be described with reference to FIGS. 131 and 132. FIG. 131 shows an example of a window which is displayed when the radius-instructed circular interpolation is performed. The operation for the radius-instructed circular interpolation using the coordinate graph is performed to perform programming for the radius-instructed circular interpolation. Referring to the drawings, an alternate long and short dash line and symbols A to N are auxiliary lines and symbols for the description and they are not displayed on the window. Circles H and J are two circles each of which passes through the location start point 150 and the location end point 151 and each of which has a maximum circular arc radius which can be circular-interpolation-controlled by a locating controller 1001. Each circle intersects a perpendicular bisector of a straight line connecting the location start point 150 and the location end point 151 to each other at points K, L, M and N. Reference numeral 520*a* and 250*b* represent radius instructing point setting range gauges for indicating a range in which the radius instructing point can be set, the gauges being displayed on straight lines KL and MN, respectively.

Figure 132:
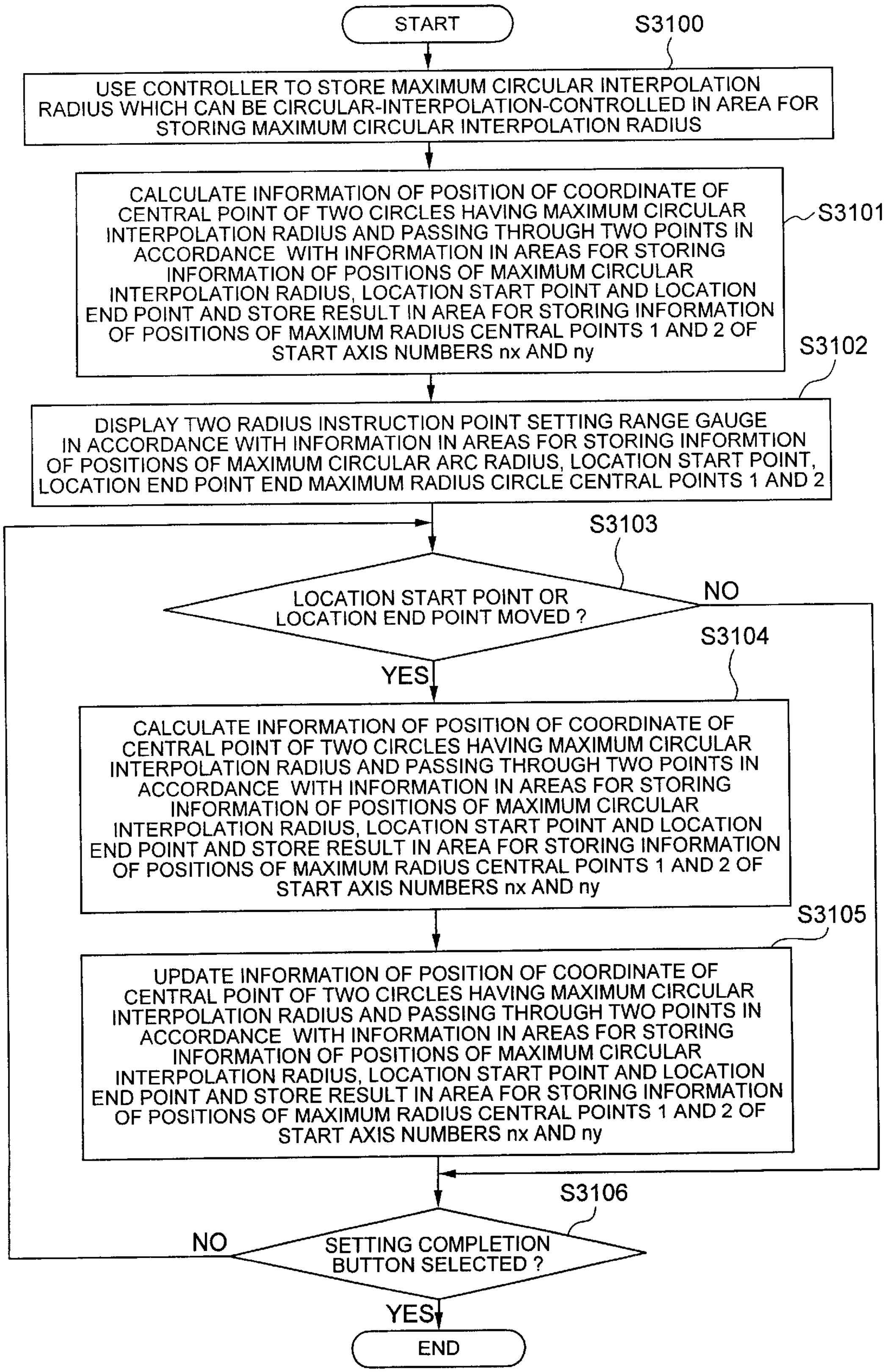

The operation for displaying, on the coordinate graph, a range in which the circular arc radius instructing point can be set when locating programming for the radius-instructed circular interpolation is performed will now be described with reference to a flow chart shown in FIG. 132. Initially, the maximum circular interpolation radius which can be circular-interpolation-controlled by the locating controller 1001 is stored in the maximum circular interpolation radius storage area 560 (step S3100). In accordance with information in the areas 560, 127*a*, 127*b*, 122*a* and 122*b* for storing information of the positions of the maximum circular interpolation radius, location start point and location end point, position information of the coordinates of the two central points of the circles passing through the location start point 150 and the location end point 151 and having the maximum circular interpolation radius are calculated in step S3101. Obtained information is stored in the areas 561*a*, 561*b*, 562*a* and 562*b* for storing central points 1 and 2 of the circles having the maximum radius of the start axis numbers nx and ny. In step S3102 position information of the coordinates of the points K, L, M and N is calculated in accordance with information in the areas 560, 127*a*, 127*b*, 122*a*, 122*b*, 561*a*, 561*b*, 562*a* and 562*b* for storing information of the positions of the maximum circular arc radius, the location start point and the location end point of the start axis number and the central points 1 and 2 of the circles having the maximum radius of the start axis number. Then, the two radius instruction point setting range gauges 520*a* and 520*b* are displayed on the straight lines KL and MN.

When the location start point 150 or the location end point 151 has been moved because of the mouse dragging operation described in locating programming by using coordinate graph (step S3103), the operation proceeds to step S3104. If the movement is not performed, the operation proceeds to step S3106. In step S3104 position information of coordinates of the two central points of the circles passing through the location start point 150 and the location end point 151 and having the maximum circular interpolation radius is calculated in accordance with information in the areas 560, 127*a*, 127*b*, 122*a* and 122*b* for storing information of the positions of the maximum circular interpolation radius, location start point and the location end point. Obtained information is stored in the areas 561*a*, 561*b*, 562*a* and 562*b* for storing information of the positions of the central points 1 and 2 of the circles having the maximum radius of the start axis numbers nx and ny. In step S3105 position information of the coordinate of the points K, L, M and N is calculated in accordance with information in the areas 560, 127*a*, 127*b*, 122*a*, 122*b*, 561*a*, 561*b*, 562*a* and 562*b* for storing information of the positions of the maximum circular arc radius and the central points 1 and 2. Thus, the two radius instruction point setting range gauges 520*a* and 520*b* are displayed on the straight lines KL and MN. The operation returns to step S3103 until the setting completion button 160 is selected. When the setting completion button 160 has been selected (step S3106), the operation is ended.

The above-mentioned structure is arranged in such a manner that the setting permissible range for the circular-arc radius instructing point is displayed on the coordinate graph. When movement of the circular-arc instructing point to the outside of the setting permissible range, undesirable making of a circular interpolation program which cannot be circular-interpolation-controlled by the locating controller 1001 can be prevented.

The above-mentioned structure is arranged in such a manner that the setting permissible range for the circular-arc instructing point is always displayed on the coordinate graph. When an error message is made when the circular-arc instructing point is on the outside of the setting permissible range in a case where the setting completion button 160 has been selected, undesirable making of a circular interpolation program which cannot be circular-interpolation-controlled by the locating controller 1001 can be prevented.

The above-mentioned location programming apparatus enables a setting range which can be circular-interpolation-controlled by the locating controller to easily be confirmed when the locating program for the radius-instructed circular interpolation control is set and changed by using a locus graph.

Figure 133:
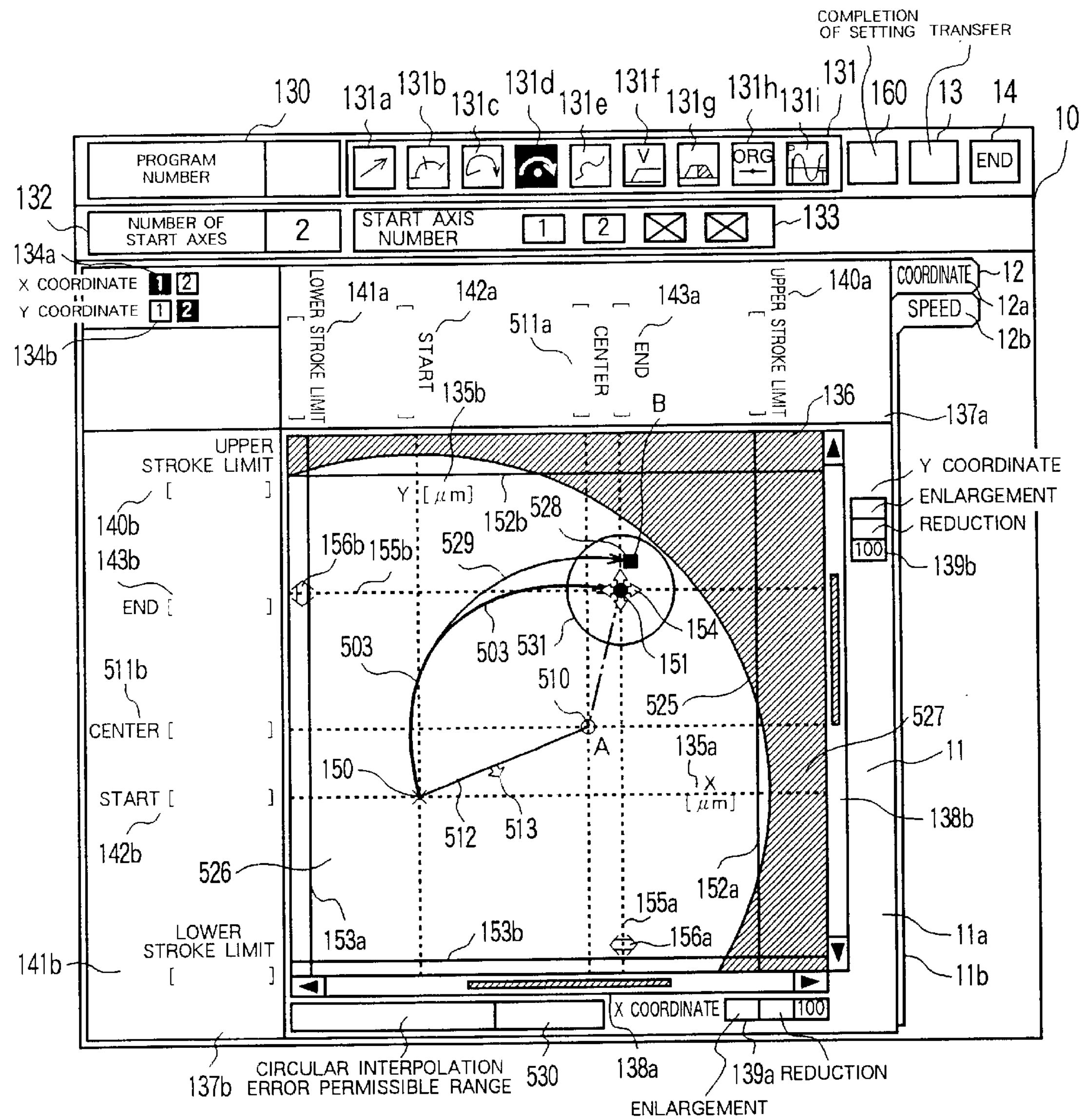

36. Display of Range in Which Central Point of Circular Arc can be set When Central-Point-Instructed Circular Interpolation is Performed The operation for displaying, on the coordinate graph for use to perform the central-point-instructed circular interpolation, a range in which the central point of a circular arc can be set and a range in which a permissible error range for circular interpolation when locating programming for the central-point-instructed circular interpolation is performed will now be described with reference to FIGS. 133 and 135. FIG. 133 shows an example of a window which is displayed when the central-point-instructed circular interpolation is performed. The operation for performing the central-point-instructed circular interpolation by using the coordinate graph is performed so that programming of the central-point-instructed circular interpolation is performed. Referring to the drawing, an alternate long and short dash line and symbols A and B are an auxiliary line and symbols for the description and they are not displayed on the window. A straight line AB is a straight line passing through the circular interpolation central point 510 and the location end point 151. Reference numeral 525 represents a central-point setting display circle which shows setting-range-permissive which of the location start point 150 and a circle having a maximum circular interpolation radius which can be circular-interpolation-controlled by the locating controller 1001 having the center which is the location start point 150. Reference numeral 526 represents a region which can be circular-interpolation-controlled by the locating controller 1001 and in which the central point of the circular arc can be set, the region being on the inside of the central-point setting display circle 525. Reference numeral 527 represents a region in which the central point cannot be set because the circular arc radius exceeds a maximum circular arc radius which can be circular-interpolation-controlled by the locating controller 1001 if the circular interpolation central point 510 is set, the region being the outer region of the central-point setting display circle 525. In this description, it is displayed with diagonal lines on the coordinate-graph making/display area 136 so as to be distinguished from the other regions. Reference numeral 528 represents a location end point calculated from the location start point 150 and the circular interpolation central point 510, the location end point being located on an intersection between a circle calculated from the location start point 150 and the circular interpolation central point 510 and the straight line AB. Reference numeral 529 represents a circular arc graph, the center of which is the circular interpolation central point 510, and which connects the location start point 150 and the calculated location end point 528. Reference numeral 530 represents a range in which an error in the circular interpolation is permitted between the set location end point 151 and the calculated location end point 528. Reference numeral 531 represents a circle for displaying the range in which the error in the circular interpolation is permitted, the circle having the center which is the location end point and which displays, on the coordinate-graph making/display area 136, the range in which the error in the circular interpolation is permitted.

Figure 135:
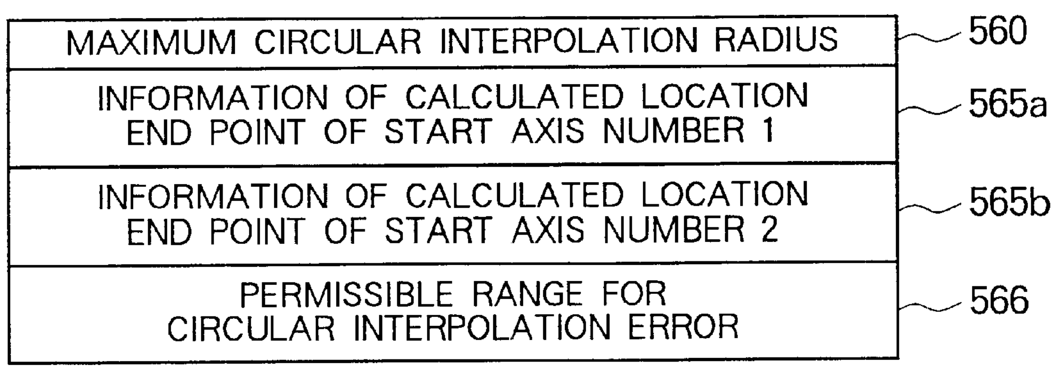

FIG. 135 shows the circular-interpolation-type-setting-range-information storage area 558 of the graphic programming work memory 4, the area 558 being composed of a maximum circular interpolation radius storage area 560, the location-end-point position information storage areas 565*a* and 565*b* and an area 566 for storing the range in which an error in the circular interpolation is permitted when locating programming for the central-point-instructed circular interpolation is performed.

Figure 134:
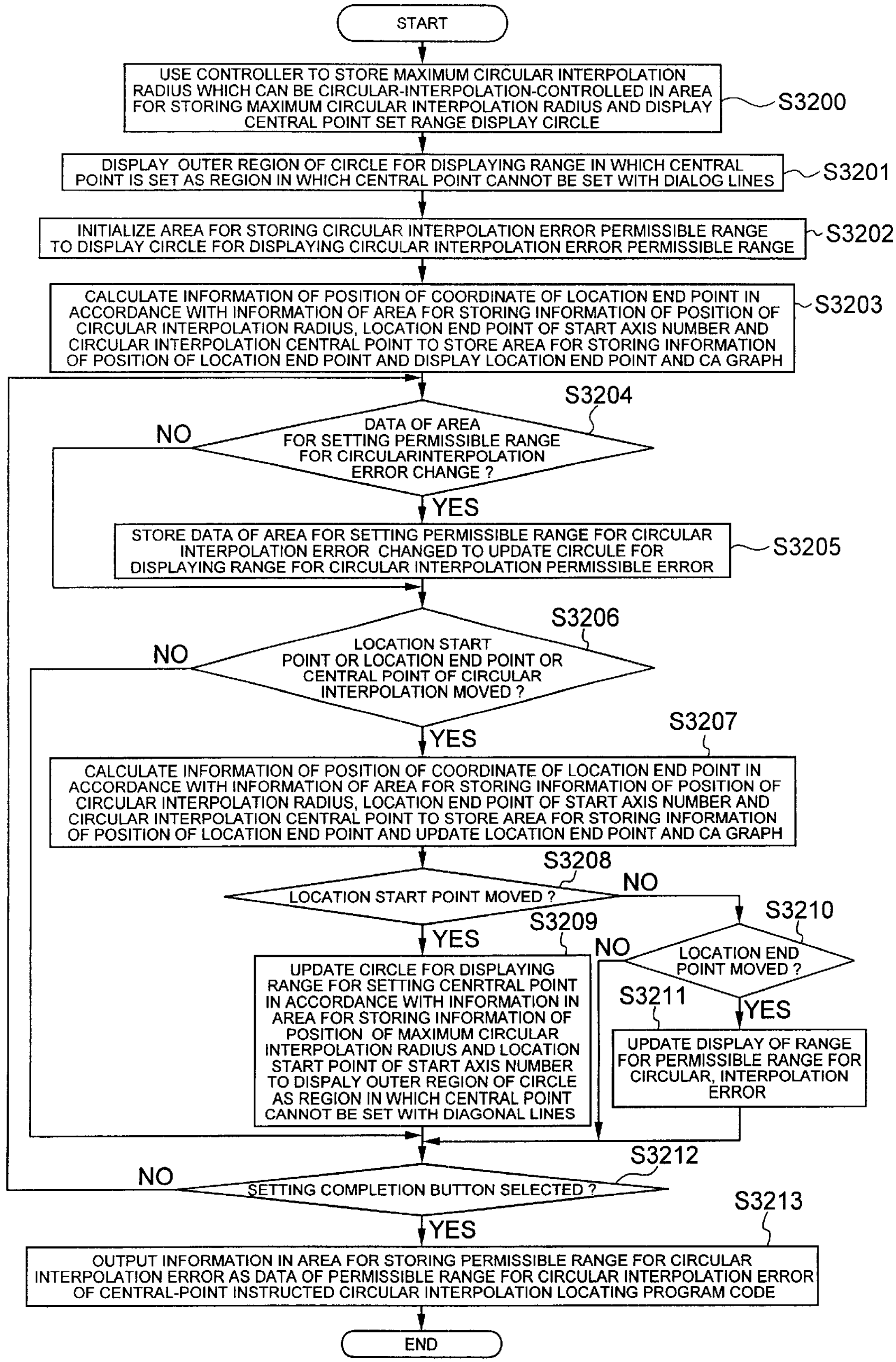

The operation for displaying, on the coordinate graph, the range in which the circular arc central point can be set, the range in which it cannot be set and the range in which an error in the circular interpolation is permitted will now be described with reference to a flow chart shown in FIG. 134. Initially, a maximum circular interpolation radius which can be circular-interpolation-controlled by the locating controller 1001 is stored in the maximum circular interpolation radius storage area 560. In accordance with information in the areas 127*a* and 127*b* for storing information of the positions of the location start points and the maximum circular interpolation radius storage area 560, the central-point setting display circle 525 is displayed, the center of which is the location start point 150 (step S3200). In step S3201 the outer region of the central-point setting display circle 525 is displayed with diagonal lines as a region 527 in which the central point cannot be set. In step S3202 the area 566 for storing the range in which an error in the circular interpolation is permitted is initialized so that a circle 531 for displaying a range in which an error in the circular interpolation is permitted is displayed, the center of which is the location end point 151. In accordance with information in the areas 550, 122*a*, 122*b*, 551*a* and 551*b* for storing information of the positions of the circular interpolation radius, the location end point and the central point of the circular interpolation of the start axis number, information of the position of the location end point 529 is calculated in step S3203 so as to be stored in the location-end-point position information storage areas 565*a* and 565*b*. Moreover, the calculated location end point 528 and the calculated circular arc graph 529 are displayed.

If data in the area 530 for setting an error in the circular interpolation is changed (step S3204), data in the area 530 for setting an error in the circular interpolation is stored in the area 566 for storing the range in which an error in the circular interpolation is permitted in step S3205. Thus, the circle 531 for displaying a range in which an error in the circular interpolation is permitted is updated. If data in the area 530 for setting an error in the circular interpolation is not changed in step S3204, the operation proceeds to step S3206.

If the location start point 150 or the location end point 151 or the circular interpolation central point 510 is moved in step S3206, information of the position of the calculated location end point 529 is calculated in step S3207 in accordance with information in the areas 550, 122*a*, 122*b*, 551*a* and 551*b* for storing information of the positions of the circular interpolation radius, the location end point and the central point of the circular interpolation of the start axis number. Obtained information is stored in the location-end-point position information storage areas 565*a* and 565*b*. Moreover, the calculated location end point 528 and the calculated circular arc graph 529 are updated. If the location start point 150 has been moved (step S3208), the central-point setting display circle 525 is updated in accordance with information in the areas 560, 127*a* and 127*b* for storing information of the positions of the maximum circular interpolation radius and the location start point of the start axis number (step S3209). The outer region of the circle is displayed with diagonal lines as the 527 in which the central point cannot be set. If no point has been moved in step S3206, the operation proceeds to step S3212. If the location start point 150 has not been moved in step S3208, the operation proceeds to step S3210. If the location end point 151 has been moved in step S3210, the circle 531 for displaying a range in which an error in the circular interpolation is permitted is updated (step S3211). Then, the operation proceeds to step S3212. If the location end point 151 has not been moved in step S3210, the operation proceeds to step S3212.

The operation returns to step S3204 until the setting completion button 160 is selected. When the setting completion button 160 has been selected (step S3212), information in the area 566 for storing the range in which an error in the circular interpolation is permitted stored in the graphic programming work memory 4 is outputted as data 2501 of the range in which the circular interpolation error is permitted of the central-point-instructed circular interpolation locating program code (step S3213).

The above-mentioned structure is arranged in such a manner that only the range in which the central point of the circular arc can be set and the range in which setting is inhibited are displayed on the coordinate graph. When movement of the central point of the circular arc to the outside of the setting permissible range is inhibited, making of a circular interpolation program which cannot be circular-interpolation-controlled by the locating controller 1001 can be prevented.

The above-mentioned structure is arranged in such a manner that only the range in which the error in the circular interpolation is permitted is displayed on the coordinate graph. When movement of the central point of the circular arc or the location end point in such a manner that the circular interpolation error is on the outside of the range in which the error in the circular interpolation is permitted is limited, making of a circular interpolation program which cannot be circular-interpolation-controlled by the controller 1001 can be prevented.

The above-mentioned structure is arranged in such a manner that the range in which the central point of the circular arc can be set and the range in which the error in the circular interpolation is permitted are always displayed on the coordinate graph. When an error message is outputted when the central point of the circular arc does not satisfy the setting permissible range or the error in the circular interpolation does not satisfy the range in which the error in the circular interpolation is permitted in a case where the setting completion button 160 has been selected, making of a circular interpolation program which cannot be circular-interpolation-controlled by the controller 1001 can be prevented.

The above-mentioned location programming apparatus enables a setting range which can be circular-interpolation-controlled by the locating controller to easily be confirmed when the locating program for the central-point-instructed circular interpolation control is set and changed by the locus graph.

37. Selection of Reference Axis by Instructing Speed of Reference Axis

The operation for selecting a reference axis in such a manner that the speed of the reference axis is instructed will now be described with reference to FIGS. 69, 136 and 137. FIG. 136 shows a dialogue displayed on the window for selecting a reference axis in such a manner that the speed of the reference axis is instructed. Reference numeral 595 represents a dialogue for setting the reference axis, 596*a*, 596*b* and 596*c* represent reference-axis selection buttons for selecting a reference axis with the mouse and 597 represents a reference-axis determining button.

The operation for selecting a reference axis in such a manner that the speed of the reference axis is instructed will now be described with reference to a flow chart shown in FIG. 137. When any one of the speed instruction method selection buttons 201*a* to 201*c* shown in FIG. 69 in such a manner that the speed of the reference axis is instructed has been selected (step S3300), the reference-axis setting dialogue 595 and the reference-axis determining button 597 shown in FIG. 136 are displayed. Then, the reference-axis selection button 596 of the axis number stored in the start-axis-number setting area 133 by the number corresponding to the number of the axes stored in the number 82 of start axes of the common-information storage area 70 of the graphic programming work memory 4 is displayed (step S3301). A reference to position information in the locating-start-point-position-information storage area and the locating-end-point-position-information storage area 122 and 127 of the start axis number is made. Then, symbol is displayed on the reference-axis selection button 596 of the start axis number, the amount of movement of which is zero (step S3302). FIG. 136 shows a case in which the amount of movement of the start axis number 2 is zero. When the reference-axis selection button 596 has been selected (step S3303), the selected reference-axis selection button 596 is inversely displayed (step S3304). Moreover, the corresponding start axis number is stored in the speed-instruction-method storage area 238. If the reference-axis selection button 596 has not been selected in step S3303, the operation proceeds to step S3305. The operation returns to step S3303 until the reference-axis selection button 597 is selected in step S3305. When the reference-axis determining button 597 has been selected, display of the reference-axis determining button 597 is ended (step S3306).

The above-mentioned structure is arranged in such a manner that only the start axis number, the amount of movement of which is zero is displayed on the reference-axis selection button. When selection of the reference-axis selection button corresponding to the start axis number, the movement of which is zero is inhibited, undesirable setting of a start axis number, the amount of movement of which is zero, to be the reference axis can be prevented.

The above-mentioned location programming apparatus is able to prevent undesirable setting of a reference axis with which start cannot be performed by the locating controller because the amount of movement of the reference axis is zero.

38. Locating Programming for Speed/Position Switching Control Using Speed Graph The operation for performing locating programming for controlling switching of the speed and position by using a speed graph will now be described with reference to FIGS. 138 to 143. FIG. 138 shows an example of a window for controlling switching of the speed and the position. Reference numeral 535 represents a speed/position switching point cursor capable of dividing the speed-graph making and displaying area 204 into a speed control region and a position control region. Moreover, when a mouse dragging operation has been performed, a speed/position switching arrow pointer 536 is displayed. When the cursor is moved to the right or left, the amount of movement after the position control has been switched can be changed. A position at which dragging has been suspended is the determined position. Reference numeral 537 represents movement amount display after the position control has been switched in such a manner that the amount of movement after the position control has been switched is displayed with diagonal lines to correspond to the area on the speed graph. Reference numeral 538 represents a movement amount figure display area after the position control has been switched. Reference numeral 539 represents an overrun point cursor for displaying, on the speed graph, a point at which overrun takes place even if the deviation is zero if the speed/position switching point cursor is set to the right. Reference numeral 540 represents a deceleration distance display area. Reference numeral 541 represents a permissible deviation display area for numerically displaying maximum deviation for preventing overrunning when the controller has controlled switching between speed and the position. Reference numeral 542*a* and 542*b* represent movement direction buttons for setting the movement direction to the forward direction or the reverse direction. Reference numeral 543 represents a position-control-unit setting button for setting the position control unit. Upper and lower stroke limits are displayed by upper and lower stroke limit cursors 544 and 545 and upper and lower stroke limit display areas 546 and 547.

FIG. 143 shows the locating-program-speed-information storage area 221 of the graphic programming work memory 4. When locating programming for the speed and position switching control is performed, the locating-program-speed-information storage area 221 is composed of the instructed speed storage area 239 for the region 1, the movement-amount storage area 570, the movement direction storage area 571, the deceleration distance storage area 572 and the permissible deviation storage area 573.

The operation for changing position control unit and the upper and lower stroke limits will now be described with reference to a flow chart shown in FIG. 139. Initially, start axis number is set for the start-axis-number setting area 133 (step S3441). When the position control unit is changed (step S3442), the position-control-unit setting button 543 is selected (step S3443). When the unit is not changed, the operation proceeds to step S3444. When the upper stroke limit is changed (step S3444), the upper stroke limit cursor 545 is moved by dragging the mouse (step S3445). When the lower stroke limit is changed (step S3446), the lower stroke limit cursor 544 is moved by dragging the mouse (step S3447). When setting is furthermore changed in step S3458, the operation returns to step S3442. When setting has been completed, the setting completion button 160 is selected (step S3459) and the operation is ended.

The operation for changing the position control unit and the upper and lower stroke limits will now be described with reference to a flow chart shown in FIG. 140. Initially, 1 is stored in the number 82 of start axes of the common-information storage area 70 of the graphic programming work memory 4 (step S3470). The start axis number set for the start-axis-number setting area 133 is stored in the area 83*a* for storing start axis number 1. The position control unit and upper and lower stroke limits of the corresponding start axis number are read from the storage areas 1701, 1705 and 1706 of the axis parameter memory to each of the storage areas 111*a*, 112*a* and 113*a* of the graphic programming work memory 4 (step S3471). Moreover, the corresponding position-control-unit setting button 543 is inversely displayed (step S3472). Moreover, the upper and lower stroke limit cursors 544 and 545 and the upper and lower stroke limit display areas 546 and 547 are displayed. When the position-control-unit setting button 543 has been selected (step S3473), the selected button is inversely displayed. The corresponding position control unit is stored in the position-control-unit reading area 111*a* of the start axis number 1 (step S3474). When the upper and lower stroke limit cursors 544 and 545 have been moved (steps S3475 and S3477), position information corresponding to the coordinate of each cursor is stored in the upper and lower stroke limit storage areas 112*a* and 113*a* of the start axis number 1 and displayed on the upper and lower stroke limit display areas 547 547 (steps S3476 and S3478). The operation returns to step S3473 until the setting completion button 160 is selected in step S3479. When the setting completion button 160 has been selected, areas 82 and 83*a* for storing the number of axes and the start axis number 1 of the graphic programming work memory 4 are stored in the areas 2103 and 2104*a* for storing the number of interpolation axes and the start axis number 1 of the speed/position control program code (step S3480). Then, information in the position-control-unit reading area 111*a* of the start axis number 1 of the graphic programming work memory 4 and the upper and lower stroke limit storage areas 112*a* and 113*a* of the start axis number 1 are stored in the areas 1701, 1705 and 1706 of the parameter memory for storing the position control unit and upper and lower stroke limits (step S3481).

The operation for changing the instructed speed, the acceleration/deceleration parameter number, dowel time, M code speed and limited torque will now be described. The speed of the speed control region which is on the left side of the position switching point cursor 53 is, on the speed-graph making and displaying area 204, set by the operation for setting and changing the limited speed by using the speed graph and stored in the region-instructed-speed storage area 239 for the region 1. The acceleration/deceleration parameter number is set in the acceleration/deceleration control-parameter number setting area 200 by the operation for setting and changing the limited speed by using the speed graph and stored in the acceleration/deceleration parameter number storage area 230. The dowel time is set by the operation for setting and changing the dowel time by using the speed graph and stored in the dwell-time storage area 295. The M code and the limited torque in the speed control region and the position control region are set by the operation for setting and changing the limited torque and stored in the area 296*p*1, 297*p*1, 296*p*2 and 297*p*2 for storing M code and limited torque for the regions 1 and 2.

The operation for changing the movement direction and the speed/position switching point will now be described with reference to a flow chart shown in FIG. 141. When the movement direction is changed (step S3400), the operation proceeds to step S3401. When the movement direction is the forward direction, the forward movement direction button 542*a* is selected (step S3402). When the movement direction is the reverse direction, the reverse movement direction button 542*b* is selected (step S3403). If the movement direction is not changed in step S3400, the operation proceeds to step S3404. When the amount of movement after the position control has been switched is changed in step S3404, the operation proceeds to step S3405. The speed/position switching point cursor 535 is dragged with the mouse so that the speed/position switching arrow pointer 536 is displayed which is moved to an arbitrary position on the speed graph. The operation returns to step S3405 until the amount of movement after the position control has been switched in step S3406. After the amount has been determined, mouse dragging is suspended (step S3407). If the amount of movement after the position control has been switched is not changed in step S3404, the operation proceeds to step S3408. When the speed/position switching control is furthermore set, the operation returns to step S3400. When change has been completed (step S3408), the setting completion button 160 is selected (step S3409). Then, the operation is ended.

The operation for changing the speed/position switching point cursor 535 will now be described with reference to a flow chart shown in FIG. 142. Initially, the area 570 and 571 for storing the amount of movement and the movement direction after the position control has been switched are initialized. In accordance with the initial values, the speed/position switching point cursor 535 is displayed, and the movement amount display 537 after the position control has been switched is displayed with diagonal lines. Display on the movement-amount display area 538 after the position control has been switched and the movement direction button 542 are inversely displayed (step S3421). In step S3422 a deceleration distance is calculated in step S3422 similarly to setting and change of the deceleration time by using the speed graph. In accordance with the following Equation 3400, a permissible deviation is calculated so as to be stored in the deceleration distance and permissible deviation storage areas 572 and 573. Moreover, the areas 540 and 541 for displaying the deceleration distance and permissible deviation are displayed.

(permissible deviation)=(amount of movement after position control has been switched)−(deceleration distance)   Equation 3400

When the forward movement direction button has been selected (step S3423), "forward direction" is stored in the movement direction storage area (step S3425). When the reverse movement direction button has been selected (step S3424), "reverse direction" is stored (step S3426). When the speed/position switching point cursor 535 is dragged with the mouse in step S3427, the speed/position switching arrow pointer 536 is displayed. Moreover, the speed/position switching point cursor 535 is moved to follow the mouse pointer (step S3428). In step S3429 the amount of movement is calculated after the position control has been switched so as to be stored in the movement-amount storage area 570 after the position control has been switched. The movement amount display 537 after the position control has been switched is displayed with diagonal lines and the movement amount display area 538 after the position control has been switched are updated. In step S3430 the deceleration distance and the permissible deviation are calculated so as to be stored in the areas 572 and 573 for storing the deceleration distance and the permissible deviation. Thus, the areas 540 and 541 for displaying the deceleration distance and the permissible deviation are updated. If the speed/position switching point cursor is not dragged with the mouse in step S3427, the operation proceeds to step S3432.

Finally, steps S3428 to S3430 are repeated until mouse dragging is suspended in step S3431. When mouse dragging has been suspended, the operation proceeds to step S3432. The operation returns to step S3423 until the setting completion button 160 is selected in step S3432. When the setting completion button 160 has been selected, the operation proceeds to step S3433. Thus, information in the areas 239, 570 and 571 for storing instructed speed in the region 1, the amount of movement and the movement direction after the position control has been switched is outputted as data in the areas 2200, 2800 and 2701 for storing the instructed speed of the speed/position switching control position program code, the movement amount and the movement direction after the position control has been switched. Moreover In step S3434 information in the areas 230, 295, 296*p*1, 297*p*1, 296*p*2 and 297*p*2 for storing acceleration/deceleration control parameter number, dowel time, M code for the region 1, limited torque for the region 1, M code for the region 2 and limited torque for the region 2 is output as data of the areas 2107, 2204, 2202, 2203, 2801 and 2802 for storing the acceleration/deceleration control parameter number of the speed/position switching control position locating position control, dowel time, M code, limited torque, M code after the position control has been switched and limited torque after the position control has been switched. Thus, INC is stored in the area for storing position instruction method, and then the operation is ended.

The above-mentioned structure is arranged in such a manner that the point at which overrunning takes place even if the deviation is zero is simply displayed on the speed graph. If movement of the speed/position switching point cursor to the region which causes overrunning to take place is inhibited, making of a speed/position switching control program which causes overrunning to take place with the locating controller 1001 can be prevented.

The above-mentioned structure is arranged in such a manner that the point at which overrunning takes place is always displayed on the speed graph. When an error message is outputted when a speed/position switching point cursor is located in the region in which overrunning takes place when the setting completion button 160 has been selected, making of a speed/position switching control program which causes overrunning to take place with the locating controller 1001 can be prevented.

The above-mentioned structure is arranged in such a manner that only the figures of the permissible deviation which is the maximum deviation with which overrunning can be prevented when the speed/position switching control is performed by the controller is simply displayed. If a deviation when the speed/position switching control has been performed by the locating controller 1001 is previously set and an error message is outputted when the permissible deviation is smaller than the predetermined value, making of a speed/position switching control program which causes overrunning to take place can be prevented.

The above-mentioned location programming apparatus enables the speed/position switching control locating program to easily be set and changed by using the speed graph. Moreover, a set range which prevents overrunning with the locating controller can easily be confirmed on the speed graph.

39. Programming of Dog-Method Returning to Original Point Using Speed Graph

The operation for performing programming for returning to an original point by a dog method by using a speed graph will now be described with reference to FIGS. 144 and 147. FIG. 144 shows an example of a window which is displayed when the dog method returning to the original point is performed. Symbols A to D are auxiliary symbols for the description and they are omitted from display. Reference numeral 580 represents an original-point-returning-method setting button, 581 represents an original-point-returning-speed cursor, 582 represents an original-point-returning-speed display area, 583 represents a creep-speed cursor for changing the creep speed by mouse dragging and 584 represents a creep speed display area. Reference numeral 585 represents a required-dog-length display area for displaying the near dog length required to decelerate the original-point returning speed to the creep speed, 586 represents an original-point address setting area, 587 represents an original point returning speed pattern for graphically displaying the speed pattern when returning to the original point is performed and 589 represents a near dog graph for graphically displaying input timing of a near dog signal.

FIG. 147 shows a locating-program-speed-information storage area 221 of the graphic programming work memory 4 and which is composed of a original point returning method storage area 574, an original point address storage area 575, an original point returning speed storage area 576, a creep speed storage area 577, an area 578 for storing a set movement amount after the DOG signal has been turned on and a required DOG length storage area 579 when the program for returning to the original point is performed.

The number of start axes and the start axis number are stored in the areas 82 and 83*a* for storing the number of start axes and the start axis number 1 of the graphic programming work memory 4 by the operation for setting and changing the limited speed by using the speed graph. When the setting completion button 160 has been selected, they are outputted to the storage areas 2103 and 2104*a* as the number of interpolation axes and the start axis number 1 of the original point returning program code. The position control unit and the upper and lower stroke limits are changed by the operation for performing the locating programming by using the list-form locating program while displaying the coordinate graph. When the setting completion button 160 has been selected, they are outputted to the areas 1701, 1705 and 1706 for storing the process unit and upper and lower stroke limits of the parameter memory. The acceleration/deceleration parameter number is stored in the acceleration/deceleration parameter number storage area 230 of the graphic programming work memory 4 by the operation for setting and changing the limited speed by using the speed graph. The movement direction is stored in the movement direction storage area 571 of the graphic programming work memory 4 by the operation for performing locating programming for the speed/position switching control. When the setting completion button 160 has been selected, it is outputted to original point returning parameter memory in the direction in which returning to the original point is performed.

The operation for selecting the method of returning to the original point will now be described. When the dog method has been selected by the original-point returning-method selection button 580 shown in FIG. 144, a window for returning to the original point by the dog method is displayed. Moreover, the "dog method" is stored in the original-point returning-method storage area 1901. When the count method has been selected, a window for returning to the original point by the count method is displayed. Moreover, the "count method" is stored in the original-point returning-method storage area 1901. When the setting completion button 160 has been selected, it is outputted to the original-point returning method storage area of the original-point returning parameter memory.

The operation for changing the original-point returning speed, the creep speed and original-point returning address will now be described with reference to a flow chart shown in FIG. 145. When the original-point returning speed is changed (step S3500), the original-point returning speed cursor 581 is dragged with the mouse so as to be moved vertically (step S3501). After the original-point returning speed has been determined (step S3502), mouse dragging is suspended (step S3503). If the original-point returning speed is not changed in step S3500, the operation proceeds to step S3504. When the creep speed is changed (step S3504), the creep-speed cursor 583 is dragged with the mouse so as to be moved vertically (step S3505). When the creep speed has been determined (step S3506), mouse dragging is suspended (step S3507). If the original-point returning speed is not changed in step S3504, the operation proceeds to step S3508. When the address of the original point is changed (step S3508), the address of the original point in the original-point address setting area 586 is changed (step S3509). If the address of the original point is not changed in step S3508, the operation proceeds to step S3510. The operation returns to step S3500 until the setting of the dog-method returning to the original point is completed in step S3510. When setting has been completed, the setting completion button 160 is selected (step S3511). Then, the operation is ended.

The operation for changing the original-point returning speed, the creep speed and the original-point returning address will now be described with reference to a flow chart shown in FIG. 146. Initially, information in the areas 1903, 1904 and 1905 for storing the address of the original point, the original-point returning speed and the creep speed corresponding to the start axis in the area 83*a* for storing start axis number 1 of the original-point returning parameter memory is read to the corresponding storage areas 575, 576 and 577 of the graphic programming work memory 4 (step S3520). Moreover, display of the original-point address setting area 586, the original-point returning-speed display area 582, the creep-speed display area 584, the original-point returning-speed cursor 581, the creep-speed cursor 583, the original-point returning-speed pattern 587 and the near-dog graph 589 is performed (step S3521). A required length of the dog is calculated which corresponds to the area of the trapezoid ABCD so as to be stored in the required DOG-length storage area 579 and displayed on the required near dog display area 585 (step S3522).

When the original-point returning-speed cursor 581 has been moved in step S3523, the original-point returning speed corresponding to the coordinate position of the original-point returning-speed cursor 581 is stored in the original-point returning-speed storage area 576 and displayed on original-point returning-speed display area 582 (step S3524). A requited length of the dog corresponding to the area of the trapezoid ABCD is calculated so as to be stored in the required DOG-length storage area 579 and displayed on the required near dog display area 585 (step S3525). If the original-point returning-speed cursor 581 has not been moved in step S3523, the operation proceeds to step S3526.

When the creep-speed cursor 583 has been moved in step S3526, the creep speed corresponding to the coordinate position of the creep-speed cursor 583 is stored in the creep-speed storage area 577 and displayed on the creep-speed display area 584 (step S3527). Moreover, a required length of the dog corresponding to the area of the trapezoid ABCD is calculated so as to be stored in the required DOG-length storage area 579 and displayed on the required near dog display area 585 (step S3528). If the creep-speed cursor 583 has not been moved in step S3526, the operation proceeds to step S3529.

When the address of the original point in the original-point address setting area 586 has been changed in step S3529, the address of the original point in the original-point address setting area 586 is stored in the original-point-address storage area 575 (step S3530). If the address is not changed, the operation proceeds to step S3531.

The operation returns to step S3523 until the setting completion button 160 is selected in step S3531. When the setting completion button 160 has been selected, information in the areas 575, 576 and 577 for storing the address of the original point, the original-point returning speed and the creep speed of the graphic programming work memory 4 is outputted to the storage areas 1903, 1904 and 1905 of the original-point returning parameter memory corresponding to the start axis of the area 83*a* for storing start axis number 1 (step S3532).

The above-mentioned structure is arranged in such a manner that only the length of the dog required to prevent overrunning when returning to the original point by the dog method by the locating controller 1001 is displayed with figures. If the dog length of the machine is previously set and an error message is outputted when the required dog length is smaller than the predetermined length, making an original-point returning parameter which causes overrunning to take place can be prevented.

The above-mentioned location programming apparatus enables a program for returning to the original point by the dog method to easily be set and changed. Therefore, a required length of the dog with which overrunning with the locating controller can easily be confirmed.

40. Programming of Count-Method Returning to Original Point Using Speed Graph The operation for performing programming for returning to the original point by a count method by using a speed graph will now be described with reference to FIGS. 148 to 150. FIG. 148 shows an example of a window which is displayed when returning to the original point by the count method is performed. Symbols A to F are auxiliary symbols for description and they are not displayed on the window. Reference numeral 590 represents a movement amount cursor after near DOG has been turned on for changing the movement amount after near DOG has been turned on when dragged with mouse to be moved to the right or left, 591 represents a movement amount pointer after near DOG has been turned on which is displayed when the movement amount cursor 590 after near DOG has been turned on is dragged with the mouse and 592 represents a movement amount display after near DOG has been turned on for displaying the movement amount after near DOG has been turned on with diagonal lines to correspond to the area on the speed graph. Reference numeral 593 represents a movement amount displaying area after near DOG has been turned on, 594 represents an overrun point cursor for indicating a point with which overrunning takes place in the count-method original-point returning when the movement amount cursor 590 after near DOG has been turned on is moved to the left.

The operation for changing the movement amount after near DOG has been turned on will now be described with reference to a flow chart shown in FIG. 149. When the movement amount after near DOG has been turned on is changed (step S3601), the movement-amount cursor 590 after the near DOG has been turned on is dragged with the mouse so that the movement-amount arrow pointer 591 after the near DOG has been turned on is displayed so as to be moved to the right or left (step S3602). After the movement amount after near DOG has been turned on has been determined (step S3603), mouse dragging is suspended (step S3604). When the movement amount after near DOG has been turned on is not changed in step S3601, the operation proceeds to step S3605. The operation returns to step S3601 until setting of the count-method returning to the original point is completed. When setting has been completed (step S3606), the setting completion button 160 is selected and the operation is ended.

The operation for changing the movement amount after near DOG has been turned on will now be described with reference to a flow chart shown in FIG. 150. Initially, the set movement amount storage area 578 after near DOG has been turned on is initialized. Then, the movement-amount cursor 590 after the near DOG has been turned on, the movement-amount display 592 after the near DOG has been turned on and the movement-amount display area 593 after the near DOG has been turned on are displayed. Moreover, the movement-amount arrow pointer 591 after the near DOG has been turned on is displayed. The original-point returning overrun point cursor 594 is displayed as a vertical line which passes through a point at which deceleration to the creep speed is completed (step S3620). When the movement-amount cursor 590 after the near DOG has been turned on is dragged with the mouse (step S3621), the movement-amount arrow pointer 591 after the near DOG has been turned on is displayed. Moreover, the movement-amount cursor 590 after the near DOG has been turned on is moved to follow the mouse pointer so that the original-point returning-speed pattern 587 is updated (step S3622). The display of the movement-amount display 592 after the near DOG has been turned on with the diagonal lines is updated. The movement amount after near DOG has been turned on is calculated to correspond to the area of a polygon ABDCEF so as to be stored in the set movement amount storage area 578 after near DOG has been turned on. Thus, the movement-amount display area 593 after the near DOG has been turned on is updated (step S3623). The operation returns to step S3622 until mouse dragging is suspended in step S3624. When mouse dragging is suspended, the operation proceeds to step S3625. When the movement-amount cursor 590 after the near DOG has been turned on is not dragged in step S3621, the operation proceeds to step S3625. In step S3625 the operation returns to step S3621 until the setting completion button 160 is selected. When the setting completion button is selected, information in the set movement amount storage area 578 after near DOG has been turned on is outputted as data of the set movement amount storage area 1906 after near DOG has been turned on of the original-point returning parameter memory (step S3626).

The original-point returning method, the original-point returning speed, the creep speed and the original-point returning address are changed by the operation for performing programming for returning to the original point by the dog method by using the speed graph so as to be outputted to the original-point returning parameter memory 1900.

The above-mentioned structure is arranged in such a manner that only the region in which overrunning takes place when returning to the original point is performed by the count method is displayed on the speed graph. When movement of the movement cursor after near DOG has been turned on into the region which causes overrunning to take place is inhibited, setting of returning to the original point by the count method which causes overrunning to take place by the locating controller 1001 can be prevented.

The above-mentioned structure is arranged in such a manner that only the region in which overrunning takes place when returning to the original point is performed by the count method is displayed on the speed graph. When an error message is outputted when the movement amount cursor after near DOG has been turned on is positioned in the region in which overrunning takes place when the setting completion button 160 has been selected, setting of returning to the original point by the count method which causes overrunning to take place by the locating controller 1001 can be prevented.

The above-mentioned after near DOG has been turned on enables the program for returning to the original point by the count method by using a speed graph to easily be set and changed. The set range in which overrunning does not take place with the locating controller can easily be confirmed on the speed graph.

41. Programming of High Speed Oscillation Using

The operation for performing high-speed oscillation programming by using other-time-transition graph will now be described with reference to FIGS. 151 to 155. The high speed oscillation is control of one axis in such a manner that start at an instructed start angle is performed and a reciprocative motion is repeated with an instructed frequency and instructed amplitude in the form of a sine wave. FIG. 151 shows an example of the other-time-transition graph for performing programming of the high speed oscillation. Reference numeral 600 represents a start-angle instructing pointer, 601 represents a frequency pointer, 602 represents an amplitude pointer, 603 represents a start-angle display area, 604 represents a frequency display area, 605 represents an amplitude display area and 606 represents a time axis. FIG. 152 is a structural view showing the contents of the other-time-transition-graph storage area 73 shown in FIG. 2. Reference numeral 607 represents high speed oscillation program information and 608 represents window structure information. FIG. 153 is a structural view showing the contents of high speed oscillation program information 607 shown in FIG. 152. The start angle is stored in a start angle storage area 609, amplitude is stored in a amplitude storage area 610 and frequency is stored in the frequency storage area 611. FIG. 154 is a structural view showing the contents of window structure information 608 shown in FIG. 152. Reference numeral 612 represents a storage area on which time required for one cycle, that is, period is stored and 613 represents a storage area on which the position of the start angle on the time axis is stored.

A method of displaying an initial window of the other-time-transition graph for the high speed oscillation will now be described. Initial value 0 is stored in the start angle storage area 609 of the high speed oscillation program information 607, initial value a is stored in the amplitude storage area 610 and initial value f is stored in the frequency storage area 611. Time 612 required for one cycle of window structure information 608 is obtained from information in the frequency storage area 611 in accordance with the following Equation 4000 so as to be stored in the time storage area 612:

$$T=1/f \qquad \text{(Equation 4000)}$$

T: time required for one cycle f: frequency

The position 613 of the start angle on the time axis is obtained from time 612 required for one cycle and the start angle 609 in accordance with the following Equation 4001 so as to be stored in the position storage area 613.

$$ts=qs{\cdot}T/360 \qquad \text{(Equation 4001)}$$

ts: position of start angle on time axis qs: start angle [degree]

T: time required for one cycle

A sine wave as shown in FIG. 151 is drawn in the display area in accordance with time 612 required for one cycle and the amplitude 610. Since the initial value of the start angle is zero, the start angle pointer 600 is displayed at the position of time 0 in accordance with Equation 4001. The frequency instructing pointer 601 is displayed at a position advanced from position 613*ts* of the start angle on the time axis for time 612T required for one cycle on the time axis, that is, a position corresponding to time ts+T. The amplitude instructing pointer 602 is displayed to correspond to the degree of the amplitude 610. The start angle display area 603, the frequency display area 604 and the amplitude display area 605 display the start angle 609, the frequency 611 and the amplitude 610 of high speed oscillation program information 607.

A method of setting data for the high speed oscillation by using the other-time-transition graph will now be described with reference to a flow chart shown in FIG. 155. The amplitude is set by changing the amplitude by vertically moving the amplitude instructing pointer 602 by a dragging operation (step S4000). The position of the amplitude instructing pointer 602 at which the dragging operation has been suspended is the amplitude (step S4001) so as to be stored in the amplitude storage area 610 of high speed oscillation program information 607 and displayed in the amplitude display area 605 (step S4002). The frequency is set in such a manner that the frequency instructing pointer 601 is moved to the right or left by a dragging operation. The frequency is determined at the position at which the dragging operation has been suspended. In actual, the frequency is set in such a manner that the period of the sine wave is changed by dragging the frequency instructing pointer (step S4003). The difference in time from the position 613 of the start angle on the time axis to time indicated by the frequency instructing pointer 601 is time required for one cycle. Therefore, time 612 required for one cycle is instructed. Then, the instructed value is stored in the area 612 of window structure information 608 for storing time required for one cycle (step S4004). In accordance with the following Equation 4002 which is an inverse operation of Equation 4001, the frequency 611 is obtained (step S4005) so as to be stored in the frequency storage area 611 of high speed oscillation program information 607 and displayed on the frequency display area 604 (step S4006).

$$f=1/T \quad \text{(Equation 4002)}$$

T: time required for one cycle f: frequency

Then, the sine waveform is again drawn in accordance with the instructed amplitude 610 and time 612 required for one cycle (step S4007). The start angle 609 is set in such a manner that the start-angle instructing pointer is dragged to the right or left (step S4008). The position on the time axis at which the dragging operation has been suspended is stored in the position storage area 613 for storing the position of the start angle on the time ax (step S4009). It is apparent that the start angle can be obtained in accordance with the position of the start angle on the time axis in accordance with the following Equation 4003 which is the inverse operation of Equation 4002. Therefore, calculations are performed (step S4010). A result of the calculations is stored in the start angle storage area 609 of high speed oscillation program information 607 and displayed in the start angle display area 603 (step S4011).

$$qs=360ts/T \quad \text{(Equation 4003)}$$

ts: position of start angle on time axis qs: start angle [degree]

T: time required for one cycle

Then, display of the frequency instructing pointer 601 is modified to a position shifted from the position 613$t_s$ of the start angle on the time axis for a time 612T required for one cycle on the time axis, that is, a position on the time axis cursor to ts+T (step S4012). After setting has been completed, the operation is completed (step S4013).

The above-mentioned location programming apparatus enables programming for the high speed oscillation to graphically be performed. Therefore, programming can be performed while a user is conscious of the actual operation.

Second Embodiment

A location programming apparatus according to a second embodiment of the present invention will now be described with reference to FIGS. 156 to 162 and 164 to 167. FIG. 156 is a block diagram showing the system structure of a location programming apparatus and a locating controller according to the second embodiment of the present invention. The same reference numerals in the drawing represent the same or corresponding elements.

Referring to the drawings, reference numeral 1A represents a location programming apparatus (a peripheral unit) for performing programming and monitoring of a locating controller 1001. Reference numeral 2 represents a CPU for performing calculations of the location programming apparatus 1A. Reference numeral 3 represents a control S/W storage memory for storing S/W for controlling the location programming apparatus 1A. Reference numeral 4 represents a graphic programming work memory required to perform graphic programming and 5 represents a keyboard interface for inputting figures and characters to the location programming apparatus 1A.

When the conventional operation pattern shown in FIG. 195 is set with position data corresponding to transition time, a time transition graph shown in FIG. 157 is constructed. FIG. 158 is a flow chart of the operation for making a position data table in which sequential locating corresponds to transition time. Operation cycle time for performing sequential operations is set (step S4200). Then, arbitrary transition time (38*b* to 381) is set (step S4201). Then, position data (38*m* to 38*u*) corresponding to set transition time is set (step S4202). Information of the address operation of the position corresponding to transition time set in step S4201 and 4202 is temporarily restored in an internal memory (the graphic programming work memory 4). If setting for arbitrary transition time required for the setting operation has been completed, the operation proceeds to a next step. If setting has not been completed, the operation returns to step S4201. The operations in steps S4201 to S4203 are repeated until step S4203 is completed.

Then, speed and acceleration characteristics of transition time set in the step S4201 for each region is set (step S4204). If setting of the speed and acceleration characteristics for all regions has been completed, the operation proceeds to a next step (step S4205). If setting has not been completed, steps S4204 to S4205 are repeated until setting is completed. The speed and acceleration characteristic for each region set in step S4204 are temporarily restored in the graphic programming work memory 4. After setting has been completed, automatic generation of position data is performed (step S4206) so that a position data table is generated. The generated position data table is communicated to the locating controller 1001 and stored in the work memory 1007. The locating controller 1001 starts a predetermined program and makes a reference to the position data table so as to rotate the motor.

Referring to a flow chart shown in FIG. 164, a setting method in steps S4201 and S4202 will now be described. FIG. 166 is a setting window. A passing point (•) 50 of the address of the position corresponding to the transition time is dragged with the mouse so as to be moved to up, down, right or left so that a rough coordinate position is set (step S4270). Then, the fine-adjustment up, down, right and left movement pointer 51 is operated so that the position of (•) is adjusted (step S4271). Reference numeral 52 represents an area on which set cycle time is displayed, 53 represents an area on which the coordinate of the position of the cursor in the cycle time is displayed and 54 represents an area on which the coordinate of the position of the cursor at the address of the position is displayed. When mouse dragging is suspended, the point is determined. When double clicking has been performed, the passing point (a bent point) is stored in the graphic programming work memory 4 (steps S4273 and S4274). After processing of passing point data for one cycle has been completed, a button 55 for completing setting of a passing point is selected. Thus, generation is completed (step S4276). Thus, information shown in FIG. 160 is stored in the graphic programming work memory 4. If generation has not been completed, steps S4270 to S4275 are repeated until step S4275 is completed.

The setting operation which is performed in step S4204 to S4206 will now be described with reference to a flow chart shown in FIG. 165. A setting window is shown in FIG. 167. A transition time region (for example, 38*e* to 38*f*) which must be set is clicked with the mouse so as to be selected (step S4280). Then, the speed and acceleration characteristic (for example, constant acceleration 60) in the selected region are selected and set (step S4281). Whether or not setting for the set region has been completed is determined (step S4282). If setting has been completed, a next speed and acceleration characteristic setting completion button 61 is selected and the process is completed (step S4283). Thus, information shown in FIG. 161 is stored in the graphic programming work memory 4. If setting has not been completed, steps S4280 to S4282 are repeated until step S4282 is completed.

The process in step S4206 will now be described with reference to FIG. 159. One cycle time set in step S4200 is equally divided with an arbitrary resolution (when time for one cycle is divided into 1000, the resolution is 1000) (step S4230). Then, the amount of movement for each of arbitrary transition time periods set in step S4201 and the speed and acceleration characteristics set in step S4202 are used to calculate the amount of movement in each of the equally divided time periods (step S4231). In accordance with obtained amount of movement, position data is generated so as to be written on the position data table (step S4232). Whether or not generation of the position data table having position data for the resolution has been completed is determined (step S4233). If generation has been completed, the operation for generating the table is completed so that the position data table shown in FIG. 162 is stored in the graphic programming work memory 4. If generation has not been completed, steps S4231 to S4233 are repeated until step S4233 is completed.

The location programming apparatus 1A according to the second embodiment is arranged in such a manner that the timing chart for the sequential operations is generated. Therefore, the position data table is automatically generated and locating is performed in accordance with data in the Position data table. Therefore, the necessity of continuously executing the locating program can be eliminated and an additional sequence program is not required. Since position information is provided as the continuous position table data, any delay in the operation can be prevented.

Third Embodiment

A location programming apparatus according to a third embodiment of the present invention will now be described with reference to FIGS. 163, 168 and 169. The structure according to the third embodiment is similar to that according to the second embodiment.

FIG. 168 shows an example of a means for setting the operations of a plurality of axes each of which repeats a predetermined conventional operation as shown in FIG. 198. The apparatus according to this embodiment has a function capable of simultaneously setting operation timings of a plurality of axes on one window. The setting procedure will now be described with reference to a flow chart shown in FIG. 163. The number 62 of axes to be set shown in FIG. 168 is clicked so that the number of axes to be controlled is set (step S4250). Then, one-cycle-time setting 63 is clicked so that sequential operation time (one cycle time) of a subject which must be controlled is set (step S4200). After steps S4250 and S4200 have been completed, the window is switched to that shown in FIG. 169. Then, the axis number to be set is selected to set position data corresponding to the arbitrary transition time for each axis (if the first axis is selected, “first axis” 64 is selected). Then, the window is switched to that shown in FIG. 166 (step S4251). Then, the operations in step S4201 to S4206 are performed. Then, whether or not setting for the number of axes to be controlled which has been set in step S4250 has been completed is determined (step S4252). If setting has not been completed, steps S4251 to S4206 are repeated. When step S4252 has been completed, setting is completed.

The location programming apparatus 1A according to the third embodiment has the structure that the operation timing chart for each axis according to the second embodiment is converted into position table data for controlling one cycle of a plurality of axes. In accordance with data, position of each axis is controlled. Therefore, even if a plurality of axes are controlled, the necessity of generating sequences for administrating the positional relationship with the other axes and start timing can be eliminated. Moreover, delay of the operation of each axis can be prevented.

INDUSTRIAL APPLICABILITY

As described above, the location programming apparatus for generating operation control information including a locating control parameter and a locating program for a controller for controlling a motor for operating a subject which must be controlled, the location programming apparatus comprising: locating control type setting means for setting locating control type for controlling the operation of the subject which must be controlled; graphical data generating means for graphically generating graph data of the locating program on a work memory in accordance with the set locating control type; and operation control information generating means for generating operation control information on a parameter memory and a locating program memory in accordance with graph data stored in the work memory. Therefore, an effect can be obtained in that a locating program and locating control parameter can be generated by only graphically setting the locating locus operation, the speed pattern and time transition control.

As described above, the location programming apparatus according to the present invention has the structure that the graphical data generating means uses a coordinate graph in which a position control unit of the instructed axis which must be operated is made to be a unit of a coordinate axis and which indicates the position of the subject which must be controlled and a speed graph having a speed axis and a time axis to indicate change of the speed as time elapses so as to generate graph data. Therefore, an effect can be obtained in that the locating control operation can easily visually be understood for any user and time required to perform initial programming can significantly be shortened.

As described above, the location programming apparatus according to the present invention has the structure that the graphical data generating means uses a speed graph having a speed axis and a time axis to indicate change in the speed as time elapses so as to generate graph data. Therefore, an effect can be obtained in that the locating control operation can easily visually be understood for any user and time required to perform initial programming can significantly be shortened.

As described above, the location programming apparatus according to the present invention has the structure that the graphical data generating means uses a other-time-transition graph having an amplitude axis and a time axis to indicate change in the degree of reciprocating motion as time elapses and a speed graph having a speed axis and a time axis to indicate change in the speed as time elapses so as to generate graph data. Therefore, an effect can be obtained in that the locating control operation can easily visually be understood for any user and time required to perform initial programming can significantly be shortened.

As described above, the location programming apparatus according to the present invention has the structure that when the set locating control type is linear locating control, the graphical data generating means stores information generated on the coordinate graph and the speed graph in a predetermined area in the work memory, and the operation control information generating means generates a locating program and a parameter for the linear locating control as operation control information in accordance with information stored in the work memory. Therefore, an effect can be obtained in that the locating program for the linear control can easily be set and changed by using the locus graph.

As described above, the location programming apparatus according to the present invention has the structure that when the set locating control type is passing-point-instructed circular interpolation control, the graphical data generating means stores information generated on the coordinate graph and the speed graph in a predetermined area in the work memory, and the operation control information generating means generates a locating program and a parameter for the passing-point-instructed circular interpolation control as operation control information in accordance with information stored in the work memory. Therefore, an effect can be obtained in that the locating program for the passing-point-instructed circular interpolation control can easily be set and changed by using the locus graph.

As described above, the location programming apparatus according to the present invention has the structure that when the set locating control type is radius-instructed circular interpolation control, the graphical data generating means stores information generated on the coordinate graph and the speed graph in a predetermined area in the work memory, and the operation control information generating means generates a locating program and a parameter for the radius-instructed circular interpolation control as operation control information in accordance with information stored in the work memory. Therefore, an effect can be obtained in that the locating program for the radius-instructed circular interpolation control can easily be set and changed.

As described above, the location programming apparatus according to the present invention has the structure that when the set locating control type is central-point-instructed circular interpolation control, the graphical data generating means stores information generated on the coordinate graph and the speed graph in a predetermined area in the work memory, and the operation control information generating means generates a locating program and a parameter for the central-point-instructed circular interpolation control as operation control information in accordance with information stored in the work memory. Therefore, an effect can be obtained in that the locating program for the central-point-instructed circular interpolation control can easily be set and changed.

As described above, the location programming apparatus according to the present invention has the structure that when the set locating control type is locus control, the graphical data generating means stores information generated on the coordinate graph and the speed graph in a predetermined area in the work memory, and the operation control information generating means generates a locating program and a parameter for the locus control as operation control information in accordance with information stored in the work memory. Therefore, an effect can be obtained in that the locating program for the locus control can easily be set and changed.

As described above, the location programming apparatus according to the present invention has the structure that when the set locating control type is speed control, the graphical data generating means stores information generated on the coordinate graph and the speed graph in a predetermined area in the work memory, and the operation control information generating means generates a locating program and a parameter for the speed control as operation control information in accordance with information stored in the work memory. Therefore, an effect can be obtained in that the locating program can be generated by only graphically setting the instructed speed pattern for the operation.

As described above, the location programing apparatus according to the present invention has the structure that when the set locating control type is speed/position switching control, the graphical data generating means stores information generated on the coordinate graph and the speed graph in a predetermined area in the work memory, and the operation control information generating means generates a locating program and a parameter for the speed/position switching control as operation control information in accordance with information stored in the work memory. Therefore, an effect can be obtained in that the locus for the speed/position switching control can easily be set and changed by using the locus graph.

As described above, the location programming apparatus according to the present invention has the structure that when the set locating control type is original-point returning control, the graphical data generating means stores information generated on the coordinate graph and the speed graph in a predetermined area in the work memory, and the operation control information generating means generates a locating program and a parameter for the original-point returning control as operation control information in accordance with information stored in the work memory. Therefore, an effect can be obtained in that the locating program for the original-point returning control can easily be set and changed by using the locus graph.

As described above, the location programming apparatus according to the present invention has the structure that when the set locating control type is high-speed oscillation control, the graphical data generating means stores information generated on the coordinate graph and the speed graph in a predetermined area in the work memory, and the operation control information generating means generates a locating program and a parameter for the high-speed oscillation control as operation control information in accordance with information stored in the work memory. Therefore, an effect can be obtained in that the locating program for the high speed oscillation control can easily be set and changed by using the locus graph.

As described above, according to another aspect of the present invention, there is provided a location programming apparatus for generating operation control information for a controller for controlling a motor for operating a subject which must be controlled, the location programming apparatus comprising: graphical data generating means for generating, on a work memory, a position data table for a locating program having a time transition graph to graphically correspond to time transition; and means for transmitting the position data table stored in the work memory to the locating controller. Therefore, an effect can be obtained in that delay in the operation start can be prevented.

As described above, the location programming apparatus according to the present invention has the structure that the graphical data generating means generates a position data table for controlling one cycle of a plurality of axes corresponding to the set number of axes to be controlled. Therefore, even if a plurality of axes are controlled, the necessity of generating a sequence for administrating the positional relationship with other axes and start timing can be eliminated. Moreover, the problem in that the delay in the operation start of each axis can be prevented.

As described above, according to another aspect of the present invention, there is provided a location programming method for generating operation control information including a locating control parameter and a locating program for a controller for controlling a motor for operating a subject which must be controlled, the location programming method comprising: a step of setting locating control type for controlling the operation of the subject which must be controlled; a step of graphically generating graph data of the locating program on a work memory in accordance with the set locating control type; and a step of generating operation control information on a parameter memory and a locating program memory in accordance with graph data stored in the work memory. Therefore, the locating program and the locating control parameter can be generated by only graphically setting the locus operation for the locating, the speed pattern and time transition control.

As described above, the location programming method according to the present invention has the structure that the graphical data generating step uses a coordinate graph in which a position control unit of the instructed axis which must be operated is made to be a unit of a coordinate axis and which indicates the position of the subject which must be controlled and a speed graph having a speed axis and a time axis to indicate change of the speed as time elapses so as to generate graph data. Therefore, an effect can be obtained in that the control operation can easily visually be understood for any user and time required to perform initial programming can significantly be shortened.

As described above, the location programming method according to the present invention has the structure that the graphical data generating step uses a speed graph having a speed axis and a time axis to indicate change in the speed as time elapses so as to generate graph data. Therefore, an effect can be obtained in that the control operation can easily visually be understood for any user and time required to perform initial programming can significantly be shortened.

As described above, the location programming method according to the present invention has the structure that the graphical data generating step uses a other-time-transition graph having an amplitude axis and a time axis to indicate change in the degree of reciprocating motion as time elapses and a speed graph having a speed axis and a time axis to indicate change in the speed as time elapses so as to generate graph data. Therefore, an effect can be obtained in that the control operation can easily visually be understood for any user and time required to perform initial programming can significantly be shortened.

What is claimed is:

1. A location programming apparatus for generating operation control information including a locating control parameter and a locating program for a controller for controlling a motor for operating a subject which must be controlled, said location programming apparatus comprising:

locating control type setting means for setting locating control type based on input from a user for selecting one of a first process which interpolates axes, and at least a second process that does not require axes interpolation, for controlling the operation of the subject which must be controlled;

graphical data generating means for graphically generating graph data of the locating program on a work memory in accordance with the set locating control type; and operation control information generating means for generating operation control information on a parameter memory and a locating program memory in accordance with graph data stored in said work memory, wherein said graphical data generating means uses a coordinate graph in which a position control unit of the instructed axis which must be operated is made to be a unit of a coordinate axis and which indicates the position of the subject which must be controlled and a speed graph having a speed axis and a time axis to indicate change of the speed as time elapses so as to generate graph data.

2. A location programming apparatus according to claim 1, wherein when the set locating control type is radius-instructed circular interpolation control, said graphical data generating means stores information generated on said coordinate graph and said speed graph in a predetermined area in said work memory, and said operation control information generating means generates a locating program and a parameter for the radius-instructed circular interpolation control as operation control information in accordance with information stored in said work memory.

3. A location programming apparatus according to claim 1, wherein when the set locating control type is central-point-instructed circular interpolation control, said graphical data generating means stores information generated on said coordinate graph and said speed graph in a predetermined area in said work memory, and said operation control information generating means generates a locating program and a parameter for the central-point-instructed circular interpolation control as operation control information in accordance with information stored in said work memory.

4. A location programming apparatus according to claim 1, wherein when the set locating control type is locus control, said graphical data generating means stores information generated on said coordinate graph and said speed graph in a predetermined area in said work memory, and said operation control information generating means generates a locating program and a parameter for the locus control as operation control information in accordance with information stored in said work memory.

5. A location programming apparatus according to claim 1, wherein when the set locating control type is linear locating control, said graphical data generating means stores information generated on said coordinate graph and said speed graph in a predetermined area in said work memory, and said operation control information generating means generates a locating program and a parameter for the linear locating control as operation control information in accordance with information stored in said work memory.

6. A location programming apparatus according to claim 1, wherein when the set locating control type is passing-point-in-instructed circular interpolation control, said graphical data generating means stores information generated on said coordinate graph and said speed graph in a predetermined area in said work memory, and said operation control information generating means generates a locating program and a parameter for the passing-point-instructed circular interpolation control as operation control information in accordance with information stored in said work memory.

7. A location programming apparatus for generating operation control information including a locating control parameter and a locating program for a controller for controlling a motor for operating a subject which must be controlled, said location programming apparatus comprising:

locating control type setting means for setting locating control type based on input from a user for selecting one of a first process which interpolates axes, and at least a second process that does not require axes interpolation, for controlling the operation of the subject which must be controlled;

graphical data generating means for graphically generating graph data of the locating program on a work memory in accordance with the set locating control type; and operation control information generating means for generating operation control information on a parameter memory and a locating program memory in accordance with graph data stored in said work memory, wherein said graphical data generating means uses a speed graph having a speed axis and a time axis to indicate change in the speed as time elapses so as to generate graph data.

8. A location programming apparatus according to claim 7, wherein when the set locating control type is speed/position switching control, said graphical data generating means stores information generated on said coordinate graph and said speed graph in a predetermined area in said work memory, and said operation control information generating means generates a locating program and a parameter for the speed/position switching control as operation control information in accordance with information stored in said work memory.

9. A location programming apparatus according to claim 7, wherein when the set locating control type is original-point returning control, said graphical data generating means stores information generated on said coordinate graph and said speed graph in a predetermined area in said work memory, and said operation control information generating means generates a locating program and a parameter for the original-point returning control as operation control information in accordance with information stored in said work memory.

10. A location programming apparatus according to claim 7, wherein when the set locating control type is speed control, said graphical data generating means stores information generated on said coordinate graph and said speed graph in a predetermined area in said work memory, and said operation control information generating means generates a locating program and a parameter for the speed control as operation control information in accordance with information stored in said work memory.

11. A location programming apparatus for generating operation control information including a locating control parameter and a locating program for a controller for controlling a motor for operating a subject which must be controlled, said location programming apparatus comprising:

locating control type setting means for setting locating control type for controlling the operation of the subject which must be controlled;

graphical data generating means for graphically generating graph data of the locating program on a work memory in accordance with the set locating control type; and operation control information generating means for generating operation control information on a parameter memory and a locating program memory in accordance with graph data stored in said work memory, wherein said graphical data generating means uses a coordinate graph in which a position control unit of the instructed axis which must be operated is made to be a unit of a coordinate axis and which indicates the position of the subject which must be controlled and a speed graph having a speed axis and a time axis to indicate change of the speed as time elapses so as to generate graph data, wherein when the set locating control type is radius-instructed circular interpolation control, said graphical data generating means stores information generated on said coordinate graph and said speed graph in a predetermined area in said work memory, and said operation control information generating means generates a locating program and a parameter for the radius-instructed circular interpolation control as operation control information in accordance with information stored in said work memory.

12. A location programming apparatus for generating operation control information including a locating control parameter and a locating program for a controller for controlling a motor for operating a subject which must be controlled, said location programming apparatus comprising:

locating control type setting means for setting locating control type for controlling the operation of the subject which must be controlled;

graphical data generating means for graphically generating graph data of the locating program on a work memory in accordance with the set locating control type; and operation control information generating means for generating operation control information on a parameter memory and a locating program memory in accordance with graph data stored in said work memory, wherein said graphical data generating means uses a coordinate graph in which a position control unit of the instructed axis which must be operated is made to be a unit of a coordinate axis and which indicates the position of the subject which must be controlled and a speed graph having a speed axis and a time axis to indicate change of the speed as time elapses so as to generate graph data, wherein when the set locating control type is central-point-instructed circular interpolation control, said graphical data generating means stores information generated on said coordinate graph and said speed graph in a predetermined area in said work memory, and said operation control information generating means generates a locating program and a parameter for the central-point-instructed circular interpolation control as operation control information in accordance with information stored in said work memory.

13. A location programming apparatus for generating operation control information including a locating control parameter and a locating program for a controller for controlling a motor for operating a subject which must be controlled, said location programming apparatus comprising:

locating control type setting means for setting locating control type for controlling the operation of the subject which must be controlled;

graphical data generating means for graphically generating graph data of the locating program on a work memory in accordance with the set locating control type; and operation control information generating means for generating operation control information on a parameter memory and a locating program memory in accordance with graph data stored in said work memory, wherein said graphical data generating means uses an other-time-transition graph having an amplitude axis and a time axis to indicate change in the degree of reciprocating motion as time elapses and a speed graph having a speed axis and a time axis to indicate change in the speed as time elapses so as to generate data, wherein when the set locating control type is high-speed oscillation control, said graphical data generating means stores information generated on said coordinate graph and said speed graph in a predetermined area in said work memory, and said operation control information generating means generates a locating program and a parameter for the high-speed oscillation control as operation control information in accordance with information stored in said work memory.

14. A location programming apparatus for generating operation control information for a controller for controlling a motor for operating a subject which must be controlled, said location programming apparatus comprising:

graphical data generating means for generating, on a work memory, a position data table for a locating program having a time transition graph to graphically correspond to time transition; and means for transmitting said position data table stored in said work memory to said locating controller; and wherein said graphical data generating means generates a position data table for controlling one cycle of a plurality of axes corresponding to the set number of axes to be controlled.

15. A location programming apparatus for generating operation control information including a locating control parameter and a locating program for a controller for controlling a motor for operating a subject which must be controlled, said location programming apparatus comprising:

locating control type setting means for setting locating control type for controlling the operation of the subject which must be controlled;

graphical data generating means for graphically generating graph data of the locating program on a work memory in accordance with the set locating control type; and operation control information generating means for generating operation control information on a parameter memory and a locating program memory in accordance with graph data stored in said work memory, wherein said graphical data generating means uses a other-time-transition graph having an amplitude axis and a time axis to indicate change in the degree of reciprocating motion as time elapses and a speed graph having a speed axis and a time axis to indicate change in the speed as time elapses so as to generate graph data.

16. A location programming apparatus according to claim 15, wherein when the set locating control type is high-speed oscillation control, said graphical data generating means stores information generated on said coordinate graph and said speed graph in a predetermined area in said work memory, and said operation control information generating means generates a locating program and a parameter for the high-speed oscillation control as operation control information in accordance with information stored in said work memory.

17. A location programming method for generating operation control information including a locating control parameter and a locating program for a controller for controlling a motor for operating a subject which must be controlled, said location programming method comprising:

a step of setting locating control type based on input by a user for selecting one of a first process which interpolates axes, and at least a second process that does not require axes interpolation, for controlling the operation of the subject which must be controlled;

a step of graphically generating graph data of the locating program on a work memory in accordance with the set locating control type; and a step of generating operation control information on a parameter memory and a locating program memory in accordance with graph data stored in said work memory, wherein said graphical data generating step uses a coordinate graph in which a position control unit of the instructed axis which must be operated is made to be a unit of a coordinate axis and which indicates the position of the subject which must be controlled and a speed graph having a speed axis and a time axis to indicate change of the speed as time elapses so as to generate graph data.

18. A location programming method for generating operation control information including a locating control parameter and a locating program for a controller for controlling a motor for operating a subject which must be controlled, said location programming method comprising:

a step of setting locating control type based on input by a user for selecting one of a first process which interpolates axes, and at least a second process that does not require axes interpolation, for controlling the operation of the subject which must be controlled;

a step of graphically generating graph data of the locating program on a work memory in accordance with the set locating control type; and a step of generating operation control information on a parameter memory and a locating program memory in accordance with graph data stored in said work memory, wherein said graphical data generating step uses a speed graph having a speed axis and a time axis to indicate change in the speed as time elapses so as to generate graph data.

19. A location programming method for generating operation control information including a locating control parameter and a locating program for a controller for controlling a motor for operating a subject which must be controlled, said location programming method comprising:

a step of setting locating control type for controlling the operation of the subject which must be controlled;

a step of graphically generating graph data of the locating program on a work memory in accordance with the set locating control type; and a step of generating operation control information on a parameter memory and a locating program memory in accordance with graph data stored in said work memory, wherein said graphical data generating step uses a other-time-transition graph having an amplitude axis and a time axis to indicate change in the degree of reciprocating motion as time elapses and a speed graph having a speed axis and a time axis to indicate change in the speed as time elapses so as to generate graph data.

20. A location programming apparatus for generating operation control information including a locating control parameter and a locating program for a controller for controlling a motor for operating a subject which must be controlled, said location programming apparatus comprising:

locating control type setting means for setting locating control type for controlling the operation of the subject which must be controlled;

graphical data generating means for graphically generating graph data of the locating program on a work memory in accordance with the set locating control type; and operation control information generating means for generating operation control information on a parameter memory and a locating program memory in accordance with graph data stored in said work memory, wherein said graphical data generating means uses a coordinate graph in which a position control unit of the instructed axis which must be operated is made to be a unit of a coordinate axis and which indicates the position of the subject which must be controlled and a speed graph having a speed axis and a time axis to indicate change of the speed as time elapses so as to generate graph data, wherein when the set locating control type is passing-point-instructed circular interpolation control, said graphical data generating means stores information generated on said coordinate graph and said speed graph in a predetermined area in said work memory, and said operation control information generating means generates a locating program and a parameter for the passing-point-instructed circular interpolation control as operation control information in accordance with information stored in said work memory.

* * * * *